US009151937B2

(12) United States Patent
Uchida et al.

(10) Patent No.: US 9,151,937 B2
(45) Date of Patent: Oct. 6, 2015

(54) OPTICAL SYSTEM AND OPTICAL INSTRUMENT, IMAGE PICKUP APPARATUS, AND IMAGE PICKUP SYSTEM USING THE SAME

(71) Applicant: OLYMPUS CORPORATION, Tokyo (JP)

(72) Inventors: Yoshihiro Uchida, Tokyo (JP); Kenichiro Abe, Tokyo (JP); Keisuke Ichikawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/529,885

(22) Filed: Oct. 31, 2014

(65) Prior Publication Data

US 2015/0103413 A1 Apr. 16, 2015

Related U.S. Application Data

(63) Continuation of application No. PCT/JP2013/075153, filed on Sep. 18, 2013.

(30) Foreign Application Priority Data

Sep. 21, 2012 (JP) ................................ 2012-208980

(51) Int. Cl.
*G02B 15/14* (2006.01)
*G02B 13/18* (2006.01)
(Continued)

(52) U.S. Cl.
CPC ................ *G02B 15/14* (2013.01); *G02B 13/18* (2013.01); *G02B 13/26* (2013.01); *G02B 21/02* (2013.01)

(58) Field of Classification Search
CPC ...... G02B 21/025; G02B 13/18; G02B 13/24; G02B 13/26; G02B 15/14
USPC ................................................ 359/642–830
See application file for complete search history.

(56) References Cited

U.S. PATENT DOCUMENTS 7,646,542 B2 1/2010 Yonetani
7,663,807 B2 2/2010 Yonetani
(Continued)

FOREIGN PATENT DOCUMENTS

JP 11-133312 5/1999
JP 2008-185965 8/2008
(Continued)

OTHER PUBLICATIONS

International Search Report, dated Jan. 7, 2014, issued in corresponding International Application No. PCT/JP2013/075153.
(Continued)

*Primary Examiner* — Mahidere Sahle
(74) *Attorney, Agent, or Firm* — Kenyon & Kenyon LLP

(57) ABSTRACT

An optical system which forms an optical image on an image pickup element, comprising in order from an object side,
a first lens unit having a positive refractive power, which includes a plurality of lenses,
a stop, and
a second lens unit which includes a plurality of lenses, wherein
the first lens unit includes a first object-side lens which is disposed nearest to an object, and
the second lens unit includes a second image-side lens which is disposed nearest to an image, and
the first lens unit includes a negative lens, and a positive lens which is disposed on the object side of the negative lens, and
the following conditional expressions are satisfied:

$$\beta \leq -1.1 \quad (15)$$

$$0.08 < NA \quad (16)$$

$$1.0 < WD/BF \quad (19)$$

$$0.5 < 2\times(WD\times\tan(\sin^{-1} NA)+Y_{obj})/\phi_s < 4.0 \quad (20).$$

10 Claims, 107 Drawing Sheets

(51) Int. Cl.
*G02B 13/26* (2006.01)
*G02B 21/02* (2006.01)

(56) References Cited

U.S. PATENT DOCUMENTS

| | | | |
|---|---|---|---|
| 7,965,450 | B2 | 6/2011 | Yonetani |
| 8,564,756 | B2 | 10/2013 | Kuba |

FOREIGN PATENT DOCUMENTS

| | | |
|---|---|---|
| JP | 2008-309901 | 12/2008 |
| JP | 2009-205063 | 9/2009 |
| JP | 2009-251081 | 10/2009 |
| JP | 2012-173491 | 9/2012 |

OTHER PUBLICATIONS

International Preliminary Report on Patentability, dated Apr. 2, 2015, issued in corresponding International Application No. PCT/JP2013/075153.

SA
NA' 0.25
d LINE
C LINE
g LINE
−0.2
0
0.2
(mm)

AS
FIY 3.00
ΔS
ΔM
−0.2
0
0.2
(mm)

DT
FIY 3.00
−5
0
5
(%)

CC
FIY 3.00
−0.01
0
0.01
(mm)
656.27
587.56
435.84

FIG. 26A
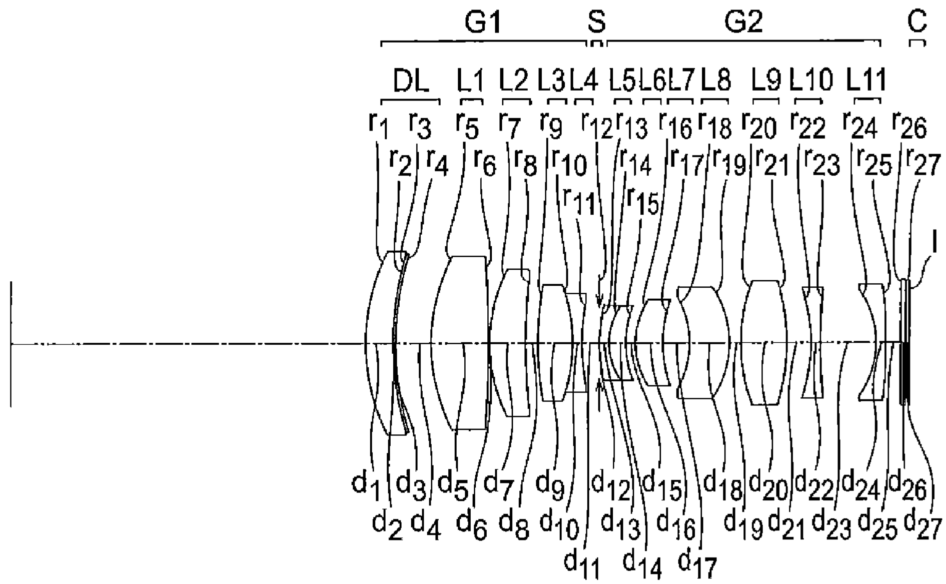
FIG.26B FIG.26C FIG.26D FIG.26E
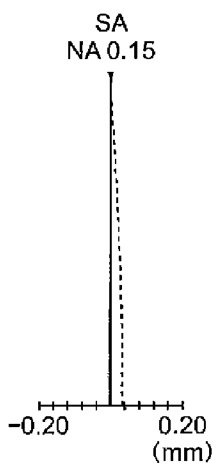
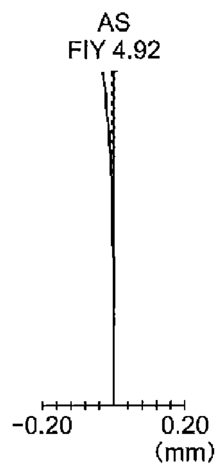
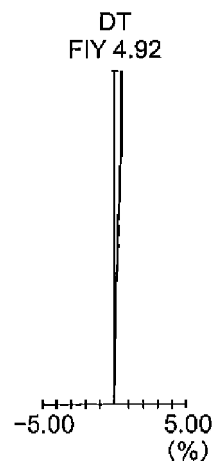
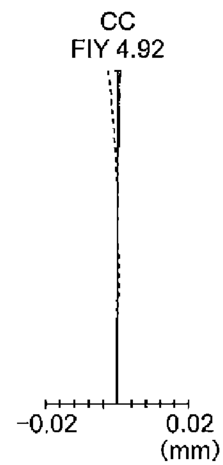

FIG. 34A
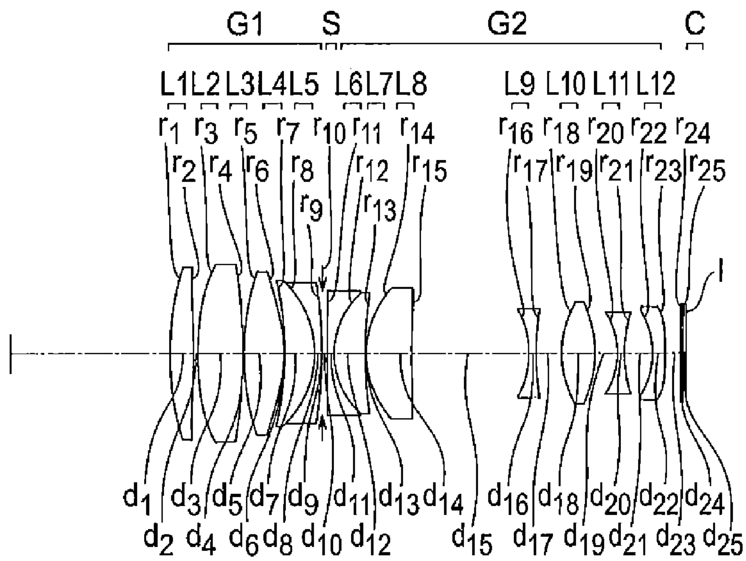
FIG.34B FIG.34C FIG.34D FIG.34E
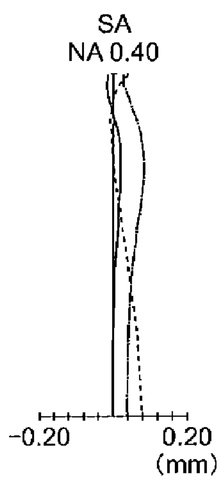
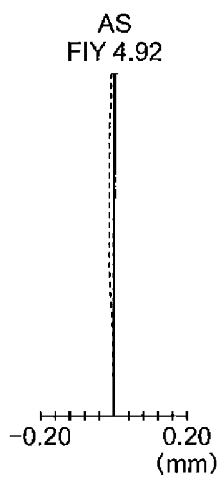
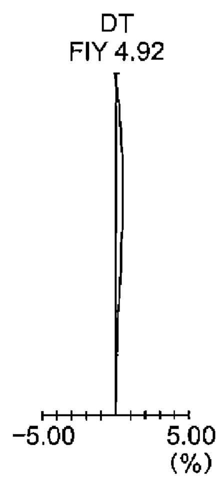
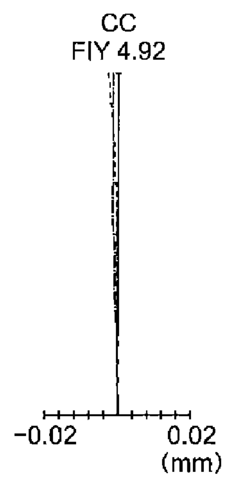

FIG. 43A
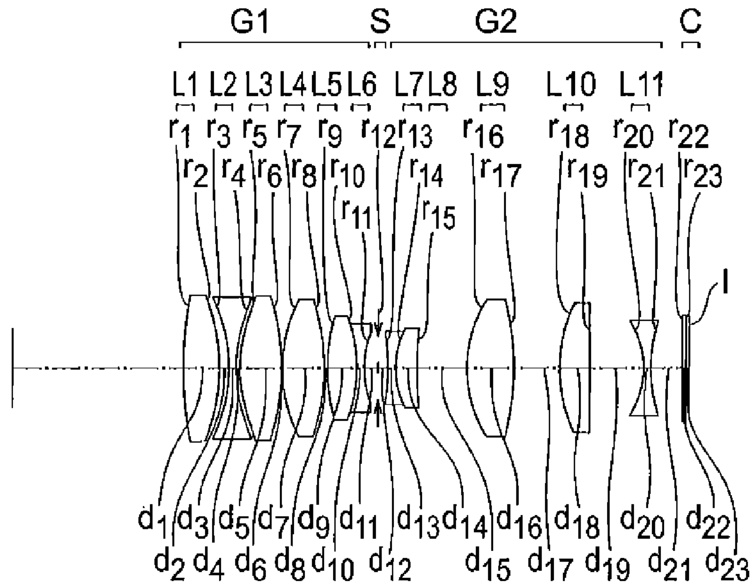
FIG.43B FIG.43C FIG.43D FIG.43E
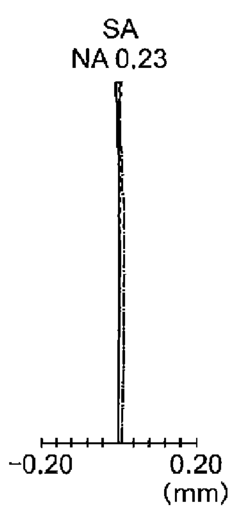
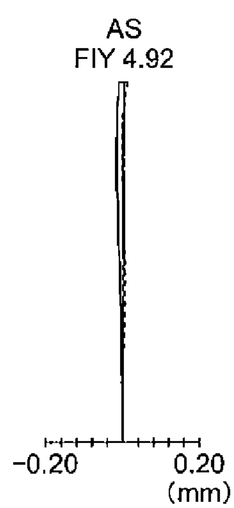
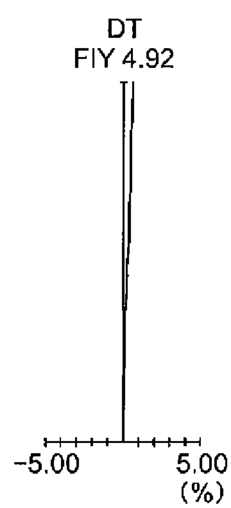
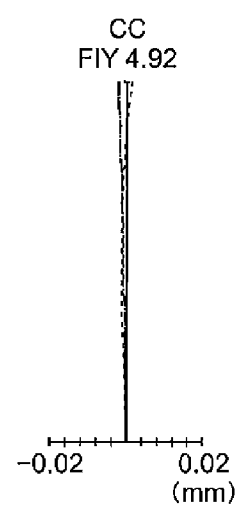

FIG. 48A
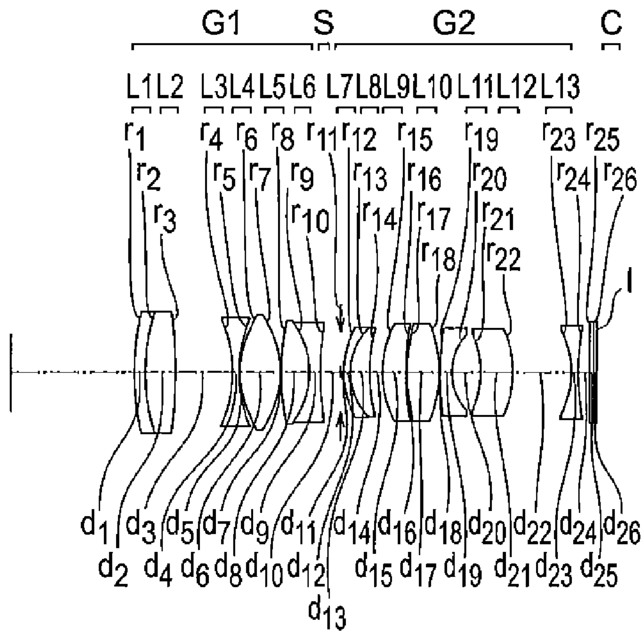
FIG.48B FIG.48C FIG.48D FIG.48E
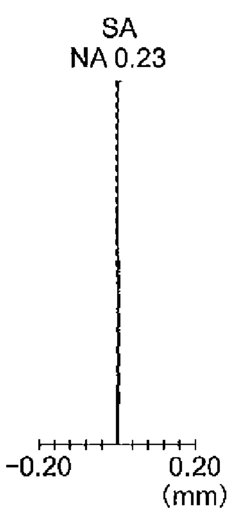
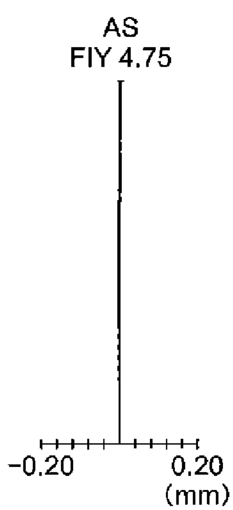
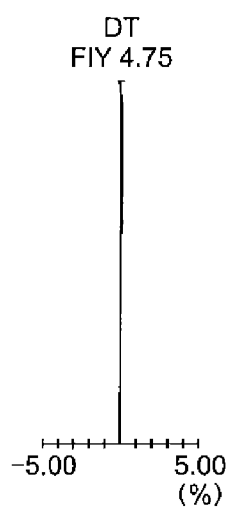
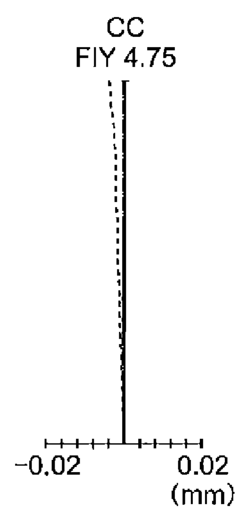

FIG. 57A
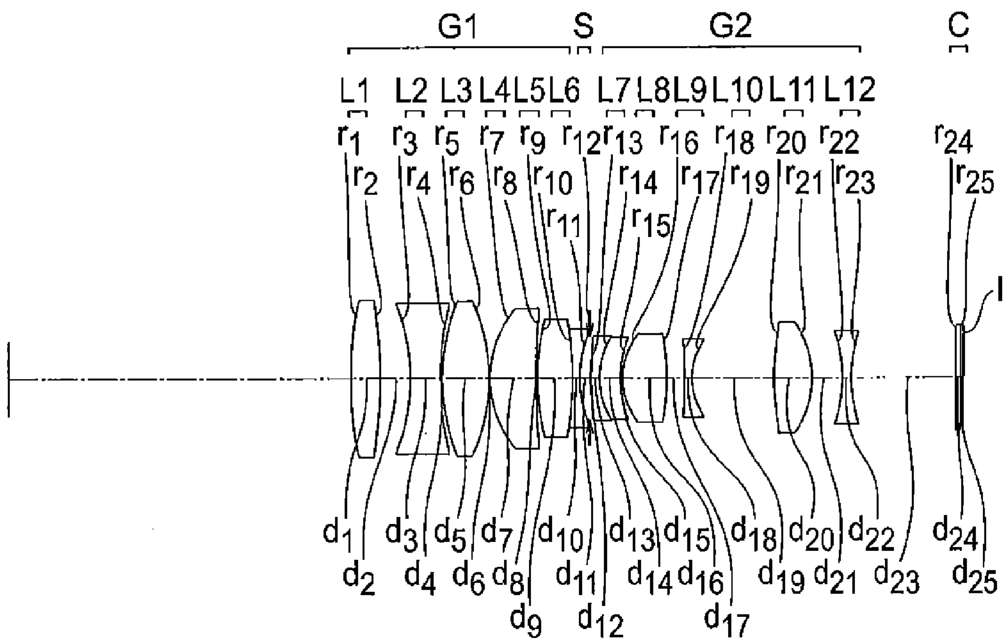
FIG.57B FIG.57C FIG.57D FIG.57E
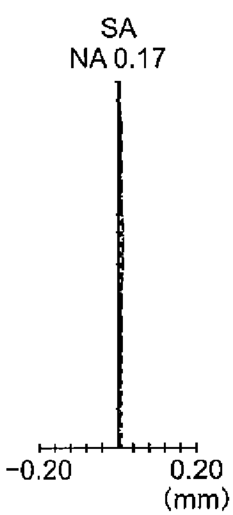
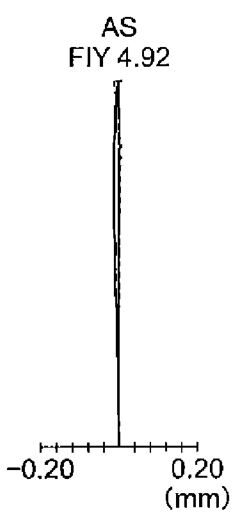
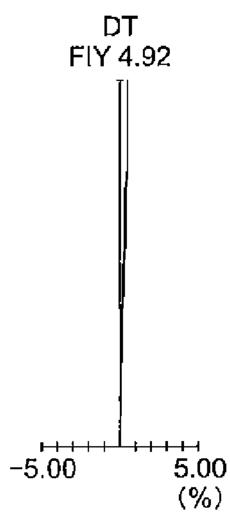
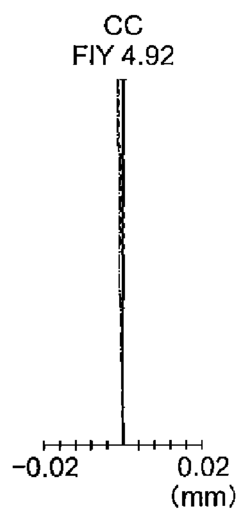

FIG. 65A
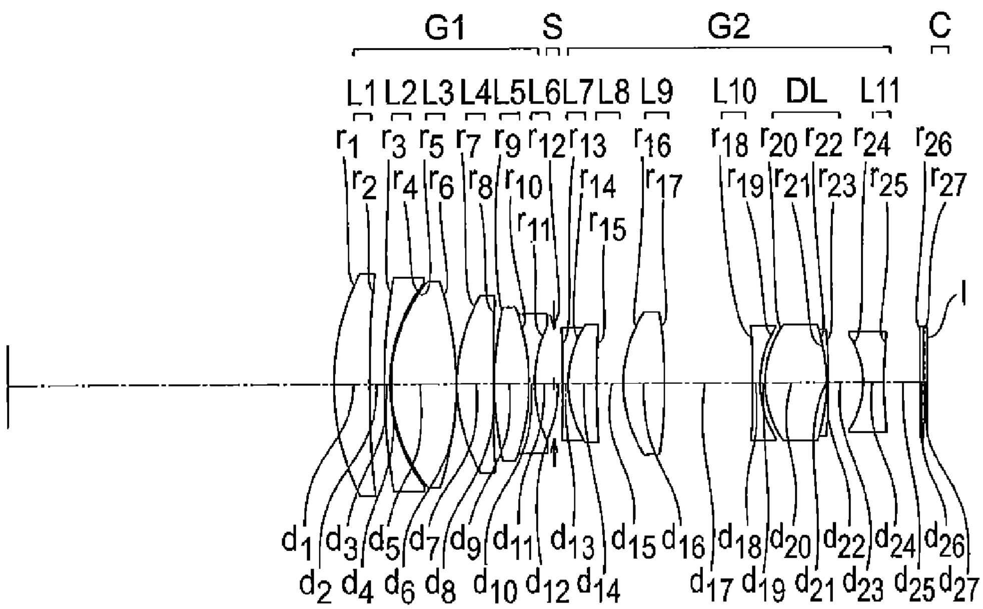
FIG.65B FIG.65C FIG.65D FIG.65E
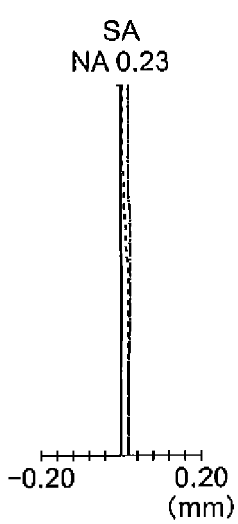
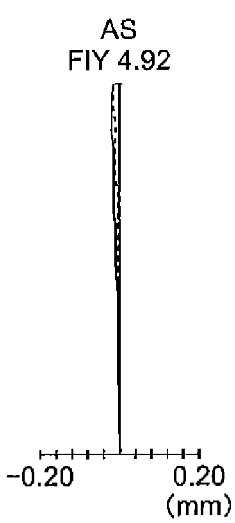
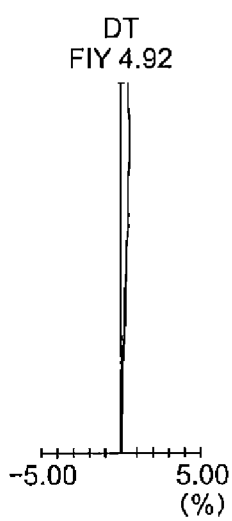
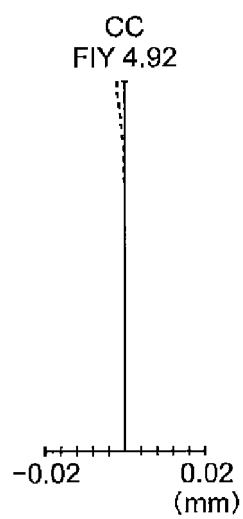

FIG. 84A
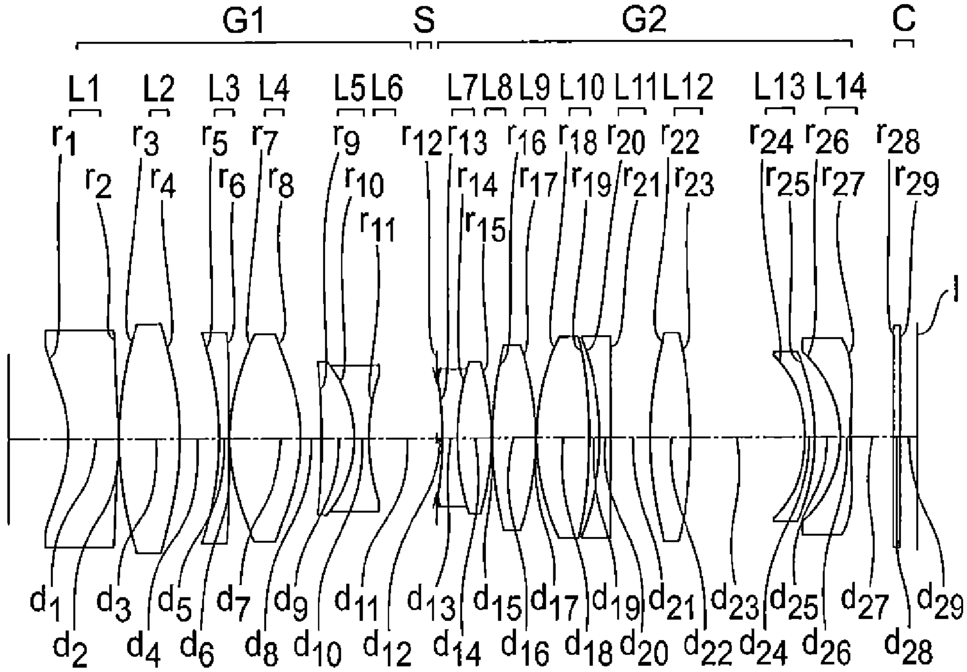
FIG.84B FIG.84C FIG.84D FIG.84E
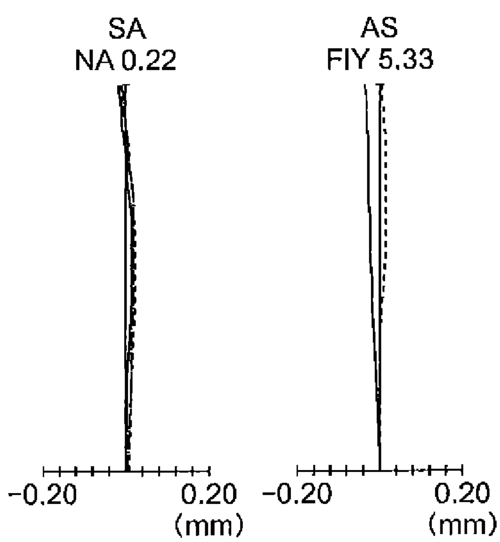
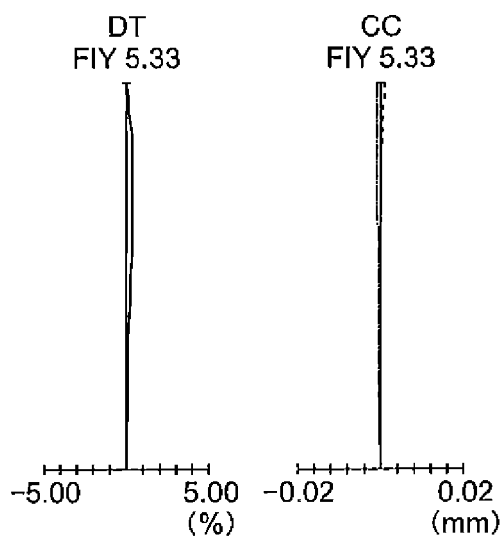

FIG. 93A
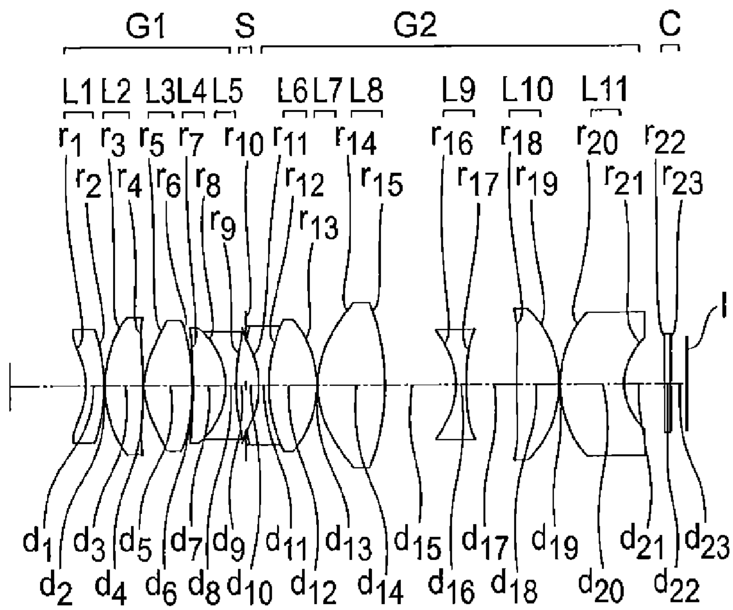
FIG.93B FIG.93C FIG.93D FIG.93E
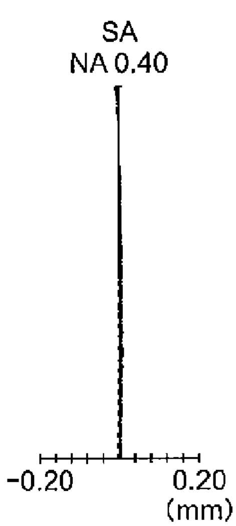
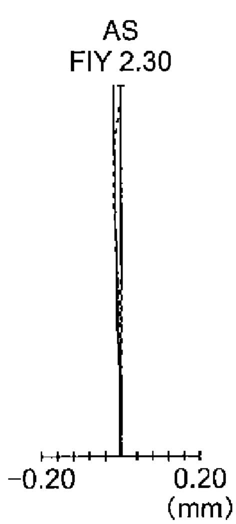
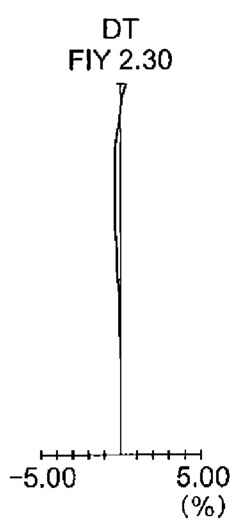
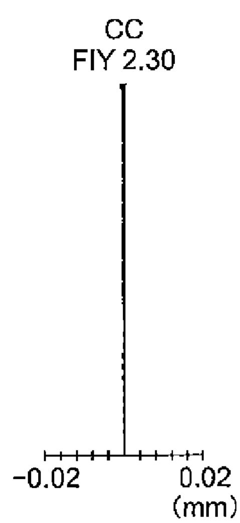

OPTICAL SYSTEM AND OPTICAL INSTRUMENT, IMAGE PICKUP APPARATUS, AND IMAGE PICKUP SYSTEM USING THE SAME

CROSS-REFERENCE TO RELATED APPLICATION

The present application is a continuation application of PCT/JP2013/075153 filed on Sep. 18, 2013 which is based upon and claims the benefit of priority from Japanese Patent Application No. 2012-208980 filed on Sep. 21, 2012; the entire contents of which are incorporated herein by reference.

BACKGROUND OF THE INVENTION

1. Field of the Invention

The present invention relates to an optical system, and an optical instrument, an image pickup apparatus, and an image pickup system using the same.

2. Description of the Related Art

In a case of observing a minute sample, a method in which, first, the overall sample is observed, and a region to be observed in detail is identified, and thereafter the region to be observed in detail is magnified and observed, has hitherto been adopted. As an image pickup apparatus to be used in such method, an image pickup apparatus which magnifies digitally an image that has been captured, and displays the magnified image is available. As an optical system to be used in such image pickup apparatus, an optical system described in Japanese Patent Application Laid-open Publication number 2012-173491 is available. Digital magnification of image is called as digital zooming.

Moreover, if conventional optical systems, such as optical systems for microscope, are differentiated according to a difference of a type of image formation, they will be divided into two types namely, optical systems of finite correction type and optical systems of infinite correction type. In the optical system of finite correction type, an object image is formed at a finite distance by a microscope objective. Whereas, in the optical system of infinite correction type, light emerged from the microscope objective becomes a substantially parallel light beam. Therefore, in the optical system of infinite correction type, an object image is formed by combining the microscope objective and a tube lens.

As aforementioned, in a microscope optical system of the infinite correction type, a microscope objective by which, the light emerged becomes substantially parallel light beam, has been used. As an example of the microscope objective, a microscope objective described in Japanese Patent Application Laid-open Publication No. 2008-185965 is available. The microscope objective described in Japanese Patent Application Laid-open Publication No. 2008-185965 has a numerical aperture (NA) of an extremely large value on an object side (sample side), such that a numerical aperture on the object side is 0.8. This microscope objective is used with the tube lens, and at this time, if a numerical aperture on an image side is small, a bright and sharp image cannot be formed.

SUMMARY OF THE INVENTION

An optical system according to an aspect of the present invention is an optical system which forms an optical image on an image pickup element including a plurality of pixels arranged in rows two-dimensionally, which converts a light intensity to an electric signal, and a plurality of color filters disposed on the plurality of pixels respectively, comprising in order from an object side, a first lens unit having a positive refractive power, which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the first lens unit includes a negative lens, and a positive lens which is disposed on the object side of the negative lens, and the following conditional expressions (15), (16), (19), and (20) are satisfied:

$$\beta \le -1.1 \quad (15)$$

$$0.08 < NA \quad (16)$$

$$1.0 < WD/BF \quad (19)$$

$$0.5 < 2\times(WD\times\tan(\sin^{-1} NA)+Y_{obj})/\phi_s < 4.0 \quad (20)$$

where,

β denotes an imaging magnification of the optical system,

NA denotes a numerical aperture on the object side of the optical system,

WD denotes a distance on an optical axis from the object up to an object-side surface of the first object-side lens, BF denotes a distance on the optical axis from an image-side surface of the second image-side lens up to the image, $Y_{obj}$ denotes a maximum object height, and $\phi_s$ denotes a diameter of the stop.

Moreover, an optical system according to another aspect of the present invention is an optical system which forms an optical image on an image pickup element including a plurality of pixels arranged in rows two-dimensionally, which converts a light intensity to an electric signal, and a plurality of color filters disposed on the plurality of pixels respectively, comprising in order from an object side, a first lens unit which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the following conditional expressions (16), (21), (23-1), and (24-1) are satisfied:

$$0.08 < NA \quad (16)$$

$$0.01 < D_{max}/\phi_s < 3.0 \quad (21)$$

$$0.6 \le L_L/D_{oi} \quad (23\text{-}1)$$

$$0.015 < 1/\nu d_{min} - 1/\nu d_{max} \quad (24\text{-}1)$$

where,

NA denotes a numerical aperture on the object side of the optical system, $D_{max}$ denotes a maximum distance from among distances on an optical axis of adjacent lenses in the optical system, $\phi_s$ denotes a diameter of the stop, $L_L$ denotes a distance on the optical axis from an object-side surface of the first object-side lens up to an image-side surface of the second image-side lens, $D_{oi}$ denotes a distance on the optical axis from the object to the image, $\nu d_{min}$ denotes a smallest Abbe's number from among Abbe's numbers for lenses forming the optical system, and $\nu d_{max}$ denotes a largest Abbe's number from among the Abbe's numbers for lenses forming the optical system.

An optical system according to still another aspect of the present invention comprising in order from an object side, a lens unit Gf having a positive refractive power, a stop, and a lens unit Gr having a positive refractive power, and the following conditional expressions (4-1), (5), (9-1), and (13) are satisfied:

$$0.08<NA, 0.08<NA' \quad (4\text{-}1)$$

$$-2<\beta<-0.5 \quad (5)$$

$$0<d_1/\Sigma d<0.2 \quad (9\text{-}1)$$

$$-20<\Delta f_{cd}/\epsilon d<20 \quad (13)$$

where,

NA denotes a numerical aperture on the object side of the optical system,

NA' denotes a numerical aperture on an image side of the optical system, $\beta$ denotes a projection magnification of the optical system, $d_1$ denotes a distance on an optical axis from a surface positioned nearest to the image side of the lens unit Gf up to a surface positioned nearest to the object side of the lens unit Gr, $\Sigma d$ denotes a sum total of lens thickness on the optical axis of an overall optical system, $\epsilon d$ denotes an Airy disc radius for a d-line which is determined by the numerical aperture on the image side of the optical system, and $\Delta f_{cd}$ denotes a difference in a focal position on a C-line and a focal position on the d-line, which is a difference in positions at which light is focused when parallel light is made to be incident on the lens unit Gr from the stop side.

Moreover, an optical system according to still another aspect of the present invention comprising in order from an object side, a lens unit Gf having a positive refractive power, a stop, and a lens unit Gr having a positive refractive power, and the following conditional expression (4-1), (5), (10-1), and (13) are satisfied:

$$0.08<NA, 0.08<NA' \quad (4\text{-}1)$$

$$-2<\beta<-0.5 \quad (5)$$

$$0<d_2/\Sigma d<2 \quad (10\text{-}1)$$

$$-20<\Delta f_{cd}/\epsilon d<20 \quad (13)$$

where,

NA denotes a numerical aperture on the object side of the optical system,

NA' denotes a numerical aperture on an image side of the optical system, $\beta$ denotes a projection magnification of the optical system, $d_2$ denotes a distance on an optical axis from a front principal point of the lens unit Gf up to a rear principal point of the lens unit Gr, $\Sigma d$ denotes a sum total of lens thickness on the optical axis of an overall optical system, $\epsilon d$ denotes an Airy disc radius for a d-line which is determined by the numerical aperture on the image side of the optical system, and $\Delta f_{cd}$ denotes a difference in a focal position on a C-line and a focal position on the d-line, which is a difference in positions at which light is focused when parallel light is made to be incident on the lens unit Gr from the stop side.

Moreover, an optical system according to still another aspect of the present invention is an optical system which forms an optical image on an image pickup element including a plurality of pixels arranged in rows two-dimensionally, which converts a light intensity to an electric signal, and a plurality of color filters disposed on the plurality of pixels respectively, and for which, a pitch of pixels is not more than 5.0 μm, comprising in order from an object side, a first lens unit which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the following conditional expressions (16), (18), and (25) are satisfied:

$$0.08<NA \quad (16)$$

$$-30<(\Delta D_{G2dC}+(\Delta D_{G1dC}\times\beta_{G2C}^2/(1+\beta_{G2C}\times\Delta D_{G1dC}/f_{G2C})))/\epsilon_d<30 \quad (18)$$

$$0.15<D_{os}/D_{oi}<0.8 \quad (25)$$

where,

NA denotes a numerical aperture on the object side of the optical system, $\Delta D_{G1dC}$ denotes a distance from a position of an image point $P_{G1}$ on a d-line up to a position of an image point on a C-line, at an image point of the first lens unit with respect to an object point on an optical axis, $\Delta D_{G2dC}$ denotes a distance from a position of an image point on the d-line up to a position of an image point on the C-line, at an image point of the second lens unit, when the image point $P_{G1}$ is let to be an object point of the second lens unit, $\Delta D_{G1dC}$ and $\Delta D_{G2dC}$ are let to be positive in a case in which, the position of the image point on the C-line is on the image side of the position of the image point on the d-line, $\Delta D_{G1dC}$ and $\Delta D_{G2dC}$ are let to be negative in a case in which, the position of the image point on the C-line is on the object side of the position of the image point on the d-line, $\beta_{G2C}$ denotes an imaging magnification for the C-line of the second lens unit when the image point $P_{G1}$ is let to be the object point of the second lens unit, $f_{G2C}$ denotes a focal length for the C-line of the second lens unit, $\epsilon_d$ denotes an Airy disc radius for the d-line, which is determined by the numerical aperture on the image side of the optical system, $D_{os}$ denotes a distance on the optical axis from the object up to the stop, and $D_{oi}$ denotes a distance on the optical axis from the object up to the image, and the object point and the image point are points on the optical axis, and also include cases of being a virtual object point and a virtual image point.

Moreover, a microscope which is an example of an optical instrument of the present invention, or an image pickup apparatus of the present invention comprises, the optical system described above, and an image pickup element.

Furthermore, an image pickup system of the present invention comprises, the image pickup apparatus described above, a stage which holds an object, and an illuminating unit which illuminates the object.

BRIEF DESCRIPTION OF THE DRAWINGS

FIG. 26A is a cross-sectional view along an optical axis showing an optical arrangement, and FIG. 26B, FIG. 26C, FIG. 26D, and FIG. 26E are diagrams showing a spherical aberration (SA), an astigmatism (AS), a distortion (DT), and a chromatic aberration of magnification (CC) respectively, of the optical system according to an example 19;

FIG. 34A is a cross-sectional view along an optical axis showing an optical arrangement, and FIG. 34B, FIG. 34C, FIG. 34D, and FIG. 34E are diagrams showing a spherical aberration (SA), an astigmatism (AS), a distortion (DT), and a chromatic aberration of magnification (CC) respectively, of the optical system according to an example 27;

FIG. 43A is a cross-sectional view along an optical axis showing an optical arrangement, and FIG. 43B, FIG. 43C, FIG. 43D, and FIG. 43E are diagrams showing a spherical aberration (SA), an astigmatism (AS), a distortion (DT), and a chromatic aberration of magnification (CC) respectively, of the optical system according to an example 36;

FIG. 48A is a cross-sectional view along an optical axis showing an optical arrangement, and FIG. 48B, FIG. 48C, FIG. 48D, and FIG. 48E are diagrams showing a spherical aberration (SA), an astigmatism (AS), a distortion (DT), and a chromatic aberration of magnification (CC) respectively, of the optical system according to an example 41;

FIG. 57A is a cross-sectional view along an optical axis showing an optical arrangement, and FIG. 57B, FIG. 57C, FIG. 57D, and FIG. 57E are diagrams showing a spherical aberration (SA), an astigmatism (AS), a distortion (DT), and a chromatic aberration of magnification (CC) respectively, of the optical system according to an example 50;

FIG. 65A is a cross-sectional view along an optical axis showing an optical arrangement, and FIG. 65B, FIG. 65C, FIG. 65D, and FIG. 65E are diagrams showing a spherical aberration (SA), an astigmatism (AS), a distortion (DT), and a chromatic aberration of magnification (CC) respectively, of the optical system according to an example 58;

FIG. 84A is a cross-sectional view along an optical axis showing an optical arrangement, and FIG. 84B, FIG. 84C, FIG. 84D, and FIG. 84E are diagrams showing a spherical aberration (SA), an astigmatism (AS), a distortion (DT), and a chromatic aberration of magnification (CC) respectively, of the optical system according to an example 77;

FIG. 93A is a cross-sectional view along an optical axis showing an optical arrangement, and FIG. 93B, FIG. 93C, FIG. 93D, and FIG. 93E are diagrams showing a spherical aberration (SA), an astigmatism (AS), a distortion (DT), and a chromatic aberration of magnification (CC) respectively, of the optical system according to an example 86;

DETAILED DESCRIPTION OF THE INVENTION

Figure 1:
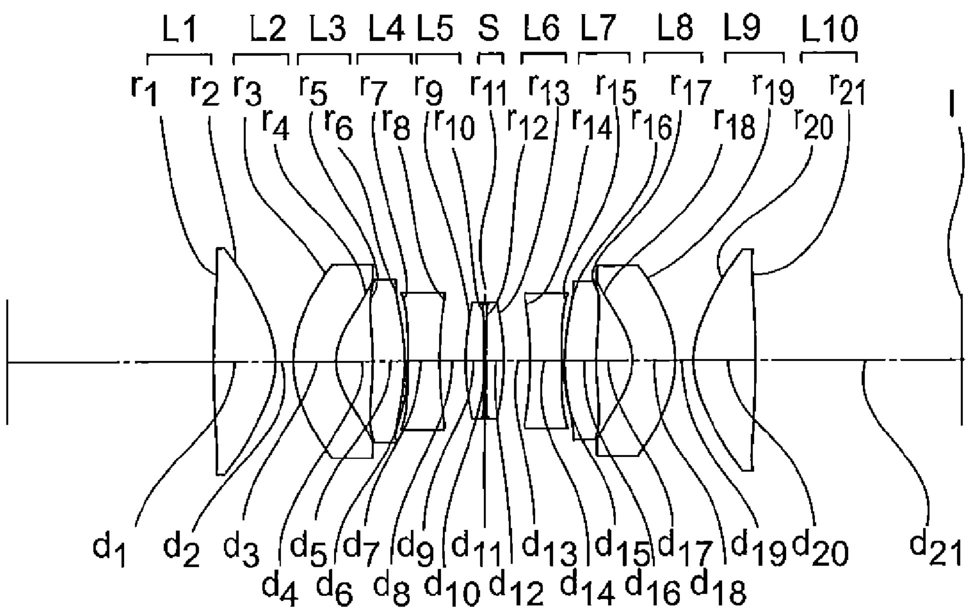
FIG. 1 is a cross-sectional view along an optical axis showing an optical arrangement of an optical system according to an example 1.
Figures 2A, 2B, 2C, 2D:
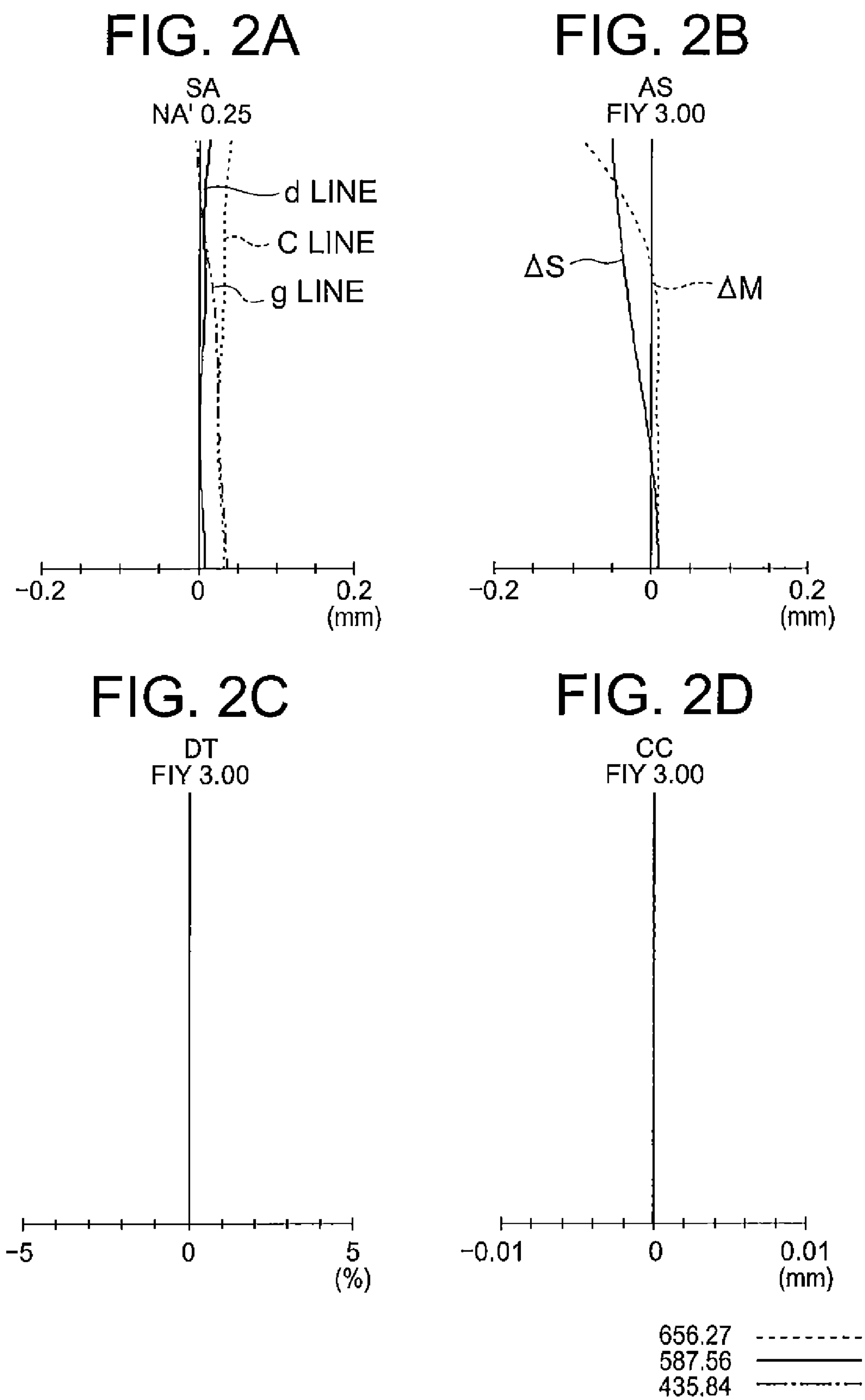
FIG. 2A, FIG. 2B, FIG. 2C, and FIG. 2D are diagrams showing a spherical aberration (SA), an astigmatism (AS), a distortion (DT), and a chromatic aberration of magnification (CC) respectively, of the optical system according to the example 1.

Prior to description of examples, an action and effect of embodiments according to certain aspects of the present embodiment will be described below. At the time of describing concretely the action and effect of the present embodiment, the description will be made by citing specific examples. However, similar to cases of examples that will be described later, aspects to be exemplified are only some of the aspects included in the embodiment, and there are a large number of variations in those aspects. Consequently, the present invention is not restricted to aspects that will be exemplified.

For instance, in optical systems from an optical system according to a first embodiment up to an optical system according to a seventh embodiment, by imparting a function of an objective lens to a lens unit Gf, and by imparting a function of an image forming lens to a lens unit Gr, it is possible to form an optical system of a microscope as an optical instrument. An embodiment of the microscope will be described later.

In the following description, a 'sample image' is let to be an 'image' appropriately, and a 'sample' is let to be an 'object' appropriately.

Moreover, in the following description, a variable (such as, a focal length, an imaging magnification, and a numerical aperture) of which, a value changes with a wavelength, is with reference to a d-line unless specifically noted. Moreover, β is used for a magnification of an overall optical system, but β has been described as a projection magnification or an imaging magnification. Furthermore, optical systems of the following embodiments are optical systems with a fixed focal length. However, an optical system may be equipped with a focusing function.

An optical system according to a first embodiment will be described below. The optical system according to the first embodiment comprises in order from an object side, a lens unit Gf having a positive refractive power, a stop, and a lens unit Gr having a positive refractive power, and includes at least one pair of lenses which satisfies the following conditional expressions (1), (2), and (3), and one lens in the pair of lenses is included in the lens unit Gf, and the other lens in the pair of lenses is included in the lens unit Gr:

$$-1.1 < r_{OBf}/r_{TLr} < -0.9 \quad (1)$$

$$-1.1 < r_{OBr}/r_{TLf} < -0.9 \quad (2)$$

$$-0.1 < (d_{OB}-d_{TL})/(d_{OB}+d_{TL}) < 0.1 \quad (3)$$

where, $r_{OBf}$ denotes a paraxial radius of curvature of an object-side surface of the one lens in the pair of lenses, $r_{OBr}$ denotes a paraxial radius of curvature of an image-side surface of the one lens in the pair of lenses, $r_{TLf}$ denotes a paraxial radius of curvature of an object-side surface of the other lens in the pair of lenses, $r_{TLr}$ denotes a paraxial radius of curvature of an image-side surface of the other lens in the pair of lenses, $d_{OB}$ denotes a thickness on the optical axis of the one lens in the pair of lenses, and $d_{TL}$ denotes a thickness on the optical axis of the other lens in the pair of lenses.

The optical system according to the first embodiment includes the lens unit Gf having a positive refractive power, the stop (aperture stop), and the lens unit Gr having a positive refractive power. Moreover, the lens unit Gf is disposed on the object side and the lens unit Gr is disposed on an image side, sandwiching the stop. Furthermore, the optical system has at least one pair of lenses that satisfies conditional expressions (1), (2), and (3).

By at least one pair of lenses satisfying conditional expressions (1), (2), and (3), each of the lens unit Gf and the lens unit Gr has at least one lens of which, a shape is plane-symmetrical with respect to the stop. In other words, in the optical system according to the first embodiment, there is at least one pair of lenses of which, the shape is plane-symmetrical with respect to the stop. Therefore, the optical system has symmetry with respect to the shape of the lens. Accordingly, it is possible to correct favorably, a chromatic aberration of magnification, a distortion, and a coma. Here, the symmetry does not refer only to cases of being completely symmetrical, but also includes cases of being nearly symmetrical.

Moreover, when the numerical aperture on the image side of the optical system is made large, an occurrence of an off-axis aberration is susceptible to be noticeable. However, according to the optical system of the first embodiment, even when the numerical aperture on the image side of the optical system is made large, it becomes easy to suppress the occurrence of the off-axis aberration. As a result, various aberrations are corrected favorably, and a bright and sharp sample image is formed.

An optical system according to a second embodiment will be described below. In the optical system according to the second embodiment, the following conditional expressions (4) and (5) are satisfied:

$$0.1<NA, 0.1<NA' \quad (4)$$

$$-2<\beta<-0.5 \quad (5)$$

where,

NA denotes a numerical aperture on the object side of the optical system,

NA' denotes a numerical aperture on an image side of the optical system, and

β denotes a projection magnification of the optical system.

By satisfying conditional expressions (4) and (5), it is possible to form a bright and sharp image. Therefore, even if a light intensity of illuminating light or excitation light is small, a bright and sharp image is formed. Moreover, it is possible to make the magnification (projection magnification) of the optical system one time, or close to one time. In this case, by making the numerical aperture on the object side large, it is possible to make the numerical aperture on the image side large (the purpose is served without making the numerical aperture on the image side that small). As a result, it is possible to make the numerical aperture on the image side large while maintaining the optical system to be small-sized. Moreover, it is possible to correct various aberrations favorably.

For making the numerical aperture on the image side large, it is necessary to make the numerical aperture on the object side large. However, by making so as to exceed a lower limit value of conditional expression (4), the numerical aperture on the object side is not required to be made large. Therefore, small-sizing of the optical system becomes easy. By making so as to exceed a lower limit of conditional expression (5), the magnification of the optical system does not become excessively large. In this case, various aberrations occurred in the lens unit Gf, such as the spherical aberration and a curvature of field, are not enlarged significantly in the lens unit Gr. Therefore, it is preferable from a viewpoint of correcting the aberration favorably to exceed the lower limit value of conditional expression (5).

By making so as to fall below an upper limit value of conditional expression (5), an image that is formed does not become excessively small. Therefore, observation and image pickup of a microstructure of a sample become easy.

Here, it is preferable that the following conditional expression (4') is satisfied instead of conditional expression (4).

$$0.13<NA<0.9, 0.13<NA'<0.9 \quad (4')$$

Also, it is preferable that the following conditional expression (5') is satisfied instead of conditional expression (5).

$$-1.5<\beta<-0.75 \quad (5')$$

Moreover, it is more preferable that the following conditional expression (5") is satisfied instead of conditional expression (5)

$$-1.2<\beta<-0.8 \quad (5'')$$

An optical system according to a third embodiment will be described below. The optical system according to the third embodiment comprises in order from an object side, a lens unit Gf having a positive refractive power, a stop, and a lens unit Gr having a positive refractive power, and the following conditional expressions (4) and (6) are satisfied:

$$0.1<NA, 0.1<NA' \quad (4)$$

$$0.5<f_{OB}/f_{TL}<2 \quad (6)$$

where,

NA denotes a numerical aperture on the object side of the optical system,

NA' denotes a numerical aperture on an image side of the optical system, $f_{OB}$ denotes a focal length of the lens unit Gf, and $f_{TL}$ denotes a focal length of the lens unit Gr.

The optical system according to the third embodiment includes the lens unit Gf having a positive refractive power, the stop (aperture stop), and the lens unit Gr having a positive refractive power. Moreover, the lens unit Gf is disposed on the object side and the lens unit Gr is disposed on the image side, sandwiching the stop. Therefore, in the optical system according to the third embodiment, the refractive power is symmetrical with respect to the stop. In other words, regarding the refractive power, the optical system has symmetry. Therefore, it is possible to correct the chromatic aberration of magnification, the distortion, and the coma aberration favorably.

Moreover, when the numerical aperture on the image side of the optical system is made large, an occurrence of an off-axis aberration is susceptible to be noticeable. However, according to the optical system of the third embodiment, even when the numerical aperture on the image side of the optical system is made large, it becomes easy to suppress the occurrence of the off-axis aberration. As a result, various aberrations are corrected favorably, and a bright and sharp sample image is formed.

A technical significance of conditional expression (4) is as mentioned above. Moreover, a technical significance of conditional expression (6) is similar to the technical significance of conditional expression (5).

Here, it is preferable that the following conditional expression (6') is satisfied instead of conditional expression (6).

$$0.75<f_{OB}/f_{TL}<1.5 \quad (6')$$

Moreover, it is more preferable that the following conditional expression (6") is satisfied instead of conditional expression (6).

$$0.8<f_{OB}/f_{TL}<1.2 \quad (6'')$$

An optical system according to a fourth embodiment will be described below. The optical system according to the fourth embodiment comprises in order from an object side, a lens unit Gf having a positive refractive power, a stop, and a lens unit Gr having a positive refractive power, and the following conditional expressions (7), (8), and (9) are satisfied:

$$30\%\leq MTF_{OB} \quad (7)$$

$$30\%\leq MFT_{TL} \quad (8)$$

$$0<d_1/\Sigma d<0.5 \quad (9)$$

where, $MTF_{OB}$ denotes an MTF (Modulation Transfer Function) on an axis in the lens unit Gf, and is an MTF with respect to a spatial frequency of fc/4, $MTF_{TL}$ denotes an MTF on an axis in the lens unit Gr, and is an MTF with respect to a spatial frequency of fc'/4, where fc denotes a cut-off frequency with respect to the numerical aperture on the object side of the optical system, and fc' denotes a cut-off frequency with respect to the numerical aperture on the image side of the optical system, and both $MTF_{OB}$ and $MTF_{TL}$ are MTFs at positions at which, light is focused when parallel light of an e-line is made to be incident from the stop side respectively, $d_1$ denotes a distance on an optical axis from a surface positioned nearest to the image side of the lens unit Gf up to a surface positioned nearest to the object side of the lens unit Gr, and Σd denotes a sum total of lens thickness on the optical axis of the overall optical system.

By satisfying conditional expressions (7) and (8), it becomes possible to impart a function equivalent to a function of the objective to the lens unit Gf, and to impart a function equivalent to a function of the tube lens to the lens unit Gr. Accordingly, the optical system becomes suitable for a microscope optical system and an optical system which is suitable for an object of forming a sharp sample image, similar to the microscope optical system. Conditional expression (7-1) or conditional expression (7-1') that will be described later may be satisfied instead of conditional expression (7). Moreover, conditional expression (8-1) or conditional expression (8-1') that will be described later may be satisfied instead of conditional expression (8).

By satisfying conditional expression (9), it is possible to dispose the lens unit Gf and the lens unit Gr near the stop (pupil). Here, when the numerical aperture on the image side of the optical system is made large, an occurrence of the off-axis aberration is susceptible to be noticeable. However, according to the optical system of the fourth embodiment, even when the numerical aperture on the image side of the optical system is made large, it becomes easy to suppress the occurrence of the off-axis aberration, particularly the occurrence of the coma. As a result, various aberrations are corrected favorably, and a bright and sharp sample image is formed. Any of conditional expressions (9-1), (9-1'), (9-1"), and (9-1''') which will be described later may be satisfied instead of conditional expression (9).

An optical system according to a fifth embodiment will be described below. The optical system according to the fifth embodiment comprises in order from an object side, a lens unit Gf having a positive refractive power, a stop, and a lens unit Gr having a positive refractive power, and the following conditional expressions (7), (8), and (10) are satisfied:

$$30\%\leq MTF_{OB} \quad (7)$$

$$30\%\leq MFT_{TL} \quad (8)$$

$$0<d_2/\Sigma d<4 \quad (10)$$

where, $MTF_{OB}$ denotes an MTF on an axis in the lens unit Gf, and is an MTF with respect to a spatial frequency of fc/4, $MTF_{TL}$ denotes an MTF on an axis in the lens unit Gr, and is an MTF with respect to a spatial frequency of fc'/4, where fc denotes a cut-off frequency with respect to the numerical aperture on the object side of the optical system, and fc' denotes a cut-off frequency with respect to the numerical aperture on the image side of the optical system, and both $MTF_{OB}$ and $MTF_{TL}$ are MTFs at positions at which, light is focused when parallel light of an e-line is made to be incident from the stop side respectively, $d_2$ denotes a distance on an optical axis from a front principal point of the lens unit Gf up to a rear principal point of the lens unit Gr, and Σd denotes a sum total of lens thickness on the optical axis of the overall optical system.

A technical significance of conditional expressions (7) and (8) is as already been explained. Conditional expression (7-1) or conditional expression (7-1') that will be described later may be satisfied instead of conditional expression (7). Moreover, conditional expression (8-1) or conditional expression (8-1') that will be described later may be satisfied instead of conditional expression (8).

By satisfying conditional expression (10), the rear principal point of the lens unit Gf and the front principal point of the lens unit Gr are positioned near the stop (pupil). Here, when the numerical aperture on the image side of the optical system is made large, an occurrence of the off-axis aberration is susceptible to be noticeable. However, according to the optical system of the fifth embodiment, even when the numerical aperture on the image side of the optical system is made large, it becomes easy to suppress the occurrence of the off-axis aberration, particularly the occurrence of the coma. As a result, various aberrations are corrected favorably, and a bright and sharp image is formed. Any of conditional expressions (10-1), (10-1'), (10-1") and (10-1''') that will be described later may be satisfied instead of conditional expression (10).

It is preferable that the optical systems of embodiments from the first embodiment to the fifth embodiment (hereinafter, appropriately called as the optical system according to the present embodiment) have an arrangement of an optical system according to the other embodiments, and satisfy conditional expressions. Accordingly, it is possible to provide an optical system having a large numerical aperture on the image side, and in which, various aberrations are corrected favorably. Moreover, a bright and sharp sample image, in which various aberrations are corrected favorably, is formed.

Moreover, in the optical system according to the present embodiment, it is preferable that the following conditional expression (11) is satisfied:

$$0.05<\Delta f/Y<0.05 \quad (11)$$

where,

Δf denotes a difference in a focal position on a C-line and a focal position on an F-line, which is a difference in positions at which light is focused when parallel light is made to be incident on the lens unit Gr from the stop side, and Y denotes the maximum image height in an overall optical system.

In the optical system according to the present embodiment, the optical system has symmetry with regard to a shape of lens or a refractive power of lens, or both. Therefore, the chromatic aberration of magnification, the distortion, and the coma occur in opposite directions in the lens unit Gf and the lens unit Gr. Therefore, by rendering the lens unit Gf and the lens unit Gr in a combined state, it is possible to cancel an aberration occurred in the lens unit Gf, in the lens unit Gr.

However, a longitudinal chromatic aberration occurs in the same direction in both the lens unit Gf and the lens unit Gr. For this reason, in the state of the lens unit Gf and the lens unit Gr combined, the aberration occurred in the lens unit Gf cannot be cancelled in the lens unit Gr. Therefore, the longitudinal chromatic aberration is required to be corrected only in the lens unit Gr. The longitudinal chromatic aberration is also required to be corrected only in the lens unit Gf.

By making so as to fall below an upper limit value of conditional expression (11) or by making so as to exceed a lower limit value of conditional expression (11), correction of the longitudinal chromatic aberration in the overall optical system becomes easy.

Moreover, it is preferable that the optical system according to the present embodiment has at least two pairs of lenses.

Regarding the shape of lens, symmetry of the optical system improves further. Therefore, it is possible to correct the chromatic aberration of magnification, the distortion, and the coma even more favorably.

Moreover, it is preferable that the optical system according to the present embodiment has at least three pairs of lenses.

Regarding the shape of lens, the symmetry of the optical system improves further. Therefore, it is possible to correct the chromatic aberration of magnification, the distortion, and the coma favorably.

Moreover, in the optical system according to the present embodiment, it is preferable that the following conditional expression (12) is satisfied:

$$-10^\circ<\theta_o<10^\circ \quad (12)$$

where, $\theta_o$ denotes an angle made by a normal of a plane perpendicular to the optical axis with a principal ray on the object side.

By making so as to exceed a lower limit value of conditional expression (12), or by making so as to fall below an upper limit value of conditional expression (12), it is possible to impart telecentricity on the object side, in the optical system. Accordingly, it is possible to suppress the fluctuation in magnification corresponding to a fluctuation in an object (photographic subject) distance. For instance, in a case of carrying out dimensional measurement by using the optical system according to the present embodiment, even when the object (substance to be tested) has concavity and convexity in the optical axial direction, since a magnification for a concave portion and a magnification for a convex portion being same, an accurate measurement is possible.

In the optical system according to the present embodiment, it is preferable that each lens in the pair of lenses disposed at a position nearest from the stop is a positive lens. Moreover, it is preferable that each lens in the pair of lenses disposed at a position second nearest from the stop is a negative lens.

An optical system according to a sixth embodiment will be described below. The optical system according to the sixth embodiment comprises in order from an object side, a lens unit Gf having a positive refractive power, a stop, and a lens unit Gr having a positive refractive power, and the following conditional expressions (4-1), (5), (9-1), and (13) are satisfied:

$$0.0<NA, 0.0<NA' \quad (4\text{-}1)$$

$$-2<\beta<-0.5 \quad (5)$$

$$0<d_1/\Sigma d<0.2 \quad (9\text{-}1)$$

$$-20<\Delta f_{cd}/\epsilon d<20 \quad (13)$$

where,

NA denotes a numerical aperture on the object side of the optical system,

NA' denotes a numerical aperture on an image side of the optical system,

β denotes a projection magnification of the optical system, $d_1$ denotes a distance on an optical axis from a surface positioned nearest to the image side of the lens unit Gf up to a surface positioned nearest to the object side of the lens unit Gr, Σd denotes a sum total of lens thickness on the optical axis of an overall optical system, εd denotes an Airy disc radius for a d-line which is determined by the numerical aperture on the image side of the optical system, and $\Delta f_{cd}$ denotes a difference in a focal position on a C-line and a focal position on the d-line, which is a difference in positions at which light is focused when parallel light is made to be incident on the lens unit Gr from the stop side.

An upper limit of a resolution on the object side is determined by the NA, and an upper limit of a resolving power on the image side is determined by the NA' and a pixel pitch of an image pickup element. By including in order from the object side, the lens unit Gf having a positive refractive power, the stop, and the lens unit Gr having a positive refractive power, as well as conditional expression (4-1) and (5) are satisfied simultaneously, it is possible to make a balance of the resolution on the object side and the resolving power on the image side favorable. Moreover, it is possible to correct various aberrations favorably, and to improve an imaging performance to the maximum limit, as well as to form an optical system of a small size. Particularly, the optical system according to the sixth embodiment is an optical system ideal for an image pickup element with the pixel pitch from about one time to three times of a visual light wavelength.

Moreover, by satisfying conditional expressions (4-1) and (5) simultaneously, even when the light intensity of the illuminating light and the excitation light is small, it is possible to form a bright and sharp image while maintaining the optical system to be small-sized.

For making the numerical aperture on the image side large, it is necessary to make the numerical aperture on the object side large. However, by making so as to exceed a lower limit value of conditional expression (5), the numerical aperture on the object side is not required to be made large. Therefore, small-sizing of the optical system becomes easy. Moreover, by making so as to exceed the lower limit value of conditional expression (5), the magnification of the optical system does not become excessively large. In this case, various aberrations occurred in the lens unit Gf, such as the spherical aberration and the curvature of field, are not enlarged significantly in the lens unit Gr. Therefore, it is preferable from a viewpoint of correcting the aberration favorably to exceed the lower limit value of conditional expression (5).

By making so as to fall below an upper limit value of conditional expression (5), an image that is formed does not become excessively small. Therefore, observation and image pickup of a microstructure of a sample become easy.

Here, it is preferable that the following conditional expression (4-1') is satisfied instead of conditional expression (4-1).

$$0.1<NA<0.9, 0.1<NA'<0.9 \quad (4\text{-}1')$$

Moreover, it is preferable that the abovementioned conditional expression (4') is satisfied instead of conditional expression (4-1).

It is preferable that the abovementioned conditional expression (5') is satisfied instead of conditional expression (5). Moreover, it is more preferable that the abovementioned conditional expression (5") is satisfied instead of conditional expression (5).

By satisfying conditional expressions (9-1) and (13), regarding a lens arrangement in the lens unit Gf and a lens arrangement in the lens unit Gr, it is possible to dispose the lens unit Gf and the lens unit Gr near the stop while imparting symmetry with respect to the stop. When the numerical aperture on the image side of the optical system is made large, the occurrence of the off-axis aberration, particularly the occurrence of the coma becomes noticeable, but by making such an arrangement, it becomes easier to suppress the occurrence of such aberration. Here, $d_1$ is a distance between the two surfaces, and the two surfaces in this case are both lens surfaces.

Here, it is preferable that the following conditional expression (9-1') is satisfied instead of conditional expression (9-1).

$$0<d_1/\Sigma d<0.15 \quad (9\text{-}1')$$

Moreover, it is more preferable that the following conditional expression (9-1") is satisfied instead of conditional expression (9-1).

$$0<d_1/\Sigma d<0.07 \quad (9\text{-}1'')$$

Furthermore, it is even more preferable that the following conditional expression (9-1'") is satisfied instead of conditional expression (9-1).

$$0<d_1/\Sigma d<0.03 \quad (9\text{-}1''')$$

By satisfying conditional expression (13), it is possible to correct the off-axis aberrations such as the chromatic aberration and the coma favorably while maintaining the correction of the longitudinal chromatic aberration to a favorable state. In the optical system according to the sixth embodiment, by satisfying conditional expressions (4-1) and (5), it becomes possible to make the numerical aperture on the image side large with respect to the numerical aperture on the object side, or to make an arrangement such that the numerical aperture on the image side does not become excessively small with respect to the numerical aperture on the object side. Accordingly, it is made possible to form a brighter and sharper image, but at the same time, it is necessary to suppress the occurrence of the longitudinal chromatic aberration of the overall optical system to be small.

The optical system according to the sixth embodiment includes in order from the object side, the lens unit Gf having a positive refractive power, the stop, and the lens unit Gr having a positive refractive power, and is an optical system which satisfies conditional expression (5), or in other words, an optical system with an imaging magnification to be one time or close to one time. In such optical system, by making so as to fall below an upper limit value of conditional expression (13) or by making so as to exceed a lower limit value of conditional expression (13), it is possible to suppress the occurrence of the longitudinal chromatic aberration in the lens unit Gr. By enabling to suppress the occurrence of the longitudinal chromatic aberration in the lens unit Gr, it is possible to make the excessive correction of the longitudinal chromatic aberration in the lens unit Gf unnecessary. Therefore, regarding a lens arrangement in the lens unit Gf and a lens arrangement in the lens unit Gr, it is possible to impart symmetry with respect to the stop. By making the numerical aperture of the optical system large, the occurrence of aberrations such as the coma and the chromatic aberration of magnification becomes noticeable, but since the lens arrangement in the lens unit Gf and the lens arrangement in the lens unit Gr have symmetry with respect to the stop, it becomes possible to correct these aberrations favorably. Here, the symmetry does not refer only to cases of being completely symmetrical, but also includes cases of being nearly symmetrical.

Here, it is preferable that the following conditional expression (13') is satisfied instead of conditional expression (13).

$$-15<\Delta f_{cd}/\epsilon d<15 \quad (13')$$

Moreover, it is more preferable that the following conditional expression (13") is satisfied instead of conditional expression (13).

$$-12<\Delta f_{cd}/\epsilon d<12 \quad (13'')$$

Furthermore, it is even more preferable that the following conditional expression (13'") is satisfied instead of conditional expression (13).

$$-7<\Delta f_{cd}/\epsilon d<7 \quad (13''')$$

An optical system according to a seventh embodiment will be described below. The optical system according to the seventh embodiment comprises in order from an object side, a lens unit Gf having a positive refractive power, a stop, and a lens unit Gr having a positive refractive power, and the following conditional expressions (4-1), (5), (10-1), and (13) are satisfied:

$$0.0<NA, 0.0<NA' \quad (4\text{-}1)$$

$$-2<\beta<-0.5 \quad (5)$$

$$0<d_2/\Sigma d<2 \quad (10\text{-}1)$$

$$-20<\Delta f_{cd}/\epsilon d<20 \quad (13)$$

where,

NA denotes a numerical aperture on the object side of the optical system,

NA' denotes a numerical aperture on an image side of the optical system,

β denotes a projection magnification of the optical system, $d_2$ denotes a distance on an optical axis from a front principal point of the lens unit Gf up to a rear principal point of the lens unit Gr, Σd denotes a sum total of lens thickness on the optical axis of an overall optical system, ϵd denotes an Airy disc radius for a d-line which is determined by the numerical aperture on the image side of the optical system, and $\Delta f_{cd}$ denotes a difference in a focal position on a C-line and a focal position on the d-line, which is a difference in positions at which light is focused when parallel light is made to be incident on the lens unit Gr from the stop side.

A technical significance of conditional expressions (4-1), (5), and (13) is as already been described above.

Moreover, by satisfying conditional expressions (10-1) and (13), regarding a lens arrangement in the lens unit Gf and a lens arrangement in the lens unit Gr, it is possible to position a principal point of the lens unit Gf and a principal point of the lens unit Gr near the stop while imparting symmetry with respect to the stop. When the numerical aperture on the image side of the optical system is made large, the occurrence of the off-axis aberration, particularly the occurrence of the coma becomes noticeable, but by making such an arrangement, it becomes easier to suppress the occurrence of the aberration.

Here, it is preferable that the following conditional expression (10-1') is satisfied instead of conditional expression (10-1).

$$0<d_2/\Sigma d<1.5 \quad (10\text{-}1')$$

Moreover, it is more preferable that the following conditional expression (10-1") is satisfied instead of conditional expression (10-1).

$$0<d_2/\Sigma d<1 \quad (10\text{-}1'')$$

Furthermore, it is even more preferable that the following conditional expression (10-1''') is satisfied instead of conditional expression (10-1).

$$0<d_2/\Sigma d<0.7 \quad (10\text{-}1''')$$

It is all the more preferable to satisfy the following conditional expression (10-1"") instead of conditional expression (10-1)

$$0<d_2/\Sigma d<0.4 \quad (10\text{-}1'''')$$

It is preferable that the optical system according to the sixth embodiment and the optical system according to the seventh embodiment (hereinafter, called appropriately as an 'optical system according to the present embodiment') have an arrangement of an optical system according to the other embodiments, and satisfy conditional expressions. Accordingly, it is possible to provide an optical system with a large numerical aperture on the image side, and in which, various aberrations are corrected favorably. Moreover, a bright and sharp sample image, in which various aberrations are corrected favorably, is formed.

In the optical system according to the present embodiment, it is preferable that the following conditional expressions (7-1) and (8-1) are satisfied:

$$40\%\leq MTF_{OB} \quad (7\text{-}1)$$

$$40\%\leq MTF_{TL} \quad (8\text{-}1)$$

where, $MTF_{OB}$ denotes an MTF on an axis in the lens unit Gf, and is an MTF with respect to a spatial frequency of fc/4, $MTF_{TL}$ denotes an MTF on an axis in the lens unit Gr, and is an MTF with respect to a spatial frequency of fc'/4, where fc denotes a cut-off frequency with respect to the numerical aperture on the object side of the optical system, and fc' denotes a cut-off frequency with respect to the numerical aperture on the image side of the optical system, and both $MTF_{OB}$ and $MTF_{TL}$ are MTFs at positions at which, light is focused when parallel light of an e-line is made to be incident from the stop side, respectively.

By satisfying conditional expressions (7-1) and (8-1), it becomes possible to impart a function equivalent to a function of the objective to the lens unit Gf, and to impart a function equivalent to a function of the tube lens to the lens unit Gr. Accordingly, in an optical arrangement in which, light emerged from the lens unit Gf becomes a substantially parallel light beam, it is possible to correct a longitudinal aberration favorably. Therefore, in the optical system which satisfies conditional expression (5), by further satisfying conditional expressions (7-1) and (8-1), regarding the arrangement of the lens unit Gf and the arrangement of the lens unit Gr, it becomes easy to impart symmetry with respect to the stop. As a result, it is possible to suppress an off-axis distortion, the chromatic aberration of magnification, and the coma favorably.

Furthermore, since a light beam passing through the stop becomes substantially parallel, it becomes possible to insert an optical element such as a phase plate and a polarization plate being necessary for various observation techniques (such as phase-contrast microscopy, polarization microscopy, and differential interference contrast microscopy), near the stop.

Here, it is preferable that the following conditional expression (7-1') is satisfied instead of conditional expression (7-1).

$$50\%\leq MTF_{OB} \quad (7\text{-}1')$$

Moreover, it is preferable that the following conditional expression (8-1') is satisfied instead of conditional expression (8-1).

$$50\%\leq MTF_{TL} \quad (8\text{-}1')$$

In the optical system according to the present embodiment, it is preferable that the following conditional expression (6) is satisfied:

$$0.5<f_{OB}/f_{TL}<2 \quad (6)$$

where, $f_{OB}$ denotes a focal length of the lens unit Gf, and $f_{TL}$ denotes a focal length of the lens unit Gr.

The optical system according to the present embodiment is an optical system which satisfies conditional expression (5), or in other words, is an optical system having a projection magnification which is one time or close to one time. In the optical system having a projection magnification which is one time or close to one time, by satisfying conditional expression (6), regarding an arrangement of the lens unit Gf and an arrangement of the lens unit Gr, it becomes possible to impart symmetry with respect to the stop. When the numerical aperture on the image side of the optical system is made large, the occurrence of off-axis aberrations such as the chromatic aberration of magnification and the coma becomes noticeable. However, since the arrangement of the lens unit Gf and the arrangement of the lens unit Gr have symmetry with respect to the stop, it becomes possible to correct these aberrations favorably.

It is preferable that the aforementioned conditional expression (6') is satisfied instead of conditional expression (6). Moreover, it is more preferable that the aforementioned conditional expression (6") is satisfied instead of conditional expression (6).

In the optical system according to the present embodiment, it is preferable that the following conditional expression (14) is satisfied:

$$0.78<d_{SHOB}/d_{SHTL}<1.3 \quad (14)$$

where, $d_{SHOB}$ denotes a distance on the optical axis from a front principal point of the lens unit Gf up to the stop, and $d_{SHTL}$ denotes a distance on the optical axis from the stop up to a rear principal point of the lens unit Gr.

A technical significance of conditional expression (14) is same as the technical significance of conditional expression (6).

It is preferable that the following conditional expression (14') is satisfied instead of conditional expression (14).

$$0.8<d_{SHOB}/d_{SHTL}<1.2 \quad (14')$$

It is more preferable that the following conditional expression (14") is satisfied instead of conditional expression (14).

$$0.9<d_{SHOB}/d_{SHTL}<1.1 \quad (14'')$$

Moreover, in the optical system according to the present embodiment, it is preferable that a positive lens Lf1 is disposed nearest to the image in the lens unit Gf.

By making such an arrangement, since it becomes possible to position a principal point of the lens unit Gf at the stop side (or near the stop), it becomes advantageous for shortening a conjugate length (distance from the object up to the image). Moreover, when the numerical aperture on the image side of the optical system is made large, the occurrence of the off-axis aberration, particularly the occurrence of the coma becomes noticeable. However, by positioning the principal point of the lens unit Gf near the stop (pupil), it becomes easier to suppress the occurrence of the off-axis aberration.

Moreover, in the optical system according to the present embodiment, it is preferable that a positive lens Lr1 is disposed nearest to the object in the lens unit Gr.

By making such an arrangement, since it becomes possible to position a principal point of the lens unit Gr at the stop side (or near the stop), it becomes advantageous for shortening the conjugate length. Moreover, when the numerical aperture on the image side of the optical system is made large, the occurrence of the off-axis aberration, particularly the occurrence of the coma becomes noticeable. However, by positioning the principal point of the lens unit Gr near the stop (pupil), it becomes easier to suppress the occurrence of the off-axis aberration.

Moreover, in the optical system according to the present embodiment, it is preferable that a negative lens Lf2 is disposed on the object side of the positive lens Lf1 such that, the negative lens Lf2 is adjacent to the positive lens Lf1.

By the negative lens Lf2, it is possible to correct favorably a chromatic aberration occurring in the positive lens Lf1. Besides, since the negative lens Lf2 is disposed to be adjacent to the positive lens Lf1, it is possible to suppress the occurrence of the chromatic aberration of magnification in the lens unit Gf. As a result, it is possible to correct the chromatic aberration of magnification of the overall optical system favorably.

In the optical system according to the present embodiment, it is preferable that a negative lens Lr2 is disposed on the image side of the positive lens Lr1 such that, the negative lens Lr2 is adjacent to the positive lens Lr1.

By the negative lens Lr2, it is possible to correct favorably the chromatic aberration occurring in the positive lens Lr1. Besides, since the negative lens Lr2 is disposed to be adjacent to the positive lens Lr1, it is possible to suppress the occurrence of the chromatic aberration of magnification in the lens unit Gr. As a result, it is possible to correct the chromatic aberration of magnification of the overall optical system favorably.

Moreover, in the optical system according to the present embodiment, it is preferable that an object-side surface of the negative lens Lf2 is concave toward the object side.

By making such an arrangement, since it is possible to make large an angle of incidence of an off-axis light beam incident on the negative lens Lf2, it is possible to shorten the conjugate length of the optical system while maintaining a wide range of observation (an actual field of view).

Moreover, in the optical system according to the present embodiment, it is preferable that an image-side surface of the negative lens Lr2 is concave toward the image side.

By making such an arrangement, since it is possible to make large an angle of emergence of an off-axis light beam emerging from the negative lens Lr2, it is possible to shorten the conjugate length of the optical system while maintaining a wide observation range.

Moreover, in the optical system according to the present embodiment, it is preferable that the lens unit Gf includes a lens Lfe which is disposed nearest to the object, and a shape of at least one lens surface of the lens Lfe is a shape having an inflection point.

By letting the shape of the lens surface near the object side to be a surface shape having the inflection point, and by letting a refractive power at a periphery to differ from a refractive power at a center, it becomes possible to reduce an angle of emergence of the off-axis light beam with respect to the object plane while maintaining a principal plane of the lens unit Gf at an optimum position. Moreover, since a position through which, the off-axis ray passes through a lens surface near the object becomes high, by providing the point of inflection to that surface, and letting the refractive power at the periphery to differ from the refractive power at the center, it is possible to correct favorably the off-axis aberration such as the curvature of field and an astigmatism.

Moreover, in the optical system according to the present embodiment, it is preferable that the lens unit Gr includes a lens Lre which is disposed nearest to the image, and a shape of at least one lens surface of the lens Lre is a shape having an inflection point.

By letting the shape of the lens surface near the image side to be a surface shape having the inflection point, and by letting a refractive power at a periphery to differ from a refractive power at a center, it becomes possible to reduce an angle of incidence of the off-axis light beam with respect to the image plane while maintaining a principal plane of the lens unit Gr at an optimum position. Moreover, since a position through which, the off-axis ray passes through a lens surface near the image becomes high, by providing the point of inflection to that surface, and letting the refractive power at the periphery to differ from the refractive power at the center, it is possible to correct favorably the off-axis aberration such as the curvature of field and the astigmatism.

Moreover, in the optical system according to the present embodiment, it is preferable that the lens Lfe has a negative refractive power.

By making such an arrangement, since it becomes possible to position the principal plane of the lens unit Gf at the stop side, it becomes advantageous for shortening the conjugate length. Moreover, by positioning the principal plane of the lens unit Gf near the stop (pupil), even when the numerical aperture on the image side of the optical system is made large, it is possible to suppress the occurrence of the off-axis aberration, particularly the occurrence of the coma.

Moreover, in the optical system according to the present embodiment, it is preferable that the lens Lre has a negative refractive power.

By making such an arrangement, since it becomes possible to position the principal plane of the lens unit Gr at the stop side, it becomes advantageous for shortening the conjugate length. Moreover, by positioning the principal plane of the lens unit Gr near the stop (pupil), even when the numerical aperture on the image side of the optical system is made large, it is possible to suppress the occurrence of the off-axis aberration, and particularly the occurrence of the coma.

Moreover, in the optical system according to the embodiment, it is preferable that the 1 optical system includes at least one pair of lenses which satisfies the following conditional expressions (1), (2), and (3), and one lens in the pair of lenses is included in the lens unit Gf, and the other lens in the pair of lenses is included in the lens unit Gr:

$$-1.1<r_{OBf}/r_{TLr}<-0.9 \quad (1)$$

$$-1.1<r_{OBr}/r_{TLf}<-0.9 \quad (2)$$

$$-0.1<(d_{OB}-d_{TL})/(d_{OB}+d_{TL})<0.1 \quad (3)$$

where, $r_{OBf}$ denotes a paraxial radius of curvature of an object-side surface of the one lens in the pair of lenses, $r_{OBr}$ denotes a paraxial radius of curvature of an image-side surface of the one lens in the pair of lenses, $r_{TLf}$ denotes a paraxial radius of curvature of an object-side surface of the other lens in the pair of lenses, $r_{TLr}$ denotes a paraxial radius of curvature of an image-side surface of the other lens in the pair of lenses, $d_{OB}$ denotes a thickness on the optical axis of the one lens in the pair of lenses, and $d_{TL}$ denotes a thickness on the optical axis of the other lens in the pair of lenses.

The technical significance of conditional expressions (1), (2), and (3) is as aforementioned.

Moreover, it is preferable that the optical system according to the present embodiment has at least two pairs of lenses.

Regarding the shape of lens, symmetry of the optical system improves further. Therefore, it is possible to correct the chromatic aberration of magnification, the distortion, and the coma even more favorably.

Moreover, it is preferable that the optical system according to the present embodiment has at least three pairs of lenses.

Regarding the shape of lens, the symmetry of the optical system improves further. Therefore, it is possible to correct the chromatic aberration of magnification, the distortion, and the coma favorably.

Moreover, in the optical system according to the present embodiment, it is preferable that the following conditional expression (12-1) is satisfied:

$$-10°<\theta_o<30° \quad (12\text{-}1)$$

where, $\theta_o$ denotes an angle made by a normal of a plane perpendicular to the optical axis with a principal ray on the object side.

By making so as to exceed a lower limit value of conditional expression (12-1), or making so as to fall below an upper limit value of conditional expression (12-1), it is possible to impart telecentricity on the object side, in the optical system. Accordingly, it is possible to suppress the fluctuation in magnification corresponding to a fluctuation in the object (photographic subject) distance. For instance, in a case of carrying out dimensional measurement by using the optical system of the present embodiment, even when the object (substance to be tested) has concavity and convexity in the optical axial direction, since it is possible to make a difference in a magnification for a concave portion and a magnification for a convex portion small, an accurate measurement is possible.

Moreover, in a case of seeking even higher telecentricity in the optical system, in the optical system according to the present embodiment, it is preferable that the following conditional expression (12-1') is satisfied.

$$-5°<\theta_o<5° \quad (12\text{-}1')$$

Moreover, in a case of seeking further small-sizing (shortening overall length of the optical system, and making a diameter fine) in the optical system, in the zoom lens of the present embodiment, it is preferable that the following conditional expression (12-1") is satisfied.

$$15°<\theta_o<30° \quad (12\text{-}1'')$$

A focal length of a tube lens used in a conventional microscope is approximately 10 times of a focal length of a microscope objective. Therefore, the numerical aperture (NA') on the image side becomes small to about 0.08. However, in the aforementioned embodiments from the first embodiment to the seventh embodiment, it is possible to realize an optical system in which, the numerical aperture on the image side is large, and various aberrations are corrected favorably.

Moreover, an optical instrument (such as a microscope) of the present embodiment includes the aforementioned optical system, and an image pickup element.

According to the optical instrument of the present embodiment, it is possible to realize an optical instrument in which, the numerical aperture on the image side is large, and various aberrations are corrected favorably. Moreover, a bright and sharp sample image in which, various aberrations have been corrected, is formed.

An optical system according to an eighth embodiment, an optical system according to a ninth embodiment, and an optical system according to a tenth embodiment (hereinafter, appropriately called as an ‘optical system according to the present embodiment’) will be described below. Moreover, a marginal ray is a light rays emerged from an object point on the optical axis, and passing through a peripheral portion of an entrance pupil of the optical system. Here, in the following description, in a case in which, the marginal ray has emerged from an object point on the optical axis, the marginal ray will be let to be an axial marginal ray, and in a case in which, the marginal ray has emerged from an off-axis object point, the marginal ray will be let to be an off-axis marginal ray. Moreover, the optical system according to the present embodiment is an optical system presupposing that an object is at a finite distance from the optical system (finite correction optical system).

Moreover, in an image pickup apparatus using the optical system according to the present embodiment, it is possible to let an image photographed to be subjected to digital zooming, and make a magnified display thereof. Therefore, the optical systems of these embodiments have a high resolution as various aberrations are corrected favorably, and are capable of forming an image over a wide observation range. In the optical systems of these embodiments, since a longitudinal chromatic aberration and an off-axis chromatic aberration in particular, has been corrected favorably, by combining with an image pickup element having a small pixel pitch, a magnified image with a high resolution is achieved even in a case in which, the image captured is magnified by digital zooming.

The optical system according to the eighth embodiment is an optical system which forms an optical image on an image pickup element including a plurality of pixels arranged in rows two-dimensionally, which converts a light intensity to an electric signal, and a plurality of color filters disposed on the plurality of pixels respectively, and comprises in order from an object side, a first lens unit having a positive refractive power, which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the first lens unit includes a negative lens, and a positive lens which is disposed on the object side of the negative lens, and the following conditional expressions (15), (16), (19), and (20) are satisfied:

$$\beta \leq -1.1 \quad (15)$$

$$0.08 < NA \quad (16)$$

$$1.0 < WD/BF \quad (19)$$

$$0.5 < 2\times(WD\times\tan(\sin^{-1} NA)+Y_{obj})/\phi_s < 4.0 \quad (20)$$

where,

β denotes an imaging magnification of the optical system,

NA denotes a numerical aperture on the object side of the optical system,

WD denotes a distance on an optical axis from the object up to an object-side surface of the first object-side lens, BF denotes a distance on the optical axis from an image-side surface of the second image-side lens up to the image, $Y_{obj}$ denotes a maximum object height, and $\phi_s$ denotes a diameter of the stop.

The optical system according to the ninth embodiment is an optical system which forms an optical image on an image pickup element including a plurality of pixels arranged in rows two-dimensionally, which converts a light intensity to an electric signal, and a plurality of color filters disposed on the plurality of pixels respectively, and comprises in order from an object side, a first lens unit which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the following conditional expressions (16), (21), (23-1), and (24-1) are satisfied:

$$0.0 < NA \quad (16)$$

$$0.01 < D_{max}/\phi_s < 3.0 \quad (21)$$

$$0.6 \leq L_L/D_{oi} \quad (23\text{-}1)$$

$$0.015 < 1/\nu d_{min} - 1/\nu d_{max} \quad (24\text{-}1)$$

where,

NA denotes a numerical aperture on the object side of the optical system, $D_{max}$ denotes a maximum distance from among distances on an optical axis of adjacent lenses in the optical system, $\phi_s$ denotes a diameter of the stop, $L_L$ denotes a distance on the optical axis from an object-side surface of the first object-side lens up to an image-side surface of the second image-side lens, $D_{oi}$ denotes a distance on the optical axis from the object to the image, $\nu d_{min}$ denotes a smallest Abbe's number from among Abbe's numbers for lenses forming the optical system, and $\nu d_{max}$ denotes a largest Abbe's number from among the Abbe's numbers for lenses forming the optical system.

The optical system according to the tenth embodiment is an optical system which forms an optical image on an image pickup element including a plurality of pixels arranged in rows two-dimensionally, which converts a light intensity to an electric signal, and a plurality of color filters disposed on the plurality of pixels respectively, and for which, a pitch of pixels is not more than 5.0 μm, and comprises in order from an object side, a first lens unit which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the following conditional expressions (16), (18), and (25) are satisfied:

$$0.08 < NA \quad (16)$$

$$-30 < (\Delta D_{G2dC} + (\Delta D_{G1dC} \times \beta_{G2C}{}^2/(1+\beta_{G2C} \times \Delta D_{G1dC}/f_{G2C})))/\Sigma_d < 30 \quad (18)$$

$$0.15 < D_{os}/D_{oi} < 0.8 \quad (25)$$

where,

NA denotes a numerical aperture on the object side of the optical system, $\Delta D_{G1dC}$ denotes a distance from a position of an image point $P_{G1}$ on a d-line up to a position of an image point on a C-line, at an image point of the first lens unit with respect to an object point on an optical axis, $\Delta D_{G2dC}$ denotes a distance from a position of an image point on the d-line up to a position of an image point on the C-line, at an image point of the second lens unit, when the image point $P_{G1}$ is let to be an object point of the second lens unit, where $\Delta D_{G1dC}$ and $\Delta D_{G2dC}$ are let to be positive in a case in which, the position of the image point on the C-line is on the image side of the position of the image point on the d-line, $\Delta D_{G1dC}$ and $\Delta D_{G2dC}$ are let to be negative in a case in which, the position of the image point on the C-line is on the object side of the position of the image point on the d-line, $\beta_{G2C}$ denotes an imaging magnification for the C-line of the second lens unit when the image point $P_{G1}$ is let to be the object point of the second lens unit, $f_{G2C}$ denotes a focal length for the C-line of the second lens unit, $\epsilon_d$ denotes an Airy disc radius for the d-line, which is determined by the numerical aperture on the image side of the optical system, $D_{os}$ denotes a distance on the optical axis from the object up to the stop, and $D_{oi}$ denotes a distance on the optical axis from the object up to the image, and the object point and the image point are points on the optical axis, and also include cases of being a virtual object point and a virtual image point.

Each of the optical system according to the eighth embodiment, the optical system according to the ninth embodiment, and the optical system according to the tenth embodiment is an optical system that forms an optical image on the image pickup element. Here, the image pickup element includes a plurality of pixels arranged in rows two-dimensionally, which converts a light intensity to an electric signal, and a plurality of color filters disposed on the plurality of pixels respectively.

In the optical system according to the eighth embodiment, it is preferable that the following conditional expression (15) is satisfied:

$$\beta \leq -1.1 \tag{15}$$

where,

β denotes an imaging magnification of the optical system.

When the numerical aperture on the object side of the optical system is enlarged (the numerical aperture is made large), and a working distance is made long to a certain extent, since a height of an axial marginal ray incident on the optical system (lens positioned nearest to the object) becomes high, the axial aberration is susceptible to occur. Therefore, by satisfying conditional expression (15), since it is possible to suppress the height of the axial marginal ray and the off-axis marginal ray incident on the optical system, it is possible to suppress further the occurrence of the axial aberration and the off-axis aberration.

Moreover, in the optical system according to the ninth embodiment, it is preferable that the following conditional expression (15-1) is satisfied:

$$\beta \leq -1.0 \tag{15-1}$$

where,

β denotes an imaging magnification of the optical system.

By satisfying conditional expression (15-1), the optical system becomes a magnifying optical system. Accordingly, it is possible to realize more detailed observation.

Moreover, in the optical system according to the tenth embodiment, it is preferable that the following conditional expression (15-2) is satisfied:

$$-1.1 \leq \beta \leq -0.9 \tag{15-2}$$

where,

β denotes an imaging magnification of the optical system.

Moreover, in the optical system according to the present embodiment, it is preferable that the following conditional expression (16) is satisfied:

$$0.08 < NA \tag{16}$$

where,

NA denotes a numerical aperture on the object side of the optical system.

By satisfying conditional expression (16), it is possible to realize an optical system and an image pickup apparatus having a high resolution.

Moreover, it is preferable that the optical system according to the present embodiment is an optical system which is used in a microscope.

It is preferable that the optical system according to the present embodiment includes in order from an object side, a first lens unit which includes a plurality of lenses, a stop, and a second lens unit which includes a plurality of lenses, and that the lens units which form the optical system include the first lens unit and the second lens unit. It is preferable that the stop is an aperture stop. It is possible that the lens units which form the optical system consist of the first lens unit and the second lens unit.

Moreover, in the optical system according to the present embodiment, it is preferable that the first lens unit includes a first object-side lens which is disposed nearest to an object. Moreover, it is preferable that the first lens unit includes a first image-side lens which his disposed nearest to the image. It is preferable that the second lens unit includes a second object-side lens which is disposed nearest to the object. Moreover, it is preferable that the second lens unit includes a second image-side lens which is disposed nearest to the image.

In the optical system according to the present embodiment, it is preferable that the following conditional expression (17) is satisfied:

$$L_{TL}/2Y < 15 \tag{17}$$

where, $L_{TL}$ denotes a distance on an optical axis from an object-side surface of the first object-side lens up to an image, and Y denotes a maximum image height in an overall optical system.

By satisfying conditional expression (17), it is possible to make the optical system and the overall image pickup apparatus small.

Moreover, in the optical system according to the present embodiment, it is preferable that the lens units which form the optical system includes the first lens unit and the second lens unit, and the pitch of pixels is not more than 5.0 μm, and the following conditional expression (18) is satisfied:

$$-30 < (\Delta D_{G2dC} + (\Delta D_{G1dC} \times \beta_{G2C}^{2} / (1 + \beta_{G2C} \times \Delta D_{G1dC} / f_{G2C}))) / \epsilon_d < 30 \tag{18}$$

where, $\Delta D_{G1dC}$ denotes a distance from a position of an image point $P_{G1}$ on a d-line up to a position of an image point on a C-line, at an image point of the first lens unit with respect to an object point on an optical axis, $\Delta D_{G2dC}$ denotes a distance from a position of an image point on the d-line up to a position of an image point on the C-line, at an image point of the second lens unit, when the image point $P_{G1}$ is let to be an object point of the second lens unit, where $\Delta D_{G1dC}$ and $\Delta D_{G2dC}$ are let to be positive in a case in which, the position of the image point on the C-line is on the image side of the position of the image point on the d-line, $\Delta D_{G1dC}$ and $\Delta D_{G2dC}$ are let to be negative in a case in which, the position of the image point on the C-line is on the object side of the position of the image point on the d-line, $\beta_{G2C}$ denotes an imaging magnification for the C-line of the second lens unit when the image point $P_{G1}$ is let to be the object point of the second lens unit, $f_{G2C}$ denotes a focal length for the C-line of the second lens unit, and $\epsilon_d$ denotes an Airy disc radius for the d-line which is determined by the numerical aperture on the image side of the optical system, and the object point and the image point are points on the optical axis, and also include cases of being a virtual object point and a virtual image point.

Conditional expression (18) is a conditional expression related to a balance between a correction function of the longitudinal chromatic aberration of the first lens unit and a correction function of the longitudinal chromatic aberration of the second lens unit, and is a conditional expression related to a difference in an image position on the d-line and an image position on the C-line. By the first lens unit and the second lens unit satisfying conditional expression (18), it is possible to correct the longitudinal chromatic aberration of the overall optical system favorably. Moreover, by the longitudinal chromatic aberration being corrected favorably, it is possible to improve the resolution of the optical system. As a result, it is possible to observe a microscopic structure of a sample with a high resolution, even in color.

Particularly, in the optical system which satisfies conditional expressions (15-2) and (16), or in other words, in the optical system with a large numerical aperture on the image side, for achieving high resolution, it is necessary that the longitudinal chromatic aberration has been corrected more favorably, and by satisfying conditional expression (18), the abovementioned effect is achieved.

At the time of calculating $\epsilon_d$, the optical system is assumed to be an ideal optical system. When the optical system is assumed to be an ideal optical system, the shape of the Airy disc becomes circular. Since a size of the radius of the Airy disc is determined by the numerical aperture on the image side, it is possible to calculate the radius of the Airy disc uniquely.

Moreover, it is preferable to let the pitch of the pixels to be not less than 0.5 μm.

Here, it is preferable that the following conditional expression (18') is satisfied instead of conditional expression (18).

$$-21<(\Delta D_{G2dC}+(\Delta D_{G1dC}\times\beta_{G2C}^{2}/(1+\beta_{G2C}\times\Delta D_{G1dC}/f_{G2C})))/\epsilon_d<21 \quad (18')$$

Moreover, it is more preferable that the following conditional expression (18") is satisfied instead of conditional expression (18).

$$-15<(\Delta D_{G2dC}+(\Delta D_{G1dC}\times\beta_{G2C}^{2}/(1+\beta_{G2C}\times\Delta D_{G1dC}/f_{G2C})))/\epsilon_d<15 \quad (18'')$$

Furthermore, it is even more preferable that the following conditional expression (18''') is satisfied instead of conditional expression (18).

$$-9<(\Delta D_{G2dC}+(\Delta D_{G1dC}\times\beta_{G2C}^{2}/(1+\beta_{G2C}\times\Delta D_{G1dC}/f_{G2C})))/\epsilon_d<9 \quad (18''')$$

In the optical system according to the eighth embodiment and the optical system according to the tenth embodiment, it is preferable that the first lens unit has a positive refractive power, and the following conditional expression (19) is satisfied:

$$1.0<WD/BF \quad (19)$$

where,

WD denotes a distance on an optical axis from the object up to an object-side surface of the first object-side lens, and BF denotes a distance on the optical axis from an image-side surface of the second image-side lens up to an image.

It is preferable to dispose the lens unit having a positive refractive power on the object side of the stop. Accordingly, it is possible to position the principal point on the object side. Therefore, it is possible to shorten the overall length of the optical system while maintaining the state in which, the longitudinal chromatic aberration has been corrected favorably.

In conditional expression (19), WD is the distance on the optical axis from the object up to the object-side surface of the first object-side lens, but will be called as a working distance in the present specification. Moreover, BF is the distance on the optical axis from the image-side surface of the second image-side lens up to the image, but will be called as a back focus in the present specification. Accordingly, conditional expression (19) can be said to be a conditional expression which regulates an appropriate ratio of the working distance and the back focus.

By making so as not to fall below a lower limit value of conditional expression (19), it is possible to prevent the back focus from becoming excessively long. When such an arrangement is made, since it is possible to make a distance from the stop up to the image short, it is possible to make a height of a principal ray higher on the image side than at the stop. As a result, since it is possible to carry out an aberration correction in a state in which, the height of the principal ray has become high in the second lens unit, it is possible to correct favorably the chromatic aberration of magnification in particular.

Here, it is preferable that the following conditional expression (19') is satisfied instead of conditional expression (19).

$$1.2<WD/BF<50.0 \quad (19')$$

Moreover, it is more preferable that the following conditional expression (19") is satisfied instead of conditional expression (19).

$$1.4<WD/BF<35.0 \quad (19'')$$

Furthermore, it is even more preferable that the following conditional expression (19''') is satisfied instead of conditional expression (19).

$$2.0<WD/BF<17.5 \quad (19''')$$

In the optical system according to the eighth embodiment, it is preferable that the first lens unit includes a negative lens, and a positive lens which is disposed on the object side of the negative lens, and that the following conditional expression (20) is satisfied:

$$0.5<2\times(WD\times\tan(\sin^{-1}\mathrm{NA})+Y_{obj})/\phi_s<4.0 \quad (20)$$

where,

WD denotes a distance on an optical axis from the object up to the object-side surface of the first object-side lens, NA denotes a numerical aperture on the object side of the optical system, $Y_{obj}$ denotes a maximum object height, and $\phi_s$ denotes a diameter of the stop.

By disposing the positive lens and the negative lens in the first lens unit, it is possible to correct the longitudinal chromatic aberration favorably. At this time, by disposing the positive lens on the object side of the negative lens, it is possible to correct the longitudinal chromatic aberration more favorably.

By satisfying conditional expression (20), it is possible to correct the chromatic aberration more favorably. The stop being the aperture stop, it is possible to let the stop to be a stop that determines the NA.

By making so as not to fall below a lower limit value of conditional expression (20), it is possible to suppress a predetermined refraction effect in the first lens unit from becoming excessively small. Therefore, since it is possible to position a principal point sufficiently on the object side, it is possible to shorten the overall length of the optical system. The predetermined refraction is an effect of making a light ray refract in order to bring closer to the optical axis. Larger the predetermined refraction effect, the light ray is refracted in a direction of coming closer to the optical axis. For instance, larger the predetermined refraction effect, convergence becomes stronger in the convergence effect, and divergence becomes weaker in the divergence effect.

By making so as not to exceed an upper limit value of conditional expression (20) is not exceeded, it is possible to prevent the predetermined refraction effect in the first lens unit from becoming excessively large. Accordingly, it is possible to correct the longitudinal chromatic aberration due to the axial marginal ray and the off-axis chromatic aberration at the maximum image height favorably and in a balanced manner. Even in a range of satisfying conditional expression (16), it is possible to correct the longitudinal chromatic aberration and the off-axis chromatic aberration favorably and in a balanced manner.

By satisfying conditional expressions (16), (19), and (20), it is possible to realize enlargement of the numerical aperture on the object side, shortening of the overall length of the optical system, and favorable correction of the chromatic aberration, while securing appropriately a thickness of optical components forming the optical system.

Here, it is preferable that the following conditional expression (20') is satisfied instead of conditional expression (20).

$$0.63<2\times(WD\times\tan(\sin^{-1}\mathrm{NA})+Y_{obj})/\phi_s<3.70 \quad (20')$$

Moreover, it is more preferable that the following conditional expression (20") is satisfied instead of conditional expression (20).

$$0.78<2\times(WD\times\tan(\sin^{-1}\mathrm{NA})+Y_{obj})/\phi_s<3.50 \quad (20")$$

Furthermore, it is even more preferable that the following conditional expression (20"') is satisfied instead of conditional expression (20).

$$0.98<2\times(WD\times\tan(\sin^{-1}\mathrm{NA})+Y_{obj})/\phi_s<3.15 \quad (20"')$$

In the optical system according to the tenth embodiment, it is preferable that the first lens unit includes a negative lens, and a positive lens which is disposed on the object side of the negative lens, and the following conditional expression (20-1) is satisfied:

$$1.0<2\times(WD\times\tan(\sin^{-1}\mathrm{NA})+Y_{obj})/\phi_s<5.0 \quad (20\text{-}1)$$

where,

WD denotes a distance on the optical axis from the object up to the object-side surface of the first object-side lens, NA denotes a numerical aperture on the object side of the optical system, $Y_{obj}$ denotes a maximum object height, and $\phi_s$ denotes a diameter of the stop.

By satisfying conditional expression (20-1), it is possible to realize simultaneously, enlargement of the numerical aperture on the object side, shortening of the overall length of the optical system, and favorable correction of the chromatic aberration, while securing appropriately a thickness of optical components forming the optical system.

A technical significance of conditional expression (20-1) is same as the technical significance of conditional expression (20).

BY satisfying conditional expressions (16) and (20-1), and conditional expression (25) that will be described later, it is possible to correct the chromatic aberration more favorably while securing the required lens thickness, and while carrying out enlargement of the numerical aperture on the object side and shortening of the overall length of the optical system.

Here, it is preferable that the following conditional expression (20-1') is satisfied instead of conditional expression (20-1).

$$1.33<2\times(WD\times\tan(\sin^{-1}\mathrm{NA})+Y_{obj})/\phi_s<4.75 \quad (20\text{-}1')$$

Moreover, it is more preferable that the following conditional expression (20-1") is satisfied instead of conditional expression (20-1).

$$1.78<2\times(WD\times\tan(\sin^{-1}\mathrm{NA})+Y_{obj})/\phi_s<4.51 \quad (20\text{-}1")$$

Furthermore, it is even more preferable that the following conditional expression (20-1"') is satisfied instead of conditional expression (20-1).

$$2.37<2\times(WD\times\tan(\sin^{-1}\mathrm{NA})+Y_{obj})/\phi_s<4.29 \quad (20\text{-}1"')$$

In the optical system according to the present embodiment, it is preferable that the following conditional expression (21) is satisfied:

$$0.01<D_{max}/\phi_s<3.0 \quad (21)$$

where, $D_{max}$ denotes a maximum distance from among distances on the optical axis of adjacent lenses in the optical system, and $\phi_s$ denotes a diameter of the stop.

By satisfying conditional expression (21), it is possible to correct a chromatic coma more favorably.

By making so as not to fall below a lower limit value of conditional expression (21), it is possible to reduce deterioration of aberration due to a manufacturing error. For instance, decentering of a lens at the time of lens assembling is an example of the manufacturing error.

By making so as not to exceed an upper limit value of conditional expression (21), even in a case in which, the numerical aperture on the object side is large, it is possible to suppress the height of the off-axis marginal ray with respect to the height of the axial marginal ray from changing substantially between the lenses. For instance, let two adjacent lenses be a lens $L_A$ and a lens $L_B$. The height of the off-axis marginal ray for the lens $L_A$ and the height of the off-axis marginal ray for the lens $L_B$ differ. However, by making a distance between the lens $L_A$ and the lens $L_B$ appropriate, it is possible to reduce the difference between the height of the off-axis marginal ray for the lens $L_A$ and the height of the off-axis marginal ray for the lens $L_B$. As a result, since it is possible to reduce a difference between the chromatic aberration for an off-axis light beam incident on the lens $L_A$ and the chromatic aberration for an off-axis light beam incident on the lens $L_B$, it is possible to suppress an occurrence of the chromatic coma.

By satisfying conditional expressions (20) and (21), it is possible to correct the chromatic coma more favorably while carrying out enlargement of the numerical aperture on the object side and shortening of the overall length of the optical system, and while securing appropriately the thickness of the optical components forming the optical system.

Moreover, by satisfying conditional expression (21), and conditional expressions (23-1) and (24-1) which will be described later, it is possible to correct the chromatic coma favorably while securing appropriately the thickness of the optical components forming the optical system, and besides, it is possible to achieve both, enlargement of the numerical aperture on the object side and shortening of the overall length of the optical system.

By satisfying conditional expressions (18) and (21), it is possible to correct the chromatic coma more favorably while carrying out enlargement of the numerical aperture on the object side and shortening of the overall length of the optical system, and while securing appropriately the thickness of the optical components forming the optical system.

Here, it is preferable that the following conditional expression (21') is satisfied instead of conditional expression (21).

$$0.01<D_{max}/\phi_s<2.85 \quad (21')$$

Moreover, it is more preferable that the following conditional expression (21") is satisfied instead of conditional expression (21).

$$0.02<D_{max}/\phi_s<2.50 \quad (21")$$

Furthermore, it is even more preferable that the following conditional expression (21''') is satisfied instead of conditional expression (21).

$$0.03 \le D_{max}/\phi_s < 2.0 \quad (21''')$$

In the optical system according to the present embodiment, it is preferable that the following conditional expression (22) is satisfied:

$$0.01 \le D_{G1max}/\phi_s < 2.0 \quad (22)$$

where, $D_{G1max}$ denotes a maximum distance from among distances on the optical axis of the adjacent lenses in the first lens unit, and $\phi_s$ denotes a diameter of the stop.

By satisfying conditional expression (22), it is possible to correct a chromatic coma more favorably.

By making so as not to fall below a lower limit value of conditional expression (22), it is possible to reduce deterioration of aberration due to a manufacturing error. For instance, decentering of a lens at the time of lens assembling is an example of the manufacturing error.

By making so as not to exceed an upper limit value of conditional expression (22), even in a case in which, the numerical aperture on the object side is large, it is possible to suppress the height of the off-axis marginal ray with respect to the height of the axial marginal ray from changing substantially between the lenses. For instance, let two adjacent lenses be a lens $L_A$ and a lens $L_B$. The height of the off-axis marginal ray for the lens $L_A$ and the height of the off-axis marginal ray for the lens $L_B$ differ. However, by making a distance between the lens $L_A$ and the lens $L_B$ appropriate, it is possible to reduce the difference between the height of the off-axis marginal ray for the lens $L_A$ and the height of the off-axis marginal ray for the lens $L_B$. As a result, since it is possible to reduce a difference between the chromatic aberration for an off-axis light beam incident on the lens $L_A$ and the chromatic aberration for an off-axis light beam incident on the lens $L_B$, it is possible to suppress an occurrence of the chromatic coma.

By satisfying conditional expressions (20) and (22), it is possible to correct the chromatic coma more favorably while carrying out enlargement of the numerical aperture on the object side and shortening of the overall length of the optical system, and while securing appropriately the thickness of the optical components forming the optical system.

Moreover, by satisfying conditional expression (22), and conditional expressions (23-1) and (24-1) which will be described later, it is possible to correct the chromatic coma favorably while securing appropriately the thickness of the optical components forming the optical system, and besides, it is possible to achieve both, enlargement of the numerical aperture on the object side and shortening of the overall length of the optical system.

By satisfying conditional expressions (18) and (22), it is possible to correct the chromatic coma more favorably while carrying out enlargement of the numerical aperture on the object side and shortening of the overall length of the optical system, and while securing appropriately the thickness of the optical components forming the optical system.

Here, it is preferable that the following conditional expression (22') is satisfied instead of conditional expression (22).

$$0.01 \le D_{G1max}/\phi_s < 1.80 \quad (22')$$

Moreover, it is more preferable that the following conditional expression (22'') is satisfied instead of conditional expression (22).

$$0.02 \le D_{G1max}/\phi_s < 1.62 \quad (22'')$$

Furthermore, it is even more preferable that the following conditional expression (22''') is satisfied instead of conditional expression (22).

$$0.03 \le D_{G1max}/\phi_s < 1.46 \quad (22''')$$

In the optical system according to the eighth embodiment and the optical system according to the tenth embodiment, it is preferable that the following conditional expression (23) is satisfied:

$$0.4 < L_L/D_{oi} \quad (23)$$

where, $L_L$ denotes a distance on the optical axis from the object-side surface of the first object-side lens up to the image-side surface of the second image-side lens, and $D_{oi}$ denotes a distance on the optical axis from the object up to the image.

By making so as not to fall below a lower limit value of conditional expression (23), even in an optical system having the overall length shortened, since it becomes possible to change the height of the principal ray emerged from a periphery of the object and reaching a periphery of the image comparatively gradually, it is possible to prevent a radius of curvature (paraxial radius of curvature) of a lens in the optical system from becoming excessively small. As a result, it is possible to suppress the occurrence of the longitudinal chromatic aberration and the chromatic aberration of magnification.

Moreover, by satisfying conditional expressions (20) and (23), even in an optical system having the overall length shortened as well as the numerical aperture on the object side enlarged, it is possible to correct the longitudinal chromatic aberration and the chromatic aberration of magnification more favorably.

By satisfying conditional expression (23), and conditional expression (25) that will be described later, even in an optical system having the overall length shortened as well as the numerical aperture on the object side enlarged, it is possible to correct the longitudinal chromatic aberration and the chromatic aberration of magnification more favorably.

It is preferable that the following conditional expression (23') is satisfied instead of conditional expression (23).

$$0.42 < L_L/D_{oi} < 0.99 \quad (23')$$

Moreover, it is more preferable that the following conditional expression (23'') is satisfied instead of conditional expression (23).

$$0.44 < L_L/D_{oi} < 0.98 \quad (23'')$$

Furthermore, it is even more preferable that the following conditional expression (23''') is satisfied instead of conditional expression (23).

$$0.47 < L_L/D_{oi} < 0.97 \quad (23''')$$

In the optical system according to the ninth embodiment, it is preferable that the following conditional expression (23-1) is satisfied:

$$0.6 \le L_L/D_{oi} \quad (23\text{-}1)$$

$L_L$ denotes a distance on the optical axis from an object-side surface of the first object-side lens up to an image-side surface of the second image-side lens, and $D_{oi}$ denotes a distance on the optical axis from the object to an image.

A technical significance of conditional expression (23-1) is same as the technical significance of conditional expression (23).

By satisfying conditional expression (23-1), and conditional expression (24-1) that will be described later, it is possible to achieve both, the favorable correction of the chromatic aberration (longitudinal chromatic aberration and chromatic aberration of magnification) in particular, and shortening of the overall length of the optical system.

Here, it is preferable that the following conditional expression (23-1') is satisfied instead of conditional expression (23-1).

$$0.63<L_L/D_{oi}<0.99 \quad (23\text{-}1')$$

Moreover, it is more preferable that the following conditional expression (23-1") is satisfied instead of conditional expression (23-1).

$$0.66<L_L/D_{oi}<0.98 \quad (23\text{-}1'')$$

Furthermore, it is even more preferable that the following conditional expression (23-1"') is satisfied instead of conditional expression (23-1).

$$0.70<L_L/D_{oi}<0.97 \quad (23\text{-}1''')$$

In the optical system according to the eighth embodiment and the optical system according to the tenth embodiment, it is preferable that the following conditional expression (24) is satisfied:

$$0.01<1/\nu d_{min}-1/\nu d_{max} \quad (24)$$

where, $\nu d_{min}$ denotes a smallest Abbe's number from among Abbe's numbers for lenses forming the optical system, and $\nu d_{max}$ denotes a largest Abbe's number from among Abbe's numbers for lenses forming the optical system.

By making so as not to fall below a lower limit value of conditional expression (24), it is possible to correct the longitudinal chromatic aberration and the chromatic aberration of magnification favorably. In a case in which, the optical system includes a diffractive optical element, a lens which forms the diffractive optical element is to be excluded from the 'lenses forming the optical system' in conditional expression (24).

By satisfying conditional expressions (20) and (24), even in an optical system having the overall length shortened as well as the numerical aperture on the object side enlarged, it is possible to correct the longitudinal chromatic aberration and the chromatic aberration of magnification more favorably.

By satisfying conditional expression (24), and conditional expression (25) that will be described later, even in the optical system having the overall length shortened as well as the numerical aperture on the object side enlarged, it is possible to correct the longitudinal chromatic aberration and the chromatic aberration of magnification more favorably.

Here, it is preferable that the following conditional expression (24') is satisfied instead of conditional expression (24).

$$0.012<1/\nu d_{min}-1/\nu d_{max}<0.050 \quad (24')$$

Moreover, it is more preferable that the following conditional expression (24") is satisfied instead of conditional expression (24).

$$0.014<1/\nu d_{min}-1/\nu d_{max}<0.040 \quad (24'')$$

Furthermore, it is even more preferable that the following conditional expression (24"') is satisfied instead of conditional expression (24).

$$0.016<1/\nu d_{min}-1/\nu d_{max}<0.035 \quad (24''')$$

In the optical system according to the ninth embodiment, it is preferable that the following conditional expression (24-1) is satisfied:

$$0.015<1/\nu d_{min}-1/\nu d_{max} \quad (24\text{-}1)$$

where, $\nu d_{min}$ denotes a smallest Abbe's number from among Abbe's numbers for lenses forming the optical system, and $\nu d_{max}$ denotes a largest Abbe's number from among the Abbe's numbers for lenses forming the optical system.

A technical significance of conditional expression (24-1) is same as the technical significance of conditional expression (24).

By satisfying conditional expressions (15-1), (16), and (24-1), it is possible to correct the longitudinal chromatic aberration and the chromatic aberration of magnification favorably. As a result, it is possible to observe a microscopic structure of a sample with a high resolution, even in color.

Here, it is preferable that the following conditional expression (24-1') is satisfied instead of conditional expression (24-1).

$$0.017<1/\nu d_{min}-1/\nu d_{max}<0.050 \quad (24\text{-}1')$$

Moreover, it is more preferable that the following conditional expression (24-1") is satisfied instead of conditional expression (24-1).

$$0.019<1/\nu d_{min}-1/\nu d_{max}<0.040 \quad (24\text{-}1'')$$

Furthermore, it is even more preferable that the following conditional expression (24-1"') is satisfied instead of conditional expression (24-1).

$$0.021<1/\nu d_{min}-1/\nu d_{max}<0.035 \quad (24\text{-}1''')$$

In the optical system according to the eighth embodiment and the optical system according to the tenth embodiment, it is preferable that the following conditional expression (25) is satisfied:

$$0.15<D_{os}/D_{oi}<0.8 \quad (25)$$

where, $D_{os}$ denotes a distance on the optical axis from the object up to the stop, and $D_{oi}$ denotes a distance on the optical axis from the object up to the image.

By making so as not to fall below a lower limit value of conditional expression (25), it is possible to maintain appropriately the positive refractive power of the first lens unit while securing an appropriate thickness in lenses forming the first lens unit. As a result, it is possible to correct the chromatic aberration favorably while correcting a monochromatic aberration such as the curvature of field in the first lens unit. Moreover, as it is possible to correct the longitudinal chromatic aberration in the first lens unit favorably, an excessive correction of the longitudinal chromatic aberration in the second lens unit becomes unnecessary. Accordingly, since the chromatic aberration of magnification in the second lens unit can be corrected favorably, it is possible to correct the chromatic aberration of magnification in the overall optical system favorably.

By making so as not to exceed an upper limit value of conditional expression (25), since it becomes possible to change the height of the principal ray emerged from the stop and reaching a periphery of the image comparatively gradually, it is possible to prevent a radius of curvature of a lens in the second lens unit from becoming excessively small. Therefore, it is possible to correct also the chromatic aberration favorably while correcting the monochromatic aberration such as the curvature of field in the second lens unit.

By satisfying conditional expressions (16), (19), (20), and (25), it is possible to correct the chromatic aberration more favorably while suppressing an occurrence of the monochromatic aberration such as the curvature of field, and while carrying out enlargement of the numerical aperture on the object side and shortening of the overall length of the optical system.

By satisfying conditional expressions (18) and (25), it is possible to realize simultaneously, enlargement of the numerical aperture on the object side, shortening of the overall length of the optical system, and favorable correction of the chromatic aberration, while suppressing the occurrence of the monochromatic aberration such as the curvature of field.

Here, it is preferable to that following conditional expression (25') is satisfied instead of conditional expression (25).

$$0.19<D_{os}/D_{oi}<0.76 \quad (25')$$

Moreover, it is more preferable that the following conditional expression (25") is satisfied instead of conditional expression (25).

$$0.21<D_{os}/D_{oi}<0.72 \quad (25'')$$

Furthermore, it is even more preferable that the following conditional expression (25"') is satisfied instead of conditional expression (25).

$$0.35<D_{os}/D_{oi}<0.69 \quad (25''')$$

In the optical system according to the ninth embodiment, it is preferable that the following conditional expression (25-1) is satisfied:

$$0.15<D_{os}/D_{oi}<0.65 \quad (25\text{-}1)$$

where, $D_{os}$ denotes a distance on an optical axis from the object up to the stop, and $D_{oi}$ denotes a distance on the optical axis from the object up to an image.

A technical significance of conditional expression (25-1) is same as the technical significance of conditional expression (25).

By satisfying conditional expressions (23-1), (24-1), and (25-1), it is possible to correct the longitudinal chromatic aberration and the chromatic aberration of magnification more favorably while carrying out enlargement of the numerical aperture on the object side and shortening of the overall length of the optical system.

Here, it is preferable that the following conditional expression (25-1') is satisfied instead of conditional expression (25-1).

$$0.17<D_{os}/D_{oi}<0.62 \quad (25\text{-}1')$$

Moreover, it is more preferable that the following conditional expression (25-1") is satisfied instead of conditional expression (25-1).

$$0.21<D_{os}/D_{oi}<0.59 \quad (25\text{-}1'')$$

Furthermore, it is even more preferable that the following conditional expression (25-1"') is satisfied instead of conditional expression (25-1).

$$0.35<D_{os}/D_{oi}<0.56 \quad (25\text{-}1''')$$

In the optical system according to the present embodiment, it is preferable that the following conditional expression (26) is satisfied:

$$0.95<\phi_{G1o}/(2\times Y/|\beta|) \quad (26)$$

where, $\phi_{G1o}$ denotes an effective diameter of the object-side surface of the first object-side lens, Y denotes a maximum image height in an overall optical system, and β denotes an imaging magnification of the optical system.

By making so as not to fall below a lower limit value of conditional expression (26), it is possible to make small a difference in angles of incidence when the off-axis marginal ray is incident on the lens, or in other words, to make small a difference in an angle of incidence of an upper-side light ray and an angle of incidence of a lower-side light ray. Accordingly, it is possible to correct the coma and the chromatic coma favorably. Moreover, in an optical system having the numerical aperture on the object side enlarged, it is possible to correct the coma and the chromatic coma favorably.

Here, it is preferable that the following conditional expression (26') is satisfied instead of conditional expression (26).

$$1.00<\phi_{G1o}/(2\times Y/|\beta|)<10.00 \quad (26')$$

Moreover, it is more preferable that the following conditional expression (26") is satisfied instead of conditional expression (26).

$$1.05<\phi_{G1o}/(2\times Y/|\beta|)<7.00 \quad (26'')$$

Furthermore, it is even more preferable that the following conditional expression (26"') is satisfied instead of conditional expression (26).

$$1.11<\phi_{G1o}/(2\times Y/|\beta|)<5.00 \quad (26''')$$

In the optical system according to the present embodiment, it is preferable that the following conditional expression (27) is satisfied:

$$0<BF/L_L<0.4 \quad (27)$$

where,

BF denotes a distance on an optical axis from the image-side surface of the second image-side lens up to the image, and $L_L$ denotes a distance on the optical axis from the object-side surface of the first object-side lens up to the image-side surface of the second image-side lens.

By making so as not to fall below a lower limit value of conditional expression (27), it is possible to increase a distance between the second image-side lens and the image pickup element. Accordingly, even when a ghost is generated due to multiple reflection between the second image-side lens and the image pickup element, it is possible to prevent the ghost from being incident on a surface of the image pickup element with a high density.

By making so as not to exceed an upper limit value of conditional expression (27), it is possible to prevent occupancy of a space of the back focus with respect to the overall length of the optical system from becoming excessively large. Accordingly, since there is an increase in a degree of freedom of positions at the time of disposing the lenses, it is possible to correct various aberrations favorably. For instance, by disposing a lens having a function of correcting chromatic aberration in the first lens unit and the second lens unit, and adjusting a positional relationship of these lenses, it is possible to achieve both, the favorable correction of the longitudinal chromatic aberration and the favorable correction of the chromatic aberration of magnification.

By satisfying conditional expressions (16), (19), (20), and (27), it is possible to correct the longitudinal chromatic aberration and the chromatic aberration of magnification more favorably while carrying out enlargement of the numerical aperture on the object side and shortening of the overall length of the optical system.

By satisfying conditional expressions (23-1), (24-1), and (27), it is possible to correct the longitudinal chromatic aberration and the chromatic aberration of magnification more favorably while carrying out enlargement of the numerical aperture on the object side and shortening of the overall length of the optical system.

By satisfying conditional expressions (18) and (27), it is possible to correct the longitudinal chromatic aberration and the chromatic aberration of magnification more favorably while carrying out enlargement of the numerical aperture on the object side and shortening of the overall length of the optical system.

Here, it is preferable that the following conditional expression (27') is satisfied instead of conditional expression (27).

$$0.01<BF/L_L<0.36 \quad (27')$$

Moreover, it is more preferable that the following conditional expression (27") is satisfied instead of conditional expression (27).

$$0.02<BF/L_L<0.32 \quad (27'')$$

Furthermore, it is even more preferable that the following conditional expression (27"') is satisfied instead of conditional expression (27).

$$0.03<BF/L_L<0.28 \quad (27''')$$

In the optical system according to the present embodiment, it is preferable that the following conditional expression (28) is satisfied:

$$0<BF/Y<7.0 \quad (28)$$

where,

BF denotes a distance on an optical axis from the image-side surface of the second image-side lens up to the image, and Y denotes a maximum image height in an overall optical system.

By satisfying conditional expression (28), it is possible to correct an aberration more favorably, particularly an aberration in a peripheral portion of an image, while shortening the overall length of the optical system.

By making so as not to fall below a lower limit value of conditional expression (28), it is possible to increase a distance between the second image-side lens and the image pickup element. Accordingly, even when a ghost is generated due to multiple reflection between the second image-side lens and the image pickup element, it is possible to prevent the ghost from being incident on the surface of the image pickup element with a high density.

By making so as not to exceed an upper limit value of conditional expression (28), it is possible to prevent the occupancy of a space of the back focus with respect to the overall length of the optical system from becoming excessively large. Accordingly, since there is an increase in the degree of freedom of positions at the time of disposing the lenses, it is possible to correct various aberrations favorably. For instance, by disposing the lens having the function of correcting chromatic aberration in the first lens unit and the second lens unit, and adjusting a positional relationship of these lenses, it is possible to achieve both, the favorable correction of the longitudinal chromatic aberration and the favorable correction of the chromatic aberration of magnification.

Here, it is preferable that the following conditional expression (28') is satisfied instead of conditional expression (28).

$$0.05<BF/Y<6.30 \quad (28')$$

Moreover, it is more preferable that the following conditional expression (28") is satisfied instead of conditional expression (28).

$$0.10<BF/Y<5.67 \quad (28'')$$

Furthermore, it is even more preferable that the following conditional expression (28"') is satisfied instead of conditional expression (28).

$$0.15<BF/Y<5.10 \quad (28''')$$

In the optical system according to the eighth embodiment and the optical system according to the tenth embodiment, it is preferable that the following conditional expression (29) is satisfied:

$$-0.2<\phi_{G1o}/R_{G1o}<3.0 \quad (29)$$

where, $\phi_{G1o}$ denotes an effective diameter of the object-side surface of the first object-side lens, and $R_{G1o}$ denotes a radius of curvature of the object-side surface of the first object-side lens.

In an optical system in which, the numerical aperture on the object side has been enlarged and the working distance made long, a diameter of a light beam incident on the first object-side lens is spread sufficiently. By making so as not to fall below a lower limit value of conditional expression (29), even in such optical system, it is possible to suppress the light beam that is incident, from being diverged. As a result, in a lens disposed on the image side of the first object-side lens, it is possible to suppress an occurrence of various aberrations such as the spherical aberration and the coma aberration.

By making so as not to exceed an upper limit value of conditional expression (29), since it is possible to prevent difference in angles of incidence when the off-axis marginal ray is incident on the lens, or in other words, to prevent the difference in an angle of incidence of an upper-side light ray and an angle of incidence of a lower-side light ray from becoming excessively large, it is possible to suppress the occurrence of the coma.

Particularly, in a case in which, the working distance has been secured sufficiently, in the optical system with the large numerical aperture on the object side, it is possible to correct various aberrations such as the coma more favorably while shortening the overall length of the optical system.

Here, it is preferable that the following conditional expression (29') is satisfied instead of conditional expression (29).

$$-0.15<\phi_{G1o}/R_{G1o}<2.10 \quad (29')$$

Moreover, it is more preferable that the following conditional expression (29") is satisfied instead of conditional expression (29).

$$-0.10<\phi_{G1o}/R_{G1o}<1.47 \quad (29'')$$

Furthermore, it is even more preferable that the following conditional expression (29"') is satisfied instead of conditional expression (29).

$$-0.05<\phi_{G1o}/R_{G1o}<1.03 \quad (29''')$$

In the optical system according to the present embodiment, it is preferable that the second lens unit includes four lenses, and at least one of the four lenses in the second lens unit is a negative lens, and at least one of the four lenses in the second lens unit is a positive lens, and an object-side surface of the positive lens from among the positive lenses, which is positioned nearest to the object side, is a convex surface that is convex toward the object side.

By making such an arrangement, it is possible to correct various aberrations, particularly the chromatic aberration of magnification more favorably, while shortening the overall length of the optical system. In other words, it is possible to make an adjustment to position the principal point of the second lens unit on the object side, and to dispose a plurality of lenses having different optical characteristics. Therefore, it is possible to correct the chromatic aberration and other various aberrations in the second lens unit favorably while shortening a conjugate length (a distance from the object up to the image). As a result, it is possible to correct favorably various aberrations including the chromatic aberration of magnification in the overall optical system while shortening the overall length of the optical system.

In the optical system according to the present embodiment, it is preferable that the first lens unit includes a first image-side lens which is disposed nearest to the image side, and a distance of two lenses positioned on two sides of the stop is fixed, and the following conditional expression (30) is satisfied:

$$D_{G1G2}/\phi_s<2.0 \quad (30)$$

where, $D_{G1G2}$ denotes a distance on the optical axis from the image-side surface of the first image-side lens up to the object-side surface of the second object-side lens, and $\phi_s$ denotes a diameter of the stop.

By satisfying conditional expression (30), it is possible to maintain appropriately a balance between a predetermined refraction effect in the first lens unit and a predetermined refraction effect in the second lens unit, while shortening the overall length of the optical system. As a result, it is possible to correct the chromatic aberration of magnification and other off-axis aberrations more favorably. The predetermined refraction effect is same as the predetermined refraction effect described in conditional expression (20).

By making so as not to exceed an upper limit value of conditional expression (30), it is possible to make the optical system thin while preventing an angle of incidence of an off-axis light beam incident on the second lens unit from becoming excessively small. Therefore, it is possible to suppress the predetermined refraction effect in the first lens unit from becoming excessively large, and moreover not to let the predetermined refraction effect in the second lens unit become excessively small, while maintaining the required imaging magnification. Accordingly, since it is possible to maintain appropriately the balance between the predetermined refraction effect in the first lens unit and the predetermined refraction effect in the second lens unit, it is possible to correct the chromatic aberration of magnification and other off-axis aberrations more favorably.

Here, it is preferable that the following conditional expression (30') is satisfied instead of conditional expression (30).

$$0.01<D_{G1G2}/\phi_s<1.80 \quad (30')$$

Moreover, it is more preferable that the following conditional expression (30") is satisfied instead of conditional expression (30).

$$0.03<D_{G1G2}/\phi_s<1.53 \quad (30'')$$

Furthermore, it is even more preferable that the following conditional expression (30"') is satisfied instead of conditional expression (30).

$$0.05<D_{G1G2}/\phi_s<1.30 \quad (30''')$$

In the optical system according to the eighth embodiment and the optical system according to the ninth embodiment, it is preferable that the following conditional expression (31) is satisfied:

$$0.1<L_{G1}/L_{G2}<1.5 \quad (31)$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to the image side surface of the second image-side lens.

By making so as not to fall below a lower limit value of conditional expression (31), it is possible to maintain appropriately the positive refractive power of the first lens unit while securing the appropriate thickness of lenses forming the first lens unit. Therefore, it is possible to position the principal point on the object side and to shorten the overall length of the optical system while correcting the longitudinal chromatic aberration favorably.

By making so as not to exceed an upper limit value of conditional expression (31), in a case of securing the appropriate working distance, since it is possible to change the height of a principal ray emerged from the stop and reaching the periphery of the image in the second lens unit comparatively gradually, it is possible to prevent a radius of curvature of a lens in the second lens unit from becoming excessively small. Therefore, it is possible to correct the chromatic aberration of magnification more favorably.

By satisfying conditional expressions (16), (19), (20), and (31), it is possible to correct the longitudinal chromatic aberration and the chromatic aberration of magnification more favorably while securing sufficient working distance, and while carrying out enlargement of the numerical aperture on the object side and shortening of the overall length of the optical system.

By satisfying conditional expressions (23-1), (24-1), and (31), it is possible to correct the longitudinal chromatic aberration and the chromatic aberration of magnification more favorably while carrying out enlargement of the numerical aperture on the object side and shortening of the overall length of the optical system.

Here, it is preferable that the following conditional expression (31') is satisfied instead of conditional expression (31).

$$0.14<L_{G1}/L_{G2}<1.43 \quad (31')$$

Moreover, it is more preferable that the following conditional expression (31") is satisfied instead of conditional expression (31).

$$0.20<L_{G1}/L_{G2}<1.35 \quad (31'')$$

Furthermore, it is even more favorable that the following conditional expression (31"') is satisfied instead of conditional expression (31).

$$0.29<L_{G1}/L_{G2}<1.29 \quad (31''')$$

In the optical system according to the tenth embodiment, it is preferable that the following conditional expression (31-1) is satisfied:

$$0.1<L_{G1}/L_{G2}<1.4 \quad (31\text{-}1)$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to the image side surface of the second image-side lens.

A technical significance of conditional expression (31-1) is same as the technical significance of conditional expression (31).

By satisfying conditional expressions (18) and (31-1), it is possible to correct the longitudinal chromatic aberration and the chromatic aberration of magnification more favorably while securing the appropriate working distance, and while carrying out enlargement of the numerical aperture on the object side and shortening of the overall length of the optical system.

Here, it is preferable that the following conditional expression (31-1') is satisfied instead of conditional expression (31-1).

$$0.14<L_{G1}/L_{G2}<1.33 \quad (31\text{-}1')$$

Moreover, it is more preferable that the following conditional expression (31-1") is satisfied instead of conditional expression (31-1).

$$0.20<L_{G1}/L_{G2}<1.26 \quad (31\text{-}1'')$$

Furthermore, it is even more preferable that the following conditional expression (31-1"') is satisfied instead of conditional expression (31-1).

$$0.29<L_{G1}/L_{G2}<1.20 \quad (31\text{-}1''')$$

In the optical system according to the present embodiment, it is preferable that the following conditional expression (32) is satisfied:

$$0.1<L_{G1s}/L_{sG2}<1.5 \quad (32)$$

where, $L_{G1s}$ denotes a distance on the optical axis from the object-side surface of the first object-side lens up to the stop, and $L_{sG2}$ denotes a distance on the optical axis from the stop up to the image side surface of the second image-side lens.

By satisfying conditional expression (32), it is possible to correct more favorably an aberration in a peripheral portion of the image, particularly the chromatic aberration of magnification while shortening the overall length of the optical system.

By making so as not to fall below a lower limit value of conditional expression (32), it is possible to secure sufficiently a space for disposing the first lens unit. Accordingly, it is possible to secure an appropriate thickness in lenses forming the first lens unit, and to increase a degree of freedom of selection of curvature of a lens surface, and to dispose a large number of lenses having different optical characteristics. Therefore, it is possible to correct also the chromatic aberration favorably while correcting the monochromatic aberration in the first lens unit. Moreover, as it is possible to correct the longitudinal chromatic aberration in the first lens unit favorably, an excessive correction of the longitudinal chromatic aberration in the second lens unit becomes unnecessary. Accordingly, since the chromatic aberration of magnification in the second lens unit can be corrected favorably, it is possible to correct the chromatic aberration of magnification in the overall optical system favorably.

By making so as not to exceed an upper limit value of conditional expression (32), it is possible to secure sufficiently a space for disposing the second lens unit. Accordingly, it is possible to secure an appropriate thickness in lenses forming the second lens unit, and to increase a degree of freedom of selection of curvature of a lens surface, and to dispose a large number of lenses having different optical characteristics. Therefore, it is possible to correct also the chromatic aberration favorably while correcting the monochromatic aberration in the second lens unit. Moreover, as it is possible to correct the longitudinal chromatic aberration in the second lens unit favorably, an excessive correction of the longitudinal chromatic aberration in the first lens unit becomes unnecessary. Accordingly, since the chromatic aberration of magnification in the first lens unit can be corrected favorably, it is possible to correct the chromatic aberration of magnification in the overall optical system favorably.

Here, it is preferable that the following conditional expression (32') is satisfied instead of conditional expression (32).

$$0.14<L_{G1s}/L_{sG2}<1.35 \quad (32')$$

Moreover, it is more preferable that the following conditional expression (32") is satisfied instead of conditional expression (32).

$$0.20<L_{G1s}/L_{sG2}<1.22 \quad (32'')$$

Furthermore, it is even more preferable that the following conditional expression (32"') is satisfied instead of conditional expression (32).

$$0.29<L_{G1s}/L_{sG2}<1.09 \quad (32''')$$

In the optical system according to the present embodiment, it is preferable that the following conditional expression (33) is satisfied:

$$0.8\leq\phi_{G1max}/\phi_{G2max}<5.0 \quad (33)$$

where, $\phi_{G1max}$ denotes a maximum effective diameter from among effective diameter of lenses in the first lens unit, and $\phi_{G2max}$ denotes a maximum effective diameter from among effective diameter of lenses in the second lens unit.

By satisfying conditional expression (33), it is possible to maintain appropriately the balance between a predetermined refraction effect in the first lens unit and a predetermined refraction effect in the second lens unit while shortening the overall length of the optical system. As a result, it is possible to correct the chromatic aberration of magnification and other off-axis aberrations more favorably.

By making so as not to fall below a low limit value of conditional expression (33), it is possible to make the optical system thin while preventing a diameter of a lens forming the first lens unit from becoming excessively small. Therefore, in a region on the object side of the first lens unit, it is possible to prevent a light ray height of an off-axis light beam from becoming excessively low. Accordingly, since it is possible to secure appropriately a space in an optical axial direction of the first lens unit, it is possible to correct the chromatic aberration of magnification favorably.

By making so as not to exceed an upper limit value of conditional expression (33), it is possible to make the optical system thin while preventing a diameter of a lens forming the second lens unit from becoming excessively small. In this case, since it is not necessary anymore to make an angle of incidence of an off-axis light beam that is incident on the second lens unit excessively small, it is possible to suppress the predetermined refraction effect in the first lens unit from becoming excessively large, and moreover not to let the predetermined refraction effect in the second lens unit become excessively small while maintaining the required imaging magnification. In such manner, since it is possible to maintain appropriately the balance between the predetermined refraction effect in the first lens unit and the predetermined refraction effect in the second lens unit, it is possible to correct the chromatic aberration of magnification and other off-axis aberrations more favorably.

Here, it is preferable that the following conditional expression (33') is satisfied instead of conditional expression (33).

$$0.84 \le \phi_{G1max}/\phi_{G2max} < 4.50 \tag{33'}$$

Moreover, it is more preferable that the following conditional expression (33") is satisfied instead of conditional expression (33).

$$0.88 \le \phi_{G1max}/\phi_{G2max} < 3.50 \tag{33"}$$

Furthermore, it is even more preferable that the following conditional expression (33"') is satisfied instead of conditional expression (33).

$$0.93 \le \phi_{G1max}/\phi_{G2max} < 2.50 \tag{33"'}$$

In the optical system according to the present embodiment, it is preferable that the following conditional expression (34) is satisfied:

$$0.5 < D_{os}/L_{G1} < 4.0 \tag{34}$$

where, $D_{os}$ denotes a distance on an optical axis from the object up to the stop, and $L_{G1}$ denotes a distance on the optical axis from the object-side surface of the first object-side lens up to the image-side surface of the first image-side lens.

By making so as not to fall below a lower limit value of conditional expression (34), it is possible to secure sufficiently a space for disposing the second lens unit. Accordingly, it is possible to secure an appropriate thickness in lenses forming the second lens unit, and to increase a degree of freedom of selection of curvature of a lens surface, and to dispose a large number of lenses having different optical characteristics. Therefore, it is possible to correct also the chromatic aberration favorably while correcting the monochromatic aberration in the second lens unit. Moreover, as it is possible to correct the longitudinal chromatic aberration in the second lens unit favorably, an excessive correction of the longitudinal chromatic aberration in the first lens unit becomes unnecessary. Accordingly, since the chromatic aberration of magnification in the first lens unit can be corrected favorably, it is possible to correct the chromatic aberration of magnification in the overall optical system favorably.

By making so as not to exceed an upper limit value of conditional expression (34), it is possible to secure sufficiently a space for disposing the first lens unit. Accordingly, it is possible to secure an appropriate thickness in lenses forming the first lens unit, and to increase a degree of freedom of selection of curvature of a lens surface, and to dispose a large number of lenses having different optical characteristics. Therefore, it is possible to correct also the chromatic aberration favorably while correcting the monochromatic aberration in the first lens unit. Moreover, as it is possible to correct the longitudinal chromatic aberration in the first lens unit favorably, an excessive correction of the longitudinal chromatic aberration in the second lens unit becomes unnecessary. Accordingly, since the chromatic aberration of magnification in the second lens unit can be corrected favorably, it is possible to correct the chromatic aberration of magnification in the overall optical system favorably.

By satisfying conditional expressions (16), (19), (20), and (34), it is possible to correct the chromatic aberration of magnification more favorably while carrying out enlargement of the numerical aperture on the object side and shortening of the overall length of the optical system.

By satisfying conditional expressions (23-1), (24-1), and (34), it is possible to correct the longitudinal chromatic aberration and the chromatic aberration of magnification more favorably while carrying out enlargement of the numerical aperture on the object side and shortening of the overall length of the optical system.

By satisfying conditional expressions (18) and (34), it is possible to correct the chromatic aberration of magnification more favorably while carrying out enlargement of the numerical aperture on the object side and shortening of the overall length of the optical system.

Here, it is preferable that the following conditional expression (34') is satisfied instead of conditional expression (34).

$$0.7 < D_{os}/L_{G1} < 3.8 \tag{34'}$$

Moreover, it is more preferable that the following conditional expression (34") is satisfied instead of conditional expression (34).

$$1.0 < D_{os}/L_{G1} < 3.6 \tag{34"}$$

Furthermore, it is even more preferable that the following conditional expression (34"') is satisfied instead of conditional expression (34).

$$1.5 < D_{os}/L_{G1} < 3.4 \tag{34"'}$$

In the optical system according to the present embodiment, it is preferable that the following conditional expressions (35) and (36) are satisfied:

$$1.0 < D_{ENP}/Y \tag{35}$$

$$0 \le CRA_{obj}/CRA_{img} < 0.5 \tag{36}$$

where, $D_{ENP}$ denotes a distance on the optical axis from a position of an entrance pupil of the optical system up to the object-side surface of the first object-side lens, Y denotes a maximum image height in an overall optical system, $CRA_{obj}$ denotes a maximum angle from among angles made by a principal ray that is incident on the first object-side lens, with the optical axis, and $CRA_{img}$ denotes a maximum angle from among angles made by a principal ray that is incident on an image plane, with the optical axis, and an angle measured in a direction of clockwise rotation is let to be a negative angle, and an angle measured in a direction of counterclockwise rotation is let to be a positive angle.

By making so as not to fall below a lower limit value of conditional expression (36), since an angle of incidence of an off-axis light beam on an image pickup surface does not become excessively large, it is possible to prevent degradation of an amount of light at periphery more efficiently.

By making so as not to exceed an upper limit value of conditional expression (36), a divergence effect is imparted to a region near an image side of the optical system, and it is possible to make an arrangement of the optical system to be of a telephoto type. As a result, it is possible to shorten the overall length of the optical system.

Satisfying conditional expressions (16), (19), (20), (35), and (36) is advantageous for favorable correction of the chromatic aberration and for shortening the overall length of the optical system while securing the amount of light at periphery.

Satisfying conditional expressions (23-1), (24-1), (35), and (36) is advantageous for favorable correction of the chromatic aberration, and for shortening the overall length of the optical system while securing the amount of light at periphery.

Satisfying conditional expressions (18), (35), and (36) is advantageous for favorable correction of the chromatic aberration, and for shortening the overall length of the optical system while securing the amount of light at periphery.

Here, it is preferable that the following conditional expression (36') is satisfied instead of conditional expression (36).

$$0.01 \le CRA_{obj}/CRA_{img} < 0.48 \quad (36')$$

Moreover, it is more preferable that the following conditional expression (36") is satisfied instead of conditional expression (36).

$$0.02 \le CRA_{obj}/CRA_{img} < 0.46 \quad (36'')$$

Furthermore, it is even more preferable that the following conditional expression (36"') is satisfied instead of conditional expression (36).

$$0.03 \le CRA_{obj}/CRA_{img} < 0.44 \quad (36''')$$

In the optical system according to the present embodiment, it is preferable that the first lens unit includes the first object-side lens, and a lens which disposed to be adjacent to the first object-side lens, and at least one of the first object-side lens and the lens disposed to be adjacent to the first object-side lens has a positive refractive power.

By one of the first object-side lens and the lens disposed to be adjacent to the first object-side lens, on the image side of the first object-side lens, having a positive refractive power, it is possible to position the principal point of the first lens unit on the object side. As a result, it is possible to secure the working distance sufficiently. The first object-side lens and the lens disposed to be adjacent to the first object-side lens, on the image side of the first object-side lens may be in separated state or may be in cemented state.

In the optical system according to the eighth embodiment and the optical system according to the tenth embodiment, it is preferable that the first object-side lens has a positive refractive power. Moreover, it is preferable that the following conditional expression (37) is satisfied:

$$0.05 < f_{G1o}/f \quad (37)$$

where, $f_{G1o}$ denotes a focal length of the first object-side lens, and f denotes a focal length of an overall optical system.

In the optical system which satisfies conditional expression (20), by imparting the positive refractive power to the first object-side lens, a height of the off-axis marginal ray can be suppressed while positioning the principal point of the first lens unit on the object side. Therefore, it is possible to achieve both, enlargement of the numerical aperture on the object side and shortening of the overall length of the optical system. Furthermore, by satisfying conditional expression (37), it is possible to suppress the occurrence of the spherical aberration and the coma more effectively.

In the optical system which satisfies conditional expression (25), by imparting the positive refractive power to the first object-side lens, the height of the off-axis marginal ray can be suppressed while positioning the principal point of the first lens unit on the object side. Therefore, it is possible to achieve both, enlargement of the numerical aperture on the object side and shortening of the overall length of the optical system. Furthermore, by satisfying conditional expression (37), it is possible to suppress the occurrence of the spherical aberration and the coma more effectively.

Here, it is preferable that the following conditional expression (37') is satisfied instead of conditional expression (37).

$$0.06 < f_{G1o}/f < 50.00 \quad (37')$$

Moreover, it is more preferable that the following conditional expression (37") is satisfied instead of conditional expression (37).

$$0.07 < f_{G1o}/f < 25.00 \quad (37'')$$

Furthermore, it is even more preferable that the following conditional expression (37"') is satisfied instead of conditional expression (37).

$$0.10 < f_{G1o}/f < 20.00 \quad (37''')$$

In the optical system according to the ninth embodiment, it is preferable that the first object-side lens has a negative refractive power. Moreover, it is preferable that the following conditional expression (37-1) is satisfied:

$$f_{G1o}/f < -0.01 \quad (37\text{-}1)$$

where, $f_{G1o}$ denotes a focal length of the first object-side lens, and f denotes a focal length of an overall optical system.

In the optical system which satisfies conditional expressions (23-1) and (24-1), by imparting the negative refractive power to the first object-side lens, it is possible to secure sufficiently a space for disposing the first lens unit, as well as to maintain appropriately a height of the off-axis marginal ray in a region on the object side of the first lens unit. Furthermore, by satisfying conditional expression (37-1), it is possible to suppress the off-axis marginal ray from being diverged excessively. Accordingly, it is possible to correct aberrations such as the chromatic aberration of magnification favorably.

Here, it is preferable that the following conditional expression (37-1') is satisfied instead of conditional expression (37-1).

$$-500.00 < f_{G1o}/f < -0.02 \quad (37\text{-}1')$$

Moreover, it is more preferable that the following conditional expression (37-1") is satisfied instead of conditional expression (37-1).

$$-250.00 < f_{G1o}/f < -0.04 \quad (37\text{-}1'')$$

Furthermore, it is even more preferable that the following conditional expression (37-1"') is satisfied instead of conditional expression (37-1).

$$-100.00 < f_{G1o}/f < -0.08 \quad (37\text{-}1''')$$

In the optical system according to the eighth embodiment and the optical system according to the tenth embodiment, it is preferable that the object-side surface of the first object-side lens is convex toward the object side. Moreover, it is preferable that the following conditional expression (38) is satisfied:

$$0.02 < R_{G1o}/WD \quad (38)$$

where, $R_{G1o}$ denotes a radius of curvature of the object-side surface of the first object-side lens, and WD denotes a distance on an optical axis from the object up to an object-side side surface of the first object-side lens.

In the optical system which satisfies the conditional expression (20), by imparting the positive refractive power to the object-side surface of the first object-side lens, a height of the off-axis marginal ray can be suppressed while positioning the principal point of the first lens unit on the object side. Therefore, it is possible to achieve both, enlargement of the numerical aperture on the object side and shortening of the overall length of the optical system. Furthermore, by satisfying conditional expression (38), it is possible to suppress the occurrence of the spherical aberration and the coma more effectively.

In the optical system which satisfies the conditional expression (25), by imparting the positive refractive power to the object-side surface of the first object-side lens, the height of the off-axis marginal ray can be suppressed while positioning the principal point of the first lens unit on the object side. Therefore, it is possible to achieve both, enlargement of the numerical aperture on the object side and shortening of the overall length of the optical system. Furthermore, by satisfying conditional expression (38), it is possible to suppress the occurrence of the spherical aberration and the coma more effectively.

Here, it is preferable that the following conditional expression (38') is satisfied instead of conditional expression (38).

$$0.02<R_{G1o}/WD<20.00 \quad (38')$$

Moreover, it is more preferable that the following conditional expression (38") is satisfied instead of conditional expression (38).

$$0.03<R_{G1o}/WD<15.00 \quad (38'')$$

Furthermore, it is even more preferable that the following conditional expression (38"') is satisfied instead of conditional expression (38).

$$0.04<R_{G1o}/WD<10.00 \quad (38')$$

In the optical system according to the ninth embodiment, it is preferable that the object-side surface of the first object-side lens is concave toward the object side. Moreover, it is preferable that the following conditional expression (38-1) is satisfied:

$$R_{G1o}/WD<-0.1 \quad (38\text{-}1)$$

where, $R_{G1o}$ denotes the radius of curvature of the object-side surface of the first object-side lens, and WD denotes a distance on an optical axis from the object up to an object-side side surface of the first object-side lens.

In the optical system which satisfies conditional expressions (23-1) and (24-1), by imparting the negative refractive power to the object-side surface of the first object-side lens, it is possible to secure sufficiently a space for disposing the first lens unit, as well as to maintain appropriately the height of the off-axis marginal ray in a region on the object side of the first lens unit. Furthermore, by satisfying conditional expression (38-1), it is possible to suppress divergence of the off-axis marginal ray. Accordingly, it is possible to correct aberrations such as the chromatic aberration of magnification favorably.

Here, it is preferable that the following conditional expression (38-1') is satisfied instead of conditional expression (38-1).

$$-250.00<R_{G1o}/WD<-0.14 \quad (38\text{-}1')$$

Moreover, it is more preferable that the following conditional expression (38-1") is satisfied instead of conditional expression (38-1).

$$-100.00<R_{G1o}/WD<-0.20 \quad (38\text{-}1'')$$

Furthermore, it is even more preferable that the following conditional expression (38-1"') is satisfied instead of conditional expression (38-1).

$$-50.00<R_{G1o}/WD<-0.29 \quad (38\text{-}1''')$$

In the optical system according to the present embodiment, it is preferable that the second lens unit includes a predetermined lens unit nearest to the image, and the predetermined lens unit has a negative refractive power as a whole, and consists a single lens having a negative refractive power or two single lenses, and the two single lenses consist in order from the object side, a lens having a negative refractive power, and a lens having one of a positive refractive power and a negative refractive power.

In the optical system which satisfies conditional expression (20), by further disposing the predetermined lens unit, or in other words, a lens unit having a negative refractive power, at a position nearest to the image side of the second lens unit, it is possible to position the principal point on the object side. Accordingly, since it becomes possible to change the height of the principal ray emerged from the stop and reaching the periphery of the image in the second lens unit comparatively gradually while shortening the overall length of the optical system, it is possible to correct favorably the chromatic aberration of magnification in particular.

In the optical system which satisfies conditional expressions (21), (23-1), and (24-1), by further disposing the predetermined lens unit, or in other words, a lens unit having a negative refractive power, at a position nearest to the image side of the second lens unit, it is possible to position the principal point on the object side. Accordingly, since it becomes possible to change the height of the principal ray emerged from the stop and reaching the periphery of the image in the second lens unit comparatively gradually while shortening the overall length of the optical system, it is possible to correct favorably the chromatic aberration of magnification in particular.

In the optical system which satisfies conditional expressions (18) and (25), by further disposing the predetermined lens unit, or in other words, a lens unit having a negative refractive power, at a position nearest to the image side of the second lens unit, it is possible to position the principal point on the object side. Accordingly, since it becomes possible to change the height of the principal ray emerged from the stop and reaching the periphery of the image in the second lens unit comparatively gradually while shortening the overall length of the optical system, it is possible to correct favorably the chromatic aberration of magnification in particular.

In the optical system according to the present embodiment, it is preferable that an image-side surface of the second image-side lens is concave toward the image side, and that the following conditional expression (39) is satisfied:

$$0.1 \le R_{G2i}/BF \quad (39)$$

where, $R_{G2i}$ denotes a radius of curvature of the image-side surface of the second image-side lens, and BF denotes a distance on the optical axis from an image-side surface of the second image-side lens up to the image.

Since it is possible to position the principal point of the second lens unit on the object side, it is possible to shorten the optical system while maintaining a favorable imaging performance.

Here, it is preferable that the following conditional expression (39') is satisfied instead of conditional expression (39).

$$0.2<R_{G2i}/BF \quad (39')$$

Moreover, it is more preferable that the following conditional expression (39") is satisfied instead of conditional expression (39).

$$0.4<R_{G2i}/BF \quad (39'')$$

Furthermore, it is even more preferable that the following conditional expression (39"') is satisfied instead of conditional expression (39).

$$0.8<R_{G2i}/BF \quad (39''')$$

In the optical system according to the present embodiment, it is preferable that the second lens unit includes a predetermined lens unit nearest to the image, and the positive lens is disposed on the object side of the predetermined lens unit, and the positive lens is disposed to be adjacent to the predetermined lens unit.

By disposing the positive lens on the object side of the predetermined lens unit, and disposing the positive lens to be adjacent to the predetermined lens unit, it is possible to suppress an angle of incidence of an off-axis light beam on the second lens unit from becoming large, while shortening the overall length of the optical system. As a result, since it is possible to prevent a height of a light ray of the off-axis light beam from becoming excessively high, it is possible to make the optical system thin. Moreover, although a distortion in a positive direction occurs due to a divergence effect in the predetermined lens unit, it is possible to correct the distortion favorably by the positive lens. The predetermined lens and the positive lens may be disposed separately, or may be cemented.

In the optical system according to the present embodiment, it is preferable that an image-side surface of the first image-side lens is concave toward the image side, and the following conditional expression (40) is satisfied:

$$0.2<R_{G1i}/D_{G1is} \quad (40)$$

where, $R_{G1i}$ denotes a radius of curvature of the image-side surface of the first image-side lens, and $D_{G1is}$ denotes a distance on the optical axis from the image-side surface of the first image-side lens up to the stop.

By making the image-side surface of the first image-side lens concave toward the image side, it is possible to position the principal point of the first lens unit on the object side. Accordingly, it is possible to secure an appropriate working distance. Moreover since a lens surface which is a concave surface is directed toward the stop, it is possible to suppress the occurrence of the coma in a peripheral portion of the image (position at which, the image height is high).

Furthermore, by satisfying conditional expression (40), since it is possible to maintain appropriately the divergence effect in a peripheral portion of the optical system, it is possible to suppress the occurrence of the chromatic coma.

Here, it is preferable that the following conditional expression (40') is satisfied instead of conditional expression (40).

$$0.4<R_{G1i}/D_{G1is} \quad (40')$$

Moreover, it is more preferable that the following conditional expression (40") is satisfied instead of conditional expression (40).

$$0.4<R_{G1i}/D_{G1is} \quad (40'')$$

Furthermore, it is even more preferable that the following conditional expression (40"') is satisfied instead of conditional expression (40).

$$1.6<R_{G1i}/D_{G1is} \quad (40''')$$

In the optical system according to the present embodiment, it is preferable that the first lens unit includes not less than three positive lenses, and at least two positive lenses from among the positive lenses are disposed to be adjacent, and an object-side surface in the two positive lenses disposed to be adjacent is a convex surface which is convex toward the object side.

By making such an arrangement, it is possible to distribute the positive refractive power in the first lens unit to three or more than three lenses, and to dispose each lens at a different position. As a result, it is possible to converge a light beam incident with a high numerical aperture while suppressing an occurrence of aberration, and to correct the curvature of field and the chromatic aberration of magnification favorably. Furthermore, by disposing two of the three or more than three lenses to be adjacent, and letting the object-side surface to be a convex surface convex toward the object side, it is possible to correct the spherical aberration favorably.

In the optical system according to the present embodiment, it is preferable that from among the three or more than three positive lenses, at least one positive lens is an aspherical lens, and at least one surface of the aspherical lens is an aspherical surface.

By making such an arrangement, it is possible to correct the off-axis aberration of higher order.

In the optical system according to the present embodiment, it is preferable that the first lens unit includes at least one cemented lens.

By cementing a lens having a function of correcting the chromatic aberration with another lens to form a cemented lens, and by disposing the cemented lens in the first lens unit, it is possible to suppress the occurrence of the chromatic aberration of magnification simultaneously while correcting the longitudinal chromatic aberration in the first lens unit. As a result, it is possible to correct the longitudinal chromatic aberration and the chromatic aberration of magnification in the optical system favorably.

In the optical system according to the present embodiment, it is preferable that a positive lens is disposed on the object side of the cemented lens in the first lens unit, and the positive lens is a single lens.

By making such an arrangement, it is possible to distribute the positive refractive power in the first lens unit to the cemented lens and the positive lens. As a result, it is possible to correct the spherical aberration more favorably.

In the optical system according to the present embodiment, it is preferable that the second lens unit includes at least one cemented lens.

By cementing a lens having a function of correcting the chromatic aberration with another lens to form a cemented lens, and by disposing the cemented lens in the second lens unit, it is possible to suppress the occurrence of the chromatic aberration of magnification simultaneously while correcting the longitudinal chromatic aberration in the second lens unit. As a result, it is possible to correct the longitudinal chromatic aberration and the chromatic aberration of magnification in the optical system favorably.

In the optical system according to the present embodiment, it is preferable that a positive lens is disposed on the image side of the cemented lens in the second lens unit, and the positive lens is a single lens.

By making such an arrangement, it is possible to distribute the positive refractive power in the second lens unit to the cemented lens and the positive lens. As a result, it is possible to correct the spherical aberration more favorably.

In the optical system according to the eighth embodiment and the optical system according to the tenth embodiment, it is preferable that the first object-side lens has a positive refractive power, and the first object-side lens is either a single lens or a cemented lens.

By imparting the positive refractive power to the first object-side lens, it is possible to position the principal point of the first lens unit on the object side as much as possible. As a result, it is possible to achieve both, securing an appropriate working distance and small-sizing of the optical system. In a case in which, further longer working distance is necessary, it is preferable to make such arrangement.

It is preferable that the optical system according to the present embodiment includes at least one lens having an inflection point, and in the lens having the inflection point, the number of inflection points in a shape of a lens surface is one or more than one.

By making such an arrangement, it is possible to correct the off-axis aberration of higher order favorably.

In the optical system according to the present embodiment, it is preferable that a shape of at least one lens surface of the second image-side lens is a shape having an inflection point.

By making such an arrangement, it is possible to correct the off-axis aberration of higher order favorably, and apart from this, it is possible to achieve both, the small-sizing of the optical system and reduction of an angle of incidence on the image pickup element. For small-sizing of the optical system, it is desirable to make an arrangement such that in the second lens unit, a refractive power in a region closer to the image side becomes a negative refractive power, and accordingly, to position the principal point of the second lens unit on the object side. Moreover, for reducing the angle of incidence on the image pickup element, at least one surface of the second image-side lens is let to have a shape having at least one inflection point. By making such an arrangement, it is possible to make small an angle of incidence of an off-axis light beam on the image surface.

In the optical system according to the present embodiment, it is preferable that the first lens unit includes at least one negative lens, and the negative lens is a single lens.

By making such an arrangement, it is possible to correct the chromatic aberration sufficiently in the first lens unit. As a result, it is possible to correct the chromatic aberration of magnification favorably while correcting the longitudinal chromatic aberration in the overall optical system.

In the optical system according to the present embodiment, it is preferable that the first image-side lens is a cemented lens.

In the first lens unit, by disposing a negative lens near the stop, it is possible to correct favorably the longitudinal chromatic aberration and the curvature of field simultaneously. Here, by disposing a positive lens at a position adjacent to the negative lens, and cementing the negative lens and the positive lens, it is possible to suppress the occurrence of the chromatic aberration of magnification.

Moreover, in the optical system according to the present embodiment, it is preferable that the second object-side lens is a cemented lens.

In the second lens unit, by disposing a negative lens near the stop, it is possible to correct favorably the longitudinal chromatic aberration and the curvature of field simultaneously. Here, by disposing a positive lens at a position adjacent to the negative lens, and cementing the negative lens and the positive lens, it is possible to suppress the occurrence of the chromatic aberration of magnification.

In the optical system according to the eighth embodiment, it is preferable that at the time of focusing, some of the lenses from among the plurality of lenses in the second lens unit move in an optical axial direction.

Since the second lens unit is positioned on the image side of the first lens unit, a light beam diameter in the second lens unit is smaller than a light beam diameter in the first lens unit. Therefore, even when a lens is moved in the second lens unit, a fluctuation in aberration is small. Therefore, when the movement of lenses at the time of focusing is carried out by using some of the lenses from among the plurality of lenses in the second lens unit, it is possible to make small the fluctuation in aberration due to the movement of the lenses.

In the optical system according to the eighth embodiment, it is preferable that at the time of focusing, an optical system from the first-object side lens up to the second image-side lens moves integrally in the optical axial direction.

In the optical system according to the present embodiment, it is preferable that at the time of focusing, an airspace from the first object-side lens up to the second image-side lens does not change.

By making such an arrangement, at the time of focusing, a positional relationship of lenses (single lens or cemented lens) positioned on both sides of the stop does not change. As a result, since a balance of the chromatic aberration of magnification in the first lens unit and the chromatic aberration of magnification in the second lens unit is not disrupted, it is possible to maintain a favorable imaging performance even when the focusing is carried out. In the first lens unit and the second lens unit, it is desirable that a lens and a pair of lenses having a significant effect of correcting the chromatic aberration is disposed near the stop for correcting the chromatic aberration of magnification favorably.

In the optical system according to the eighth embodiment, it is preferable that the following conditional expression (37-2) is satisfied:

$$0.5<f_{G1o}/f<100 \tag{37-2}$$

where, $f_{G1o}$ denotes a focal length of the first object-side lens, and f denotes a focal length of an overall optical system.

Moreover, in the optical system according to the eighth embodiment and the optical system according to the tenth embodiment, it is preferable that the following conditional expression (41) is satisfied:

$$0.5<f_{G1o}/f_{G1}<20 \tag{41}$$

where, $f_{G1o}$ denotes a focal length of the first object-side lens, and $f_{G1}$ denotes a focal length of the first lens unit.

By making so as not to fall below a lower limit value of conditional expression (41), it is possible to prevent the positive refractive power of the first object-side lens from becoming excessively small. Accordingly, it is possible to position the principal point of the first lens unit on the object side as much as possible. As a result, it is possible to achieve both, securing an appropriate working distance and small-sizing of the optical system. In a case in which, further longer working distance is necessary, it is preferable to make such arrangement.

Here, it is preferable that the following conditional expression (41') is satisfied instead of conditional expression (41).

$$0.71<f_{G1o}/f_{G1}<10.00 \tag{41'}$$

Moreover, it is more preferable that the following conditional expression (41") is satisfied instead of conditional expression (41).

$$1.00<f_{G1o}/f_{G1}<7.00 \tag{41''}$$

Furthermore, it is even more preferable that the following conditional expression (41''') is satisfied instead of conditional expression (41).

$$1.67<f_{G1o}/f_{G1}<5.00 \tag{41'''}$$

In the optical system according to the present embodiment, it is preferable that the following conditional expression (42) is satisfied:

$$0.01<1/\nu d_{G1min}-1/\nu_{G1max} \tag{42}$$

where, $\nu d_{G1min}$ denotes a smallest Abbe's number from among Abbe's numbers for lenses forming the first lens unit, and $\nu d_{G1max}$ denotes a largest Abbe's number from among Abbe's numbers for lenses forming the first lens unit.

In the optical system according to the present embodiment, it is preferable that the following (i) and (ii) have been realized. (i) Enlargement of the numerical aperture on the object side and shortening of the overall length of the optical system, (ii) Favorable correction of the longitudinal chromatic aberration and the chromatic aberration of magnification. Conditional expression (42) is an expression for achieving both of (i) and (ii).

By making so as not to fall below a lower limit value of conditional expression (42), it is possible to suppress the occurrence of the longitudinal chromatic aberration in the first lens unit. Moreover, as it is possible to suppress the occurrence of the longitudinal chromatic aberration in the first lens unit, an excessive correction of the longitudinal chromatic aberration in the second lens unit becomes unnecessary. Accordingly, since the correction of the chromatic aberration of magnification in the second lens unit can be carried out favorably, it is possible to correct the chromatic aberration of magnification in the overall optical system favorably.

Here, it is preferable that the following conditional expression (42') is satisfied instead of conditional expression (42).

$$0.011<1/\nu d_{G1min}-1/\nu d_{G1max} \tag{42'}$$

Moreover, it is more preferable that the following conditional expression (42") is satisfied instead of conditional expression (42).

$$0.014<1/\nu d_{G1min}-1/\nu d_{G1max} \tag{42''}$$

Furthermore, it is even more preferable that the following conditional expression (42''') is satisfied instead of conditional expression (42).

$$0.020<1/\nu d_{G1min}-1/\nu d_{G1max} \tag{42'''}$$

In the optical system according to the present embodiment, it is preferable that the following conditional expression (43) is satisfied:

$$0.01<1/\nu d_{G2min}-1/\nu d_{G2max} \tag{43}$$

where, $\nu d_{G2min}$ denotes a smallest Abbe's number from among Abbe's numbers for lenses forming the second lens unit, and $\nu d_{G2max}$ denotes a largest Abbe's number from among Abbe's numbers for lenses forming the second lens unit.

In the optical system according to the present embodiment, it is preferable that the aforementioned (i) and (ii) have been realized. Conditional expression (43) is an expression for achieving both of (i) and (ii).

By making so as not to fall below a lower limit value of conditional expression (43), it is possible to suppress the occurrence of the longitudinal chromatic aberration in the second lens unit. Moreover, as it is possible to suppress the occurrence of the longitudinal chromatic aberration in the second lens unit, an excessive correction of the longitudinal chromatic aberration in the first lens unit becomes unnecessary. Accordingly, since the correction of the chromatic aberration of magnification in the second lens unit can be carried out favorably, it is possible to correct the chromatic aberration of magnification in the overall optical system favorably.

Here, it is preferable that the following conditional expression (43') is satisfied instead of conditional expression (43).

$$0.011<1/\nu d_{G2min}-1/\nu d_{G2max} \tag{43'}$$

Moreover, it is more preferable that the following conditional expression (43") is satisfied instead of conditional expression ((43).

$$0.014<1/\nu d_{G2min}-1/\nu_{G2max} \tag{43''}$$

Furthermore, it is even more preferable that the following conditional expression (43''') is satisfied instead of conditional expression (43).

$$0.020<1/\nu d_{G2min}-1/\nu d_{G2max} \tag{43'''}$$

It is preferable that the optical system according to the present embodiment includes at least one positive lens which satisfies the following conditional expression (44):

$$0.59<\theta_{gF}<0.8 \tag{44}$$

where, $\theta_{gF}$ denotes a partial dispersion ratio of the positive lens, and is expressed by $\theta_{gF}=(ng-nF)/(nF-nC)$, where nC, nF, and ng denote refractive indices with respect to a C-line, an F-line, and a g-line respectively.

In the optical system according to the present embodiment, it is preferable that the aforementioned (i) and (ii) have been realized. Conditional expression (44) is an expression for achieving both of (i) and (ii).

When the longitudinal chromatic aberration and the chromatic aberration of magnification for the d-line and the C-line have been corrected favorably, by disposing the positive lens satisfying conditional expression (44) in the optical system, it is possible to correct the longitudinal chromatic aberration and the chromatic aberration of magnification for the g-line favorably.

A material satisfying conditional expression (44), in many cases, is a material having a high dispersion in general. Therefore, using a material which satisfies conditional expression (44) for a lens having a positive refractive power means imparting a function of correcting a chromatic aberration which is opposite to a usual case, to the lens. However, in a case of carrying out more favorable correction of chromatic aberration, it is desirable to use a material which satisfies conditional expression (44), for the lens having a positive refractive power.

In the optical system according to the eighth embodiment and the optical system according to the tenth embodiment, it is preferable that the lens satisfying conditional expression (44) is included in the first lens unit.

When an attempt is made to secure an appropriate working distance in the optical system, in many cases, an aberration in the first lens unit is outspread to the second lens unit. Therefore, it is desirable to correct favorably the chromatic aberration for the g-line solely in the first lens unit. By doing so, it is possible to correct the chromatic aberration for the g-line favorably, solely in the first lens unit.

In the optical system according to the present embodiment, it is preferable that the positive lens which satisfies conditional expression (44), satisfies the following conditional expression (45):

$$0.3<D_{p1s}/L_{G1s}\leq 1 \tag{45}$$

where, $D_{p1s}$ denotes a distance on the optical axis from an object-side surface of the positive lens up to the stop, and $L_{G1s}$ denotes a distance on the optical axis from an object-side surface of the first object-side lens up to the stop.

By satisfying conditional expression (45), it is possible to position the principal point of the first lens unit on the object side while correcting the chromatic aberration favorably. As a result, small-sizing of the optical system is possible while securing the working distance to a fixed amount.

Here, it is preferable that the following conditional expression (45') is satisfied instead of conditional expression (45).

$$0.32<D_{p1s}/L_{G1s}\leq 1.00 \tag{45'}$$

Moreover, it is more preferable that the following conditional expression (45'') is satisfied instead of conditional expression (45).

$$0.50<D_{p1s}/L_{G1s}\leq 1.00 \quad (45'')$$

Furthermore, it is even more preferable that the following conditional expression (45''') is satisfied instead of conditional expression (45).

$$0.70<D_{p1s}/L_{G1S}\leq 1.00 \quad (45''')$$

In the optical system according to the present embodiment, it is preferable that the first lens unit includes not less than two negative lenses that satisfy the following conditional expression (46):

$$0.01<1/\nu d_{G1n}-1/\nu d_{G1max} \quad (46)$$

where, $\nu d_{G1n}$ denotes a smallest Abbe's number for the negative lens forming the first lens unit, and $\nu d_{G1max}$ denotes a largest Abbe's number from among Abbe's numbers for lenses forming the first lens unit.

By satisfying conditional expression (46), it is possible to correct the longitudinal chromatic aberration and the chromatic aberration of magnification more favorably. Two or more than two negative lenses which satisfy conditional expression (46), or in other words, two or more than two negative lenses which have a function of correcting the chromatic aberration are used, and are disposed to have an appropriate positional relation. Accordingly, when the occurrence of the longitudinal chromatic aberration in the first lens unit has been suppressed, it is possible to correct the chromatic aberration of magnification in the first lens unit favorably. As a result, it is possible to correct the longitudinal chromatic aberration and the chromatic aberration of magnification in the overall optical system favorably. Particularly, in a case of a magnifying optical system, for correcting the chromatic aberration of magnification in the first lens unit favorably, it is desirable to satisfy conditional expression (46).

Moreover, in the optical system according to the present embodiment, it is preferable that the two or more than two negative lenses which satisfy conditional expression (46) include an object-side negative lens which is disposed nearest to the object, and an image-side negative lens which is disposed nearest to the image, and the object-side negative lens satisfies the following conditional expression (47):

$$0.2<D_{noni}/L_{G1s}<0.9 \quad (47)$$

where, $D_{noni}$ denotes a distance on the optical axis from an object-side surface of the object-side negative lens up to an object-side surface of the image-side negative lens, and $L_{G1s}$ denotes a distance on the optical axis from the object-side surface of the first object-side lens up to the stop.

By satisfying conditional expression (47), it is possible to correct the longitudinal chromatic aberration and the chromatic aberration of magnification more favorably. Two or more than two negative lenses which satisfy conditional expression (46), or in other words, two or more than to negative lenses having a function of correcting the chromatic aberration are used, and these negative lenses are disposed at positions which satisfy conditional expression (47). Accordingly, when the occurrence of the longitudinal chromatic aberration in the first lens unit has been suppressed, it is possible to correct the chromatic aberration of magnification in the first lens unit more favorably. As a result, it is possible to correct the longitudinal chromatic aberration and the chromatic aberration of magnification of the overall lens system more favorably. Particularly, in a case of a magnifying optical system, for correcting the chromatic aberration of magnification in the first lens unit favorably, it is desirable to satisfy conditional expression (47).

Here, it is preferable that the following conditional expression (47') is satisfied instead of conditional expression (47).

$$0.21<D_{noni}/L_{G1s}<0.86 \quad (47')$$

Moreover, it is more preferable that the following conditional expression (47'') is satisfied instead of conditional expression (47).

$$0.22<D_{noni}/L_{G1s}<0.81 \quad (47'')$$

Furthermore, it is even more preferable that the following conditional expression (47''') is satisfied instead of conditional expression (47).

$$0.23<D_{noni}/L_{G1s}<0.77 \quad (47''')$$

In the optical system according to the present embodiment, it is preferable that the first lens unit has a positive refractive power, and includes at least one diffractive optical element.

A height of an axial marginal ray is high in the first lens unit. Therefore, by letting the refractive power of the first lens unit to be a positive refractive power, and disposing the diffractive optical element in the first lens unit, it is possible to suppress the occurrence of the longitudinal chromatic aberration in the first lens unit.

In the optical system according to the present embodiment, it is preferable to dispose at least one diffractive optical element at a position which is on the object side of the stop, and at the position which satisfies the following conditional expression (48):

$$0.1<D_{DLs}/D_{G1is} \quad (48)$$

where, $D_{DLs}$ denotes a distance on the optical axis from the diffractive optical element up to the stop, and $D_{G1is}$ denotes a distance on the optical axis from the image-side surface of the first image-side lens up to the stop.

At the position in the first lens unit at which, conditional expression (48) is satisfied, since the height of the principal ray becomes comparatively higher, by disposing the diffractive optical element at that position, it is possible to correct the chromatic aberration of magnification for the F-line and the g-line in particular, more favorably. To be more precise, $D_{DLs}$ is a distance from a diffractive surface of the diffractive optical element up to the stop.

In the optical system according to the present embodiment, it is preferable to dispose at least one diffractive optical element at a position which is on the image side of the stop, and at the position which satisfies the following conditional expression (49):

$$0.2<D_{sDL}/L_{sG2}<0.9 \quad (49)$$

where, $D_{sDL}$ denotes a distance on the optical axis from the stop up to the diffractive optical element, and $L_{sG2}$ denotes a distance on the optical axis from the stop up to the image-side surface of the second image-side lens.

At the position in the second lens unit at which, conditional expression (49) is satisfied, since the height of the principal ray becomes comparatively higher, by disposing the diffractive optical element at that position, it is possible to correct the chromatic aberration of magnification for the F-line and the g-line in particular, more favorably. To be more precise, $D_{sDL}$ is a distance from the stop up to a diffractive surface of the diffractive optical element.

Here, it is preferable that the following conditional expression (49') is satisfied instead of conditional expression (49).

$$0.21<D_{sDL}/L_{sG2}<0.86 \quad (49')$$

Moreover, it is more preferable that the following conditional expression (49") is satisfied instead of conditional expression (49).

$$0.22<D_{sDL}/L_{sG2}<0.86 \quad (49'')$$

Furthermore, it is even more preferable that the following conditional expression (49"') is satisfied instead of conditional expression (49).

$$0.23<D_{sDL}/L_{sG2}<0.86 \quad (49''')$$

Moreover, it is preferable that the optical system according to the present embodiment includes a negative lens which satisfies the following conditional expressions (50) and (51):

$$0.01<1/\nu d_{n1}-1/\nu d_{G1max} \quad (50)$$

$$0<D_{n1s}/D_{os}<0.3 \quad (51)$$

where, $\nu d_{n1}$ denotes Abbe's number for the negative lens, $\nu d_{G1max}$ denotes a largest Abbe's number from among the Abbe's numbers for lenses forming the first lens unit, $D_{n1s}$ denotes a distance on the optical axis from an object-side surface of the negative lens up to the stop, and $D_{os}$ denotes a distance on the optical axis from the object up to the stop.

For achieving both, shortening of the overall length of the optical system and favorable correction of the chromatic aberration and the curvature of field, it is preferable to satisfy conditional expressions (50) and (51).

By making so as not to fall below lower limit values of conditional expression (50) and (51), it is possible to secure a thickness of the negative lens appropriately.

By making so as not to exceed an upper limit values of conditional expressions (50) and (51), it is possible to dispose the negative lens having a function of correcting the chromatic aberration because of high dispersion, near the stop. The height of an axial marginal ray being low near the stop, it is possible to correct favorably the chromatic aberration and the curvature of field simultaneously by the negative lens.

Here, it is preferable that the following conditional expression (51') is satisfied instead of conditional expression (51).

$$0.01<D_{n1s}/D_{os}<0.29 \quad (51')$$

Moreover, it is more preferable that the following conditional expression (51") is satisfied instead of conditional expression (51).

$$0.02<D_{n1s}/D_{os}<0.27 \quad (51'')$$

Furthermore, it is even more preferable that the following conditional expression (51"') is satisfied instead of conditional expression (51).

$$0.03<D_{n1s}/D_{os}<0.26 \quad (51''')$$

It is preferable that the optical system according to the present embodiment includes a negative lens which satisfies the following conditional expressions (52) and (53):

$$0.01<1/\nu d_{n2}-1/\nu d_{G2max} \quad (52)$$

$$0<D_{m2}/D_{si}<0.4 \quad (53)$$

where, $\nu d_{n2}$ denotes Abbe's number for the negative lens, $\nu d_{G2max}$ denotes a largest Abbe's number from among the Abbe's numbers for lenses forming the second lens unit, $D_{sn2}$ denotes a distance on the optical axis from the stop up to an image-side surface of the negative lens, and $D_{si}$ denotes a distance on the optical axis from the stop up to the image.

For achieving both, shortening of the overall length of the optical system and favorable correction of the chromatic aberration and the curvature of field, it is preferable to satisfy conditional expressions (52) and (53).

By making so as not to fall below lower limit values of conditional expressions (52) and (53), it is possible to secure a thickness of the negative lens appropriately.

By making so as not to exceed an upper limit values of conditional expressions (52) and (53), it is possible to dispose the negative lens having a function of correcting the chromatic aberration because of high dispersion, near the stop. The height of an axial marginal ray being low near the stop, it is possible to correct favorably the chromatic aberration and the curvature of field simultaneously by the negative lens.

Here, it is preferable that the following conditional expression (53') is satisfied instead of conditional expression (53).

$$0.01<D_{sn2}/D_{si}<0.38 \quad (53')$$

Moreover, it is more preferable that the following conditional expression (53") is satisfied instead of conditional expression (53).

$$0.02<D_{sn2}/D_{si}<0.36 \quad (53'')$$

Furthermore, it is even more preferable that the following conditional expression (53"') is satisfied instead of conditional expression (53).

$$0.03<D_{sn2}/D_{si}<0.34 \quad (53''')$$

It is preferable that the optical system according to the present embodiment includes a negative lens at a position which satisfies the following conditional expression (54):

$$0.6<D_{sn3}/D_{si}<1 \quad (54)$$

where, $D_{sn3}$ denotes a distance on the optical axis from the stop up to an image-side surface of the negative lens, and $D_{si}$ denotes a distance on the optical axis from the stop up to the image.

For achieving both, shortening of the overall length of the optical system and favorable correction of the off-axis aberration such as the chromatic aberration of magnification, it is preferable to satisfy conditional expression (54).

By making so as not to fall below a lower limit value of conditional expression (54), in the second lens unit, it is possible to dispose the negative lens in a region closer to the image side. Accordingly, since it is possible to position the principal point on the object side, even if the overall length of the optical system is shortened, it becomes possible to change the height of the principal ray emerged from the stop and reaching the periphery of the image in the second lens unit comparatively gradually. As a result it is possible to correct favorably the chromatic aberration of magnification in particular.

By making so as not to exceed an upper limit value of conditional expression (54), it is possible to increase a distance between the negative lens and the image pickup element. Therefore, even when a ghost is generated due to multiple reflection between the negative lens and the image pickup element, it is possible to prevent the ghost from being incident on a surface of the image pickup element with a high density.

Here, it is preferable that the following conditional expression (54') is satisfied instead of conditional expression (54).

$$0.63<D_{sn3}/D_{si}<0.98 \quad (54')$$

Moreover, it is more preferable that the following conditional expression (54") is satisfied instead of conditional expression (54).

$$0.66<D_{sn3}/D_{si}<0.96 \quad (54'')$$

Furthermore, it is even more preferable that the following conditional expression (54"') is satisfied instead of conditional expression (54).

$$0.70<D_{sn3}/D_{si}<0.94 \quad (54''')$$

It is preferable that the optical system according to the present embodiment includes a positive lens at a position which satisfies the following conditional expression (55):

$$0.3<D_{p2s}/D_{os}<0.99 \quad (55)$$

where, $D_{p2s}$ denotes a distance on the optical axis from an object-side surface of the positive lens up to the stop, and $D_{os}$ denotes a distance on the optical axis from object up to the stop.

For achieving both, shortening of the overall length of the optical system and favorable correction of the chromatic aberration of magnification and the off-axis aberration, it is preferable to satisfy conditional expression (55).

By making so as not to fall below a lower limit value of conditional expression (55), it is possible to dispose the positive lens on the object side. Accordingly, since it is possible to position the principal point of the first lens unit on the object side, it is possible to secure an appropriate working distance.

By making so as not to exceed an upper limit value of conditional expression (55), it is possible to prevent the positive lens from coming too close to the object. As a result it is possible to secure an appropriate working distance.

Here, it is preferable that the following conditional expression (55') is satisfied instead of conditional expression (55).

$$0.35<D_{p2s}/D_{os}<0.89 \quad (55')$$

Moreover, it is more preferable that the following conditional expression (55") is satisfied instead of conditional expression (55).

$$0.42<D_{p2s}/D_{os}<0.80 \quad (55'')$$

Furthermore, it is even more preferable that the following conditional expression (55"') is satisfied instead of conditional expression (55).

$$0.49<D_{p2s}/D_{os}<0.70 \quad (55''')$$

In the optical system according to the eighth embodiment, it is preferable that, instead of conditional expression (55), the following conditional expression (55-1) is satisfied.

$$0.3<D_{p2s}/D_{os}<0.7 \quad (55\text{-}1)$$

In the optical system according to the ninth embodiment, it is preferable that, instead of conditional expression (55), the following conditional expression (55-2) is satisfied.

$$0.5<D_{p2s}/D_{os}<0.99 \quad (55\text{-}2)$$

In the optical system according to the eighth embodiment and the optical system according to the tenth embodiment, it is preferable that the first lens unit includes a negative lens, and a positive lens which is disposed on the object side of the negative lens, and that the following conditional expression (56) is satisfied:

$$0.78<L_L/D_{oi}+0.07\times WD/BF \quad (56)$$

where, $L_L$ denotes a distance on the optical axis from the object-side surface of the first object-side lens up to the image-side surface of the second image-side lens, $D_{oi}$ denotes a distance on the optical axis from the object up to the image, WD denotes a distance on the optical axis from the object up to the object-side surface of the first object-side lens, and BF denotes a distance on the optical axis from the image-side surface of the second image-side lens up to the image.

By making so as not to fall below a lower limit value of conditional expression (56), even in an optical system of which, the overall length is shortened, since it becomes possible to change the height of a principal ray emerged from a periphery of the object and reaching a periphery of the image comparatively gradually, it is possible to prevent the radius of curvature of a lens in the optical system from becoming excessively small. As a result, it is possible to suppress the occurrence of the longitudinal chromatic aberration and the chromatic aberration of magnification.

By satisfying conditional expressions (16), (19), (20), and (56), it is possible to suppress the occurrence of the longitudinal chromatic aberration and the chromatic aberration of magnification more effectively while carrying out enlargement of the numerical aperture on the object side and shortening of the overall length of the optical system.

By satisfying conditional expressions (25) and (56), it is possible to correct the longitudinal chromatic aberration and the chromatic aberration of magnification more favorably while securing the working distance appropriately, and carrying out enlargement of the numerical aperture on the object side and shortening of the overall length of the optical system.

Here, it is preferable that the following conditional expression (56') is satisfied instead of conditional expression (56).

$$0.87<L_L/D_{oi}+0.07\times WD/BF \quad (56')$$

Moreover, it is more preferable that the following conditional expression (56") is satisfied instead of conditional expression (56).

$$0.96<L_L/D_{oi}+0.07\times WD/BF \quad (56'')$$

Furthermore, it is even more preferable that the following conditional expression (56"') is satisfied instead of conditional expression (56).

$$1.07<L_L/D_{oi}+0.07\times WD/BF \quad (56''')$$

Moreover, in the optical system according to the eighth embodiment and the optical system according to the tenth embodiment, it is preferable that the following conditional expression (57) is satisfied:

$$D_{os}/L_{G1}-0.39\times WD/BF<1.8 \quad (57)$$

where, $D_{os}$ denotes a distance on the optical axis from the object up to the stop, $L_{G1}$ denotes a distance on the optical axis from the object-side surface of the first object-side lens up to the image-side surface of the first image-side lens, WD denotes a distance on the optical axis from the object up to the object-side surface of the first object-side lens, and BF denotes a distance on the optical axis from the image-side surface of the second image-side lens up to the image.

By making so as not to exceed an upper limit value of conditional expression (57), even in an optical system of which, the overall length is shortened, it becomes possible to change the height of a principal ray emerged from a periphery of the object and reaching a periphery of the image comparatively gradually, and it is possible to prevent the radius of curvature of a lens in the optical system from becoming excessively small. Therefore, it is possible to suppress the occurrence of the longitudinal chromatic aberration and the chromatic aberration of magnification.

By satisfying conditional expressions (16), (19), (20), and (57), it is possible to suppress the occurrence of the longitudinal chromatic aberration and the chromatic aberration of magnification more effectively while carrying out enlargement of the numerical aperture on the object side and shortening of the overall length of the optical system.

By satisfying conditional expressions (25) and (57), it is possible to correct the longitudinal chromatic aberration and the chromatic aberration of magnification more favorably while securing the working distance appropriately, and carrying out enlargement of the numerical aperture on the object side and shortening of the overall length of the optical system.

Here, it is preferable that the following conditional expression (57') is satisfied instead of conditional expression (57).

$$D_{os}/L_{G1}-0.39\times WD/BF<1.53 \quad (57')$$

Moreover, it is more preferable that the following conditional expression (57") is satisfied instead of conditional expression (57).

$$D_{os}/L_{G1}-0.39\times WD/BF<1.40 \quad (57'')$$

Furthermore, it is even more preferable that the following conditional expression (57''') is satisfied instead of conditional expression (57).

$$D_{os}/L_{G1}-0.39\times WD/BF<1.30 \quad (57''')$$

Moreover, an image pickup apparatus of the present embodiment is characterized by including the abovementioned optical system and the image pickup element.

Moreover, an image pickup system of the present embodiment is characterized by including the image pickup apparatus, a stage which holds an object, and an illuminating unit which illuminates the object.

By illuminating the object by the illuminating unit, since it is possible to reduce a noise at the time of image pickup, it is possible to acquire an image with a high resolution.

Moreover, in the image pickup system of the present embodiment, it is preferable that the image pickup apparatus and the stage are integrated.

Since the numerical aperture on the object side of the optical system according to the present embodiment is large, the optical system has a high resolution, but a depth of field becomes shallow. Therefore, in the image pickup system using the optical system according to the present embodiment, it is preferable to integrate the image pickup apparatus and the stage which holds the object. By integrating the image pickup apparatus and the stage, since it is possible to maintain relative positions and a relative distance of the image pickup apparatus and the object to be fixed, it is possible to acquire an image with a high resolution.

Regarding each conditional expression, by restricting one of or both an upper limit value and a lower limit value, since it is possible to make that function more assured, it is preferable to apply restriction. Moreover, regarding each conditional expression, only an upper limit value or a lower limit value of a numerical range of a further restricted conditional expression may be restricted. Moreover, with regard to restricting the numerical range of a conditional expression, the upper limit value or the lower limit value of each conditional expression described above may be an upper limit value or a lower limit value of a conditional expression other than those described above.

An optical system according to an example 1 will be described below. FIG. 1 is a cross-sectional view along an optical axis showing an optical arrangement of the optical system according to the example 1. Moreover, FIG. 2A, FIG. 2B, FIG. 2C, and FIG. 2D are aberration diagrams of the optical system according to the example 1.

In the aberration diagrams shown in FIG. 2A, FIG. 2B, FIG. 2C, and FIG. 2D, 'FIY' denotes the maximum image height. Symbols in the aberration diagrams are same even in examples that will be described later. Moreover, in aberration diagrams of examples from the example 1 to an example 7, four aberration diagrams in order from left show a spherical aberration (SA), an astigmatism (AS), a distortion (DT), and a chromatic aberration of magnification (CC).

The optical system according to the example 1, as shown in FIG. 1, includes in order from an object side, a lens unit Gf having a positive refractive power, an aperture stop S, and a lens unit Gr having a positive refractive power. In the examples from the example 1 to the example 7, in lens cross-sectional views, I denotes an image pickup surface of an image pickup element. The optical system according to the example 1 is suitable for an image pickup element for which, a pixel pitch is in a range of 0.6 μm to 1.2 μm.

The lens unit Gf includes a biconvex positive lens L1, a negative meniscus lens L2 having a convex surface directed toward the object side, a positive meniscus lens L3 having a convex surface directed toward an image side, a biconcave negative lens L4, and a positive meniscus lens L5 having a convex surface directed toward the object side.

The lens unit Gr includes a positive meniscus lens L6 having a convex surface directed toward the image side, a biconcave negative lens L7, a positive meniscus lens L8 having a convex surface directed toward the object side, a negative meniscus lens L9 having a convex surface directed toward the image side, and the biconvex positive lens L10.

The aperture stop S is disposed between the lens L5 and the lens L6.

An aspheric surface is provided to both surfaces of all the lenses from the lens L1 to the lens L10.

The optical system according to the example 1 includes five pairs of lenses which satisfy conditional expressions (1), (2), and (3). The pairs of lenses are the lens L1 and the lens L10, the lens L2 and the lens L9, the lens L3 and the lens L8, the lens L4 and the lens L7, and the lens L5 and the lens L6. Moreover, in the pairs of lenses, a shape of one lens in the pair and a shape of the other lens in the pair are same.

Figure 3:
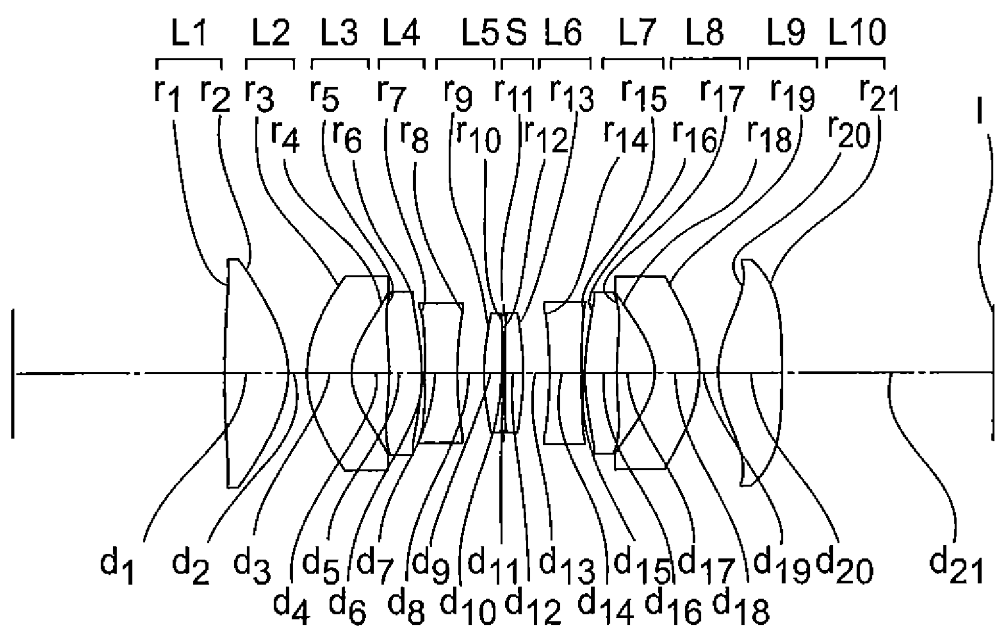
FIG. 3 is a cross-sectional view along an optical axis showing an optical arrangement of an optical system according to an example 2.
Figure 4A:
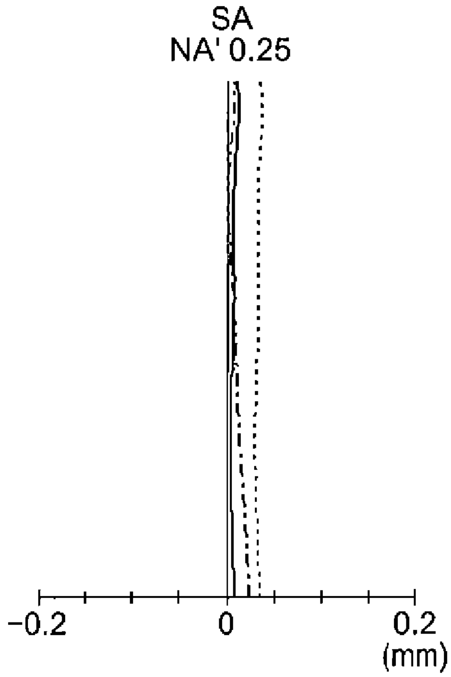
FIG. 4A, FIG. 4B, FIG. 4C, and FIG. 4D are diagrams showing a spherical aberration (SA), an astigmatism (AS), a distortion (DT), and a chromatic aberration of magnification (CC) respectively, of the optical system according to the example 2.
Figure 4B:
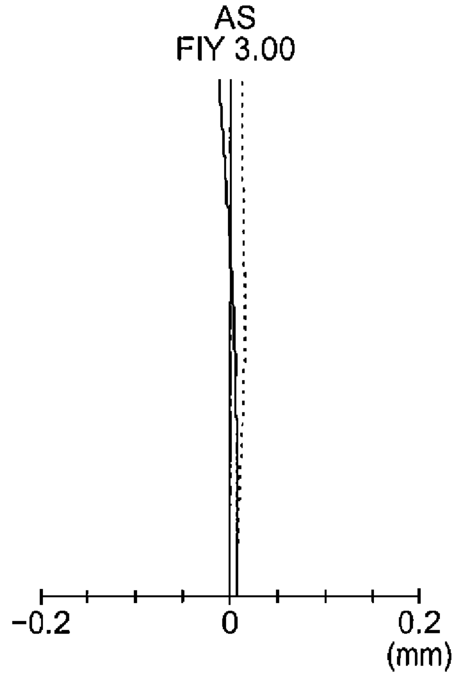
Figure 4C:
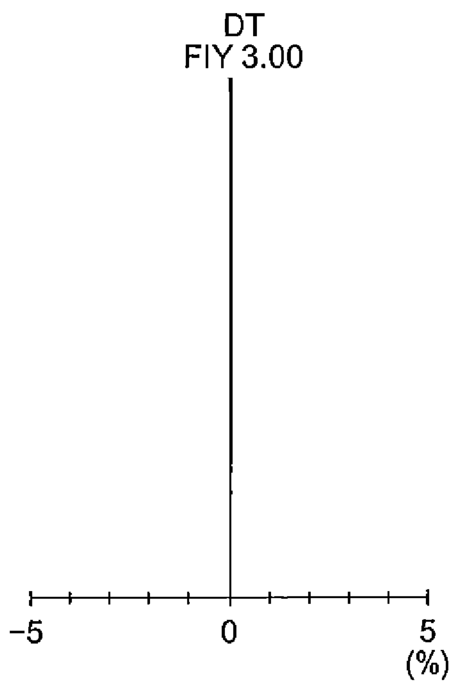
Figure 4D:
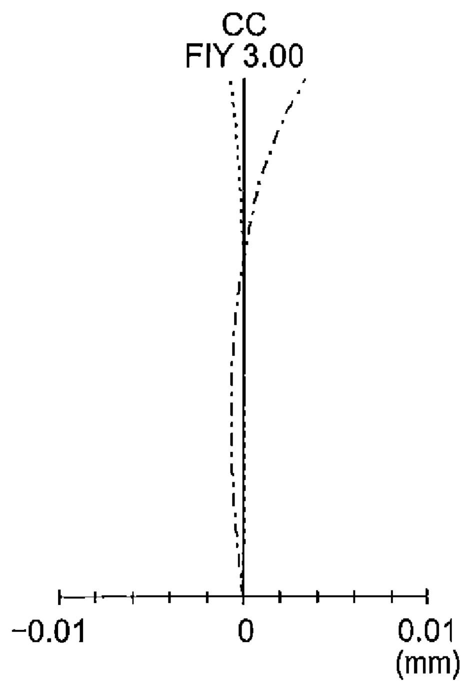

Next, an optical system according to an example 2 of the present invention will be described below. FIG. 3 is a cross-sectional view along an optical axis showing an optical arrangement of the optical system according to the example 2. Moreover, FIG. 4A, FIG. 4B, FIG. 4C, and FIG. 4D are aberration diagrams of the optical system according to the example 2.

The optical system according to the example 2, as shown in FIG. 3, includes in order from an object side, a lens unit Gf having a positive refractive power, an aperture stop S, and a lens unit Gr having a positive refractive power. The optical system according to the example 2 is suitable for an image pickup element for which, a pixel pitch is in a range of 0.6 μm to 1.2 μm.

The lens unit Gf includes a biconvex positive lens L1, a negative meniscus lens L2 having a convex surface directed toward the object side, a positive meniscus lens L3 having a convex surface directed toward an image side, a biconcave negative lens L4, and a positive meniscus lens L5 having a convex surface directed toward the object side.

The lens unit Gr includes a positive meniscus lens L6 having a convex surface directed toward the image side, a biconcave negative lens L7, a positive meniscus lens L8 having a convex surface directed toward the object side, a negative meniscus lens L9 having a convex surface directed toward the image side, and the biconvex positive lens L10.

The aperture stop S is disposed between the lens L5 and the lens L6.

An aspheric surface is provided to both surfaces of all the lenses from the lens L1 to the lens L10.

The optical system according to the example 2 includes five pairs of lenses which satisfy conditional expressions (1), (2), and (3). The pairs of lenses are the lens L1 and the lens L10, the lens L2 and the lens L9, the lens L3 and the lens L8, the lens L4 and the lens L7, and the lens L5 and the lens L6. Moreover, in the pairs of lenses, a shape of one lens in the pair and a shape of the other lens in the pair differ slightly.

Figure 5:
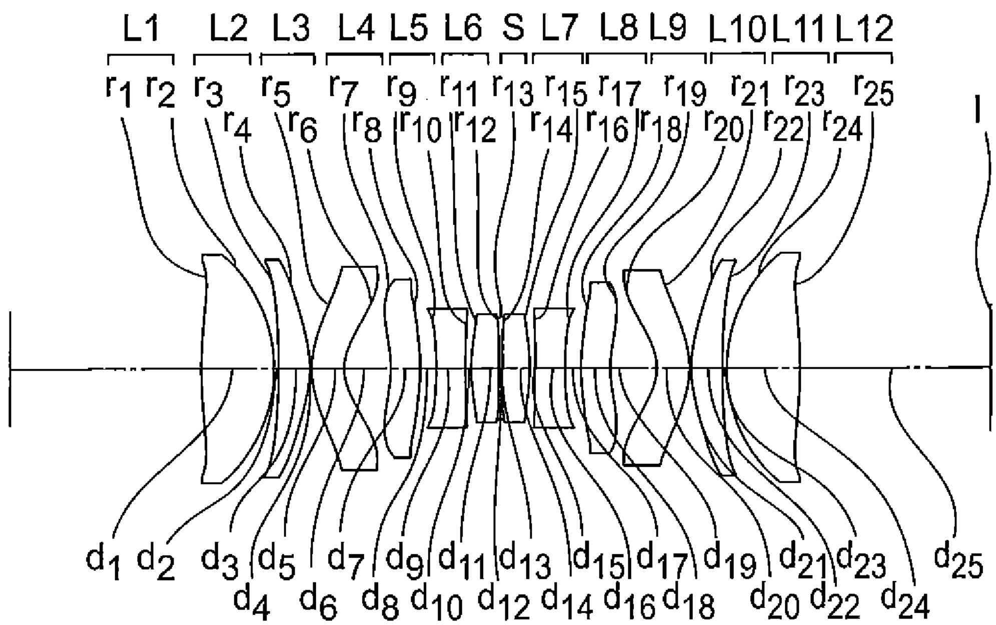
FIG. 5 is a cross-sectional view along an optical axis showing an optical arrangement of an optical system according to an example 3.
Figure 6A:
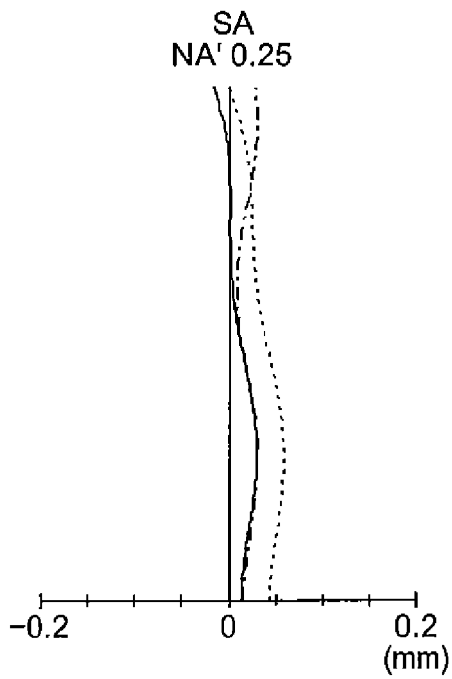
FIG. 6A, FIG. 6B, FIG. 6C, and FIG. 6D are diagrams showing a spherical aberration (SA), an astigmatism (AS), a distortion (DT), and a chromatic aberration of magnification (CC) respectively, of the optical system according to the example 3.
Figure 6B:
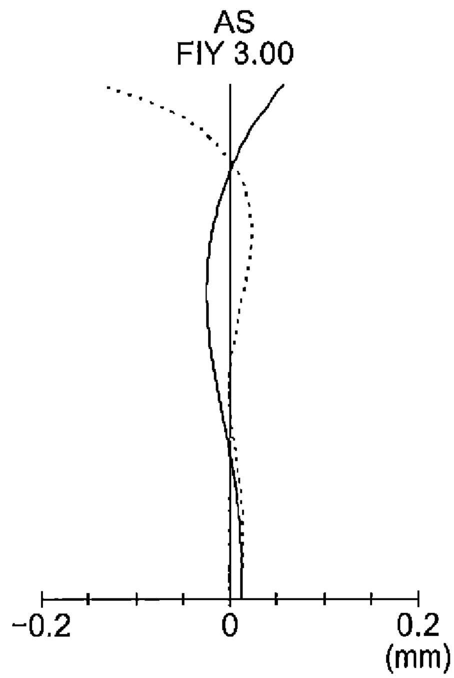
Figure 6C:
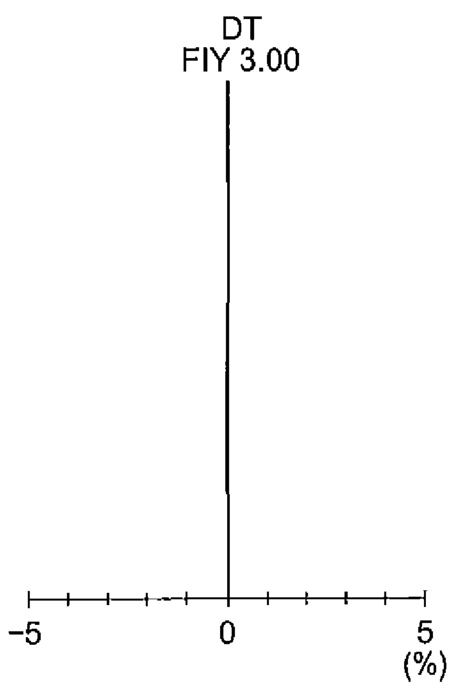
Figure 6D:
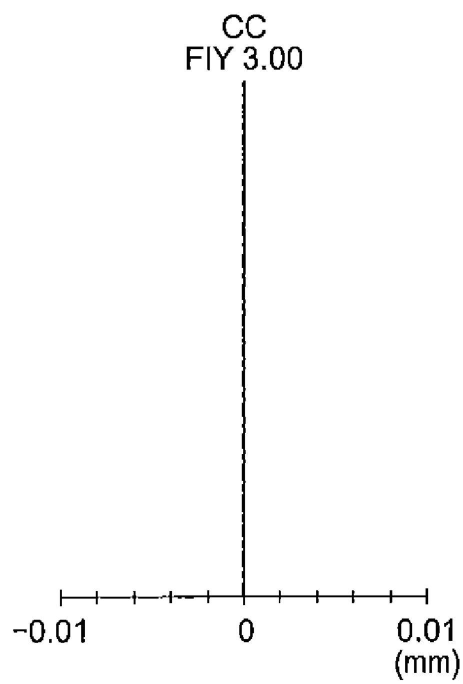

Next, an optical system according to an example 3 will be described below. FIG. 5 is a cross-sectional view along an optical axis showing an optical arrangement of the optical system according to the example 3. Moreover, FIG. 6A, FIG. 6B, FIG. 6C, and FIG. 6D are aberration diagrams of the optical system according to the example 3.

The optical system according to the example 3, as shown in FIG. 5, includes in order from an object side, a lens unit Gf having a positive refractive power, an aperture stop S, and a lens unit Gr having a positive refractive power. The optical system according to the example 3 is suitable for an image pickup element for which, a pixel pitch is in a range of 0.6 μm to 1.2 μm.

The lens unit Gf includes a biconvex positive lens L1, a positive meniscus lens L2 having a convex surface directed toward an image side, a negative meniscus lens L3 having a convex surface directed toward the object side, a negative meniscus lens L4 having a convex surface directed toward the image side, a biconcave negative lens L5, and a positive meniscus lens L6 having a convex surface directed toward the object side.

The lens unit Gr includes a positive meniscus lens L7 having a convex surface directed toward the image side, a biconcave negative lens L8, a negative meniscus lens L9 having a convex surface directed toward the object side, a negative meniscus lens L10 having a convex surface directed toward the image side, a positive meniscus lens L11 having a convex surface directed toward the object side, and a biconvex positive lens L12.

The aperture stop S is disposed between the lens L6 and the lens L7.

An aspheric surface is provided to both surfaces of all the lenses from the lens L1 to the lens L12.

The optical system according to the example 3 includes six pairs of lenses which satisfy conditional expressions (1), (2), and (3). The pairs of lenses are the lens L1 and the lens L12, the lens L2 and the lens L11, the lens L3 and the lens L10, the lens L4 and the lens L9, the lens L5 and the lens L8, and the lens L6 and the lens L7. Moreover, in the pairs of lenses, a shape of one lens in the pair and a shape of the other lens in the pair are same.

Figure 7:
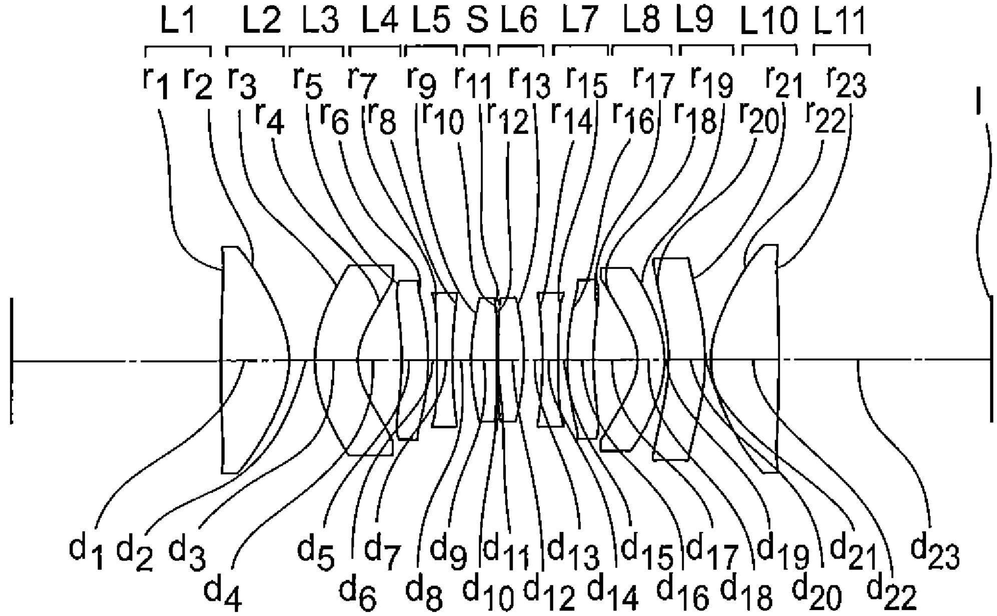
FIG. 7 is a cross-sectional view along an optical axis showing an optical arrangement of an optical system according to an example 4.
Figure 8A:
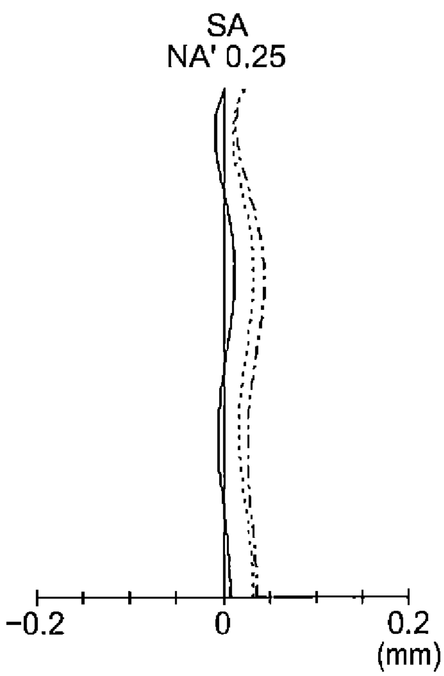
FIG. 8A, FIG. 8B, FIG. 8C, and FIG. 8D are diagrams showing a spherical aberration (SA), an astigmatism (AS), a distortion (DT), and a chromatic aberration of magnification (CC) respectively, of the optical system according to the example 4.
Figure 8B:
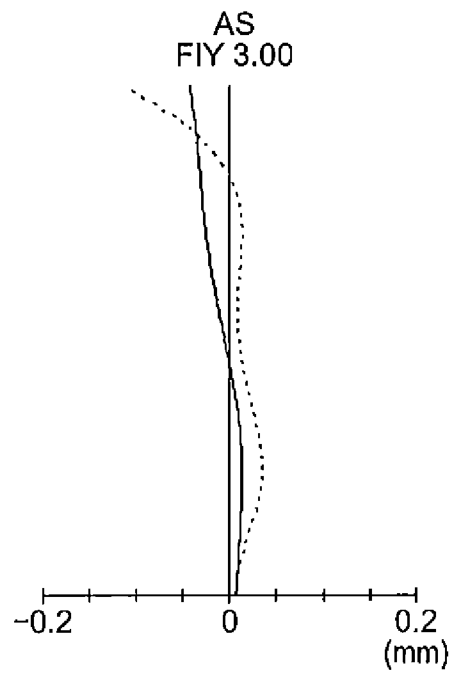
Figure 8C:
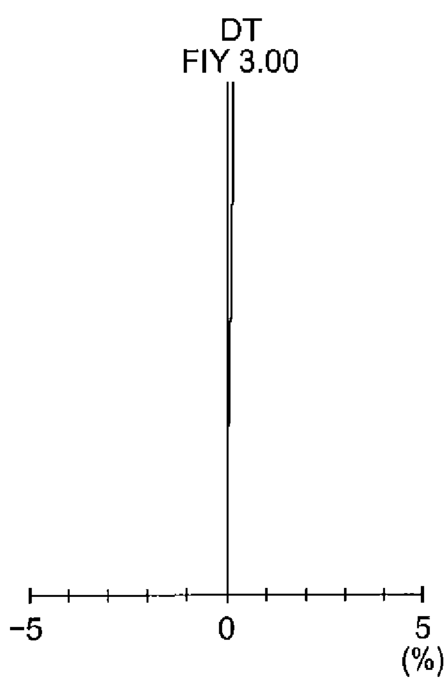
Figure 8D:
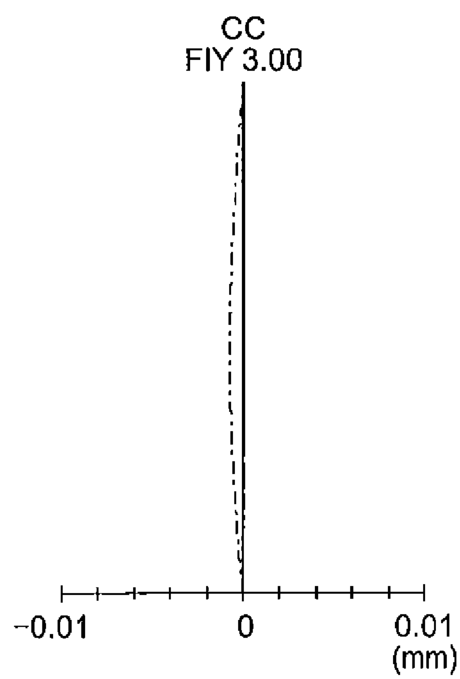

Next, an optical system according to an example 4 of the present invention will be described below. FIG. 7 is a cross-sectional view along an optical axis showing an optical arrangement of the optical system according to the example 4. Moreover, FIG. 8A, FIG. 8B, FIG. 8C, and FIG. 8D are aberration diagrams of the optical system according to the example 4.

The optical system according to the example 4, as shown in FIG. 7, includes in order from an object side, a lens unit Gf having a positive refractive power, an aperture stop S, and a lens unit Gr having a positive refractive power. The optical system according to the example 4 is suitable for an image pickup element for which, a pixel pitch is in a range of 0.6 μm to 1.2 μm.

The lens unit Gf includes a biconvex positive lens L1, a negative meniscus lens L2 having a convex surface directed toward the object side, a positive meniscus lens L3 having a convex surface directed toward an image side, a negative meniscus lens L4 having a convex surface directed toward the object side, and a biconvex positive lens L5.

The lens unit Gr includes a biconvex positive lens L6, a negative meniscus lens L7 having a convex surface directed toward the image side, a positive meniscus lens L8 having a convex surface directed toward the object side, a negative meniscus lens L9 having a convex surface directed toward the image side, a negative meniscus lens L10 having a convex surface directed toward the image side, and a biconvex positive lens L11.

The aperture stop S is disposed between the lens L5 and the lens L6.

An aspheric surface is provided to both surfaces of all the lenses from the lens L1 to the lens L11.

The optical system according to the example 4 includes four pairs of lenses which satisfy conditional expressions (1), (2), and (3). The pairs of lenses are the lens L1 and the lens L11, the lens L3 and the lens L8, the lens L4 and the lens L7, and the lens L5 and the lens L6. Moreover, in the pairs of lenses, a shape of one lens in the pair and a shape of the other lens in the pair are same.

Figure 9:
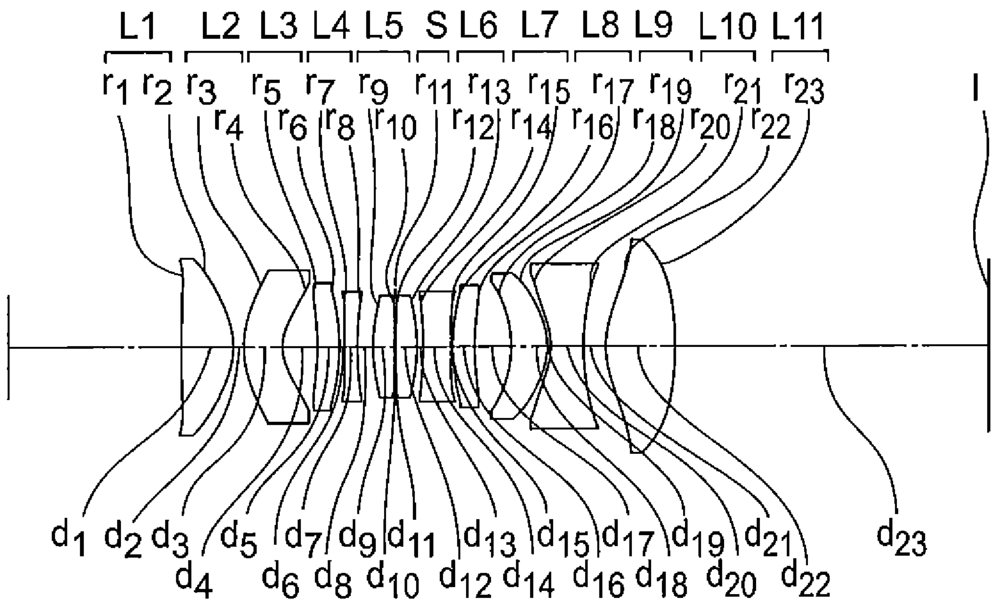
FIG. 9 is a cross-sectional view along an optical axis showing an optical arrangement of an optical system according to an example 5.
Figure 10A:
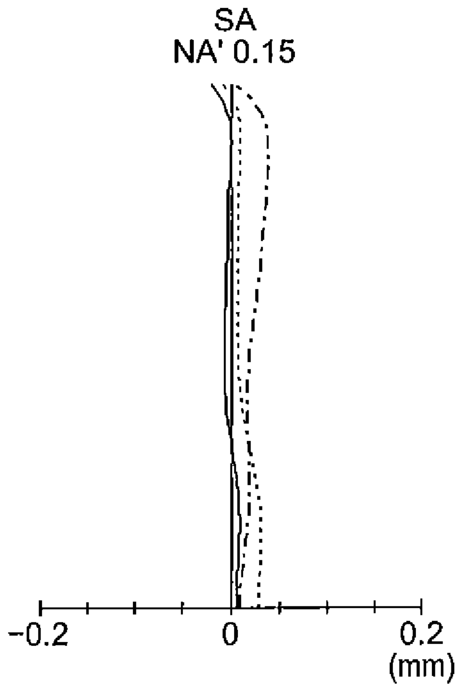
FIG. 10A, FIG. 10B, FIG. 10C, and FIG. 10D are diagrams showing a spherical aberration (SA), an astigmatism (AS), a distortion (DT), and a chromatic aberration of magnification (CC) respectively, of the optical system according to the example 5.
Figure 10B:
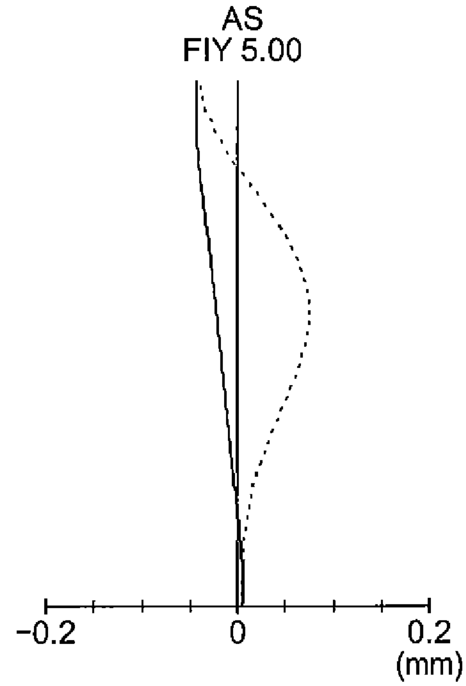
Figure 10C:
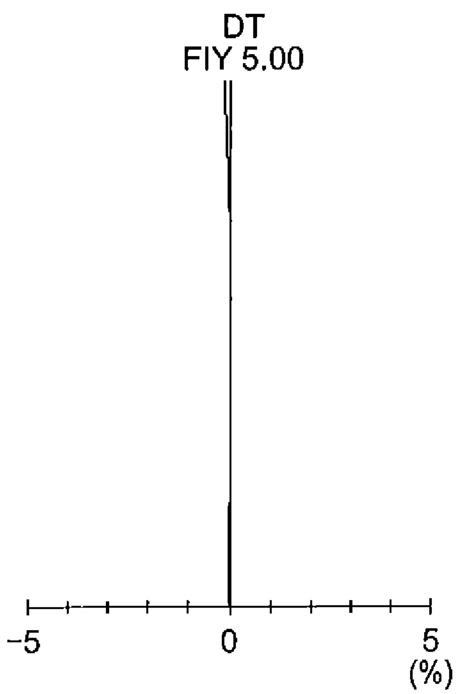
Figure 10D:
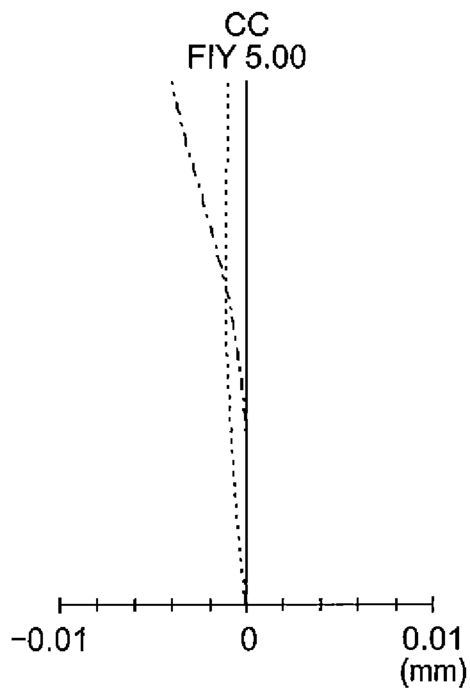

Next, an optical system according to an example 5 will be described below. FIG. 9 is a cross-sectional view along an optical axis showing an optical arrangement of the optical system according to the example 5. Moreover, FIG. 10A, FIG. 10B, FIG. 10C, and FIG. 10D are aberration diagrams of the optical system according to the example 5.

The optical system according to the example 5, as shown in FIG. 9, includes in order from an object side, a lens unit Gf having a positive refractive power, an aperture stop S, and a lens unit Gr having a positive refractive power. The optical system according to the example 5 is suitable for an image pickup element for which, a pixel pitch is in a range of 1.0 μm to 1.6 μm.

The lens unit Gf includes a biconvex positive lens L1, a negative meniscus lens L2 having a convex surface directed toward the object side, a positive meniscus lens L3 having a convex surface directed toward an image side, a negative meniscus lens L4 having a convex surface directed toward the object side, and a biconvex positive lens L5.

The lens unit Gr includes a biconvex positive lens L6, a negative meniscus lens L7 having a convex surface directed toward the image side, a positive meniscus lens L8 having a convex surface directed toward the object side, a positive meniscus lens L9 having a convex surface directed toward the image side, a biconcave negative lens L10, and a biconvex positive lens L11.

The aperture stop S is disposed between the lens L5 and the lens L6.

An aspheric surface is provided to both surfaces of all the lenses from the lens L1 to the lens L11.

The optical system according to the example 5 includes two pairs of lenses which satisfy conditional expressions (1), (2), and (3). The pairs of lenses are the lens L3 and the lens L8, and the lens L5 and the lens L6. Moreover, in the pairs of lenses, a shape of one lens in the pair and a shape of the other lens in the pair are same.

Figure 11:
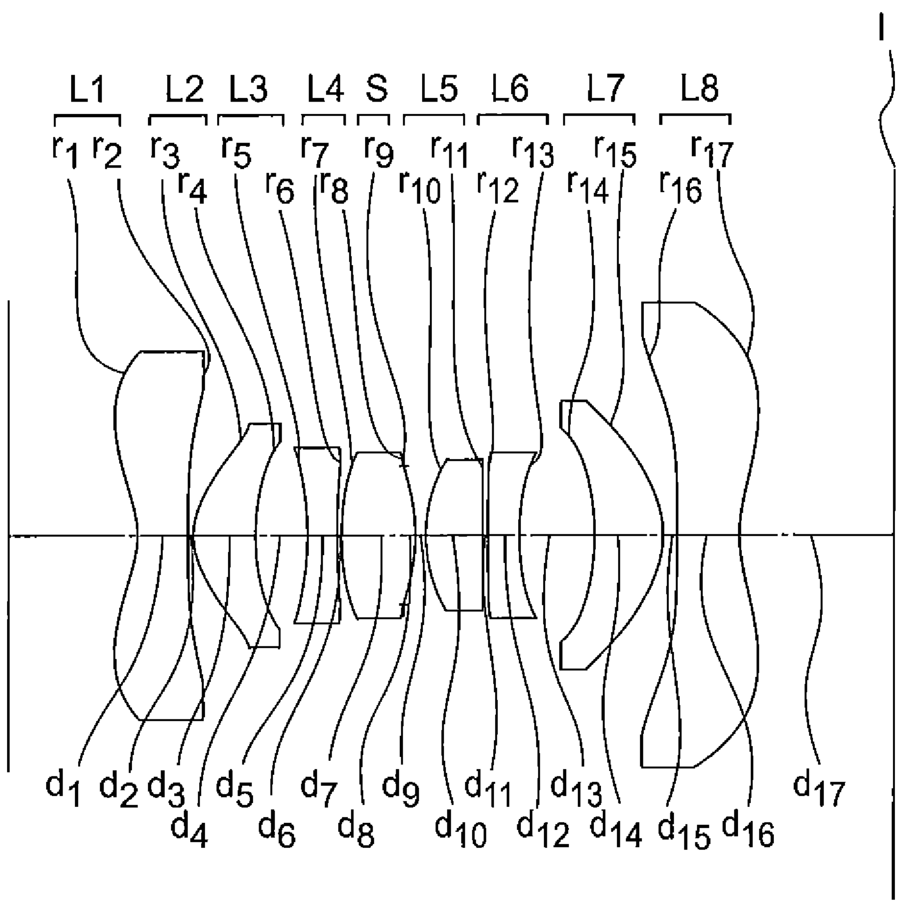
FIG. 11 is a cross-sectional view along an optical axis showing an optical arrangement of an optical system according to an example 6.
Figure 12A:
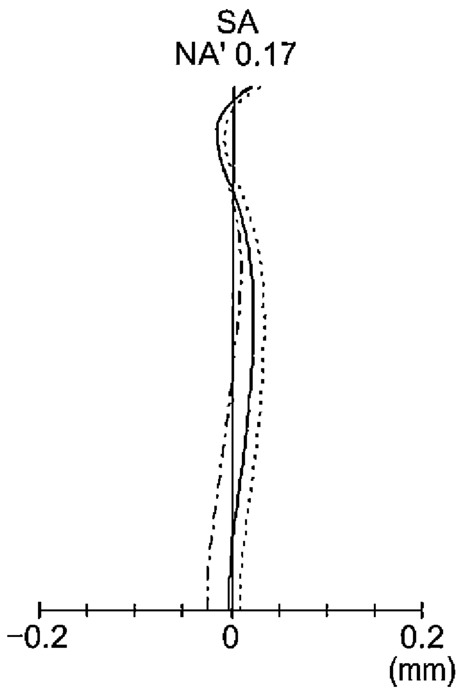
FIG. 12A, FIG. 12B, FIG. 12C, and FIG. 12D are diagrams showing a spherical aberration (SA), an astigmatism (AS), a distortion (DT), and a chromatic aberration of magnification (CC) respectively, of the optical system according to the example 6.
Figure 12B:
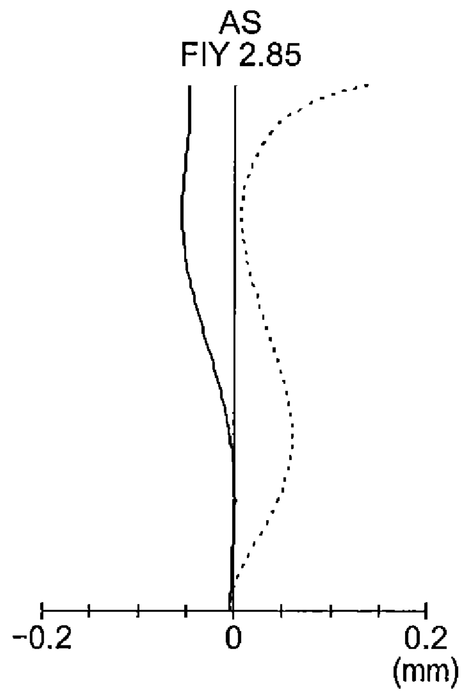
Figure 12C:
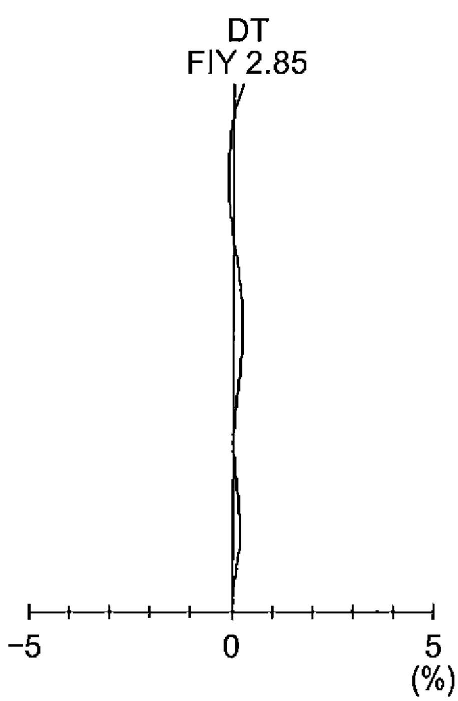
Figure 12D:
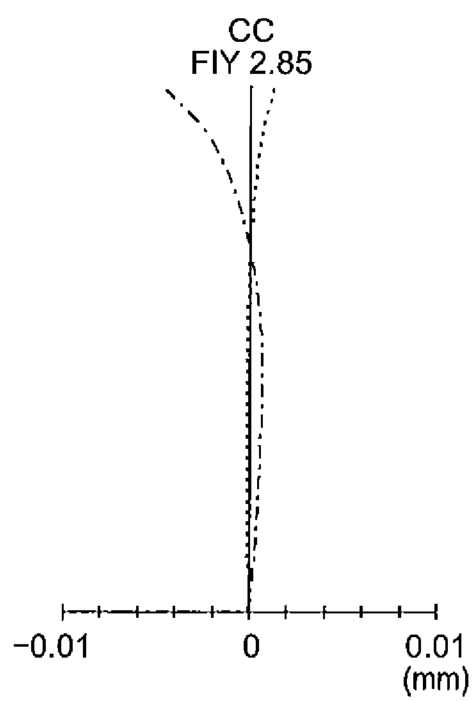

Next, an optical system according to an example 6 will be described below. FIG. 11 is a cross-sectional view along an optical axis showing an optical arrangement of the optical system according to the example 6. Moreover, FIG. 12A, FIG. 12B, FIG. 12C, and FIG. 12D are aberration diagrams of the optical system according to the example 6.

The optical system according to the example 6, as shown in FIG. 11, includes in order from an object side, a lens unit Gf having a positive refractive power, an aperture stop S, and a lens unit Gr having a positive refractive power. The optical system according to the example 6 is suitable for an image pickup element for which, a pixel pitch is in a range of 0.9 μm to 1.5 μm.

The lens unit Gf includes a negative meniscus lens L1 having a convex surface directed toward an image side, a positive meniscus lens L2 having a convex surface directed toward the object side, a biconcave negative lens L3, and a biconvex positive lens L4.

The lens unit Gr includes a biconvex positive lens L5, a biconcave negative lens L6, a positive meniscus lens L7 having a convex surface directed toward the image side, and a biconcave negative lens L8.

The aperture stop S is positioned on the image side of the biconvex positive lens L4, and on the object side of a vertex of the image-side surface of the biconvex positive lens L4.

An aspheric surface is provided to both surfaces of all the lenses from the lens L1 to the lens L8.

The optical system according to the example 6 does not include a pair of lenses which satisfies conditional expressions (1), (2), and (3).

Figure 13:
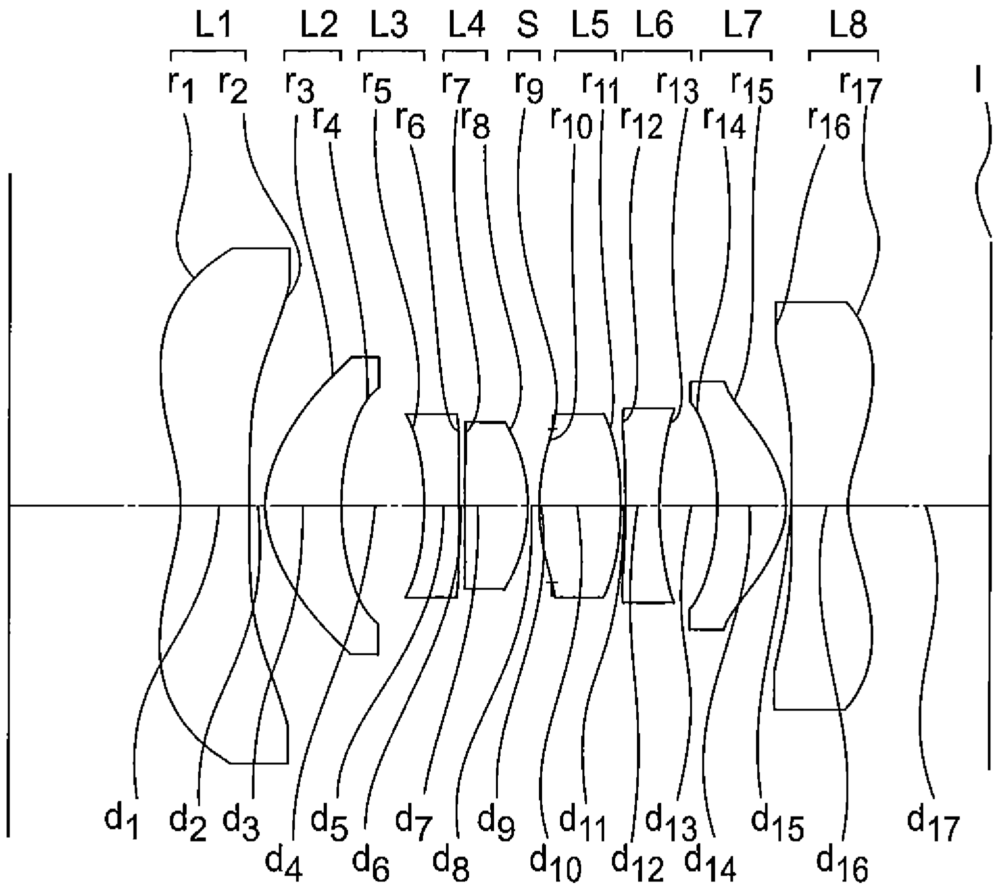
FIG. 13 is a cross-sectional view along an optical axis showing an optical arrangement of an optical system according to an example 7.
Figure 14A:
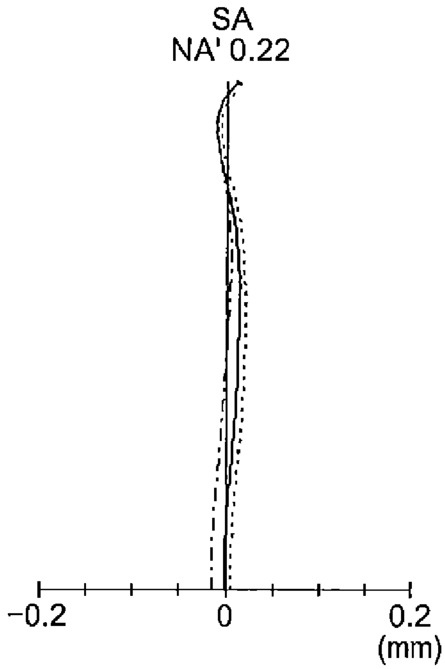
FIG. 14A, FIG. 14B, FIG. 14C, and FIG. 14D are diagrams showing a spherical aberration (SA), an astigmatism (AS), a distortion (DT), and a chromatic aberration of magnification (CC) respectively, of the optical system according to the example 7.
Figure 14B:
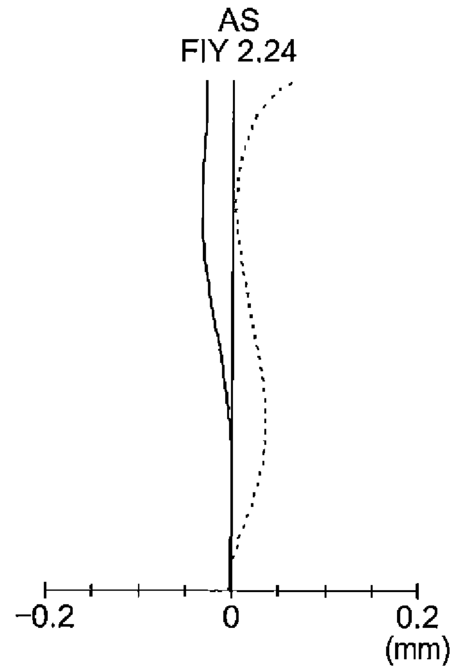
Figure 14C:
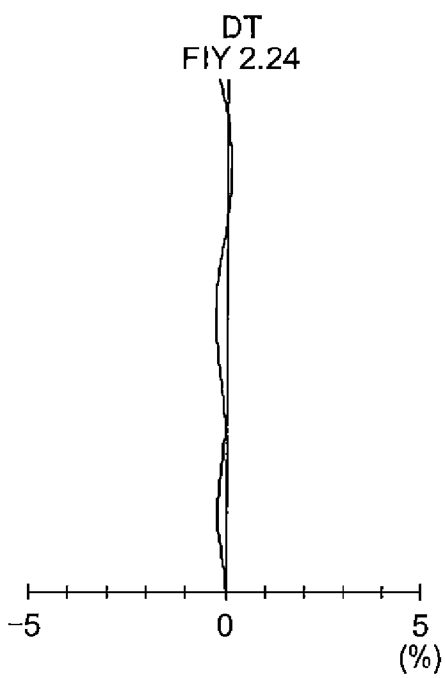
Figure 14D:
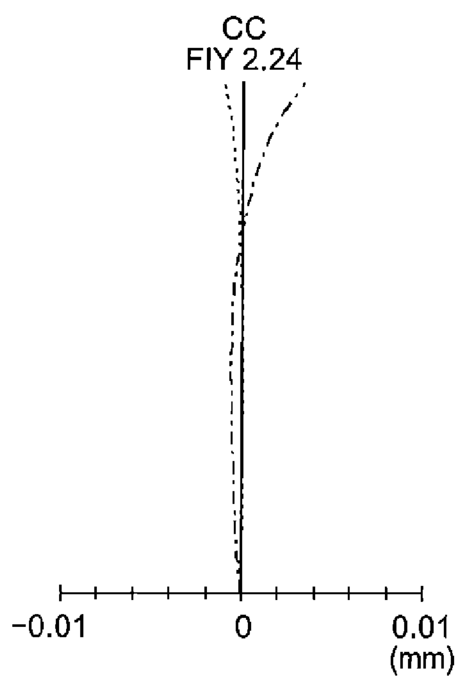

Next, an optical system according to an example 7 will be described below. FIG. 13 is a cross-sectional view along an optical axis showing an optical arrangement of the optical system according to the example 7. Moreover, FIG. 14A, FIG. 14B, FIG. 14C, and FIG. 14D are aberration diagrams of the optical system according to the example 7.

The optical system according to the example 7, as shown in FIG. 13, includes in order from an object side, a lens unit Gf having a positive refractive power, an aperture stop S, and a lens unit Gr having a positive refractive power. The optical system according to the example 7 is suitable for an image pickup element for which, a pixel pitch is in a range of 0.7 μm to 1.3 μm.

The lens unit Gf includes a biconcave negative lens L1, a positive meniscus lens L2 having a convex surface directed toward the object side, a biconcave negative lens L3, and a biconvex positive lens L4.

The lens unit Gr includes a biconvex positive lens L5, a biconcave negative lens L6, a positive meniscus lens L7 having a convex surface directed toward an image side, and a negative meniscus lens L8 having a convex surface directed toward the object side.

The aperture stop S is positioned on the object side of the biconvex positive lens L5, and on the object side of a vertex of the object-side surface of the biconvex positive lens L5.

An aspheric surface is provided to both surfaces of all the lenses from the lens L1 to the lens L8.

The optical system according to the example 7 does not include a pair of lenses which satisfies conditional expressions (1), (2), and (3).

In some of the following examples, a diffractive optical element is used. The diffractive optical element used here is an optical element as described in Japanese Patent Publication No. 3717555 in which, at least two layers of mutually different optical materials are laminated and a relief pattern is formed at an interface thereof, and a diffraction efficiency is made higher in a wide wavelength region. However, the diffractive optical element to be used in the optical element of the examples is not restricted to such diffractive optical element, and may be a diffractive optical element described in Japanese Patent Application Laid-open Publication No. 2003-215457 and Japanese Patent Application Laid-open publication No. Hei 11-133305.

Figure 15A:
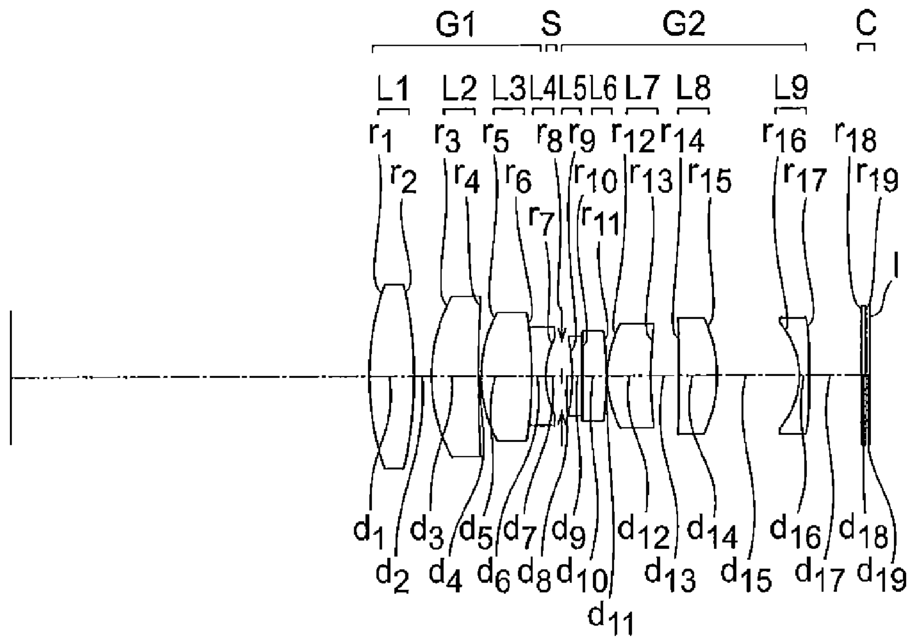
FIG. 15A is a cross-sectional view along an optical axis showing an optical arrangement.
Figures 15B, 15C, 15D, 15E:
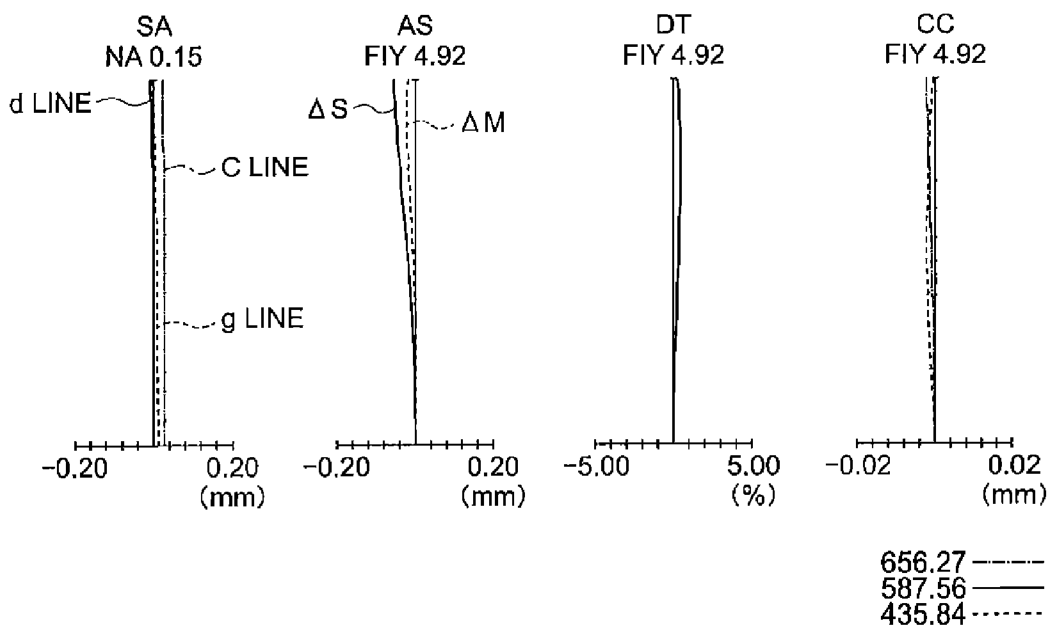
FIG. 15B, FIG. 15C, FIG. 15D, and FIG. 15E are diagrams showing a spherical aberration (SA), an astigmatism (AS), a distortion (DT), and a chromatic aberration of magnification (CC) respectively, of the optical system according to an example 8.

Next, an optical system according to an example 8 will be described below. FIG. 15A is a cross-sectional view along an optical axis showing an optical arrangement of the optical system according to the example 8. Moreover, FIG. 15B, FIG. 15C, FIG. 15D, and FIG. 15E are aberration diagrams of the optical system according to the example 8.

In the aberration diagrams shown in FIG. 15B, FIG. 15C, FIG. 15D, and FIG. 15E, 'FIY' denotes the maximum image height. Symbols in the aberration diagrams are same even in examples that will be described later. Moreover, in aberration diagrams of examples from the example 8 to an example 96, four aberration diagrams in order from left show a spherical aberration (SA), an astigmatism (AS), a distortion (DT), and a chromatic aberration of magnification (CC).

The optical system according to the example 8, as shown in FIG. 15A, includes in order from an object side, a first lens unit G1 having a positive refractive power, an aperture stop S, and a second lens unit G2 having a positive refractive power. In the examples from the example 8 to the example 96, in lens cross-sectional views, S denotes a stop, C denotes a cover glass, and I denotes an image pickup surface of an image pickup element.

The first lens unit G1 includes a biconvex positive lens L1, a positive meniscus lens L2 having a convex surface directed toward the object side, a biconvex positive lens L3, and a biconcave negative lens L4. The biconvex positive lens L3 and the biconcave negative lens L4 are cemented.

The second lens unit G2 includes a negative meniscus lens L5 having a convex surface directed toward an image side, a positive meniscus lens L6 having a convex surface directed toward the image side, a positive meniscus lens L7 having a convex surface directed toward the object side, a biconvex positive lens L8, and a biconcave negative lens L9. The negative meniscus lens L5 and the positive meniscus lens L6 are cemented. A predetermined lens unit includes the biconcave negative lens L9.

The aperture stop S is disposed between the biconcave negative lens L4 and the negative meniscus lens L5.

An aspheric surface is provided to seven surfaces namely, a surface on the image side of the positive meniscus lens L2, both surfaces of the positive meniscus lens L7, both surfaces of the biconvex positive lens L8, and both surfaces of the biconcave negative lens L9.

Figure 16A:
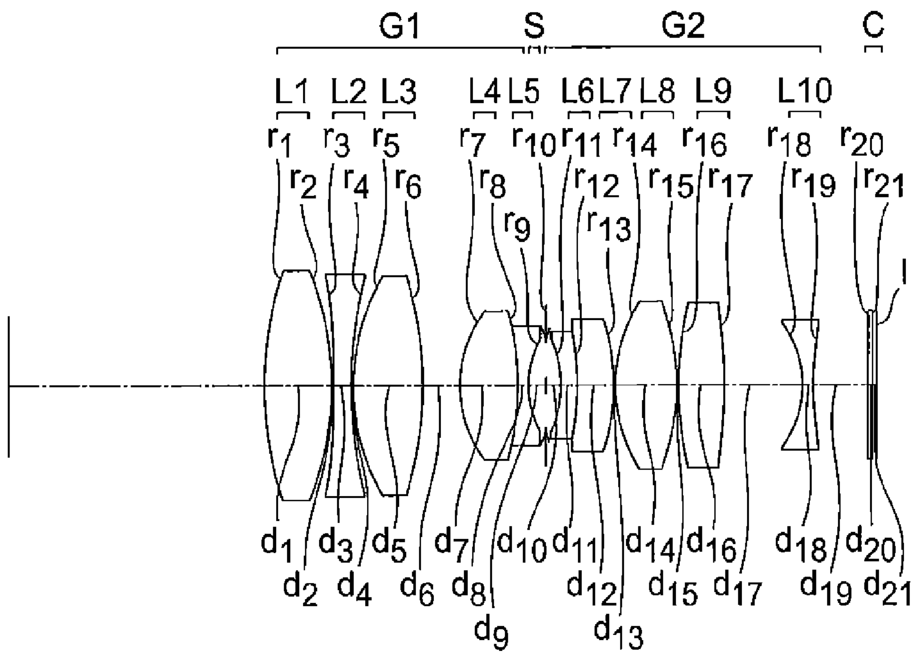
FIG. 16A is a cross-sectional view along an optical axis showing an optical arrangement.
Figures 16B, 16C, 16D, 16E:
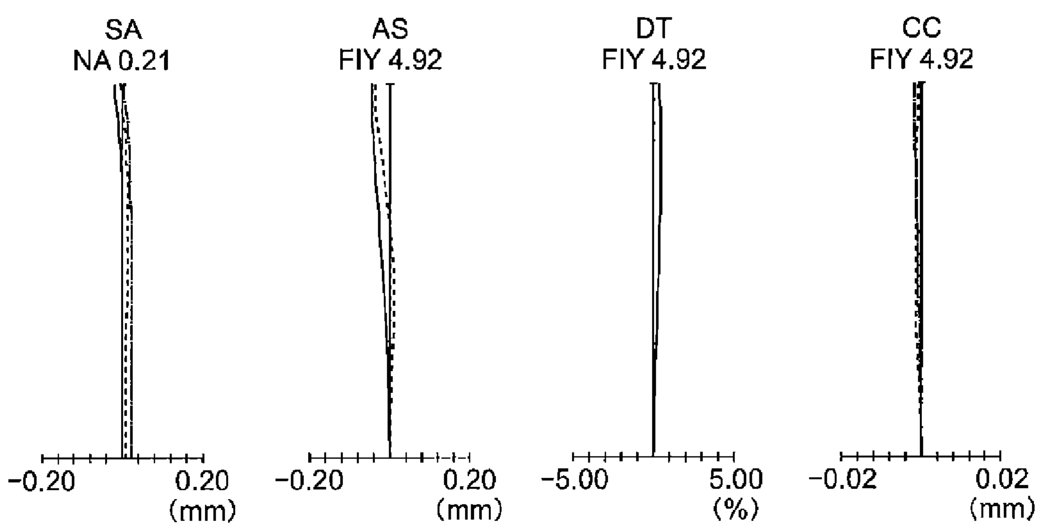
FIG. 16B, FIG. 16C, FIG. 16D, and FIG. 16E are diagrams showing a spherical aberration (SA), an astigmatism (AS), a distortion (DT), and a chromatic aberration of magnification (CC) respectively, of the optical system according to an example 9.

Next, an optical system according to an example 9 will be described below. FIG. 16A is a cross-sectional view along an optical axis showing an optical arrangement of the optical system according to the example 9. Moreover, FIG. 16B, FIG. 16C, FIG. 16D, and FIG. 16E are aberration diagrams of the optical system according to the example 9.

The optical system according to the example 9, as shown in FIG. 16A, includes in order from an object side, a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, and a biconcave negative lens L5. The biconvex positive lens L4 and the biconcave negative lens L5 are cemented.

The second lens unit G2 includes a negative meniscus lens L6 having a convex surface directed toward an image side, a positive meniscus lens L7 having a convex surface directed toward the image side, a biconvex positive lens L8, a biconvex positive lens L9, and a biconcave negative lens L10. The negative meniscus lens L6 and the positive meniscus lens L7 are cemented. A predetermined lens unit includes the biconcave negative lens L10.

The aperture stop S is disposed between the biconcave negative lens L5 and the negative meniscus lens L6.

An aspheric surface is provided to nine surfaces namely, both surfaces of the biconcave negative lens L2, a surface on the image side of the biconvex positive lens L3, both surfaces of the biconvex positive lens L8, both surfaces of the biconvex positive lens L9, and both surfaces of the biconcave negative lens L10.

Figure 17A:
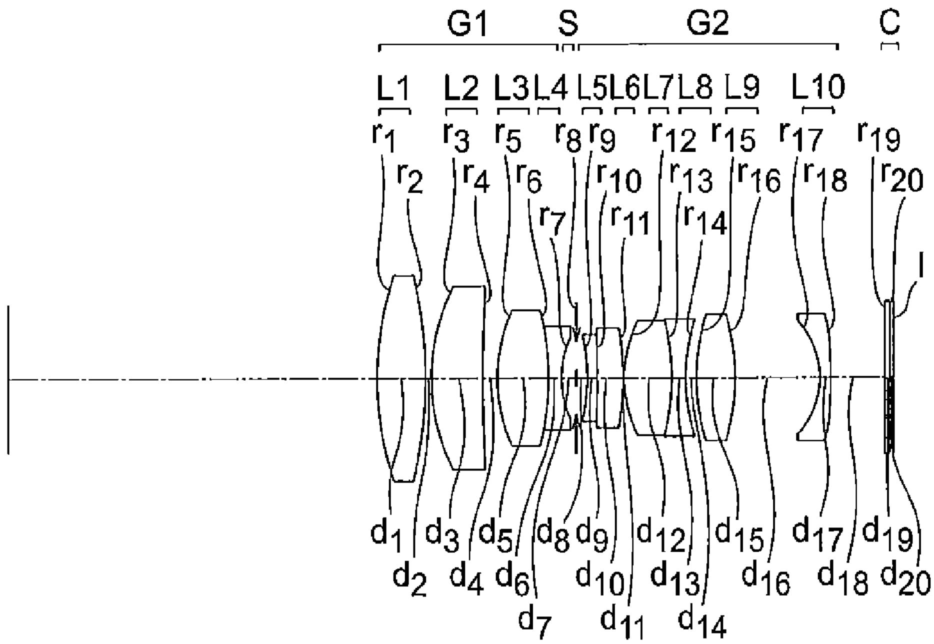
FIG. 17A is a cross-sectional view along an optical axis showing an optical arrangement.
Figures 17B, 17C, 17D, 17E:
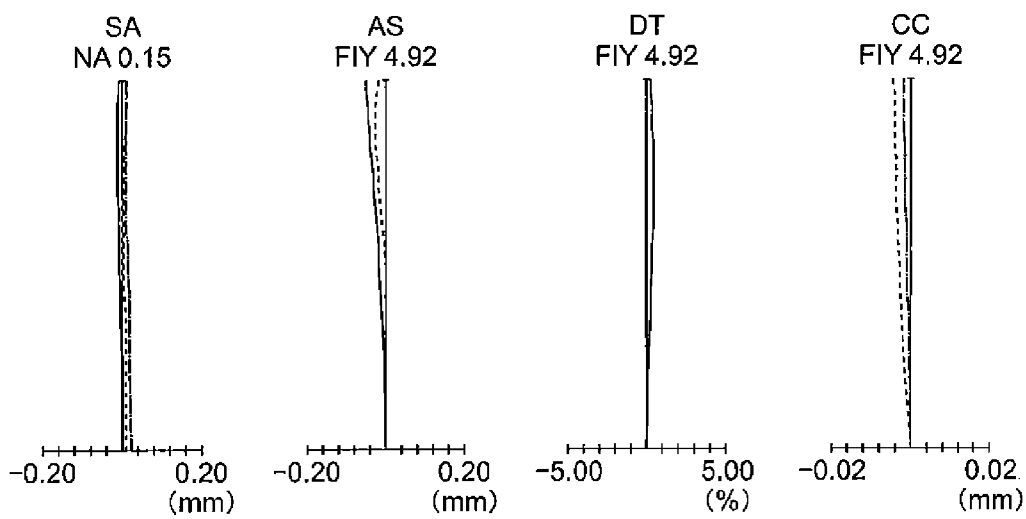
FIG. 17B, FIG. 17C, FIG. 17D, and FIG. 17E are diagrams showing a spherical aberration (SA), an astigmatism (AS), a distortion (DT), and a chromatic aberration of magnification (CC) respectively, of the optical system according to an example 10.

Next, an optical system according to an example 10 will be described below. FIG. 17A is a cross-sectional view along an optical axis showing an optical arrangement of the optical system according to the example 10. Moreover, FIG. 17B, FIG. 17C, FIG. 17D, and FIG. 17E are aberration diagrams of the optical system according to the example 10.

The optical system according to the example 10, as shown in FIG. 17A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward the object side, a biconvex positive lens L3, and a biconcave negative lens L4. The biconvex positive lens L3 and the biconcave negative lens L4 are cemented.

The second lens unit G2 includes a negative meniscus lens L5 having a convex surface directed toward an image side, a positive meniscus lens L6 having a convex surface directed toward the image side, a biconvex positive lens L7, a biconcave negative lens L8, a biconvex positive lens L9, and a negative meniscus lens L10 having a convex surface directed toward the image side. The negative meniscus lens L5 and the positive meniscus lens L6 are cemented. Moreover the biconvex positive lens L7 and the biconcave negative lens L8 are cemented. A predetermined lens unit includes the negative meniscus lens L10.

The aperture stop S is disposed between the biconcave negative lens L4 and the negative meniscus lens L5.

An aspheric surface is provided to five surfaces namely, a surface on the image side of the positive meniscus lens L2, both surfaces of the biconvex positive lens L9, and both surfaces of the negative meniscus lens L10.

Figure 18A:
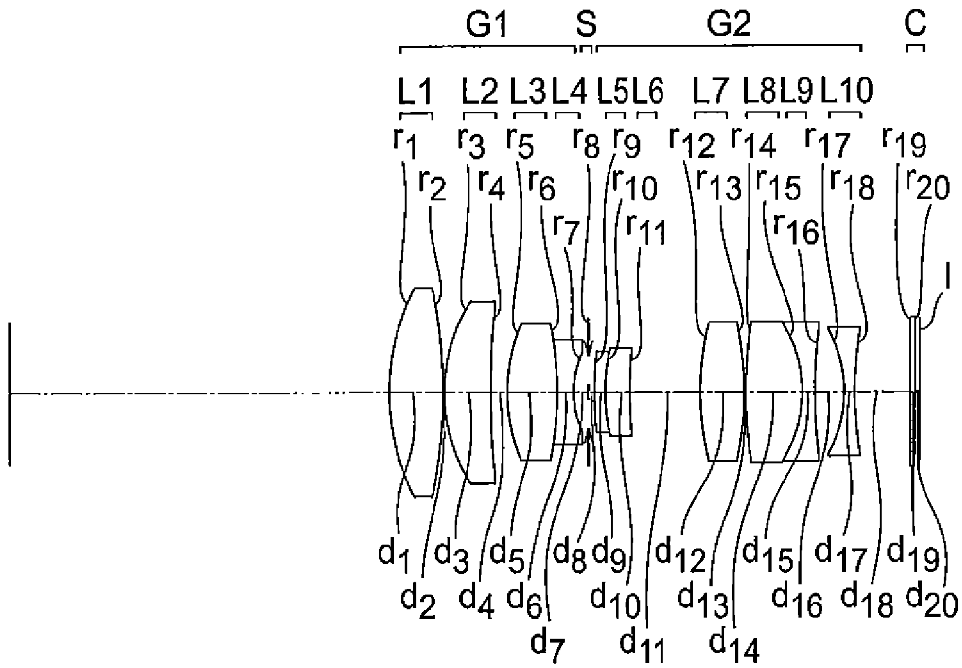
FIG. 18A is a cross-sectional view along an optical axis showing an optical arrangement.
Figures 18B, 18C, 18D, 18E:
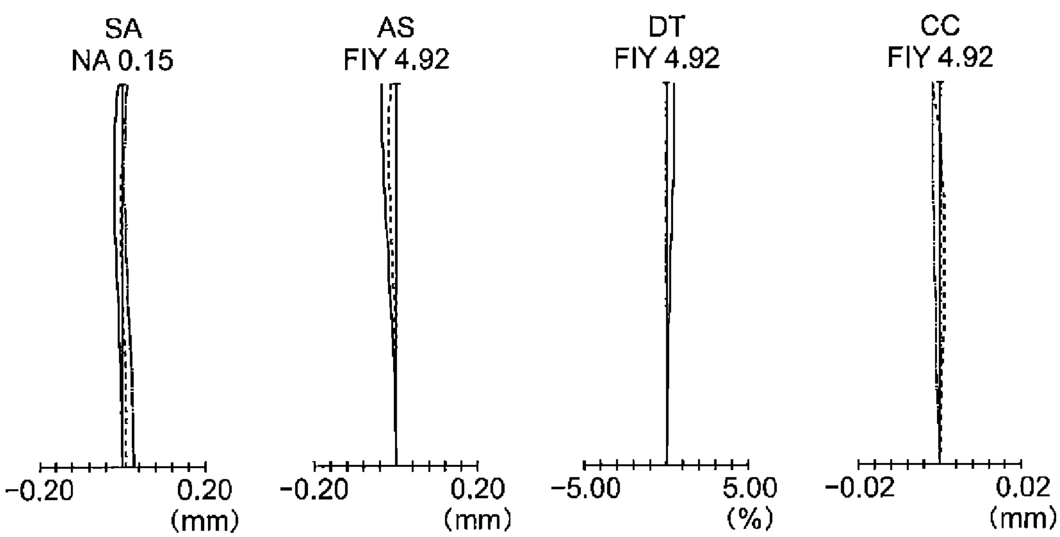
FIG. 18B, FIG. 18C, FIG. 18D, and FIG. 18E are diagrams showing a spherical aberration (SA), an astigmatism (AS), a distortion (DT), and a chromatic aberration of magnification (CC) respectively, of the optical system according to an example 11.

Next, an optical system according to an example 11 will be described below. FIG. 18A is a cross-sectional view along an optical axis showing an optical arrangement of the optical system according to the example 11. Moreover, FIG. 18B, FIG. 18C, FIG. 18D, and FIG. 18E are aberration diagrams of the optical system according to the example 11.

The optical system according to the example 11, as shown in FIG. 18A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward the object side, a biconvex positive lens L3, and a biconcave negative lens L4. The biconvex positive lens L3 and the biconcave negative lens L4 are cemented.

The second lens unit G2 includes a negative meniscus lens L5 having a convex surface directed toward the object side, a positive meniscus lens L6 having a convex surface directed toward the object side, a biconvex positive lens L7, a biconvex positive lens L8, a biconcave negative lens L9, and a biconcave negative lens L10. The negative meniscus lens L5 and the positive meniscus lens L6 are cemented. Moreover, the biconvex positive lens L8 and the biconcave negative lens L9 are cemented. A predetermined lens unit includes the biconcave negative lens L10.

The aperture stop S is disposed between the biconcave negative lens L4 and the negative meniscus lens L5.

An aspheric surface is provided to five surfaces namely, a surface on an image side of the positive meniscus lens L2, both surfaces of the biconvex positive lens L7, and both surfaces of the biconcave negative lens L10.

Figure 19A:
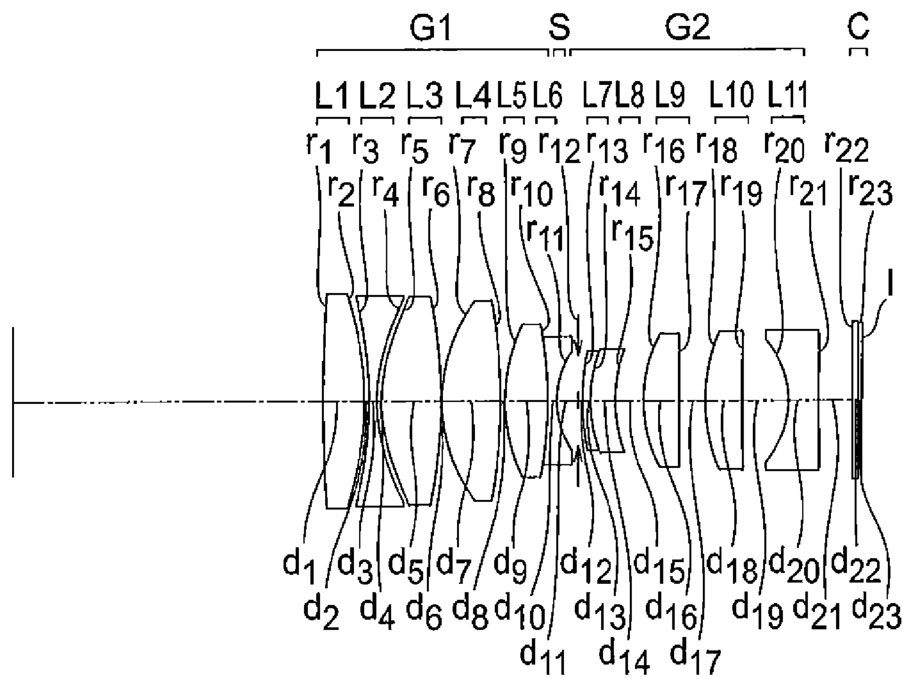
FIG. 19A is a cross-sectional view along an optical axis showing an optical arrangement.
Figures 19B, 19C, 19D, 19E:
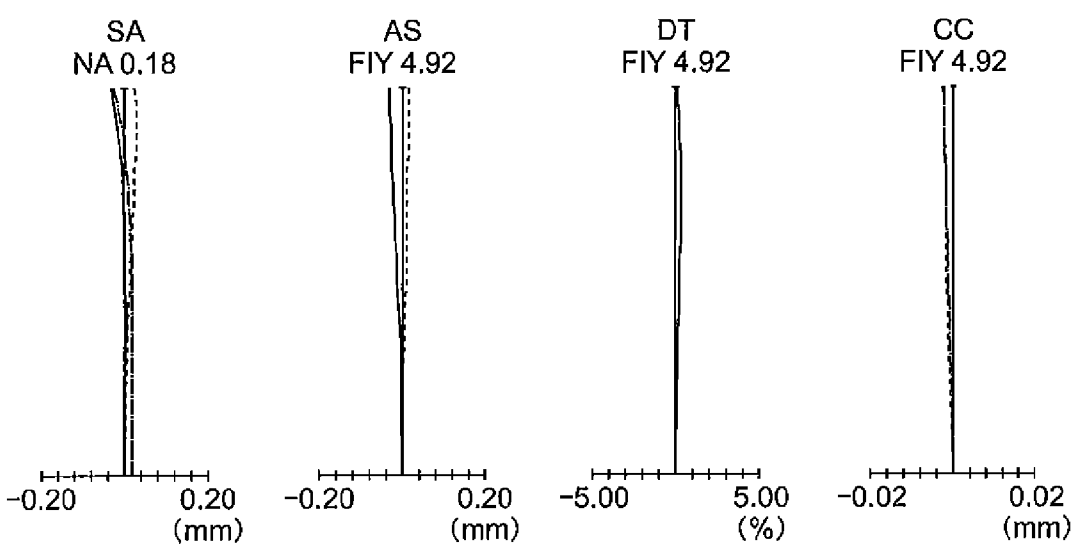
FIG. 19B, FIG. 19C, FIG. 19D, and FIG. 19E are diagrams showing a spherical aberration (SA), an astigmatism (AS), a distortion (DT), and a chromatic aberration of magnification (CC) respectively, of the optical system according to an example 12.

Next, an optical system according to an example 12 will be described below. FIG. 19A is a cross-sectional view along an optical axis showing an optical arrangement of the optical system according to the example 12. Moreover, FIG. 19B, FIG. 19C, FIG. 19D, and FIG. 19E are aberration diagrams of the optical system according to the example 12.

The optical system according to the example 12, as shown in FIG. 19A, includes in order from an object side, a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a positive meniscus lens L9 having a convex surface directed toward the object side, a positive meniscus lens L10 having a convex surface directed toward the object side, and a biconcave negative lens L11. The negative meniscus lens L7 and the positive meniscus lens L8 are cemented. A predetermined lens unit includes the biconcave negative lens L11.

The aperture stop S is disposed between the biconcave negative lens L6 and the negative meniscus lens L7.

An aspheric surface is provided to 10 surfaces namely, a surface on an image side of the biconvex positive lens L1, both surfaces of the biconcave negative lens L2, a surface on the object side of the biconvex positive lens L3, both surfaces of the positive meniscus lens L9, both surfaces of the positive meniscus lens L10, and both surfaces of the biconcave negative lens L11.

Figure 20A:
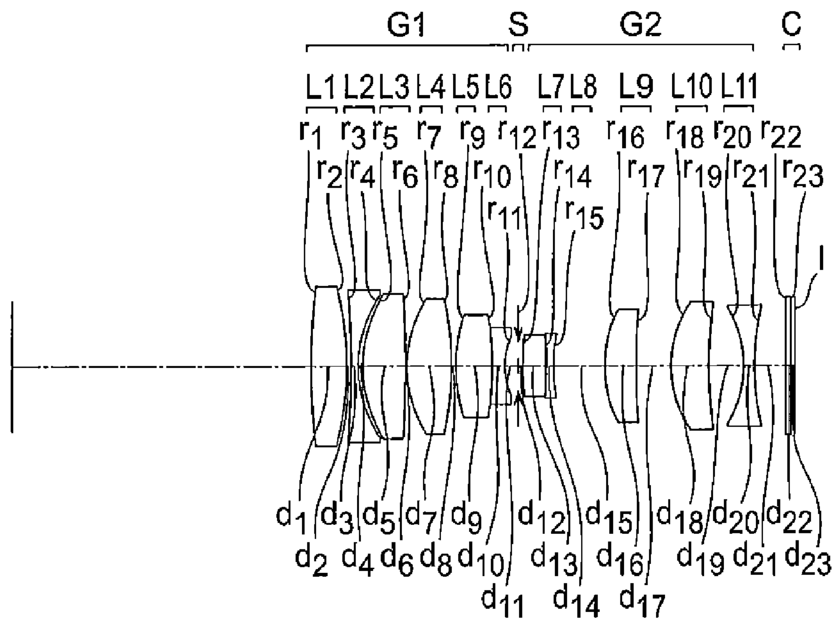
FIG. 20A is a cross-sectional view along an optical axis showing an optical arrangement.
Figures 20B, 20C, 20D, 20E:
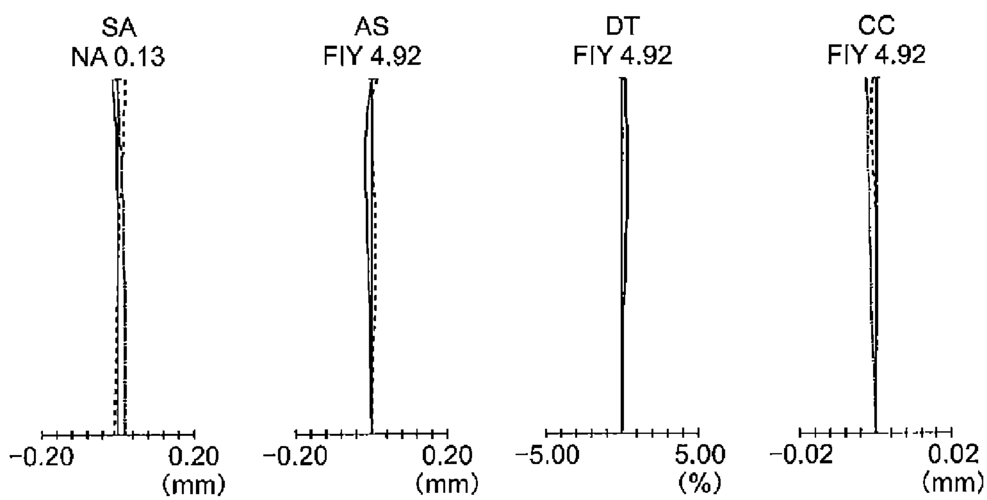
FIG. 20B, FIG. 20C, FIG. 20D, and FIG. 20E are diagrams showing a spherical aberration (SA), an astigmatism (AS), a distortion (DT), and a chromatic aberration of magnification (CC) respectively, of the optical system according to an example 13.

Next, an optical system according to an example 13 will be described below. FIG. 20A is a cross-sectional view along an optical axis showing an optical arrangement of the optical system according to the example 13. Moreover, FIG. 20B, FIG. 20C, FIG. 20D, and FIG. 20E are aberration diagrams of the optical system according to the example 13.

The optical system according to the example 13, as shown in FIG. 20A, includes in order from an object side, a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconvex positive lens L7, a biconcave negative lens L8, a positive meniscus lens L9 having a convex surface directed toward the object side, a positive meniscus lens L10 having a convex surface directed toward the object side, and a biconcave negative lens L11. A predetermined lens unit includes the biconcave negative lens L11.

The aperture stop S is disposed between the biconcave negative lens L6 and the biconvex positive lens L7.

An aspheric surface is provided to 10 surfaces namely, a surface on an image side of the biconvex positive lens L1, both surfaces of the biconcave negative lens L2, a surface on the object side of the biconvex positive lens L3, both surfaces of the positive meniscus lens L9, both surfaces of the positive meniscus lens L10, and both surfaces of the biconcave negative lens L11.

Figure 21A:
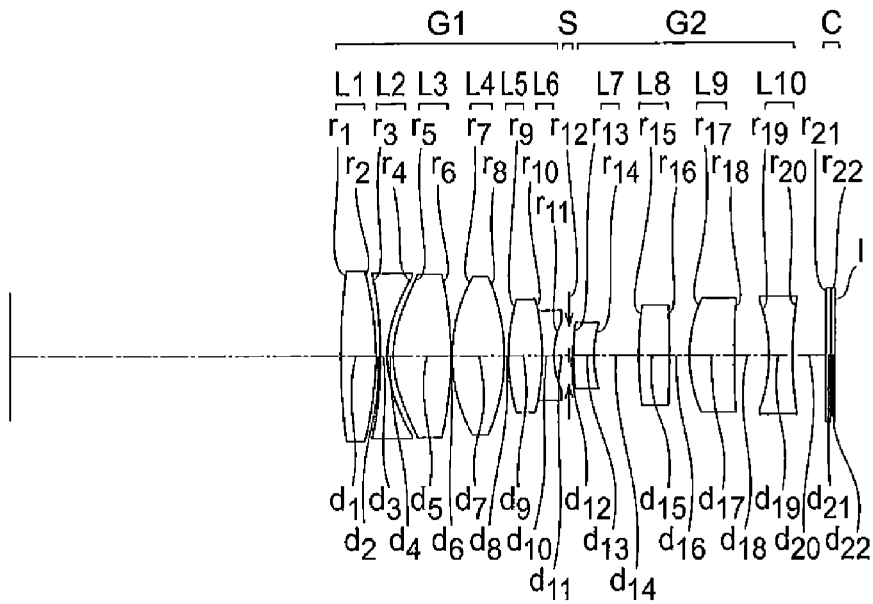
FIG. 21A is a cross-sectional view along an optical axis showing an optical arrangement.
Figures 21B, 21C, 21D, 21E:
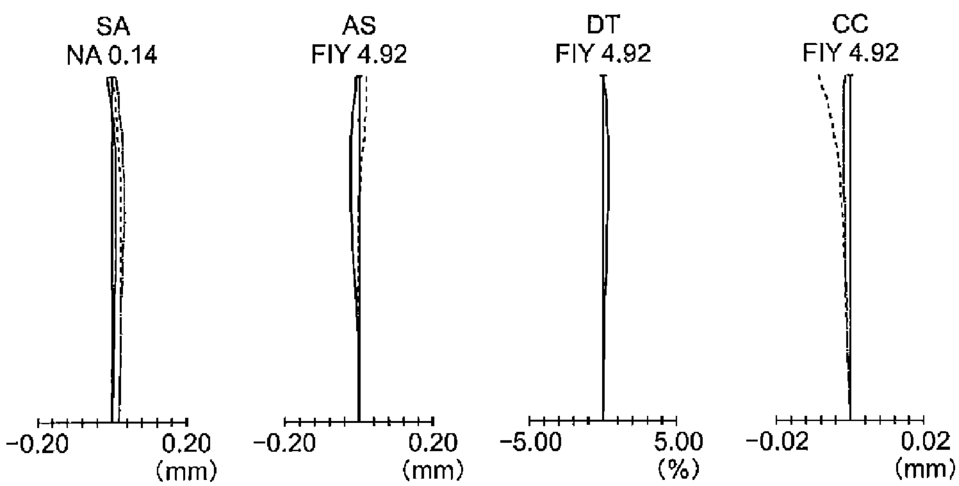
FIG. 21B, FIG. 21C, FIG. 21D, and FIG. 21E are diagrams showing a spherical aberration (SA), an astigmatism (AS), a distortion (DT), and a chromatic aberration of magnification (CC) respectively, of the optical system according to an example 14.

Next, an optical system according to an example 14 will be described below. FIG. 21A is a cross-sectional view along an optical axis showing an optical arrangement of the optical system according to the example 14. Moreover, FIG. 21B, FIG. 21C, FIG. 21D, and FIG. 21E are aberration diagrams of the optical system according to the example 14.

The optical system according to the example 14, as shown in FIG. 21A, includes in order from an object side, a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a biconvex positive lens L8, a positive meniscus lens L9 having a convex surface directed toward the object side, and a biconcave negative lens L10. A predetermined lens unit includes the biconcave negative lens L10.

The aperture stop S is disposed between the biconcave negative lens L6 and the negative meniscus lens L7.

An aspheric surface is provided to 10 surfaces namely, a surface on an image side of the biconvex positive lens L1, both surfaces of the biconcave negative lens L2, a surface on the object side of the biconvex positive lens L3, both surfaces of the biconvex positive lens L8, both surfaces of the positive meniscus lens L9, and both surfaces of the biconcave negative lens L10.

Figure 22A:
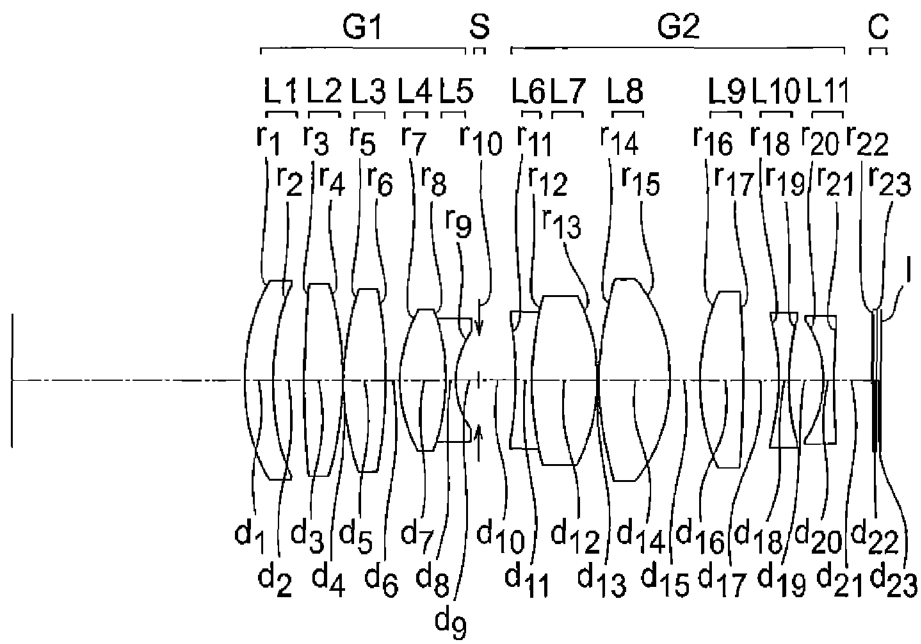
FIG. 22A is a cross-sectional view along an optical axis showing an optical arrangement.
Figures 22B, 22C, 22D, 22E:
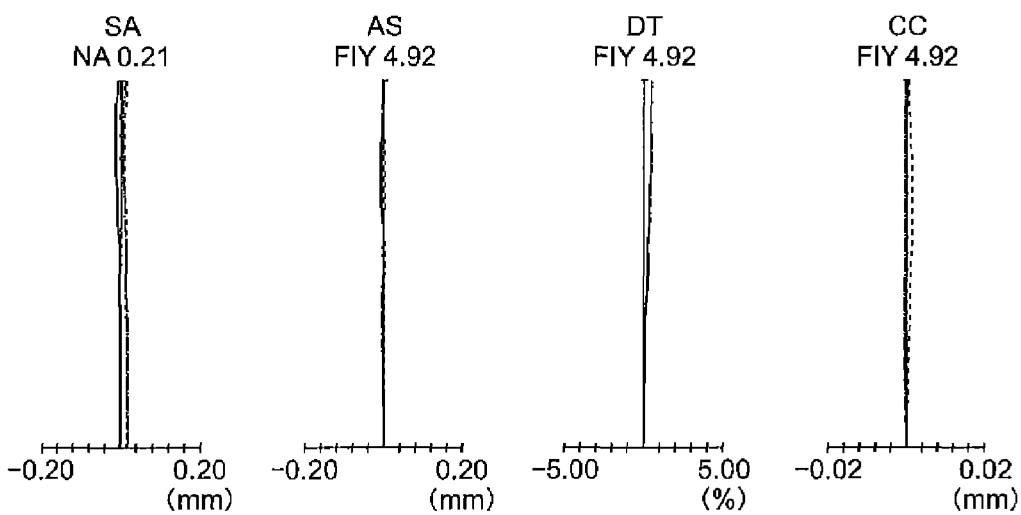
FIG. 22B, FIG. 22C, FIG. 22D, and FIG. 22E are diagrams showing a spherical aberration (SA), an astigmatism (AS), a distortion (DT), and a chromatic aberration of magnification (CC) respectively, of the optical system according to an example 15.

Next, an optical system according to an example 15 will be described below. FIG. 22A is a cross-sectional view along an optical axis showing an optical arrangement of the optical system according to the example 15. Moreover, FIG. 22B, FIG. 22C, FIG. 22D, and FIG. 22E are aberration diagrams of the optical system according to the example 15.

The optical system according to the example 15, as shown in FIG. 22A, includes in order from an object side, a first lens unit G1 having a positive refractive power, an aperture stop S, and a second lens unit G2 having a positive refractive power.

The first lens unit G1 includes a positive meniscus lens L1 having a convex surface directed toward the object side, a biconvex positive lens L2, a biconvex positive lens L3, a biconvex positive lens L4, and a biconcave negative lens L5. The biconvex positive lens L4 and the biconcave negative lens L5 are cemented.

The second lens unit G2 includes a biconcave negative lens L6, a biconvex positive lens L7, a biconvex positive lens L8, a biconvex positive lens L9, a biconcave negative lens L10, and a biconcave negative lens L11. The biconcave negative lens L6 and the biconvex positive lens L7 are cemented. A predetermined lens unit includes the biconcave negative lens L10 and the biconcave negative lens L11.

The aperture stop S is disposed between the biconcave negative lens L5 and the biconcave negative lens L6.

An aspheric surface is provided to 11 surfaces namely, both surfaces of the positive meniscus lens L1, a surface on an image side of the biconvex positive lens L3, both surfaces of the biconvex positive lens L8, both surfaces of the biconvex positive lens L9, both surfaces of the biconcave negative lens L10, and both surfaces of the biconcave negative lens L11.

Figure 23A:
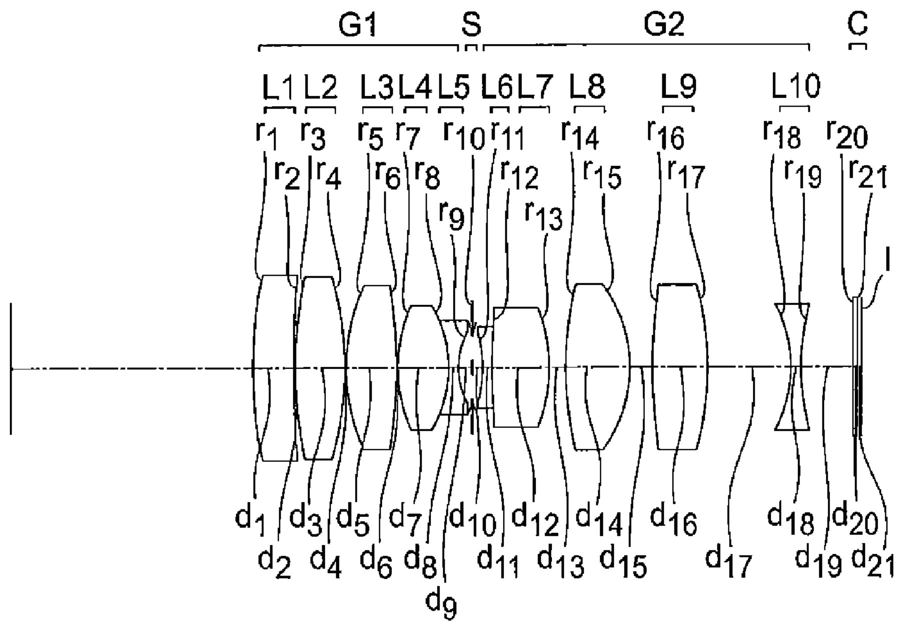
FIG. 23A is a cross-sectional view along an optical axis showing an optical arrangement.
Figure 23B:
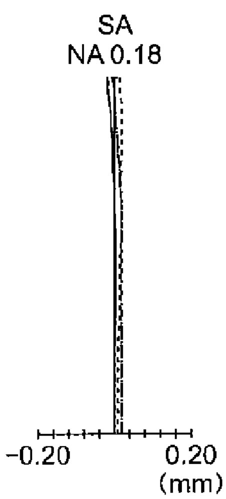
FIG. 23B, FIG. 23C, FIG. 23D, and FIG. 23E are diagrams showing a spherical aberration (SA), an astigmatism (AS), a distortion (DT), and a chromatic aberration of magnification (CC) respectively, of the optical system according to an example 16.
Figure 23C:
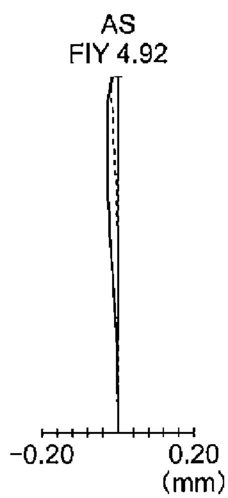
Figure 23D:
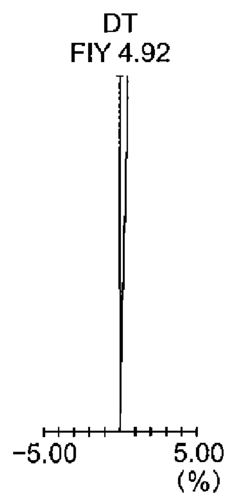
Figure 23E:
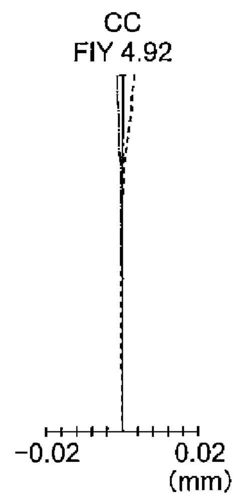

Next, an optical system according to an example 16 will be described below. FIG. 23A is a cross-sectional view along an optical axis showing an optical arrangement of the optical system according to the example 16. Moreover, FIG. 23B, FIG. 23C, FIG. 23D, and FIG. 23E are aberration diagrams of the optical system according to the example 16.

The optical system according to the example 16, as shown in FIG. 23A, includes in order from an object side, a first lens unit G1 having a positive refractive power, an aperture stop S, and a second lens unit G2 having a positive refractive power.

The first lens unit G1 includes a positive meniscus lens L1 having a convex surface directed toward the object side, a biconvex positive lens L2, a biconvex positive lens L3, a biconvex positive lens L4, and a biconcave negative lens L5. The biconvex positive lens L4 and the biconcave negative lens L5 are cemented.

The second lens unit G2 includes a biconcave negative lens L6, a biconvex positive lens L7, a biconvex positive lens L8, a biconvex positive lens L9, and a biconcave negative lens L10. The biconcave negative lens L6 and the biconvex positive lens L7 are cemented. A predetermined lens unit includes a biconcave negative lens L10.

The aperture stop S is disposed between the biconcave negative lens L5 and the biconcave negative lens L6.

An aspheric surface is provided to nine surfaces namely, both surfaces of the positive meniscus lens L1, a surface on an image side of the biconvex positive lens L3, both surfaces of the biconvex positive lens L8, both surfaces of the biconvex positive lens L9, and both surfaces of the biconcave negative lens L10.

Figure 24A:
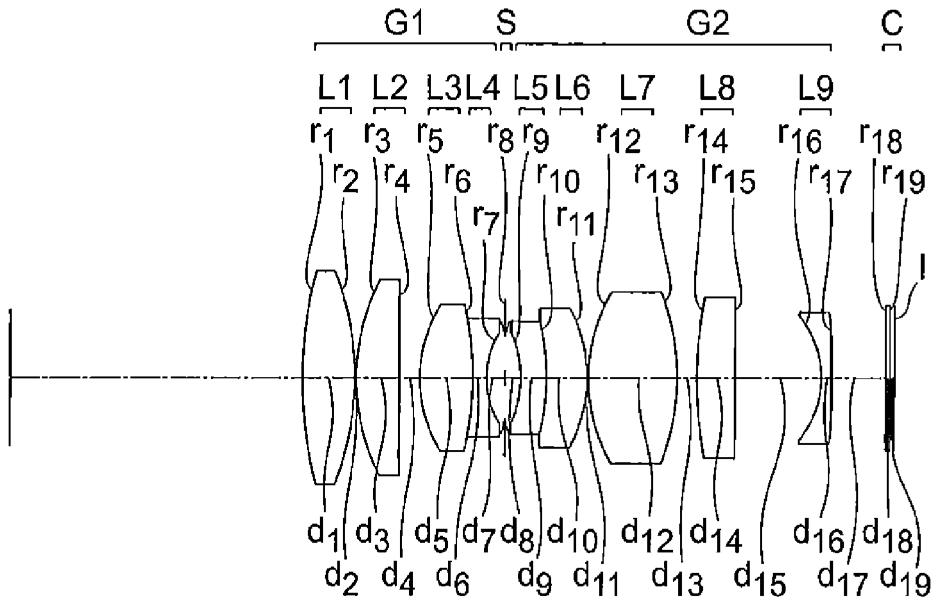
FIG. 24A is a cross-sectional view along an optical axis showing an optical arrangement.
Figures 24B, 24C, 24D, 24E:
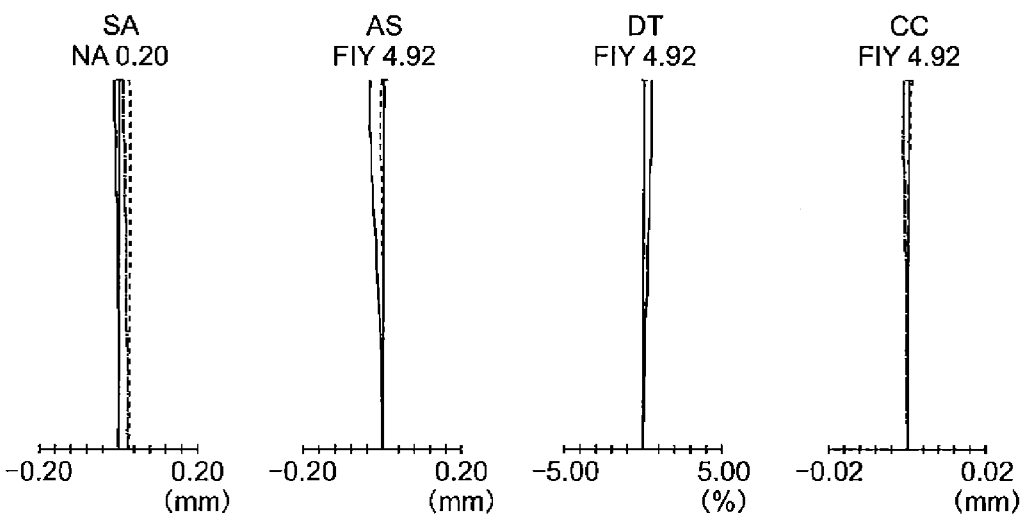
FIG. 24B, FIG. 24C, FIG. 24D, and FIG. 24E are diagrams showing a spherical aberration (SA), an astigmatism (AS), a distortion (DT), and a chromatic aberration of magnification (CC) respectively, of the optical system according to an example 17.

Next, an optical system according to an example 17 will be described below. FIG. 24A is a cross-sectional view along an optical axis showing an optical arrangement of the optical system according to the example 17. Moreover, FIG. 24B, FIG. 24C, FIG. 24D, and FIG. 24E are aberration diagrams of the optical system according to the example 17.

The optical system according to the example 17, as shown in FIG. 24A, includes in order from an object side, a first lens unit G1 having a positive refractive power, an aperture stop S, and a second lens unit G2 having a positive refractive power.

The first lens unit G1 includes a biconvex positive lens L1, a biconvex positive lens L2, a biconvex positive lens L3, and a biconcave negative lens L4. The biconvex positive lens L3 and the biconcave negative lens L4 are cemented.

The second lens unit G2 includes a negative meniscus lens L5 having a convex surface directed toward an image side, a positive meniscus lens L6 having a convex surface directed toward the image side, a biconvex positive lens L7, a positive meniscus lens L8 having a convex surface directed toward the object side, and a biconcave negative lens L9. The negative meniscus lens L5 and the positive meniscus lens L6 are cemented. A predetermined lens unit includes a biconcave negative lens L9.

The aperture stop S is disposed between the biconcave negative lens L4 and the negative meniscus lens L5.

An aspheric surface is provided to seven surfaces namely, a surface on the image side of the biconvex positive lens L2, both surfaces of the biconvex positive lens L7, both surfaces of the positive meniscus lens L8, and both surfaces of the biconcave negative lens L9.

Figure 25A:
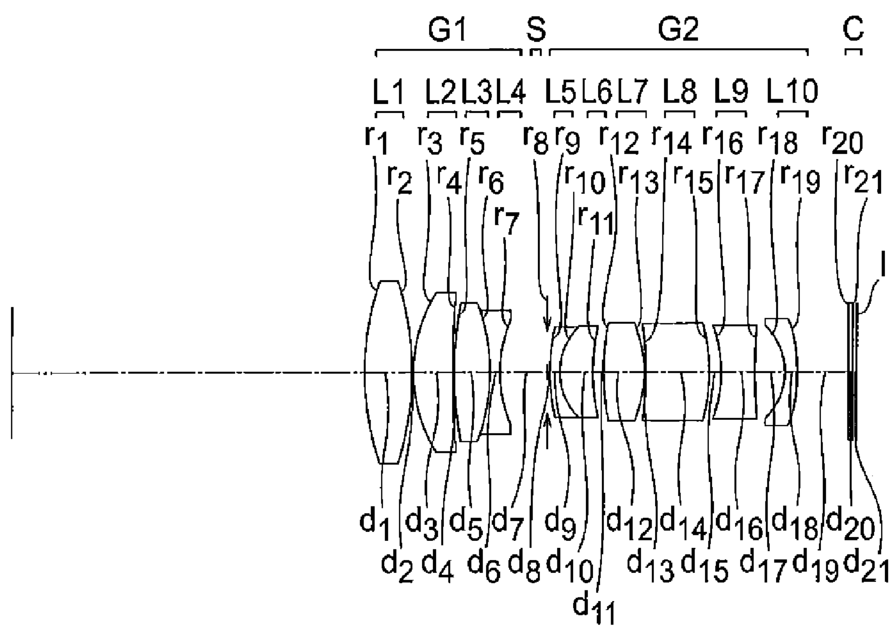
FIG. 25A is a cross-sectional view along an optical axis showing an optical arrangement.
Figures 25B, 25C, 25D, 25E:
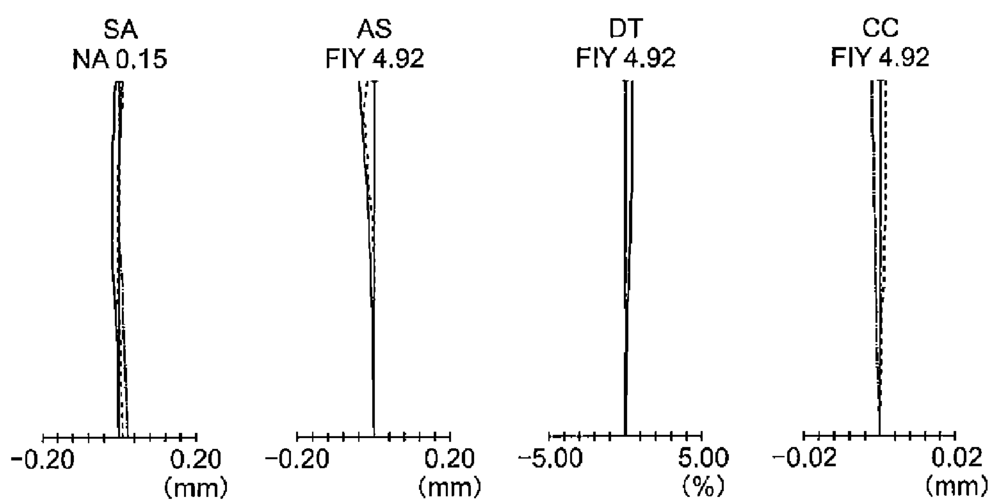
FIG. 25B, FIG. 25C, FIG. 25D, and FIG. 25E are diagrams showing a spherical aberration (SA), an astigmatism (AS), a distortion (DT), and a chromatic aberration of magnification (CC) respectively, of the optical system according to an example 18.

Next, an optical system according to an example 18 will be described below. FIG. 25A is a cross-sectional view along an optical axis showing an optical arrangement of the optical system according to the example 18. Moreover, FIG. 25B, FIG. 25C, FIG. 25D, and FIG. 25E are aberration diagrams of the optical system according to the example 18.

The optical system according to the example 18, as shown in FIG. 25A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward the object side, a biconvex positive lens L3, and a biconcave negative lens L4. The biconvex positive lens L3 and the biconcave negative lens L4 are cemented.

The second lens unit G2 includes a negative meniscus lens L5 having a convex surface directed toward the object side, a positive meniscus lens L6 having a convex surface directed toward the object side, a biconvex positive lens L7, a positive meniscus lens L8 having a convex surface directed toward an image side, a biconcave negative lens L9, and a negative meniscus lens L10 having a convex surface directed toward the image side. The negative meniscus lens L5 and the positive meniscus lens L6 are cemented. A predetermined lens unit includes the biconcave negative lens L9 and the negative meniscus lens L10.

The aperture stop S is disposed between the biconcave negative lens L4 and the negative meniscus lens L5.

An aspheric surface is provided to five surfaces namely, a surface on the image side of the positive meniscus lens L2, both surfaces of the biconvex positive lens L7, and both surfaces of the negative meniscus lens L10.

Next, an optical system according to an example 19 will be described below. FIG. 26A is a cross-sectional view along an optical axis showing an optical arrangement of the optical system according to the example 19. Moreover, FIG. 26B, FIG. 26C, FIG. 26D, and FIG. 26E are aberration diagrams of the optical system according to the example 19.

The optical system according to the example 19, as shown in FIG. 26A, includes in order from an object side, a first lens unit G1 having a positive refractive power, an aperture stop S, and a second lens unit G2 having a negative refractive power.

The first lens unit G1 includes a diffractive optical element DL, a biconvex positive lens L1, a positive meniscus lens L2 having a convex surface directed toward the object side, a biconvex positive lens L3, and a biconcave negative lens L4. The biconvex positive lens L3 and the biconcave negative lens L4 are cemented.

The second lens unit G2 includes a negative meniscus lens L5 having a convex surface directed toward the object side, a positive meniscus lens L6 having a convex surface directed toward the object side, a positive meniscus lens L7 having a convex surface directed toward the object side, a negative meniscus lens L8 having a convex surface directed toward an image side, a biconvex positive lens L9, a biconcave negative lens L10, and a biconcave negative lens L11. The negative meniscus lens L5 and the positive meniscus lens L6 are cemented. A predetermined lens unit includes the biconcave negative lens L10 and the biconcave negative lens L11.

The diffractive optical element DL has a positive refractive power as a whole. The diffractive optical element DL includes a positive meniscus lens having a convex surface directed toward the object side and a negative meniscus lens having a convex surface directed toward the object side. A relief pattern is formed at an interface of the positive meniscus lens and the negative meniscus lens, and the interface is let to be a diffractive surface.

The aperture stop S is disposed between the biconcave negative lens L4 and the negative meniscus lens L5.

An aspheric surface is provided to 12 surfaces namely, a surface on the object side of the biconvex positive lens L1, a surface on the image side of the positive meniscus lens L2, both surfaces of the positive meniscus lens L7, both surfaces of the negative meniscus lens L8, both surfaces of the biconvex positive lens L9, both surfaces of the biconcave negative lens L10, and both surfaces of the biconcave negative lens L11.

Figure 27A:
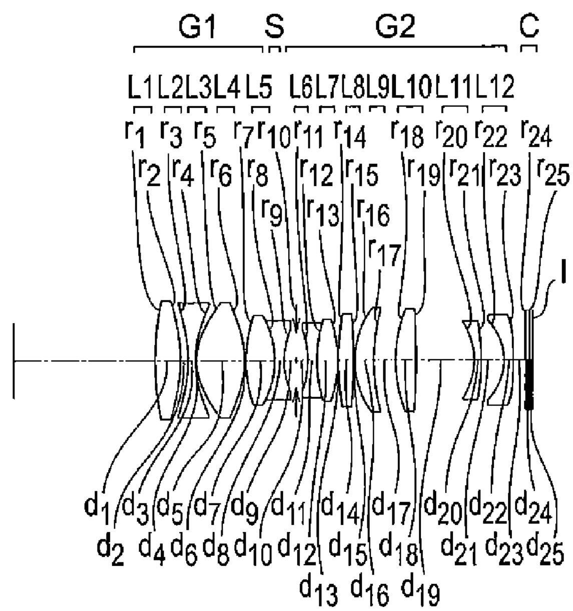
FIG. 27A is a cross-sectional view along an optical axis showing an optical arrangement.
Figures 27B, 27C, 27D, 27E:
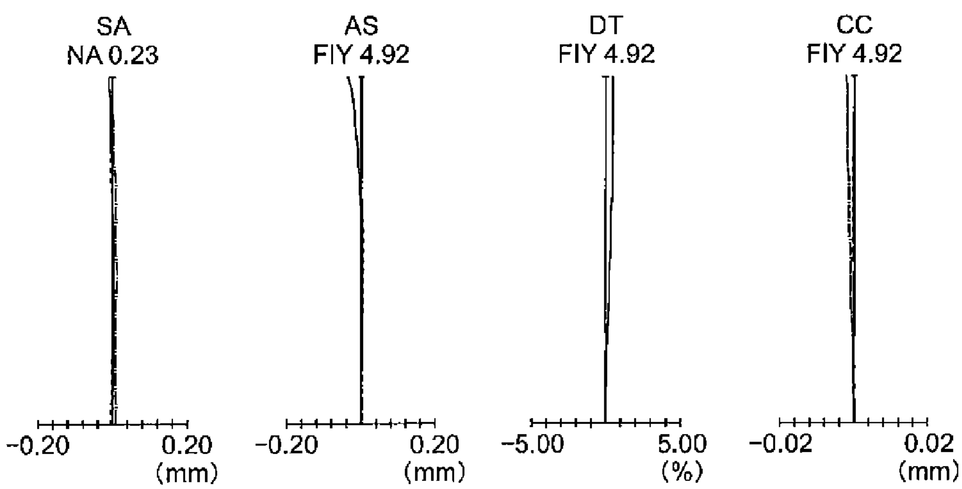
FIG. 27B, FIG. 27C, FIG. 27D, and FIG. 27E are diagrams showing a spherical aberration (SA), an astigmatism (AS), a distortion (DT), and a chromatic aberration of magnification (CC) respectively, of the optical system according to an example 20.

Next, an optical system according to an example 20 will be described below. FIG. 27A is a cross-sectional view along an optical axis showing an optical arrangement of the optical system according to the example 20. Moreover, FIG. 27B, FIG. 27C, FIG. 27D, and FIG. 27E are aberration diagrams of the optical system according to the example 20.

The optical system according to the example 20, as shown in FIG. 27A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, and a biconcave negative lens L5. The biconvex positive lens L4 and the biconcave negative lens L5 are cemented.

The second lens unit G2 includes a biconcave negative lens L6, a biconvex positive lens L7, a biconvex positive lens L8, a positive meniscus lens L9 having a convex surface directed toward the object side, a biconvex positive lens L10, a negative meniscus lens L11 having a convex surface directed toward an image side, and a negative meniscus lens L12 having a convex surface directed toward the image side. The biconcave negative lens L6 and the biconvex positive lens L7 are cemented. A predetermined lens unit includes the negative meniscus lens L11 and the negative meniscus lens L12.

The aperture stop S is disposed between the biconcave negative lens L5 and the biconcave negative lens L6.

An aspheric surface is provided to 16 surfaces namely, both surfaces of the biconvex positive lens L1, both surfaces of the biconcave negative lens L2, both surfaces of the biconvex positive lens L3, both surfaces of the biconvex positive lens L8, both surfaces of the positive meniscus lens L9, both surfaces of the biconvex positive lens L10, both surfaces of the negative meniscus lens L11, and both surfaces of the negative meniscus lens L12.

Figure 28A:
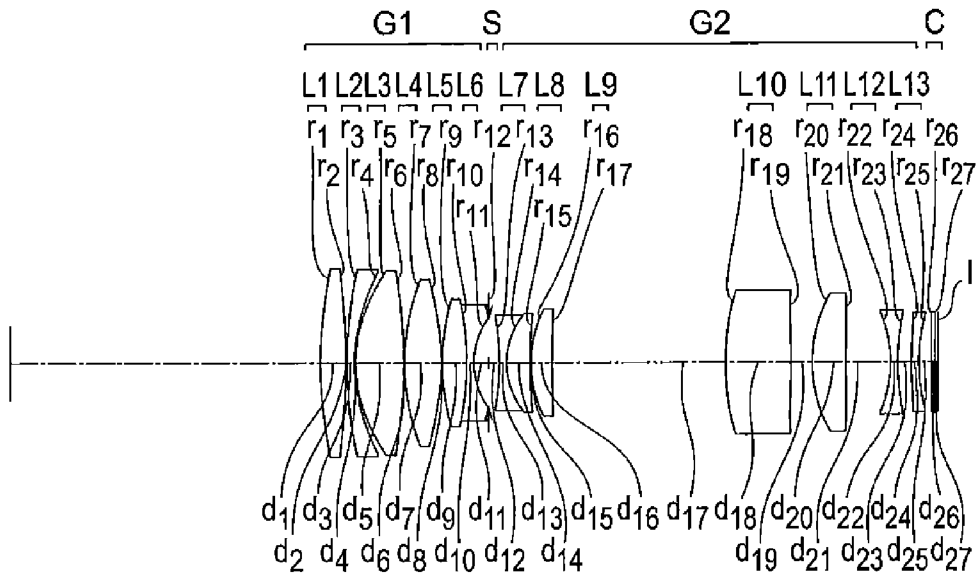
FIG. 28A is a cross-sectional view along an optical axis showing an optical arrangement.
Figures 28B, 28C, 28D, 28E:
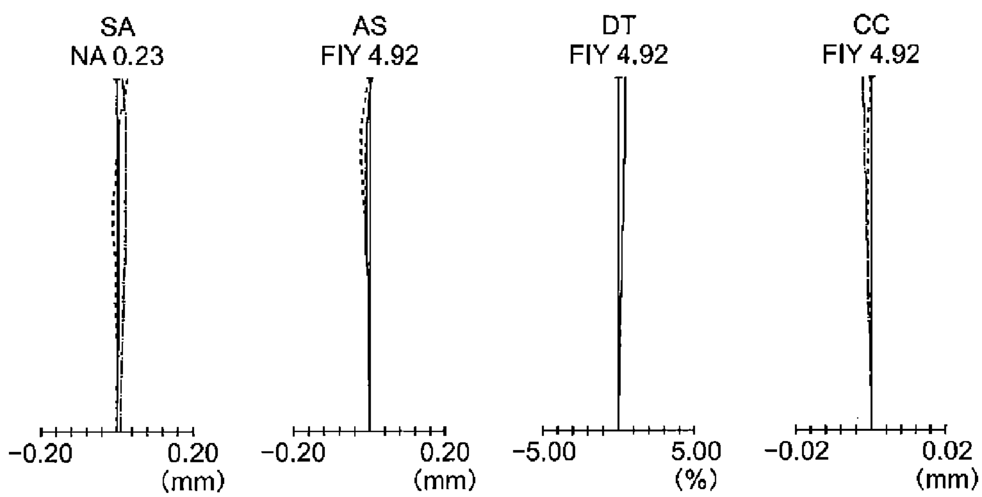
FIG. 28B, FIG. 28C, FIG. 28D, and FIG. 28E are diagrams showing a spherical aberration (SA), an astigmatism (AS), a distortion (DT), and a chromatic aberration of magnification (CC) respectively, of the optical system according to an example 21.

Next, an optical system according to an example 21 will be described below. FIG. 28A is a cross-sectional view along an optical axis showing an optical arrangement of the optical system according to the example 21. Moreover, FIG. 28B, FIG. 28C, FIG. 28D, and FIG. 28E are aberration diagrams of the optical system according to the example 21.

The optical system according to the example 21, as shown in FIG. 28A, includes a first lens unit G1 having a positive refractive power, an aperture stop S, and a second lens unit G2 having a negative refractive power.

The first lens unit G1 includes a biconvex positive lens L1, a negative meniscus lens L2 having a convex surface directed toward the object side, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward the object side, a positive meniscus lens L9 having a convex surface directed toward the object side, a biconvex positive lens L10, a positive meniscus lens L11 having a convex surface directed toward the object side, a biconcave negative lens L12, and a negative meniscus lens L13 having a convex surface directed toward the object side. The biconcave negative lens L7 and the positive meniscus lens L8 are cemented. A predetermined lens unit includes the biconcave negative lens L12 and the negative meniscus lens L13.

The aperture stop S is disposed between the biconcave negative lens L6 and the biconcave negative lens L7.

An aspheric surface is provided to 16 surfaces namely, both surfaces of the biconvex positive lens L1, both surfaces of the negative meniscus lens L2, a surface on the object side of the biconvex positive lens L3, a surface on an image side of the biconvex positive lens L4, both surfaces of the positive meniscus lens L9, both surfaces of the biconvex positive lens L10, both surfaces of the positive meniscus lens L11, both surfaces of the biconcave negative lens L12, and both surfaces of the negative meniscus lens L13.

Figure 29A:
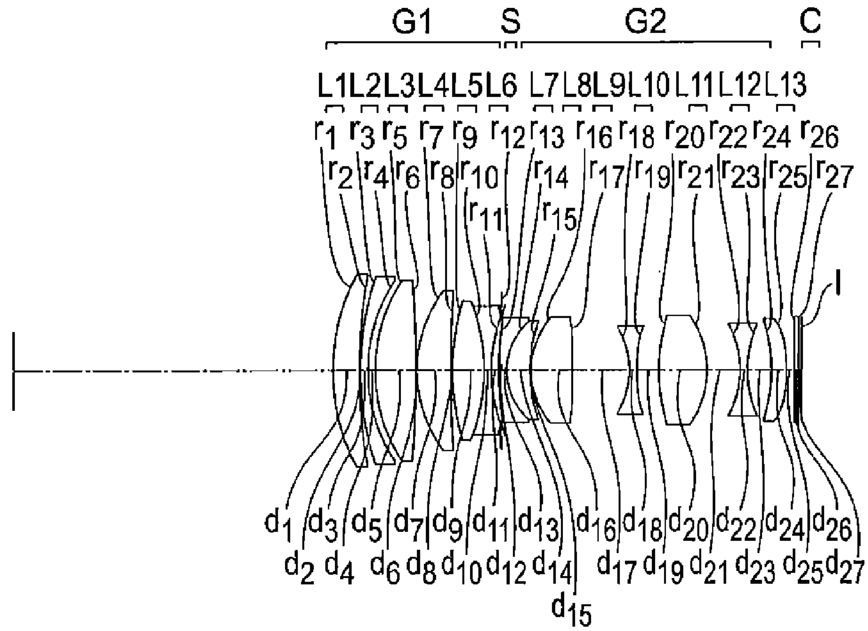
FIG. 29A is a cross-sectional view along an optical axis showing an optical arrangement.
Figures 29B, 29C, 29D, 29E:
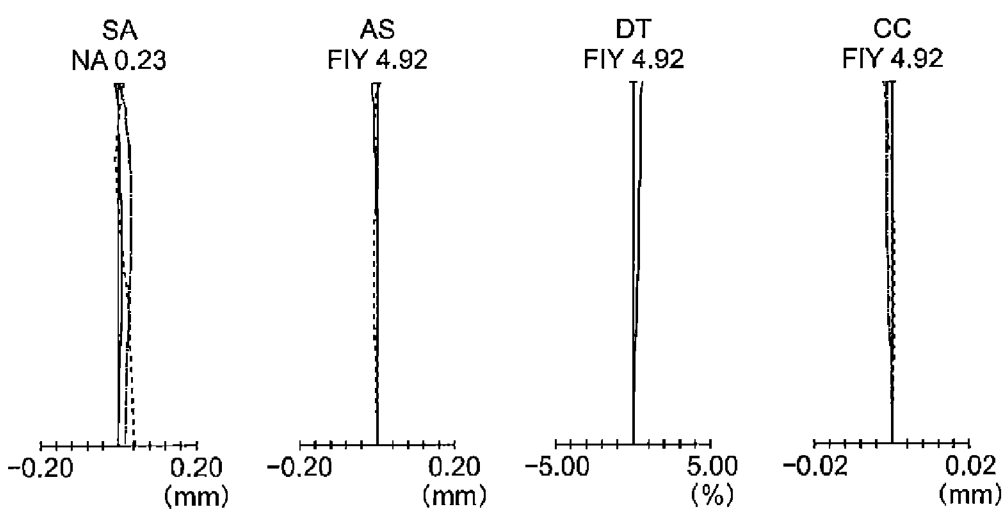
FIG. 29B, FIG. 29C, FIG. 29D, and FIG. 29E are diagrams showing a spherical aberration (SA), an astigmatism (AS), a distortion (DT), and a chromatic aberration of magnification (CC) respectively, of the optical system according to an example 22.

Next, an optical system according to an example 22 will be described below. FIG. 29A is a cross-sectional view along an optical axis showing an optical arrangement of the optical system according to the example 22. Moreover, FIG. 29B, FIG. 29C, FIG. 29D, and FIG. 29E are aberration diagrams of the optical system according to the example 22.

The optical system according to the example 22, as shown in FIG. 29A, includes a first lens unit G1 having a positive refractive power, an aperture stop S, and a second lens unit G2 having a negative refractive power.

The first lens unit G1 includes a positive meniscus lens L1 having a convex surface directed toward the object side, a negative meniscus lens L2 having a convex surface directed toward the object side, a biconvex positive lens L3, a positive meniscus lens L4 having a convex surface directed toward the object side, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a biconvex positive lens L9, a biconcave negative lens L10, a biconvex positive lens L11, a biconcave negative lens L12, and a negative meniscus lens L13 having a convex surface directed toward an image side. The negative meniscus lens L7 and the positive meniscus lens L8 are cemented. A predetermined lens unit includes the biconcave negative lens L12 and the negative meniscus lens L13.

The aperture stop S is disposed between the biconcave negative lens L6 and the negative meniscus lens L7.

An aspheric surface is provided to 14 surfaces namely, both surfaces of the positive meniscus lens L1, a surface on the object side of the biconvex positive lens L3, a surface on the image side of the positive meniscus lens L4, both surfaces of the biconvex positive lens L9, both surfaces of the biconcave negative lens L10, both surfaces of the biconvex positive lens L11, both surfaces of the biconcave negative lens L12, and both surfaces of the negative meniscus lens L13.

Figure 30A:
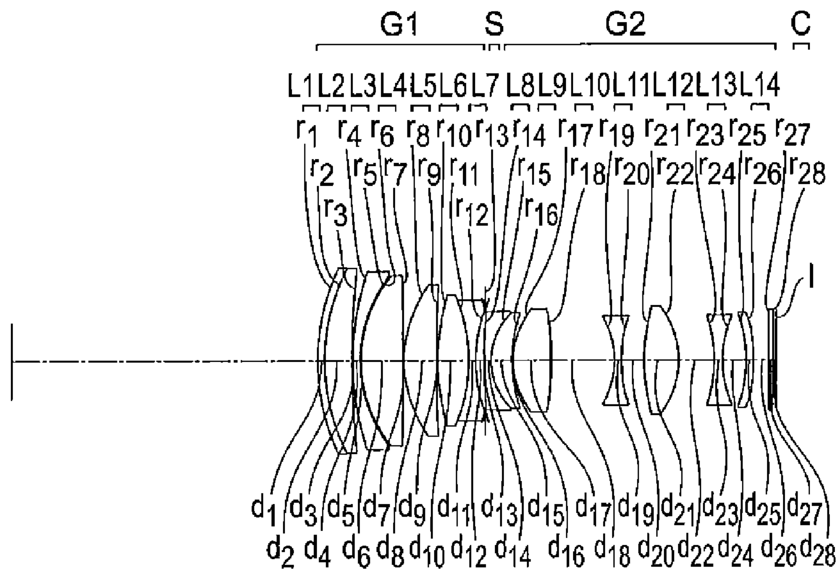
FIG. 30A is a cross-sectional view along an optical axis showing an optical arrangement.
Figures 30B, 30C, 30D, 30E:
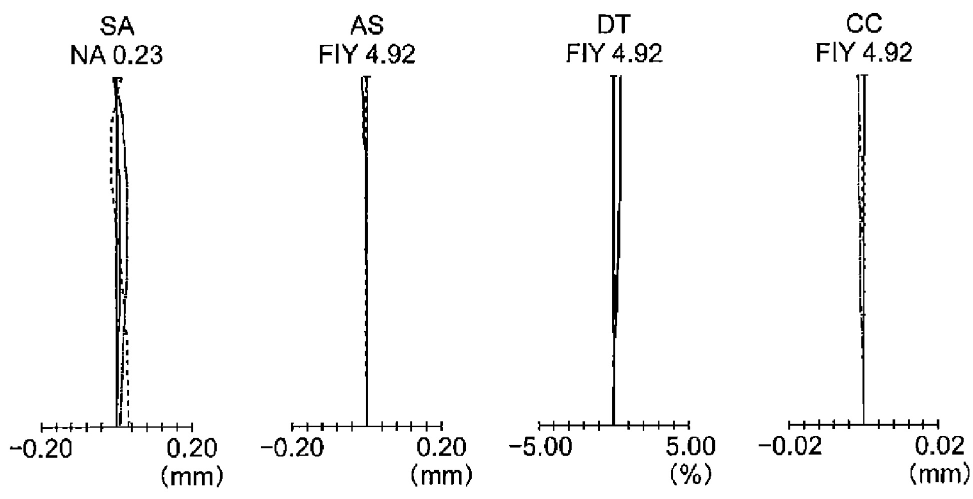
FIG. 30B, FIG. 30C, FIG. 30D, and FIG. 30E are diagrams showing a spherical aberration (SA), an astigmatism (AS), a distortion (DT), and a chromatic aberration of magnification (CC) respectively, of the optical system according to an example 23.

Next, an optical system according to an example 23 will be described below. FIG. 30A is a cross-sectional view along an optical axis showing an optical arrangement of the optical system according to the example 23. Moreover, FIG. 30B, FIG. 30C, FIG. 30D, and FIG. 30E are aberration diagrams of the optical system according to the example 23.

The optical system according to the example 23, as shown in FIG. 30A, includes a first lens unit G1 having a positive refractive power, an aperture stop S, and a second lens unit G2 having a negative refractive power.

The first lens unit G1 includes a negative meniscus lens L1 having a convex surface directed toward the object side, a positive meniscus lens L2 having a convex surface directed toward the object side, a negative meniscus lens L3 having a convex surface directed toward the object side, a biconvex positive lens L4, a biconvex positive lens L5, a biconvex positive lens L6, and a biconcave negative lens L7. The negative meniscus lens L1 and the positive meniscus lens L2 are cemented. Moreover, the biconvex positive lens L6 and the biconcave negative lens L7 are cemented.

The second lens unit G2 includes a negative meniscus lens L8 having a convex surface directed toward the object side, a positive meniscus lens L9 having a convex surface directed toward the object side, a biconvex positive lens L10, a biconcave negative lens L11, a biconvex positive lens L12, a biconcave negative lens L13, and a negative meniscus lens L14 having a convex surface directed toward an image side. The negative meniscus lens L8 and the positive meniscus lens L9 are cemented. A predetermined lens unit includes the biconcave negative lens L13 and the negative meniscus lens L14.

The aperture stop S is disposed between the biconcave negative lens L7 and the negative meniscus lens L8.

An aspheric surface is provided to 12 surfaces namely, a surface on the object side of the biconvex positive lens L4, a surface on the image side of the biconvex positive lens L5, both surfaces of the biconvex positive lens L10, both surfaces of the biconcave negative lens L11, both surfaces of the biconvex positive lens L12, both surfaces of the biconcave negative lens L13, and both surfaces of the negative meniscus lens L14.

Figure 31A:
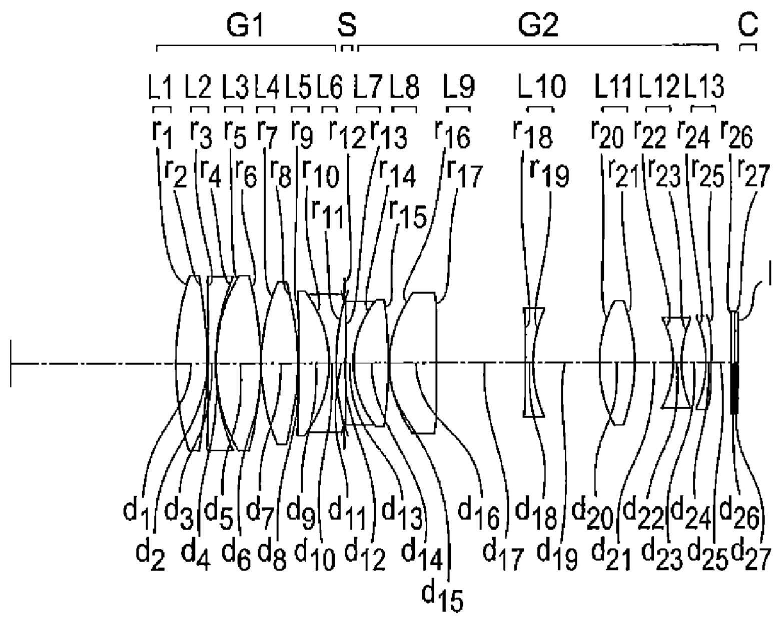
FIG. 31A is a cross-sectional view along an optical axis showing an optical arrangement.
Figure 31B:
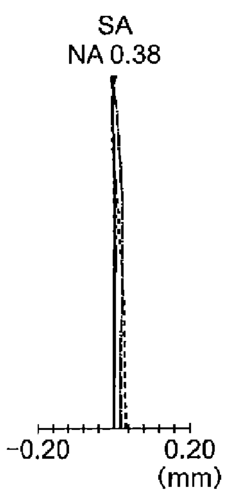
FIG. 31B, FIG. 31C, FIG. 31D, and FIG. 31E are diagrams showing a spherical aberration (SA), an astigmatism (AS), a distortion (DT), and a chromatic aberration of magnification (CC) respectively, of the optical system according to an example 24.
Figure 31C:
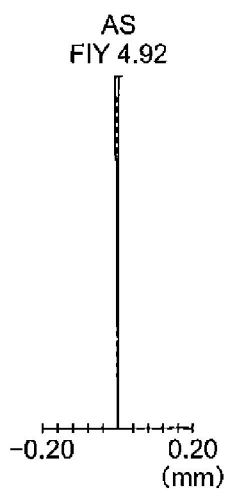
Figure 31D:
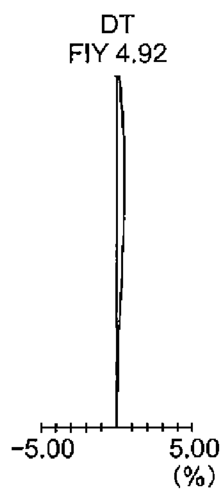
Figure 31E:
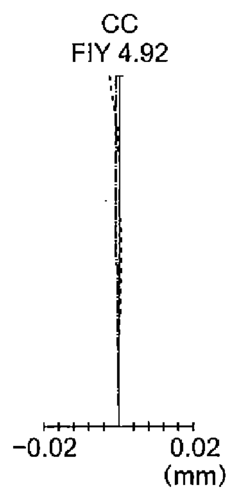

Next, an optical system according to an example 24 will be described below. FIG. 31A is a cross-sectional view along an optical axis showing an optical arrangement of the optical system according to the example 24. Moreover, FIG. 31B, FIG. 31C, FIG. 31D, and FIG. 31E are aberration diagrams of the optical system according to the example 24.

The optical system according to the example 24, as shown in FIG. 31A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a positive meniscus lens L5 having a convex surface directed toward an image side, and a biconcave negative lens L6. The positive meniscus lens L5 and the biconcave negative lens L6 are cemented.

The second lens unit G2 includes a biconcave negative lens L7, a biconvex positive lens L8, a biconvex positive lens L9, a negative meniscus lens L10 having a convex surface directed toward the object side, a biconvex positive lens L11, a biconcave negative lens L12, and a negative meniscus lens L13 having a convex surface directed toward the image side. The biconcave negative lens L7 and the biconvex positive lens L8 are cemented. A predetermined lens unit includes the biconcave negative lens L12 and the negative meniscus lens L13.

The aperture stop S is disposed between the biconcave negative lens L6 and the biconcave negative lens L7.

An aspheric surface is provided to 14 surfaces namely, both surfaces of the biconvex positive lens L1, a surface on the object side of the biconvex positive lens L3, a surface on the image side of the biconvex positive lens L4, both surfaces of the biconvex positive lens L9, both surfaces of the negative meniscus lens L10, both surfaces of the biconvex positive lens L11, both surfaces of the biconcave negative lens L12, and both surfaces of the negative meniscus lens L13.

Figure 32A:
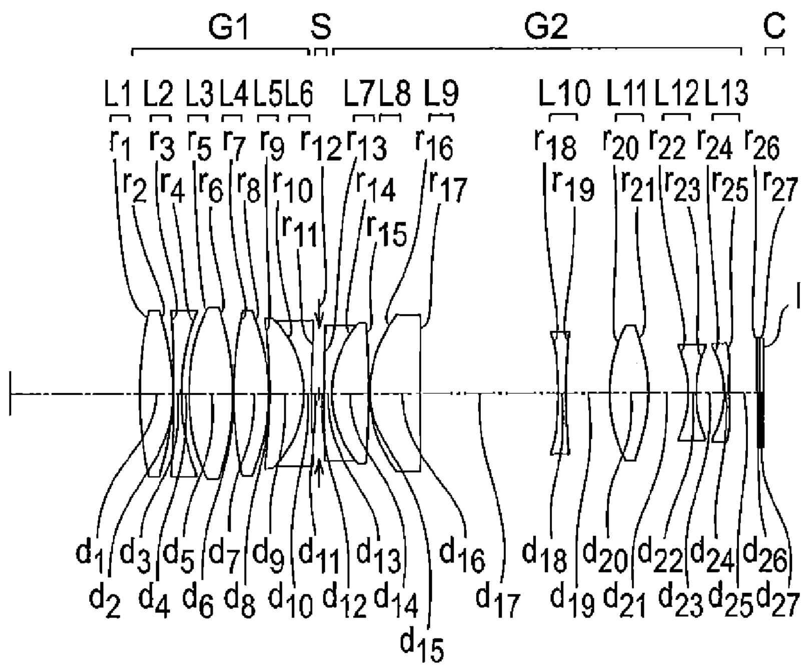
FIG. 32A is a cross-sectional view along an optical axis showing an optical arrangement.
Figures 32B, 32C, 32D, 32E:
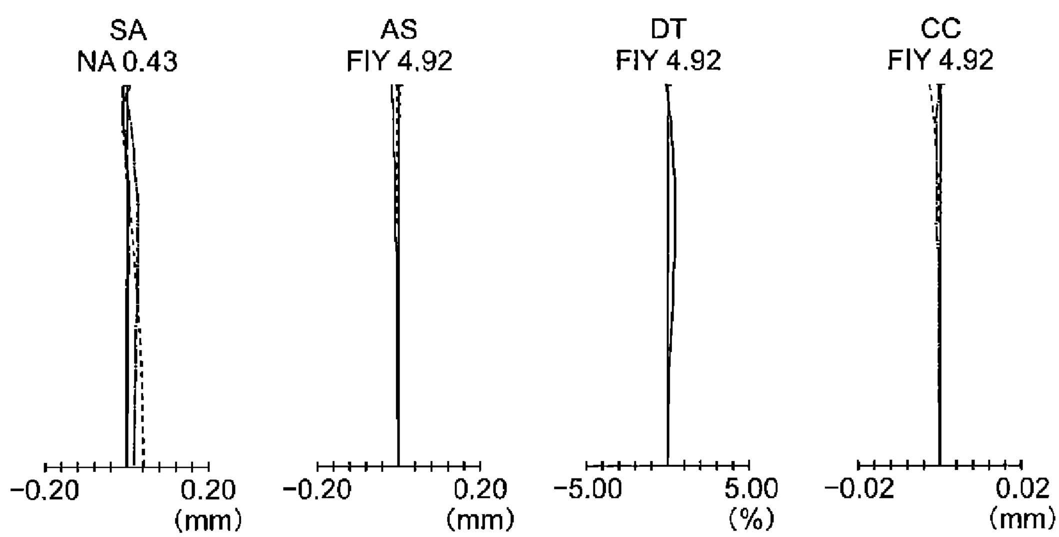
FIG. 32B, FIG. 32C, FIG. 32D, and FIG. 32E are diagrams showing a spherical aberration (SA), an astigmatism (AS), a distortion (DT), and a chromatic aberration of magnification (CC) respectively, of the optical system according to an example 25.

Next, an optical system according to an example 25 will be described below. FIG. 32A is a cross-sectional view along an optical axis showing an optical arrangement of the optical system according to the example 25. Moreover, FIG. 32B, FIG. 32C, FIG. 32D, and FIG. 32E are aberration diagrams of the optical system according to the example 25.

The optical system according to the example 25, as shown in FIG. 32A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a positive meniscus lens L5 having a convex surface directed toward an image side, and a biconcave negative lens L6. The positive meniscus lens L5 and the biconcave negative lens L6 are cemented.

The second lens unit G2 includes a negative meniscus lens L7 having a convex surface directed toward the object side, a biconvex positive lens L8, a positive meniscus lens L9 having a convex surface directed toward the object side, a biconcave negative lens L10, a biconvex positive lens L11, a biconcave negative lens L12, and a biconcave negative lens L13. The negative meniscus lens L7 and the biconvex positive lens L8 are cemented. A predetermine lens unit includes the biconcave negative lens L12 and the biconcave negative lens L13.

The aperture stop S is disposed between the biconcave negative lens L6 and the negative meniscus lens L7.

An aspheric surface is provided to 14 surfaces namely, both surfaces of the biconvex positive lens L1, a surface on the object of the biconvex positive lens L3, a surface on the image side of the biconvex positive lens L4, both surfaces of the positive meniscus lens L9, both surfaces of the biconcave negative lens L10, both surfaces of the biconvex positive lens L11, both surfaces of the biconcave negative lens L12, and both surfaces of the biconcave negative lens L13.

Figure 33A:
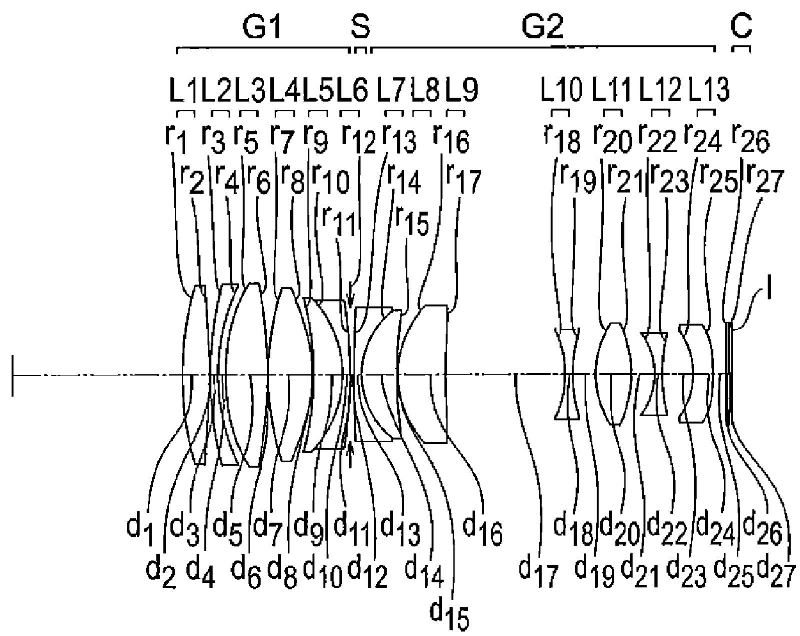
FIG. 33A is a cross-sectional view along an optical axis showing an optical arrangement.
Figures 33B, 33C, 33D, 33E:
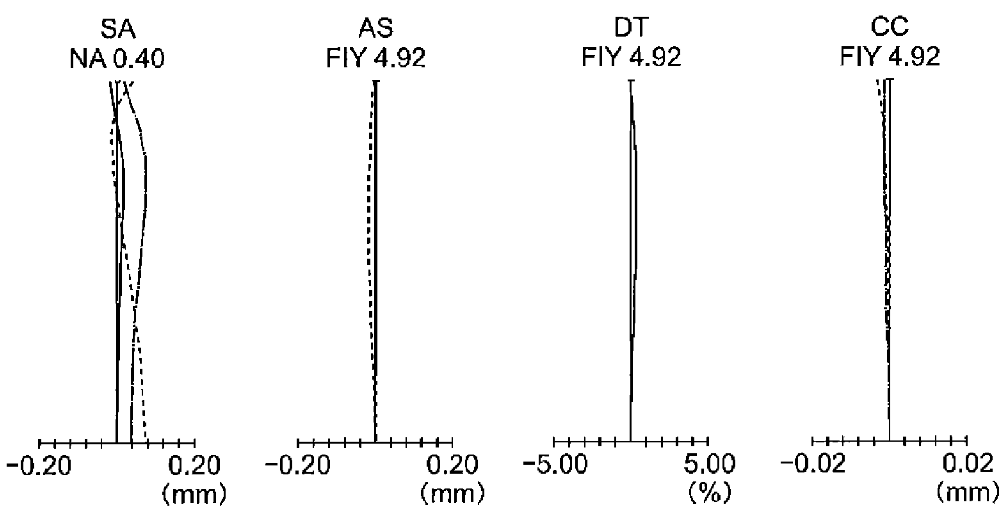
FIG. 33B, FIG. 33C, FIG. 33D, and FIG. 33E are diagrams showing a spherical aberration (SA), an astigmatism (AS), a distortion (DT), and a chromatic aberration of magnification (CC) respectively, of the optical system according to an example 26.

Next, an optical system according to an example 26 will be described below. FIG. 33A is a cross-sectional view along an optical axis showing an optical arrangement of the optical system according to the example 26. Moreover, FIG. 33B, FIG. 33C, FIG. 33D, and FIG. 33E are aberration diagrams of the optical system according to the example 26.

The optical system according to the example 26, as shown in FIG. 33A, includes a first lens unit G1 having a positive refractive power, an aperture stop S, and a second lens unit G2 having a negative refractive power.

The first lens unit G1 includes a biconvex positive lens L1, a negative meniscus lens L2 having a convex surface directed toward an object side, a biconvex positive lens L3, a biconvex positive lens L4, a positive meniscus lens L5 having a convex surface directed toward an image side, and a negative meniscus lens L6 having a convex surface directed toward the image side. The positive meniscus lens L5 and the negative meniscus lens L6 are cemented.

The second lens unit G2 includes a negative meniscus lens L7 having a convex surface directed toward the object side, a positive meniscus lens L8 having a convex surface directed toward the object side, a positive meniscus lens L9 having a convex surface directed toward the object side, a biconcave negative lens L10, a biconvex positive lens L11, a biconcave negative lens L12, and a negative meniscus lens L13 having a convex surface directed toward the image side. The negative meniscus lens L7 and the positive meniscus lens L8 are cemented. A predetermined lens unit includes the biconcave negative lens L12 and the negative meniscus L13.

The aperture stop S is disposed between the negative meniscus lens L6 and the negative meniscus lens L7.

An aspheric surface is provided to 14 surfaces namely, both surfaces of the biconvex positive lens L1, a surface on the object side of the biconvex positive lens L3, a surface on the image side of the biconvex positive lens L4, both surfaces of the positive meniscus lens L9, both surfaces of the biconcave negative lens L10, both surfaces of the biconvex positive lens L11, both surfaces of the biconcave negative lens L12, and both surfaces of the negative meniscus lens L13.

Next, an optical system according to an example 27 will be described below. FIG. 34A is a cross-sectional view along an optical axis showing an optical arrangement of the optical system according to the example 27. Moreover, FIG. 34B, FIG. 34C, FIG. 34D, and FIG. 34E are aberration diagrams of the optical system according to the example 27.

The optical system according to the example 27, as shown in FIG. 34A, includes a first lens unit G1 having a positive refractive power, an aperture stop S, and a second lens unit G2 having a negative refractive power.

The first lens unit G1 includes a biconvex positive lens L1, a biconvex positive lens L2, a biconvex positive lens L3, a positive meniscus lens L4 having a convex surface directed toward an image side, and a negative meniscus lens L5 having a convex surface directed toward the image side. The positive meniscus lens L4 and the negative meniscus lens L5 are cemented.

The second lens unit G2 includes a negative meniscus lens L6 having a convex surface directed toward an object side, a positive meniscus lens L7 having a convex surface directed toward the object side, a positive meniscus lens L8 having a convex surface directed toward the object side, a biconcave negative lens L9, a biconvex positive lens L10, a biconcave negative lens L11, and a negative meniscus lens L12 having a convex surface directed toward the image side. The negative meniscus lens L6 and the positive meniscus lens L7 are cemented. A predetermined lens unit includes the biconcave negative lens L11 and the negative meniscus lens L12.

The aperture stop S is disposed between the negative meniscus lens L5 and the negative meniscus lens L6.

An aspheric surface is provided to 14 surfaces namely, both surfaces of the biconvex positive lens L1, a surface on the object side of the biconvex positive lens L2, a surface on the image side of the biconvex positive lens L3, both surfaces of the positive meniscus lens L8, both surfaces of the biconcave negative lens L9, both surfaces of the biconvex positive lens L10, both surfaces of the biconcave negative lens L11, and both surfaces of the negative meniscus lens L12.

Figure 35A:
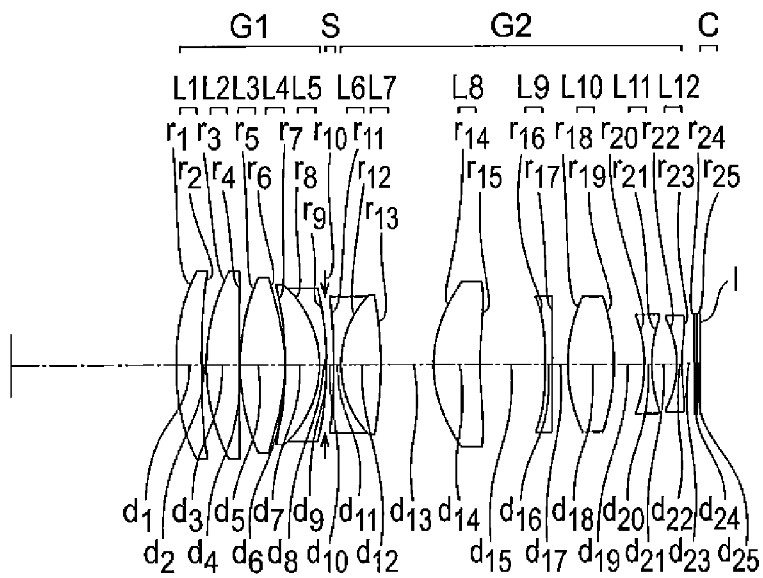
FIG. 35A is a cross-sectional view along an optical axis showing an optical arrangement.
Figures 35B, 35C, 35D, 35E:
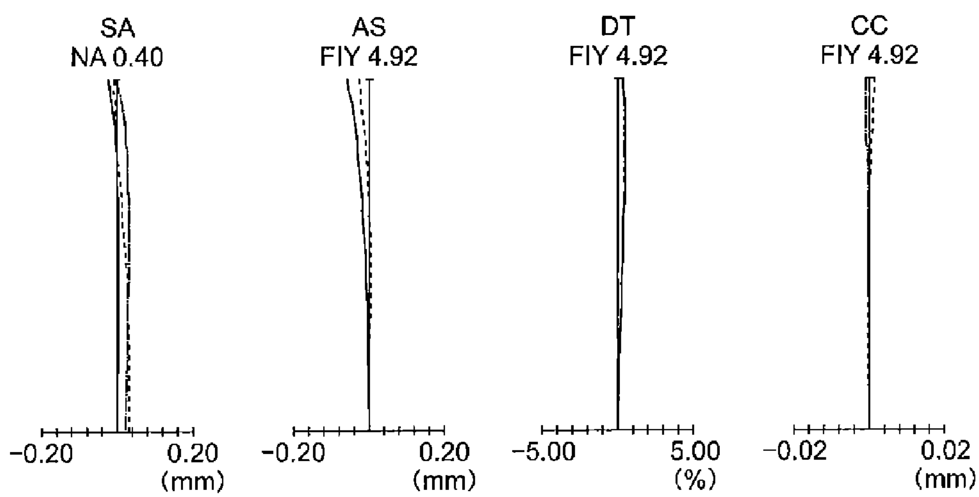
FIG. 35B, FIG. 35C, FIG. 35D, and FIG. 35E are diagrams showing a spherical aberration (SA), an astigmatism (AS), a distortion (DT), and a chromatic aberration of magnification (CC) respectively, of the optical system according to an example 28.

Next, an optical system according to an example 28 will be described below. FIG. 35A is a cross-sectional view along an optical axis showing an optical arrangement of the optical system according to the example 28. Moreover, FIG. 35B, FIG. 35C, FIG. 35D, and FIG. 35E are aberration diagrams of the optical system according to the example 28.

The optical system according to the example 28, as shown in FIG. 35A, includes a first lens unit G1 having a positive refractive power, an aperture stop S, and a second lens unit G2 having a negative refractive power.

The first lens unit G1 includes a positive meniscus lens L1 having a convex surface directed toward an object side, a positive meniscus lens L2 having a convex surface directed toward the object side, a biconvex positive lens L3, a positive meniscus lens L4 having a convex surface directed toward an image side, and a negative meniscus lens L5 having a convex surface directed toward the image side. The positive meniscus lens L4 and the negative meniscus lens L5 are cemented.

The second lens unit G2 includes a biconcave negative lens L6, a biconvex positive lens L7, a positive meniscus lens L8 having a convex surface directed toward the object side, a negative meniscus lens L9 having a convex surface directed toward the image side, a biconvex positive lens L10, a biconcave negative lens L11, and a biconcave negative lens L12. The biconcave negative lens L6 and the biconvex positive lens L7 are cemented. A predetermined lens unit includes the biconcave negative lens L11 and the biconcave negative lens L12.

The aperture stop S is disposed between the negative meniscus lens L5 and the biconcave negative lens L6.

An aspheric surface is provided to 14 surfaces namely, both surfaces of the positive meniscus lens L1, a surface on the object side of the positive meniscus lens L2, a surface on the image side of the biconvex positive lens L3, both surfaces of the positive meniscus lens L8, both surfaces of the negative meniscus lens L9, both surfaces of the biconvex positive lens L10, both surfaces of the biconcave negative lens L11, and both surfaces of the biconcave negative lens L12.

Figure 36A:
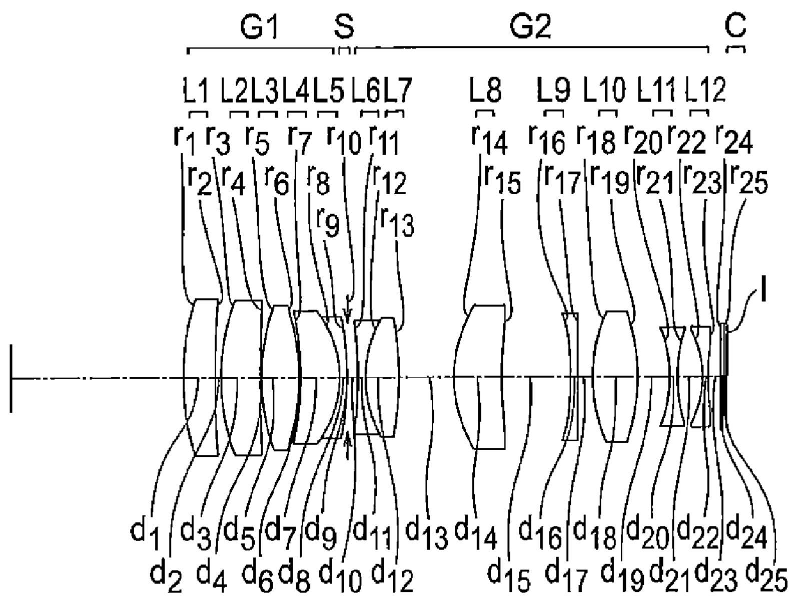
FIG. 36A is a cross-sectional view along an optical axis showing an optical arrangement.
Figures 36B, 36C, 36D, 36E:
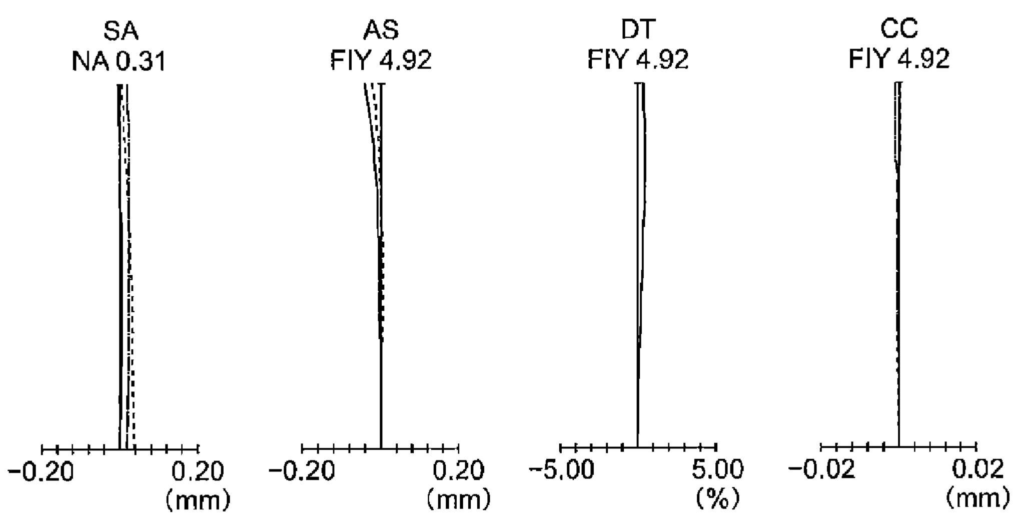
FIG. 36B, FIG. 36C, FIG. 36D, and FIG. 36E are diagrams showing a spherical aberration (SA), an astigmatism (AS), a distortion (DT), and a chromatic aberration of magnification (CC) respectively, of the optical system according to an example 29.

Next, an optical system according to an example 29 will be described below. FIG. 36A is a cross-sectional view along an optical axis showing an optical arrangement of the optical system according to the example 29. Moreover, FIG. 36B, FIG. 36C, FIG. 36D, and FIG. 36E are aberration diagrams of the optical system according to the example 29.

The optical system according to the example 29, as shown in FIG. 36A, includes a first lens unit G1 having a positive refractive power, an aperture stop S, and a second lens unit G2 having a negative refractive power.

The first lens unit G1 includes a positive meniscus lens L1 having a convex surface directed toward an object side, a positive meniscus lens L2 having a convex surface directed toward the object side, a biconvex positive lens L3, a positive meniscus lens L4 having a convex surface directed toward an image side, and a negative meniscus lens L5 having a convex surface directed toward the image side. The positive meniscus lens L4 and the negative meniscus lens L5 are cemented.

The second lens unit G2 includes a biconcave negative lens L6, a biconvex positive lens L7, a positive meniscus lens L8 having a convex surface directed toward the object side, a negative meniscus lens L9 having a convex surface directed toward the image side, a biconvex positive lens L10, a biconcave negative lens L11, and a biconcave negative lens L12. The biconcave negative lens L6 and the biconvex positive lens L7 are cemented. A predetermined lens unit includes the biconcave negative lens L11 and the biconcave negative lens L12.

The aperture stop S is disposed between the negative meniscus lens L5 and the biconcave negative lens L6.

An aspheric surface is provided to 14 surfaces namely, both surfaces of the positive meniscus lens L1, a surface on the object side of the positive meniscus lens L2, a surface on the image side of the biconvex positive lens L3, both surfaces of the positive meniscus lens L8, both surfaces of the negative meniscus lens L9, both surfaces of the biconvex positive lens L10, both surfaces of the biconcave negative lens L11, and both surfaces of the biconcave negative lens L12.

Figure 37A:
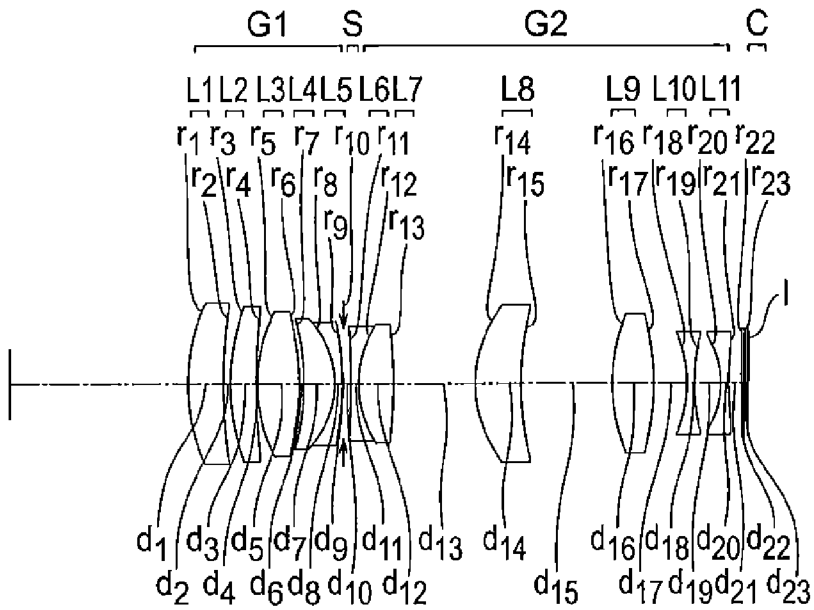
FIG. 37A is a cross-sectional view along an optical axis showing an optical arrangement.
Figures 37B, 37C, 37D, 37E:
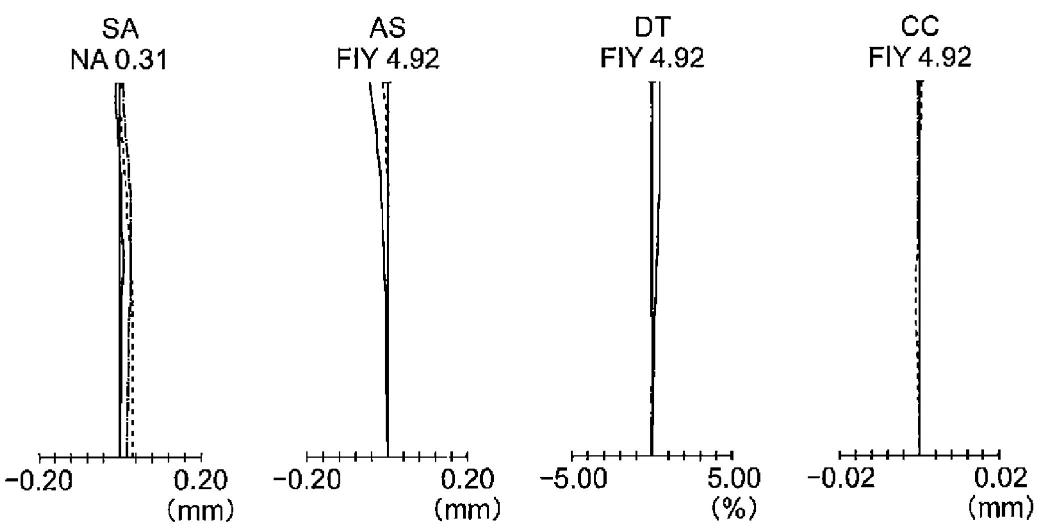
FIG. 37B, FIG. 37C, FIG. 37D, and FIG. 37E are diagrams showing a spherical aberration (SA), an astigmatism (AS), a distortion (DT), and a chromatic aberration of magnification (CC) respectively, of the optical system according to an example 30.

Next, an optical system according to an example 30 will be described below. FIG. 37A is a cross-sectional view along an optical axis showing an optical arrangement of the optical system according to the example 30. Moreover, FIG. 37B, FIG. 37C, FIG. 37D, and FIG. 37E are aberration diagrams of the optical system according to the example 30.

The optical system according to the example 30, as shown in FIG. 37A, includes a first lens unit G1 having a positive refractive power, an aperture stop S, and a second lens unit G2 having a negative refractive power.

The first lens unit G1 includes a positive meniscus lens L1 having a convex surface directed toward an object side, a positive meniscus lens L2 having a convex surface directed toward the object side, a biconvex positive lens L3, a positive meniscus lens L4 having a convex surface directed toward an image side, and a negative meniscus lens L5 having a convex surface directed toward the image side. The positive meniscus lens L4 and the negative meniscus lens L5 are cemented.

The second lens unit G2 includes a biconcave negative lens L6, a biconvex positive lens L7, a positive meniscus lens L8 having a convex surface directed toward the object side, a biconvex positive lens L9, a biconcave negative lens L10, and a biconcave negative lens L11. The biconcave negative lens L6 and the biconvex positive lens L7 are cemented. A predetermined lens unit includes the biconcave negative lens L10 and the biconcave negative lens L11.

The aperture stop S is disposed between the negative meniscus lens L5 and the biconcave negative lens L6.

An aspheric surface is provided to 12 surfaces namely, both surfaces of the positive meniscus lens L1, a surface on the object side of the positive meniscus lens L2, a surface on the image side of the biconvex positive lens L3, both surfaces of the positive meniscus lens L8, both surfaces of the biconvex positive lens L9, both surfaces of the biconcave negative lens L10, and both surfaces of the biconcave negative lens L11.

Figure 38A:
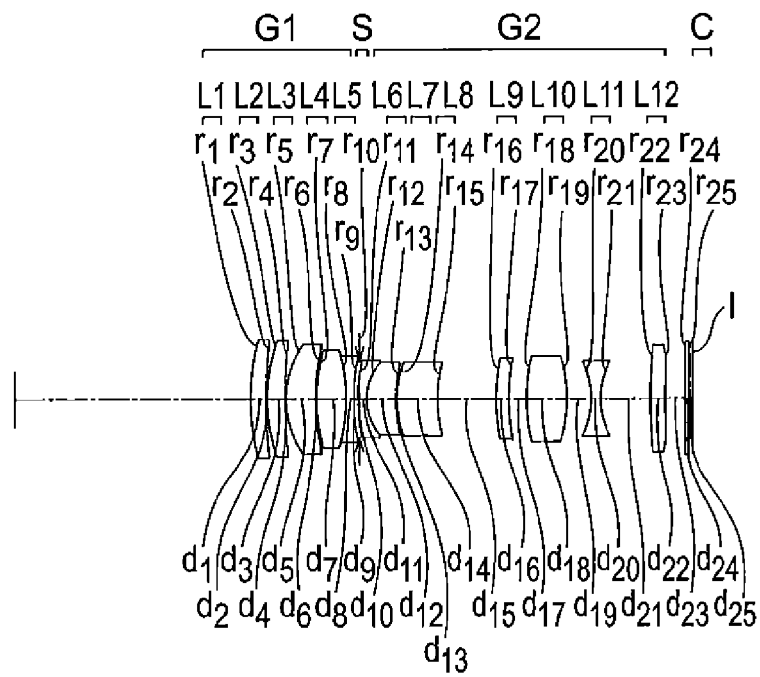
FIG. 38A is a cross-sectional view along an optical axis showing an optical arrangement.
Figures 38B, 38C, 38D, 38E:
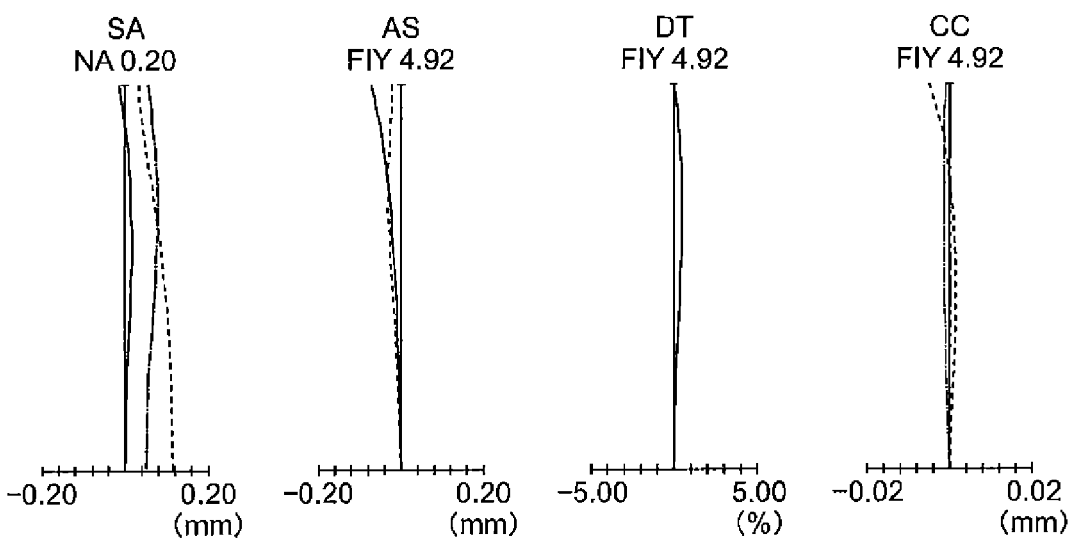
FIG. 38B, FIG. 38C, FIG. 38D, and FIG. 38E are diagrams showing a spherical aberration (SA), an astigmatism (AS), a distortion (DT), and a chromatic aberration of magnification (CC) respectively, of the optical system according to an example 31.

Next, an optical system according to an example 31 will be described below. FIG. 38A is a cross-sectional view along an optical axis showing an optical arrangement of the optical system according to the example 31. Moreover, FIG. 38B, FIG. 38C, FIG. 38D, and FIG. 38E are aberration diagrams of the optical system according to the example 31.

The optical system according to the example 31, as shown in FIG. 38A, includes a first lens unit G1 having a positive refractive power, an aperture stop S, and a second lens unit G2 having a negative refractive power.

The first lens unit G1 includes a positive meniscus lens L1 having a convex surface directed toward an object side, a positive meniscus lens L2 having a convex surface directed toward the object side, a positive meniscus lens L3 having a convex surface directed toward the object side, a biconvex positive lens L4, and a biconcave negative lens L5. The biconvex positive lens L4 and the biconcave negative lens L5 are cemented.

The second lens unit G2 includes a negative meniscus lens L6 having a convex surface directed toward the object side, a positive meniscus lens L7 having a convex surface directed toward the object side, a positive meniscus lens L8 having a convex surface directed toward the object side, a positive meniscus lens L9 having a convex surface directed toward the object side, a biconvex positive lens L10, a biconcave negative lens L11, and a positive meniscus lens L12 having a convex surface directed toward the object side. The negative meniscus lens L6 and the positive meniscus lens L7 are cemented. A predetermined lens unit includes the biconcave negative lens L11 and the positive meniscus lens L12.

The aperture stop S is disposed between the biconcave negative lens L5 and the negative meniscus lens L6.

An aspheric surface is provided to 14 surfaces namely, both surfaces of the positive meniscus lens L1, a surface on the object side of the positive meniscus lens L2, a surface on an image side of the positive meniscus lens L3, both surfaces of the positive meniscus lens L8, both surfaces of the positive meniscus lens L9, both surfaces of the biconvex positive lens L10, both surfaces of the biconcave negative lens L11, and both surfaces of the positive meniscus lens L12.

Figure 39A:
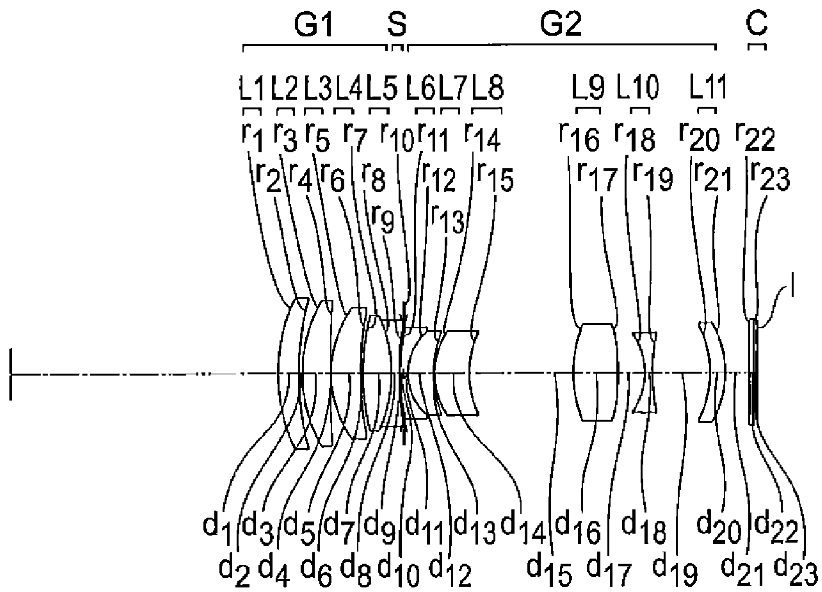
FIG. 39A is a cross-sectional view along an optical axis showing an optical arrangement.
Figures 39B, 39C, 39D, 39E:
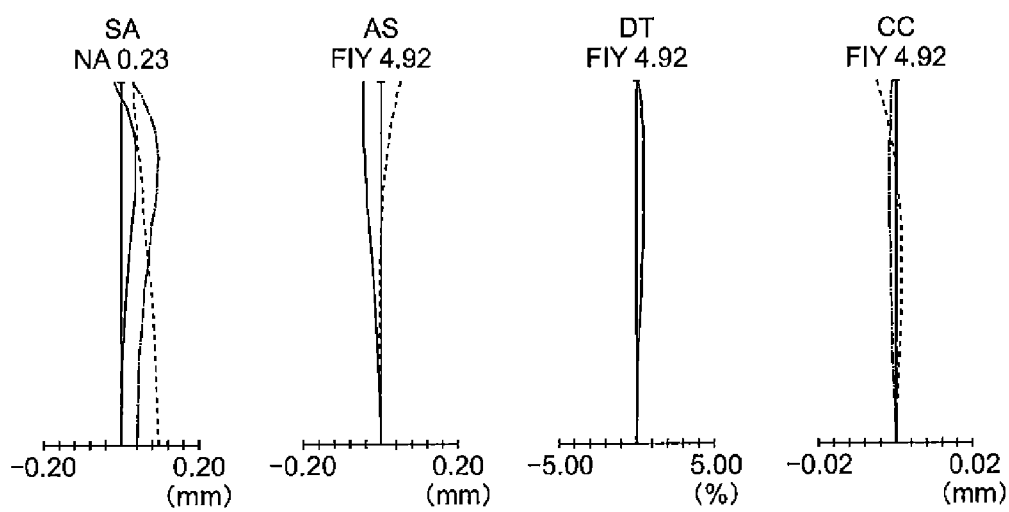
FIG. 39B, FIG. 39C, FIG. 39D, and FIG. 39E are diagrams showing a spherical aberration (SA), an astigmatism (AS), a distortion (DT), and a chromatic aberration of magnification (CC) respectively, of the optical system according to an example 32.

Next, an optical system according to an example 32 will be described below. FIG. 39A is a cross-sectional view along an optical axis showing an optical arrangement of the optical system according to the example 32. Moreover, FIG. 39B, FIG. 39C, FIG. 39D, and FIG. 39E are aberration diagrams of the optical system according to the example 32.

The optical system according to the example 32, as shown in FIG. 39A, includes a first lens unit G1 having a positive refractive power, an aperture stop S, and a second lens unit G2 having a negative refractive power.

The first lens unit G1 includes a positive meniscus lens L1 having a convex surface directed toward an object side, a positive meniscus lens L2 having a convex surface directed toward the object side, a positive meniscus lens L3 having a convex surface directed toward the object side, a biconvex positive lens L4, and a biconcave negative lens L5. The biconvex positive lens L4 and the biconcave negative lens L5 are cemented.

The second lens unit G2 includes a negative meniscus lens L6 having a convex surface directed toward the object side, a positive meniscus lens L7 having a convex surface directed toward the object side, a positive meniscus lens L8 having a convex surface directed toward the object side, a biconvex positive lens L9, a biconcave negative lens L10, and a positive meniscus lens L11 having a convex surface directed toward an image side. The negative meniscus lens L6 and the positive meniscus lens L7 are cemented. A predetermined lens unit includes the biconcave negative lens L10 and the positive meniscus lens L11.

The aperture stop S is disposed between the biconcave negative lens L5 and the negative meniscus lens L6.

An aspheric surface is provided to 12 surfaces namely, both surfaces of the positive meniscus lens L1, a surface on the object side of the positive meniscus lens L2, a surface on the image side of the positive meniscus lens L3, both surfaces of the positive meniscus lens L8, both surfaces of the biconvex positive lens L9, both surfaces of the biconcave negative lens L10, and both surfaces of the positive meniscus lens L11.

Figure 40A:
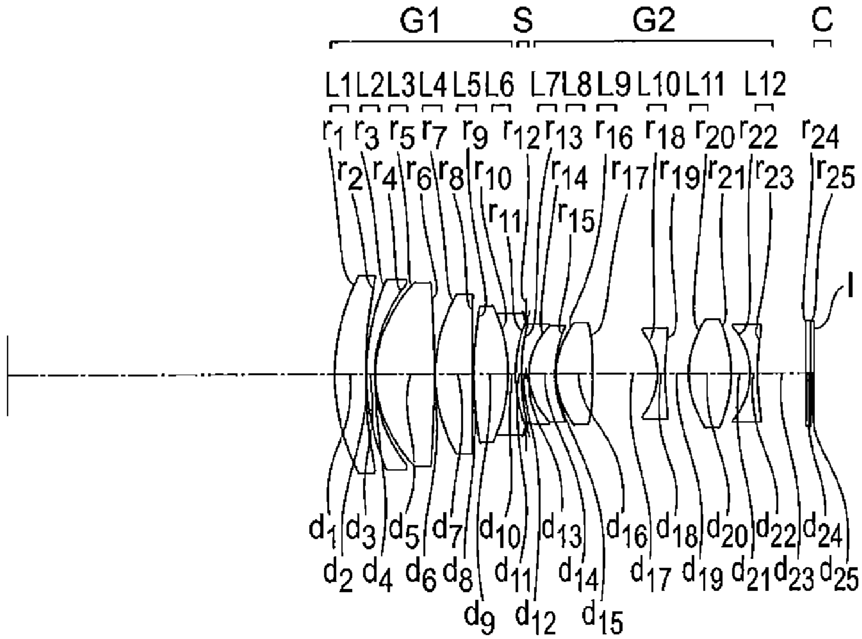
FIG. 40A is a cross-sectional view along an optical axis showing an optical arrangement.
Figures 40B, 40C, 40D, 40E:
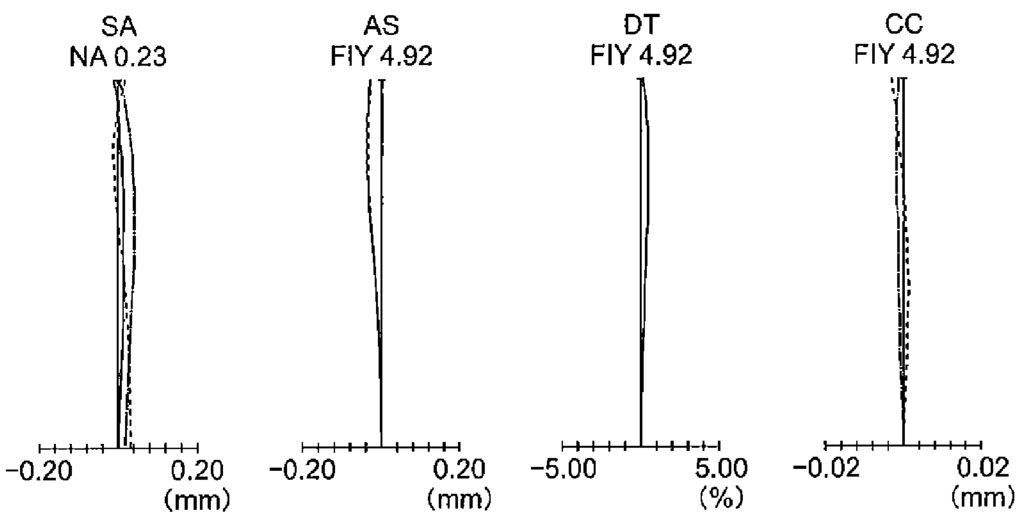
FIG. 40B, FIG. 40C, FIG. 40D, and FIG. 40E are diagrams showing a spherical aberration (SA), an astigmatism (AS), a distortion (DT), and a chromatic aberration of magnification (CC) respectively, of the optical system according to an example 33.

Next, an optical system according to an example 33 will be described below. FIG. 40A is a cross-sectional view along an optical axis showing an optical arrangement of the optical system according to the example 33. Moreover, FIG. 40B, FIG. 40C, FIG. 40D, and FIG. 40E are aberration diagrams of the optical system according to the example 33.

The optical system according to the example 33, as shown in FIG. 40A, includes a first lens unit G1 having a positive refractive power, an aperture stop S, and a second lens unit G2 having a negative refractive power.

The first lens unit G1 includes a positive meniscus lens L1 having a convex surface directed toward an object side, a negative meniscus lens L2 having a convex surface directed toward the object side, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a biconvex positive lens L9, a biconcave negative lens L10, a biconvex positive lens L11, and a biconcave negative lens L12. The negative meniscus lens L7 and the positive meniscus lens L8 are cemented. A predetermine lens unit includes the biconcave negative lens L12.

The aperture stop S is disposed between the biconcave negative lens L6 and the negative meniscus lens L7.

An aspheric surface is provided to 12 surfaces namely, both surfaces of the positive meniscus lens L1, a surface on the object side of the biconvex positive lens L3, a surface on an image side of the biconvex positive lens L4, both surfaces of the biconvex positive lens L9, both surfaces of the biconcave negative lens L10, both surfaces of the biconvex positive lens L11, and both surfaces of the biconcave negative lens L12.

Figure 41A:
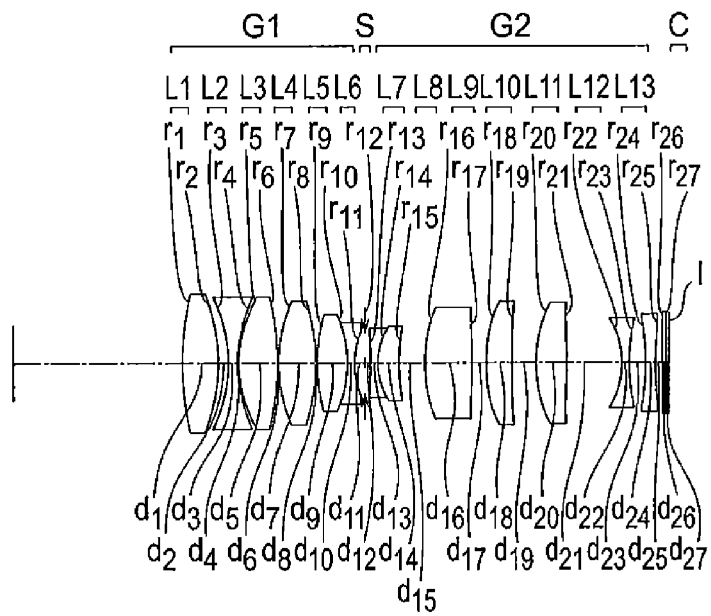
FIG. 41A is a cross-sectional view along an optical axis showing an optical arrangement.
Figures 41B, 41C, 41D, 41E:
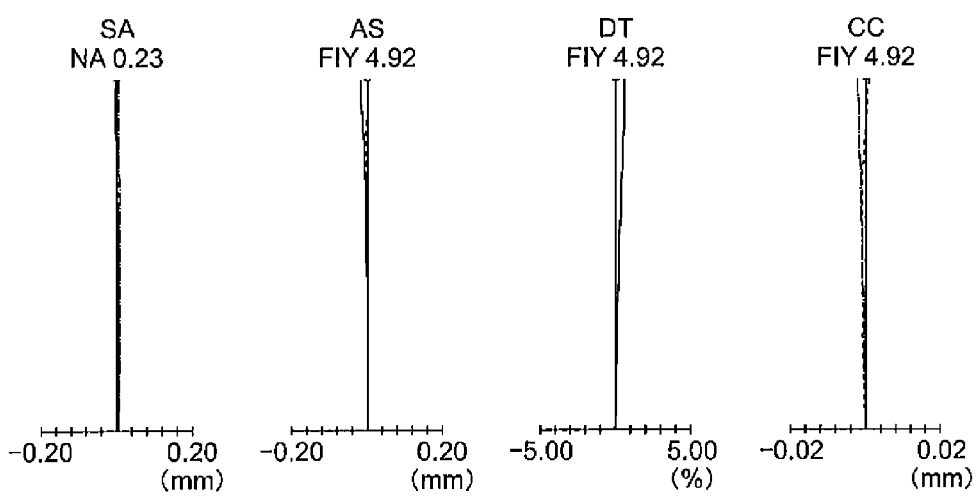
FIG. 41B, FIG. 41C, FIG. 41D, and FIG. 41E are diagrams showing a spherical aberration (SA), an astigmatism (AS), a distortion (DT), and a chromatic aberration of magnification (CC) respectively, of the optical system according to an example 34.

Next, an optical system according to an example 34 will be described below. FIG. 41A is a cross-sectional view along an optical axis showing an optical arrangement of the optical system according to the example 34. Moreover, FIG. 41B, FIG. 41C, FIG. 41D, and FIG. 41E are aberration diagrams of the optical system according to the example 34.

The optical system according to the example 34, as shown in FIG. 41A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a positive meniscus lens L10 having a convex surface directed toward the object side, a biconvex positive lens L11, a biconcave negative lens L12, and a biconcave negative lens L13. The biconcave negative lens L7 and the positive meniscus lens L8 are cemented. A predetermined lens unit includes the biconcave negative lens L12 and the biconcave negative lens L13.

The aperture stop S is disposed between the biconcave negative lens L6 and the biconcave negative lens L7.

An aspheric surface is provided to 15 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the positive meniscus lens L10, both surfaces of the biconvex positive lens L11, both surfaces of the biconcave negative lens L12, and both surfaces of the biconcave negative lens L13.

Figure 42A:
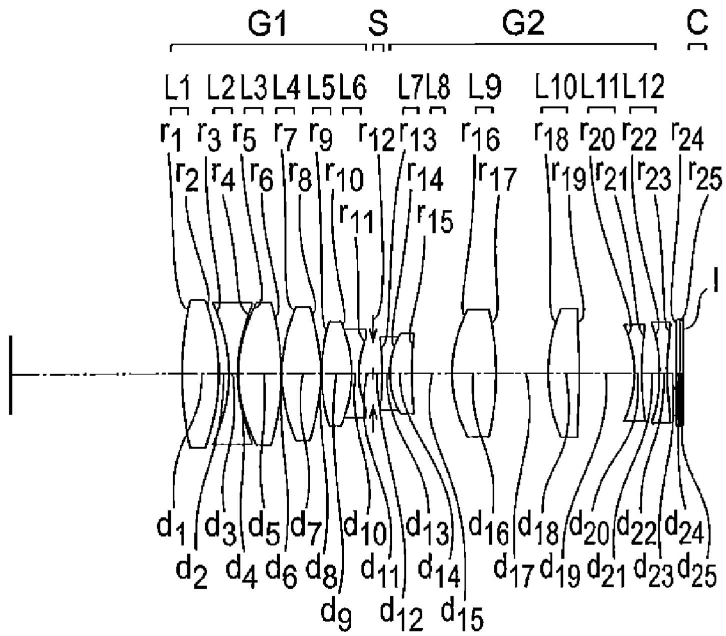
FIG. 42A is a cross-sectional view along an optical axis showing an optical arrangement.
Figures 42B, 42C, 42D, 42E:
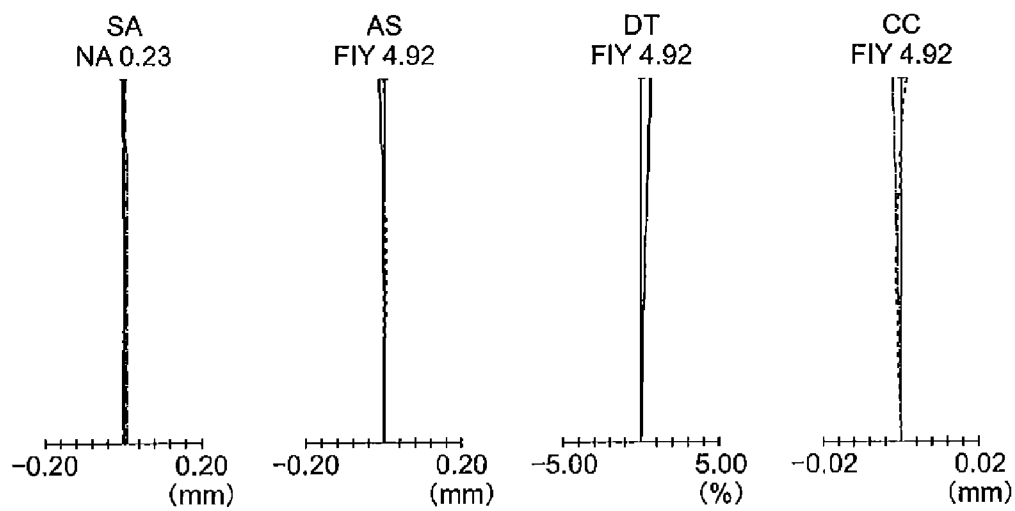
FIG. 42B, FIG. 42C, FIG. 42D, and FIG. 42E are diagrams showing a spherical aberration (SA), an astigmatism (AS), a distortion (DT), and a chromatic aberration of magnification (CC) respectively, of the optical system according to an example 35.

Next, an optical system according to an example 35 will be described below. FIG. 42A is a cross-sectional view along an optical axis showing an optical arrangement of the optical system according to the example 35. Moreover, FIG. 42B, FIG. 42C, FIG. 42D, and FIG. 42E are aberration diagrams of the optical system according to the example 35.

The optical system according to the example 35, as shown in FIG. 42A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a biconvex positive lens L10, a biconcave negative lens L11, and a biconcave negative lens L12. The biconcave negative lens L7 and the positive meniscus lens L8 are cemented. A predetermined lens unit includes the biconcave negative lens L11 and the biconcave negative lens L12.

The aperture stop S is disposed between the biconcave negative lens L6 and the biconcave negative lens L7.

An aspheric surface is provided to 13 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the biconvex positive lens L10, both surfaces of the biconcave negative lens L11, and both surfaces of the biconcave negative lens L12.

Next, an optical system according to an example 36 will be described below. FIG. 43A is a cross-sectional view along an optical axis showing an optical arrangement of the optical system according to the example 36. Moreover, FIG. 43B, FIG. 43C, FIG. 43D, and FIG. 43E are aberration diagrams of the optical system according to the example 36.

The optical system according to the example 36, as shown in FIG. 43A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a biconvex positive lens L10, and a biconcave negative lens L11. The biconcave negative lens L7 and the positive meniscus lens L8 are cemented. A predetermined lens unit includes the biconcave negative lens L11.

The aperture stop S is disposed between the biconcave negative lens L6 and the biconcave negative lens L7.

An aspheric surface is provided to 11 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the biconvex positive lens L10, and both surfaces of the biconcave negative lens L11.

Figure 44A:
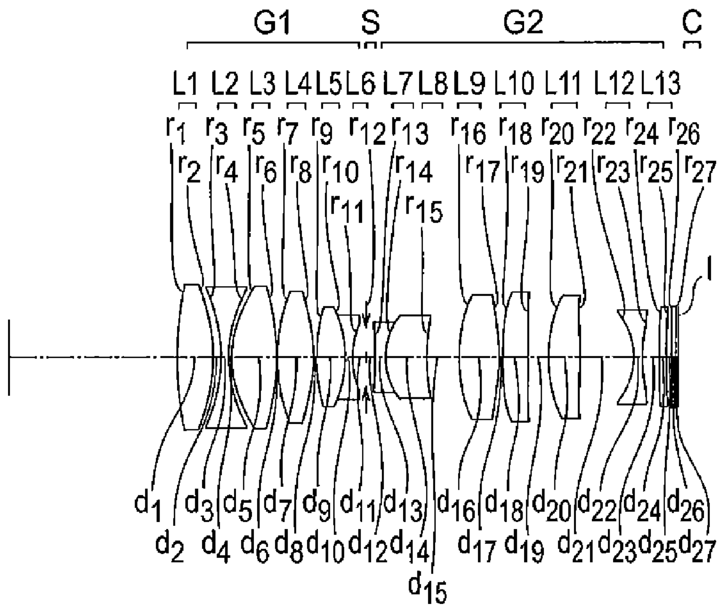
FIG. 44A is a cross-sectional view along an optical axis showing an optical arrangement.
Figures 44B, 44C, 44D, 44E:
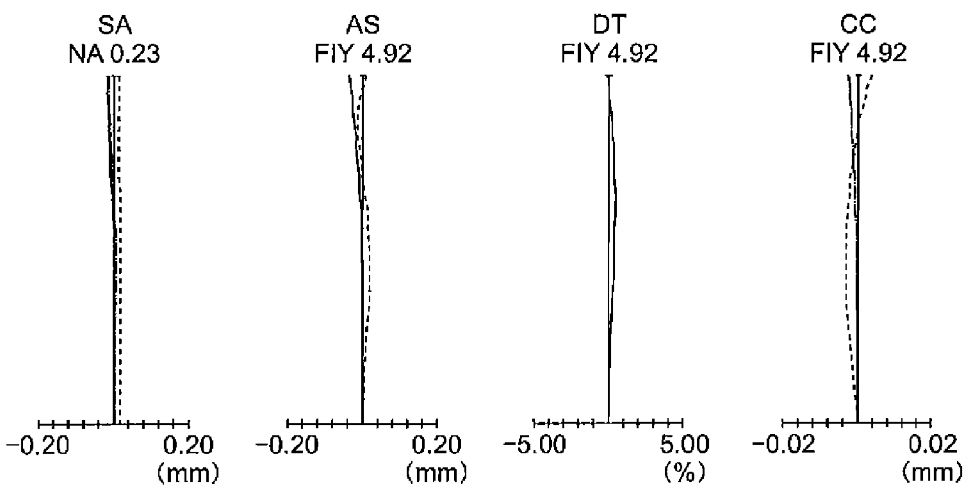
FIG. 44B, FIG. 44C, FIG. 44D, and FIG. 44E are diagrams showing a spherical aberration (SA), an astigmatism (AS), a distortion (DT), and a chromatic aberration of magnification (CC) respectively, of the optical system according to an example 37.

Next, an optical system according to an example 37 will be described below. FIG. 44A is a cross-sectional view along an optical axis showing an optical arrangement of the optical system according to the example 37. Moreover, FIG. 44B, FIG. 44C, FIG. 44D, and FIG. 44E are aberration diagrams of the optical system according to the example 37.

The optical system according to the example 37, as shown in FIG. 44A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a biconvex positive lens L10, a biconvex positive lens L11, a biconcave negative lens L12, and a positive meniscus lens L13 having a convex surface directed toward the object side. The biconcave negative lens L7 and the positive meniscus lens L8 are cemented. A predetermined lens unit includes the biconcave negative lens L12 and the positive meniscus lens L13.

The aperture stop S is disposed between the biconcave negative lens L6 and the biconcave negative lens L7.

An aspheric surface is provided to 13 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the biconvex positive lens L10, both surfaces of the biconvex positive lens L11, and both surfaces of the biconcave negative lens L12.

Figure 45A:
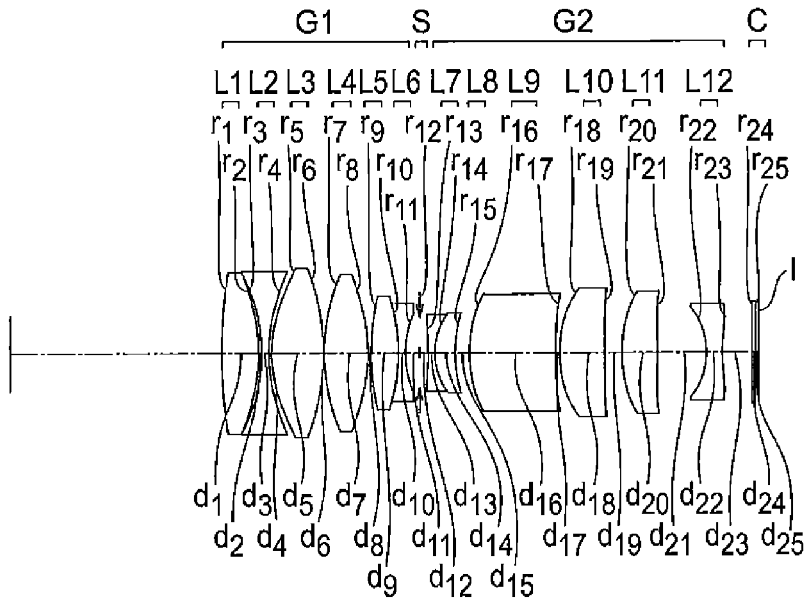
FIG. 45A is a cross-sectional view along an optical axis showing an optical arrangement.
Figures 45B, 45C, 45D, 45E:
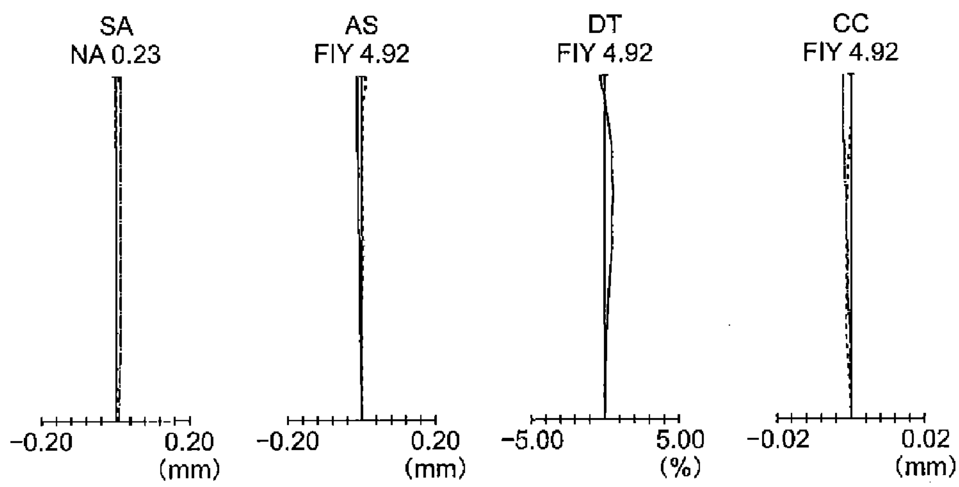
FIG. 45B, FIG. 45C, FIG. 45D, and FIG. 45E are diagrams showing a spherical aberration (SA), an astigmatism (AS), a distortion (DT), and a chromatic aberration of magnification (CC) respectively, of the optical system according to an example 38.

Next, an optical system according to an example 38 will be described below. FIG. 45A is a cross-sectional view along an optical axis showing an optical arrangement of the optical system according to the example 38. Moreover, FIG. 45B, FIG. 45C, FIG. 45D, and FIG. 45E are aberration diagrams of the optical system according to the example 38.

The optical system according to the example 38, as shown in FIG. 45A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a positive meniscus lens L9 having a convex surface directed toward the object side, a biconvex positive lens L10, a biconvex positive lens L11, and a biconcave negative lens L12. The biconcave negative lens L7 and the positive meniscus lens L8 are cemented. The predetermined lens unit includes the biconcave negative lens L12.

The aperture stop S is disposed between the biconcave negative lens L6 and the biconcave negative lens L7.

An aspheric surface is provided to 13 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the positive meniscus lens L9, both surfaces of the biconvex positive lens L10, both surfaces of the biconvex positive lens L11, and both surfaces of the biconcave negative lens L12.

Figure 46A:
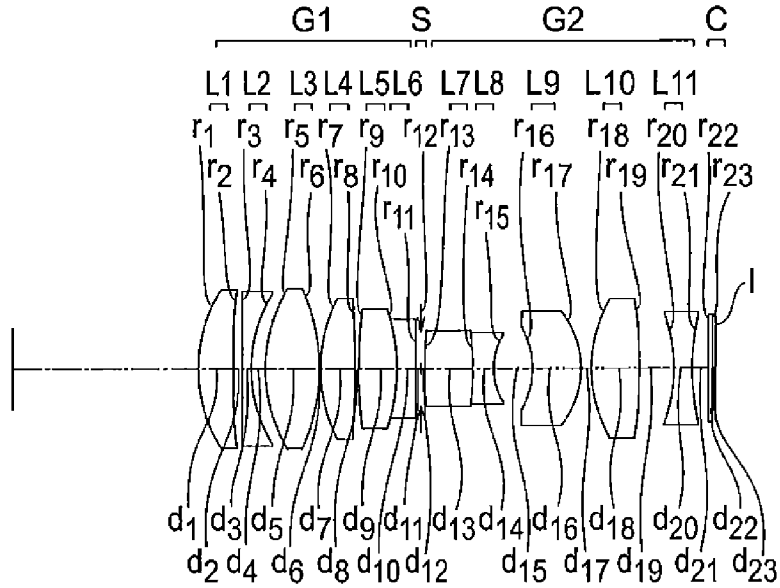
FIG. 46A is a cross-sectional view along an optical axis showing an optical arrangement.
Figures 46B, 46C, 46D, 46E:
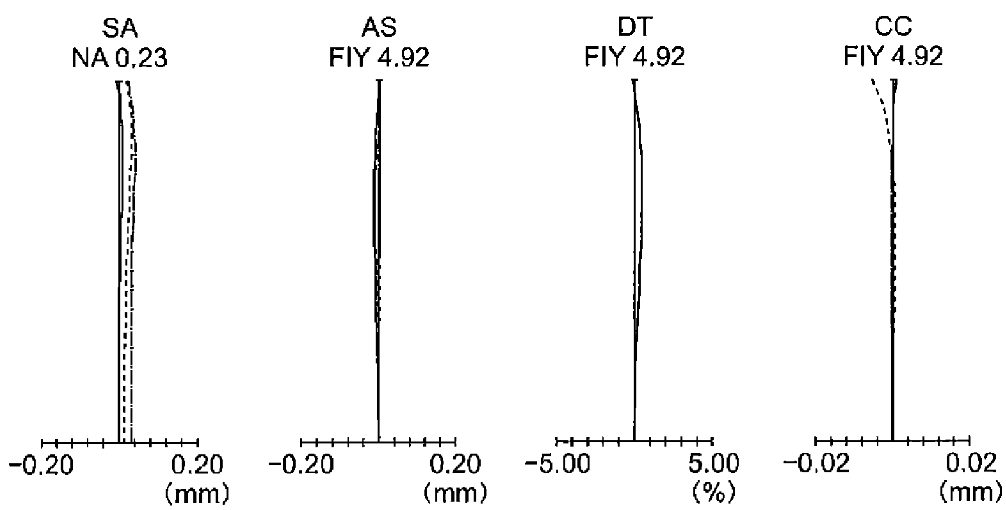
FIG. 46B, FIG. 46C, FIG. 46D, and FIG. 46E are diagrams showing a spherical aberration (SA), an astigmatism (AS), a distortion (DT), and a chromatic aberration of magnification (CC) respectively, of the optical system according to an example 39.

Next, an optical system according to an example 39 will be described below. FIG. 46A is a cross-sectional view along an optical axis showing an optical arrangement of the optical system according to the example 39. Moreover, FIG. 46B, FIG. 46C, FIG. 46D, and FIG. 46E are aberration diagrams of the optical system according to the example 39.

The optical system according to the example 39, as shown in FIG. 46A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a biconvex positive lens L4, a biconvex positive lens L5, and a negative meniscus lens L6 having a convex surface directed toward an image side. The biconvex positive lens L5 and the negative meniscus lens L6 are cemented.

The second lens unit G2 includes a biconvex positive lens L7, a biconcave negative lens L8, a negative meniscus lens L9 having a convex surface directed toward the image side, a biconvex positive lens L10, and a biconcave negative lens L11. The biconvex positive lens L7 and the biconcave negative lens L8 are cemented. A predetermined lens unit includes the biconcave negative lens L11.

The aperture stop S is disposed between the negative meniscus lens L6 and the biconvex positive lens L7.

An aspheric surface is provided to 10 surfaces namely, both surfaces of the biconvex positive lens L1, a surface on an object side of the biconvex positive lens L3, a surface on the image side of the biconvex positive lens L4, both surfaces of the negative meniscus lens L9, both surfaces of the biconvex positive lens L10, and both surfaces of the biconcave negative lens L11.

Figure 47A:
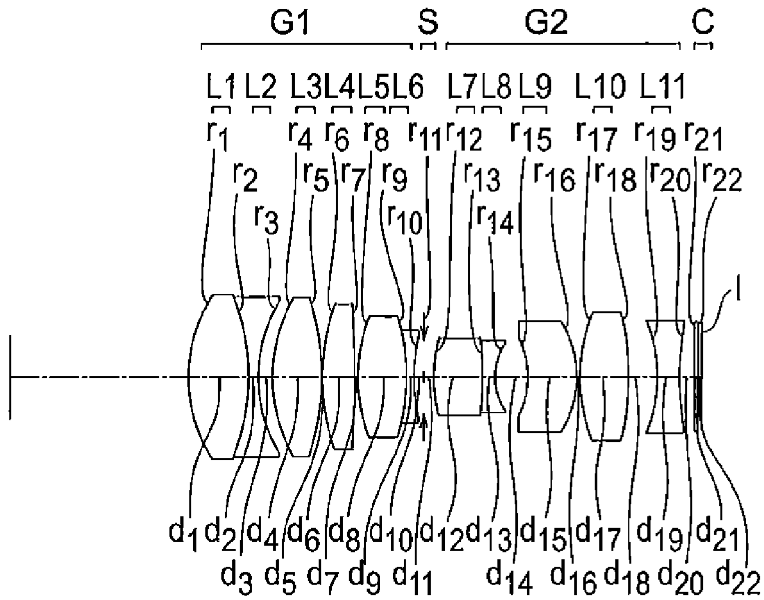
FIG. 47A is a cross-sectional view along an optical axis showing an optical arrangement.
Figures 47B, 47C, 47D, 47E:
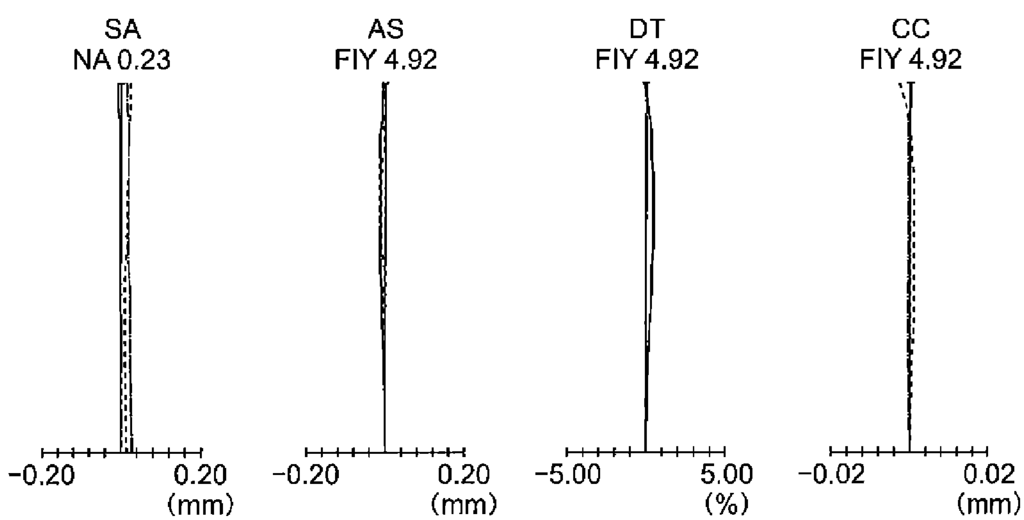
FIG. 47B, FIG. 47C, FIG. 47D, and FIG. 47E are diagrams showing a spherical aberration (SA), an astigmatism (AS), a distortion (DT), and a chromatic aberration of magnification (CC) respectively, of the optical system according to an example 40.

Next, an optical system according to an example 40 will be described below. FIG. 47A is a cross-sectional view along an optical axis showing an optical arrangement of the optical system according to the example 40. Moreover, FIG. 47B, FIG. 47C, FIG. 47D, and FIG. 47E are aberration diagrams of the optical system according to the example 40.

The optical system according to the example 40, as shown in FIG. 47A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L1 and the biconcave negative lens L2 are cemented. Moreover, the biconvex positive lens L5 and the biconcave negative lens L6 are cemented.

The second lens unit G2 includes a biconvex positive lens L7, a biconcave negative lens L8, a negative meniscus lens L9 having a convex surface directed toward an image side, a biconvex positive lens L10, and a biconcave negative lens L11. The biconvex positive lens L7 and the biconcave negative lens L8 are cemented. A predetermined lens unit includes the biconcave negative lens L11.

The aperture stop S is disposed between the biconcave negative lens L6 and the biconvex positive lens L7.

An aspheric surface is provided to 11 surfaces namely, a surface on an object side of the biconvex positive lens L1, a cemented surface of the biconvex positive lens L1 and the biconcave negative lens L2, a surface on the image side of the biconcave negative lens L2, a surface on the object side of the biconvex positive lens L3, a surface on the image side of the biconvex positive lens L4, both surfaces of the negative meniscus lens L9, both surfaces of the biconvex positive lens L10, and both surfaces of the biconcave negative lens L11.

Next, an optical system according to an example 41 will be described below. FIG. 48A is a cross-sectional view along an optical axis showing an optical arrangement of the optical system according to the example 41. Moreover, FIG. 48B, FIG. 48C, FIG. 48D, and FIG. 48E are aberration diagrams of the optical system according to the example 41.

The optical system according to the example 41, as shown in FIG. 48A, includes a first lens unit G1 having a positive refractive power, an aperture stop S, and a second lens unit G2 having a positive refractive power.

The first lens unit G1 includes a negative meniscus lens L1 having a convex surface directed toward an object side, a biconvex positive lens L2, a biconcave negative lens L3, a biconvex positive lens L4, a biconvex positive lens L5, and a biconcave negative lens L6. The negative meniscus lens L1 and the biconvex positive lens L2 are cemented. Moreover, the biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a positive meniscus lens L9 having a convex surface directed toward the object side, a biconvex positive lens L10, a negative meniscus lens L11 having a convex surface directed toward the object side, a negative meniscus lens L12 having a convex surface directed toward an image side, and a biconcave negative lens L13. The negative meniscus lens L7 and the positive meniscus lens L8 are cemented. A predetermined lens unit includes the biconcave negative lens L13.

The aperture stop S is disposed between the biconcave negative lens L6 and the negative meniscus lens L7.

An aspheric surface is provided to eight surfaces namely, both surfaces of the biconcave negative lens L3, both surfaces of the biconvex positive lens L4, both surfaces of the biconvex positive lens L10, and both surfaces of the biconcave negative lens L13.

Figure 49A:
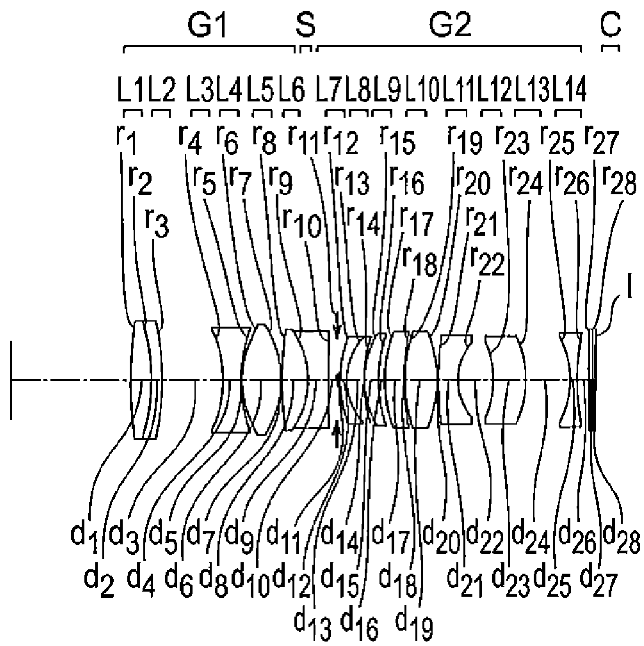
FIG. 49A is a cross-sectional view along an optical axis showing an optical arrangement.
Figures 49B, 49C, 49D, 49E:
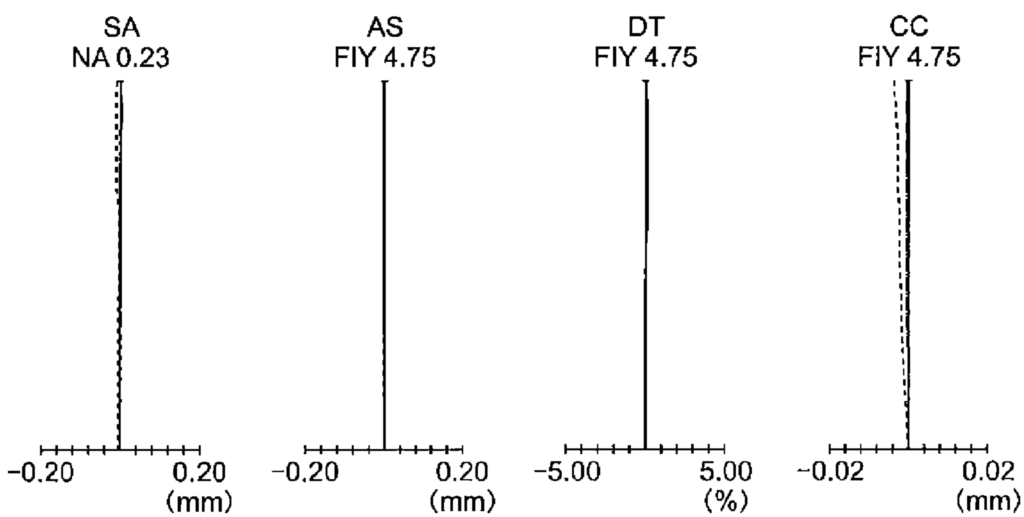
FIG. 49B, FIG. 49C, FIG. 49D, and FIG. 49E are diagrams showing a spherical aberration (SA), an astigmatism (AS), a distortion (DT), and a chromatic aberration of magnification (CC) respectively, of the optical system according to an example 42.

Next, an optical system according to an example 42 will be described below. FIG. 49A is a cross-sectional view along an optical axis showing an optical arrangement of the optical system according to the example 42. Moreover, FIG. 49B, FIG. 49C, FIG. 49D, and FIG. 49E are aberration diagrams of the optical system according to the example 42.

The optical system according to the example 42, as shown in FIG. 49A, includes a first lens unit G1 having a positive refractive power, an aperture stop S, and a second lens unit G2 having a positive refractive power.

The first lens unit G1 includes a biconvex positive lens L1, a negative meniscus lens L2 having a convex surface directed toward an image side, a biconcave negative lens L3, a biconvex positive lens L4, a biconvex positive lens L5, and a biconcave negative lens L6. The biconvex positive lens L1 and the negative meniscus lens L2 are cemented. Moreover, the biconvex positive lens L5 and the biconcave negative lens L6 are cemented.

The second lens unit G2 includes a negative meniscus lens L7 having a convex surface directed toward an object side, a positive meniscus lens L8 having a convex surface directed toward the object side, a positive meniscus lens L9 having a convex surface directed toward the object side, a positive meniscus lens L10 having a convex surface directed toward the object side, a biconvex positive lens L11, a negative meniscus lens L12 having a convex surface directed toward the object side, a negative meniscus lens L13 having a convex surface directed toward the image side, and a biconcave negative lens L14. The negative meniscus lens L7 and the positive meniscus lens L8 are cemented. A predetermined lens unit includes the biconcave negative lens L14.

The aperture stop S is disposed between the biconcave negative lens L6 and the negative meniscus lens L7.

An aspheric surface is provided to eight surfaces namely, both surfaces of the biconcave negative lens L3, both surfaces of the biconvex positive lens L4, both surfaces of the biconvex positive lens L11, and both surfaces of the biconcave negative lens L14.

Figure 50A:
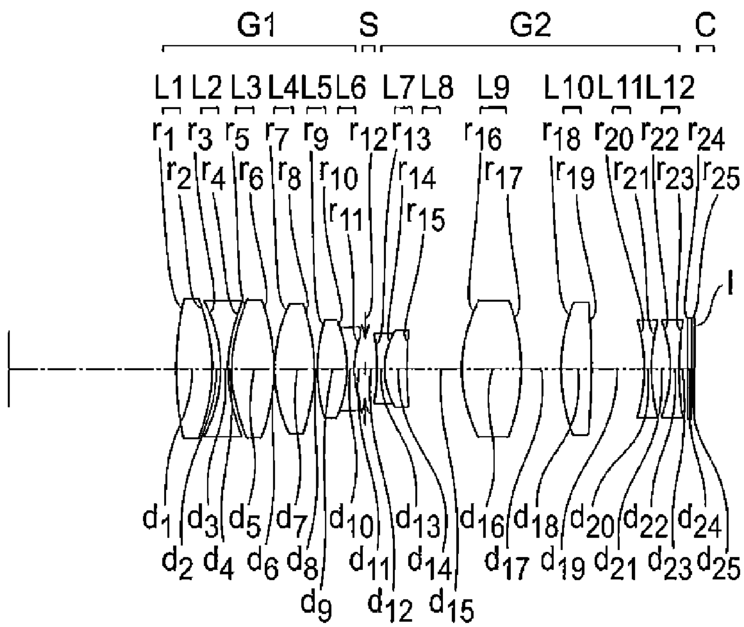
FIG. 50A is a cross-sectional view along an optical axis showing an optical arrangement.
Figures 50B, 50C, 50D, 50E:
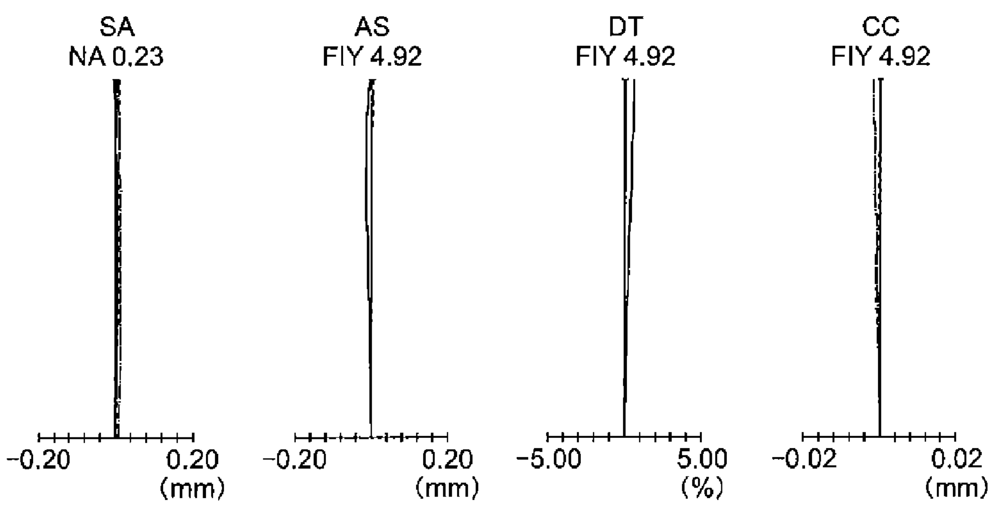
FIG. 50B, FIG. 50C, FIG. 50D, and FIG. 50E are diagrams showing a spherical aberration (SA), an astigmatism (AS), a distortion (DT), and a chromatic aberration of magnification (CC) respectively, of the optical system according to an example 43.

Next, an optical system according to an example 43 will be described below. FIG. 50A is a cross-sectional view along an optical axis showing an optical arrangement of the optical system according to the example 43. Moreover, FIG. 50B, FIG. 50C, FIG. 50D, and FIG. 50E are aberration diagrams of the optical system according to the example 43.

The optical system according to the example 43, as shown in FIG. 50A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a biconvex positive lens L10, a biconcave negative lens L11, and a biconcave negative lens L12. The biconcave negative lens L7 and the positive meniscus lens L8 are cemented. A predetermined lens unit includes the biconcave negative lens L11 and the biconcave negative lens L12.

The aperture stop S is disposed between the biconcave negative lens L6 and the biconcave negative lens L7.

An aspheric surface is provided to 13 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the biconvex positive lens L10, both surfaces of the biconcave negative lens L11, and both surfaces of the biconcave negative lens L12.

Figure 51A:
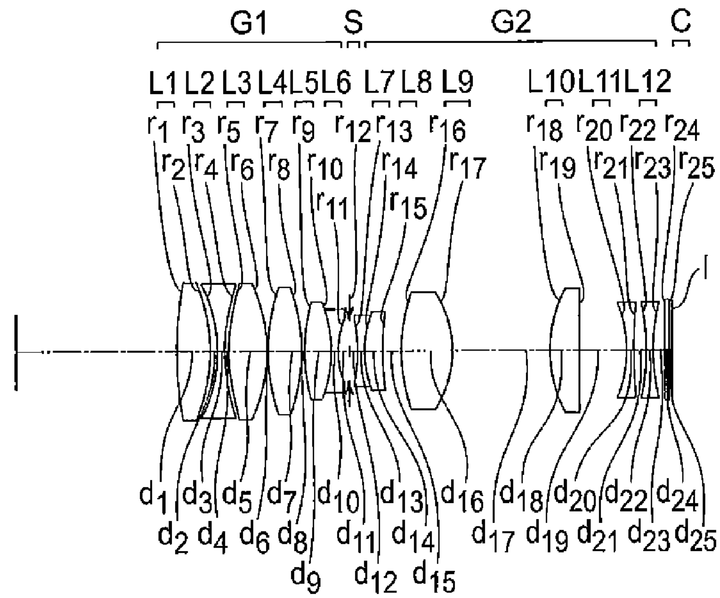
FIG. 51A is a cross-sectional view along an optical axis showing an optical arrangement.
Figures 51B, 51C, 51D, 51E:
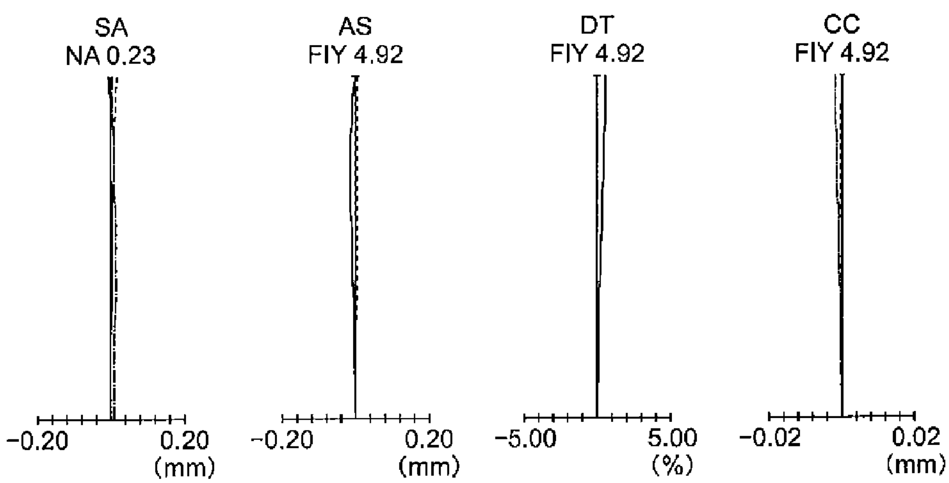
FIG. 51B, FIG. 51C, FIG. 51D, and FIG. 51E are diagrams showing a spherical aberration (SA), an astigmatism (AS), a distortion (DT), and a chromatic aberration of magnification (CC) respectively, of the optical system according to an example 44.

Next, an optical system according to an example 44 will be described below. FIG. 51A is a cross-sectional view along an optical axis showing an optical arrangement of the optical system according to the example 44. Moreover, FIG. 51B, FIG. 51C, FIG. 51D, and FIG. 51E are aberration diagrams of the optical system according to the example 44.

The optical system according to the example 44, as shown in FIG. 51A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a positive meniscus lens L10 having a convex surface directed toward the object side, a biconcave negative lens L11, and a biconcave negative lens L12. The biconcave negative lens L7 and the positive meniscus lens L8 are cemented. A predetermined lens unit includes the biconcave negative lens L11 and the biconcave negative lens L12.

The aperture stop S is disposed between the biconcave negative lens L6 and the biconcave negative lens L7.

An aspheric surface is provided to 13 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the positive meniscus lens L10, both surfaces of the biconcave negative lens L11, and both surfaces of the biconcave negative lens L12.

Figure 52A:
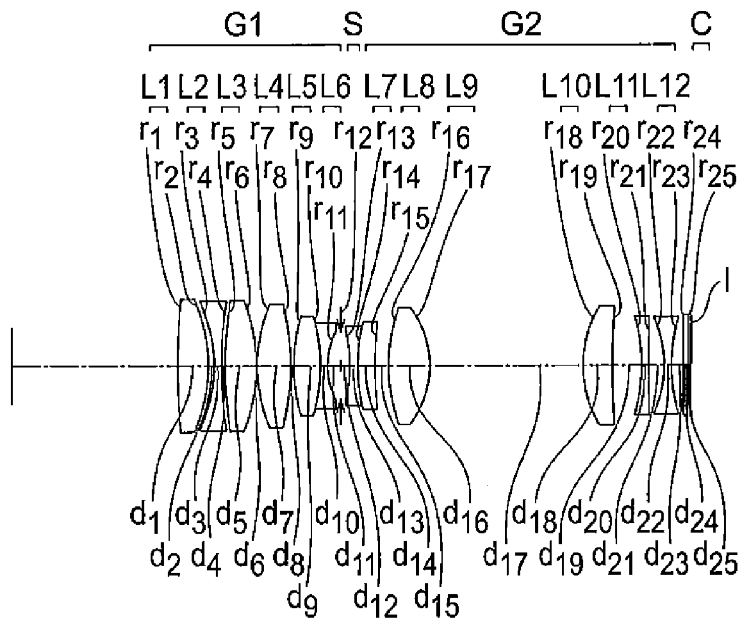
FIG. 52A is a cross-sectional view along an optical axis showing an optical arrangement.
Figure 52B:
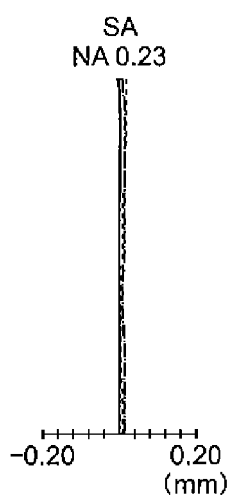
FIG. 52B, FIG. 52C, FIG. 52D, and FIG. 52E are diagrams showing a spherical aberration (SA), an astigmatism (AS), a distortion (DT), and a chromatic aberration of magnification (CC) respectively, of the optical system according to an example 45.
Figure 52C:
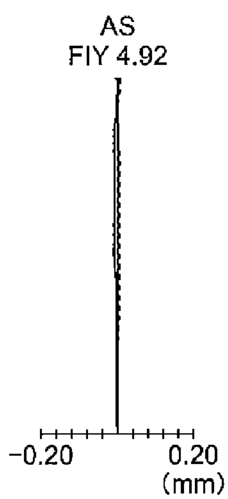
Figure 52D:
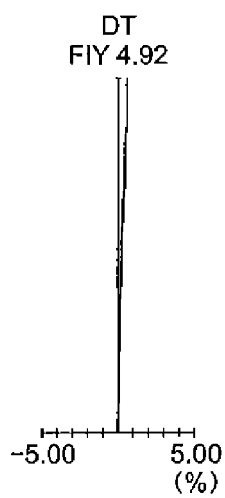
Figure 52E:
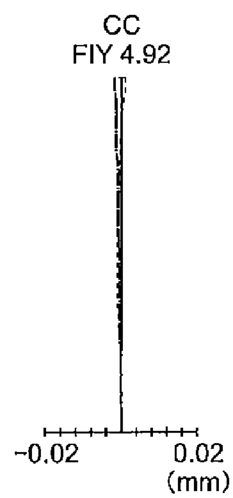

Next, an optical system according to an example 45 will be described below. FIG. 52A is a cross-sectional view along an optical axis showing an optical arrangement of the optical system according to the example 45. Moreover, FIG. 52B, FIG. 52C, FIG. 52D, and FIG. 52E are aberration diagrams of the optical system according to the example 45.

The optical system according to the example 45, as shown in FIG. 52A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a positive meniscus lens L10 having a convex surface directed toward the object side, a biconcave negative lens L11, and a biconcave negative lens L12. The biconcave negative lens L7 and the positive meniscus lens L8 are cemented. A predetermined lens unit includes the biconcave negative lens L11 and the biconcave negative lens L12.

The aperture stop S is disposed between the biconcave negative lens L6 and the biconcave negative lens L7.

An aspheric surface is provided to 13 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the positive meniscus lens L10, both surfaces of the biconcave negative lens L11, and both surfaces of the biconcave negative lens L12.

Figure 53A:
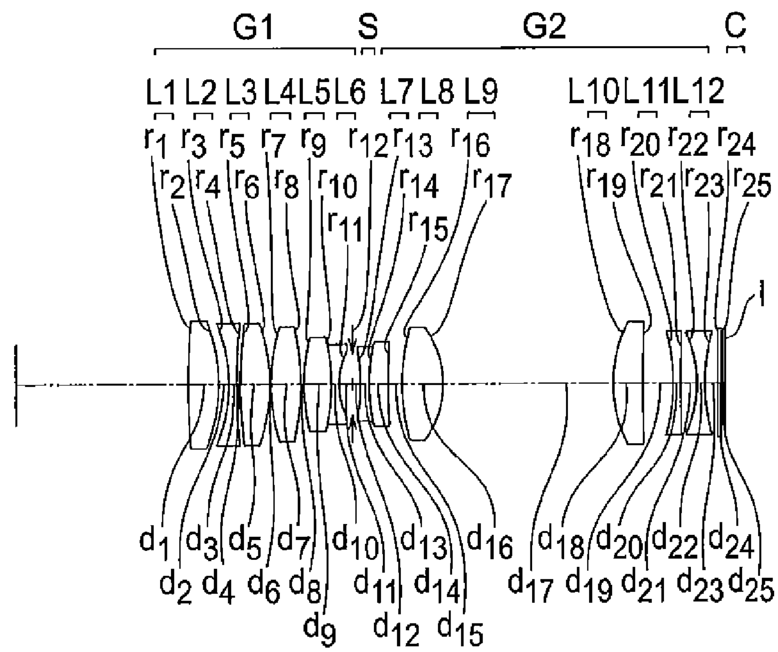
FIG. 53A is a cross-sectional view along an optical axis showing an optical arrangement.
Figures 53B, 53C, 53D, 53E:
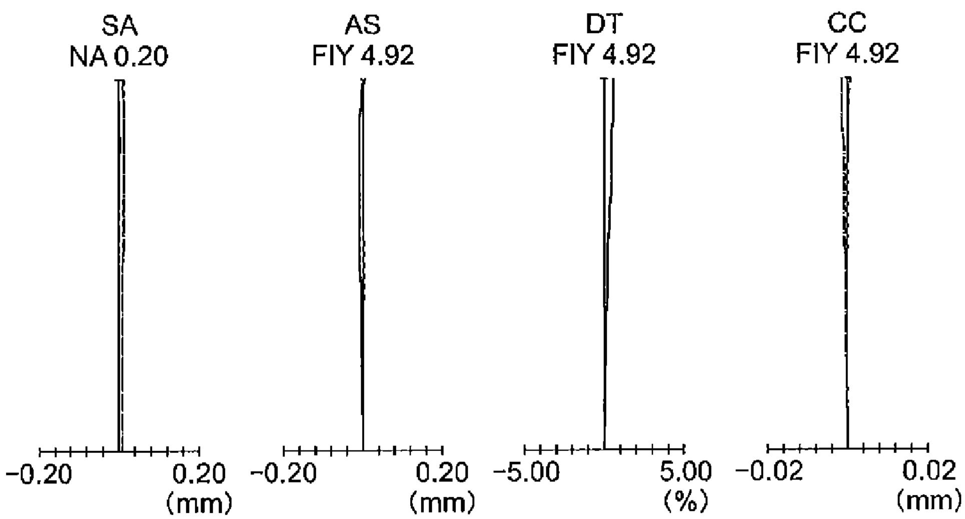
FIG. 53B, FIG. 53C, FIG. 53D, and FIG. 53E are diagrams showing a spherical aberration (SA), an astigmatism (AS), a distortion (DT), and a chromatic aberration of magnification (CC) respectively, of the optical system according to an example 46.

Next, an optical system according to an example 46 will be described below. FIG. 53A is a cross-sectional view along an optical axis showing an optical arrangement of the optical system according to the example 46. Moreover, FIG. 53B, FIG. 53C, FIG. 53D, and FIG. 53E are aberration diagrams of the optical system according to the example 46.

The optical system according to the example 46, as shown in FIG. 53A, includes a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a positive meniscus lens L10 having a convex surface directed toward the object side, a biconcave negative lens L11, and a biconcave negative lens L12. The biconcave negative lens L7 and the positive meniscus lens L8 are cemented. A predetermined lens unit includes the biconcave negative lens L11 and the biconcave negative lens L12.

The aperture stop S is disposed between the biconcave negative lens L6 and the biconcave negative lens L7.

An aspheric surface is provided to 13 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the positive meniscus lens L10, both surfaces of the biconcave negative lens L11, and both surfaces of the biconcave negative lens L12.

Figure 54A:
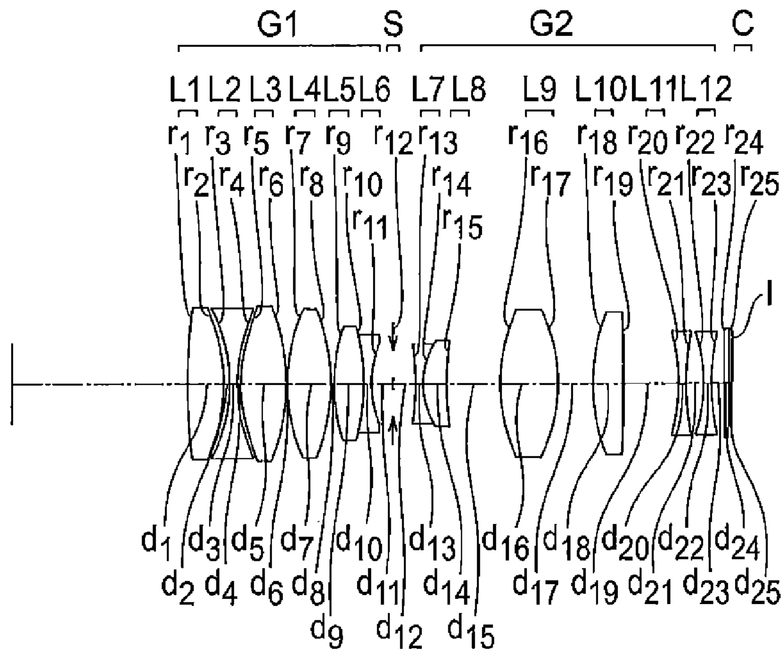
FIG. 54A is a cross-sectional view along an optical axis showing an optical arrangement.
Figure 54B:
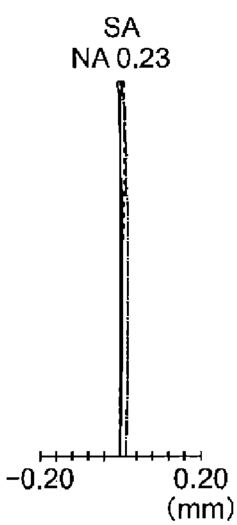
FIG. 54B, FIG. 54C, FIG. 54D, and FIG. 54E are diagrams showing a spherical aberration (SA), an astigmatism (AS), a distortion (DT), and a chromatic aberration of magnification (CC) respectively, of the optical system according to an example 47.
Figure 54C:
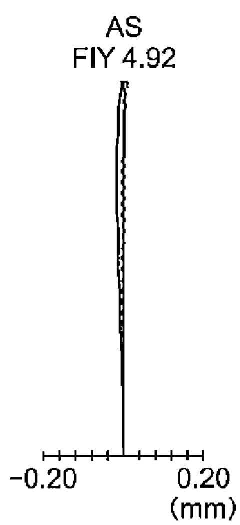
Figure 54D:
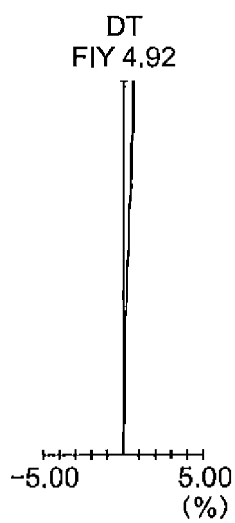
Figure 54E:
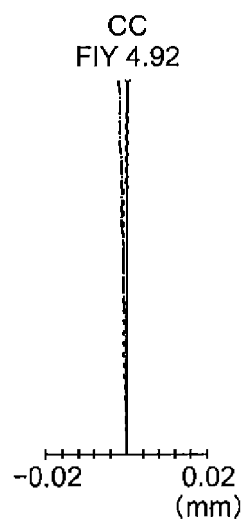

Next, an optical system according to an example 47 will be described below. FIG. 54A is a cross-sectional view along an optical axis showing an optical arrangement of the optical system according to the example 47. Moreover, FIG. 54B, FIG. 54C, FIG. 54D, and FIG. 54E are aberration diagrams of the optical system according to the example 47.

The optical system according to the example 47, as shown in FIG. 54A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward an object side, a biconvex positive lens L9, a biconvex positive lens L10, a biconcave negative lens L11, and a biconcave negative lens L12. The biconcave negative lens L7 and the positive meniscus lens L8 are cemented. A predetermined lens unit includes the biconcave negative lens L11 and the biconcave negative lens L12.

The aperture stop S is disposed between the biconcave negative lens L6 and the biconcave negative lens L7.

An aspheric surface is provided to 13 surfaces namely, a surface on an image side of the biconvex positive lens L1, both surfaces of the biconcave negative lens L2, a surface on the object side of the biconvex positive lens L3, a surface on the image side of the biconvex positive lens L4, both surfaces of the biconvex positive lens L9, both surfaces of the biconvex positive lens L10, both surfaces of the biconcave negative lens L11, and both surfaces of the biconcave negative lens L12.

Figure 55A:
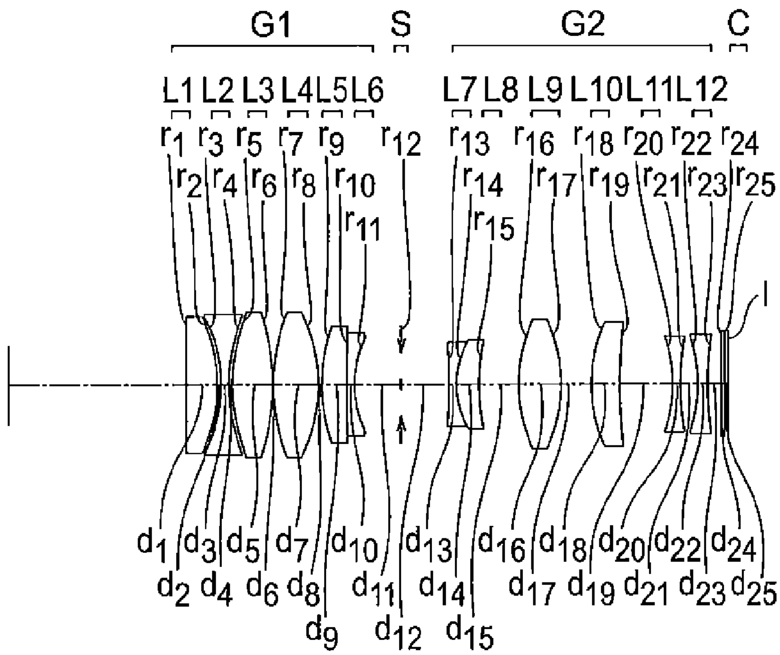
FIG. 55A is a cross-sectional view along an optical axis showing an optical arrangement.
Figure 55B:
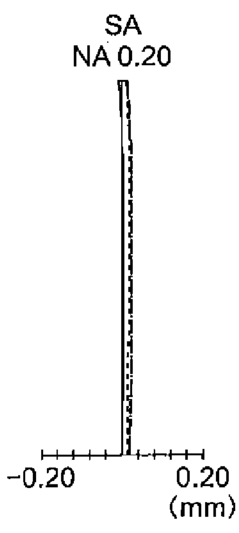
FIG. 55B, FIG. 55C, FIG. 55D, and FIG. 55E are diagrams showing a spherical aberration (SA), an astigmatism (AS), a distortion (DT), and a chromatic aberration of magnification (CC) respectively, of the optical system according to an example 48.
Figure 55C:
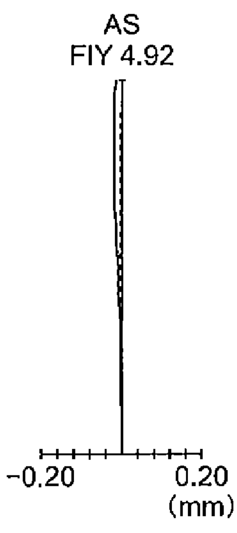
Figure 55D:
Figure 55E:
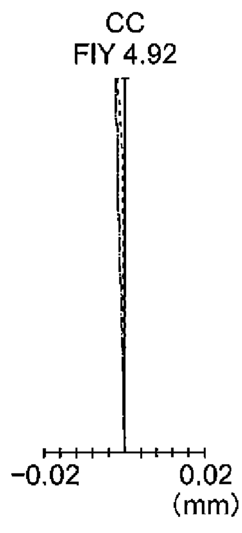

Next, an optical system according to an example 48 will be described below. FIG. 55A is a cross-sectional view along an optical axis showing an optical arrangement of the optical system according to the example 48. Moreover, FIG. 55B, FIG. 55C, FIG. 55D, and FIG. 55E are aberration diagrams of the optical system according to the example 48.

The optical system according to the example 48, as shown in FIG. 55A, includes a first lens unit G1 having a positive refractive power, an aperture stop S, and a second lens unit G2 having a negative refractive power.

The first lens unit G1 includes a positive meniscus lens L1 having a convex surface directed toward an image side, a biconcave negative lens L2, a biconvex positive lens L3, a biconvex positive lens L4, a positive meniscus lens L5 having a convex surface directed toward an object side, and a negative meniscus lens L6 having a convex surface directed toward the object side. The positive meniscus lens L5 and the negative meniscus lens L6 are cemented.

The second lens unit G2 includes a biconcave negative lens L7, a positive meniscus lens L8 having a convex surface directed toward the object side, a biconvex positive lens L9, a positive meniscus lens L10 having a convex surface directed toward the object side, a biconcave negative lens L11, and a biconcave negative lens L12. The biconcave negative lens L7 and the positive meniscus lens L8 are cemented. A predetermined lens unit includes the biconcave negative lens L11 and the biconcave negative lens L12.

The aperture stop S is disposed between the negative meniscus lens L6 and the biconcave negative lens L7.

An aspheric surface is provided to 13 surfaces namely, a surface on the image side of the positive meniscus lens L1, both surfaces of the biconcave negative lens L2, a surface on the object side of the biconvex positive lens L3, a surface on the image side of the biconvex positive lens L4, both surfaces of the biconvex positive lens L9, both surfaces of the positive meniscus lens L10, both surfaces of the biconcave negative lens L11, and both surfaces of the biconcave negative lens L12.

Figure 56A:
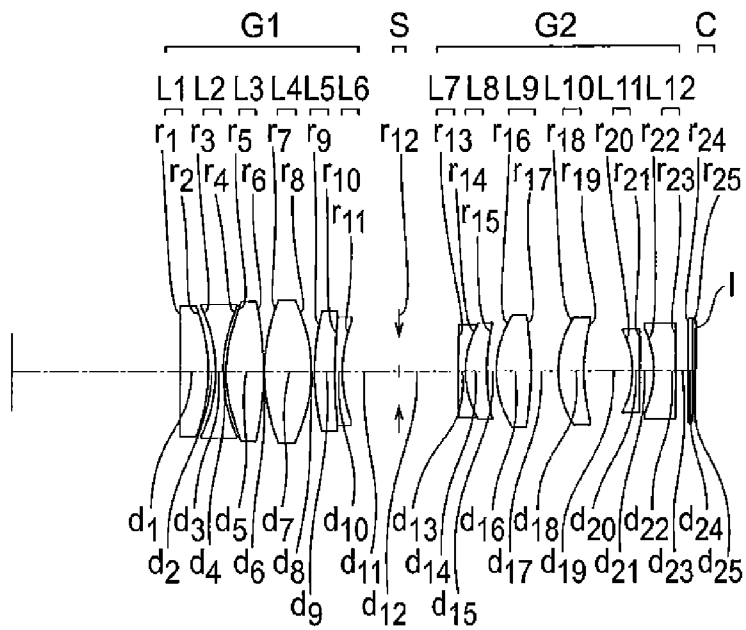
FIG. 56A is a cross-sectional view along an optical axis showing an optical arrangement.
Figures 56B, 56C, 56D, 56E:
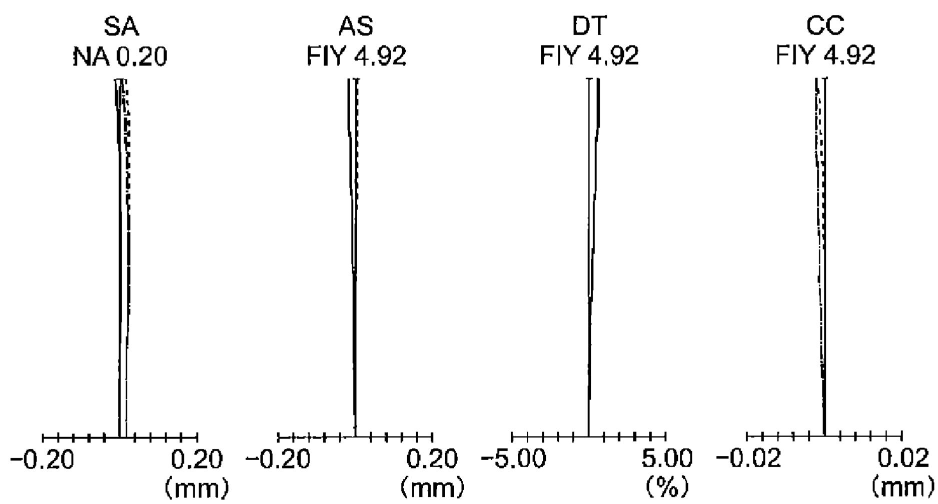
FIG. 56B, FIG. 56C, FIG. 56D, and FIG. 56E are diagrams showing a spherical aberration (SA), an astigmatism (AS), a distortion (DT), and a chromatic aberration of magnification (CC) respectively, of the optical system according to an example 49.

Next, an optical system according to an example 49 will be described below. FIG. 56A is a cross-sectional view along an optical axis showing an optical arrangement of the optical system according to the example 49. Moreover, FIG. 56B, FIG. 56C, FIG. 56D, and FIG. 56E are aberration diagrams of the optical system according to the example 49.

The optical system according to the example 49, as shown in FIG. 56A, includes a first lens unit G1 having a positive refractive power, an aperture stop S, and a second lens unit G2 having a positive refractive power.

The first lens unit G1 includes a positive meniscus lens L1 having a convex surface directed toward an image side, a biconcave negative lens L2, a biconvex positive lens L3, a biconvex positive lens L4, a positive meniscus lens L5 having a convex surface directed toward an object side, and a negative meniscus lens L6 having a convex surface directed toward the object side. The positive meniscus lens L5 and the negative meniscus lens L6 are cemented.

The second lens unit G2 includes a negative meniscus lens L7 having a convex surface directed toward the object side, a positive meniscus lens L8 having a convex surface directed toward the object side, a biconvex positive lens L9, a positive meniscus lens L10 having a convex surface directed toward the object side, a biconcave negative lens L11, and a negative meniscus lens L12 having a convex surface directed toward the image side. The negative meniscus lens L7 and the positive meniscus lens L8 are cemented. A predetermined lens unit includes the biconcave negative lens L11 and the negative meniscus lens L12.

The aperture stop S is disposed between the negative meniscus lens L6 and the negative meniscus lens L7.

An aspheric surface is provided to 13 surfaces namely, a surface on the image side of the positive meniscus lens L1, both surfaces of the biconcave negative lens L2, a surface on the object side of the biconvex positive lens L3, a surface on the image side of the biconvex positive lens L4, both surfaces of the biconvex positive lens L9, both surfaces of the positive meniscus lens L10, both surfaces of the biconcave negative lens L11, and both surfaces of the negative meniscus lens L12.

Next, an optical system according to an example 50 will be described below. FIG. 57A is a cross-sectional view along an optical axis showing an optical arrangement of the optical system according to the example 50. Moreover, FIG. 57B, FIG. 57C, FIG. 57D, and FIG. 57E are aberration diagrams of the optical system according to the example 50.

The optical system according to the example 50, as shown in FIG. 57A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a positive meniscus lens L4 having a convex surface directed toward an object side, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a biconvex positive lens L9, a biconcave negative lens L10, a biconvex positive lens L11, and biconcave negative lens L12. The negative meniscus lens L7 and the positive meniscus lens L8 are cemented. A predetermined lens unit includes the biconcave negative lens L12.

The aperture stop S is disposed between the biconcave negative lens L6 and the negative meniscus lens L7.

An aspheric surface is provided to 12 surfaces namely, both surfaces of the biconvex positive lens L1, a surface on the object side of the biconvex positive lens L3, a surface on an image side of the positive meniscus lens L4, both surfaces of the biconvex positive lens L9, both surfaces of the biconcave negative lens L10, both surfaces of the biconvex positive lens L11, and both surfaces of the biconcave negative lens L12.

Figure 58A:
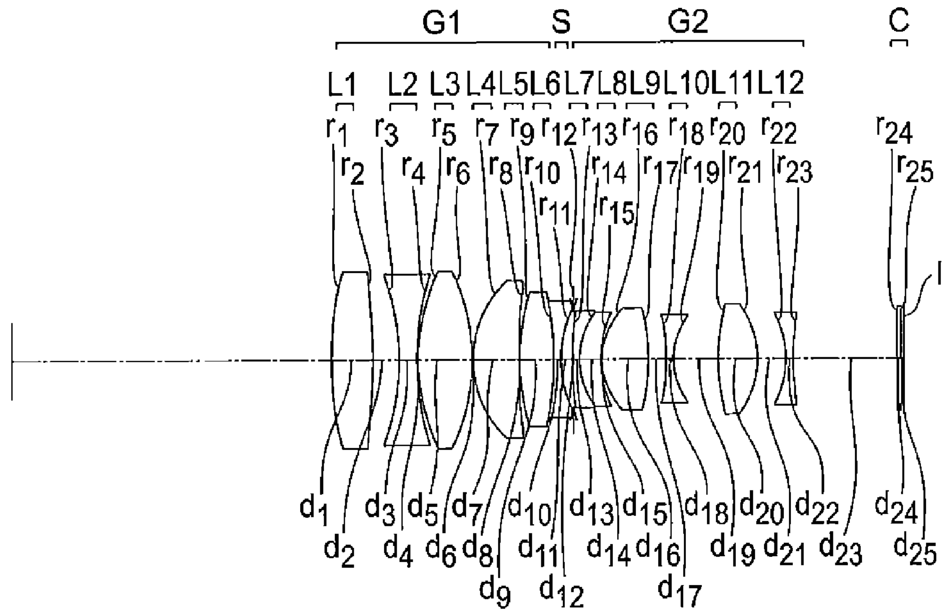
FIG. 58A is a cross-sectional view along an optical axis showing an optical arrangement.
Figures 58B, 58C, 58D, 58E:
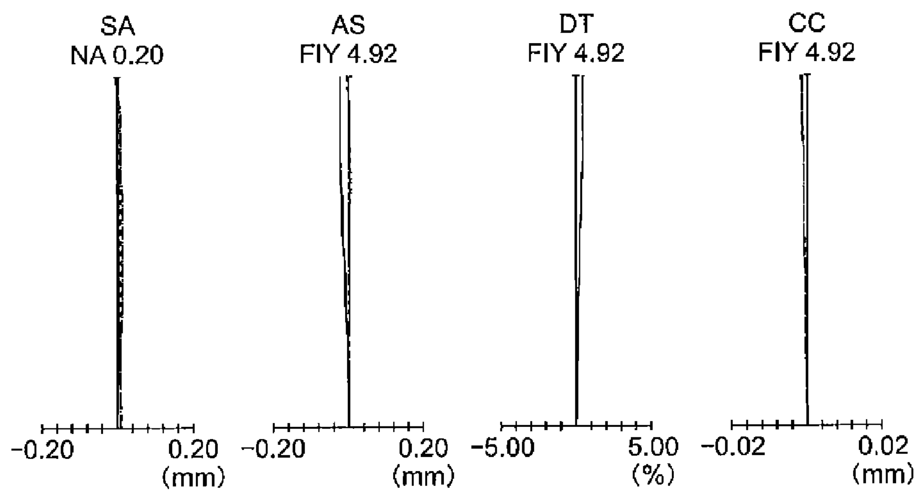
FIG. 58B, FIG. 58C, FIG. 58D, and FIG. 58E are diagrams showing a spherical aberration (SA), an astigmatism (AS), a distortion (DT), and a chromatic aberration of magnification (CC) respectively, of the optical system according to an example 51.

Next, an optical system according to an example 51 will be described below. FIG. 58A is a cross-sectional view along an optical axis showing an optical arrangement of the optical system according to the example 51. Moreover, FIG. 58B, FIG. 58C, FIG. 58D, and FIG. 58E are aberration diagrams of the optical system according to the example 51.

The optical system according to the example 51, as shown in FIG. 58A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a positive meniscus lens L4 having a convex surface directed toward an object side, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a biconvex positive lens L9, a biconcave negative lens L10, a biconvex positive lens L11, and a biconcave negative lens L12. The negative meniscus lens L7 and the positive meniscus lens L8 are cemented. A predetermined lens unit includes the biconcave negative lens L12.

The aperture stop S is disposed between the biconcave negative lens L6 and the negative meniscus lens L7.

An aspheric surface is provided to 12 surfaces namely, both surfaces of the biconvex positive lens L1, a surface on the object side of the biconvex positive lens L3, a surface on an image side of the positive meniscus lens L4, both surfaces of the biconvex positive lens L9, both surfaces of the biconcave negative lens L10, both surfaces of the biconvex positive lens L11, and both surfaces of the biconcave negative lens L12.

Figure 59A:
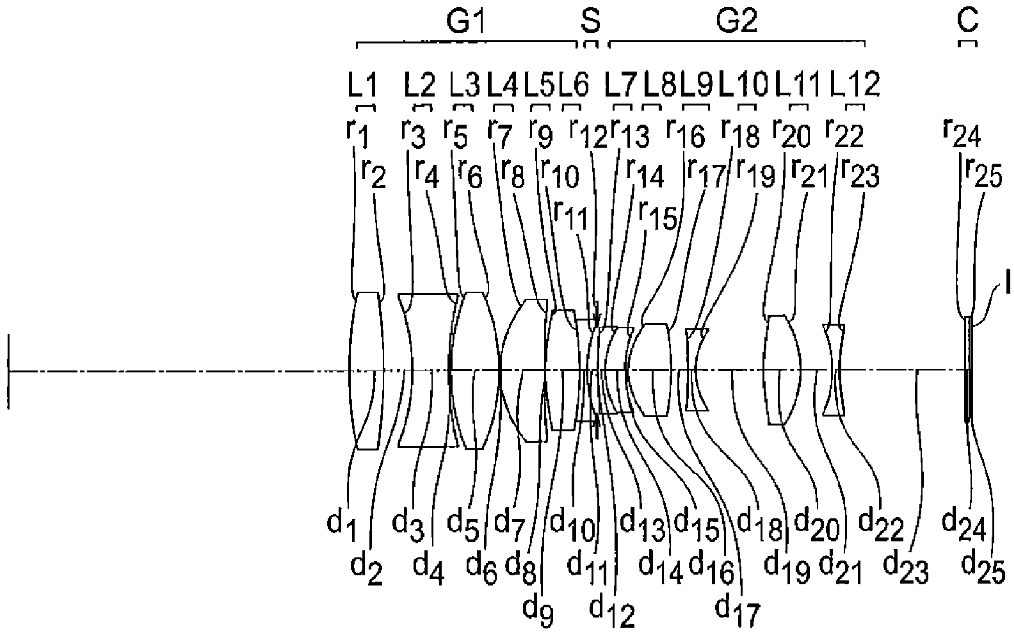
FIG. 59A is a cross-sectional view along an optical axis showing an optical arrangement.
Figures 59B, 59C, 59D, 59E:
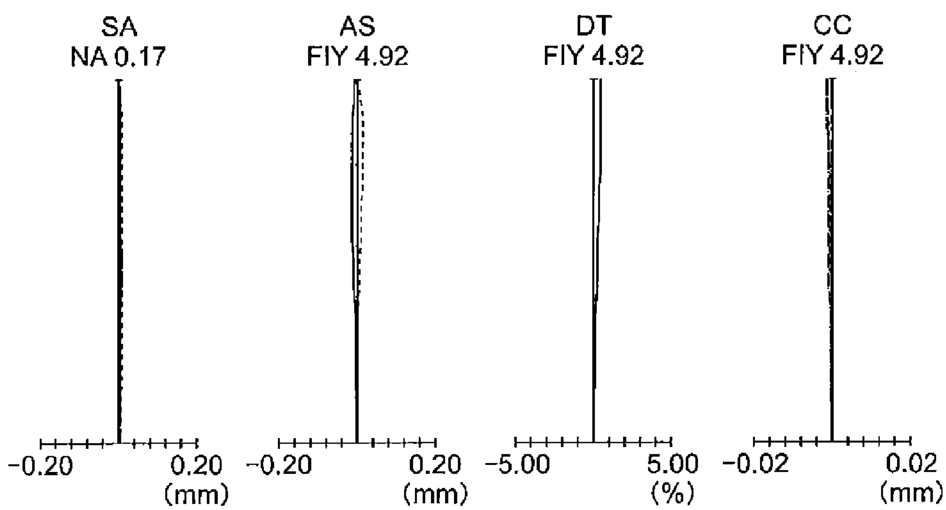
FIG. 59B, FIG. 59C, FIG. 59D, and FIG. 59E are diagrams showing a spherical aberration (SA), an astigmatism (AS), a distortion (DT), and a chromatic aberration of magnification (CC) respectively, of the optical system according to an example 52.

Next, an optical system according to an example 52 will be described below. FIG. 59A is a cross-sectional view along an optical axis showing an optical arrangement of the optical system according to the example 52. Moreover, FIG. 59B, FIG. 59C, FIG. 59D, and FIG. 59E are aberration diagrams of the optical system according to the example 52.

The optical system according to the example 52, as shown in FIG. 59A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a positive meniscus lens L4 having a convex surface directed toward an object side, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a biconvex positive lens L9, a biconcave negative lens L10, a biconvex positive lens L11, and a biconcave negative lens L12. The negative meniscus lens L7 and the positive meniscus lens L8 are cemented. A predetermined lens unit includes the biconcave negative lens L12.

The aperture stop S is disposed between the biconcave negative lens L6 and the negative meniscus lens L7.

An aspheric surface is provided to 12 surfaces namely, both surfaces of the biconvex positive lens L1, a surface on the object side of the biconvex positive lens L3, a surface on an image side of the positive meniscus lens L4, both surfaces of the biconvex positive lens L9, both surfaces of the biconcave negative lens L10, both surfaces of the biconvex positive lens L11, and both surfaces of the biconcave negative lens L12.

Figure 60A:
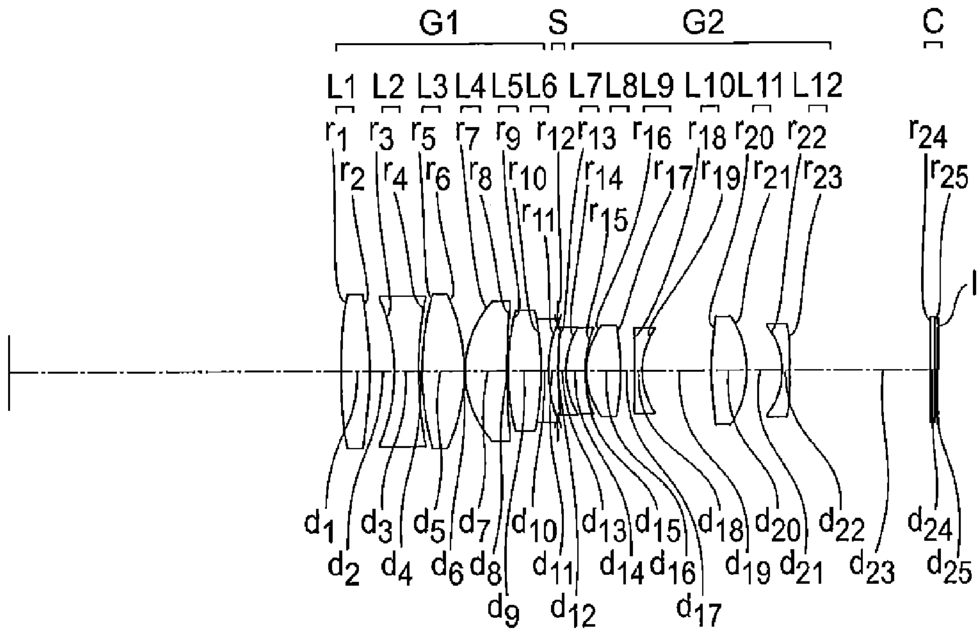
FIG. 60A is a cross-sectional view along an optical axis showing an optical arrangement.
Figures 60B, 60C, 60D, 60E:
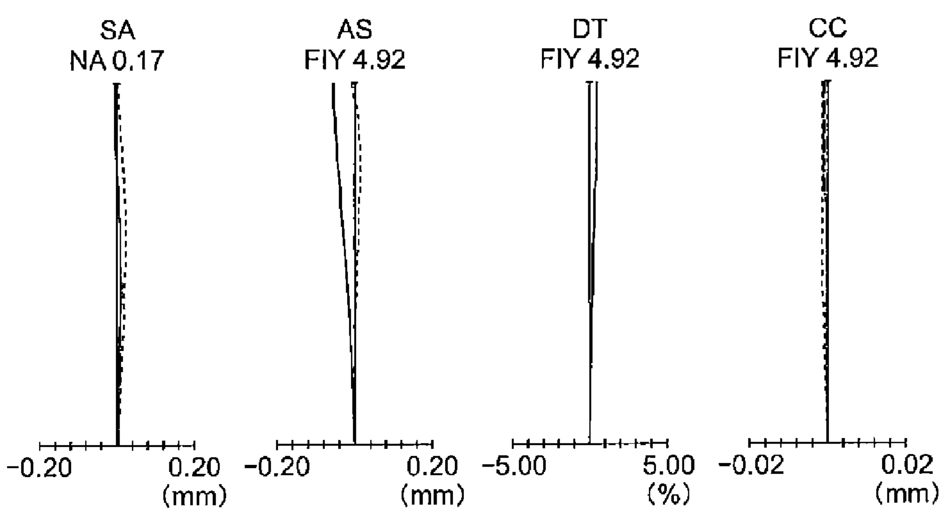
FIG. 60B, FIG. 60C, FIG. 60D, and FIG. 60E are diagrams showing a spherical aberration (SA), an astigmatism (AS), a distortion (DT), and a chromatic aberration of magnification (CC) respectively, of the optical system according to an example 53.

Next, an optical system according to an example 53 will be described below. FIG. 60A is a cross-sectional view along an optical axis showing an optical arrangement of the optical system according to the example 53. Moreover, FIG. 60B, FIG. 60C, FIG. 60D, and FIG. 60E are aberration diagrams of the optical system according to the example 53.

The optical system according to the example 53, as shown in FIG. 60A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a positive meniscus lens L4 having a convex surface directed toward an object side, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a biconvex positive lens L9, a biconcave negative lens L10, a biconvex positive lens L11, and a biconcave negative lens L12. The negative meniscus lens L7 and the positive meniscus lens L8 are cemented. A predetermined lens unit includes a biconcave negative lens L12.

The aperture stop S is disposed between the biconcave negative lens L6 and the negative meniscus lens L7.

An aspheric surface is provided to 12 surfaces namely, both surfaces of the biconvex positive lens L1, a surface on the object side of the biconvex positive lens L3, a surface on an image side of the positive meniscus lens L4, both surfaces of the biconvex positive lens L9, both surfaces of the biconcave negative lens L10, both surfaces of the biconvex positive lens L11, and both surfaces of the biconcave negative lens L12.

Figure 61A:
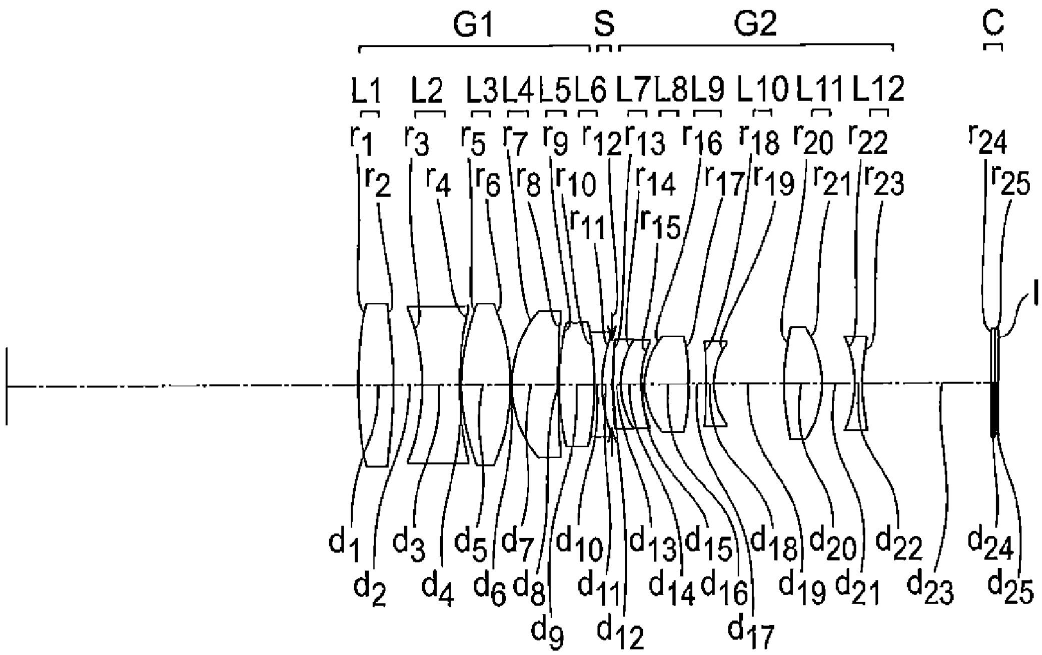
FIG. 61A is a cross-sectional view along an optical axis showing an optical arrangement.
Figures 61B, 61C, 61D, 61E:
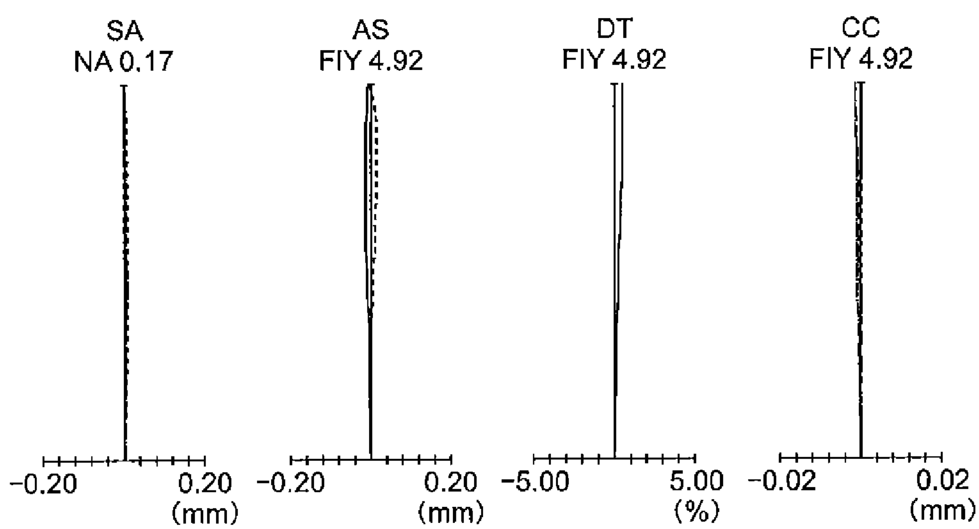
FIG. 61B, FIG. 61C, FIG. 61D, and FIG. 61E are diagrams showing a spherical aberration (SA), an astigmatism (AS), a distortion (DT), and a chromatic aberration of magnification (CC) respectively, of the optical system according to an example 54.

Next, an optical system according to an example 54 will be described below. FIG. 61A is a cross-sectional view along an optical axis showing an optical arrangement of the optical system according to the example 54. Moreover, FIG. 61B, FIG. 6C, FIG. 61D, and FIG. 61E are aberration diagrams of the optical system according to the example 54.

The optical system according to the example 54, as shown in FIG. 61A, includes a first lens unit G1 having a positive refractive power, an aperture stop S, and a second lens unit G2 having a negative refractive power.

The first lens unit G1 includes a biconvex positive lens L1, a biconcave negative lens L2, a biconvex positive lens L3, a positive meniscus lens L4 having a convex surface directed toward the object side, a biconvex positive lens L5, and a biconcave negative lens L6. The biconvex positive lens L5 and the biconcave negative lens L6 are cemented.

The second lens unit G2 includes a negative meniscus lens L7 having a convex surface directed toward the object side, a positive meniscus lens L8 having a convex surface directed toward the object side, a biconvex positive lens L9, a biconcave negative lens L10, a biconvex positive lens L11, and a biconcave negative lens L12. The negative meniscus lens L7 and the positive meniscus lens L8 are cemented. A predetermined lens unit includes the biconcave negative lens L12.

The aperture stop S is disposed between the biconcave negative lens L6 and the negative meniscus lens L7.

An aspheric surface is provided to 12 surfaces namely, both surfaces of the biconvex positive lens L1, a surface on the object side of the biconvex positive lens L3, a surface on an image side of the positive meniscus lens L4, both surfaces of the biconvex positive lens L9, both surfaces of the biconcave negative lens L10, both surfaces of the biconvex positive lens L11, and both surfaces of the biconcave negative lens L12.

Figure 62A:
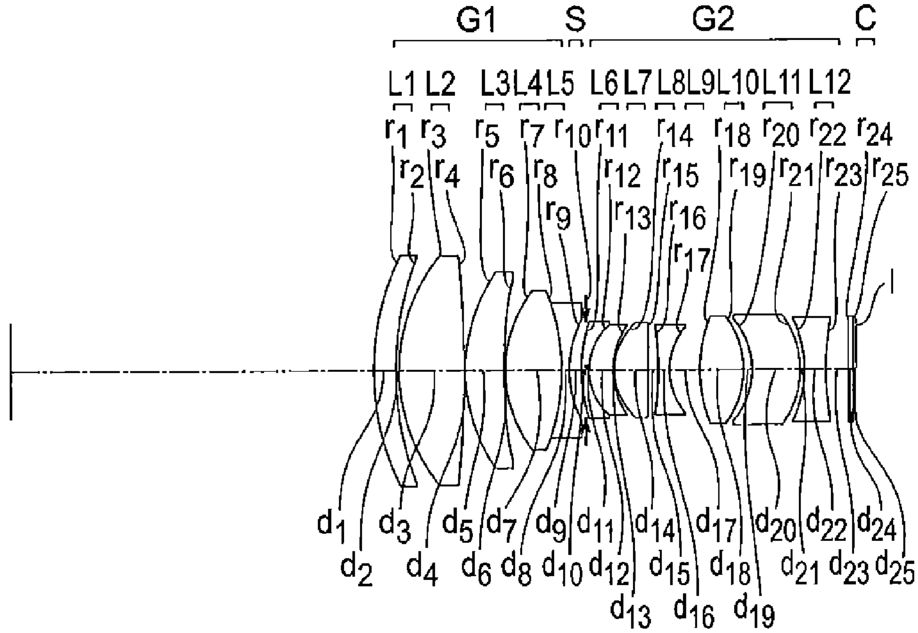
FIG. 62A is a cross-sectional view along an optical axis showing an optical arrangement.
Figures 62B, 62C, 62D, 62E:
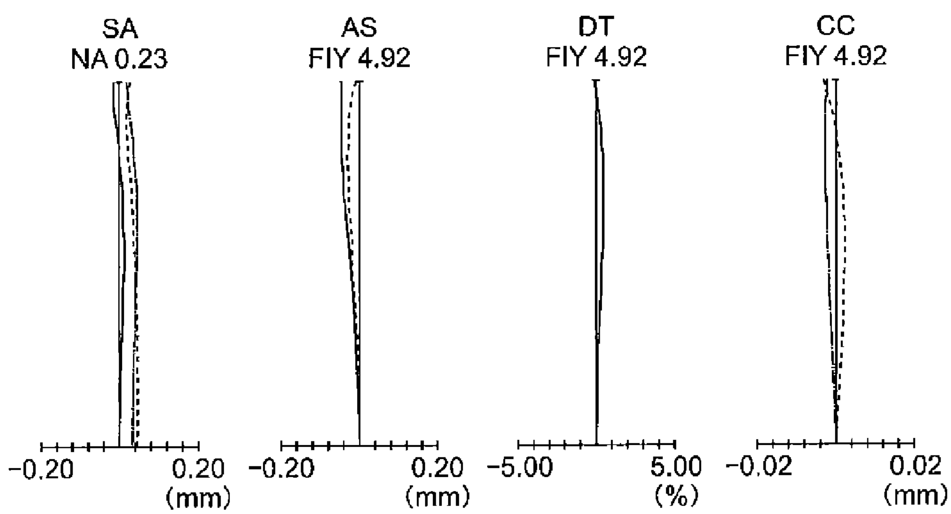
FIG. 62B, FIG. 62C, FIG. 62D, and FIG. 62E are diagrams showing a spherical aberration (SA), an astigmatism (AS), a distortion (DT), and a chromatic aberration of magnification (CC) respectively, of the optical system according to an example 55.

Next, an optical system according to an example 55 will be described below. FIG. 62A is a cross-sectional view along an optical axis showing an optical arrangement of the optical system according to the example 55. Moreover, FIG. 62B, FIG. 62C, FIG. 62D, and FIG. 62E are aberration diagrams of the optical system according to the example 55.

The optical system according to the example 55, as shown in FIG. 62A, includes a first lens unit G1 having a positive refractive power, an aperture stop S, and a second lens unit G2 having a negative refractive power.

The first lens unit G1 includes a positive meniscus lens L1 having a convex surface directed toward an object side, a biconvex positive lens L2, a positive meniscus lens L3 having a convex surface directed toward the object side, a biconvex positive lens L4, and a biconcave negative lens L5. The biconvex positive lens L4 and the biconcave negative lens L5 are cemented.

The second lens unit G2 includes a negative meniscus lens L6 having a convex surface directed toward the object side, a positive meniscus lens L7 having a convex surface directed toward the object side, a biconvex positive lens L8, a biconcave negative lens L9, a biconvex positive lens L10, a negative meniscus lens L11 having a convex surface directed toward an image side, and a biconcave negative lens L12. The negative meniscus lens L6 and the positive meniscus lens L7 are cemented. A predetermined lens unit includes the biconcave negative lens L12.

The aperture stop S is disposed between the biconcave negative lens L5 and the negative meniscus lens L6.

An aspheric surface is provided to 12 surfaces namely, both surfaces of the positive meniscus lens L1, a surface on the object side of the biconvex positive lens L2, a surface on the image side of the positive meniscus lens L3, a surface on the object side of the biconvex positive lens L8, both surfaces of the biconcave negative lens L9, both surfaces of the biconvex positive lens L10, both surfaces of the negative meniscus lens L11, an a surface on the image side of the biconcave negative lens L12.

Figure 63A:
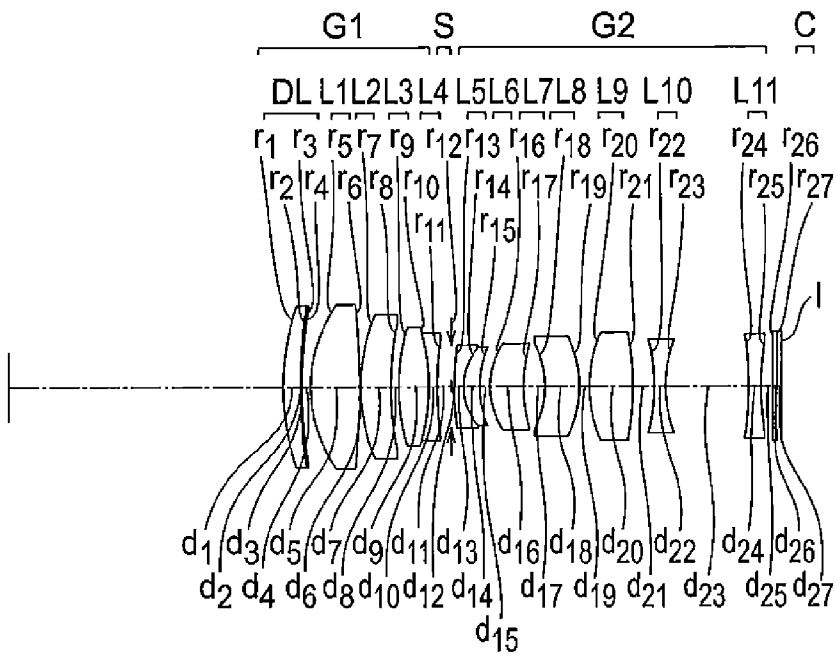
FIG. 63A is a cross-sectional view along an optical axis showing an optical arrangement.
Figures 63B, 63C, 63D, 63E:
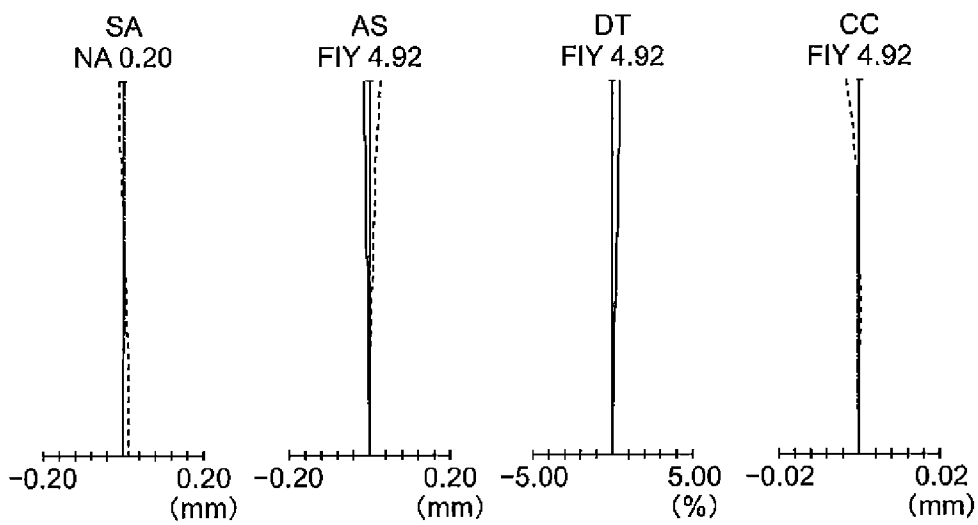
FIG. 63B, FIG. 63C, FIG. 63D, and FIG. 63E are diagrams showing a spherical aberration (SA), an astigmatism (AS), a distortion (DT), and a chromatic aberration of magnification (CC) respectively, of the optical system according to an example 56.

Next, an optical system according to an example 56 will be described below. FIG. 63A is a cross-sectional view along an optical axis showing an optical arrangement of the optical system according to the example 56. Moreover, FIG. 63B, FIG. 63C, FIG. 63D, and FIG. 63E are aberration diagrams of the optical system according to the example 56.

The optical system according to the example 56, as shown in FIG. 63A, includes a first lens unit G1 having a positive refractive power, an aperture stop S, and a second lens unit G2 having a negative refractive power.

The first lens unit G1 includes a diffractive optical element DL, a biconvex positive lens L1, a positive meniscus lens L2 having a convex surface directed toward an object side, a biconvex positive lens L3, and a biconcave negative lens L4. The biconvex positive lens L3 and the biconcave negative lens L4 are cemented.

The second lens unit G2 includes a negative meniscus lens L5 having a convex surface directed toward the object side, a positive meniscus lens L6 having a convex surface directed toward the object side, a positive meniscus lens L7 having a convex surface directed toward the object side, a negative meniscus lens L8 having a convex surface directed toward an image side, a biconvex positive lens L9, a biconcave negative lens L10, and a biconcave negative lens L11. The negative meniscus lens L5 and the positive meniscus lens L6 are cemented. A predetermined lens unit includes the biconcave negative lens L10 and the biconcave negative lens L11.

The diffractive optical element DL has a positive refractive power as a whole. The diffractive optical element DL includes a positive meniscus lens having a convex surface directed toward the object side and a negative meniscus lens having a convex surface directed toward the object side. A relief pattern is formed at an interface of the positive meniscus lens and the negative meniscus lens, and the interface is let to be a diffractive surface.

The aperture stop S is disposed between the biconcave negative lens L4 and the negative meniscus lens L5.

An aspheric surface is provided to 12 surfaces namely, a surface on the object side of the biconvex positive lens L1, a surface on the image side of the positive meniscus lens L2, both surfaces of the positive meniscus lens L7, both surfaces of the negative meniscus lens L8, both surfaces of the biconvex positive lens L9, both surfaces of the biconcave negative lens L10, and both surfaces of the biconcave negative lens L11.

Figure 64A:
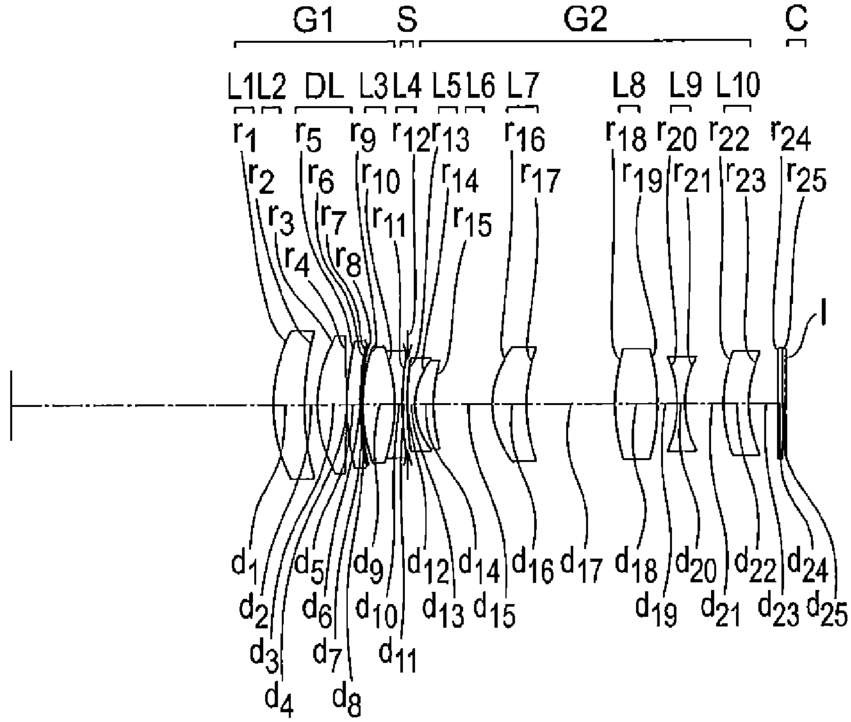
FIG. 64A is a cross-sectional view along an optical axis showing an optical arrangement.
Figures 64B, 64C, 64D, 64E:
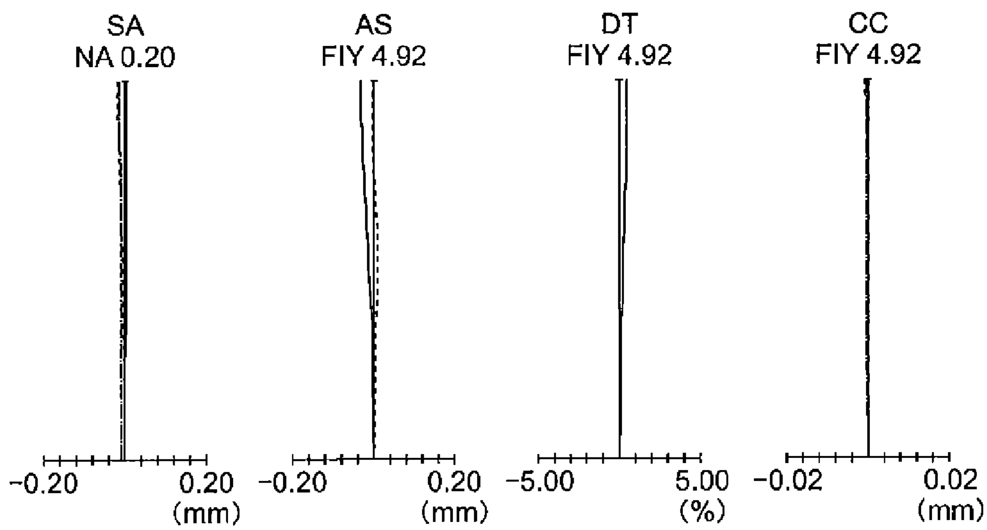
FIG. 64B, FIG. 64C, FIG. 64D, and FIG. 64E are diagrams showing a spherical aberration (SA), an astigmatism (AS), a distortion (DT), and a chromatic aberration of magnification (CC) respectively, of the optical system according to an example 57.

Next, an optical system according to an example 57 will be described below. FIG. 64A is a cross-sectional view along an optical axis showing an optical arrangement of the optical system according to the example 57. Moreover, FIG. 64B, FIG. 64C, FIG. 64D, and FIG. 64E are aberration diagrams of the optical system according to the example 57.

The optical system according to the example 57, as shown in FIG. 64A, includes a first lens unit G1 having a positive refractive power, an aperture stop S, and a second lens unit G2 having a negative refractive power.

The first lens unit G1 includes a positive meniscus lens L1 having a convex surface directed toward an object side, a biconvex positive lens L2, a diffractive optical element DL, a biconvex positive lens L3, and a biconcave negative lens L4. The biconvex positive lens L3 and the biconcave negative lens L4 are cemented.

The second lens unit G2 includes a negative meniscus lens L5 having a convex surface directed toward the object side, a positive meniscus lens L6 having a convex surface directed toward the object side, a positive meniscus lens L7 having a convex surface directed toward the object side, a biconvex positive lens L8, a biconcave negative lens L9, and a negative meniscus lens L10 having a convex surface directed toward the object side. The negative meniscus lens L5 and the positive meniscus lens L6 are cemented. A predetermined lens unit includes the biconcave negative lens L9 and the negative meniscus lens L10.

The diffractive optical element DL has a positive refractive power as a whole. The diffractive optical element DL includes a positive meniscus lens having a convex surface directed toward the object side and a negative meniscus lens having a convex surface directed toward the object side. A relief pattern is formed at an interface of the positive meniscus lens and the negative meniscus lens, and the interface is let to be a diffractive surface.

The aperture stop S is disposed between the biconcave negative lens L4 and the negative meniscus lens L5.

An aspheric surface is provided to 11 surfaces namely, both surfaces of the positive meniscus lens L1, a surface on the object side of the biconvex positive lens L2, both surfaces of the positive meniscus lens L7, both surfaces of the biconvex positive lens L8, both surfaces of the biconcave negative lens L9, and both surfaces of the negative meniscus lens L10.

Next, an optical system according to an example 58 will be described below. FIG. 65A is a cross-sectional view along an optical axis showing an optical arrangement of the optical system according to the example 58. Moreover, FIG. 65B, FIG. 65C, FIG. 65D, and FIG. 65E are aberration diagrams of the optical system according to the example 58.

The optical system according to the example 58, as shown in FIG. 65A, includes a first lens unit G1 having a positive refractive power, an aperture stop S, and a second lens unit G2 having a negative refractive power.

The first lens unit G1 includes a positive meniscus lens L1 having a convex surface directed toward an object side, a negative meniscus lens L2 having a convex surface directed toward the object side, a biconvex positive lens L3, a positive meniscus lens L4 having a convex surface directed toward the object side, a biconvex positive lens L5, and a biconcave negative lens L6. The biconvex positive lens L5 and the biconcave negative lens L6 are cemented.

The second lens unit G2 includes a biconcave negative lens L7, a positive meniscus lens L8 having a convex surface directed toward the object side, a biconvex positive lens L9, a biconcave negative lens L10, a diffractive optical element DL, and a biconcave negative lens L11. The biconcave negative lens L7 and the positive meniscus lens L8 are cemented. A predetermined lens unit includes a biconcave negative lens L10 and the biconcave negative lens L11.

The diffractive optical element DL has a positive refractive power as a whole. The diffractive optical element DL includes a biconvex positive lens and a negative meniscus lens having a convex surface directed toward an image side. A relief pattern is formed at an interface of the biconvex positive lens and the negative meniscus lens, and the interface is let to be a diffractive surface.

The aperture stop S is disposed between the biconcave negative lens L6 and the biconcave negative lens L7.

An aspheric surface is provided to 10 surfaces namely, both surfaces of the positive meniscus lens L1, a surface on the object side of the biconvex positive lens L3, a surface on the image side of the positive meniscus lens L4, both surfaces of the biconvex positive lens L9, both surfaces of the biconcave negative lens L10, and both surfaces of the biconcave negative lens L11.

Figure 66A:
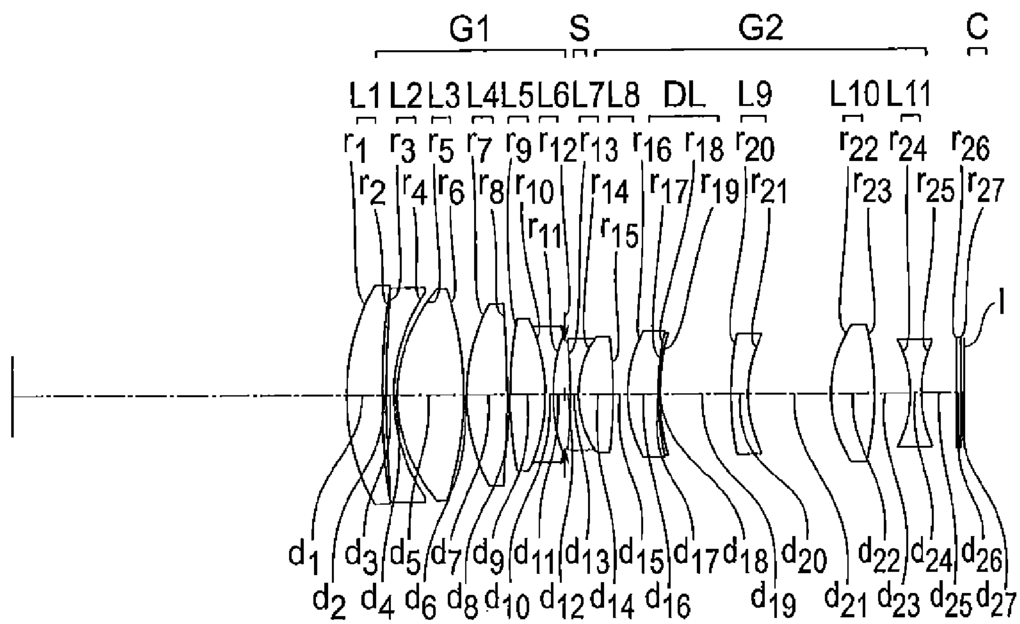
FIG. 66A is a cross-sectional view along an optical axis showing an optical arrangement.
Figures 66B, 66C, 66D, 66E:
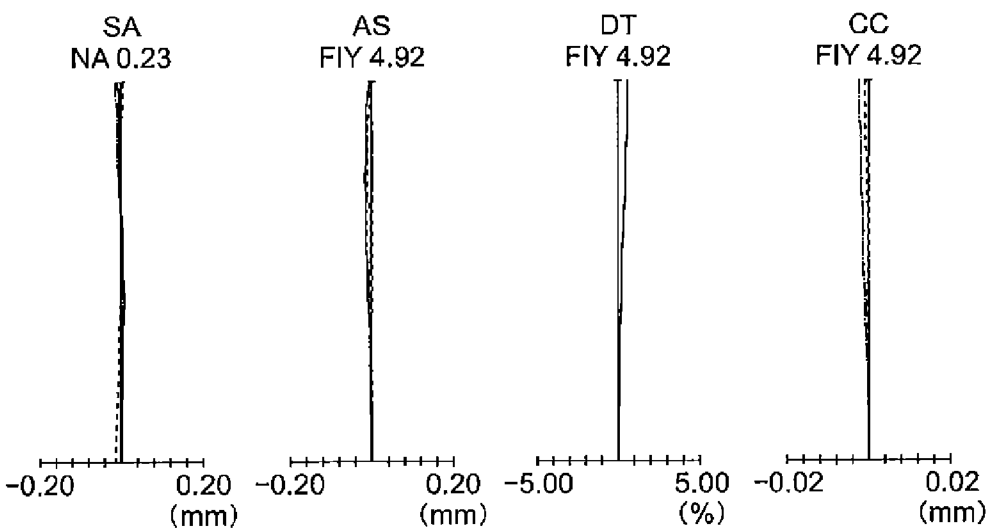
FIG. 66B, FIG. 66C, FIG. 66D, and FIG. 66E are diagrams showing a spherical aberration (SA), an astigmatism (AS), a distortion (DT), and a chromatic aberration of magnification (CC) respectively, of the optical system according to an example 59.

Next, an optical system according to an example 59 will be described below. FIG. 66A is a cross-sectional view along an optical axis showing an optical arrangement of the optical system according to the example 59. Moreover, FIG. 66B, FIG. 66C, FIG. 66D, and FIG. 66E are aberration diagrams of the optical system according to the example 59.

The optical system according to the example 59, as shown in FIG. 66A, includes a first lens unit G1 having a positive refractive power, an aperture stop S, and a second lens unit G2 having a negative refractive power.

The first lens unit G1 includes a positive meniscus lens L1 having a convex surface directed toward an object side, a negative meniscus lens L2 having a convex surface directed toward the object side, a biconvex positive lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a biconvex positive lens L8, a diffractive optical element DL, a negative meniscus lens L9 having a convex surface directed toward the object side, a biconvex positive lens L10, and a biconcave negative lens L11. The biconcave negative lens L7 and the biconvex positive lens L8 are cemented. A predetermined lens unit includes the biconcave negative lens L11.

The diffractive optical element DL has a positive refractive power as a whole. The diffractive optical element DL includes a positive meniscus lens having a convex surface directed toward the object side, and a negative meniscus lens having a convex surface directed toward the object side. A relief pattern is formed at an interface of the positive meniscus lens and the negative meniscus lens, and the interface is let to be a diffractive surface.

The aperture stop S is disposed between the biconcave negative lens L6 and the biconcave negative lens L7.

An aspheric surface is provided to 12 surfaces namely, both surfaces of the positive meniscus lens L1, a surface on the object side of the biconvex positive lens L3, a surface on an image side of the biconvex positive lens L4, both surfaces of the diffractive optical element DL, both surfaces of the negative meniscus lens L9, both surfaces of the biconvex positive lens L10, and both surfaces of the biconcave negative lens L11.

Figure 67A:
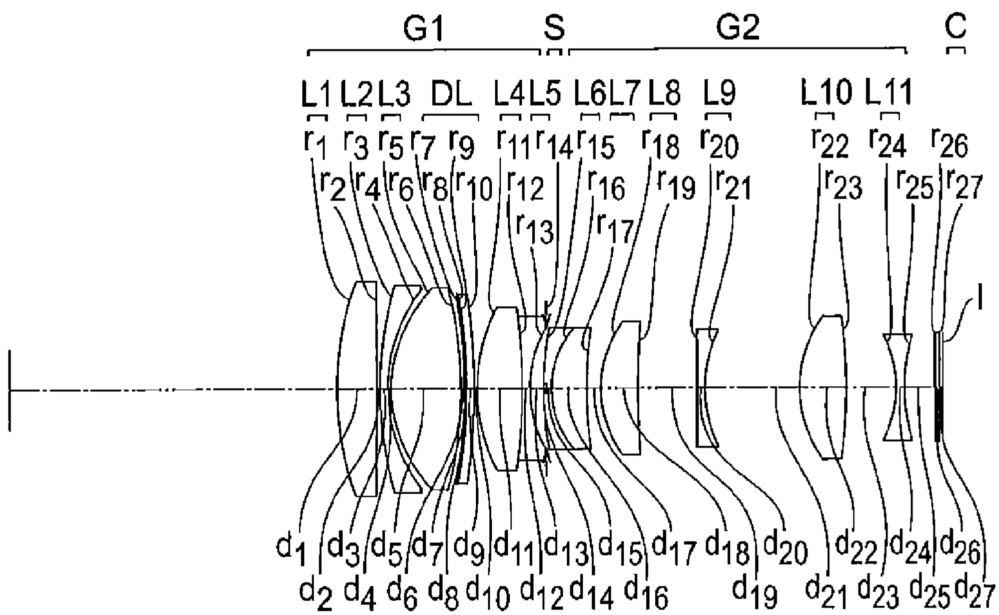
FIG. 67A is a cross-sectional view along an optical axis showing an optical arrangement.
Figure 67B:
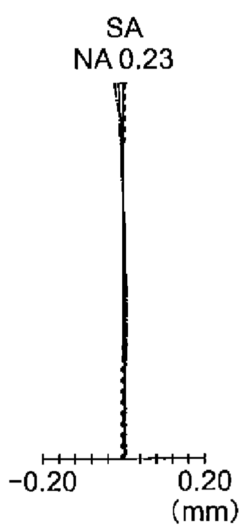
FIG. 67B, FIG. 67C, FIG. 67D, and FIG. 67E are diagrams showing a spherical aberration (SA), an astigmatism (AS), a distortion (DT), and a chromatic aberration of magnification (CC) respectively, of the optical system according to an example 60.
Figure 67C:
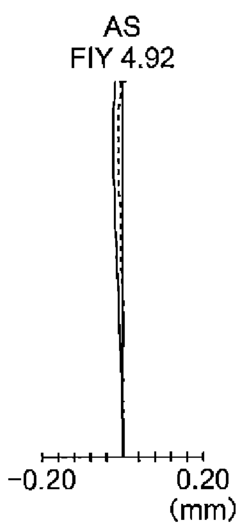
Figure 67D:
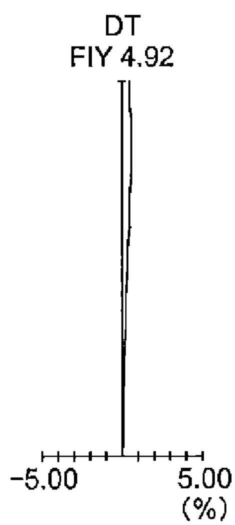
Figure 67E:
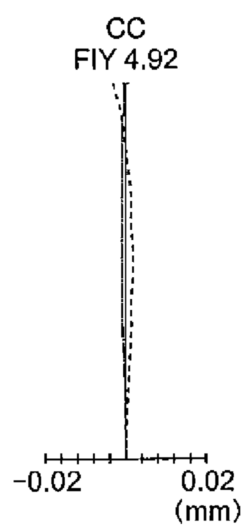

Next, an optical system according to an example 60 will be described below. FIG. 67A is a cross-sectional view along an optical axis showing an optical arrangement of the optical system according to the example 60. Moreover, FIG. 67B, FIG. 67C, FIG. 67D, and FIG. 67E are aberration diagrams of the optical system according to the example 60.

The optical system according to the example 60, as shown in FIG. 67A, includes a first lens unit G1 having a positive refractive power, an aperture stop S, and a second lens unit G2 having a positive refractive power.

The first lens unit G1 includes a biconvex positive lens L1, a negative meniscus lens L2 having a convex surface directed toward an object side, a biconvex positive lens L3, a diffractive optical element DL, a biconvex positive lens L4, and a biconcave negative lens L5. The biconvex positive lens L4 and the biconcave negative lens L5 are cemented.

The second lens unit G2 includes a negative meniscus lens L6 having a convex surface directed toward the object side, a positive meniscus lens L7 having a convex surface directed toward the object side, a positive meniscus lens L8 having a convex surface directed toward the object side, a biconcave negative lens L9, a biconvex positive lens L10, and a biconcave negative lens L11. The negative meniscus lens L6 and the positive meniscus lens L7 are cemented. A predetermined lens unit includes the biconcave negative lens L11.

The diffractive optical element DL has a negative refractive power as a whole. The diffractive optical element DL includes a positive meniscus lens having a convex surface directed toward an object side and a negative meniscus lens having a convex surface directed toward the image side. A relief pattern is formed at an interface of the positive meniscus lens and the negative meniscus lens, and the interface is let to be a diffractive surface.

The aperture stop S is disposed between the biconcave negative lens L5 and the negative meniscus lens L6.

An aspheric surface is provided to 11 surfaces namely, both surfaces of the biconvex positive lens L1, a surface on the object side of the biconvex positive lens L3, both surfaces of the positive meniscus lens L8, both surfaces of the biconcave negative lens L9, both surfaces of the biconvex positive lens L10, and both surfaces of the biconcave negative lens L11.

Figure 68A:
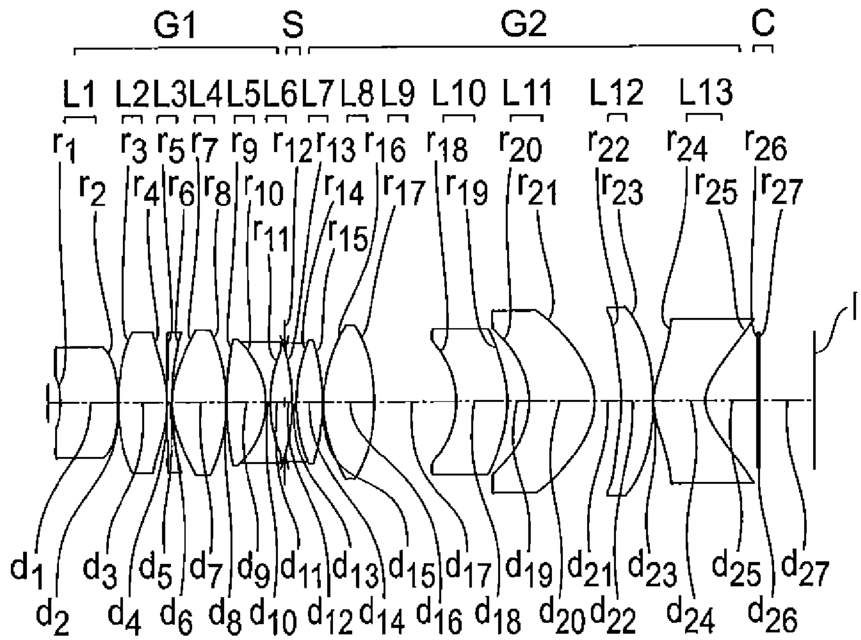
FIG. 68A is a cross-sectional view along an optical axis showing an optical arrangement.
Figures 68B, 68C, 68D, 68E:
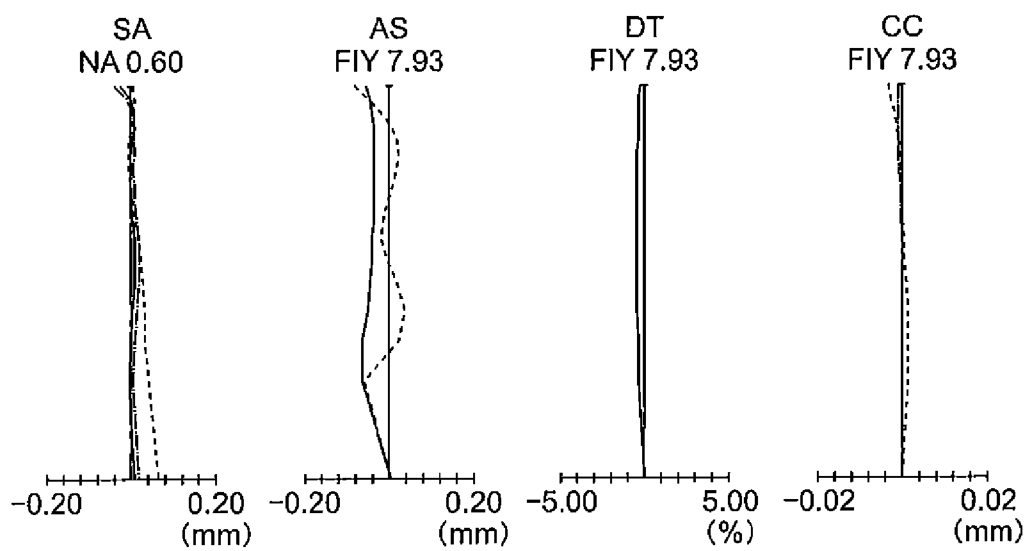
FIG. 68B, FIG. 68C, FIG. 68D, and FIG. 68E are diagrams showing a spherical aberration (SA), an astigmatism (AS), a distortion (DT), and a chromatic aberration of magnification (CC) respectively, of the optical system according to an example 61.

Next, an optical system according to an example 61 will be described below. FIG. 68A is a cross-sectional view along an optical axis showing an optical arrangement of the optical system according to the example 61. Moreover, FIG. 68B, FIG. 68C, FIG. 68D, and FIG. 68E are aberration diagrams of the optical system according to the example 61.

The optical system according to the example 61, as shown in FIG. 68A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a negative meniscus lens L3 having a convex surface directed toward the object side, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a biconvex positive lens L8, a biconvex positive lens L9, a negative meniscus lens L10 having a convex surface directed toward the image side, a positive meniscus lens L11 having a convex surface directed toward the image side, a negative meniscus lens L12 having a convex surface directed toward the image side, and a negative meniscus lens L13 having a convex surface directed toward the object side. The biconcave negative lens L7 and the biconvex positive lens L8 are cemented. A predetermined lens unit includes the negative meniscus lens L12 and the negative meniscus lens L13.

The aperture stop S is disposed between the biconcave negative lens L6 and the biconcave negative lens L7.

An aspheric surface is provided to 18 surfaces namely, both surfaces of the negative meniscus lens L1, both surfaces of the biconvex positive lens L2, both surfaces of the negative meniscus lens L3, both surfaces of the biconvex positive lens L4, both surfaces of the biconvex positive lens L9, both surfaces of the negative meniscus lens L10, both surfaces of the positive meniscus lens L11, both surfaces of the negative meniscus lens L12, and both surfaces of the negative meniscus lens L13.

Figure 69A:
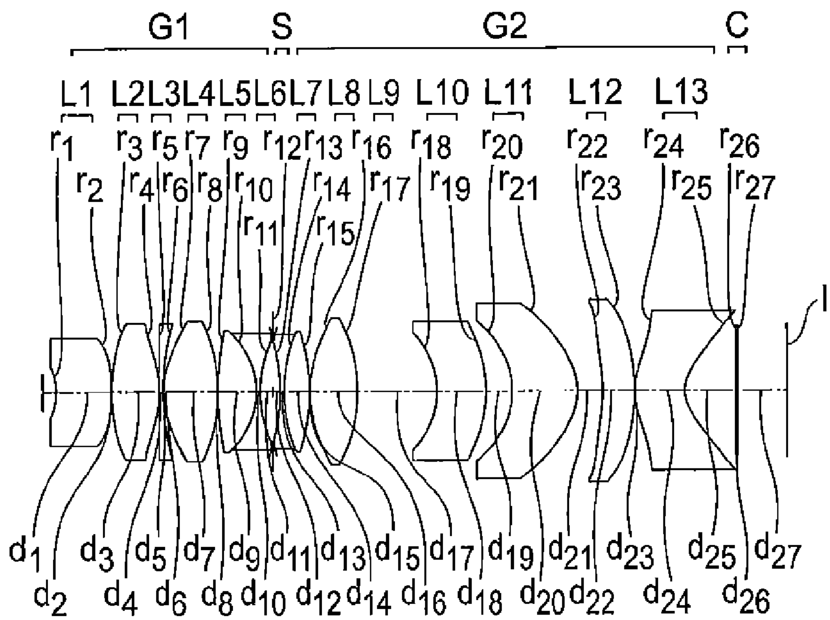
FIG. 69A is a cross-sectional view along an optical axis showing an optical arrangement.
Figures 69B, 69C, 69D, 69E:
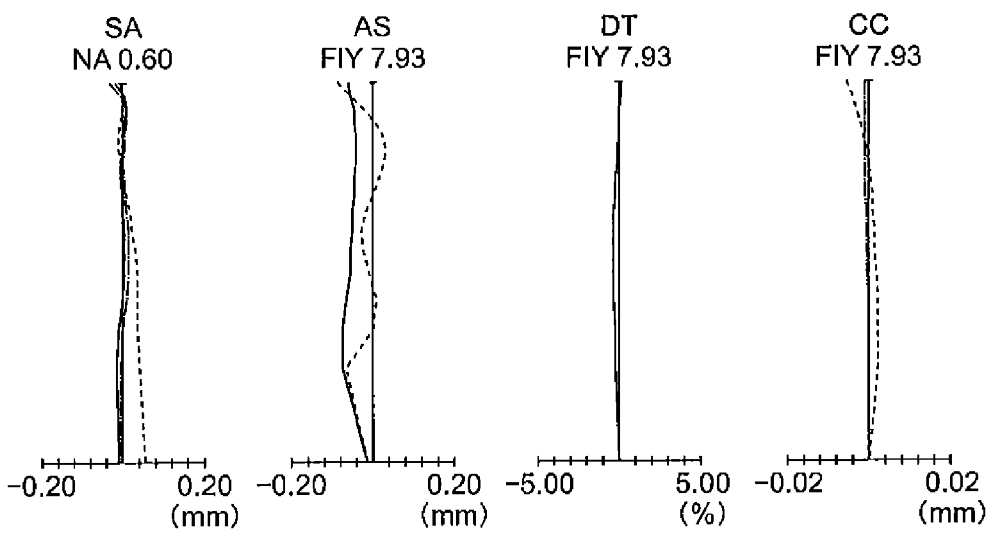
FIG. 69B, FIG. 69C, FIG. 69D, and FIG. 69E are diagrams showing a spherical aberration (SA), an astigmatism (AS), a distortion (DT), and a chromatic aberration of magnification (CC) respectively, of the optical system according to an example 62.

Next, an optical system according to an example 62 will be described below. FIG. 69A is a cross-sectional view along an optical axis showing an optical arrangement of the optical system according to the example 62. Moreover, FIG. 69B, FIG. 69C, FIG. 69D, and FIG. 69E are aberration diagrams of the optical system according to the example 62.

The optical system according to the example 62, as shown in FIG. 69A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a negative meniscus lens L3 having a convex surface directed toward the object side, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a biconvex positive lens L8, a biconvex positive lens L9, a negative meniscus lens L10 having a convex surface directed toward the image side, a positive meniscus lens L11 having a convex surface directed toward the image side, a negative meniscus lens L12 having a convex surface directed toward the image side, and a negative meniscus lens L13 having a convex surface directed toward the object side. The biconcave negative lens L7 and the biconvex positive lens L8 are cemented. A predetermined lens unit includes the negative meniscus lens L12 and the negative meniscus lens L13.

The aperture stop S is disposed between the biconcave negative lens L6 and the biconcave negative lens L7.

An aspheric surface is provided to 18 surfaces namely, both surfaces of the negative meniscus lens L1, both surfaces of the biconvex positive lens L2, both surfaces of the negative meniscus lens L3, both surfaces of the biconvex positive lens L4, both surfaces of the biconvex positive lens L9, both surfaces of the negative meniscus lens L10, both surfaces of the positive meniscus lens L11, both surfaces of the negative meniscus lens L12, and both surfaces of the negative meniscus lens L13.

Figure 70A:
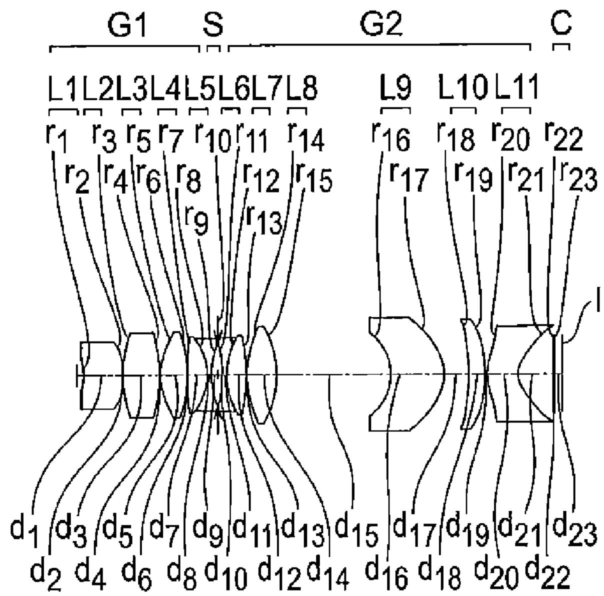
FIG. 70A is a cross-sectional view along an optical axis showing an optical arrangement.
Figure 70B:
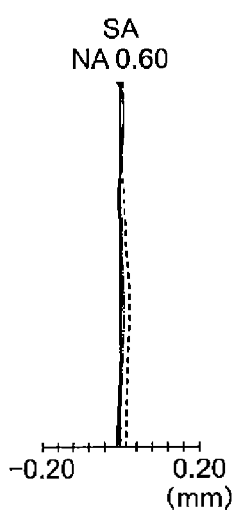
FIG. 70B, FIG. 70C, FIG. 70D, and FIG. 70E are diagrams showing a spherical aberration (SA), an astigmatism (AS), a distortion (DT), and a chromatic aberration of magnification (CC) respectively, of the optical system according to an example 63.
Figure 70C:
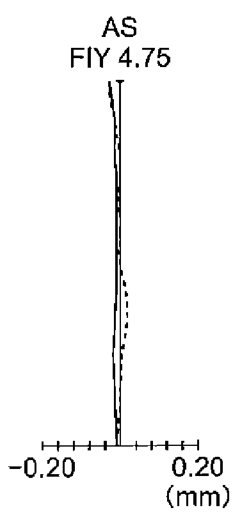
Figure 70D:
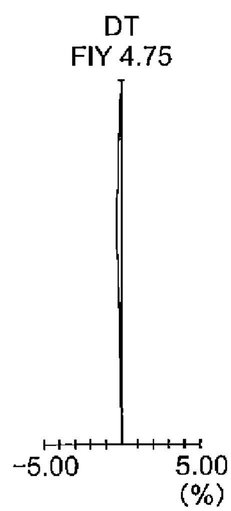
Figure 70E:
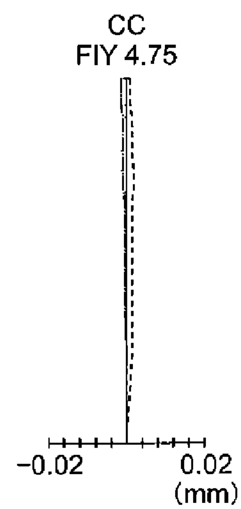

Next, an optical system according to an example 63 will be described below. FIG. 70A is a cross-sectional view along an optical axis showing an optical arrangement of the optical system according to the example 63. Moreover, FIG. 70B, FIG. 70C, FIG. 70D, and FIG. 70E are aberration diagrams of the optical system according to the example 63.

The optical system according to the example 63, as shown in FIG. 70A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a biconvex positive lens L4, and a biconcave negative lens L5. The biconvex positive lens L4 and the biconcave negative lens L5 are cemented.

The second lens unit G2 includes a biconcave negative lens L6, a biconvex positive lens L7, a biconvex positive lens L8, a positive meniscus lens L9 having a convex surface directed toward the image side, a negative meniscus lens L10 having a convex surface directed toward the image side, and a negative meniscus lens L11 having a convex surface directed toward the object side. The biconcave negative lens L6 and the biconvex positive lens L7 are cemented. A predetermined lens unit includes the negative meniscus lens L10 and the negative meniscus lens L11.

The aperture stop S is disposed between the biconcave negative lens L5 and the biconcave negative lens L6.

An aspheric surface is provided to 14 surfaces namely, both surfaces of the negative meniscus lens L1, both surfaces of the biconvex positive lens L2, both surfaces of the biconvex positive lens L3, both surfaces of the biconvex positive lens L8, both surfaces of the positive meniscus lens L9, both surfaces of the negative meniscus lens L10, and both surfaces of the negative meniscus lens L11.

Figure 71A:
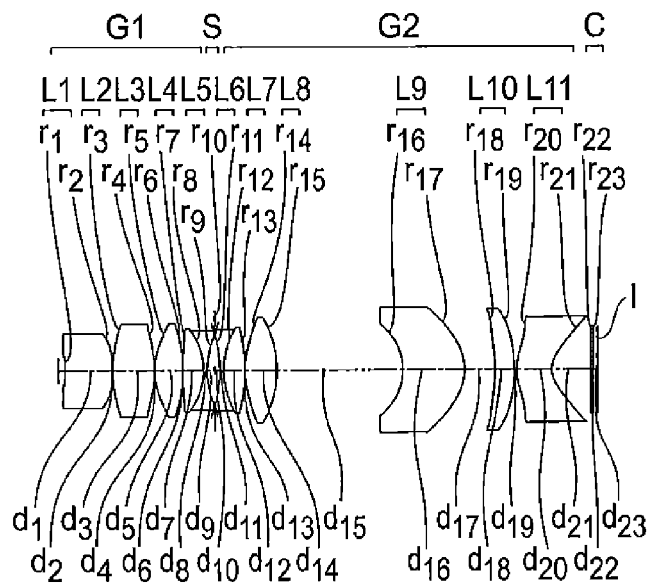
FIG. 71A is a cross-sectional view along an optical axis showing an optical arrangement.
Figures 71B, 71C, 71D, 71E:
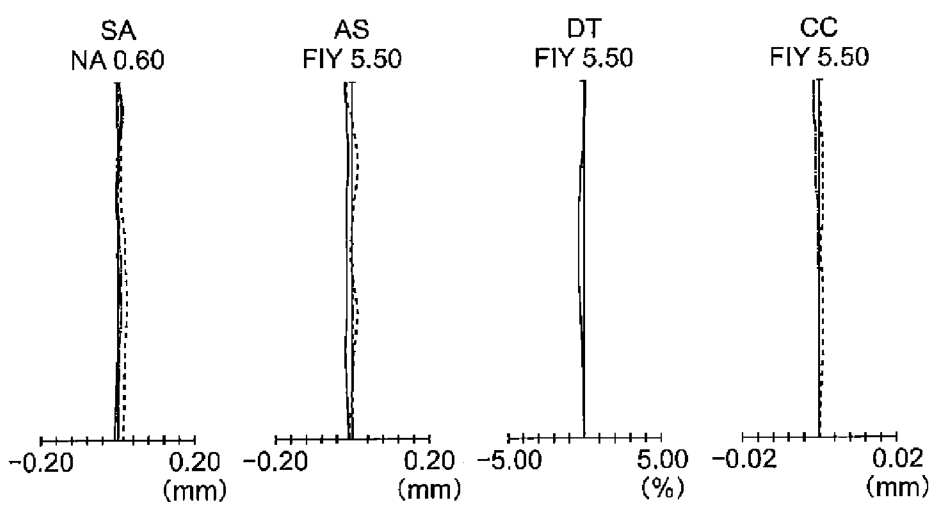
FIG. 71B, FIG. 71C, FIG. 71D, and FIG. 71E are diagrams showing a spherical aberration (SA), an astigmatism (AS), a distortion (DT), and a chromatic aberration of magnification (CC) respectively, of the optical system according to an example 64.

Next, an optical system according to an example 64 will be described below. FIG. 71A is a cross-sectional view along an optical axis showing an optical arrangement of the optical system according to the example 64. Moreover, FIG. 71B, FIG. 71C, FIG. 71D, and FIG. 71E are aberration diagrams of the optical system according to the example 64.

The optical system according to the example 64, as shown in FIG. 71A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a biconvex positive lens L4, and a biconcave negative lens L5. The biconvex positive lens L4 and the biconcave negative lens L5 are cemented.

The second lens unit G2 includes a biconcave negative lens L6, a biconvex positive lens L7, a biconvex positive lens L8, a positive meniscus lens L9 having a convex surface directed toward the image side, a negative meniscus lens L10 having a convex surface directed toward the image side, and a negative meniscus lens L11 having a convex surface directed toward the object side. The biconcave negative lens L6 and the biconvex positive lens L7 are cemented. A predetermined lens unit includes the negative meniscus lens L10 and the negative meniscus lens L11.

The aperture stop S is disposed between the biconcave negative lens L5 and the biconcave negative lens L6.

An aspheric surface is provided to 14 surfaces namely, both surfaces of the negative meniscus lens L1, both surfaces of the biconvex positive lens L2, both surfaces of the biconvex positive lens L3, both surfaces of the biconvex positive lens L8, both surfaces of the positive meniscus lens L9, both surfaces of the negative meniscus lens L10, and both surfaces of the negative meniscus lens L11.

Figure 72A:
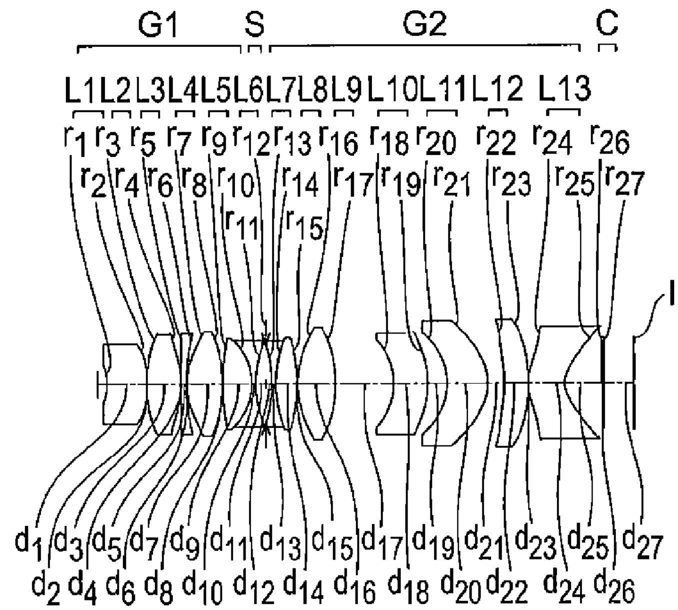
FIG. 72A is a cross-sectional view along an optical axis showing an optical arrangement.
Figures 72B, 72C, 72D, 72E:
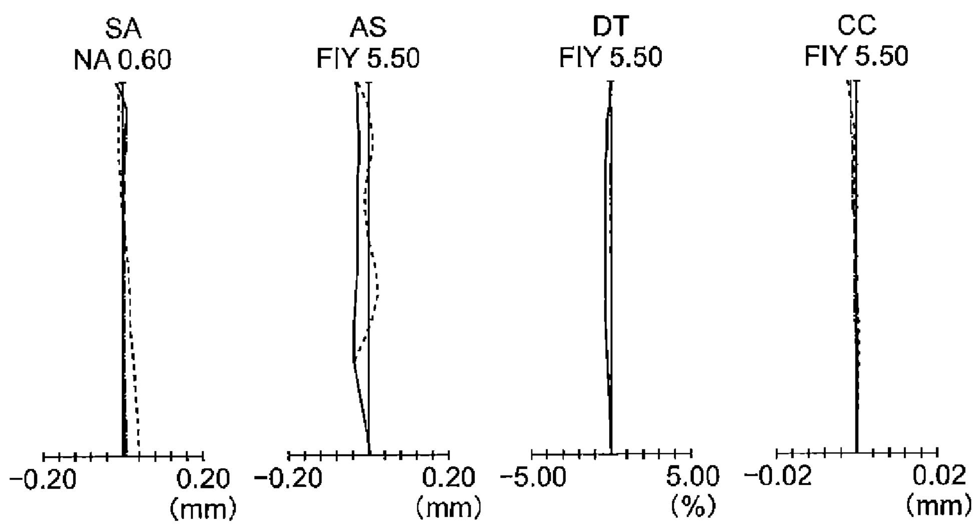
FIG. 72B, FIG. 72C, FIG. 72D, and FIG. 72E are diagrams showing a spherical aberration (SA), an astigmatism (AS), a distortion (DT), and a chromatic aberration of magnification (CC) respectively, of the optical system according to an example 65.

Next, an optical system according to an example 65 will be described below. FIG. 72A is a cross-sectional view along an optical axis showing an optical arrangement of the optical system according to the example 65. Moreover, FIG. 72B, FIG. 72C, FIG. 72D, and FIG. 72E are aberration diagrams of the optical system according to the example 65.

The optical system according to the example 65, as shown in FIG. 72A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a negative meniscus lens L3 having a convex surface directed toward the object side, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a biconvex positive lens L8, a biconvex positive lens L9, a negative meniscus lens L10 having a convex surface directed toward the image side, a positive meniscus lens L11 having a convex surface directed toward the image side, a negative meniscus lens L12 having a convex surface directed toward the image side, and a negative meniscus lens L13 having a convex surface directed toward the object side. The biconcave negative lens L7 and the biconvex positive lens L8 are cemented. A predetermined lens unit includes the negative meniscus lens L12 and the negative meniscus lens L13.

The aperture stop S is disposed between the biconcave negative lens L6 and the biconcave negative lens L7.

An aspheric surface is provided to 18 surfaces namely, both surfaces of the negative meniscus lens L1, both surfaces of the biconvex positive lens L2, both surfaces of the negative meniscus lens L3, both surfaces of the biconvex positive lens L4, both surfaces of the biconvex positive lens L9, both surfaces of the negative meniscus lens L10, both surfaces of the positive meniscus lens L11, both surfaces of the negative meniscus lens L12, and both surfaces of the negative meniscus lens L13.

Figure 73A:
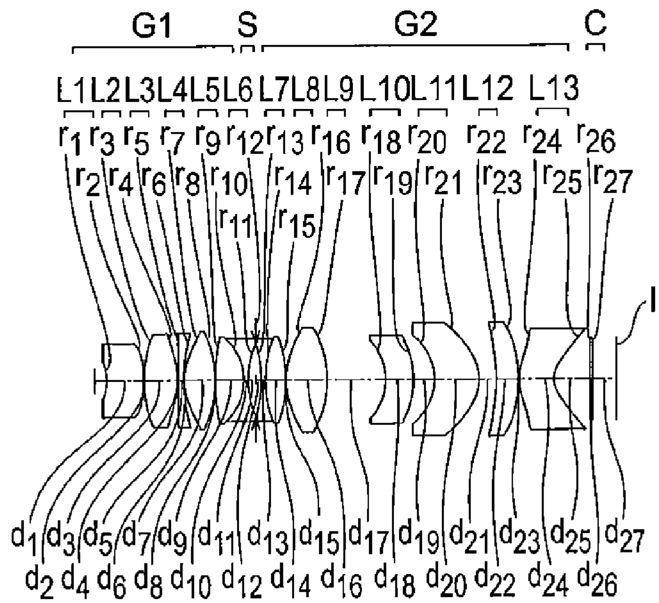
FIG. 73A is a cross-sectional view along an optical axis showing an optical arrangement.
Figures 73B, 73C, 73D, 73E:
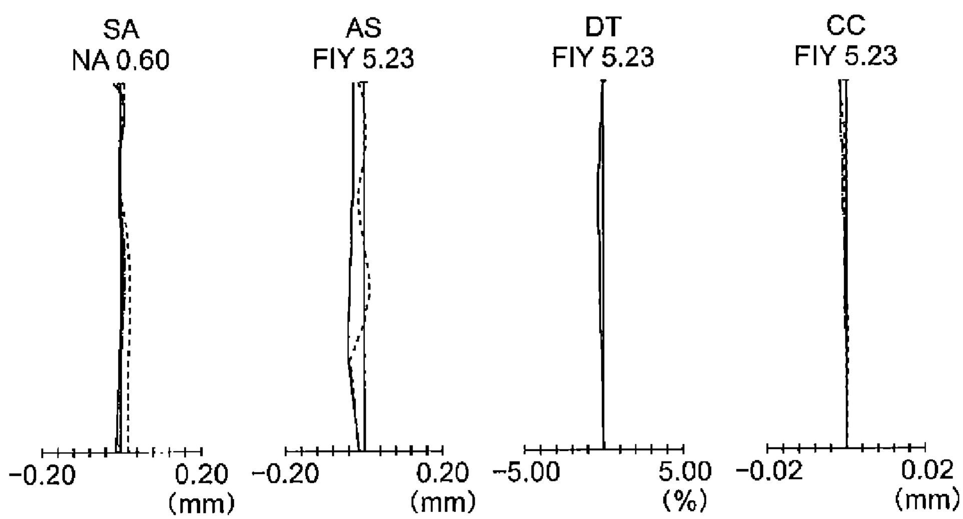
FIG. 73B, FIG. 73C, FIG. 73D, and FIG. 73E are diagrams showing a spherical aberration (SA), an astigmatism (AS), a distortion (DT), and a chromatic aberration of magnification (CC) respectively, of the optical system according to an example 66.

Next, an optical system according to an example 66 will be described below. FIG. 73A is a cross-sectional view along an optical axis showing an optical arrangement of the optical system according to the example 66. Moreover, FIG. 73B, FIG. 73C, FIG. 73D, and FIG. 73E are aberration diagrams of the optical system according to the example 66.

The optical system according to the example 66, as shown in FIG. 73A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a negative meniscus lens L3 having a convex surface directed toward the object side, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a biconvex positive lens L8, a biconvex positive lens L9, a negative meniscus lens L10 having a convex surface directed toward the image side, a positive meniscus lens L11 having a convex surface directed toward the image side, a negative meniscus lens L12 having a convex surface directed toward the image side, and a negative meniscus lens L13 having a convex surface directed toward the object side. The biconcave negative lens L7 and the biconvex positive lens L8 are cemented. A predetermined lens unit includes the negative meniscus lens L12 and the negative meniscus lens L13.

The aperture stop S is disposed between the biconcave negative lens L6 and the biconcave negative lens L7.

An aspheric surface is provided to 18 surfaces namely, both surfaces of the negative meniscus lens L1, both surfaces of the biconvex positive lens L2, both surfaces of the negative meniscus lens L3, both surfaces of the biconvex positive lens L4, both surfaces of the biconvex positive lens L9, both surfaces of the negative meniscus lens L10, both surfaces of the positive meniscus lens L11, both surfaces of the negative meniscus lens L12, and both surfaces of the negative meniscus lens L13.

Figure 74A:
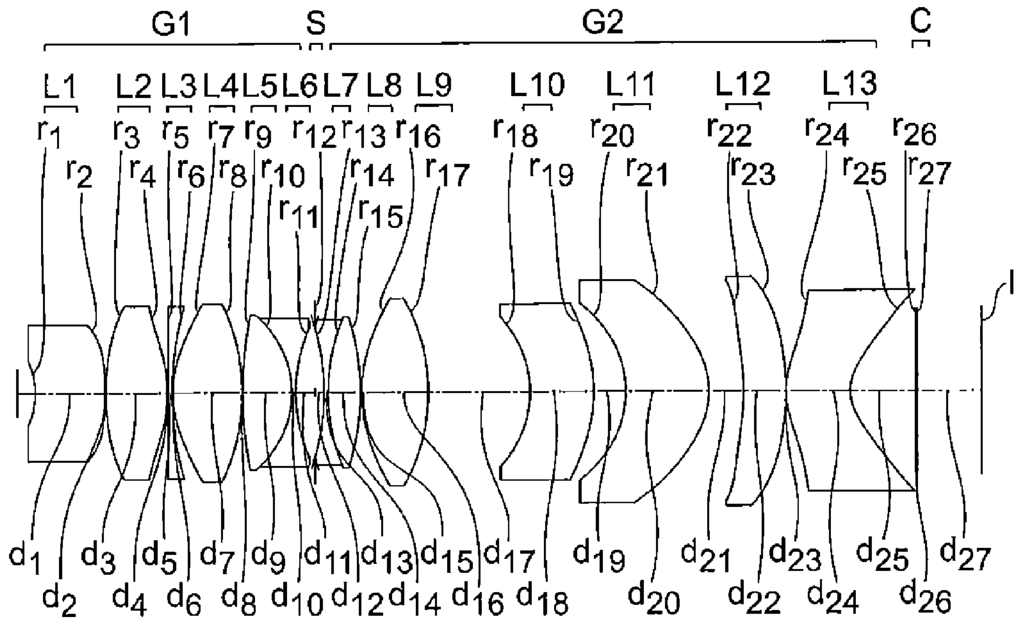
FIG. 74A is a cross-sectional view along an optical axis showing an optical arrangement.
Figure 74B:
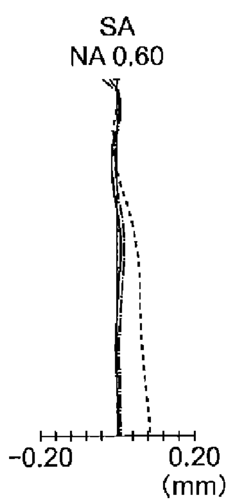
FIG. 74B, FIG. 74C, FIG. 74D, and FIG. 74E are diagrams showing a spherical aberration (SA), an astigmatism (AS), a distortion (DT), and a chromatic aberration of magnification (CC) respectively, of the optical system according to an example 67.
Figure 74C:
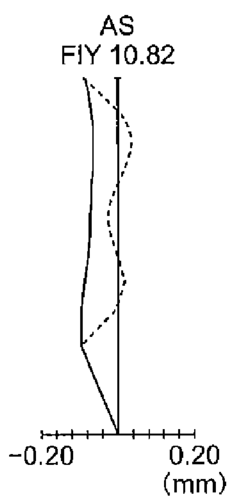
Figure 74D:
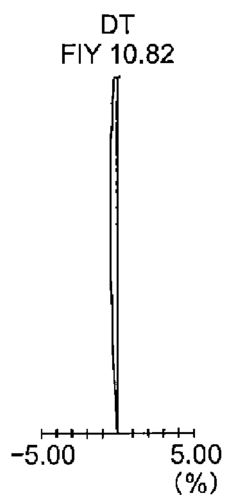
Figure 74E:
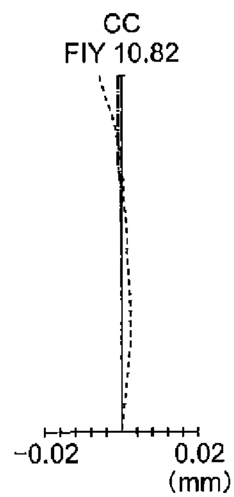

Next, an optical system according to an example 67 will be described below. FIG. 74A is a cross-sectional view along an optical axis showing an optical arrangement of the optical system according to the example 67. Moreover, FIG. 74B, FIG. 74C, FIG. 74D, and FIG. 74E are aberration diagrams of the optical system according to the example 67.

The optical system according to the example 67, as shown in FIG. 74A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a negative meniscus lens L3 having a convex surface directed toward the object side, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a biconvex positive lens L8, a biconvex positive lens L9, a negative meniscus lens L10 having a convex surface directed toward the image side, a positive meniscus lens L11 having a convex surface directed toward the image side, a negative meniscus lens L12 having a convex surface directed toward the image side, and a negative meniscus lens L13 having a convex surface directed toward the object side. The biconcave negative lens L7 and the biconvex positive lens L8 are cemented. A predetermined lens unit includes the negative meniscus lens L12 and the negative meniscus lens L13.

The aperture stop S is disposed between the biconcave negative lens L6 and the biconcave negative lens L7.

An aspheric surface is provided to 18 surfaces namely, both surfaces of the negative meniscus lens L1, both surfaces of the biconvex positive lens L2, both surfaces of the negative meniscus lens L3, both surfaces of the biconvex positive lens L4, both surfaces of the biconvex positive lens L9, both surfaces of the negative meniscus lens L10, both surfaces of the positive meniscus lens L11, both surfaces of the negative meniscus lens L12, and both surfaces of the negative meniscus lens L13.

Figure 75A:
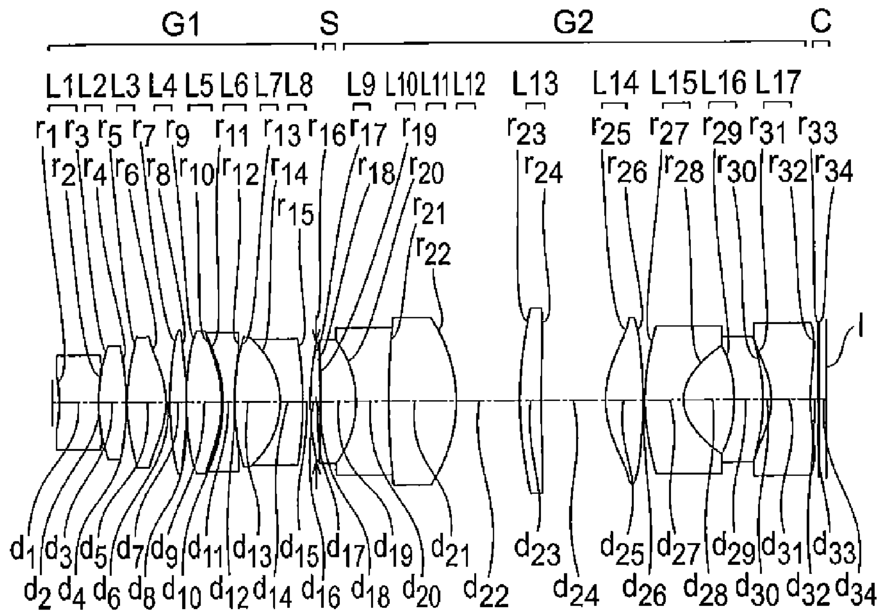
FIG. 75A is a cross-sectional view along an optical axis showing an optical arrangement.
Figures 75B, 75C, 75D, 75E:
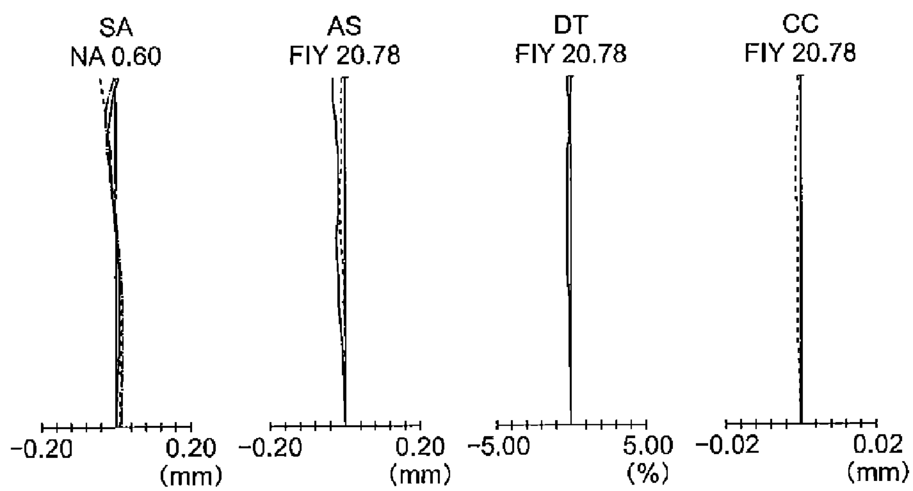
FIG. 75B, FIG. 75C, FIG. 75D, and FIG. 75E are diagrams showing a spherical aberration (SA), an astigmatism (AS), a distortion (DT), and a chromatic aberration of magnification (CC) respectively, of the optical system according to an example 68.

Next, an optical system according to an example 68 will be described below. FIG. 75A is a cross-sectional view along an optical axis showing an optical arrangement of the optical system according to the example 68. Moreover, FIG. 75B, FIG. 75C, FIG. 75D, and FIG. 75E are aberration diagrams of the optical system according to the example 68.

The optical system according to the example 68, as shown in FIG. 75A, includes in order from an object side, a first lens unit G1 having a positive refractive power, an aperture stop S, and a second lens unit G2 having a positive refractive power.

The first lens unit G1 includes a biconcave negative lens L1, a biconvex positive lens L2, a biconvex positive lens L3, a biconvex positive lens L4, a biconvex positive lens L5, a biconcave negative lens L6, a biconvex positive lens L7, and a negative meniscus lens L8 having a convex surface directed toward an image side. The biconvex positive lens L7 and the negative meniscus lens L8 are cemented.

The second lens unit G2 includes a biconvex positive lens L9, a positive meniscus lens L10 having a convex surface directed toward the image side, a biconcave negative lens L11, a biconvex positive lens L12, a positive meniscus lens L13 having a convex surface directed toward the object side, a biconvex positive lens L14, a negative meniscus lens L15 having a convex surface directed toward the object side, a negative meniscus lens L16 having a convex surface directed toward the image side, and a biconcave negative lens L17. The positive meniscus lens L10, the biconcave negative lens L11, and the biconvex positive lens L12 are cemented. A predetermined lens unit includes the negative meniscus lens L16 and the biconcave negative lens L17.

The aperture stop S is disposed between the negative meniscus lens L8 and the biconvex positive lens L9. More elaborately, the aperture stop is disposed between a vertex of an object-side surface of the biconvex positive lens L9 and a vertex of an image-side surface of the biconvex positive lens L9.

An aspheric surface is provided to 24 surfaces namely, both surfaces of the biconcave negative lens L1, both surfaces of the biconvex positive lens L2, both surfaces of the biconvex positive lens L3, both surfaces of the biconvex positive lens L4, both surfaces of the biconvex positive lens L5, both surfaces of the biconcave negative lens L6, both surfaces of the biconvex positive lens L9, both surfaces of the positive meniscus lens L13, both surfaces of the biconvex positive lens L14, both surfaces of the negative meniscus lens L15, both surfaces of the negative meniscus lens L16, and both surfaces of the biconcave negative lens L17.

Figure 76A:
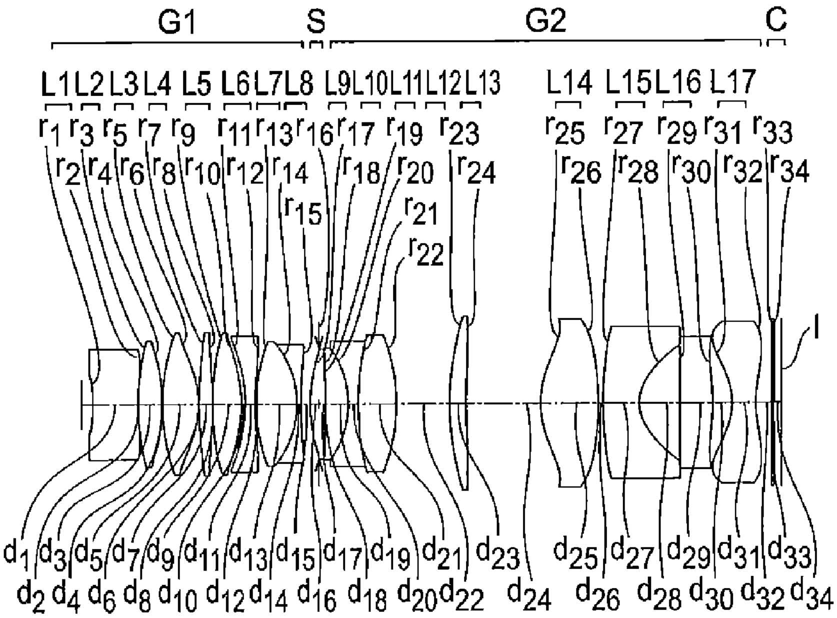
FIG. 76A is a cross-sectional view along an optical axis showing an optical arrangement.
Figures 76B, 76C, 76D, 76E:
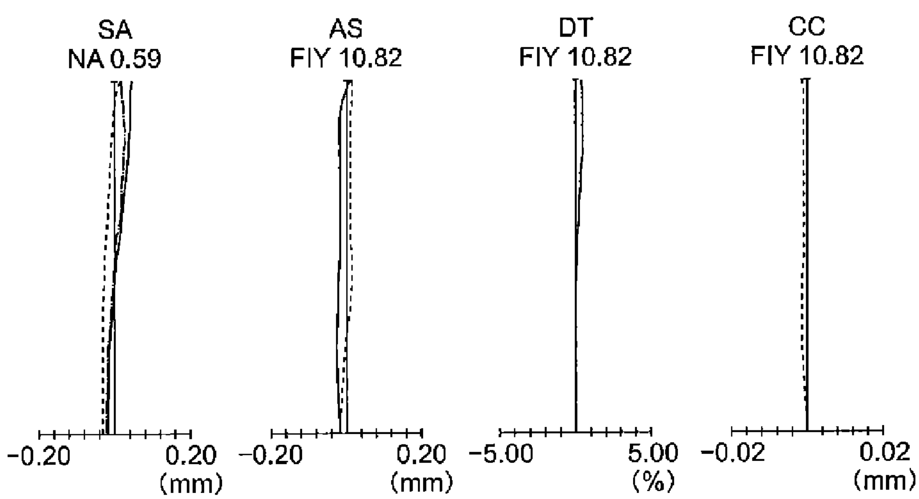
FIG. 76B, FIG. 76C, FIG. 76D, and FIG. 76E are diagrams showing a spherical aberration (SA), an astigmatism (AS), a distortion (DT), and a chromatic aberration of magnification (CC) respectively, of the optical system according to an example 69.

Next, an optical system according to an example 69 will be described below. FIG. 76A is a cross-sectional view along an optical axis showing an optical arrangement of the optical system according to the example 69. Moreover, FIG. 76B, FIG. 76C, FIG. 76D, and FIG. 76E are aberration diagrams of the optical system according to the example 69.

The optical system according to the example 69, as shown in FIG. 76A, includes in order from an object side, a first lens unit G1 having a positive refractive power, an aperture stop S, and a second lens unit G2 having a positive refractive power.

The first lens unit G1 includes a biconcave negative lens L1, a biconvex positive lens L2, a biconvex positive lens L3, a biconvex positive lens L4, a biconvex positive lens L5, a biconcave negative lens L6, a biconvex positive lens L7, and a biconcave negative lens L8. The biconvex positive lens L7 and the biconcave negative lens L8 are cemented.

The second lens unit G2 includes a biconvex positive lens L9, a positive meniscus lens L10 having a convex surface directed toward an image side, a biconcave negative lens L11, a biconvex positive lens L12, a positive meniscus lens L13 having a convex surface directed toward the object side, a biconvex positive lens L14, a negative meniscus lens L15 having a convex surface directed toward the object side, a biconvex positive lens L16, and a biconcave negative lens L17. The positive meniscus lens L10, the biconcave negative lens L11, and the biconvex positive lens L12 are cemented. A predetermined lens unit includes the biconcave negative lens L17.

The aperture stop S is disposed between the biconcave negative lens L8 and the biconvex positive lens L9. More elaborately, the aperture stop S is disposed between a vertex of an object-side surface of the biconvex positive lens L9 and a vertex of an image-side surface of the biconvex positive lens L9.

An aspheric surface is provided to 24 surfaces namely, both surfaces of the biconcave negative lens L1, both surfaces of the biconvex positive lens L2, both surfaces of the biconvex positive lens L3, both surfaces of the biconvex positive lens L4, both surfaces of the biconvex positive lens L5, both surfaces of the biconcave negative lens L6, both surfaces of the biconvex positive lens L9, both surfaces of the positive meniscus lens L13, both surfaces of the biconvex positive lens L14, both surfaces of the negative meniscus lens L15, both surfaces of the biconvex positive lens L16, and both surfaces of the biconcave negative lens L17.

Figure 77A:
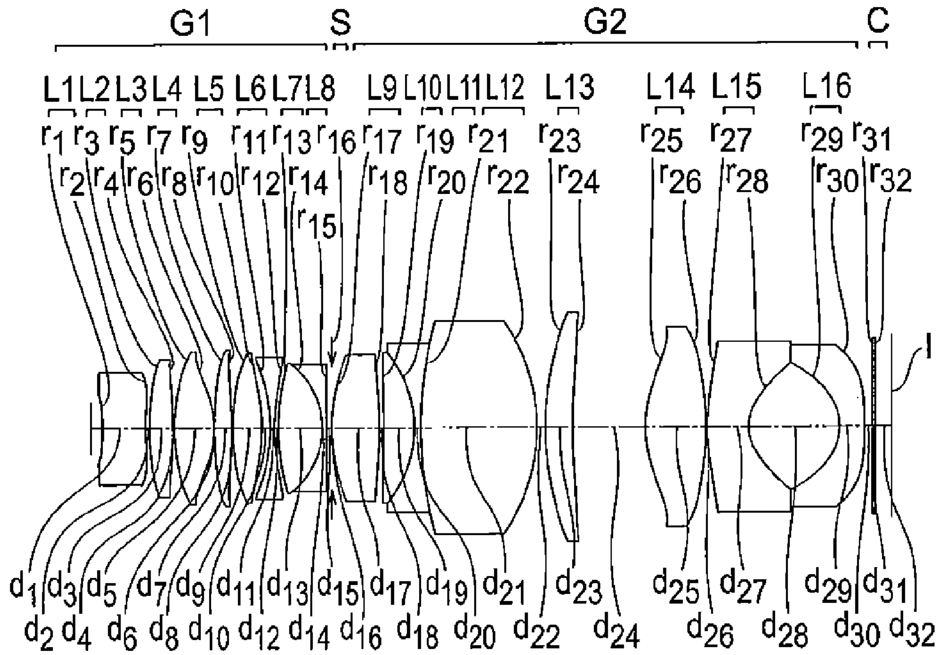
FIG. 77A is a cross-sectional view along an optical axis showing an optical arrangement.
Figures 77B, 77C, 77D, 77E:
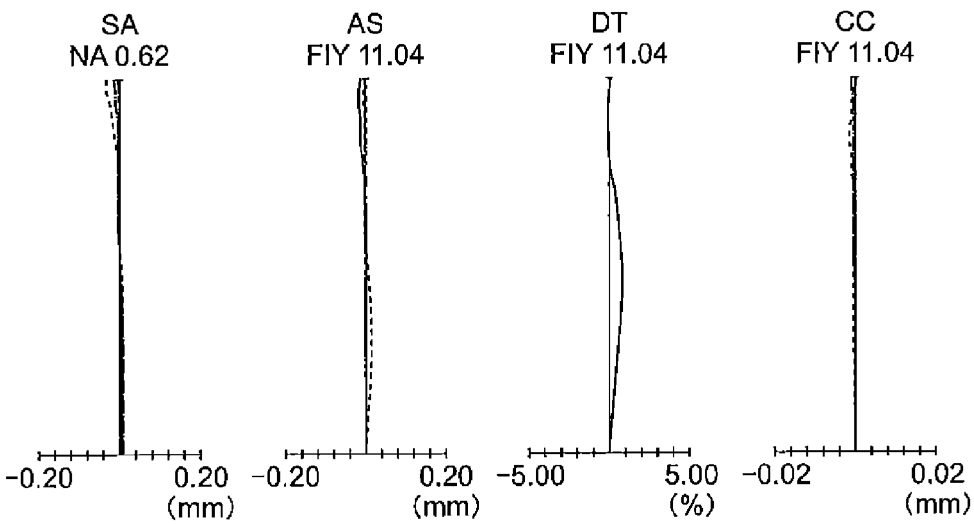
FIG. 77B, FIG. 77C, FIG. 77D, and FIG. 77E are diagrams showing a spherical aberration (SA), an astigmatism (AS), a distortion (DT), and a chromatic aberration of magnification (CC) respectively, of the optical system according to an example 70.

Next, an optical system according to an example 70 will be described below. FIG. 77A is a cross-sectional view along an optical axis showing an optical arrangement of the optical system according to the example 70. Moreover, FIG. 77B, FIG. 77C, FIG. 77D, and FIG. 77E are aberration diagrams of the optical system according to the example 70.

The optical system according to the example 70, as shown in FIG. 77A, includes in order from an object side, a first lens unit G1 having a positive refractive power, an aperture stop S, and a second lens unit G2 having a positive refractive power.

The first lens unit G1 includes a biconcave negative lens L1, a biconvex positive lens L2, a biconvex positive lens L3, a biconvex positive lens L4, a biconvex positive lens L5, a biconcave negative lens L6, a biconvex positive lens L7, and a biconcave negative lens L8. The biconvex positive lens L7 and the biconcave negative lens L8 are cemented.

The second lens unit G2 includes a biconvex positive lens L9, a positive meniscus lens L10 having a convex surface directed toward an image side, a biconcave negative lens L11, a biconvex positive lens L12, a positive meniscus lens L13 having a convex surface directed toward the object side, a biconvex positive lens L14, a negative meniscus lens L15 having a convex surface directed toward the object side, and a negative meniscus lens L16 having a convex surface directed toward the image side. The positive meniscus lens L10, the biconcave negative lens L11, and the biconvex positive lens L12 are cemented. A predetermined lens unit includes the negative meniscus lens L15 and the negative meniscus lens L16.

The aperture stop S is disposed between the biconcave negative lens L8 and the biconvex positive lens L9.

An aspheric surface is provided to 22 surfaces namely, both surfaces of the biconcave negative lens L1, both surfaces of the biconvex positive lens L2, both surfaces of the biconvex positive lens L3, both surfaces of the biconvex positive lens L4, both surfaces of the biconvex positive lens L5, both surfaces of the biconcave negative lens L6, both surfaces of the biconvex positive lens L9, both surfaces of the positive meniscus lens L13, both surfaces of the biconvex positive lens L14, both surfaces of the negative meniscus lens L15, and both surfaces of the negative meniscus lens L16.

Figure 78A:
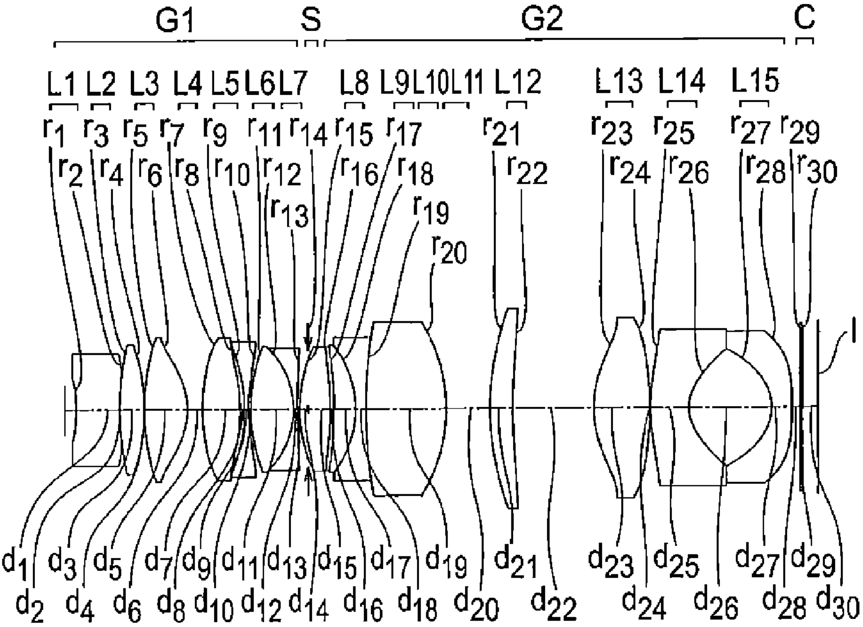
FIG. 78A is a cross-sectional view along an optical axis showing an optical arrangement.
Figures 78B, 78C, 78D, 78E:
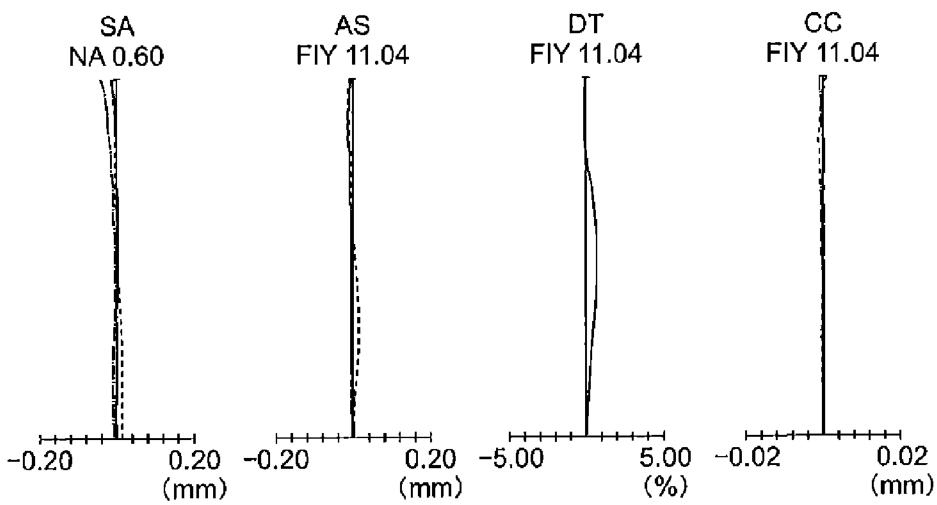
FIG. 78B, FIG. 78C, FIG. 78D, and FIG. 78E are diagrams showing a spherical aberration (SA), an astigmatism (AS), a distortion (DT), and a chromatic aberration of magnification (CC) respectively, of the optical system according to an example 71.

Next, an optical system according to an example 71 will be described below. FIG. 78A is a cross-sectional view along an optical axis showing an optical arrangement of the optical system according to the example 71. Moreover, FIG. 78B, FIG. 78C, FIG. 78D, and FIG. 78E are aberration diagrams of the optical system according to the example 71.

The optical system according to the example 71, as shown in FIG. 78A, includes in order from an object side, a first lens unit G1 having a positive refractive power, an aperture stop S, and a second lens unit G2 having a positive refractive power.

The first lens unit G1 includes a biconcave negative lens L1, a biconvex positive lens L2, a biconvex positive lens L3, a biconvex positive lens L4, a biconcave negative lens L5, a biconvex positive lens L6, and a biconcave negative lens L7. The biconvex positive lens L6 and the biconcave negative lens L7 are cemented.

The second lens unit G2 includes a biconvex positive lens L8, a positive meniscus lens L9 having a convex surface directed toward an image side, a biconcave negative lens L10, a biconvex positive lens L11, a positive meniscus lens L12 having a convex surface directed toward the object side, a biconvex positive lens L13, a negative meniscus lens L14 having a convex surface directed toward the object side, and a negative meniscus lens L15 having a convex surface directed toward the image side. The positive meniscus lens L9, the biconcave negative lens L10, and the biconvex positive lens L11 are cemented. A predetermined lens unit includes the negative meniscus lens L14 and the negative meniscus lens L15.

The aperture stop S is disposed between the biconcave negative lens L7 and the biconvex positive lens L8. More elaborately, the aperture stop S is disposed between a vertex of an object-side surface of the biconvex positive lens L8 and a vertex of an image-side surface of the biconvex positive lens L8.

An aspheric surface is provided to 20 surfaces namely, both surfaces of the biconcave negative lens L1, both surfaces of the biconvex positive lens L2, both surfaces of the biconvex positive lens L3, both surfaces of the biconvex positive lens L4, both surfaces of the biconcave negative lens L5, both surfaces of the biconvex positive lens L8, both surfaces of the positive meniscus lens L12, both surfaces of the biconvex positive lens L13, both surfaces of the negative meniscus lens L14, and both surfaces of the negative meniscus lens L15.

Figure 79A:
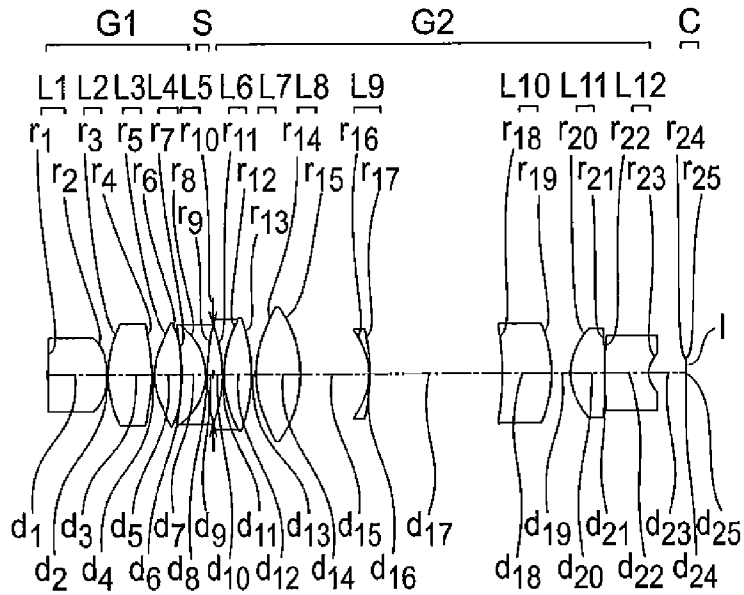
FIG. 79A is a cross-sectional view along an optical axis showing an optical arrangement.
Figures 79B, 79C, 79D, 79E:
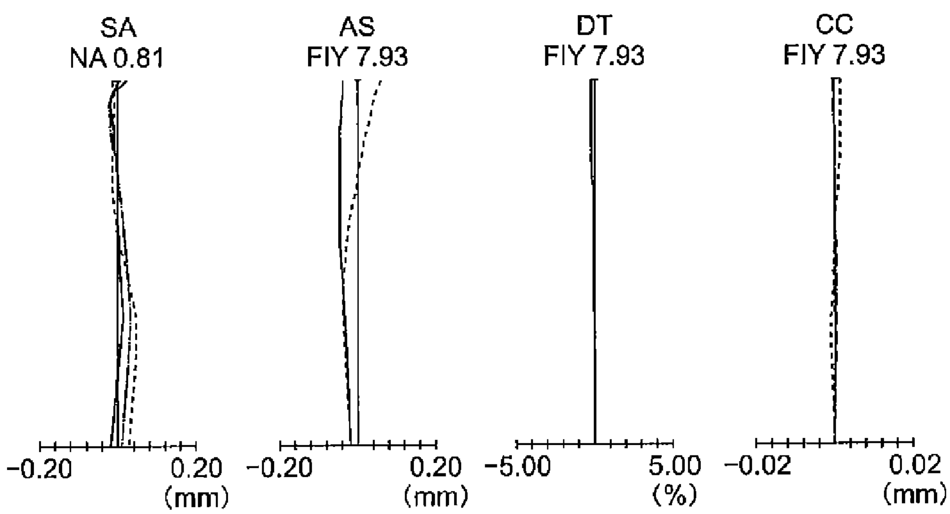
FIG. 79B, FIG. 79C, FIG. 79D, and FIG. 79E are diagrams showing a spherical aberration (SA), an astigmatism (AS), a distortion (DT), and a chromatic aberration of magnification (CC) respectively, of the optical system according to an example 72.

Next, an optical system according to an example 72 will be described below. FIG. 79A is a cross-sectional view along an optical axis showing an optical arrangement of the optical system according to the example 72. Moreover, FIG. 79B, FIG. 79C, FIG. 79D, and FIG. 79E are aberration diagrams of the optical system according to the example 72.

The optical system according to the example 72, as shown in FIG. 79A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a positive meniscus lens L4 having a convex surface directed toward the image side, and a biconcave negative lens L5. The positive meniscus lens L4 and the biconcave negative lens L5 are cemented.

The second lens unit G2 includes a biconcave negative lens L6, a biconvex positive lens L7, a biconvex positive lens L8, a negative meniscus lens L9 having a convex surface directed toward the image side, a positive meniscus lens L10 having a convex surface directed toward the image side, a biconvex positive lens L11, and a negative meniscus lens L12 having a convex surface directed toward the object side. The biconcave negative lens L6 and the biconvex positive lens L7 are cemented. A predetermined lens unit includes the negative meniscus lens L12.

The aperture stop S is disposed between the biconcave negative lens L5 and the biconcave negative lens L6.

An aspheric surface is provided to 16 surfaces namely, both surfaces of the negative meniscus lens L1, both surfaces of the biconvex positive lens L2, both surfaces of the biconvex positive lens L3, both surfaces of the biconvex positive lens L8, both surfaces of the negative meniscus lens L9, both surfaces of the positive meniscus lens L10, both surfaces of the biconvex positive lens L11, and both surfaces of the negative meniscus lens L12.

Figure 80A:
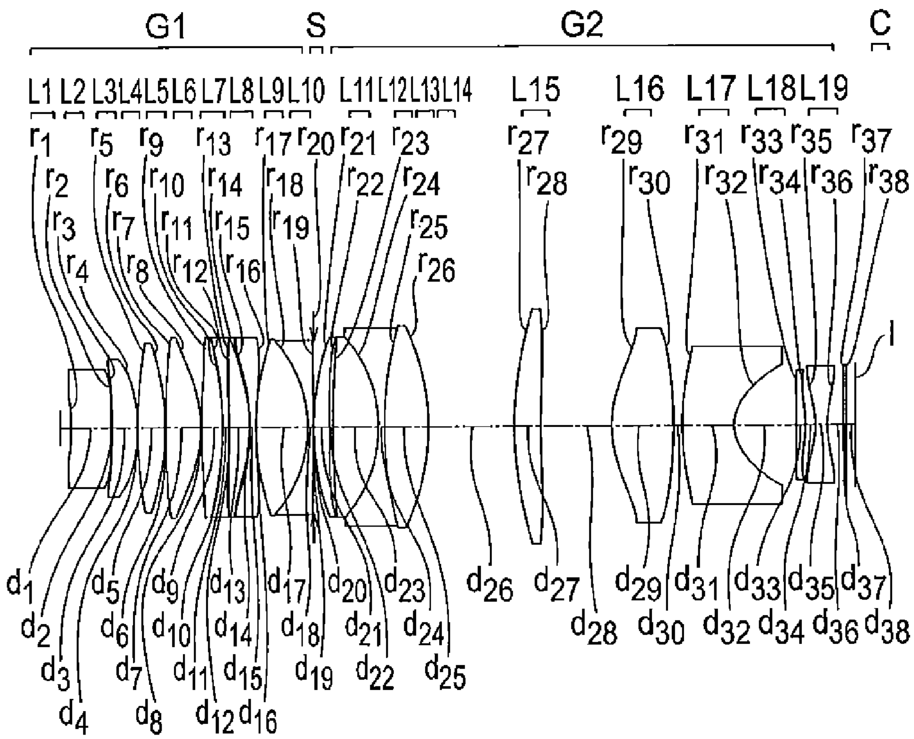
FIG. 80A is a cross-sectional view along an optical axis showing an optical arrangement.
Figures 80B, 80C, 80D, 80E:
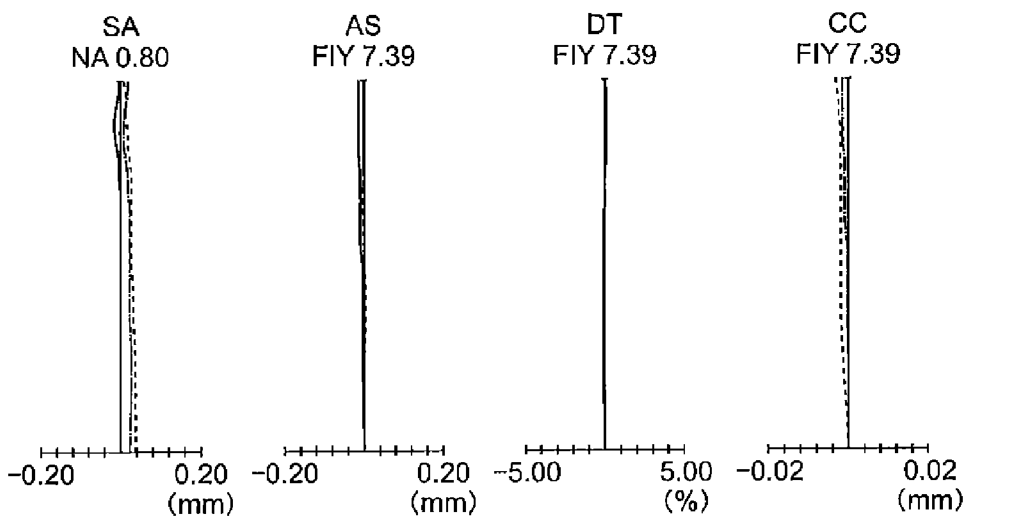
FIG. 80B, FIG. 80C, FIG. 80D, and FIG. 80*e* are diagrams showing a spherical aberration (SA), an astigmatism (AS), a distortion (DT), and a chromatic aberration of magnification (CC) respectively, of the optical system according to an example 73.

Next, an optical system according to an example 73 will be described below. FIG. 80A is a cross-sectional view along an optical axis showing an optical arrangement of the optical system according to the example 73. Moreover, FIG. 80B, FIG. 80C, FIG. 80D, and FIG. 80E are aberration diagrams of the optical system according to the example 73.

The optical system according to the example 73, as shown in FIG. 80A, includes in order from an object side, a first lens unit G1 having a positive refractive power, an aperture stop S, and a second lens unit G2 having a positive refractive power.

The first lens unit G1 includes a biconcave negative lens L1, a positive meniscus lens L2 having a convex surface directed toward an image side, a biconvex positive lens L3, a biconvex positive lens L4, a biconvex positive lens L5, a negative meniscus lens L6 having a convex surface directed toward the image side, a positive meniscus lens L7 having a convex surface directed toward the image side, a biconcave negative lens L8, a biconvex positive lens L9, and a negative meniscus lens L10 having a convex surface directed toward the image side. The biconvex positive lens L9 and the negative meniscus lens L10 are cemented.

The second lens unit G2 includes a positive meniscus lens L11 having a convex surface directed toward the object side, a biconvex positive lens L12, a biconcave negative lens L13, a biconvex positive lens L14, a positive meniscus lens L15 having a convex surface directed toward the object side, a biconvex positive lens L16, a negative meniscus lens L17 having a convex surface directed toward the object side, a positive meniscus lens L18 having a convex surface directed toward the image side, and a biconcave negative lens L19. The biconvex positive lens L12, the biconcave negative lens L13, and the biconvex positive lens L14 are cemented. A predetermined lens unit includes the biconcave negative lens L19.

The aperture stop S is disposed between the negative meniscus lens L10 and the positive meniscus lens L11.

An aspheric surface is provided to 28 surfaces namely, both surfaces of the biconcave negative lens L1, both surfaces of the positive meniscus lens L2, both surfaces of the biconvex positive lens L3, both surfaces of the biconvex positive lens L4, both surfaces of the biconvex positive lens L5, both surfaces of the negative meniscus lens L6, both surfaces of the positive meniscus lens L7, both surfaces of the biconcave negative lens L8, both surfaces of the positive meniscus lens L11, both surfaces of the positive meniscus lens L15, both surfaces of the biconvex positive lens L16, both surfaces of the negative meniscus lens L17, both surfaces of the positive meniscus lens L18, and both surfaces of the biconcave negative lens L19.

Figure 81A:
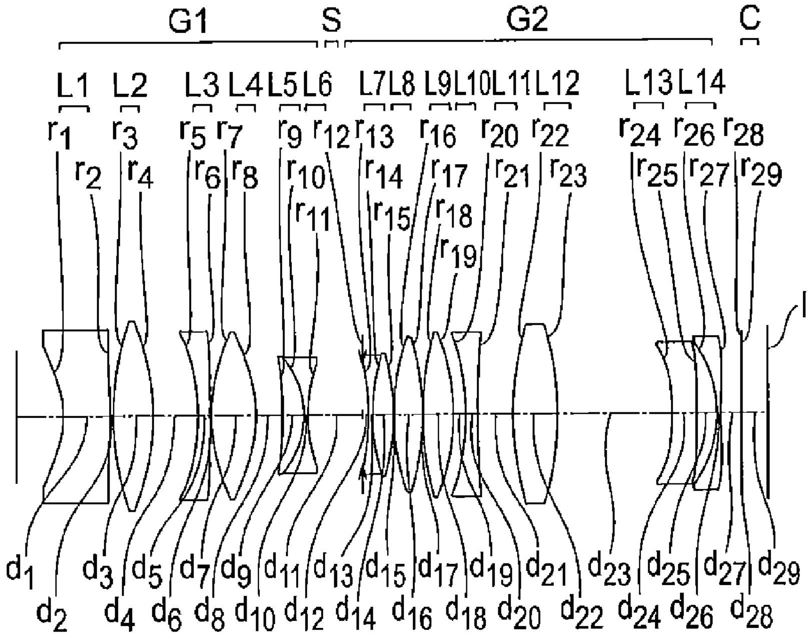
FIG. 81A is a cross-sectional view along an optical axis showing an optical arrangement.
Figures 81B, 81C, 81D, 81E:
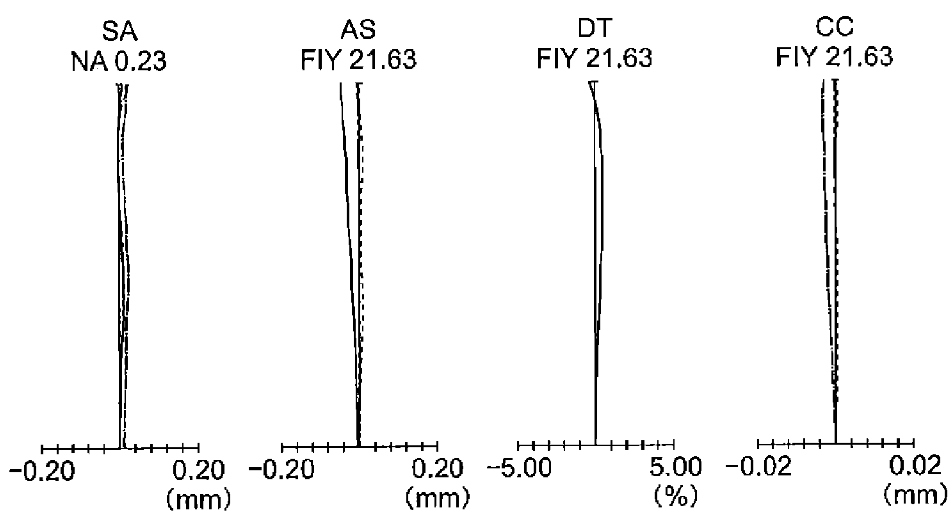
FIG. 81B, FIG. 81C, FIG. 81D, and FIG. 81E are diagrams showing a spherical aberration (SA), an astigmatism (AS), a distortion (DT), and a chromatic aberration of magnification (CC) respectively, of the optical system according to an example 74.

Next, an optical system according to an example 74 will be described below. FIG. 81A is a cross-sectional view along an optical axis showing an optical arrangement of the optical system according to the example 74. Moreover, FIG. 81B, FIG. 81C, FIG. 81D, and FIG. 81E are aberration diagrams of the optical system according to the example 74.

The optical system according to the example 74, as shown in FIG. 81A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a negative meniscus lens L3 having a convex surface directed toward the image side, a biconvex positive lens L4, a positive meniscus lens L5 having a convex surface directed toward the image side, and a biconcave negative lens L6. The positive meniscus lens L5 and the biconcave negative lens L6 are cemented.

The second lens unit G2 includes a biconcave negative lens L7, a biconvex positive lens L8, a biconvex positive lens L9, a biconvex positive lens L10, a biconcave negative lens L11, a biconvex positive lens L12, a negative meniscus lens L13 having a convex surface directed toward the image side, and a biconcave negative lens L14. The biconcave negative lens L7 and the biconvex positive lens L8 are cemented. A predetermined lens unit includes the negative meniscus lens L13 and the biconcave negative lens L14.

The aperture stop S is disposed between the biconcave negative lens L6 and the biconcave negative lens L7.

An aspheric surface is provided to 20 surfaces namely, both surfaces of the negative meniscus lens L1, both surfaces of the biconvex positive lens L2, both surfaces of the negative meniscus lens L3, both surfaces of the biconvex positive lens L4, both surfaces of the biconvex positive lens L9, both surfaces of the biconvex positive lens L10, both surfaces of the biconcave negative lens L11, both surfaces of the biconvex positive lens L12, both surfaces of the negative meniscus lens L13, and both surfaces of the biconcave negative lens L14.

Figure 82A:
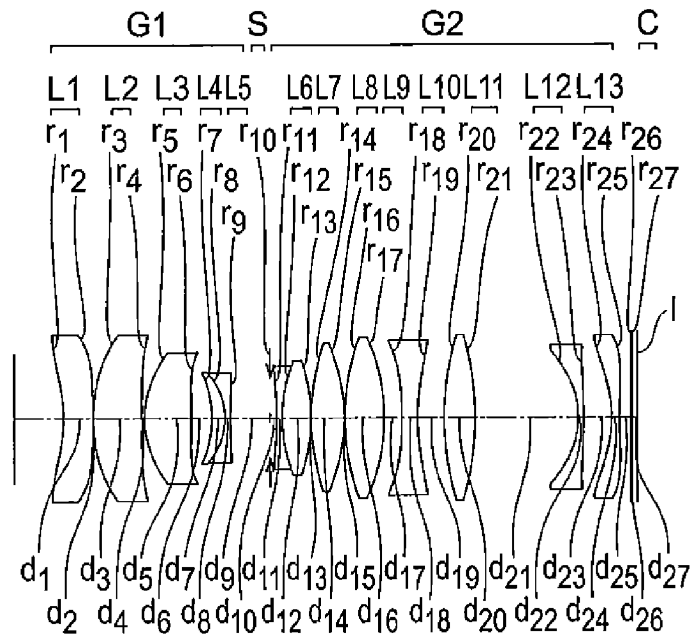
FIG. 82A is a cross-sectional view along an optical axis showing an optical arrangement.
Figures 82B, 82C, 82D, 82E:
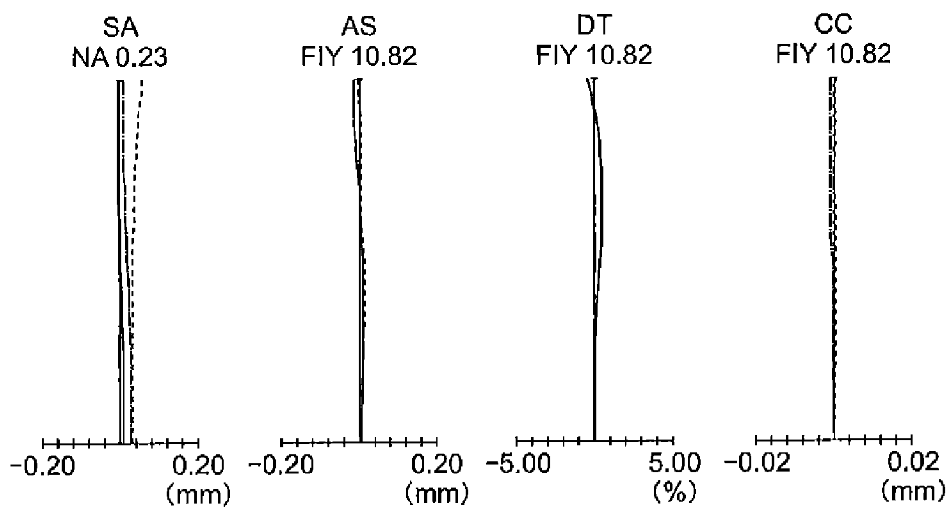
FIG. 82B, FIG. 82C, FIG. 82D, and FIG. 82E are diagrams showing a spherical aberration (SA), an astigmatism (AS), a distortion (DT), and a chromatic aberration of magnification (CC) respectively, of the optical system according to an example 75.

Next, an optical system according to an example 75 will be described below. FIG. 82A is a cross-sectional view along an optical axis showing an optical arrangement of the optical system according to the example 75. Moreover, FIG. 82B, FIG. 82C, FIG. 82D, and FIG. 82E are aberration diagrams of the optical system according to the example 75.

The optical system according to the example 75, as shown in FIG. 82A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a positive meniscus lens L4 having a convex surface directed toward the image side, and a biconcave negative lens L5. The positive meniscus lens L4 and the biconcave negative lens L5 are cemented.

The second lens unit G2 includes a biconcave negative lens L6, a biconvex positive lens L7, a biconvex positive lens L8, a biconvex positive lens L9, a biconcave negative lens L10, a biconvex positive lens L11, a negative meniscus lens L12 having a convex surface directed toward the image side, and a biconcave negative lens L13. The biconcave negative lens L6 and the biconvex positive lens L7 are cemented. A predetermined lens unit includes the negative meniscus lens L12 and the biconcave negative lens L13.

The aperture stop S is disposed between the biconcave negative lens L5 and the biconcave negative lens L6.

An aspheric surface is provided to 18 surfaces namely, both surfaces of the negative meniscus lens L1, both surfaces of the biconvex positive lens L2, both surfaces of the biconvex positive lens L3, both surfaces of the biconvex positive lens L8, both surfaces of the biconvex positive lens L9, both surfaces of the biconcave negative lens L10, both surfaces of the biconvex positive lens L11, both surfaces of the negative meniscus lens L12, and both surfaces of the biconcave negative lens L13.

Figure 83A:
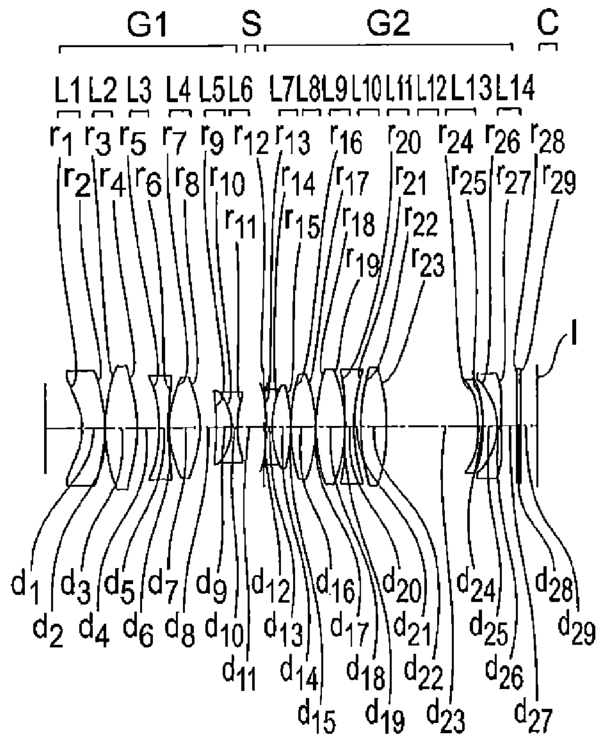
FIG. 83A is a cross-sectional view along an optical axis showing an optical arrangement.
Figures 83B, 83C, 83D, 83E:
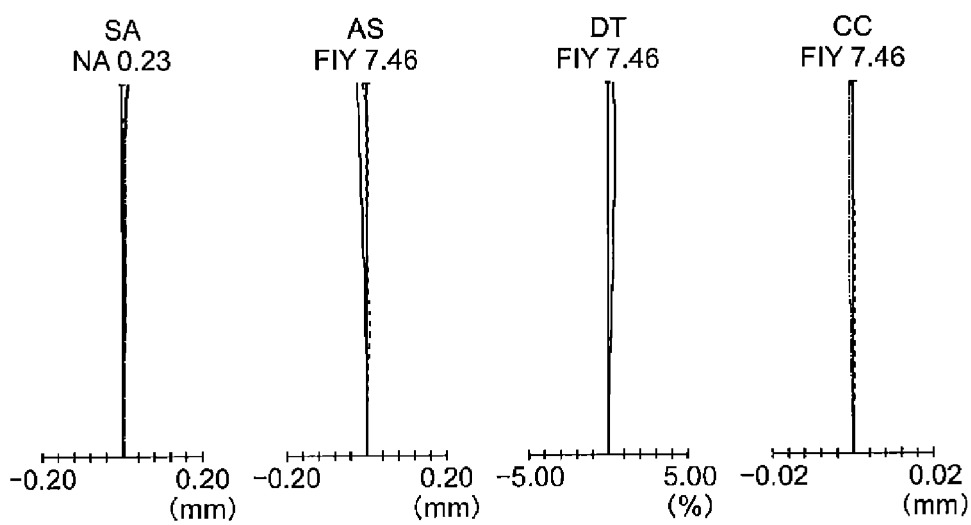
FIG. 83B, FIG. 83C, FIG. 83D, and FIG. 83E are diagrams showing a spherical aberration (SA), an astigmatism (AS), a distortion (DT), and a chromatic aberration of magnification (CC) respectively, of the optical system according to an example 76.

Next, an optical system according to an example 76 will be described below. FIG. 83A is a cross-sectional view along an optical axis showing an optical arrangement of the optical system according to the example 76. Moreover, FIG. 83B, FIG. 83C, FIG. 83D, and FIG. 83E are aberration diagrams of the optical system according to the example 76.

The optical system according to the example 76, as shown in FIG. 83A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconcave negative lens L3, a biconvex positive lens L4, a positive meniscus lens L5 having a convex surface directed toward the image side, and a biconcave negative lens L6. The positive meniscus lens L5 and the biconcave negative lens L6 are cemented.

The second lens unit G2 includes a biconcave negative lens L7, a biconvex positive lens L8, a biconvex positive lens L9, a biconvex positive lens L10, a biconcave negative lens L11, a biconvex positive lens L12, a negative meniscus lens L13 having a convex surface directed toward the image side, and a biconcave negative lens L14. The biconcave negative lens L7 and the biconvex positive lens L8 are cemented. A predetermined lens unit includes the negative meniscus lens L13 and the biconcave negative lens L14.

The aperture stop S is disposed between the biconcave negative lens L6 and the biconcave negative lens L7.

An aspheric surface is provided to 20 surfaces namely, both surfaces of the negative meniscus lens L1, both surfaces of the biconvex positive lens L2, both surfaces of the biconcave negative lens L3, both surfaces of the biconvex positive lens L4, both surfaces of the biconvex positive lens L9, both surfaces of the biconvex positive lens L10, both surfaces of the biconcave negative lens L11, both surfaces of the biconvex positive lens L12, both surfaces of the negative meniscus lens L13, and both surfaces of the biconcave negative lens L14.

Next, an optical system according to an example 77 will be described below. FIG. 84A is a cross-sectional view along an optical axis showing an optical arrangement of the optical system according to the example 77. Moreover, FIG. 84B, FIG. 84C, FIG. 84D, and FIG. 84E are aberration diagrams of the optical system according to the example 77.

The optical system according to the example 77, as shown in FIG. 84A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconcave negative lens L3, a biconvex positive lens L4, a positive meniscus lens L5 having a convex surface directed toward the image side, and a biconcave negative lens L6. The positive meniscus lens L5 and the biconcave negative lens L6 are cemented.

The second lens unit G2 includes a biconcave negative lens L7, a biconvex positive lens L8, a biconvex positive lens L9, a biconvex positive lens L10, a negative meniscus lens L11 having a convex surface directed toward the image side, a biconvex positive lens L12, a negative meniscus lens L13 having a convex surface directed toward the image side, and a biconcave negative lens L14. The biconcave negative lens L7 and the biconvex positive lens L8 are cemented. A predetermined lens unit includes the negative meniscus lens L13 and the biconcave negative lens L14.

The aperture stop S is disposed between the biconcave negative lens L6 and the biconcave negative lens L7.

An aspheric surface is provided to 20 surfaces namely, both surfaces of the negative meniscus lens L1, both surfaces of the biconvex positive lens L2, both surfaces of the biconcave negative lens L3, both surfaces of the biconvex positive lens L4, both surfaces of the biconvex positive lens L9, both surfaces of the biconvex positive lens L10, both surfaces of the negative meniscus lens L11, both surfaces of the biconvex positive lens L12, both surfaces of the negative meniscus lens L13, and both surfaces of the biconcave negative lens L14.

Figure 85A:
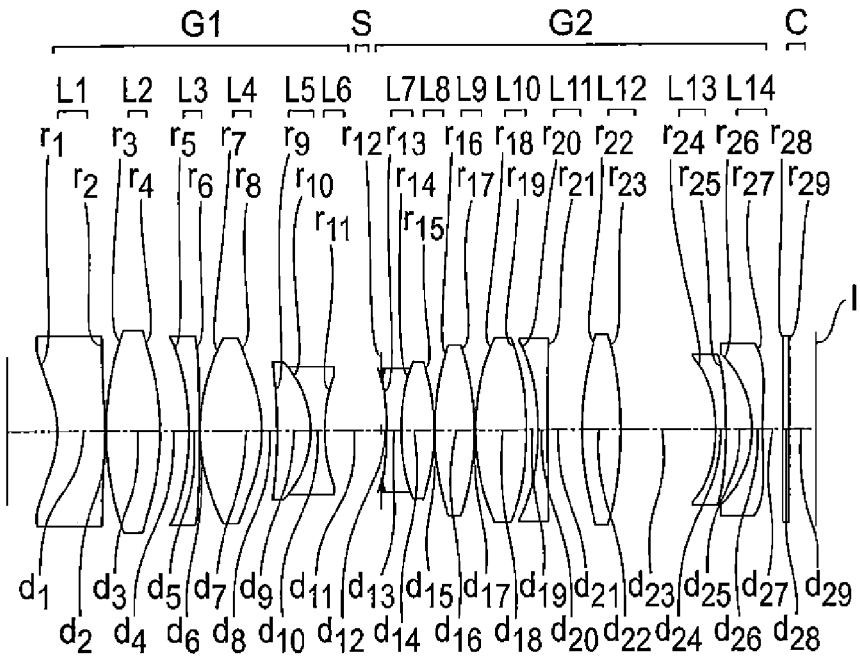
FIG. 85A is a cross-sectional view along an optical axis showing an optical arrangement.
Figures 85B, 85C, 85D, 85E:
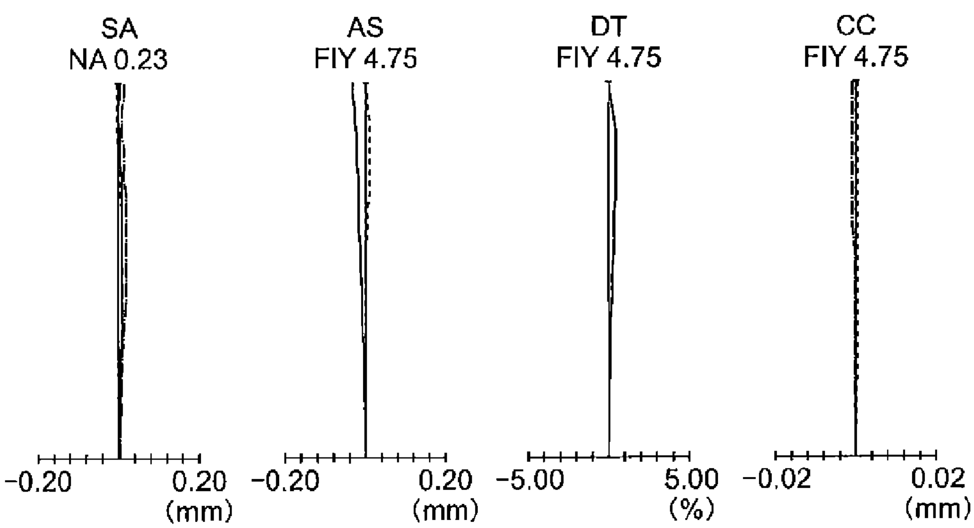
FIG. 85B, FIG. 85C, FIG. 85D, and FIG. 85E are diagrams showing a spherical aberration (SA), an astigmatism (AS), a distortion (DT), and a chromatic aberration of magnification (CC) respectively, of the optical system according to an example 78.

Next, an optical system according to an example 78 will be described below. FIG. 85A is a cross-sectional view along an optical axis showing an optical arrangement of the optical system according to the example 78. Moreover, FIG. 85B, FIG. 85C, FIG. 85D, and FIG. 85E are aberration diagrams of the optical system according to the example 78.

The optical system according to the example 78, as shown in FIG. 85A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a negative meniscus lens L3 having a convex surface directed toward the image side, a biconvex positive lens L4, a positive meniscus lens L5 having a convex surface directed toward the image side, and a biconcave negative lens L6. The positive meniscus lens L5 and the biconcave negative lens L6 are cemented.

The second lens unit G2 includes a biconcave negative lens L7, a biconvex positive lens L8, a biconvex positive lens L9, a biconvex positive lens L10, a negative meniscus lens L11 having a convex surface directed toward the image side, a biconvex positive lens L12, a negative meniscus lens L13 having a convex surface directed toward the image side, and a biconcave negative lens L14. The biconcave negative lens L7 and the biconvex positive lens L8 are cemented. A predetermined lens unit includes the negative meniscus lens L13 and the biconcave negative lens L14.

The aperture stop S is disposed between the biconcave negative lens L6 and the biconcave negative lens L7.

An aspheric surface is provided to 20 surfaces namely, both surfaces of the negative meniscus lens L1, both surfaces of the biconvex positive lens L2, both surfaces of the negative meniscus lens L3, both surfaces of the biconvex positive lens L4, both surfaces of the biconvex positive lens L9, both surfaces of the biconvex positive lens L10, both surfaces of the negative meniscus lens L11, both surfaces of the biconvex positive lens L12, both surfaces of the negative meniscus lens L13, and both surfaces of the biconcave negative lens L14.

Figure 86A:
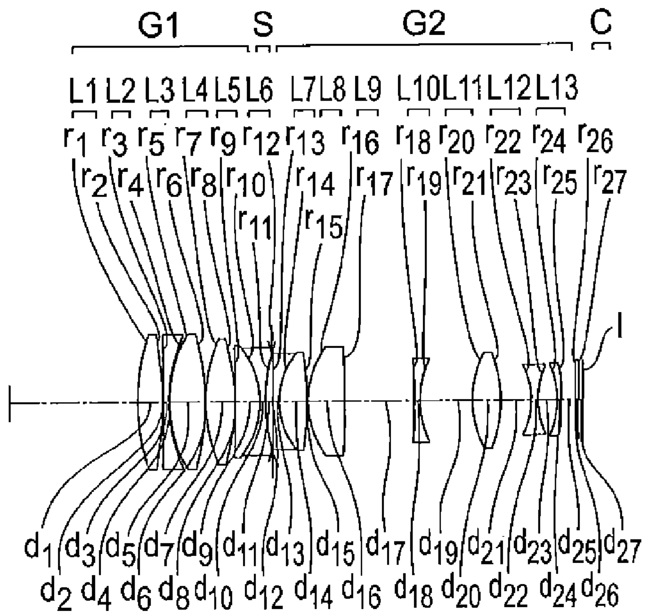
FIG. 86A is a cross-sectional view along an optical axis showing an optical arrangement.
Figures 86B, 86C, 86D, 86E:
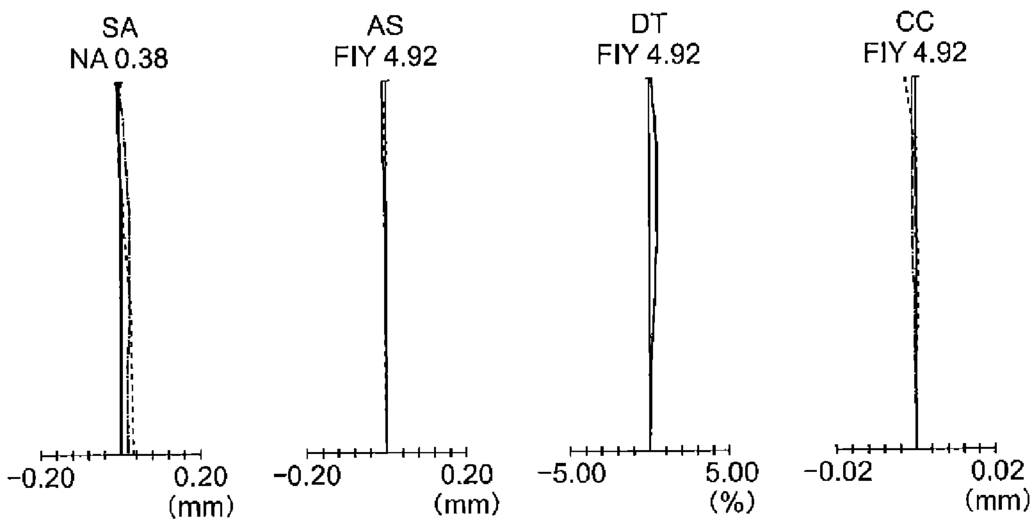
FIG. 86B, FIG. 86C, FIG. 86D, and FIG. 86E are diagrams showing a spherical aberration (SA), an astigmatism (AS), a distortion (DT), and a chromatic aberration of magnification (CC) respectively, of the optical system according to an example 79.

Next, an optical system according to an example 79 will be described below. FIG. 86A is a cross-sectional view along an optical axis showing an optical arrangement of the optical system according to the example 79. Moreover, FIG. 86B, FIG. 86C, FIG. 86D, and FIG. 86E are aberration diagrams of the optical system according to the example 79.

The optical system according to the example 79, as shown in FIG. 86A, includes in order from an object side, a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a positive meniscus lens L5 having a convex surface directed toward an image side, and a biconcave negative lens L6. The positive meniscus lens L5 and the biconcave negative lens L6 are cemented.

The second lens unit G2 includes a biconcave negative lens L7, a biconvex positive lens L8, a biconvex positive lens L9, a negative meniscus lens L10 having a convex surface directed toward the object side, a biconvex positive lens L11, a biconcave negative lens L12, and a negative meniscus lens L13 having a convex surface directed toward the image side. The biconcave negative lens L7 and the biconvex positive lens L8 are cemented. A predetermined lens unit includes the biconcave negative lens L12 and the negative meniscus lens L13.

The aperture stop S is disposed between the biconcave negative lens L6 and the biconcave negative lens L7.

An aspheric surface is provided to 14 surfaces namely, both surfaces of the biconvex positive lens L1, an object-side surface of the biconvex positive lens L3, an image-side surface of the biconvex positive lens L4, both surfaces of the biconvex positive lens L9, both surfaces of the negative meniscus lens L10, both surfaces of the biconvex positive lens L11, both surfaces of the biconcave negative lens L12, an both surfaces of the negative meniscus lens L13.

Figure 87A:
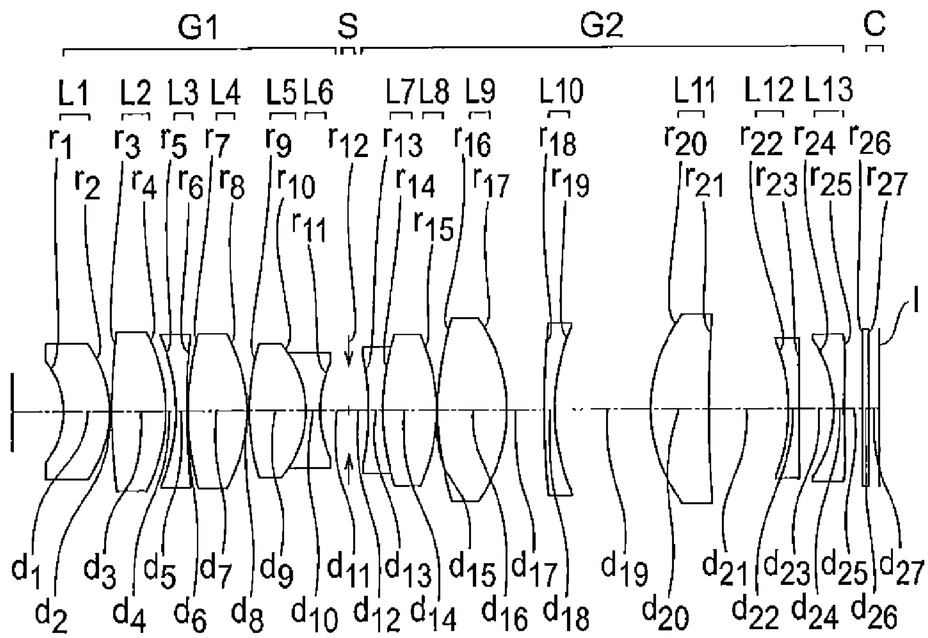
FIG. 87A is a cross-sectional view along an optical axis showing an optical arrangement.
Figures 87B, 87C, 87D, 87E:
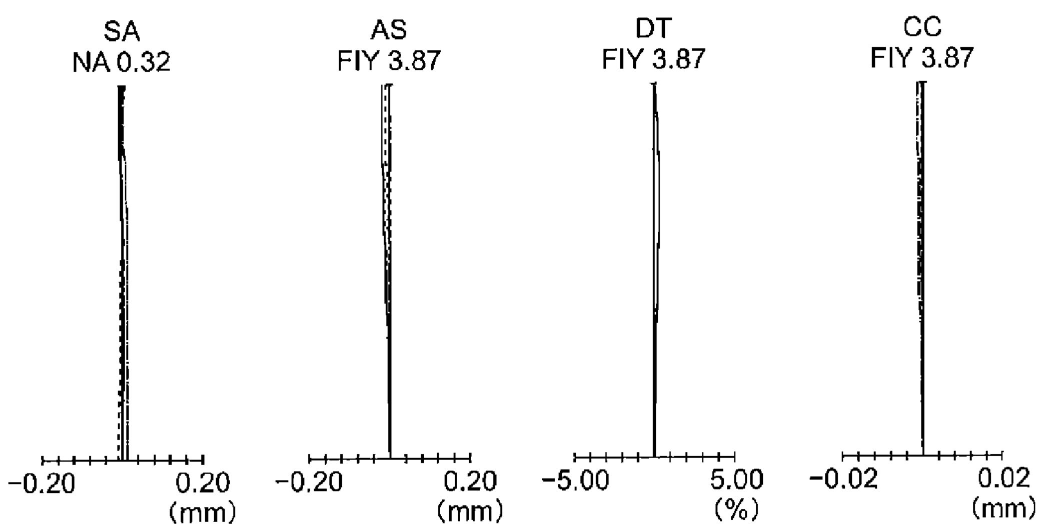
FIG. 87B, FIG. 87C, FIG. 87D, and FIG. 87E are diagrams showing a spherical aberration (SA), an astigmatism (AS), a distortion (DT), and a chromatic aberration of magnification (CC) respectively, of the optical system according to an example 80.

Next, an optical system according to an example 80 will be described below. FIG. 87A is a cross-sectional view along an optical axis showing an optical arrangement of the optical system according to the example 80. Moreover, FIG. 87B, FIG. 87C, FIG. 87D, and FIG. 87E are aberration diagrams of the optical system according to the example 80.

The optical system according to the example 80, as shown in FIG. 87A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconcave negative lens L3, a biconvex positive lens L4, a biconvex positive lens L5, and a biconcave negative lens L6. The biconcave negative lens L5 and the biconcave negative lens L6 are cemented.

The second lens unit G2 includes a biconcave negative lens L7, a biconvex positive lens L8, a biconvex positive lens L9, a negative meniscus lens L10 having a convex surface directed toward the object side, a positive meniscus lens L11 having a convex surface directed toward the object side, a biconcave negative lens L12, and a biconcave negative lens L13. The biconcave negative lens L7 and the biconvex positive lens L8 are cemented. A predetermined lens unit includes the biconcave negative lens L12 and the biconcave negative lens L13.

The aperture stop S is disposed between the biconcave negative lens L6 and the biconcave negative lens L7.

An aspheric surface is provided to 10 surfaces namely, an image-side surface of the negative meniscus lens L1, an object-side surface of the biconvex positive lens L2, both surfaces of the biconvex positive lens L4, both surfaces of the biconvex positive lens L9, both surfaces of the negative meniscus lens L10, an object-side surface of the positive meniscus lens L11, and an image-side surface of the biconcave negative lens L13.

Figure 88A:
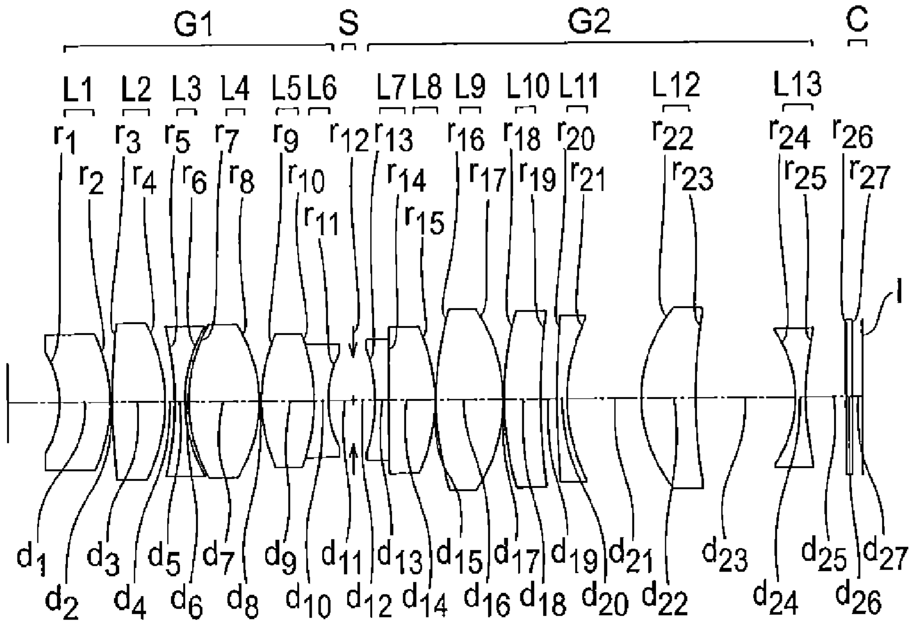
FIG. 88A is a cross-sectional view along an optical axis showing an optical arrangement.
Figures 88B, 88C, 88D, 88E:
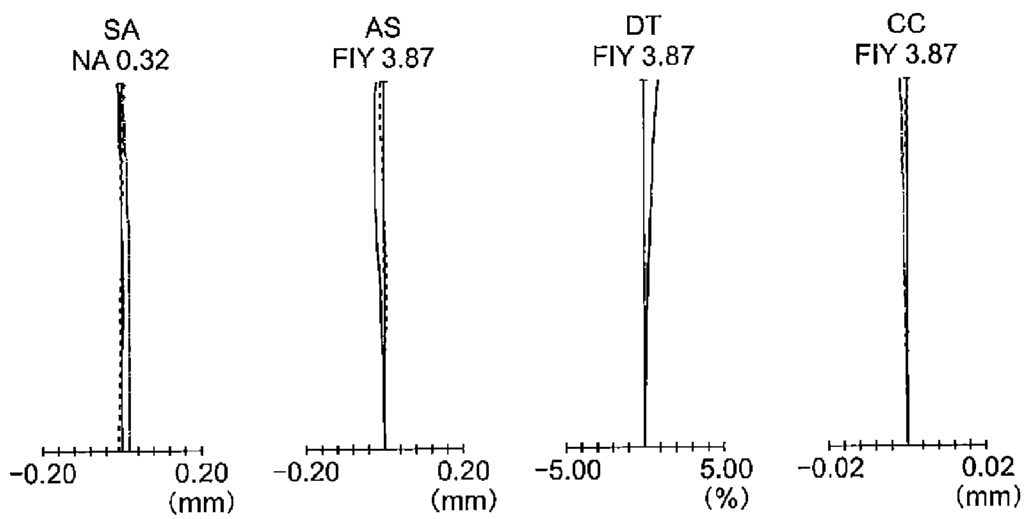
FIG. 88B, FIG. 88C, FIG. 88D, and FIG. 88E are diagrams showing a spherical aberration (SA), an astigmatism (AS), a distortion (DT), and a chromatic aberration of magnification (CC) respectively, of the optical system according to an example 81.

Next, an optical system according to an example 81 will be described below. FIG. 88A is a cross-sectional view along an optical axis showing an optical arrangement of the optical system according to the example 81. Moreover, FIG. 88B, FIG. 88C, FIG. 88D, and FIG. 88E are aberration diagrams of the optical system according to the example 81.

The optical system according to the example 81, as shown in FIG. 88A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconcave negative lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a biconvex positive lens L8, a biconvex positive lens L9, a positive meniscus lens L10 having a convex surface directed toward the object side, a negative meniscus lens L11 having a convex surface directed toward the object side, a positive meniscus lens L12 having a convex surface directed toward the object side, and a biconcave negative lens L13. The biconcave negative lens L7 and the biconvex positive lens L8 are cemented. A predetermined lens unit includes the biconcave negative lens L13.

The aperture stop S is disposed between the biconcave negative lens L6 and the biconcave negative lens L7.

An aspheric surface is provided to 12 surfaces namely, an image-side surface of the negative meniscus lens L1, an object-side surface of the biconvex positive lens L2, both surfaces of the biconvex positive lens L4, both surfaces of the biconvex positive lens L9, both surfaces of the positive meniscus lens L10, both surfaces of the negative meniscus lens L11, an object-side surface of the positive meniscus lens L12, and an image-side surface of the biconcave negative lens L13.

Figure 89A:
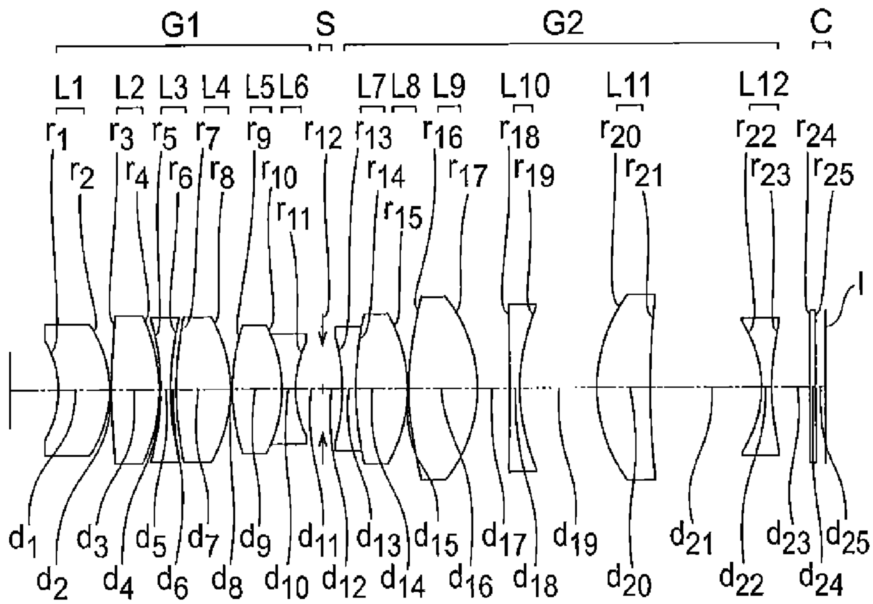
FIG. 89A is a cross-sectional view along an optical axis showing an optical arrangement.
Figures 89B, 89C, 89D, 89E:
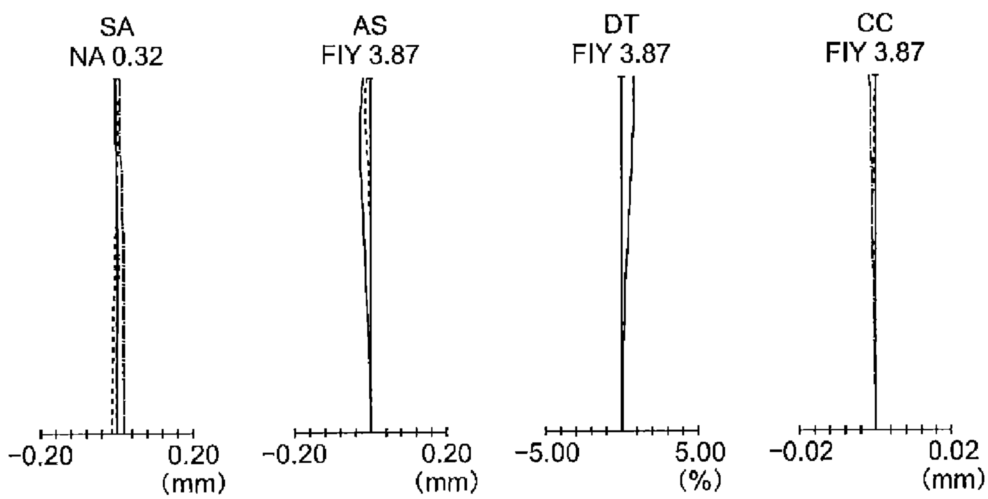
FIG. 89B, FIG. 89C, FIG. 89D, and FIG. 89E are diagrams showing a spherical aberration (SA), an astigmatism (AS), a distortion (DT), and a chromatic aberration of magnification (CC) respectively, of the optical system according to an example 82.

Next, an optical system according to an example 82 will be described below. FIG. 89A is a cross-sectional view along an optical axis showing an optical arrangement of the optical system according to the example 82. Moreover, FIG. 89B, FIG. 89C, FIG. 89D, and FIG. 89E are aberration diagrams of the optical system according to the example 82.

The optical system according to the example 82, as shown in FIG. 89A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconcave negative lens L3, a biconvex positive lens L4, a biconvex positive lens L5, and a biconcave negative lens L6. The biconvex positive lens L5 and the biconcave negative lens L6 are cemented.

The second lens unit G2 includes a biconcave negative lens L7, a biconvex positive lens L8, a biconvex positive lens L9, a biconcave negative lens L10, a positive meniscus lens L11 having a convex surface directed toward the object side, and a biconcave negative lens L12. The biconcave negative lens L7 and the biconvex positive lens L8 are cemented. A predetermined lens unit includes the biconcave negative lens L12.

The aperture stop S is disposed between the biconcave negative lens L6 and the biconcave negative lens L7.

An aspheric surface is provided to 10 surfaces namely, an image-side surface of the negative meniscus lens 11, an object-side lens of the biconvex positive lens L2, both surfaces of the biconvex positive lens L4, both surfaces of the biconvex positive lens L9, both surfaces of the biconcave negative lens L10, an object-side surface of the positive meniscus lens L11, and an image-side surface of the biconcave negative lens L12.

Figure 90A:
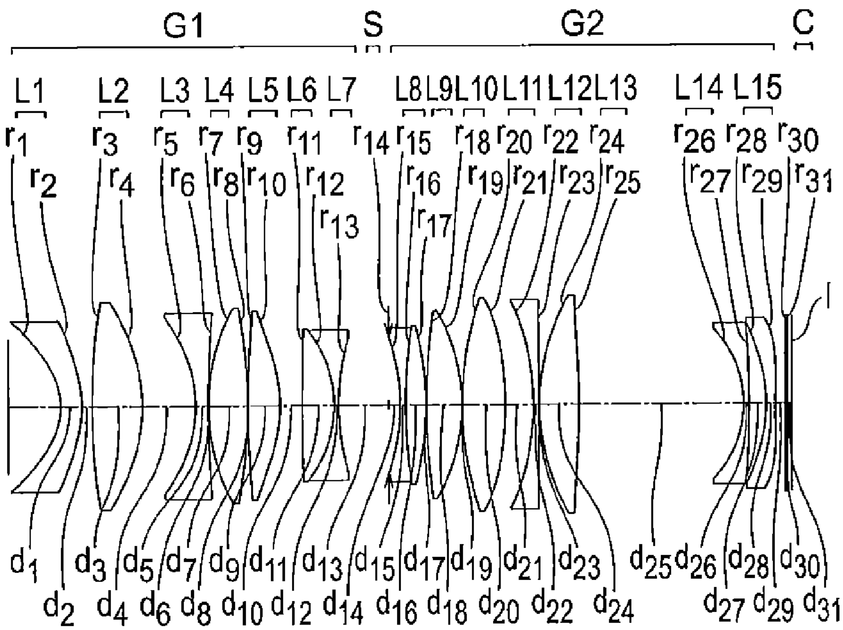
FIG. 90A is a cross-sectional view along an optical axis showing an optical arrangement.
Figures 90B, 90C, 90D, 90E:
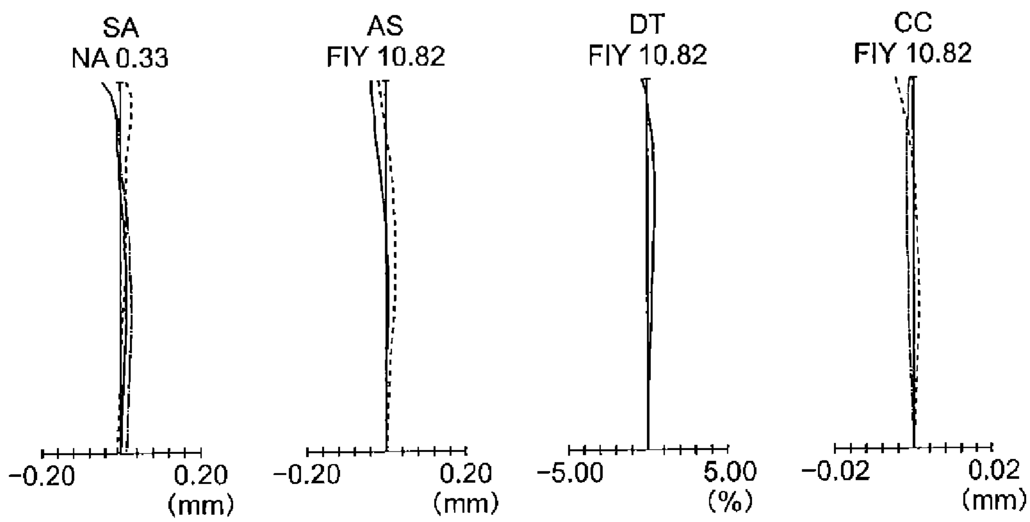
FIG. 90B, FIG. 90C, FIG. 90D, and FIG. 90E are diagrams showing a spherical aberration (SA), an astigmatism (AS), a distortion (DT), and a chromatic aberration of magnification (CC) respectively, of the optical system according to an example 83.

Next, an optical system according to an example 83 will be described below. FIG. 90A is a cross-sectional view along an optical axis showing an optical arrangement of the optical system according to the example 83. Moreover, FIG. 90B, FIG. 90C, FIG. 90D, and FIG. 90E are aberration diagrams of the optical system according to the example 83.

The optical system according to the example 83, as shown in FIG. 90A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconcave negative lens L3, a biconvex positive lens L4, a biconvex positive lens L5, a biconvex positive lens L6, and a biconcave negative lens L7. The biconvex positive lens L6 and the biconcave negative lens L7 are cemented.

The second lens unit G2 includes a biconcave negative lens L8, a biconvex positive lens L9, a biconvex positive lens L10, a biconvex positive lens L11, a negative meniscus lens L12 having a convex surface directed toward the image side, a biconvex positive lens L13, a negative meniscus lens L14 having a convex surface directed toward the image side, and a biconcave negative lens L15. The biconcave negative lens L8 and the biconvex positive lens L9 are cemented. A predetermined lens unit includes the negative meniscus lens L14 and the biconcave negative lens L15.

The aperture stop S is disposed between the biconcave negative lens L7 and the biconcave negative lens L8.

An aspheric surface is provided to 22 surfaces namely, both surfaces of the negative meniscus lens L1, both surfaces of the biconvex positive lens L2, both surfaces of the biconcave negative lens L3, both surfaces of the biconvex positive lens L4, both surfaces of the biconvex positive lens L5, both surfaces of the biconvex positive lens L10, both surfaces of the biconvex positive lens L11, both surfaces of the negative meniscus lens L12, both surfaces of the biconvex positive lens L13, both surfaces of the negative meniscus lens L14, and both surfaces of the biconcave negative lens L15.

Figure 91A:
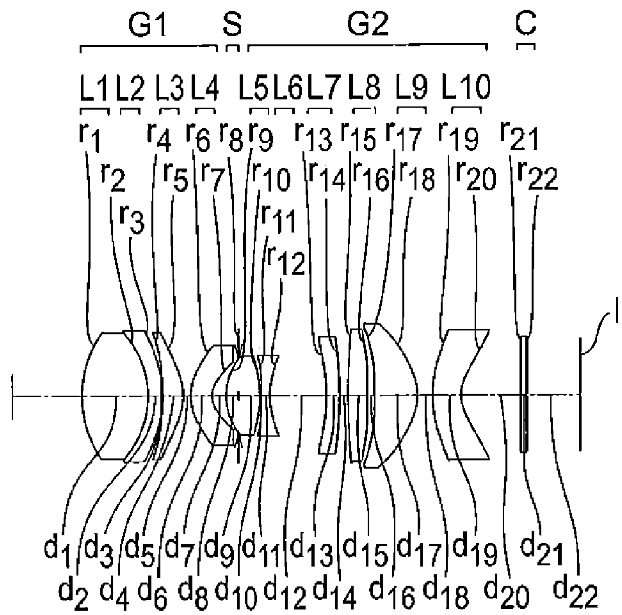
FIG. 91A is a cross-sectional view along an optical axis showing an optical arrangement.
Figures 91B, 91C, 91D, 91E:
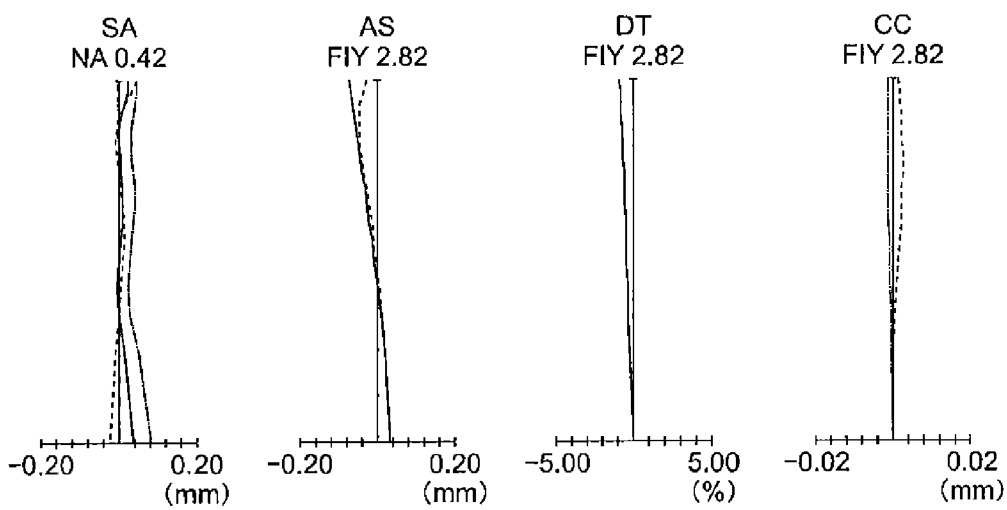
FIG. 91B, FIG. 91C, FIG. 91D, and FIG. 91E are diagrams showing a spherical aberration (SA), an astigmatism (AS), a distortion (DT), and a chromatic aberration of magnification (CC) respectively, of the optical system according to an example 84.

Next, an optical system according to an example 84 will be described below. FIG. 91A is a cross-sectional view along an optical axis showing an optical arrangement of the optical system according to the example 84. Moreover, FIG. 91B, FIG. 91C, FIG. 91D, and FIG. 91E are aberration diagrams of the optical system according to the example 84.

The optical system according to the example 84, as shown in FIG. 91A, includes in order from an object side, a first lens unit G1 having a positive refractive power, an aperture stop S, and a second lens unit G2 having a positive refractive power.

The first lens unit G1 includes a biconvex positive lens L1, a negative meniscus lens L2 having a convex surface directed toward an image side, a positive meniscus lens L3 having a convex surface directed toward the image side, and a negative meniscus lens L4 having a convex surface directed toward the object side. The biconvex positive lens L1 and the negative meniscus lens L2 are cemented.

The second lens unit G2 includes a biconvex positive lens L5, a biconcave negative lens L6, a negative meniscus lens L7 having a convex surface directed toward the image side, a positive meniscus lens L8 having a convex surface directed toward the object side, a positive meniscus lens L9 having a convex surface directed toward the image side, and a negative meniscus lens L10 having a convex surface directed toward the object side. A predetermined lens unit includes the negative meniscus lens L10.

The aperture stop S is disposed between the negative meniscus lens L4 and the biconvex positive lens L5. More elaborately, the aperture stop S is disposed between a vertex of an object-side surface of the biconvex positive lens L5 and a vertex of an image-side surface of the biconvex positive lens L5.

An aspheric surface is provided to 16 surfaces namely, both surface of the positive meniscus lens L3, both surfaces of the negative meniscus lens L4, both surfaces of the biconvex positive lens L5, both surfaces of the biconcave negative lens L6, both surfaces of the negative meniscus lens L7, both surfaces of the positive meniscus lens L8, both surfaces of the positive meniscus lens L9, and both surfaces of the negative meniscus lens L10.

Figure 92A:
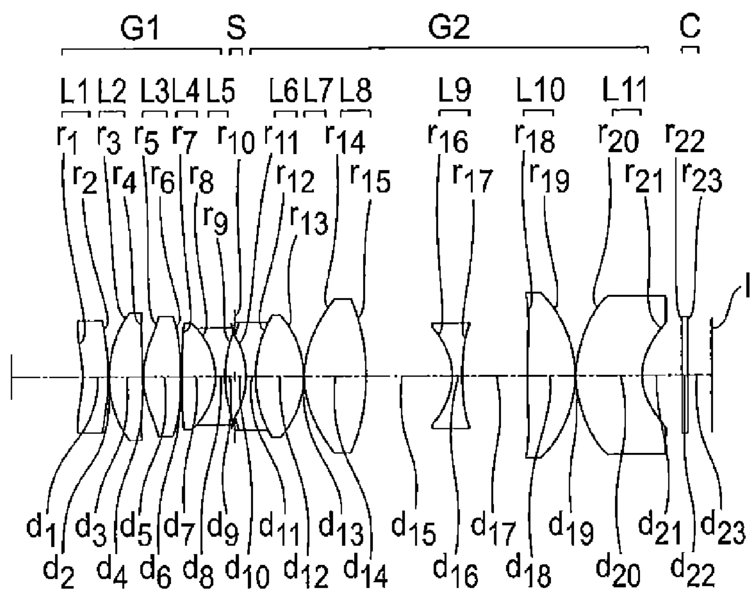
FIG. 92A is a cross-sectional view along an optical axis showing an optical arrangement.
Figures 92B, 92C, 92D, 92E:
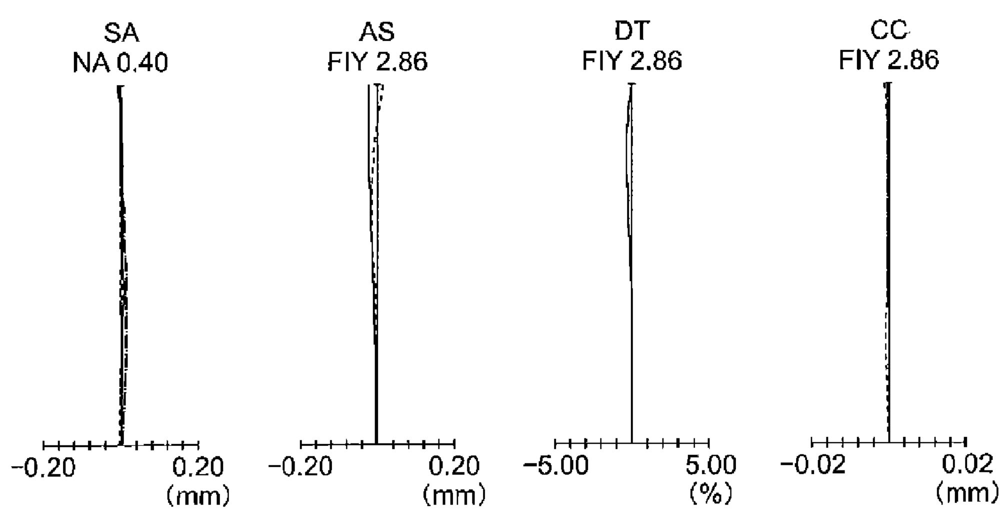
FIG. 92B, FIG. 92C, FIG. 92D, and FIG. 92E are diagrams showing a spherical aberration (SA), an astigmatism (AS), a distortion (DT), and a chromatic aberration of magnification (CC) respectively, of the optical system according to an example 85.

Next, an optical system according to an example 85 will be described below. FIG. 92A is a cross-sectional view along an optical axis showing an optical arrangement of the optical system according to the example 85. Moreover, FIG. 92B, FIG. 92C, FIG. 92D, and FIG. 92E are aberration diagrams of the optical system according to the example 85.

The optical system according to the example 85, as shown in FIG. 92A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a biconvex positive lens L4, and a biconcave negative lens L5. The biconvex positive lens L4 and the biconcave negative lens L5 are cemented.

The second lens unit G2 includes a biconcave negative lens L6, a biconvex positive lens L7, a biconvex positive lens L8, a biconcave negative lens L9, a biconvex positive lens L10, and a negative meniscus lens L11 having a convex surface directed toward the object side. The biconcave negative lens L6 and the biconvex positive lens L7 are cemented. A predetermined lens unit includes the negative meniscus lens L11.

The aperture stop S is disposed between the biconcave negative lens L5 and the biconcave negative lens L6.

An aspheric surface is provided to 14 surfaces namely, both surfaces of the negative meniscus lens L1, both surfaces of the biconvex positive lens L2, both surfaces of the biconvex positive lens L3, both surfaces of the biconvex positive lens L8, both surfaces of the biconcave negative lens L9, both surfaces of the biconvex positive lens L10, and both surfaces of the negative meniscus lens L11.

Next, an optical system according to an example 86 will be described below. FIG. 93A is a cross-sectional view along an optical axis showing an optical arrangement of the optical system according to the example 86. Moreover, FIG. 93B, FIG. 93C, FIG. 93D, and FIG. 93E are aberration diagrams of the optical system according to the example 86.

The optical system according to the example 86, as shown in FIG. 93A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a positive meniscus lens L4 having a convex surface directed toward the image side, and a biconcave negative lens L5. The positive meniscus lens L4 and the biconcave negative lens L5 are cemented.

The second lens unit G2 includes a biconcave negative lens L6, a biconvex positive lens L7, a biconvex positive lens L8, a biconcave negative lens L9, a biconvex positive lens L10, and a negative meniscus lens L11 having a convex surface directed toward the object side. The biconcave negative lens L6 and the biconvex positive lens L7 are cemented. A predetermined lens unit includes the negative meniscus lens L11.

The aperture stop S is disposed between the biconcave negative lens L5 and the biconcave negative lens L6.

An aspheric surface is provided to 14 surfaces namely, both surfaces of the negative meniscus lens L1, both surfaces of the biconvex positive lens L2, both surfaces of the biconvex positive lens L3, both surfaces of the biconvex positive lens L8, both surfaces of the biconcave negative lens L9, both surfaces of the biconvex positive lens L10, and both surfaces of the negative meniscus lens L11.

Figure 94A:
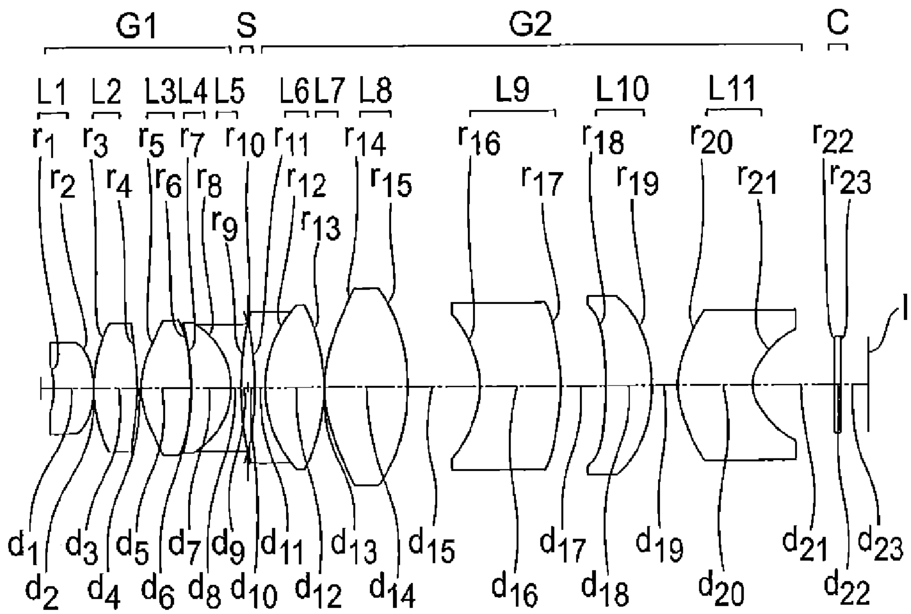
FIG. 94A is a cross-sectional view along an optical axis showing an optical arrangement.
Figures 94B, 94C, 94D, 94E:
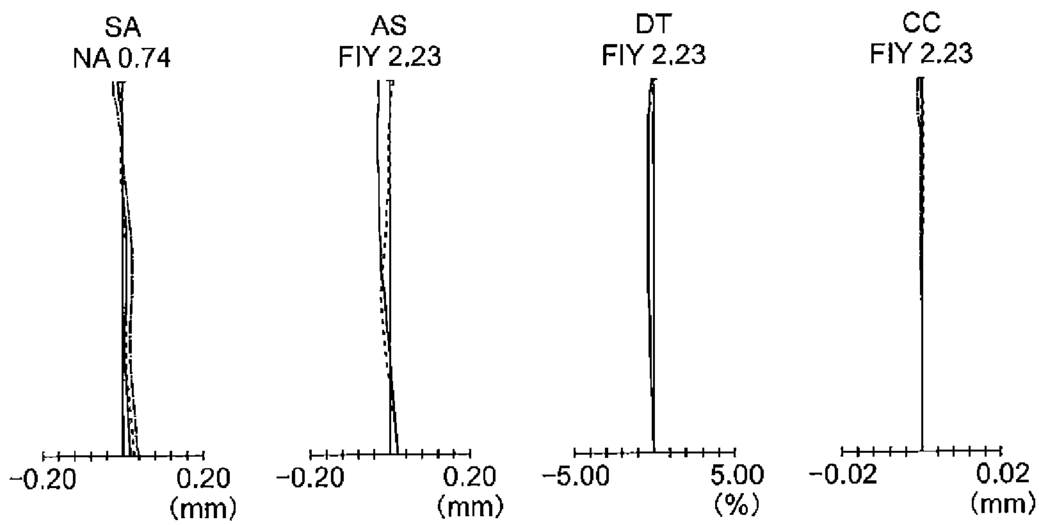
FIG. 94B, FIG. 94C, FIG. 94D, and FIG. 94E are diagrams showing a spherical aberration (SA), an astigmatism (AS), a distortion (DT), and a chromatic aberration of magnification (CC) respectively, of the optical system according to an example 87.

Next, an optical system according to an example 87 will be described below. FIG. 94A is a cross-sectional view along an optical axis showing an optical arrangement of the optical system according to the example 87. Moreover, FIG. 94B, FIG. 94C, FIG. 94D, and FIG. 94E are aberration diagrams of the optical system according to the example 87.

The optical system according to the example 87, as shown in FIG. 94A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a positive meniscus lens L4 having a convex surface directed toward the image side, and a biconcave negative lens L5. The positive meniscus lens L4 and the biconcave negative lens L5 are cemented.

The second lens unit G2 includes a biconcave negative lens L6, a biconvex positive lens L7, a biconvex positive lens L8, a negative meniscus lens L9 having a convex surface directed toward the image side, a positive meniscus lens L10 having a convex surface directed toward the image side, and a negative meniscus lens L11 having a convex surface directed toward the object side. The biconcave negative lens L6 and the biconvex positive lens L7 are cemented. A predetermined lens unit includes the negative meniscus lens L11.

The aperture stop S is disposed between the biconcave negative lens L5 and the biconcave negative lens L6.

An aspheric surface is provided to 14 surfaces namely, both surfaces of the negative meniscus lens L1, both surfaces of the biconvex positive lens L2, both surfaces of the biconvex positive lens L3, both surfaces of the biconvex positive lens L8, both surfaces of the negative meniscus lens L9, both surfaces of the positive meniscus lens L10, and both surfaces of the negative meniscus lens L11.

Figure 95A:
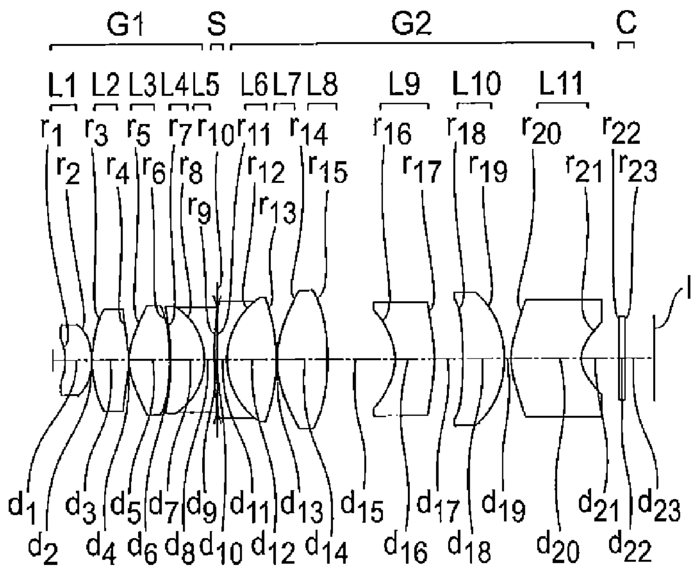
FIG. 95A is a cross-sectional view along an optical axis showing an optical arrangement.
Figures 95B, 95C, 95D, 95E:
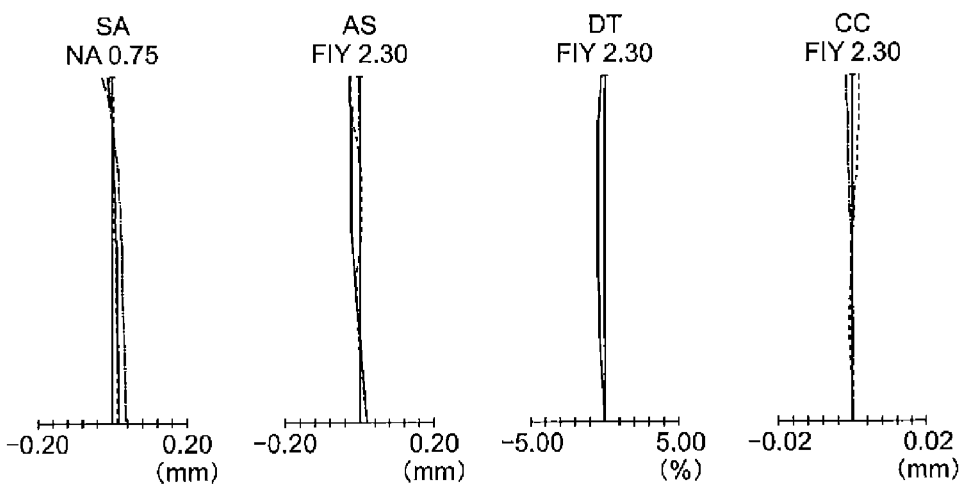
FIG. 95B, FIG. 95C, FIG. 95D, and FIG. 95E are diagrams showing a spherical aberration (SA), an astigmatism (AS), a distortion (DT), and a chromatic aberration of magnification (CC) respectively, of the optical system according to an example 88.

Next, an optical system according to an example 88 will be described below. FIG. 95A is a cross-sectional view along an optical axis showing an optical arrangement of the optical system according to the example 88. Moreover, FIG. 95B, FIG. 95C, FIG. 95D, and FIG. 95E are aberration diagrams of the optical system according to the example 88.

The optical system according to the example 88, as shown in FIG. 95A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a positive meniscus lens L4 having a convex surface directed toward the image side, and a biconcave negative lens L5. The positive meniscus lens L4 and the biconcave negative lens L5 are cemented.

The second lens unit G2 includes a negative meniscus lens L6 having a convex surface directed toward the object side, a biconvex positive lens L7, a biconvex positive lens L8, a negative meniscus lens L9 having a convex surface directed toward the image side, a positive meniscus lens L10 having a convex surface directed toward the image side, and a negative meniscus lens L11 having a convex surface directed toward the object side. The negative meniscus lens L6 and the biconvex positive lens L7 are cemented. A predetermined lens unit includes the negative meniscus lens L11.

The aperture stop S is disposed between the biconcave negative lens L5 and the negative meniscus lens L6. More elaborately, the aperture stop is disposed between a vertex of an object-side surface of the biconcave negative lens L5 and a vertex of an image-side surface of the biconcave negative lens L5.

An aspheric surface is provided to 14 surfaces namely, both surfaces of the negative meniscus lens L1, both surfaces of the biconvex positive lens L2, both surfaces of the biconvex positive lens L3, both surfaces of the biconvex positive lens L8, both surfaces of the negative meniscus lens L9, both surfaces of the positive meniscus lens L10, and both surfaces of the negative meniscus lens L11.

Figure 96A:
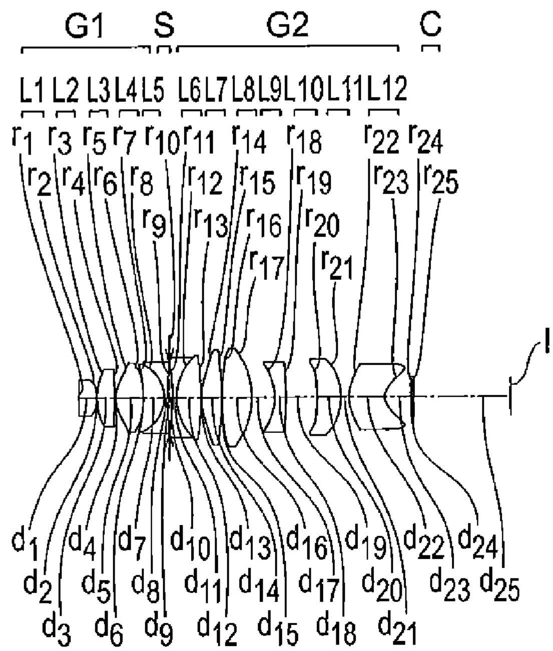
FIG. 96A is a cross-sectional view along an optical axis showing an optical arrangement.
Figures 96B, 96C, 96D, 96E:
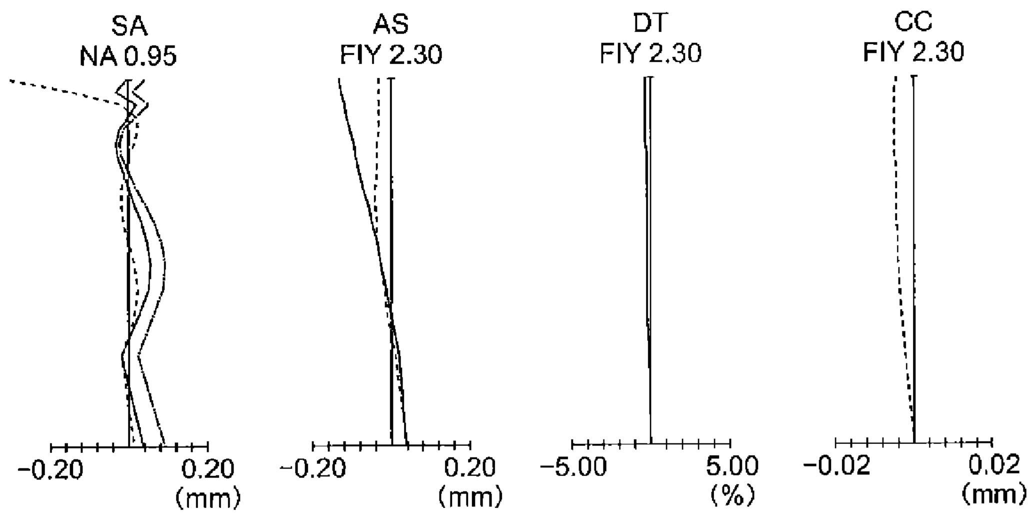
FIG. 96B, FIG. 96C, FIG. 96D, and FIG. 96E are diagrams showing a spherical aberration (SA), an astigmatism (AS), a distortion (DT), and a chromatic aberration of magnification (CC) respectively, of the optical system according to an example 89.

Next, an optical system according to an example 89 will be described below. FIG. 96A is a cross-sectional view along an optical axis showing an optical arrangement of the optical system according to the example 89. Moreover, FIG. 96B, FIG. 96C, FIG. 96D, and FIG. 96E are aberration diagrams of the optical system according to the example 89.

The optical system according to the example 89, as shown in FIG. 96A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a biconvex positive lens L2, a biconvex positive lens L3, a positive meniscus lens L4 having a convex surface directed toward the image side, and a biconcave negative lens L5. The positive meniscus lens L4 and the biconcave lens L5 are cemented.

The second lens unit G2 includes a biconcave negative lens L6, a biconvex positive lens L7, a biconvex positive lens L8, a biconvex positive lens L9, a negative meniscus lens L10 having a convex surface directed toward the image side, a positive meniscus lens L11 having a convex surface directed toward the image side, and a negative meniscus lens L12 having a convex surface directed toward the object side. The biconcave negative lens L6 and the biconvex positive lens L7 are cemented. A predetermined lens unit includes the negative meniscus lens L12.

The aperture stop S is disposed between the biconcave negative lens L5 and the biconcave negative lens L6.

An aspheric surface is provided to 16 surfaces namely, both surfaces of the negative meniscus lens L1, both surfaces of the biconvex positive lens L2, both surfaces of the biconvex positive lens L3, both surfaces of the biconvex positive lens L8, both surfaces of the biconvex positive lens L9, both surfaces of the negative meniscus lens L10, both surfaces of the positive meniscus lens L11, and both surfaces of the negative meniscus lens L12.

Figure 97A:
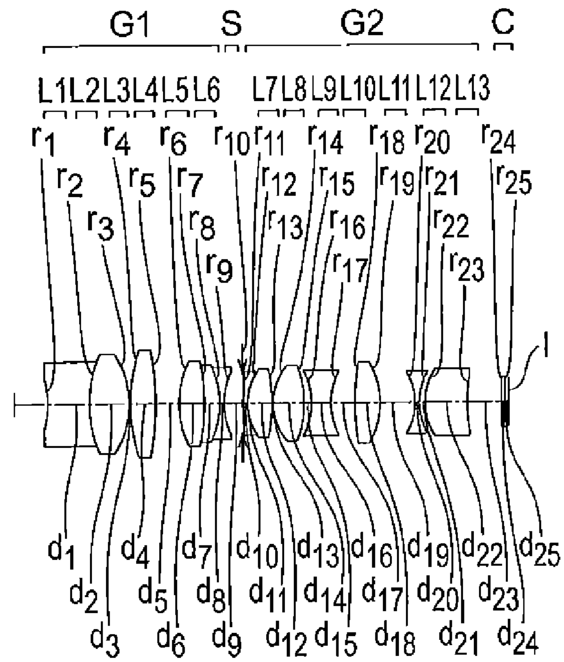
FIG. 97A is a cross-sectional view along an optical axis showing an optical arrangement.
Figures 97B, 97C, 97D, 97E:
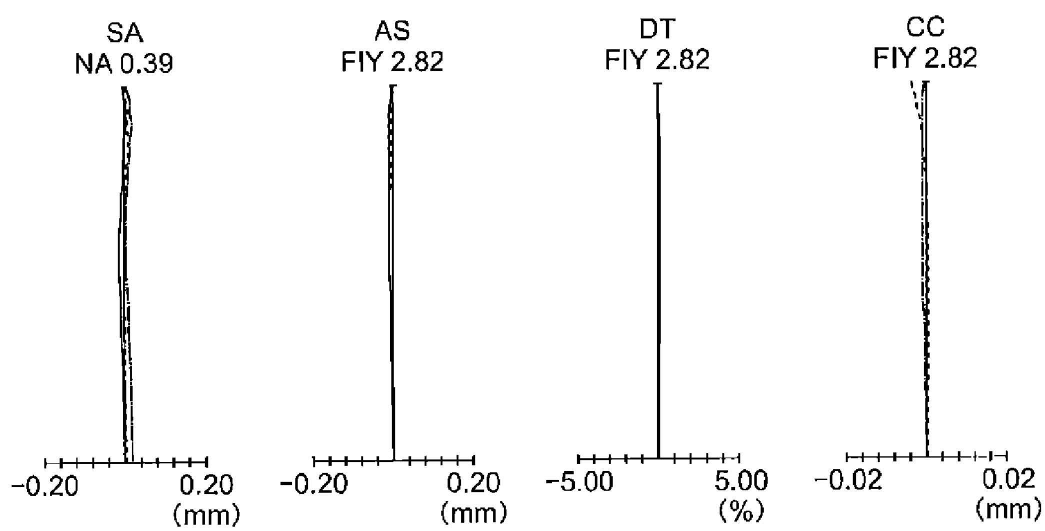
FIG. 97B, FIG. 97C, FIG. 97D, and FIG. 97E are diagrams showing a spherical aberration (SA), an astigmatism (AS), a distortion (DT), and a chromatic aberration of magnification (CC) respectively, of the optical system according to an example 90.

Next, an optical system according to an example 90 will be described below. FIG. 97A is a cross-sectional view along an optical axis showing an optical arrangement of the optical system according to the example 90. Moreover, FIG. 97B, FIG. 97C, FIG. 97D, and FIG. 97E are aberration diagrams of the optical system according to the example 90.

The optical system according to the example 90, as shown in FIG. 97A, includes in order from an object side, a first lens unit G1 having a positive refractive power, an aperture stop S, and a second lens unit G2 having a positive refractive power.

The first lens unit G1 includes a biconcave negative lens L1, a biconvex positive lens L2, a biconvex positive lens L3, a biconvex positive lens L4, a positive meniscus lens L5 having a convex surface directed toward an image side, and a biconcave negative lens L6. The biconcave negative lens L1 and the biconvex positive lens L2 are cemented. Moreover, the biconvex positive lens L4, the positive meniscus lens L5, and the biconcave negative lens L6 are cemented.

The second lens unit G2 includes a negative meniscus lens L7 having a convex surface directed toward the object side, a biconvex positive lens L8, a biconvex positive lens L9, a biconcave negative lens L10, a biconvex positive lens L11, a biconcave negative lens L12, and a positive meniscus lens L13 having a convex surface directed toward the object side. The negative meniscus lens L7 and the biconvex positive lens L8 are cemented. A predetermined lens unit includes the biconcave negative lens L12 and the positive meniscus lens L13.

The aperture stop S is disposed between the biconcave negative lens L6 and the negative meniscus lens L7.

No aspheric surface is used.

Figure 98A:
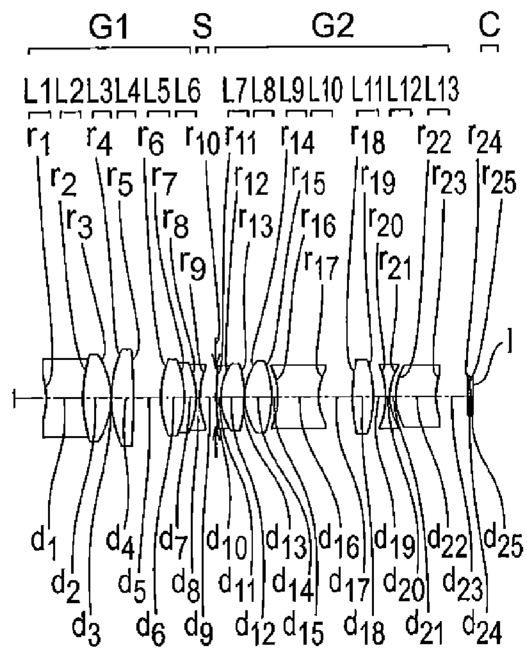
FIG. 98A is a cross-sectional view along an optical axis showing an optical arrangement.
Figures 98B, 98C, 98D, 98E:
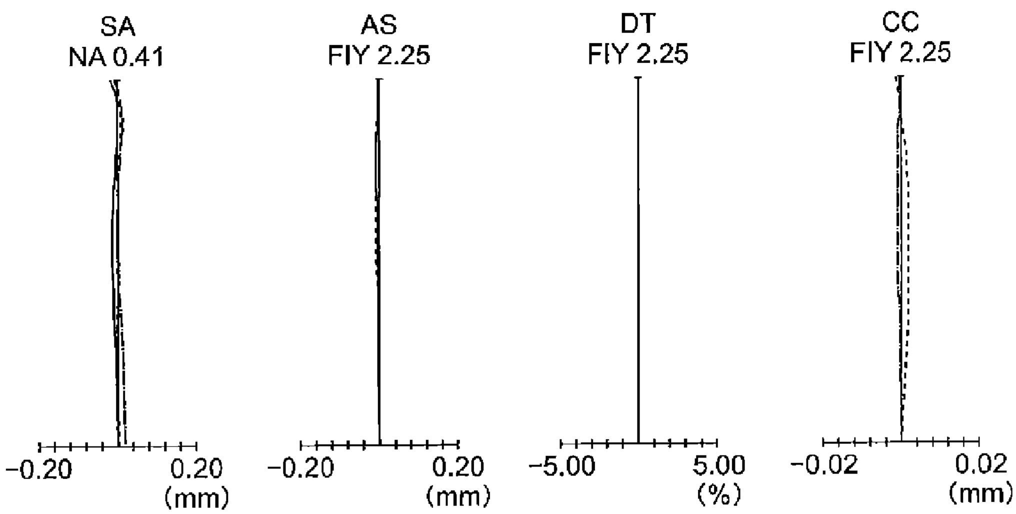
FIG. 98B, FIG. 98C, FIG. 98D, and FIG. 98E are diagrams showing a spherical aberration (SA), an astigmatism (AS), a distortion (DT), and a chromatic aberration of magnification (CC) respectively, of the optical system according to an example 91.

Next, an optical system according to an example 91 will be described below. FIG. 98A is a cross-sectional view along an optical axis showing an optical arrangement of the optical system according to the example 91. Moreover, FIG. 98B, FIG. 98C, FIG. 98D, and FIG. 98E are aberration diagrams of the optical system according to the example 91.

The optical system according to the example 91, as shown in FIG. 98A, includes in order from an object side, a first lens unit G1 having a positive refractive power, an aperture stop S, and a second lens unit G2 having a positive refractive power.

The first lens unit G1 includes a biconcave negative lens L1, a biconvex positive lens L2, a biconvex positive lens L3, a biconvex positive lens L4, a positive meniscus lens L5 having a convex surface directed toward an image side, and a biconcave negative lens L6. The biconcave negative lens L1 and the biconvex positive lens L2 are cemented. Moreover, the biconvex positive lens L4, the positive meniscus lens L5, and the biconcave negative lens L6 are cemented.

The second lens unit G2 includes a negative meniscus lens L7 having a convex surface directed toward the object side, a biconvex positive lens L8, a biconvex positive lens L9, a biconcave negative lens L10, a biconvex positive lens L11, a biconcave negative lens L12, and a positive meniscus lens L13 having a convex surface directed toward the object side. The negative meniscus lens L7 and the biconvex positive lens L8 are cemented. A predetermined lens unit includes the biconcave negative lens L12 and the positive meniscus lens L13.

The aperture stop S is disposed between the biconcave negative lens L6 and the negative meniscus lens L7.

No aspheric surface is used.

Figure 99A:
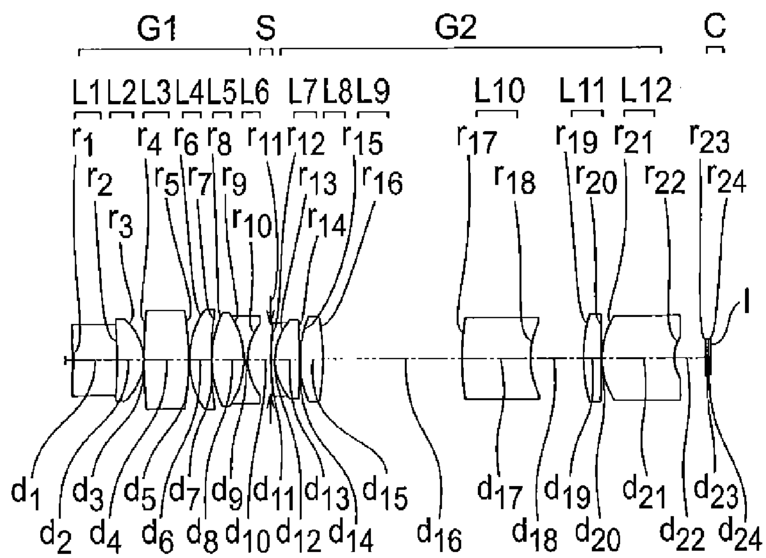
FIG. 99A is a cross-sectional view along an optical axis showing an optical arrangement.
Figures 99B, 99C, 99D, 99E:
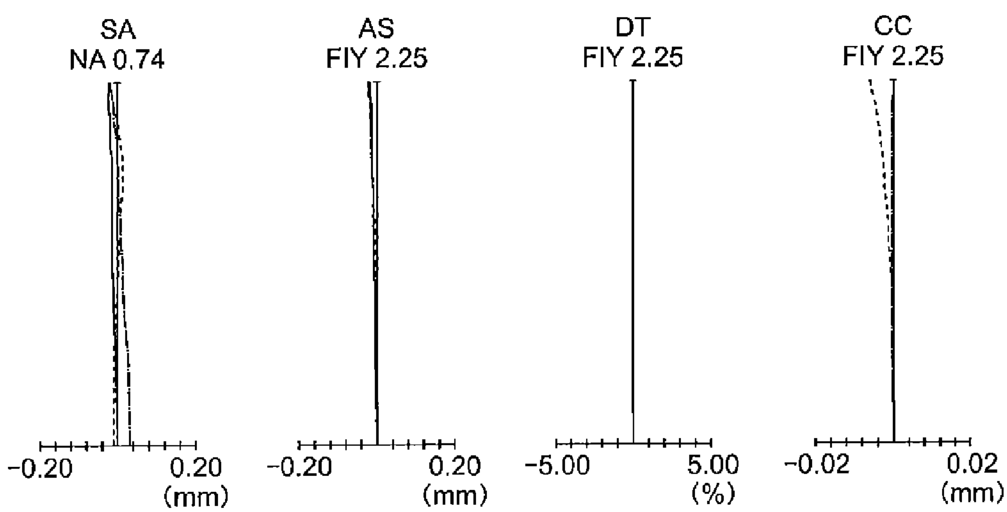
FIG. 99B, FIG. 99C, FIG. 99D, and FIG. 99E are diagrams showing a spherical aberration (SA), an astigmatism (AS), a distortion (DT), and a chromatic aberration of magnification (CC) respectively, of the optical system according to an example 92.

Next, an optical system according to an example 92 will be described below. FIG. 99A is a cross-sectional view along an optical axis showing an optical arrangement of the optical system according to the example 92. Moreover, FIG. 99B, FIG. 99C, FIG. 99D, and FIG. 99E are aberration diagrams of the optical system according to the example 92.

The optical system according to the example 92, as shown in FIG. 99A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward an image side, a positive meniscus lens L2 having a convex surface directed toward the image side, a biconvex positive lens L3, a positive meniscus lens L4 having a convex surface directed toward the object side, a biconvex positive lens L5, and a biconcave negative lens L6. The negative meniscus lens L1 and the positive meniscus lens L2 are cemented. Moreover, the biconvex positive lens L5 and the biconcave negative lens L6 are cemented.

The second lens unit G2 includes a negative meniscus lens L7 having a convex surface directed toward the object side, a biconvex positive lens L8, a biconvex positive lens L9, a negative meniscus lens L10 having a convex surface directed toward the object side, a biconvex positive lens L11, and a negative meniscus lens L12 having a convex surface directed toward the object side. The negative meniscus lens L7 and the biconvex positive lens L8 are cemented. A predetermined lens unit includes the negative meniscus lens L12.

The aperture stop S is disposed between the biconcave negative lens L6 and the negative meniscus lens L7.

No aspheric surface is used.

Figure 100A:
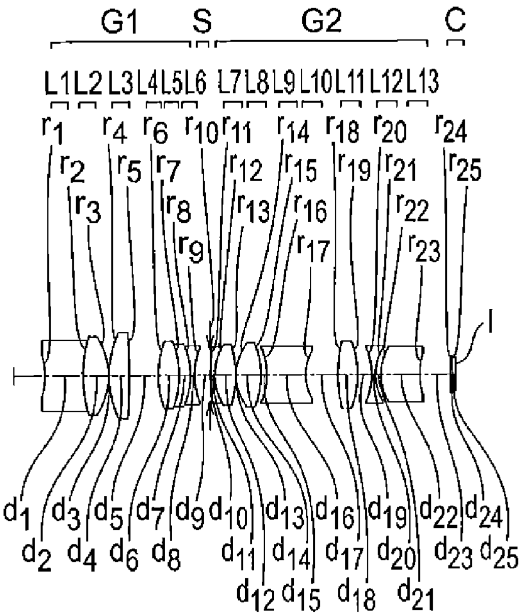
FIG. 100A is a cross-sectional view along an optical axis showing an optical arrangement.
Figures 100B, 100C, 100D, 100E:
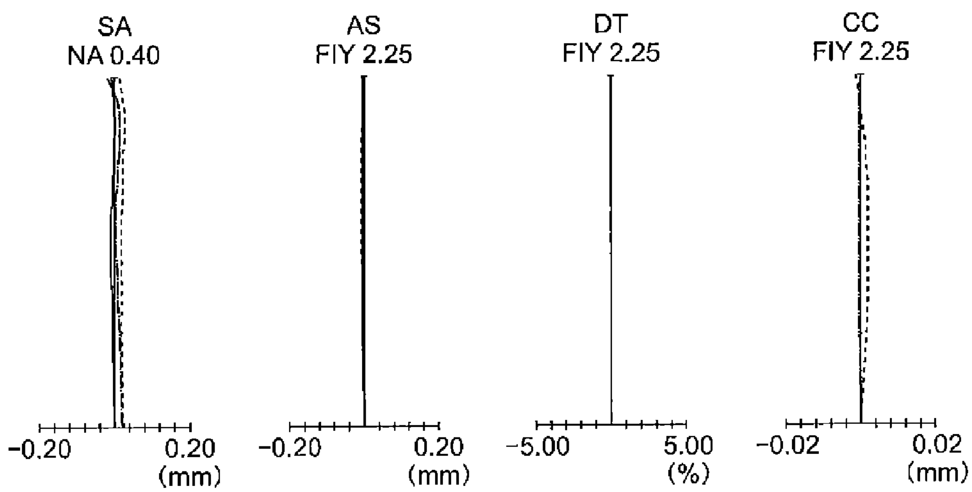
FIG. 100B, FIG. 100C, FIG. 100D, and FIG. 100E are diagrams showing a spherical aberration (SA), an astigmatism (AS), a distortion (DT), and a chromatic aberration of magnification (CC) respectively, of the optical system according to an example 93.

Next, an optical system according to an example 93 will be described below. FIG. 100A is a cross-sectional view along an optical axis showing an optical arrangement of the optical system according to the example 93. Moreover, FIG. 100B, FIG. 100C, FIG. 100D, and FIG. 100E are aberration diagrams of the optical system according to the example 93.

The optical system according to the example 93, as shown in FIG. 100A, includes in order from an object side, a first lens unit G1 having a positive refractive power, an aperture stop S, and a second lens unit G2 having a positive refractive power.

The first lens unit G1 includes a biconcave negative lens L1, a biconvex positive lens L2, a biconvex positive lens L3, a biconvex positive lens L4, a positive meniscus lens L5 having a convex surface directed toward an image side, and a biconcave negative lens L6. The biconcave negative lens L1 and the biconvex positive lens L2 are cemented. Moreover, the biconvex positive lens L4, the positive meniscus lens L5, and the biconcave negative lens L6 are cemented.

The second lens unit G2 includes a negative meniscus lens L7 having a convex surface directed toward the object side, a biconvex positive lens L8, a biconvex positive lens L9, a biconcave negative lens L10, a biconvex positive lens L11, a biconcave negative lens L12, and a positive meniscus lens L13 having a convex surface directed toward the object side. The negative meniscus lens L7 and the biconvex positive lens L8 are cemented. A predetermined lens unit includes the biconcave negative lens L12 and the positive meniscus lens L13.

The aperture stop S is disposed between the biconcave negative lens L6 and the negative meniscus lens L7.

No aspheric surface is used.

Figure 101A:
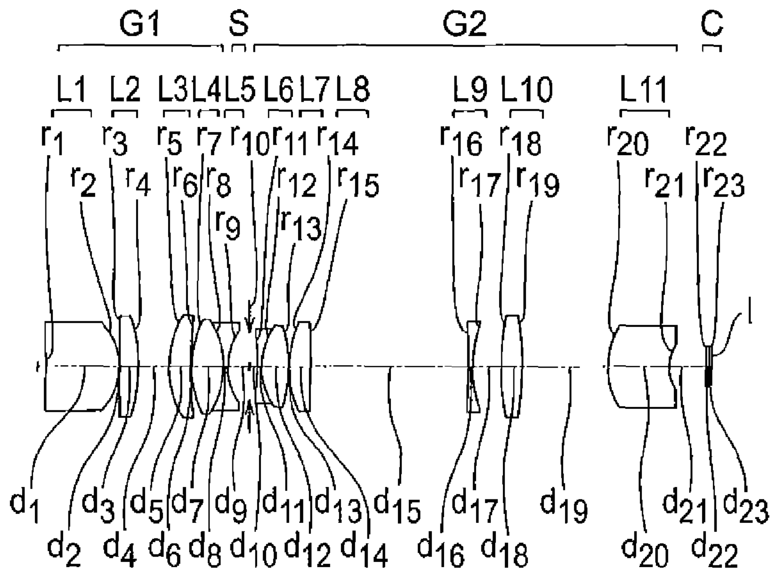
FIG. 101A is a cross-sectional view along an optical axis showing an optical arrangement.
Figures 101B, 101C, 101D, 101E:
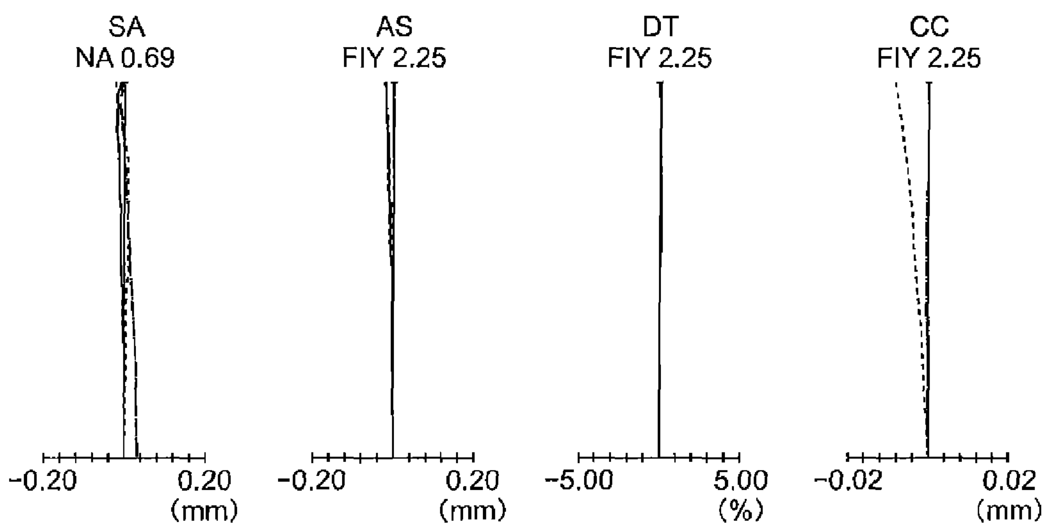
FIG. 101B, FIG. 101C, FIG. 101D, and FIG. 101E are diagrams showing a spherical aberration (SA), an astigmatism (AS), a distortion (DT), and a chromatic aberration of magnification (CC) respectively, of the optical system according to an example 94.

Next, an optical system according to an example 94 will be described below. FIG. 101A is a cross-sectional view along an optical axis showing an optical arrangement of the optical system according to the example 94. Moreover, FIG. 101B, FIG. 101C, FIG. 101D, and FIG. 101E are aberration diagrams of the optical system according to the example 94.

The optical system according to the example 94, as shown in FIG. 101A, includes in order from an object side, a first lens unit G1 having a positive refractive power, an aperture stop S, and a second lens unit G2 having a positive refractive power.

The first lens unit G1 includes a positive meniscus lens L1 having a convex surface directed toward an image side, a positive meniscus lens L2 having a convex surface directed toward the image side, a positive meniscus lens L3 having a convex surface directed toward the object side, a biconvex positive lens L4, and a biconcave negative lens L5. The biconvex positive lens L4 and the biconcave negative lens L5 are cemented.

The second lens unit G2 includes a biconcave negative lens L6, a biconvex positive lens L7, a biconvex positive lens L8, a biconcave negative lens L9, a biconvex positive lens L10, and a negative meniscus lens L11 having a convex surface directed toward the object side. The biconcave negative lens L6 and the biconvex positive lens L7 are cemented. A predetermined lens unit includes the negative meniscus lens L11, The aperture stop S is disposed between the biconcave negative lens L5 and the biconcave negative lens L6.

No aspheric surface is used.

Figure 102A:
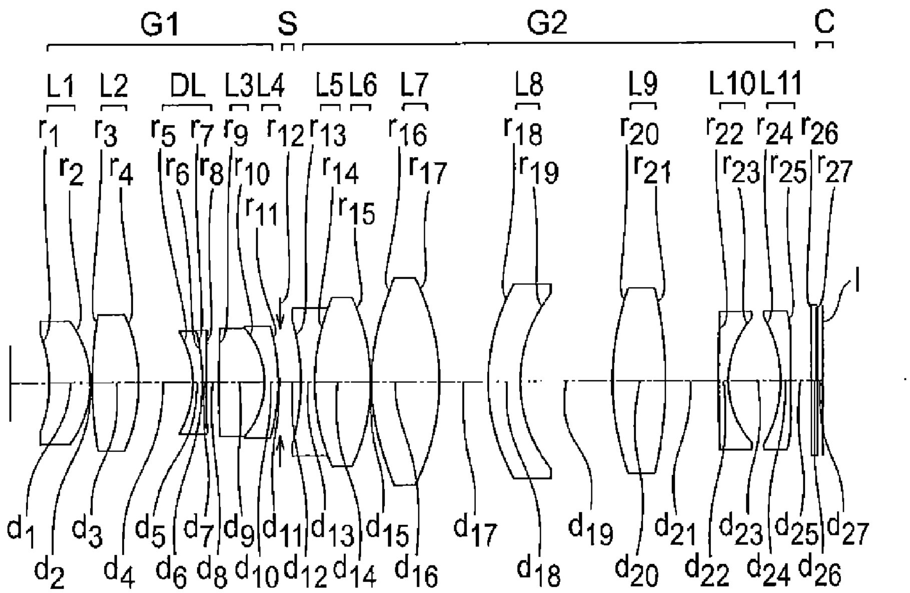
FIG. 102A is a cross-sectional view along an optical axis showing an optical arrangement.
Figures 102B, 102C, 102D, 102E:
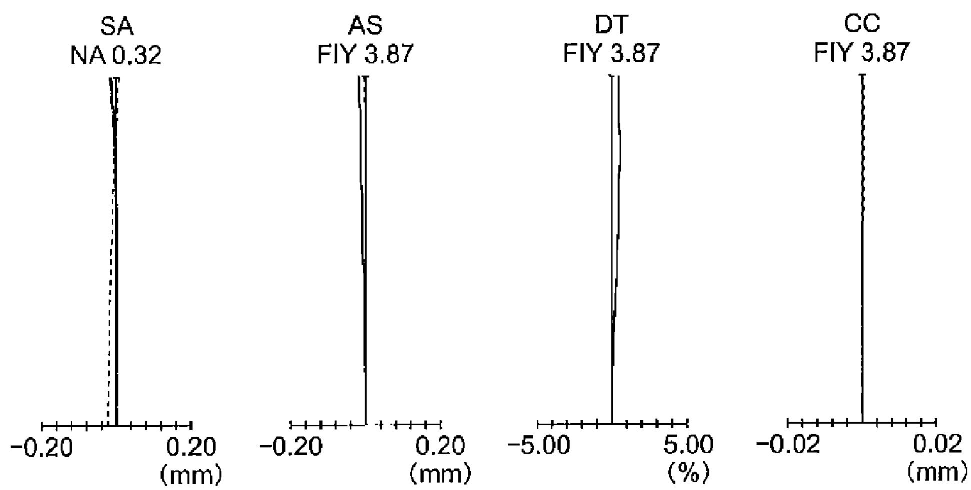
FIG. 102B, FIG. 102C, FIG. 102D, and FIG. 102E are diagrams showing a spherical aberration (SA), an astigmatism (AS), a distortion (DT), and a chromatic aberration of magnification (CC) respectively, of the optical system according to an example 95.

Next, an optical system according to an example 95 will be described below. FIG. 102A is a cross-sectional view along an optical axis showing an optical arrangement of the optical system according to the example 95. Moreover, FIG. 102B, FIG. 102C, FIG. 102D, and FIG. 102E are aberration diagrams of the optical system according to the example 95.

The optical system according to the example 95, as shown in FIG. 102A, includes in order from an object side, a first lens unit G1 having a positive refractive power, an aperture stop S, and a second lens unit G2 having a positive refractive power.

The first lens unit G1 includes a positive meniscus lens L1 having a convex surface directed toward an image side, a biconvex positive lens L2, a diffractive optical element DL, a biconvex positive lens L3, and a negative meniscus lens L4 having a convex surface directed toward the image side. The biconvex positive lens L3 and the negative meniscus lens L4 are cemented.

The second lens unit G2 includes a biconcave negative lens L5, a biconvex positive lens L6, a biconvex positive lens L7, a negative meniscus lens L8 having a convex surface directed toward the object side, a biconvex positive lens L9, a negative meniscus lens L10 having a convex surface directed toward the object side, and a biconcave negative lens L11. The biconcave negative lens L5 and the biconvex positive lens L6 are cemented. A predetermined lens unit includes the negative meniscus lens L10 and the biconcave negative lens L11.

The diffractive optical element DL has a negative refractive power as a whole. The diffractive optical element DL includes a negative meniscus lens having a convex surface directed toward the image side and a biconcave negative lens. A relief pattern is formed at an interface of the negative meniscus lens and the biconcave negative lens, and the interface is let to be a diffractive surface.

The aperture stop S is disposed between the negative meniscus lens L4 and the biconcave negative lens L5.

An aspheric surface is provided to eight surfaces namely, an image-side surface of the positive meniscus lens L1, an object-side surface of the biconvex positive lens L2, both surfaces of the biconvex positive lens L7, both surfaces of the negative meniscus lens L8, an object-side surface of the biconvex positive lens L9, and an image-side surface of the biconcave negative lens L11.

Figure 103A:
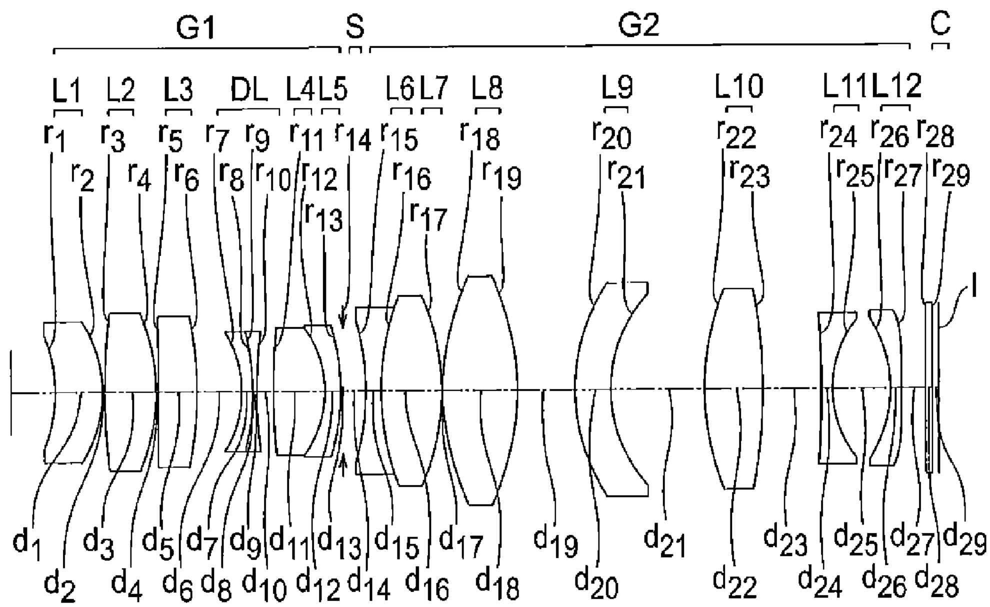
FIG. 103A is a cross-sectional view along an optical axis showing an optical arrangement.
Figures 103B, 103C, 103D, 103E:
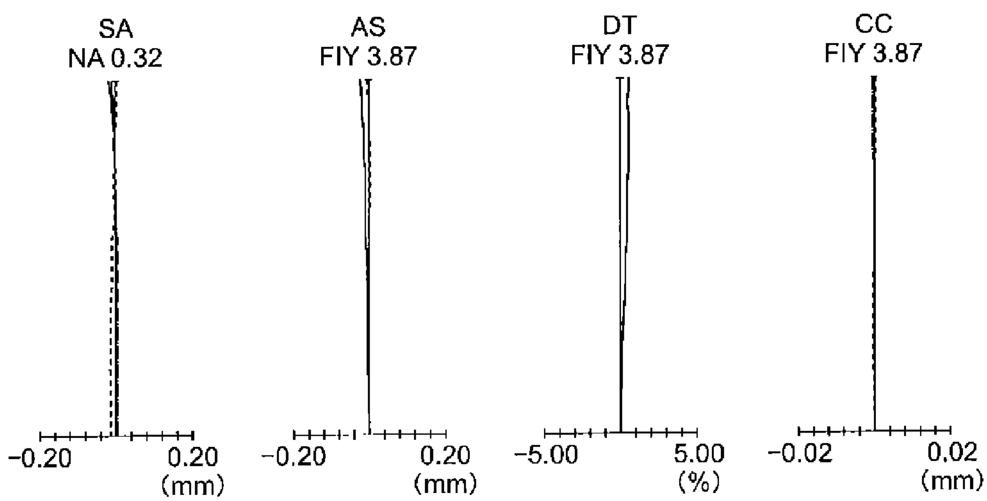
FIG. 103B, FIG. 103C, FIG. 103D, and FIG. 103E are diagrams showing a spherical aberration (SA), an astigmatism (AS), a distortion (DT), and a chromatic aberration of magnification (CC) respectively, of the optical system according to an example 96.

Next, an optical system according to an example 96 will be described below. FIG. 103A is a cross-sectional view along an optical axis showing an optical arrangement of the optical system according to the example 96. Moreover, FIG. 103B, FIG. 103C, FIG. 103D, and FIG. 103E are aberration diagrams of the optical system according to the example 96.

The optical system according to the example 96, as shown in FIG. 103A, includes in order from an object side, a first lens unit G1 having a positive refractive power, an aperture stop S, and a second lens unit G2 having a positive refractive power.

The first lens unit G1 includes a positive meniscus lens L1 having a convex surface directed toward an image side, a biconvex positive lens L2, a positive meniscus lens L3 having a convex surface directed toward the image side, a diffractive optical element DL, a biconvex positive lens L4, and a negative meniscus lens L5 having a convex surface directed toward the image side. The biconvex positive lens L4 and the negative meniscus lens L5 are cemented.

The second lens unit G2 includes a biconcave negative lens L6, a biconvex positive lens L7, a biconvex positive lens L8, a negative meniscus lens L9 having a convex surface directed toward the object side, a biconvex positive lens L10, a biconcave negative lens L11, and a negative meniscus lens L12 having a convex surface directed toward the image side. The biconcave negative lens L6 and the biconvex positive lens L7 are cemented. A predetermined lens unit includes the biconcave negative lens L11 and the negative meniscus lens L12.

The diffractive optical element DL has a negative refractive power as a whole. The diffractive optical element DL includes a negative meniscus lens having a convex surface directed toward the image side and a biconcave negative lens. A relief pattern is formed at an interface of the negative meniscus lens and the biconcave negative lens, and the interface is let to be a diffractive surface.

The aperture stop S is disposed between the negative meniscus lens L5 and the biconcave negative lens L6.

An aspheric surface is provided to eight surfaces namely, an image-side surface of the positive meniscus lens L1, an object-side surface of the biconvex positive lens L2, both surfaces of the biconvex positive lens L8, both surfaces of the negative meniscus lens L9, an object-side surface of the biconvex positive lens L10, and an image-side surface of the negative meniscus lens L12.

Next, numerical data of optical components comprising the image pickup optical system of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, ν1, νd2, . . . denotes an Abbe number of each lens, * denotes an aspheric surface, focal length denotes a focal length of an overall optical system, fb denotes a back focus, NA denotes a numerical aperture on the object side, NA' denotes a numerical aperture on an image side. The lens total length is the distance from the frontmost lens surface to the rearmost lens surface plus back focus. Further, back focus is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12, A14, $$Z=(y^2/r)/\left[1+\{1-(1+k)(y/r)^2\}^{1/2}\right]+A4y^4+A6y^6+A8y^8+A10y^{10}+A12y^{12}+A14y^{14}$$

Further, E or e stands for exponent of ten. These symbols are commonly used in the following numerical data for each example.

Example 1

Unit mm

Surface data

| Surface no. | r | d | nd | νd |
|---|---|---|---|---|
| Object plane | ∞ | 10.00 | | |
| 1* | 56.907 | 2.99 | 1.53368 | 55.90 |
| 2* | −4.184 | 0.89 | | |
| 3* | 5.571 | 2.08 | 1.63490 | 23.88 |
| 4* | 2.582 | 1.78 | | |
| 5* | −12.567 | 1.55 | 1.53368 | 55.90 |
| 6* | −9.471 | 0.16 | | |
| 7* | −81.714 | 1.53 | 1.61417 | 25.64 |
| 8* | 16.993 | 1.27 | | |
| 9* | 10.146 | 0.89 | 1.53368 | 55.90 |
| 10* | 2551.254 | 0.05 | | |
| 11(Stop) | ∞ | 0.05 | | |
| 12* | −2551.254 | 0.89 | 1.53368 | 55.90 |
| 13* | −10.146 | 1.27 | | |
| 14* | −16.993 | 1.53 | 1.61417 | 25.64 |
| 15* | 81.714 | 0.16 | | |
| 16* | 9.471 | 1.55 | 1.53368 | 55.90 |
| 17* | 12.567 | 1.78 | | |
| 18* | −2.582 | 2.08 | 1.63490 | 23.88 |
| 19* | −5.571 | 0.89 | | |
| 20* | 4.184 | 2.99 | 1.53368 | 55.90 |
| 21* | −56.907 | 10.00 | | |
| Image plane | ∞ | | | |

Aspherical surface data

1st surface k = −971.414
A4 = 5.02632E−004, A6 = −1.89989E−005, A8 = 7.41491E−008

2nd surface k = −3.546
A4 = −1.17216E−004, A6 = −3.40925E−006, A8 = −7.12080E−008

3rd surface k = −0.820
A4 = −3.68418E−004, A6 = 1.23021E−006, A8 = −1.91476E−007

-continued

Unit mm

4th surface k = −2.549
A4 = −5.11751E−005, A6 = 2.59016E−005, A8 = −4.23106E−006

5th surface k = −41.834
A4 = 1.16926E−003, A6 = 4.04202E−005, A8 = 5.90751E−007

6th surface k = −10.826
A4 = 1.20017E−003, A6 = −1.67324E−004, A8 = 1.00681E−005

7th surface k = −323.372
A4 = −1.33721E−003, A6 = −7.57104E−005

8th surface k = −56.057
A4 = 5.62466E−004, A6 = 2.31800E−005

9th surface k = −8.574
A4 = −4.31572E−004, A6 = 7.85879E−006

10th surface k = −3367.122
A4 = −1.08162E−003

12th surface k = −3367.122
A4 = 1.08162E−003

13th surface k = −8.574
A4 = 4.31572E−004, A6 = −7.85879E−006

14th surface k = −56.057
A4 = −5.62466E−004, A6 = −2.31800E−005

15th surface k = −323.372
A4 = 1.33721E−003, A6 = 7.57104E−005

16th surface k = −10.826
A4 = −1.20017E−003, A6 = 1.67324E−004, A8 = −1.00681E−005

17th surface k = −41.834
A4 = −1.16926E−003, A6 = −4.04202E−005, A8 = −5.90751E−007

18th surface k = −2.549
A4 = 5.11751E−005, A6 = −2.59016E−005, A8 = 4.23106E−006

19th surface k = −0.820
A4 = 3.68418E−004, A6 = −1.23021E−006, A8 = 1.91476E−007

20th surface k = −3.546
A4 = 1.17216E−004, A6 = 3.40925E−006, A8 = 7.12080E−008

21th surface k = −971.414
A4 = −5.02632E−004, A6 = 1.89989E−005, A8 = −7.41491E−008

Various data

| | |
|---|---|
| Focal length | 103.95 |
| Image height | 3.00 |
| Object height | 3.00 |
| fb (in air) | 10.00 |

-continued

| Unit mm | |
|---|---|
| Lens total length (in air) | 36.40 |
| NA | 0.25 |
| NA' | 0.25 |

Example 2

Unit mm

Surface data

| Surface no. | r | d | nd | νd |
|---|---|---|---|---|
| Object plane | ∞ | 10.00 | | |
| 1* | 56.907 | 2.99 | 1.53368 | 55.90 |
| 2* | −4.184 | 0.89 | | |
| 3* | 5.571 | 2.08 | 1.63490 | 23.88 |
| 4* | 2.582 | 1.78 | | |
| 5* | −12.567 | 1.55 | 1.53368 | 55.90 |
| 6* | −9.471 | 0.16 | | |
| 7* | −81.714 | 1.53 | 1.61417 | 25.64 |
| 8* | 16.993 | 1.27 | | |
| 9* | 10.146 | 0.89 | 1.53368 | 55.90 |
| 10* | 2551.254 | 0.05 | | |
| 11(Stop) | ∞ | 0.05 | | |
| 12* | −2755.354 | 0.88 | 1.53368 | 55.90 |
| 13* | −10.197 | 1.27 | | |
| 14* | −17.162 | 1.52 | 1.61417 | 25.64 |
| 15* | 80.905 | 0.16 | | |
| 16* | 9.945 | 1.51 | 1.53368 | 55.90 |
| 17* | 13.196 | 1.78 | | |
| 18* | −2.579 | 2.10 | 1.63490 | 23.88 |
| 19* | −5.515 | 0.89 | | |
| 20* | 4.205 | 3.01 | 1.53368 | 55.90 |
| 21* | −52.429 | 9.95 | | |
| Image plane | ∞ | | | |

Aspherical surface data

1st surface k = −971.414
A4 = 5.02632E−004, A6 = −1.89989E−005, A8 = 7.41491E−008

2nd surface k = −3.546
A4 = −1.17216E−004, A6 = −3.40925E−006, A8 = −7.12080E−008

3rd surface k = −0.820
A4 = −3.68418E−004, A6 = 1.23021E−006, A8 = −1.91476E−007

4th surface k = −2.549
A4 = −5.11751E−005, A6 = 2.59016E−005, A8 = −4.23106E−006

5th surface k = −41.834
A4 = 1.16926E−003, A6 = 4.04202E−005, A8 = 5.90751E−007

6th surface k = −10.826
A4 = 1.20017E−003, A6 = −1.67324E−004, A8 = 1.00681E−005

7th surface k = −323.372
A4 = −1.33721E−003, A6 = −7.57104E−005

8th surface k = −56.057
A4 = 5.62466E−004, A6 = 2.31800E−005

-continued

Unit mm

9th surface k = −8.574
A4 = −4.31572E−004, A6 = 7.85879E−006

10th surface k = −3367.122
A4 = −1.08162E−003

12th surface k = −1.000
A4 = 1.01390E−003

13th surface k = −34.706
A4 = 1.53163E−004, A6 = −3.32586E−005

14th surface k = −115.470
A4 = −3.35747E−004, A6 = −6.40043E−005, A8 = −2.43136E−006

15th surface k = −3938.246
A4 = 3.76944E−004, A6 = 7.29277E−005, A8 = −4.82792E−007

16th surface k = −8.155
A4 = −1.45390E−003, A6 = 1.19689E−004, A8 = −4.23958E−006

17th surface k = −54.092
A4 = −1.43817E−003, A6 = −4.56510E−005, A8 = −9.34587E−007

18th surface k = −2.544
A4 = −2.21738E−004, A6 = −1.23369E−005, A8 = 1.78875E−006

19th surface k = −0.962
A4 = 5.90516E−004, A6 = −9.40093E−007, A8 = 2.83619E−007

20th surface k = −3.386
A4 = −5.94157E−004, A6 = −2.05054E−005, A8 = −1.51161E−007

21st surface k = −997.069
A4 = −1.39558E−003, A6 = 3.03292E−008, A8 = −2.09782E−007

Various data

| | |
|---|---|
| Focal length | 117.54 |
| Image height | 3.00 |
| Object height | 3.04 |
| fb (in air) | 9.95 |
| Lens total length (in air) | 36.31 |
| NA | 0.25 |
| NA' | 0.25 |

Example 3

Unit mm

Surface data

| Surface no. | r | d | nd | νd |
|---|---|---|---|---|
| Object plane | ∞ | 10.00 | | |
| 1* | 24.287 | 3.82 | 1.53368 | 55.90 |
| 2* | −8.002 | 0.24 | | |
| 3* | −41.811 | 1.65 | 1.53368 | 55.90 |
| 4* | −5.934 | 0.10 | | |
| 5* | 5.062 | 1.71 | 1.63490 | 23.88 |

| Unit mm | | | | |
|---|---|---|---|---|
| 6* | 2.521 | 2.46 | | |
| 7* | −5.494 | 1.55 | 1.53368 | 55.90 |
| 8* | −8.447 | 0.84 | | |
| 9* | −19.714 | 1.55 | 1.61417 | 25.64 |
| 10* | 62.109 | 0.30 | | |
| 11* | 8.611 | 1.45 | 1.53368 | 55.90 |
| 12* | 83.241 | 0.10 | | |
| 13(Stop) | ∞ | 0.10 | | |
| 14* | −83.241 | 1.45 | 1.53368 | 55.90 |
| 15* | −8.611 | 0.30 | | |
| 16* | −62.109 | 1.55 | 1.61417 | 25.64 |
| 17* | 19.714 | 0.84 | | |
| 18* | 8.447 | 1.55 | 1.53368 | 55.90 |
| 19* | 5.494 | 2.46 | | |
| 20* | −2.521 | 1.71 | 1.63490 | 23.88 |
| 21* | −5.062 | 0.10 | | |
| 22* | 5.934 | 1.65 | 1.53368 | 55.90 |
| 23* | 41.811 | 0.24 | | |
| 24* | 8.002 | 3.82 | 1.53368 | 55.90 |
| 25* | −24.287 | 10.00 | | |
| Image plane | ∞ | | | |

Aspherical surface data

1st surface k = −38.162
A4 = 2.16640E−004, A6 = −1.95771E−005

2nd surface k = 0.297
A4 = 1.77235E−004

3rd surface k = 51.696
A4 = −7.96667E−005

4th surface k = −8.215
A4 = 3.34614E−004, A6 = −1.45043E−005

5th surface k = −2.669
A4 = −6.29227E−004

6th surface k = −2.293
A4 = −1.77915E−003

7th surface k = −13.090
A4 = 2.91976E−003, A6 = −9.94891E−005, A8 = 3.38774E−006

8th surface k = −29.993
A4 = 2.31315E−003, A6 = −2.67174E−004, A8 = 8.20378E−006

9th surface k = −144.855
A4 = −1.30120E−003, A6 = −1.92446E−004

10th surface k = −112.335
A4 = −4.38857E−004, A6 = 7.19917E−005

11th surface k = −11.820
A4 = −1.83703E−003, A6 = 5.10296E−005

12th surface k = −992.499
A4 = −2.26937E−003

14th surface k = −992.499
A4 = 2.26937E−003

Unit mm

15th surface k = −11.820
A4 = 1.83703E−003, A6 = −5.10296E−005

16th surface k = −112.335
A4 = 4.38857E−004, A6 = −7.19917E−005

17th surface k = −144.855
A4 = 1.30120E−003, A6 = 1.92446E−004

18th surface k = −29.993
A4 = −2.31315E−003, A6 = 2.67174E−004, A8 = −8.20378E−006

19th surface k = −13.090
A4 = −2.91976E−003, A6 = 9.94891E−005, A8 = −3.38774E−006

20th surface k = −2.293
A4 = 1.77915E−003

21th surface k = −2.669
A4 = 6.29227E−004

22th surface k = −8.215
A4 = −3.34614E−004, A6 = 1.45043E−005

23th surface k = 51.696
A4 = 7.96667E−005

24th surface k = 0.297
A4 = −1.77235E−004

25th surface k = −38.162
A4 = −2.16640E−004, A6 = 1.95771E−005

Various data

| | |
|---|---|
| Focal length | −66.52 |
| Image height | 3.00 |
| Object height | 3.00 |
| fb (in air) | 10.00 |
| Lens total length (in air) | 41.51 |
| NA | 0.25 |
| NA' | 0.25 |

Example 4

Unit mm

Surface data

| Surface no. | r | d | nd | νd |
|---|---|---|---|---|
| Object plane | ∞ | 10.00 | | |
| 1* | 118.590 | 3.22 | 1.53368 | 55.90 |
| 2* | −4.253 | 1.22 | | |
| 3* | 5.650 | 2.03 | 1.63490 | 23.88 |
| 4* | 2.592 | 2.12 | | |
| 5* | −12.289 | 1.26 | 1.53368 | 55.90 |
| 6* | −10.692 | 0.42 | | |
| 7* | 2017.727 | 0.75 | 1.61417 | 25.64 |
| 8* | 18.173 | 0.91 | | |
| 9* | 9.307 | 1.21 | 1.53368 | 55.90 |

-continued

| Unit mm | | | | |
|---|---|---|---|---|
| 10* | −1637.972 | 0.05 | | |
| 11(Stop) | ∞ | 0.05 | | |
| 12* | 1637.972 | 1.21 | 1.53368 | 55.90 |
| 13* | −9.307 | 0.91 | | |
| 14* | −18.173 | 0.75 | 1.61417 | 25.64 |
| 15* | −2017.727 | 0.42 | | |
| 16* | 10.692 | 1.26 | 1.53368 | 55.90 |
| 17* | 12.289 | 2.12 | | |
| 18* | −2.552 | 1.28 | 1.63490 | 23.88 |
| 19* | −4.995 | 0.20 | | |
| 20* | −8.574 | 1.73 | 1.61417 | 25.64 |
| 21* | −10.336 | 0.27 | | |
| 22* | 4.253 | 3.22 | 1.53368 | 55.90 |
| 23* | −118.590 | 10.00 | | |
| Image plane | ∞ | | | |

Aspherical surface data

1st surface k = −8136.470
A4 = 5.71134E−004, A6 = −2.00614E−005

2nd surface k = −3.272
A4 = 9.59493E−005, A6 = −1.26826E−005

3rd surface k = −1.068
A4 = −5.23801E−004

4th surface k = −2.482
A4 = −8.74470E−004

5th surface k = −40.369
A4 = 1.42420E−004, A6 = −3.86408E−005, A8 = 7.11239E−006

6th surface k = −10.478
A4 = 1.17511E−003, A6 = −2.78573E−004, A8 = 1.44945E−005

7th surface k = −29.482
A4 = −1.47024E−003, A6 = −9.25880E−005

8th surface k = −73.068
A4 = 2.28159E−004, A6 = 2.12332E−005

9th surface k = −8.721
A4 = −3.04856E−004, A6 = 1.03002E−005

10th surface k = −9998.897
A4 = −9.87805E−004

12th surface k = −9998.897
A4 = 9.87805E−004

13th surface k = −8.721
A4 = 3.04856E−004, A6 = −1.03002E−005

14th surface k = −73.068
A4 = −2.28159E−004, A6 = −2.12332E−005

15th surface k = −29.482
A4 = 1.47024E−003, A6 = 9.25880E−005

-continued

Unit mm

16th surface k = −10.478
A4 = −1.17511E−003, A6 = 2.78573E−004, A8 = −1.44945E−005

17th surface k = −40.369
A4 = −1.42420E−004, A6 = 3.86408E−005, A8 = −7.11239E−006

18th surface k = −2.482
A4 = 8.47704E−004, A6 = −1.73683E−005

19th surface k = −1.007
A4 = 1.61790E−003, A6 = −3.90652E−005

20th surface k = −5.877
A4 = 7.79125E−004, A6 = −1.32507E−005

21th surface k = −1.068
A4 = 5.79930E−004, A6 = 8.86427E−007

22th surface k = −3.272
A4 = −9.59493E−005, A6 = 1.26826E−005

23th surface k = −8136.470
A4 = −5.71134E−004, A6 = 2.00614E−005

Various data

| | |
|---|---|
| Focal length | 60.48 |
| Image height | 3.00 |
| Object height | 3.00 |
| fb (in air) | 10.00 |
| Lens total length (in air) | 36.64 |
| NA | 0.25 |
| NA' | 0.25 |

Example 5

Unit mm

Surface data

| Surface no. | r | d | nd | νd |
|---|---|---|---|---|
| Object plane | ∞ | 10.00 | | |
| 1* | 156.483 | 2.97 | 1.53368 | 55.90 |
| 2* | −4.185 | 0.64 | | |
| 3* | 5.631 | 2.24 | 1.63490 | 22.53 |
| 4* | 2.482 | 2.06 | | |
| 5* | −12.289 | 1.26 | 1.53368 | 55.90 |
| 6* | −10.692 | 0.30 | | |
| 7* | 749.711 | 0.75 | 1.61417 | 26.36 |
| 8* | 20.875 | 0.91 | | |
| 9* | 9.307 | 1.21 | 1.53368 | 55.90 |
| 10* | −1637.972 | 0.05 | | |
| 11(Stop) | ∞ | 0.05 | | |
| 12* | 1637.972 | 1.21 | 1.53368 | 55.90 |
| 13* | −9.307 | 0.36 | | |
| 14* | −16.779 | 1.62 | 1.61417 | 29.34 |
| 15* | −107.079 | 0.10 | | |
| 16* | 10.692 | 1.26 | 1.53368 | 55.90 |
| 17* | 12.289 | 2.12 | | |
| 18* | −6.330 | 2.13 | 1.63490 | 23.88 |
| 19* | −4.032 | 0.20 | | |
| 20* | −3.868 | 1.91 | 1.58366 | 31.95 |
| 21* | 11.399 | 1.30 | | |

| Unit mm | | | | |
|---|---|---|---|---|
| 22* | 4.898 | 4.02 | 1.53368 | 55.90 |
| 23* | −20.043 | 18.15 | | |
| Image plane | ∞ | | | |

Aspherical surface data

1st surface k = −9921.522
A4 = 5.99647E−004, A6 = −2.35081E−005, A8 = −3.20796E−007

2nd surface k = −3.735
A4 = −2.94840E−005, A6 = −9.87589E−006, A8 = −3.04656E−007

3rd surface k = −1.357
A4 = −7.07427E−004, A6 = 1.47946E−006, A8 = 1.15313E−007

4th surface k = −2.659
A4 = −7.98462E−004, A6 = −2.43747E−005, A8 = 5.79988E−007

5th surface k = −40.369
A4 = 1.42420E−004, A6 = −3.86408E−005, A8 = 7.11239E−006

6th surface k = −10.478
A4 = 1.17511E−003, A6 = −2.78573E−004, A8 = 1.44945E−005

7th surface k = −2.268
A4 = −1.14080E−004, A6 = −1.24060E−004, A8 = −2.30974E−006

8th surface k = −31.531
A4 = 4.20068E−004, A6 = 7.16535E−005, A8 = −5.41984E−006

9th surface k = −8.721
A4 = −3.04856E−004, A6 = 1.03002E−005

10th surface k = −9998.897
A4 = −9.87805E−004

12th surface k = −9998.897
A4 = 9.87805E−004

13th surface k = −8.721
A4 = 3.04856E−004, A6 = −1.03002E−005

14th surface k = −70.427
A4 = 1.69673E−004, A6 = −2.70114E−005, A8 = 1.08912E−007

15th surface k = −9997.910
A4 = 1.71452E−003, A6 = 1.19083E−004, A8 = −3.69775E−006

16th surface k = −10.478
A4 = −1.17511E−003, A6 = 2.78573E−004, A8 = −1.44945E−005

17th surface k = −40.369
A4 = −1.42420E−004, A6 = 3.86408E−005, A8 = −7.11239E−006

18th surface k = −2.482
A4 = 4.04572E−004, A6 = −8.29704E−005

Unit mm

19th surface k = −1.068
A4 = 2.63204E−003, A6 = −1.24324E−004

20th surface k = −2.596
A4 = 3.85952E−003, A6 = −1.23399E−004

21th surface k = −50.829
A4 = 9.71515E−004, A6 = −1.03384E−005

22th surface k = −5.617
A4 = −9.26264E−005, A6 = −1.51831E−005, A8 = 2.25669E−007

23th surface k = −1.000
A4 = −4.00926E−004, A6 = −3.90604E−006, A8 = −5.44114E−008

Various data

| | |
|---|---|
| Focal length | 26.53 |
| Image height | 5.00 |
| Object height | 2.99 |
| fb (in air) | 18.15 |
| Lens total length (in air) | 46.84 |
| NA | 0.25 |
| NA' | 0.15 |

Example 6

Unit mm

Surface data

| Surface no. | r | d | nd | νd |
|---|---|---|---|---|
| Object plane | ∞ | 1.21 | | |
| 1* | −0.784 | 0.48 | 1.53071 | 55.78 |
| 2* | −130.797 | 0.05 | | |
| 3* | 0.642 | 0.59 | 1.53071 | 55.78 |
| 4* | 2.354 | 0.49 | | |
| 5* | −2.684 | 0.29 | 1.63490 | 23.88 |
| 6* | 17.387 | 0.04 | | |
| 7* | 2.980 | 0.70 | 1.53071 | 55.78 |
| 8* | −1.789 | −0.11 | | |
| 9(Stop) | ∞ | 0.21 | | |
| 10* | 1.410 | 0.54 | 1.53463 | 56.22 |
| 11* | −25.302 | 0.05 | | |
| 12* | −63.214 | 0.30 | 1.63490 | 23.88 |
| 13* | 2.768 | 0.71 | | |
| 14* | −2.355 | 0.65 | 1.53463 | 56.22 |
| 15* | −0.912 | 0.13 | | |
| 16* | −251.493 | 0.59 | 1.53463 | 56.22 |
| 17* | 1.312 | 1.46 | | |
| Image plane | ∞ | | | |

Aspherical surface data

1st surface k = −7.734
A4 = 1.18541E−001, A6 = −5.85984E−002, A8 = 2.76156E−002,
A10 = −7.67536E−003, A12 = 1.18366E−003, A14 = −7.33016E−005

2nd surface k = 0.000
A4 = 8.48095E−002, A6 = −1.72116E−002, A8 = −1.25962E−002,
A10 = 6.37573E−003, A12 = −8.49967E−004, A14 = −3.53042E−006

-continued

| Unit mm |
|---|
| 3rd surface |
| k = −3.546<br>A4 = 2.70583E−001, A6 = −2.54490E−001, A8 = 1.89589E−001,<br>A10 = −1.87543E−001, A12 = 5.94237E−002 |
| 4th surface |
| k = −1.947<br>A4 = 9.60228E−002, A6 = −2.78077E−002, A8 = −2.47936E−003,<br>A10 = −5.89337E−002, A12 = 1.60644E−001 |
| 5th surface |
| k = −24.611<br>A4 = −1.29167E−001, A6 = 1.92617E−001, A8 = −6.67246E−002,<br>A10 = −9.41339E−002, A12 = −7.64900E−002 |
| 6th surface |
| k = 0.000<br>A4 = 7.10538E−002, A6 = 3.04047E−001, A8 = −7.45538E−001,<br>A10 = −1.67999E−001, A12 = 5.47114E−001 |
| 7th surface |
| k = −4.762<br>A4 = 9.68323E−002, A6 = 3.65189E−001, A8 = −8.02417E−001,<br>A10 = 7.47746E−002, A12 = 6.35189E−001 |
| 8th surface |
| k = −0.571<br>A4 = 4.95207E−002, A6 = −1.12153E−001, A8 = 7.03902E−001,<br>A10 = −1.28927E+000, A12 = 1.11371E+000 |
| 10th surface |
| k = 0.062<br>A4 = 1.37414E−002, A6 = −5.71487E−002, A8 = −3.66765E−002,<br>A10 = 4.18364E−001, A12 = −4.83502E−001 |
| 11th surface |
| k = 0.000<br>A4 = 1.42573E−001, A6 = −6.53135E−001, A8 = 3.84898E−001,<br>A10 = 2.63676E+000, A12 = −3.61580E+000, A14 = 4.20017E−001,<br>A16 = 4.40252E−001 |
| 12th surface |
| k = −495.266<br>A4 = 1.85957E−001, A6 = −8.01875E−001, A8 = 7.78375E−001,<br>A10 = 2.01491E+000, A12 = −2.75814E+000 |
| 13th surface |
| k = −4.665<br>A4 = 1.82826E−001, A6 = −3.29495E−001, A8 = 5.73943E−001,<br>A10 = −1.56281E−001, A12 = −1.45670E−001 |
| 14th surface |
| k = −1.122<br>A4 = −5.90880E−002, A6 = 1.80998E−001, A8 = −4.20905E−001,<br>A10 = 3.48644E−001, A12 = −1.35538E−001 |
| 15th surface |
| k = −4.154<br>A4 = −2.53695E−001, A6 = 3.45811E−001, A8 = −3.37286E−001,<br>A10 = 1.58499E−001, A12 = −2.70778E−002 |
| 16th surface |
| k = −420.200<br>A4 = −4.70698E−002, A6 = −1.74511E−002, A8 = 1.68346E−002,<br>A10 = −4.41443E−003, A12 = 5.27904E−004, A14 = −2.63829E−005 |
| 17th surface |
| k = −9.247<br>A4 = −7.76409E−002, A6 = 2.54240E−002, A8 = −8.61348E−003,<br>A10 = 1.79672E−003, A12 = −2.29048E−004, A14 = 1.31057E−005 |

| Various data | |
|---|---|
| Focal length | 1.52 |
| Image height | 2.85 |
| Object height | 2.24 |

-continued

| Unit mm | |
|---|---|
| fb (in air) | 1.46 |
| Lens total length (in air) | 7.16 |
| NA | 0.22 |
| NA' | 0.17 |

Example 7

Unit mm

Surface data

| Surface no. | r | d | nd | νd |
|---|---|---|---|---|
| Object plane | ∞ | 1.46 | | |
| 1* | −1.312 | 0.59 | 1.53463 | 56.22 |
| 2* | 251.493 | 0.13 | | |
| 3* | 0.912 | 0.65 | 1.53463 | 56.22 |
| 4* | 2.355 | 0.71 | | |
| 5* | −2.768 | 0.30 | 1.63490 | 23.88 |
| 6* | 63.214 | 0.05 | | |
| 7* | 25.302 | 0.54 | 1.53463 | 56.22 |
| 8* | −1.410 | 0.21 | | |
| 9(Stop) | ∞ | −0.11 | | |
| 10* | 1.789 | 0.70 | 1.53071 | 55.78 |
| 11* | −2.980 | 0.04 | | |
| 12* | −17.387 | 0.29 | 1.63490 | 23.88 |
| 13* | 2.684 | 0.49 | | |
| 14* | −2.354 | 0.59 | 1.53071 | 55.78 |
| 15* | −0.642 | 0.05 | | |
| 16* | 130.797 | 0.48 | 1.53071 | 55.78 |
| 17* | 0.784 | 1.21 | | |
| Image plane | ∞ | | | |

| Aspherical surface data |
|---|
| 1st surface |
| k = −9.247<br>A4 = 7.76409E−002, A6 = −2.54240E−002, A8 = 8.61348E−003,<br>A10 = −1.79672E−003, A12 = 2.29048E−004, A14 = −1.31057E−005 |
| 2nd surface |
| k = −420.200<br>A4 = 4.70698E−002, A6 = 1.74511E−002, A8 = −1.68346E−002,<br>A10 = 4.41443E−003, A12 = −5.27904E−004, A14 = 2.63829E−005 |
| 3rd surface |
| k = −4.154<br>A4 = 2.53695E−001, A6 = −3.45811E−001, A8 = 3.37286E−001,<br>A10 = −1.58499E−001, A12 = 2.70778E−002 |
| 4th surface |
| k = −1.122<br>A4 = 5.90880E−002, A6 = −1.80998E−001, A8 = 4.20905E−001,<br>A10 = −3.48644E−001, A12 = 1.35538E−001 |
| 5th surface |
| k = −4.665<br>A4 = −1.82826E−001, A6 = 3.29495E−001, A8 = −5.73943E−001,<br>A10 = 1.56281E−001, A12 = 1.45670E−001 |
| 6th surface |
| k = −495.266<br>A4 = −1.85957E−001, A6 = 8.01875E−001, A8 = −7.78375E−001,<br>A10 = −2.01491E+000, A12 = 2.75814E+000 |
| 7th surface |
| k = 0.000<br>A4 = −1.42573E−001, A6 = 6.53135E−001, A8 = −3.84898E−001,<br>A10 = −2.63676E+000, A12 = 3.61580E+000, A14 = −4.20017E−001,<br>A16 = −4.40252E−001 |

-continued

| Unit mm |
|---|
| 8th surface |
| k = 0.062<br>A4 = −1.37414E−002, A6 = 5.71487E−002, A8 = 3.66765E−002,<br>A10 = −4.18364E−001, A12 = 4.83502E−001 |
| 10th surface |
| k = −0.571<br>A4 = −4.95207E−002, A6 = 1.12153E−001, A8 = −7.03902E−001,<br>A10 = 1.28927E+000, A12 = −1.11371E+000 |
| 11th surface |
| k = −4.762<br>A4 = −9.68323E−002, A6 = −3.65189E−001, A8 = 8.02417E−001,<br>A10 = −7.47746E−002, A12 = −6.35189E−001 |
| 12th surface |
| k = 0.000<br>A4 = −7.10538E−002, A6 = −3.04047E−001, A8 = 7.45538E−001,<br>A10 = 1.67999E−001, A12 = −5.47114E−001 |
| 13th surface |
| k = −24.611<br>A4 = 1.29167E−001, A6 = −1.92617E−001, A8 = 6.67246E−002,<br>A10 = 9.41339E−002, A12 = 7.64900E−002 |
| 14th surface |
| k = −1.947<br>A4 = −9.60228E−002, A6 = 2.78077E−002, A8 = 2.47936E−003,<br>A10 = 5.89337E−002, A12 = −1.60644E−001 |
| 15th surface |
| k = −3.546<br>A4 = −2.70583E−001, A6 = 2.54490E−001, A8 = −1.89589E−001,<br>A10 = 1.87543E−001, A12 = −5.94237E−002 |
| 16th surface |
| k = 0.000<br>A4 = −8.48095E−002, A6 = 1.72116E−002, A8 = 1.25962E−002,<br>A10 = −6.37573E−003, A12 = 8.49967E−004, A14 = 3.53042E−006 |
| 17th surface |
| k = −7.734<br>A4 = −1.18541E−001, A6 = 5.85984E−002, A8 = −2.76156E−002,<br>A10 = 7.67536E−003, A12 = −1.18366E−003, A14 = 7.33016E−005 |

| Various data | |
|---|---|
| Focal length | 1.52 |
| Image height | 2.24 |
| Object height | 2.85 |
| fb (in air) | 1.21 |
| Lens total length (in air) | 6.91 |
| NA | 0.17 |
| NA' | 0.22 |

Example 8

Unit mm

Surface data

| Surface no. | r | d | nd | νd | θgf |
|---|---|---|---|---|---|
| 1 | 20.000 | 3.16 | 1.49700 | 81.61 | 0.538 |
| 2 | −29.914 | 1.23 | | | |
| 3 | 12.304 | 3.27 | 1.49700 | 81.61 | 0.538 |
| 4* | 133.906 | 0.19 | | | |
| 5 | 9.781 | 3.54 | 1.61800 | 63.33 | 0.544 |
| 6 | −30.296 | 0.98 | 1.72047 | 34.71 | 0.583 |
| 7 | 6.120 | 1.14 | | | |
| 8(Stop) | ∞ | 0.73 | | | |
| 9 | −13.763 | 0.70 | 1.90366 | 31.32 | 0.595 |
| 10 | −552.475 | 1.65 | 1.61800 | 63.33 | 0.544 |
| 11 | −30.000 | 0.10 | | | |
| 12* | 7.964 | 2.99 | 1.49700 | 81.61 | 0.538 |
| 13* | 29.995 | 1.94 | | | |
| 14* | 105.854 | 2.67 | 1.58364 | 30.30 | 0.599 |
| 15* | −9.793 | 5.72 | | | |
| 16* | −5.613 | 0.70 | 1.53368 | 55.90 | 0.563 |
| 17* | 4970.723 | 3.70 | | | |
| 18 | ∞ | 0.30 | 1.51640 | 65.06 | 0.535 |
| 19 | ∞ | 0.31 | | | |
| Image plane | ∞ | | | | |

Aspherical surface data

| Aspherical surface data |
|---|
| 4th surface |
| k = 0.000<br>A4 = 7.06954e−05 |
| 12th surface |
| k = −0.579<br>A4 = 3.23636e−08 |
| 13th surface |
| k = 0.000<br>A4 = 1.99801e−05 |
| 14th surface |
| k = 0.000<br>A4 = −5.42705e−04 |
| 15th surface |
| k = 0.000<br>A4 = −1.29917e−05 |
| 16th surface |
| k = 0.000<br>A4 = 4.43608e−04 |
| 17th surface |
| k = 0.000<br>A4 = −7.74339e−04, A6 = −4.96705e−06 |

| Various data | |
|---|---|
| NA | 0.15 |
| Magnification | −1.04 |
| Focal length | 9.34 |
| Image height (mm) | 4.92 |
| fb (mm) (in air) | 4.21 |
| Lens total length (mm) (in air) | 34.92 |

Example 9

Unit mm

Surface data

| Surface no. | r | d | nd | νd | θgf |
|---|---|---|---|---|---|
| 1 | 24.757 | 4.50 | 1.49700 | 81.61 | 0.538 |
| 2 | −20.382 | 0.14 | | | |
| 3* | −83.898 | 1.15 | 1.53368 | 55.90 | 0.563 |
| 4* | 28.935 | 0.15 | | | |
| 5 | 14.657 | 4.68 | 1.49700 | 81.61 | 0.538 |
| 6* | −22.520 | 2.49 | | | |
| 7 | 8.244 | 3.90 | 1.61800 | 63.33 | 0.544 |
| 8 | −18.524 | 0.70 | 1.72047 | 34.71 | 0.583 |
| 9 | 6.509 | 1.16 | | | |
| 10(Stop) | ∞ | 1.00 | | | |
| 11 | −7.654 | 1.06 | 1.90366 | 31.32 | 0.595 |
| 12 | −19.862 | 2.42 | 1.61800 | 63.33 | 0.544 |
| 13 | −14.476 | 0.10 | | | |
| 14* | 10.185 | 4.10 | 1.49700 | 81.61 | 0.538 |

| Unit mm | | | | | |
|---|---|---|---|---|---|
| 15* | −13.446 | 0.10 | | | |
| 16* | 22.889 | 3.01 | 1.58364 | 30.30 | 0.599 |
| 17* | −29.222 | 5.24 | | | |
| 18* | −6.641 | 0.70 | 1.53368 | 55.90 | 0.563 |
| 19* | 16.877 | 3.70 | | | |
| 20 | ∞ | 0.30 | 1.51640 | 65.06 | 0.535 |
| 21 | ∞ | 0.31 | | | |
| Image plane | ∞ | | | | |

Aspherical surface data

3rd surface k = 0.000
A4 = −5.08296e−05, A6 = −5.46138e−07

4th surface k = 0.000
A4 = 1.91756e−05, A6 = −4.56532e−07

6th surface k = 0.000
A4 = 4.28078e−05

14th surface k = −0.579
A4 = −5.62366e−07

15th surface k = 0.000
A4 = 1.84420e−04

16th surface k = 0.000
A4 = −4.33240e−05

17th surface k = 0.000
A4 = 1.44611e−04

18th surface k = 0.000
A4 = 2.83534e−04

19th surface k = 0.000
A4 = −7.46747e−04, A6 = 4.74306e−06

Various data

| | |
|---|---|
| NA | 0.21 |
| Magnification | −1.05 |
| Focal length | 9.35 |
| Image height (mm) | 4.92 |
| fb (mm) (in air) | 4.21 |
| Lens total length (mm) (in air) | 40.82 |

Example 10

Unit mm

Surface data

| Surface no. | r | d | nd | νd | θgf |
|---|---|---|---|---|---|
| 1 | 20.000 | 3.29 | 1.49700 | 81.61 | 0.538 |
| 2 | −27.197 | 0.40 | | | |
| 3 | 12.782 | 3.47 | 1.49700 | 81.61 | 0.538 |
| 4* | 186.607 | 0.99 | | | |
| 5 | 10.290 | 3.50 | 1.61800 | 63.33 | 0.544 |
| 6 | −17.388 | 0.86 | 1.72047 | 34.71 | 0.583 |
| 7 | 6.090 | 1.02 | | | |
| 8(Stop) | ∞ | 0.75 | | | |

| Unit mm | | | | | |
|---|---|---|---|---|---|
| 9 | −12.294 | 0.70 | 1.90366 | 31.32 | 0.595 |
| 10 | −69.652 | 1.69 | 1.61800 | 63.33 | 0.544 |
| 11 | −20.000 | 0.10 | | | |
| 12 | 8.145 | 3.21 | 1.49700 | 81.61 | 0.538 |
| 13 | −15.000 | 0.95 | 1.51742 | 52.43 | 0.556 |
| 14 | 11.934 | 0.72 | | | |
| 15* | 12.723 | 2.63 | 1.58364 | 30.30 | 0.599 |
| 16* | −12.612 | 5.70 | | | |
| 17* | −5.132 | 0.73 | 1.53368 | 55.90 | 0.563 |
| 18* | −59.830 | 3.70 | | | |
| 19 | ∞ | 0.30 | 1.51640 | 65.06 | 0.535 |
| 20 | ∞ | 0.31 | | | |
| Image plane | ∞ | | | | |

Aspherical surface data

4th surface k = 0.000
A4 = 9.03821e−05

15th surface k = 0.000
A4 = −1.16458e−04

16th surface k = 0.000
A4 = 3.05202e−04

17th surface k = 0.000
A4 = 4.25245e−04

18th surface k = 0.000
A4 = −8.51966e−04, A6 = −6.89946e−06

Various data

| | |
|---|---|
| NA | 0.15 |
| Magnification | −1.03 |
| Focal length | 9.35 |
| Image height (mm) | 4.92 |
| fb (mm) (in air) | 4.21 |
| Lens total length (mm) (in air) | 34.91 |

Example 11

Unit mm

Surface data

| Surface no. | r | d | nd | νd | θgf |
|---|---|---|---|---|---|
| 1 | 15.000 | 3.56 | 1.49700 | 81.61 | 0.538 |
| 2 | −34.400 | 0.10 | | | |
| 3 | 11.283 | 3.07 | 1.49700 | 81.61 | 0.538 |
| 4* | 114.633 | 1.10 | | | |
| 5 | 11.882 | 3.29 | 1.61800 | 63.33 | 0.544 |
| 6 | −23.894 | 1.08 | 1.72047 | 34.71 | 0.583 |
| 7 | 6.254 | 0.98 | | | |
| 8(Stop) | ∞ | 0.41 | | | |
| 9 | 28.157 | 0.70 | 1.90366 | 31.32 | 0.595 |
| 10 | 12.525 | 1.62 | 1.61800 | 63.33 | 0.544 |
| 11 | 29.622 | 4.65 | | | |
| 12* | 19.060 | 2.87 | 1.49700 | 81.61 | 0.538 |
| 13* | −20.715 | 0.10 | | | |
| 14 | 30.351 | 3.69 | 1.86400 | 40.58 | 0.567 |
| 15 | −8.760 | 0.84 | 1.56384 | 60.67 | 0.540 |
| 16 | 33.363 | 1.93 | | | |
| 17* | −8.111 | 0.70 | 1.53368 | 55.90 | 0.563 |
| 18* | 20.135 | 3.70 | | | |

-continued

| Unit mm | | | | | |
|---|---|---|---|---|---|
| 19 | ∞ | 0.30 | 1.51640 | 65.06 | 0.535 |
| 20 | ∞ | 0.31 | | | |
| Image plane | ∞ | | | | |

Aspherical surface data

4th surface k = 0.000
A4 = 1.82154e−04

12th surface k = −0.579
A4 = −2.53743e−05

13th surface k = 0.000
A4 = 1.30619e−04

17th surface k = 0.000
A4 = 2.60653e−04

18th surface k = 0.000
A4 = −2.39609e−04, A6 = 9.46048e−07

Various data

| | |
|---|---|
| NA | 0.15 |
| Magnification | −1.03 |
| Focal length | 10.22 |
| Image height (mm) | 4.92 |
| fb (mm) (in air) | 4.21 |
| Lens total length (mm) (in air) | 34.91 |

Example 12

Unit mm

Surface data

| Surface no. | r | d | nd | νd | θgf |
|---|---|---|---|---|---|
| 1 | 96.073 | 2.73 | 1.84666 | 23.77 | 0.620 |
| 2* | −18.251 | 0.30 | | | |
| 3* | −23.375 | 0.50 | 1.58364 | 30.30 | 0.599 |
| 4* | 10.401 | 0.30 | | | |
| 5* | 9.515 | 3.87 | 1.49700 | 81.61 | 0.538 |
| 6 | −32.363 | 0.10 | | | |
| 7 | 10.328 | 3.78 | 1.49700 | 81.61 | 0.538 |
| 8 | −34.714 | 0.30 | | | |
| 9 | 10.969 | 2.74 | 1.61800 | 63.33 | 0.544 |
| 10 | −26.411 | 0.61 | 1.72047 | 34.71 | 0.583 |
| 11 | 5.686 | 1.34 | | | |
| 12(Stop) | ∞ | 0.30 | | | |
| 13 | 15.413 | 0.50 | 1.72047 | 34.71 | 0.583 |
| 14 | 9.057 | 1.61 | 1.61800 | 63.33 | 0.544 |
| 15 | 9.689 | 1.83 | | | |
| 16* | 9.565 | 2.26 | 1.49700 | 81.61 | 0.538 |
| 17* | 340.758 | 1.70 | | | |
| 18* | 11.503 | 2.38 | 1.63490 | 23.88 | 0.630 |
| 19* | 1563.756 | 3.01 | | | |
| 20* | −5.590 | 1.96 | 1.53368 | 55.90 | 0.563 |
| 21* | 57.014 | 2.21 | | | |
| 22 | ∞ | 0.38 | 1.51640 | 65.06 | 0.535 |
| 23 | ∞ | 0.30 | | | |
| Image plane | ∞ | | | | |

-continued

Unit mm

Aspherical surface data

2nd surface k = −4.214

3rd surface k = 0.000
A4 = 3.91871e−05, A6 = 3.19948e−08

4th surface k = 0.000
A4 = −2.66544e−04, A6 = 4.29908e−08

5th surface k = −1.434
A4 = −1.94439e−04

16th surface k = −0.579
A4 = 2.99389e−04

17th surface k = 0.000
A4 = −1.11526e−04

18th surface k = 2.656
A4 = −2.50790e−04

19th surface k = 0.000
A4 = 1.33117e−04

20th surface k = 0.000
A4 = 2.61407e−04

21th surface k = 0.000
A4 = −4.36562e−04

Various data

| | |
|---|---|
| NA | 0.18 |
| Magnification | −1.05 |
| Focal length | 7.99 |
| Image height (mm) | 4.92 |
| fb (mm) (in air) | 2.77 |
| Lens total length (mm) (in air) | 34.88 |

Example 13

Unit mm

Surface data

| Surface no. | r | d | nd | νd | θgf |
|---|---|---|---|---|---|
| 1 | 47.665 | 2.51 | 1.84666 | 23.77 | 0.620 |
| 2* | −21.643 | 0.30 | | | |
| 3* | −78.703 | 0.50 | 1.58364 | 30.30 | 0.599 |
| 4* | 8.889 | 0.30 | | | |
| 5* | 8.817 | 3.03 | 1.49700 | 81.61 | 0.538 |
| 6 | −86.120 | 0.10 | | | |
| 7 | 9.186 | 3.18 | 1.49700 | 81.61 | 0.538 |
| 8 | −23.055 | 0.30 | | | |
| 9 | 12.987 | 2.57 | 1.61800 | 63.33 | 0.544 |
| 10 | −22.422 | 0.87 | 1.72047 | 34.71 | 0.583 |
| 11 | 5.211 | 0.94 | | | |
| 12(Stop) | ∞ | 0.30 | | | |
| 13 | 19.357 | 1.64 | 1.61800 | 63.33 | 0.544 |
| 14 | −39.123 | 0.50 | 1.72047 | 34.71 | 0.583 |

-continued

| Unit mm | | | | | |
|---|---|---|---|---|---|
| 15 | 11.556 | 3.60 | | | |
| 16* | 11.244 | 2.21 | 1.49700 | 81.61 | 0.538 |
| 17* | 5498.309 | 2.42 | | | |
| 18* | 8.310 | 2.64 | 1.63490 | 23.88 | 0.630 |
| 19* | 32.497 | 2.45 | | | |
| 20* | −8.166 | 0.75 | 1.53368 | 55.90 | 0.563 |
| 21* | 18.771 | 2.20 | | | |
| 22 | ∞ | 0.38 | 1.51640 | 65.06 | 0.535 |
| 23 | ∞ | 0.31 | | | |
| Image plane | ∞ | | | | |

Aspherical surface data

2nd surface k = −3.077

3rd surface k = 0.000
A4 = −3.60571e−05

4th surface k = 0.000
A4 = −1.12816e−04

5th surface k = −0.996
A4 = −7.73645e−05

16th surface k = −0.579
A4 = 7.09702e−04

17th surface k = 0.000
A4 = 5.12138e−04

18th surface k = −0.174
A4 = −2.01937e−06

19th surface k = 0.000
A4 = −3.03025e−07

20th surface k = 0.000
A4 = 1.53947e−06

21th surface k = 0.000
A4 = −1.55823e−06

Various data

| | |
|---|---|
| NA | 0.13 |
| Magnification | −1.05 |
| Focal length | 8.59 |
| Image height(mm) | 4.92 |
| fb(mm) (in air) | 2.76 |
| Lens total length(mm) (in air) | 33.88 |

Example 14

Unit mm

Surface data

| Surface no. | r | d | nd | νd | θgf |
|---|---|---|---|---|---|
| 1 | 47.850 | 2.59 | 1.84666 | 23.77 | 0.620 |
| 2* | −22.343 | 0.30 | | | |
| 3* | −42.136 | 0.50 | 1.58364 | 30.30 | 0.599 |
| 4* | 8.363 | 0.45 | | | |
| 5* | 8.022 | 4.21 | 1.49700 | 81.61 | 0.538 |
| 6 | −27.821 | 0.10 | | | |
| 7 | 12.314 | 3.81 | 1.49700 | 81.61 | 0.538 |
| 8 | −15.006 | 0.30 | | | |
| 9 | 15.820 | 2.48 | 1.61800 | 63.33 | 0.544 |
| 10 | −16.606 | 0.86 | 1.72047 | 34.71 | 0.583 |
| 11 | 5.917 | 1.11 | | | |
| 12(Stop) | ∞ | 0.30 | | | |
| 13 | 19.831 | 1.50 | 1.59542 | 57.26 | 0.547 |
| 14 | 8.704 | 3.25 | | | |
| 15* | 30.113 | 2.20 | 1.49700 | 81.61 | 0.538 |
| 16* | −129.450 | 1.44 | | | |
| 17* | 11.178 | 3.22 | 1.63490 | 23.88 | 0.630 |
| 18* | 69.854 | 2.52 | | | |
| 19* | −11.756 | 1.72 | 1.53368 | 55.90 | 0.563 |
| 20* | 28.321 | 2.45 | | | |
| 21 | ∞ | 0.38 | 1.51640 | 65.06 | 0.535 |
| 22 | ∞ | 0.30 | | | |
| Image plane | ∞ | | | | |

Aspherical surface data

2nd surface k = −6.782

3rd surface k = 0.000
A4 = −1.06326e−04

4th surface k = 0.000
A4 = −4.80995e−04

5th surface k = −1.297
A4 = −2.89846e−04

15th surface k = −0.579
A4 = −2.76313e−06

16th surface k = 0.000
A4 = 4.96403e−06

17th surface k = 1.161
A4 = −1.96685e−05

18th surface k = 0.000
A4 = 9.87207e−06

19th surface k = 0.000
A4 = 8.51271e−06

20th surface k = 0.000
A4 = −2.32962e−05

Various data

| | |
|---|---|
| NA | 0.14 |
| Magnification | −1.05 |
| Focal length | 9.49 |
| Image height(mm) | 4.92 |
| fb(mm) (in air) | 3.00 |
| Lens total length(mm) (in air) | 35.87 |

Example 15

| Unit mm | | | | | |
|---|---|---|---|---|---|
| Surface data | | | | | |
| Surface no. | r | d | nd | νd | θgf |
| 1* | 17.425 | 1.99 | 1.84666 | 23.77 | 0.620 |
| 2* | 26.052 | 2.15 | | | |
| 3 | 78.603 | 2.65 | 1.49700 | 81.61 | 0.538 |
| 4 | −23.793 | 0.10 | | | |
| 5 | 20.854 | 2.93 | 1.49700 | 81.61 | 0.538 |
| 6* | −28.805 | 0.97 | | | |
| 7 | 10.233 | 3.22 | 1.61800 | 63.33 | 0.544 |
| 8 | −14.403 | 0.70 | 1.72047 | 34.71 | 0.583 |
| 9 | 6.263 | 1.54 | | | |
| 10(Stop) | ∞ | 2.59 | | | |
| 11 | −23.449 | 1.10 | 1.90366 | 31.32 | 0.595 |
| 12 | 23.820 | 4.50 | 1.61800 | 63.33 | 0.544 |
| 13 | −13.224 | 0.10 | | | |
| 14* | 20.191 | 4.92 | 1.49700 | 81.61 | 0.538 |
| 15* | −12.021 | 2.06 | | | |
| 16* | 16.842 | 2.97 | 1.58364 | 30.30 | 0.599 |
| 17* | −61.090 | 2.44 | | | |
| 18* | −13.902 | 0.70 | 1.49700 | 81.61 | 0.538 |
| 19* | 22.930 | 2.41 | | | |
| 20* | −7.006 | 0.70 | 1.53368 | 55.90 | 0.563 |
| 21* | 42.359 | 2.70 | | | |
| 22 | ∞ | 0.30 | 1.51640 | 65.06 | 0.535 |
| 23 | ∞ | 0.31 | | | |
| Image plane | ∞ | | | | |

Aspherical surface data

1st surface k = 0.000
A4 = 1.14998e−04

2nd surface k = 0.000
A4 = 1.87722e−04

6th surface k = 0.000
A4 = 7.02747e−05

14th surface k = −0.579
A4 = −8.56059e−05

15th surface k = 0.000
A4 = −4.50576e−05

16th surface k = 0.000
A4 = 6.70751e−05

17th surface k = 0.000
A4 = 3.13794e−05

18th surface k = 0.000
A4 = 3.45712e−04

19th surface k = 0.000
A4 = 3.55414e−04

20th surface k = 0.000
A4 = 2.17628e−04

-continued

Unit mm

21th surface k = 0.000
A4 = −2.39642e−04, A6 = −9.62165e−07

| Various data | |
|---|---|
| NA | 0.21 |
| Magnification | −1.05 |
| Focal length | 8.84 |
| Image height(mm) | 4.92 |
| fb(mm) (in air) | 3.21 |
| Lens total length(mm) (in air) | 43.94 |

Example 16

| Unit mm | | | | | |
|---|---|---|---|---|---|
| Surface data | | | | | |
| Surface no. | r | d | nd | νd | θgf |
| 1* | 44.490 | 2.90 | 1.84666 | 23.77 | 0.620 |
| 2* | 1042.481 | 0.10 | | | |
| 3 | 32.397 | 3.52 | 1.49700 | 81.61 | 0.538 |
| 4 | −23.206 | 0.10 | | | |
| 5 | 14.648 | 3.55 | 1.49700 | 81.61 | 0.538 |
| 6* | −33.420 | 0.10 | | | |
| 7 | 11.152 | 3.61 | 1.61800 | 63.33 | 0.544 |
| 8 | −8.805 | 0.70 | 1.72047 | 34.71 | 0.583 |
| 9 | 5.456 | 0.96 | | | |
| 10(Stop) | ∞ | 0.72 | | | |
| 11 | −9.368 | 0.70 | 1.90366 | 31.32 | 0.595 |
| 12 | 58.101 | 4.03 | 1.61800 | 63.33 | 0.544 |
| 13 | −11.863 | 1.16 | | | |
| 14* | 22.578 | 4.50 | 1.49700 | 81.61 | 0.538 |
| 15* | −10.017 | 1.59 | | | |
| 16* | 33.644 | 3.89 | 1.58364 | 30.30 | 0.599 |
| 17* | −23.118 | 5.88 | | | |
| 18* | −8.960 | 0.70 | 1.53368 | 55.90 | 0.563 |
| 19* | 13.998 | 3.70 | | | |
| 20 | ∞ | 0.30 | 1.51640 | 65.06 | 0.535 |
| 21 | ∞ | 0.31 | | | |
| Image plane | ∞ | | | | |

Aspherical surface data

1st surface k = 0.000
A4 = 9.48776e−05

2nd surface k = 0.000
A4 = 1.31636e−04

6th surface k = 0.000
A4 = 4.63529e−05

14th surface k = −0.579
A4 = −8.09511e−05

15th surface k = 0.000
A4 = 1.88059e−05

16th surface k = 0.000
A4 = −7.81147e−05

-continued

| Unit mm |
|---|
| 17th surface |
| k = 0.000<br>A4 = −1.26355e−05 |
| 18th surface |
| k = 0.000<br>A4 = 2.75080e−04 |
| 19th surface |
| k = 0.000<br>A4 = −4.02076e−04, A6 = 6.67549e−07 |

| Various data | |
|---|---|
| NA | 0.18 |
| Magnification | −1.05 |
| Focal length | 10.48 |
| Image height(mm) | 4.92 |
| fb(mm) (in air) | 4.21 |
| Lens total length(mm) (in air) | 42.91 |

Example 17

Unit mm

Surface data

| Surface no. | r | d | nd | νd | θgf |
|---|---|---|---|---|---|
| 1 | 30.001 | 3.55 | 1.49700 | 81.61 | 0.538 |
| 2 | −20.144 | 0.10 | | | |
| 3 | 14.839 | 2.95 | 1.49700 | 81.61 | 0.538 |
| 4* | −204.753 | 1.38 | | | |
| 5 | 9.541 | 3.61 | 1.61800 | 63.33 | 0.544 |
| 6 | −22.503 | 0.94 | 1.72047 | 34.71 | 0.583 |
| 7 | 5.977 | 1.25 | | | |
| 8(Stop) | ∞ | 1.09 | | | |
| 9 | −7.570 | 1.76 | 1.90366 | 31.32 | 0.595 |
| 10 | −16.099 | 2.78 | 1.61800 | 63.33 | 0.544 |
| 11 | −10.217 | 0.10 | | | |
| 12* | 11.695 | 5.99 | 1.49700 | 81.61 | 0.538 |
| 13* | −15.540 | 1.31 | | | |
| 14* | 26.431 | 2.57 | 1.58364 | 30.30 | 0.599 |
| 15* | 405.879 | 5.84 | | | |
| 16* | −6.493 | 0.70 | 1.53368 | 55.90 | 0.563 |
| 17* | 676.071 | 3.70 | | | |
| 18 | ∞ | 0.30 | 1.51640 | 65.06 | 0.535 |
| 19 | ∞ | 0.31 | | | |
| Image plane | ∞ | | | | |

| Aspherical surface data |
|---|
| 4th surface |
| k = 0.000<br>A4 = 5.71106e−05 |
| 12th surface |
| k = −0.579<br>A4 = 1.53768e−05 |
| 13th surface |
| k = 0.000<br>A4 = 6.02131e−05 |
| 14th surface |
| k = 0.000<br>A4 = −8.63826e−05 |
| 15th surface |
| k = 0.000<br>A4 = −5.74333e−05 |

-continued

| Unit mm |
|---|
| 16th surface |
| k = 0.000<br>A4 = 1.82606e−04 |
| 17th surface |
| k = 0.000<br>A4 = −4.51042e−04, A6 = −1.53697e−06 |

| Various data | |
|---|---|
| NA | 0.20 |
| Magnification | −1.05 |
| Focal length | 10.21 |
| Image height(mm) | 4.92 |
| fb(mm) (in air) | 4.21 |
| Lens total length(mm) (in air) | 40.13 |

Example 18

Unit mm

Surface data

| Surface no. | r | d | nd | νd | θgf |
|---|---|---|---|---|---|
| 1 | 20.000 | 3.41 | 1.49700 | 81.61 | 0.538 |
| 2 | −21.403 | 0.10 | | | |
| 3 | 10.837 | 2.84 | 1.49700 | 81.61 | 0.538 |
| 4* | 419.463 | 0.10 | | | |
| 5 | 29.618 | 2.52 | 1.61800 | 63.33 | 0.544 |
| 6 | −14.040 | 0.70 | 1.72047 | 34.71 | 0.583 |
| 7 | 9.509 | 3.36 | | | |
| 8(Stop) | ∞ | 0.20 | | | |
| 9 | 15.000 | 0.70 | 1.59551 | 39.24 | 0.580 |
| 10 | 4.665 | 2.31 | 1.64769 | 33.79 | 0.594 |
| 11 | 14.569 | 0.75 | | | |
| 12* | 18.814 | 2.92 | 1.49700 | 81.61 | 0.538 |
| 13* | −8.306 | 0.10 | | | |
| 14 | −27.184 | 4.50 | 1.86400 | 40.58 | 0.567 |
| 15 | −13.984 | 0.80 | | | |
| 16 | −10.364 | 2.42 | 1.56384 | 60.67 | 0.540 |
| 17 | 42.568 | 2.09 | | | |
| 18* | −4.588 | 0.88 | 1.53368 | 55.90 | 0.563 |
| 19* | −17.205 | 3.70 | | | |
| 20 | ∞ | 0.30 | 1.51640 | 65.06 | 0.535 |
| 21 | ∞ | 0.31 | | | |
| Image plane | ∞ | | | | |

| Aspherical surface data |
|---|
| 4th surface |
| k = 0.000<br>A4 = 1.96955e−04 |
| 12th surface |
| k = −0.579<br>A4 = 1.16008e−04 |
| 13th surface |
| k = 0.000<br>A4 = 6.10145e−04 |
| 18th surface |
| k = 0.000<br>A4 = 5.15864e−04 |
| 19th surface |
| k = 0.000<br>A4 = −8.95475e−04, A6 = −1.08381e−05 |

-continued

| Unit mm | |
|---|---|
| Various data | |
| NA | 0.15 |
| Magnification | −1.04 |
| Focal length | 8.63 |
| Image height(mm) | 4.92 |
| fb(mm) (in air) | 4.21 |
| Lens total length(mm) (in air) | 34.91 |

Example 19

Unit mm

Surface data

| Surface no. | r | d | nd | vd | θgf |
|---|---|---|---|---|---|
| 1 | 15.792 | 2.15 | 1.60999 | 27.48 | 0.620 |
| 2 | 23.978 | 0.00 | 1001.00000 | −3.45 | 0.296 |
| 3 | 23.978 | 0.20 | 1.63762 | 34.21 | 0.594 |
| 4 | 23.780 | 2.78 | | | |
| 5* | 14.045 | 4.50 | 1.49700 | 81.61 | 0.538 |
| 6 | −93.714 | 0.10 | | | |
| 7 | 12.954 | 2.81 | 1.49700 | 81.61 | 0.538 |
| 8* | 48.862 | 0.93 | | | |
| 9 | 27.146 | 2.74 | 1.61800 | 63.33 | 0.544 |
| 10 | −13.584 | 0.73 | 1.72047 | 34.71 | 0.583 |
| 11 | 18.090 | 1.34 | | | |
| 12(Stop) | 0.02 | | | | |
| 13 | 13.257 | 0.72 | 1.90366 | 31.32 | 0.595 |
| 14 | 5.010 | 1.34 | 1.61800 | 63.33 | 0.544 |
| 15 | 8.118 | 0.75 | | | |
| 16* | 6.148 | 2.11 | 1.49700 | 81.61 | 0.538 |
| 17* | 10.525 | 2.08 | | | |
| 18* | −7.323 | 3.11 | 1.49700 | 81.61 | 0.538 |
| 19* | −7.585 | 0.91 | | | |
| 20* | 14.481 | 3.56 | 1.58364 | 30.30 | 0.599 |
| 21* | −16.233 | 1.90 | | | |
| 22* | −12.939 | 0.71 | 1.49700 | 81.61 | 0.538 |
| 23* | 41.071 | 4.34 | | | |
| 24* | −7.245 | 0.70 | 1.53368 | 55.90 | 0.563 |
| 25* | 54812.275 | 1.21 | | | |
| 26 | ∞ | 0.38 | 1.51640 | 65.06 | 0.535 |
| 27 | ∞ | 0.29 | | | |
| Image plane | ∞ | | | | |

Aspherical surface data

5th surface k = −0.985
A4 = −4.58140e−06

8th surface k = 0.000
A4 = 3.12616e−05

16th surface k = −0.579
A4 = −1.17288e−04

17th surface k = 0.000
A4 = −4.12749e−05

18th surface k = 0.000
A4 = −8.96232e−05

19th surface k = 0.000
A4 = 5.26452e−05

-continued

Unit mm

20th surface k = 0.000
A4 = 3.84196e−05

21th surface k = 0.000
A4 = 6.16533e−05

22th surface k = 0.000
A4 = 1.47300e−04

23th surface k = 0.000
A4 = −6.49627e−05

24th surface k = 0.000
A4 = −5.07397e−05

25th surface k = 0.000
A4 = −5.85345e−04, A6 = 1.30476e−06

| Various data | |
|---|---|
| NA | 0.15 |
| Magnification | −1.00 |
| Focal length | 9.02 |
| Image height(mm) | 4.92 |
| fb(mm) (in air) | 1.75 |
| Lens total length(mm) (in air) | 42.28 |

Example 20

Unit mm

Surface data

| Surface no. | r | d | nd | vd | θgf |
|---|---|---|---|---|---|
| 1* | 32.834 | 2.51 | 1.84666 | 23.77 | 0.620 |
| 2* | −14.478 | 0.74 | | | |
| 3* | −13.008 | 0.70 | 1.58364 | 30.30 | 0.599 |
| 4* | 10.024 | 0.11 | | | |
| 5* | 6.167 | 4.69 | 1.49700 | 81.61 | 0.538 |
| 6* | −9.896 | 0.16 | | | |
| 7 | 14.247 | 2.75 | 1.61800 | 63.33 | 0.544 |
| 8 | −9.168 | 0.89 | 1.72047 | 34.71 | 0.583 |
| 9 | 8.096 | 1.17 | | | |
| 10 (Stop) | ∞ | 1.16 | | | |
| 11 | −9.133 | 0.89 | 1.72047 | 34.71 | 0.583 |
| 12 | 13.575 | 1.99 | 1.61800 | 63.33 | 0.544 |
| 13 | −13.167 | 0.10 | | | |
| 14* | 35.940 | 1.45 | 1.49700 | 81.61 | 0.538 |
| 15* | −35.021 | 0.10 | | | |
| 16* | 9.242 | 1.85 | 1.49700 | 81.61 | 0.538 |
| 17* | 17.291 | 2.09 | | | |
| 18* | 14.145 | 2.00 | 1.63490 | 23.88 | 0.630 |
| 19* | −39.253 | 5.67 | | | |
| 20* | −5.955 | 0.70 | 1.53368 | 55.90 | 0.563 |
| 21* | −14.900 | 2.22 | | | |
| 22* | −5.519 | 0.90 | 1.53368 | 55.90 | 0.563 |
| 23* | −70.863 | 1.20 | | | |
| 24 | ∞ | 0.38 | 1.51640 | 65.06 | 0.535 |
| 25 | ∞ | 0.30 | | | |
| Image plane | ∞ | | | | |

-continued

| Unit mm |
|---|
| Aspherical surface data |
| 1st surface |
| k = 0.000<br>A4 = 1.50492e−04, A6 = −3.54780e−06 |
| 2nd surface |
| k = −2.669<br>A4 = 2.22005e−04, A6 = −2.69213e−06 |
| 3rd surface |
| k = 0.000<br>A4 = 3.10091e−04 |
| 4th surface |
| k = 0.000<br>A4 = −3.25978e−04 |
| 5th surface |
| k = −1.313<br>A4 = −2.31327e−04, A6 = 3.63551e−06 |
| 6th surface |
| k = −1.763<br>A4 = 1.38063e−04, A6 = −2.69269e−07 |
| 14th surface |
| k = −0.579<br>A4 = 1.44838e−04, A6 = −1.01594e−06 |
| 15th surface |
| k = 0.000<br>A4 = 2.79291e−04, A6 = −6.60640e−07 |
| 16th surface |
| k = 0.000<br>A4 = 1.42801e−04, A6 = 2.79003e−07 |
| 17th surface |
| k = 0.000<br>A4 = −1.94371e−04, A6 = 1.98964e−06 |
| 18th surface |
| k = −2.995<br>A4 = 2.02338e−04, A6 = −3.03901e−06 |
| 19th surface |
| k = 0.000<br>A4 = 3.16281e−04, A6 = −2.16676e−06 |
| 20th surface |
| k = 0.000<br>A4 = 1.23235e−03 |
| 21th surface |
| k = 0.000<br>A4 = 7.37586e−04 |
| 22th surface |
| k = 0.000<br>A4 = 1.78231e−04 |
| 23th surface |
| k = −207.247<br>A4 = −9.71403e−04, A6 = −5.03108e−06 |

| Various data | |
|---|---|
| NA | 0.23 |
| Magnification | −1.33 |
| Focal length | 5.76 |
| Image height (mm) | 4.92 |
| fb (mm) (in air) | 1.75 |
| Lens total length (mm) (in air) | 36.60 |

Example 21

Unit mm

Surface data

| Surface no. | r | d | nd | νd | θgf |
|---|---|---|---|---|---|
| 1* | 37.191 | 2.51 | 1.84666 | 23.77 | 0.620 |
| 2* | −60.365 | 0.10 | | | |
| 3* | 45.462 | 0.70 | 1.58364 | 30.30 | 0.599 |
| 4* | 17.208 | 0.10 | | | |
| 5* | 14.316 | 4.65 | 1.49700 | 81.61 | 0.538 |
| 6 | −53.760 | 0.10 | | | |
| 7 | 23.156 | 3.55 | 1.49700 | 81.61 | 0.538 |
| 8* | −23.670 | 0.10 | | | |
| 9 | 22.799 | 2.41 | 1.61800 | 63.33 | 0.544 |
| 10 | −29.442 | 0.70 | 1.72047 | 34.71 | 0.583 |
| 11 | 7.650 | 1.45 | | | |
| 12 (Stop) | ∞ | 1.07 | | | |
| 13 | −25.486 | 0.70 | 1.72047 | 34.71 | 0.583 |
| 14 | 7.699 | 2.32 | 1.61800 | 63.33 | 0.544 |
| 15 | 50.679 | 0.10 | | | |
| 16* | 12.228 | 2.01 | 1.49700 | 81.61 | 0.538 |
| 17* | 98.730 | 16.81 | | | |
| 18* | 31.846 | 6.30 | 1.49700 | 81.61 | 0.538 |
| 19* | −77.563 | 2.03 | | | |
| 20* | 14.198 | 3.25 | 1.63490 | 23.88 | 0.630 |
| 21* | 201.898 | 4.35 | | | |
| 22* | −12.028 | 0.70 | 1.53368 | 55.90 | 0.563 |
| 23* | 20.065 | 1.37 | | | |
| 24* | 34.840 | 0.70 | 1.53368 | 55.90 | 0.563 |
| 25* | 16.829 | 1.23 | | | |
| 26 | ∞ | 0.38 | 1.51640 | 65.06 | 0.535 |
| 27 | ∞ | 0.30 | | | |
| Image plane | ∞ | | | | |

| Aspherical surface data |
|---|
| 1st surface |
| k = 0.000<br>A4 = −2.94380e−05 |
| 2nd surface |
| k = −32.935<br>A4 = 6.14622e−06 |
| 3rd surface |
| k = 0.000<br>A4 = −1.75346e−07 |
| 4th surface |
| k = 0.000<br>A4 = −4.72517e−05 |
| 5th surface |
| k = −0.524<br>A4 = −1.41649e−05 |
| 8th surface |
| k = −7.887<br>A4 = 1.22953e−05 |
| 16th surface |
| k = −0.579<br>A4 = 2.95007e−05 |
| 17th surface |
| k = 0.000<br>A4 = −2.68357e−05 |
| 18th surface |
| k = 0.000<br>A4 = 6.31745e−05 |
| 19th surface |
| k = 0.000<br>A4 = 1.15528e−04 |

-continued

| Unit mm |
|---|
| 20th surface |
| k = 0.000<br>A4 = 6.62069e−06 |
| 21th surface |
| k = 0.000<br>A4 = −5.81516e−05 |
| 22th surface |
| k = 0.000<br>A4 = 1.13853e−04 |
| 23th surface |
| k = 0.000<br>A4 = −1.70151e−04 |
| 24th surface |
| k = 0.000<br>A4 = −3.46508e−04 |
| 25th surface |
| k = 0.000<br>A4 = −8.40323e−05 |

| Various data | |
|---|---|
| NA | 0.23 |
| Magnification | −1.33 |
| Focal length | 11.95 |
| Image height (mm) | 4.92 |
| fb (mm) (in air) | 1.78 |
| Lens total length (mm) (in air) | 59.87 |

Example 22

Unit mm

Surface data

| Surface no. | r | d | nd | νd | θgf |
|---|---|---|---|---|---|
| 1* | 19.718 | 2.47 | 1.84666 | 23.77 | 0.620 |
| 2* | 57.140 | 0.10 | | | |
| 3 | 28.082 | 0.70 | 1.65412 | 39.68 | 0.574 |
| 4 | 15.535 | 0.71 | | | |
| 5* | 16.135 | 3.81 | 1.49700 | 81.61 | 0.538 |
| 6 | −111.432 | 0.10 | | | |
| 7 | 12.560 | 3.28 | 1.49700 | 81.61 | 0.538 |
| 8* | 9264.110 | 0.10 | | | |
| 9 | 23.767 | 2.95 | 1.61800 | 63.33 | 0.544 |
| 10 | −17.820 | 0.70 | 1.72047 | 34.71 | 0.583 |
| 11 | 14.919 | 0.94 | | | |
| 12 (Stop) | ∞ | −0.22 | | | |
| 13 | 36.855 | 0.70 | 1.90366 | 31.32 | 0.595 |
| 14 | 6.199 | 2.19 | 1.61800 | 63.33 | 0.544 |
| 15 | 13.800 | 0.10 | | | |
| 16* | 7.064 | 3.86 | 1.49700 | 81.61 | 0.538 |
| 17* | −1661.525 | 5.38 | | | |
| 18* | −7.343 | 0.70 | 1.49700 | 81.61 | 0.538 |
| 19* | 26.316 | 2.07 | | | |
| 20* | 14.001 | 4.50 | 1.58364 | 30.30 | 0.599 |
| 21* | −8.579 | 3.08 | | | |
| 22* | −9.265 | 0.70 | 1.49700 | 81.61 | 0.538 |
| 23* | 10.893 | 2.23 | | | |
| 24* | −15.074 | 1.42 | 1.53368 | 55.90 | 0.563 |
| 25* | −20.788 | 0.76 | | | |
| 26 | ∞ | 0.38 | 1.51640 | 65.06 | 0.535 |
| 27 | ∞ | 0.30 | | | |
| Image plane | ∞ | | | | |

-continued

| Unit mm |
|---|
| Aspherical surface data |
| 1st surface |
| k = 0.000<br>A4 = 4.20748e−06 |
| 2nd surface |
| k = 0.000<br>A4 = 1.02174e−05 |
| 5th surface |
| k = 0.362<br>A4 = −1.39316e−06 |
| 8th surface |
| k = 0.000<br>A4 = 7.34221e−05 |
| 16th surface |
| k = −0.579<br>A4 = −1.11345e−04 |
| 17th surface |
| k = 0.000<br>A4 = −3.97260e−04 |
| 18th surface |
| k = 0.000<br>A4 = 3.14959e−04 |
| 19th surface |
| k = 0.000<br>A4 = 9.18979e−04 |
| 20th surface |
| k = 0.000<br>A4 = −3.01972e−04 |
| 21th surface |
| k = 0.000<br>A4 = 1.22286e−04 |
| 22th surface |
| k = 0.000<br>A4 = 3.61097e−10 |
| 23th surface |
| k = 0.000<br>A4 = −2.33784e−10 |
| 24th surface |
| k = 0.000<br>A4 = 7.88303e−11 |
| 25th surface |
| k = 0.000<br>A4 = −9.83303e−04, A6 = −4.80768e−06 |

| Various data | |
|---|---|
| NA | 0.23 |
| Magnification | −1.33 |
| Focal length | 9.09 |
| Image height (mm) | 4.92 |
| fb (mm) (in air) | 1.31 |
| Lens total length (mm) (in air) | 43.88 |

Example 23

| Unit mm | | | | | |
|---|---|---|---|---|---|
| Surface data | | | | | |
| Surface no. | r | d | nd | νd | θgf |
| 1 | 21.347 | 0.70 | 1.83400 | 37.16 | 0.577 |
| 2 | 19.857 | 2.68 | 1.84666 | 23.77 | 0.620 |
| 3 | 82.525 | 0.10 | | | |
| 4 | 28.223 | 0.70 | 1.65412 | 39.68 | 0.574 |
| 5 | 13.598 | 0.10 | | | |
| 6* | 13.218 | 4.13 | 1.49700 | 81.61 | 0.538 |
| 7 | −426.276 | 0.10 | | | |
| 8 | 12.661 | 3.24 | 1.49700 | 81.61 | 0.538 |
| 9* | −620.123 | 0.10 | | | |
| 10 | 23.276 | 3.03 | 1.61800 | 63.33 | 0.544 |
| 11 | −15.973 | 0.70 | 1.72047 | 34.71 | 0.583 |
| 12 | 14.351 | 0.94 | | | |
| 13 (Stop) | ∞ | −0.12 | | | |
| 14 | 52.229 | 0.70 | 1.90366 | 31.32 | 0.595 |
| 15 | 6.517 | 2.05 | 1.61800 | 63.33 | 0.544 |
| 16 | 14.011 | 0.10 | | | |
| 17* | 7.279 | 3.70 | 1.49700 | 81.61 | 0.538 |
| 18* | −52.147 | 6.22 | | | |
| 19* | −8.485 | 0.70 | 1.49700 | 81.61 | 0.538 |
| 20* | 18.496 | 2.19 | | | |
| 21* | 16.238 | 3.38 | 1.58364 | 30.30 | 0.599 |
| 22* | −8.208 | 3.48 | | | |
| 23* | −14.030 | 0.80 | 1.49700 | 81.61 | 0.538 |
| 24* | 10.694 | 2.34 | | | |
| 25* | −13.561 | 0.70 | 1.53368 | 55.90 | 0.563 |
| 26* | −32.525 | 1.56 | | | |
| 27 | ∞ | 0.38 | 1.51640 | 65.06 | 0.535 |
| 28 | ∞ | 0.30 | | | |
| Image plane | ∞ | | | | |

Aspherical surface data

6th surface k = 0.102
A4 = −3.11348e−06

9th surface k = 0.000
A4 = 7.09963e−05

17th surface k = −0.579
A4 = −1.62833e−04

18th surface k = 0.000
A4 = −2.59299e−04

19th surface k = 0.000
A4 = 2.69659e−05

20th surface k = 0.000
A4 = 5.59803e−04

21th surface k = 0.000
A4 = −2.63419e−04

22th surface k = 0.000
A4 = 1.85257e−04

23th surface k = 0.000
A4 = 1.30466e−10

-continued

Unit mm

24th surface k = 0.000
A4 = −4.02512e−11

25th surface k = 0.000
A4 = 1.98197e−11

26th surface k = 0.000
A4 = −7.91121e−04, A6 = −7.74500e−06

| Various data | |
|---|---|
| NA | 0.23 |
| Magnification | −1.33 |
| Focal length | 8.95 |
| Image height (mm) | 4.92 |
| fb (mm) (in air) | 2.12 |
| Lens total length (mm) (in air) | 44.87 |

Example 24

| Unit mm | | | | | |
|---|---|---|---|---|---|
| Surface data | | | | | |
| Surface no. | r | d | nd | νd | θgf |
| 1* | 29.347 | 3.01 | 1.84666 | 23.77 | 0.620 |
| 2* | −36.004 | 0.10 | | | |
| 3 | −397.741 | 0.70 | 1.65412 | 39.68 | 0.574 |
| 4 | 21.124 | 0.10 | | | |
| 5* | 19.426 | 4.27 | 1.49700 | 81.61 | 0.538 |
| 6 | −31.982 | 0.10 | | | |
| 7 | 20.342 | 3.53 | 1.49700 | 81.61 | 0.538 |
| 8* | −22.961 | 0.10 | | | |
| 9 | −172.666 | 2.93 | 1.61800 | 63.33 | 0.544 |
| 10 | −11.505 | 0.70 | 1.72047 | 34.71 | 0.583 |
| 11 | 24.226 | 0.79 | | | |
| 12 (Stop) | ∞ | 0.17 | | | |
| 13 | −243.374 | 0.70 | 1.90366 | 31.32 | 0.595 |
| 14 | 9.660 | 3.41 | 1.61800 | 63.33 | 0.544 |
| 15 | −43.351 | 0.10 | | | |
| 16* | 11.180 | 4.50 | 1.49700 | 81.61 | 0.538 |
| 17* | −10186.757 | 8.48 | | | |
| 18* | 719.997 | 0.70 | 1.49700 | 81.61 | 0.538 |
| 19* | 13.006 | 6.32 | | | |
| 20* | 13.192 | 3.44 | 1.58364 | 30.30 | 0.599 |
| 21* | −15.080 | 3.70 | | | |
| 22* | −9.430 | 0.81 | 1.49700 | 81.61 | 0.538 |
| 23* | 10.877 | 2.39 | | | |
| 24* | −10.747 | 0.51 | 1.53368 | 55.90 | 0.563 |
| 25* | −3339.876 | 1.95 | | | |
| 26 | ∞ | 0.38 | 1.51640 | 65.06 | 0.535 |
| 27 | ∞ | 0.30 | | | |
| Image plane | ∞ | | | | |

Aspherical surface data

1st surface k = 0.000
A4 = 1.00145e−05

2nd surface k = 0.000
A4 = 4.66734e−05

5th surface k = 0.699
A4 = 2.24508e−05

-continued

| Unit mm |
|---|
| 8th surface |
| k = 0.000<br>A4 = 8.05284e−05 |
| 16th surface |
| k = −0.579<br>A4 = 7.50799e−06 |
| 17th surface |
| k = 0.000<br>A4 = −8.03928e−05 |
| 18th surface |
| k = 0.000<br>A4 = −2.62042e−04 |
| 19th surface |
| k = 0.000<br>A4 = 2.02927e−08 |
| 20th surface |
| k = 0.000<br>A4 = 1.22996e−05 |
| 21th surface |
| k = 0.000<br>A4 = 1.31433e−04 |
| 22th surface |
| k = 0.000<br>A4 = 1.29005e−10 |
| 23th surface |
| k = 0.000<br>A4 = −8.96164e−11 |
| 24th surface |
| k = 0.000<br>A4 = 3.63415e−11 |
| 25th surface |
| k = 0.000<br>A4 = −8.06302e−04, A6 = −6.85664e−06 |

| Various data | |
|---|---|
| NA | 0.38 |
| Magnification | −2.20 |
| Focal length | 5.02 |
| Image height (mm) | 4.92 |
| fb (mm) (in air) | 2.50 |
| Lens total length (mm) (in air) | 54.08 |

Example 25

Unit mm

Surface data

| Surface no. | r | d | nd | νd | θgf |
|---|---|---|---|---|---|
| 1* | 32.463 | 2.90 | 1.84666 | 23.77 | 0.620 |
| 2* | −21.826 | 0.10 | | | |
| 3 | −115.439 | 0.70 | 1.65412 | 39.68 | 0.574 |
| 4 | 19.615 | 0.71 | | | |
| 5* | 22.162 | 3.86 | 1.49700 | 81.61 | 0.538 |
| 6 | −24.111 | 0.10 | | | |
| 7 | 34.797 | 3.13 | 1.49700 | 81.61 | 0.538 |
| 8* | −16.663 | 0.10 | | | |
| 9 | −45.805 | 3.04 | 1.61800 | 63.33 | 0.544 |
| 10 | −9.473 | 0.70 | 1.72047 | 34.71 | 0.583 |
| 11 | 97.538 | 0.68 | | | |
| 12 (Stop) | ∞ | 0.42 | | | |
| 13 | 213.328 | 0.70 | 1.90366 | 31.32 | 0.595 |
| 14 | 9.662 | 3.29 | 1.61800 | 63.33 | 0.544 |
| 15 | −95.685 | 0.10 | | | |
| 16* | 11.359 | 4.50 | 1.49700 | 81.61 | 0.538 |
| 17* | 192.634 | 12.20 | | | |
| 18* | −46.287 | 0.70 | 1.49700 | 81.61 | 0.538 |
| 19* | 55.888 | 3.89 | | | |
| 20* | 15.242 | 3.43 | 1.58364 | 30.30 | 0.599 |
| 21* | −12.872 | 3.53 | | | |
| 22* | −9.883 | 0.70 | 1.49700 | 81.61 | 0.538 |
| 23* | 10.330 | 2.47 | | | |
| 24* | −8.858 | 0.47 | 1.53368 | 55.90 | 0.563 |
| 25* | 38.821 | 2.50 | | | |
| 26 | ∞ | 0.30 | 1.51640 | 65.06 | 0.535 |
| 27 | ∞ | 0.30 | | | |
| Image plane | ∞ | | | | |

| Aspherical surface data |
|---|
| 1st surface |
| k = 0.000<br>A4 = −8.60855e−06 |
| 2nd surface |
| k = 0.000<br>A4 = 5.67857e−05 |
| 5th surface |
| k = −0.732<br>A4 = 8.88649e−05 |
| 8th surface |
| k = 0.000<br>A4 = 9.71863e−05 |
| 16th surface |
| k = −0.579<br>A4 = 3.62332e−05 |
| 17th surface |
| k = 0.000<br>A4 = −4.68359e−05 |
| 18th surface |
| k = 0.000<br>A4 = −3.90596e−04 |
| 19th surface |
| k = 0.000<br>A4 = 5.65832e−09 |
| 20th surface |
| k = 0.000<br>A4 = 1.29627e−04 |
| 21th surface |
| k = 0.000<br>A4 = 2.61604e−04 |
| 22th surface |
| k = 0.000<br>A4 = 6.73337e−11 |
| 23th surface |
| k = 0.000<br>A4 = −2.85935e−10 |
| 24th surface |
| k = 0.000<br>A4 = −1.78374e−11 |
| 25th surface |
| k = 0.000<br>A4 = −1.17807e−03, A6 = −1.38777e−06 |

| Unit mm | |
|---|---|
| **Various data** | |
| NA | 0.43 |
| Magnification | −2.55 |
| Focal length | 4.06 |
| Image height (mm) | 4.92 |
| fb (mm) (in air) | 3.00 |
| Lens total length (mm) (in air) | 55.41 |

Example 26

Unit mm

Surface data

| Surface no. | r | d | nd | νd | θgf |
|---|---|---|---|---|---|
| 1* | 35.723 | 2.54 | 1.84666 | 23.77 | 0.620 |
| 2* | −51.097 | 0.10 | | | |
| 3 | 36.176 | 0.71 | 1.65412 | 39.68 | 0.574 |
| 4 | 20.906 | 0.70 | | | |
| 5* | 23.037 | 3.88 | 1.49700 | 81.61 | 0.538 |
| 6 | −48.688 | 0.10 | | | |
| 7 | 28.972 | 4.09 | 1.49700 | 81.61 | 0.538 |
| 8* | −14.465 | 0.10 | | | |
| 9 | −30.479 | 2.71 | 1.61800 | 63.33 | 0.544 |
| 10 | −11.008 | 0.70 | 1.72047 | 34.71 | 0.583 |
| 11 | −45.001 | 0.00 | | | |
| 12(Stop) | ∞ | 0.36 | | | |
| 13 | 142.278 | 0.70 | 1.90366 | 31.32 | 0.595 |
| 14 | 7.974 | 3.29 | 1.61800 | 63.33 | 0.544 |
| 15 | 42.037 | 0.10 | | | |
| 16* | 9.420 | 4.50 | 1.49700 | 81.61 | 0.538 |
| 17* | 50.449 | 11.08 | | | |
| 18* | −10.686 | 0.70 | 1.49700 | 81.61 | 0.538 |
| 19* | 14.658 | 2.13 | | | |
| 20* | 8.921 | 3.26 | 1.58364 | 30.30 | 0.599 |
| 21* | −11.441 | 2.20 | | | |
| 22* | −6.836 | 0.70 | 1.49700 | 81.61 | 0.538 |
| 23* | 17.063 | 2.85 | | | |
| 24* | −7.530 | 1.89 | 1.53368 | 55.90 | 0.563 |
| 25* | −23.262 | 1.20 | | | |
| 26 | ∞ | 0.30 | 1.51640 | 65.06 | 0.535 |
| 27 | ∞ | 0.31 | | | |
| Image plane | ∞ | | | | |

Aspherical surface data

1st surface k = 0.000
A4 = 2.15858e−05

2nd surface k = 0.000
A4 = 5.89518e−05

5th surface k = 1.031
A4 = 4.92091e−05

8th surface k = 0.000
A4 = 1.43893e−04

16th surface k = −0.579
A4 = 1.23991e−05

17th surface k = 0.000
A4 = −1.44605e−04

Unit mm

18th surface k = 0.000
A4 = −9.44986e−05

19th surface k = 0.000
A4 = 2.20099e−08

20th surface k = 0.000
A4 = −2.09970e−04

21th surface k = 0.000
A4 = 1.31063e−04

22th surface k = 0.000
A4 = −4.92137e−11

23th surface k = 0.000
A4 = −3.04317e−10

24th surface k = 0.000
A4 = −4.31877e−12

25th surface k = 0.000
A4 = −1.03058e−03, A6 = −5.12548e−06

| Various data | |
|---|---|
| NA | 0.40 |
| Magnification | −2.55 |
| Focal length | 4.53 |
| Image height (mm) | 4.92 |
| fb (mm) (in air) | 1.71 |
| Lens total length (mm) (in air) | 51.12 |

Example 27

Unit mm

Surface data

| Surface no. | r | d | nd | νd | θgf |
|---|---|---|---|---|---|
| 1* | 35.661 | 2.32 | 1.84666 | 23.77 | 0.620 |
| 2* | −73.499 | 0.43 | | | |
| 3* | 34.183 | 4.48 | 1.49700 | 81.61 | 0.538 |
| 4 | −54.877 | 0.10 | | | |
| 5 | 25.768 | 4.00 | 1.49700 | 81.61 | 0.538 |
| 6* | −15.284 | 0.10 | | | |
| 7 | −32.854 | 2.97 | 1.61800 | 63.33 | 0.544 |
| 8 | −10.053 | 0.70 | 1.72047 | 34.71 | 0.583 |
| 9 | −46.051 | 0.05 | | | |
| 10(Stop) | ∞ | 0.47 | | | |
| 11 | 635.573 | 0.70 | 1.90366 | 31.32 | 0.595 |
| 12 | 8.195 | 3.10 | 1.61800 | 63.33 | 0.544 |
| 13 | 42.918 | 0.10 | | | |
| 14* | 9.414 | 4.50 | 1.49700 | 81.61 | 0.538 |
| 15* | 63.321 | 11.58 | | | |
| 16* | −9.781 | 0.70 | 1.49700 | 81.61 | 0.538 |
| 17* | 27.718 | 2.51 | | | |
| 18* | 9.851 | 3.31 | 1.58364 | 30.30 | 0.599 |
| 19* | −11.040 | 2.20 | | | |
| 20* | −7.575 | 0.70 | 1.49700 | 81.61 | 0.538 |
| 21* | 13.961 | 2.79 | | | |
| 22* | −8.162 | 1.28 | 1.53368 | 55.90 | 0.563 |
| 23* | −48.156 | 1.52 | | | |

-continued

| Unit mm | | | | | |
|---|---|---|---|---|---|
| 24 | ∞ | 0.30 | 1.51640 | 65.06 | 0.535 |
| 25 | ∞ | 0.31 | | | |
| Image plane | ∞ | | | | |

Aspherical surface data

1st surface k = 0.000
A4 = 3.30814e−05

2nd surface k = 0.000
A4 = 7.07042e−05

3rd surface k = 7.049
A4 = 5.92848e−05

6th surface k = 0.000
A4 = 1.66928e−04

14th surface k = −0.579
A4 = 1.76892e−05

15th surface k = 0.000
A4 = −1.15869e−04

16th surface k = 0.000
A4 = −1.90405e−04

17th surface k = 0.000
A4 = 4.29668e−08

18th surface k = 0.000
A4 = −1.26564e−04

19th surface k = 0.000
A4 = 2.29008e−04

20th surface k = 0.000
A4 = −5.43091e−12

21th surface k = 0.000
A4 = −1.28275e−10

22th surface k = 0.000
A4 = −4.59881e−11

23th surface k = 0.000
A4 = −1.00347e−03, A6 = −7.29887e−06

Various data

| | |
|---|---|
| NA | 0.40 |
| Magnification | −2.55 |
| Focal length | 4.30 |
| Image height (mm) | 4.92 |
| fb (mm) (in air) | 2.02 |
| Lens total length (mm) (in air) | 51.12 |

Example 28

Unit mm

Surface data

| Surface no. | r | d | nd | νd | θgf |
|---|---|---|---|---|---|
| 1* | 26.126 | 2.52 | 1.84666 | 23.77 | 0.620 |
| 2* | 156.726 | 0.44 | | | |
| 3* | 19.398 | 3.22 | 1.49700 | 81.61 | 0.538 |
| 4 | 668.362 | 0.10 | | | |
| 5 | 22.441 | 4.29 | 1.49700 | 81.61 | 0.538 |
| 6* | −18.521 | 0.10 | | | |
| 7 | −32.011 | 3.31 | 1.61800 | 63.33 | 0.544 |
| 8 | −10.629 | 0.70 | 1.72047 | 34.71 | 0.583 |
| 9 | −32.981 | −0.18 | | | |
| 10(Stop) | ∞ | 0.91 | | | |
| 11 | −54.468 | 0.70 | 1.90366 | 31.32 | 0.595 |
| 12 | 10.084 | 3.88 | 1.61800 | 63.33 | 0.544 |
| 13 | −38.832 | 5.09 | | | |
| 14* | 11.830 | 4.50 | 1.49700 | 81.61 | 0.538 |
| 15* | 32.748 | 6.33 | | | |
| 16* | −51.536 | 0.70 | 1.49700 | 81.61 | 0.538 |
| 17* | −5076.695 | 1.50 | | | |
| 18* | 16.498 | 4.50 | 1.58364 | 30.30 | 0.599 |
| 19* | −18.479 | 2.95 | | | |
| 20* | −13.897 | 0.70 | 1.49700 | 81.61 | 0.538 |
| 21* | 14.288 | 2.43 | | | |
| 22* | −9.910 | 0.50 | 1.53368 | 55.90 | 0.563 |
| 23* | 19.020 | 1.20 | | | |
| 24 | ∞ | 0.30 | 1.51640 | 65.06 | 0.535 |
| 25 | ∞ | 0.31 | | | |
| Image plane | ∞ | | | | |

Aspherical surface data

1st surface k = 0.000
A4 = 4.45476e−05

2nd surface k = 0.000
A4 = 4.21609e−05

3rd surface k = 1.630
A4 = −6.68631e−05

6th surface k = 0.000
A4 = 1.02748e−04

14th surface k = −0.579
A4 = −5.95923e−05

15th surface k = 0.000
A4 = −1.92311e−04

16th surface k = 0.000
A4 = −2.60712e−04

17th surface k = 0.000
A4 = 3.61925e−09

18th surface k = 0.000
A4 = 6.14546e−07

19th surface k = 0.000
A4 = 8.97691e−05

| Unit mm |
|---|
| 20th surface |
| k = 0.000<br>A4 = 7.96105e−11 |
| 21th surface |
| k = 0.000<br>A4 = 1.79636e−10 |
| 22th surface |
| k = 0.000<br>A4 = 2.08521e−10 |
| 23th surface |
| k = 0.000<br>A4 = −7.36017e−04, A6 = 1.85128e−08 |

| Various data | |
|---|---|
| NA | 0.40 |
| Magnification | −1.60 |
| Focal length | 5.39 |
| Image height (mm) | 4.92 |
| fb (mm) (in air) | 1.71 |
| Lens total length (mm) (in air) | 50.89 |

Example 29

Unit mm

Surface data

| Surface no. | r | d | nd | νd | θgf |
|---|---|---|---|---|---|
| 1* | 25.723 | 3.03 | 1.84666 | 23.77 | 0.620 |
| 2* | 149.616 | 0.54 | | | |
| 3* | 19.523 | 3.74 | 1.49700 | 81.61 | 0.538 |
| 4 | 156.580 | 0.10 | | | |
| 5 | 20.438 | 3.50 | 1.49700 | 81.61 | 0.538 |
| 6* | −18.183 | 0.15 | | | |
| 7 | −28.405 | 3.65 | 1.61800 | 63.33 | 0.544 |
| 8 | −10.074 | 0.70 | 1.72047 | 34.71 | 0.583 |
| 9 | −29.736 | 0.03 | | | |
| 10(Stop) | ∞ | 0.98 | | | |
| 11 | −37.887 | 0.70 | 1.90366 | 31.32 | 0.595 |
| 12 | 10.973 | 3.19 | 1.61800 | 63.33 | 0.544 |
| 13 | −29.734 | 5.20 | | | |
| 14* | 11.850 | 4.46 | 1.49700 | 81.61 | 0.538 |
| 15* | 32.907 | 6.37 | | | |
| 16* | −43.174 | 0.70 | 1.49700 | 81.61 | 0.538 |
| 17* | −583.895 | 1.39 | | | |
| 18* | 16.200 | 4.17 | 1.58364 | 30.30 | 0.599 |
| 19* | −16.507 | 2.96 | | | |
| 20* | −13.189 | 0.70 | 1.49700 | 81.61 | 0.538 |
| 21* | 14.167 | 2.41 | | | |
| 22* | −9.282 | 0.50 | 1.53368 | 55.90 | 0.563 |
| 23* | 18.028 | 1.20 | | | |
| 24 | ∞ | 0.30 | 1.51640 | 65.06 | 0.535 |
| 25 | ∞ | 0.31 | | | |
| Image plane | ∞ | | | | |

| Aspherical surface data |
|---|
| 1st surface |
| k = 0.000<br>A4 = 4.82416e−05 |
| 2nd surface |
| k = 0.000<br>A4 = 4.12737e−05 |

| Unit mm |
|---|
| 3rd surface |
| k = 1.920<br>A4 = −6.92724e−05 |
| 6th surface |
| k = 0.000<br>A4 = 1.06996e−04 |
| 14th surface |
| k = −0.579<br>A4 = −5.87534e−05 |
| 15th surface |
| k = 0.000<br>A4 = −1.97727e−04 |
| 16th surface |
| k = 0.000<br>A4 = −3.03525e−04 |
| 17th surface |
| k = 0.000<br>A4 = 2.27302e−08 |
| 18th surface |
| k = 0.000<br>A4 = 1.91296e−05 |
| 19th surface |
| k = 0.000<br>A4 = 1.02712e−04 |
| 20th surface |
| k = 0.000<br>A4 = 9.87048e−11 |
| 21th surface |
| k = 0.000<br>A4 = 9.22769e−11 |
| 22th surface |
| k = 0.000<br>A4 = 9.06991e−11 |
| 23th surface |
| k = 0.000<br>A4 = −8.67255e−04, A6 = 8.57757e−07 |

| Various data | |
|---|---|
| NA | 0.31 |
| Magnification | −1.56 |
| Focal length | 5.41 |
| Image height (mm) | 4.92 |
| fb (mm) (in air) | 1.70 |
| Lens total length (mm) (in air) | 50.87 |

Example 30

Unit mm

Surface data

| Surface no. | r | d | nd | νd | θgf |
|---|---|---|---|---|---|
| 1* | 19.930 | 3.24 | 1.84666 | 23.77 | 0.620 |
| 2* | 61.126 | 0.64 | | | |
| 3* | 20.022 | 2.36 | 1.49700 | 81.61 | 0.538 |
| 4 | 64.679 | 0.10 | | | |
| 5 | 14.877 | 3.79 | 1.49700 | 81.61 | 0.538 |
| 6* | −20.728 | 0.44 | | | |
| 7 | −22.514 | 2.78 | 1.61800 | 63.33 | 0.544 |

-continued

| Unit mm | | | | | |
|---|---|---|---|---|---|
| 8 | −8.591 | 0.70 | 1.72047 | 34.71 | 0.583 |
| 9 | −28.840 | 0.09 | | | |
| 10(Stop) | ∞ | 0.69 | | | |
| 11 | −75.968 | 0.70 | 1.90366 | 31.32 | 0.595 |
| 12 | 10.025 | 3.17 | 1.61800 | 63.33 | 0.544 |
| 13 | −47.134 | 7.43 | | | |
| 14* | 11.048 | 4.18 | 1.49700 | 81.61 | 0.538 |
| 15* | 29.122 | 8.18 | | | |
| 16* | 16.083 | 3.74 | 1.58364 | 30.30 | 0.599 |
| 17* | −23.253 | 3.00 | | | |
| 18* | −11.275 | 0.70 | 1.49700 | 81.61 | 0.538 |
| 19* | 22.496 | 2.40 | | | |
| 20* | −8.030 | 0.70 | 1.53368 | 55.90 | 0.563 |
| 21* | 19.993 | 1.20 | | | |
| 22 | ∞ | 0.30 | 1.51640 | 65.06 | 0.535 |
| 23 | ∞ | 0.31 | | | |
| Image plane | ∞ | | | | |

Aspherical surface data

1st surface k = 0.000
A4 = 5.96209e−05

2nd surface k = 0.000
A4 = 4.52358e−05

3rd surface k = 3.494
A4 = −1.04703e−04

6th surface k = 0.000
A4 = 1.16629e−04

14th surface k = −0.579
A4 = −1.22009e−05

15th surface k = 0.000
A4 = 9.35253e−06

16th surface k = 0.000
A4 = −4.21205e−05

17th surface k = 0.000
A4 = 3.29945e−05

18th surface k = 0.000
A4 = 2.14586e−04

19h surface k = 0.000
A4 = 2.96805e−04

20th surface k = 0.000
A4 = 8.17176e−05

21th surface k = 0.000
A4 = −6.90519e−04, A6 = 7.86063e−07

Various data

| | |
|---|---|
| NA | 0.31 |
| Magnification | −1.55 |
| Focal length | 5.52 |
| Image height (mm) | 4.92 |

-continued

Unit mm

| | |
|---|---|
| fb (mm) (in air) | 1.70 |
| Lens total length (mm) (in air) | 50.72 |

Example 31

Unit mm

Surface data

| Surface no. | r | d | nd | νd | θgf |
|---|---|---|---|---|---|
| 1* | 22.255 | 1.40 | 1.84666 | 23.77 | 0.620 |
| 2* | 49.454 | 0.10 | | | |
| 3* | 15.934 | 1.56 | 1.49700 | 81.61 | 0.538 |
| 4 | 49.074 | 0.10 | | | |
| 5 | 8.678 | 2.60 | 1.49700 | 81.61 | 0.538 |
| 6* | 24.865 | 0.10 | | | |
| 7 | 16.464 | 2.59 | 1.62041 | 60.29 | 0.543 |
| 8 | −16.180 | 0.71 | 1.72047 | 34.71 | 0.583 |
| 9 | 20.086 | 0.50 | | | |
| 10(Stop) | ∞ | −0.14 | | | |
| 11 | 16.335 | 0.77 | 1.90366 | 31.32 | 0.595 |
| 12 | 4.955 | 2.54 | 1.62041 | 60.29 | 0.543 |
| 13 | 13.367 | 0.10 | | | |
| 14* | 8.375 | 3.54 | 1.49700 | 81.61 | 0.538 |
| 15* | 12.841 | 5.26 | | | |
| 16* | 18.465 | 1.08 | 1.49700 | 81.61 | 0.538 |
| 17* | 20.987 | 1.60 | | | |
| 18* | 17.258 | 3.54 | 1.58364 | 30.30 | 0.599 |
| 19* | −13.619 | 2.16 | | | |
| 20* | −7.110 | 0.80 | 1.49700 | 81.61 | 0.538 |
| 21* | 6.864 | 4.38 | | | |
| 22* | 38.244 | 1.35 | 1.53368 | 55.90 | 0.563 |
| 23* | 40.675 | 1.79 | | | |
| 24 | ∞ | 0.38 | 1.51640 | 65.06 | 0.535 |
| 25 | ∞ | 0.31 | | | |
| Image plane | ∞ | | | | |

Aspherical surface data

1st surface k = 0.000
A4 = 9.39832e−05

2nd surface k = 0.000
A4 = 2.63124e−05

3rd surface k = 1.034
A4 = −8.38701e−05

6th surface k = 0.000
A4 = 2.34844e−04

14th surface k = −0.579
A4 = −1.61090e−04

15th surface k = 0.000
A4 = 9.62591e−05

16th surface k = 0.000
A4 = −2.20378e−04

17th surface k = 0.000
A4 = 1.44465e−04

-continued

| Unit mm |
|---|
| 18th surface |
| k = 0.000<br>A4 = 5.22295e−05 |
| 19th surface |
| k = 0.000<br>A4 = −1.67837e−04 |
| 20th surface |
| k = 0.000<br>A4 = 2.06606e−04 |
| 21th surface |
| k = 0.000<br>A4 = −1.79135e−04 |
| 22th surface |
| k = 0.000<br>A4 = −1.13764e−04 |
| 23th surface |
| k = 0.000<br>A4 = −6.19905e−04, A6 = −1.16506e−05 |

| Various data | |
|---|---|
| NA | 0.20 |
| Magnification | −2.00 |
| Focal length | 6.48 |
| Image height (mm) | 4.92 |
| fb (mm) (in air) | 2.35 |
| Lens total length (mm) (in air) | 38.99 |

Example 32

Unit mm

Surface data

| Surface no. | r | d | nd | νd | θgf |
|---|---|---|---|---|---|
| 1* | 18.031 | 1.98 | 1.84666 | 23.77 | 0.620 |
| 2* | 33.383 | 0.30 | | | |
| 3* | 14.122 | 2.63 | 1.49700 | 81.61 | 0.538 |
| 4 | 112.900 | 0.10 | | | |
| 5 | 10.797 | 2.81 | 1.49700 | 81.61 | 0.538 |
| 6* | 43.886 | 0.22 | | | |
| 7 | 23.680 | 2.64 | 1.61800 | 63.33 | 0.544 |
| 8 | −13.093 | 0.70 | 1.72047 | 34.71 | 0.583 |
| 9 | 24.412 | 0.49 | | | |
| 10(Stop) | ∞ | −0.33 | | | |
| 11 | 21.319 | 0.72 | 1.90366 | 31.32 | 0.595 |
| 12 | 5.225 | 2.41 | 1.61800 | 63.33 | 0.544 |
| 13 | 10.578 | 0.10 | | | |
| 14* | 7.000 | 3.27 | 1.49700 | 81.61 | 0.538 |
| 15* | 8.979 | 9.72 | | | |
| 16* | 11.132 | 4.18 | 1.58364 | 30.30 | 0.599 |
| 17* | −33.189 | 2.46 | | | |
| 18* | −6.616 | 0.73 | 1.49700 | 81.61 | 0.538 |
| 19* | 19.087 | 5.41 | | | |
| 20* | −10.000 | 1.47 | 1.53368 | 55.90 | 0.563 |
| 21* | −8.861 | 2.27 | | | |
| 22 | ∞ | 0.38 | 1.51640 | 65.06 | 0.535 |
| 23 | ∞ | 0.31 | | | |
| Image plane | ∞ | | | | |

| Aspherical surface data |
|---|
| 1st surface |
| k = 0.000<br>A4 = 6.50944e−05 |

-continued

| Unit mm |
|---|
| 2nd surface |
| k = 0.000<br>A4 = 5.45929e−05 |
| 3rd surface |
| k = 0.635<br>A4 = −3.35884e−05 |
| 6th surface |
| k = 0.000<br>A4 = 1.78338e−04 |
| 14th surface |
| k = −0.579<br>A4 = −1.63080e−07 |
| 15th surface |
| k = 0.000<br>A4 = 7.02281e−08 |
| 16th surface |
| k = 0.000<br>A4 = −2.61423e−04 |
| 17th surface |
| k = 0.000<br>A4 = −6.18829e−04 |
| 18th surface |
| k = 0.000<br>A4 = 4.05381e−10 |
| 19th surface |
| k = 0.000<br>A4 = −6.67366e−10 |
| 20th surface |
| k = 0.000<br>A4 = 3.21970e−10 |
| 21th surface |
| k = 0.000<br>A4 = 2.90162e−04, A6 = −7.28026e−06 |

| Various data | |
|---|---|
| NA | 0.23 |
| Magnification | −2.00 |
| Focal length | 10.51 |
| Image height (mm) | 4.92 |
| fb (mm) (in air) | 2.83 |
| Lens total length (mm) (in air) | 44.85 |

Example 33

Unit mm

Surface data

| Surface no. | r | d | nd | νd | θgf |
|---|---|---|---|---|---|
| 1* | 20.173 | 2.85 | 1.84666 | 23.77 | 0.620 |
| 2* | 44.670 | 0.10 | | | |
| 3 | 22.987 | 0.70 | 1.65412 | 39.68 | 0.574 |
| 4 | 13.553 | 0.10 | | | |
| 5* | 11.056 | 5.41 | 1.49700 | 81.61 | 0.538 |
| 6 | −117.884 | 0.10 | | | |
| 7 | 15.197 | 3.48 | 1.49700 | 81.61 | 0.538 |
| 8* | −137.586 | 0.10 | | | |
| 9 | 40.695 | 3.13 | 1.61800 | 63.33 | 0.544 |
| 10 | −15.237 | 0.70 | 1.72047 | 34.71 | 0.583 |
| 11 | 13.540 | 0.95 | | | |

-continued

| Unit mm | | | | | |
|---|---|---|---|---|---|
| 12(Stop) | ∞ | −0.41 | | | |
| 13 | 21.538 | 0.70 | 1.90366 | 31.32 | 0.595 |
| 14 | 6.309 | 2.36 | 1.61800 | 63.33 | 0.544 |
| 15 | 11.008 | 0.10 | | | |
| 16* | 6.948 | 3.38 | 1.49700 | 81.61 | 0.538 |
| 17* | −55.578 | 5.87 | | | |
| 18* | −6.796 | 0.70 | 1.49700 | 81.61 | 0.538 |
| 19* | 18.459 | 2.11 | | | |
| 20* | 7.634 | 3.91 | 1.58364 | 30.30 | 0.599 |
| 21* | −13.003 | 1.75 | | | |
| 22* | −6.810 | 0.70 | 1.49700 | 81.61 | 0.538 |
| 23* | 24.381 | 4.54 | | | |
| 24 | ∞ | 0.38 | 1.51640 | 65.06 | 0.535 |
| 25 | ∞ | 0.30 | | | |
| Image plane | ∞ | | | | |

Aspherical surface data

1st surface k = 0.000
A4 = −5.73554e−06

2nd surface k = 0.000
A4 = −9.15135e−06

5th surface k = −0.393
A4 = −2.44007e−05

8th surface k = 0.000
A4 = 6.95514e−05

16th surface k = −0.579
A4 = −2.22085e−04

17th surface k = 0.000
A4 = −4.21651e−04

18th surface k = 0.000
A4 = −3.61868e−04

19th surface k = 0.000
A4 = −7.75281e−04

20th surface k = 0.000
A4 = −6.02773e−04

21th surface k = 0.000
A4 = −6.83570e−05

22th surface k = 0.000
A4 = 1.18563e−09

23th surface k = 0.000
A4 = −1.14221e−09, A6 = −1.28369e−05

Various data

| | |
|---|---|
| NA | 0.23 |
| Magnification | −1.33 |
| Focal length | 10.24 |
| Image height (mm) | 4.92 |
| fb (mm) (in air) | 5.09 |
| Lens total length (mm) (in air) | 43.88 |

Example 34

Unit mm

Surface data

| Surface no. | r | d | nd | νd | θgf |
|---|---|---|---|---|---|
| 1 | 30.333 | 3.43 | 1.84666 | 23.77 | 0.620 |
| 2* | −17.121 | 0.96 | | | |
| 3* | −13.803 | 0.88 | 1.58364 | 30.30 | 0.599 |
| 4* | 13.612 | 0.11 | | | |
| 5* | 11.200 | 3.75 | 1.49700 | 81.61 | 0.538 |
| 6 | −27.595 | 0.10 | | | |
| 7 | 15.356 | 3.57 | 1.49700 | 81.61 | 0.538 |
| 8* | −16.003 | 0.10 | | | |
| 9 | 17.504 | 2.87 | 1.61800 | 63.33 | 0.544 |
| 10 | −11.810 | 0.70 | 1.72047 | 34.71 | 0.583 |
| 11 | 8.524 | 0.97 | | | |
| 12 (Stop) | ∞ | 0.56 | | | |
| 13 | −53.831 | 0.70 | 1.72047 | 34.71 | 0.583 |
| 14 | 6.850 | 2.02 | 1.61800 | 63.33 | 0.544 |
| 15 | 23.795 | 2.48 | | | |
| 16* | 16.577 | 4.50 | 1.49700 | 81.61 | 0.538 |
| 17* | −46.561 | 1.38 | | | |
| 18* | 20.918 | 2.44 | 1.49700 | 81.61 | 0.538 |
| 19* | 198.692 | 2.30 | | | |
| 20* | 15.525 | 2.93 | 1.63490 | 23.88 | 0.630 |
| 21* | −50.829 | 5.23 | | | |
| 22* | −9.522 | 0.71 | 1.53368 | 55.90 | 0.563 |
| 23* | 17.577 | 1.58 | | | |
| 24* | −21.349 | 0.92 | 1.53368 | 55.90 | 0.563 |
| 25* | 27.363 | 0.66 | | | |
| 26 | ∞ | 0.38 | 1.51640 | 65.06 | 0.535 |
| 27 | ∞ | 0.30 | | | |
| Image plane | ∞ | | | | |

Aspherical surface data

2nd surface
k = −3.179
3rd surface
k = 0.000
A4 = 7.36835e−05
4th surface
k = 0.000
A4 = −1.21732e−04
5th surface
k = −0.072
A4 = −1.81623e−04
8th surface
k = −6.612
A4 = 3.49560e−05
16th surface
k = −0.579
A4 = 1.35029e−04
17th surface
k = 0.000
A4 = 2.51766e−04
18th surface
k = 0.000
A4 = 2.91305e−04
19th surface
k = 0.000
A4 = 6.43367e−05
20th surface
k = −1.062
A4 = 1.69562e−04
21th surface
k = 0.000
A4 = 2.58930e−04
22th surface
k = 0.000
A4 = −4.19918e−04
23th surface
k = 0.000
A4 = −1.49907e−04
24th surface
k = 0.000

-continued

| Unit mm |
|---|
| A4 = 1.57977e−04 |
| 25th surface |
| k = 0.000 |
| A4 = −4.67783e−04 |

| Various data | |
|---|---|
| NA | 0.23 |
| Magnification | −1.33 |
| Focal length | 6.71 |
| Image height (mm) | 4.92 |
| fb (mm) (in air) | 1.21 |
| Lens total length (mm) (in air) | 46.39 |

Example 35

Unit mm

Surface data

| Surface no. | r | d | nd | νd | θgf |
|---|---|---|---|---|---|
| 1 | 31.851 | 3.46 | 1.84666 | 23.77 | 0.620 |
| 2* | −16.956 | 0.92 | | | |
| 3* | −14.469 | 0.79 | 1.58364 | 30.30 | 0.599 |
| 4* | 13.498 | 0.11 | | | |
| 5* | 11.902 | 3.99 | 1.49700 | 81.61 | 0.538 |
| 6 | −24.185 | 0.10 | | | |
| 7 | 15.502 | 3.62 | 1.49700 | 81.61 | 0.538 |
| 8* | −16.536 | 0.10 | | | |
| 9 | 17.521 | 2.82 | 1.61800 | 63.33 | 0.544 |
| 10 | −12.188 | 0.70 | 1.72047 | 34.71 | 0.583 |
| 11 | 8.905 | 1.29 | | | |
| 12(Stop) | ∞ | 0.87 | | | |
| 13 | −25.439 | 0.70 | 1.72047 | 34.71 | 0.583 |
| 14 | 7.636 | 2.05 | 1.61800 | 63.33 | 0.544 |
| 15 | 40.459 | 3.76 | | | |
| 16* | 12.506 | 4.08 | 1.49700 | 81.61 | 0.538 |
| 17* | −25.450 | 4.84 | | | |
| 18* | 16.621 | 2.91 | 1.63490 | 23.88 | 0.630 |
| 19* | −45.468 | 5.15 | | | |
| 20* | −11.176 | 0.70 | 1.53368 | 55.90 | 0.563 |
| 21* | 28.944 | 1.68 | | | |
| 22* | −16.379 | 0.70 | 1.53368 | 55.90 | 0.563 |
| 23* | 19.903 | 0.84 | | | |
| 24 | ∞ | 0.38 | 1.51640 | 65.06 | 0.535 |
| 25 | ∞ | 0.30 | | | |
| Image plane | ∞ | | | | |

Aspherical surface data

2nd surface
k = −3.154

3rd surface
k = 0.000
A4 = 4.19783e−05

4th surface
k = 0.000
A4 = −1.40144e−04

5th surface
k = 0.014
A4 = −1.86929e−04

8th surface
k = −4.445
A4 = 2.87986e−05

-continued

Unit mm

16th surface
k = −0.579
A4 = 8.24143e−06

17th surface
k = 0.000
A4 = 2.95157e−05

18th surface
k = −4.329
A4 = 1.98827e−04

19th surface
k = 0.000
A4 = 1.82474e−04

20th surface
k = 0.000
A4 = −5.85060e−05

21th surface
k = 0.000
A4 = 7.89211e−12

22th surface
k = 0.000
A4 = −1.93685e−04

23th surface
k = 0.000
A4 = −5.50486e−04

| Various data | |
|---|---|
| NA | 0.23 |
| Magnification | −1.33 |
| Focal length | 6.94 |
| Image height (mm) | 4.92 |
| fb (mm) (in air) | 1.39 |
| Lens total length (mm) (in air) | 46.76 |

Example 36

Unit mm

Surface data

| Surface no. | r | d | nd | νd | θgf |
|---|---|---|---|---|---|
| 1 | 36.714 | 3.44 | 1.84666 | 23.77 | 0.620 |
| 2* | −16.452 | 0.92 | | | |
| 3* | −14.367 | 0.70 | 1.58364 | 30.30 | 0.599 |
| 4* | 13.393 | 0.36 | | | |
| 5* | 12.942 | 3.94 | 1.49700 | 81.61 | 0.538 |
| 6 | −22.078 | 0.10 | | | |
| 7 | 13.900 | 3.96 | 1.49700 | 81.61 | 0.538 |
| 8* | −17.689 | 0.30 | | | |
| 9 | 17.537 | 2.78 | 1.61800 | 63.33 | 0.544 |
| 10 | −13.673 | 0.70 | 1.72047 | 34.71 | 0.583 |
| 11 | 9.167 | 1.30 | | | |
| 12(Stop) | ∞ | 0.93 | | | |
| 13 | −18.729 | 0.70 | 1.72047 | 34.71 | 0.583 |
| 14 | 7.839 | 2.04 | 1.61800 | 63.33 | 0.544 |
| 15 | 43.718 | 4.70 | | | |
| 16* | 11.769 | 4.45 | 1.49700 | 81.61 | 0.538 |
| 17* | −21.669 | 4.26 | | | |
| 18* | 14.851 | 2.87 | 1.63490 | 23.88 | 0.630 |
| 19* | −125.046 | 5.08 | | | |
| 20* | −7.502 | 0.70 | 1.53368 | 55.90 | 0.563 |
| 21* | 12.654 | 2.99 | | | |

-continued

| Unit mm | | | | | |
|---|---|---|---|---|---|
| 22 | ∞ | 0.38 | 1.51640 | 65.06 | 0.535 |
| 23 | ∞ | 0.30 | | | |
| Image plane | ∞ | | | | |

Aspherical surface data

2nd surface k = −2.632

3rd surface k = 0.000
A4 = 2.85023e−05

4th surface k = 0.000
A4 = −1.67992e−04

5th surface k = −0.266
A4 = −1.93461e−04

8th surface k = −4.885
A4 = −9.96312e−06

16th surface k = −0.579
A4 = 1.15323e−05

17th surface k = 0.000
A4 = 8.61252e−05

18th surface k = −1.042
A4 = 5.95706e−05

19th surface k = 0.000
A4 = 8.80359e−05

20th surface k = 0.000
A4 = 4.18334e−04

21th surface k = 0.000
A4 = −2.24974e−04

| Various data | |
|---|---|
| NA | 0.23 |
| Magnification | −1.33 |
| Focal length | 8.73 |
| Image height (mm) | 4.92 |
| Fb (mm) (in air) | 3.55 |
| Lens total length (mm) (in air) | 47.77 |

Example 37

Unit mm

Surface data

| Surface no. | r | d | nd | νd | θgf |
|---|---|---|---|---|---|
| 1 | 35.018 | 3.51 | 1.84666 | 23.77 | 0.620 |
| 2* | −16.160 | 0.79 | | | |
| 3* | −14.606 | 0.70 | 1.58364 | 30.30 | 0.599 |
| 4* | 12.706 | 0.30 | | | |
| 5* | 10.540 | 4.39 | 1.49700 | 81.61 | 0.538 |
| 6 | −25.094 | 0.10 | | | |
| 7 | 18.037 | 3.48 | 1.49700 | 81.61 | 0.538 |
| 8* | −15.488 | 0.30 | | | |
| 9 | 17.578 | 2.82 | 1.61800 | 63.33 | 0.544 |
| 10 | −11.708 | 0.71 | 1.72047 | 34.71 | 0.583 |
| 11 | 8.764 | 1.28 | | | |
| 12(Stop) | ∞ | 0.86 | | | |
| 13 | −50.664 | 1.06 | 1.72047 | 34.71 | 0.583 |
| 14 | 6.843 | 3.93 | 1.61800 | 63.33 | 0.544 |
| 15 | 22.209 | 3.20 | | | |
| 16* | 18.515 | 3.84 | 1.49700 | 81.61 | 0.538 |
| 17* | −19.905 | 0.36 | | | |
| 18* | 61.312 | 2.44 | 1.49700 | 81.61 | 0.538 |
| 19* | −138.576 | 1.98 | | | |
| 20* | 16.819 | 3.04 | 1.63490 | 23.88 | 0.630 |
| 21* | −44.496 | 5.21 | | | |
| 22* | −6.697 | 0.83 | 1.53368 | 55.90 | 0.563 |
| 23* | 12.737 | 1.65 | | | |
| 24 | 91.429 | 0.70 | 1.53368 | 55.90 | 0.563 |
| 25 | 100.508 | 0.51 | | | |
| 26 | ∞ | 0.38 | 1.51640 | 65.06 | 0.535 |
| 27 | ∞ | 0.30 | | | |
| Image plane | ∞ | | | | |

Aspherical surface data

2nd surface k = −3.277

3rd surface k = 0.000
A4 = 8.48353e−05

4th surface k = 0.000
A4 = −1.01898e−04

5th surface k = −0.286
A4 = −1.38466e−04

8th surface k = −5.555
A4 = 4.80018e−05

16th surface k = −0.579
A4 = 1.25353e−04

17th surface k = 0.000
A4 = 2.20448e−04

18th surface k = 0.000
A4 = 3.34293e−04

19th surface k = 0.000
A4 = 1.43266e−04

20th surface k = −4.552
A4 = 2.56841e−04

21th surface k = 0.000
A4 = 2.84837e−04

22th surface k = 0.000
A4 = 2.73060e−04

23th surface k = 0.000
A4 = −9.16648e−04

-continued

| Unit mm | |
|---|---|
| Various data | |
| NA | 0.23 |
| Magnification | −1.33 |
| Focal length | 8.25 |
| Image height (mm) | 4.92 |
| fb (mm) (in air) | 1.06 |
| Lens total length (mm) (in air) | 48.56 |

Example 38

Unit mm

Surface data

| Surface no. | r | d | nd | νd | θgf |
|---|---|---|---|---|---|
| 1 | 49.656 | 3.69 | 1.84666 | 23.77 | 0.620 |
| 2* | −17.011 | 0.30 | | | |
| 3* | −16.943 | 0.70 | 1.58364 | 30.30 | 0.599 |
| 4* | 15.231 | 0.30 | | | |
| 5* | 12.554 | 5.18 | 1.49700 | 81.61 | 0.538 |
| 6 | −22.778 | 0.10 | | | |
| 7 | 19.262 | 4.38 | 1.49700 | 81.61 | 0.538 |
| 8* | −14.960 | 0.30 | | | |
| 9 | 23.487 | 2.73 | 1.61800 | 63.33 | 0.544 |
| 10 | −17.685 | 0.70 | 1.72047 | 34.71 | 0.583 |
| 11 | 9.522 | 1.44 | | | |
| 12(Stop) | ∞ | 0.85 | | | |
| 13 | −38.910 | 0.70 | 1.72047 | 34.71 | 0.583 |
| 14 | 6.507 | 2.02 | 1.61800 | 63.33 | 0.544 |
| 15 | 13.505 | 1.43 | | | |
| 16* | 14.532 | 8.57 | 1.49700 | 81.61 | 0.538 |
| 17* | 57.509 | 0.41 | | | |
| 18* | 13.489 | 4.45 | 1.49700 | 81.61 | 0.538 |
| 19* | −401.830 | 1.74 | | | |
| 20* | 15.589 | 3.51 | 1.63490 | 23.88 | 0.630 |
| 21* | −58.753 | 4.86 | | | |
| 22* | −7.832 | 1.58 | 1.53368 | 55.90 | 0.563 |
| 23* | 15.936 | 2.94 | | | |
| 24 | ∞ | 0.38 | 1.51640 | 65.06 | 0.535 |
| 25 | ∞ | 0.30 | | | |
| Image plane | ∞ | | | | |

Aspherical surface data

2nd surface k = −2.652

3rd surface k = 0.000
A4 = −1.47660e−05

4th surface k = 0.000
A4 = −1.00180e−04

5th surface k = −0.298
A4 = −1.23946e−04

8th surface k = −4.494
A4 = 1.28557e−05

16th surface k = −0.579
A4 = 1.96708e−04

17th surface k = 0.000
A4 = 1.64979e−04

-continued

18th surface k = 0.000
A4 = 2.23578e−04

19th surface k = 0.000
A4 = 1.34637e−04

20th surface k = −3.507
A4 = 3.22843e−04

21th surface k = 0.000
A4 = 3.61442e−04

22th surface k = 0.000
A4 = −5.63782e−04

23th surface k = 0.000
A4 = −1.15728e−03

| Various data | |
|---|---|
| NA | 0.23 |
| Magnification | −1.33 |
| Focal length | 9.31 |
| Image height (mm) | 4.92 |
| fb (mm) (in air) | 3.49 |
| Lens total length (mm) (in air) | 53.44 |

Example 39

Unit mm

Surface data

| Surface no. | r | d | nd | νd | θgf |
|---|---|---|---|---|---|
| 1* | 15.101 | 3.29 | 1.49700 | 81.61 | 0.538 |
| 2* | −1411.511 | 0.81 | | | |
| 3 | −675.554 | 0.86 | 1.50220 | 54.74 | 0.551 |
| 4 | 13.373 | 1.32 | | | |
| 5* | 14.021 | 5.03 | 1.49700 | 81.61 | 0.538 |
| 6 | −18.164 | 0.10 | | | |
| 7 | 14.881 | 3.21 | 1.49700 | 81.61 | 0.538 |
| 8* | −54.750 | 0.32 | | | |
| 9 | 50.000 | 3.52 | 1.61800 | 63.33 | 0.544 |
| 10 | −18.151 | 1.71 | 1.72047 | 34.71 | 0.583 |
| 11 | −3000.000 | 0.50 | | | |
| 12(Stop) | ∞ | 0.37 | | | |
| 13 | 47.485 | 4.43 | 1.75500 | 52.32 | 0.547 |
| 14 | −30.000 | 1.93 | 1.71775 | 32.36 | 0.593 |
| 15 | 6.109 | 3.62 | | | |
| 16* | −7.419 | 4.50 | 1.49700 | 81.61 | 0.538 |
| 17* | −8.241 | 0.90 | | | |
| 18* | 12.630 | 4.46 | 1.80610 | 40.40 | 0.570 |
| 19* | −59.865 | 3.19 | | | |
| 20* | −14.507 | 1.72 | 1.60614 | 32.96 | 0.598 |
| 21* | 19.347 | 1.54 | | | |
| 22 | ∞ | 0.38 | 1.51640 | 65.06 | 0.535 |
| 23 | ∞ | 0.31 | | | |
| Image plane | ∞ | | | | |

Aspherical surface data

1st surface k = 0.000
A4 = 6.55745e−05

-continued

| Unit mm |
|---|
| 2nd surface |
| k = 0.000<br>A4 = 1.15283e−04 |
| 5th surface |
| k = −0.990<br>A4 = 1.66321e−05 |
| 8th surface |
| k = 0.000<br>A4 = 1.25514e−04 |
| 16th surface |
| k = −0.579<br>A4 = −1.39447e−05 |
| 17th surface |
| k = 0.000<br>A4 = 6.26727e−05 |
| 18th surface |
| k = 0.000<br>A4 = −5.34476e−05 |
| 19th surface |
| k = 0.000<br>A4 = −7.96647e−05 |
| 20th surface |
| k = 0.000<br>A4 = 6.62595e−05 |
| 21th surface |
| k = 0.000<br>A4 = −6.63922e−05, A6 = −4.52844e−06 |

| Various data | |
|---|---|
| NA | 0.23 |
| Magnification | −1.30 |
| Focal length | 11.64 |
| Image height (mm) | 4.92 |
| fb (mm) (in air) | 2.10 |
| Lens total length (mm) (in air) | 47.88 |

Example 40

Unit mm

Surface data

| Surface no. | r | d | nd | νd | θgf |
|---|---|---|---|---|---|
| 1* | 13.980 | 5.56 | 1.49700 | 81.61 | 0.538 |
| 2* | −20.000 | 0.90 | 1.51633 | 64.06 | 0.533 |
| 3* | 13.407 | 1.32 | | | |
| 4* | 13.448 | 4.59 | 1.49700 | 81.61 | 0.538 |
| 5 | −23.931 | 0.10 | | | |
| 6 | 20.404 | 3.02 | 1.49700 | 81.61 | 0.538 |
| 7* | −54.118 | 0.30 | | | |
| 8 | 15.790 | 4.48 | 1.61800 | 63.33 | 0.544 |
| 9 | −19.586 | 0.70 | 1.72047 | 34.71 | 0.583 |
| 10 | 16.357 | 0.91 | | | |
| 11(Stop) | ∞ | 0.94 | | | |
| 12 | 14.986 | 4.50 | 1.75500 | 52.32 | 0.547 |
| 13 | −30.000 | 1.15 | 1.62588 | 35.70 | 0.589 |
| 14 | 5.558 | 3.03 | | | |
| 15* | −7.759 | 4.50 | 1.49700 | 81.61 | 0.538 |
| 16* | −9.446 | 0.30 | | | |
| 17* | 14.699 | 4.50 | 1.80610 | 40.40 | 0.570 |
| 18* | −33.410 | 2.70 | | | |
| 19* | −12.364 | 2.02 | 1.53368 | 55.90 | 0.563 |
| 20* | 20.278 | 1.43 | | | |
| 21 | ∞ | 0.38 | 1.51640 | 65.06 | 0.535 |
| 22 | ∞ | 0.31 | | | |
| Image plane | ∞ | | | | |

| Aspherical surface data |
|---|
| 1st surface |
| k = 0.000<br>A4 = 7.72147e−06, A6 = −1.56655e−07 |
| 2nd surface |
| k = 0.000<br>A4 = 4.95212e−06 |
| 3rd surface |
| k = 0.000<br>A4 = 7.51990e−06 |
| 4th surface |
| k = −0.280<br>A4 = −4.12102e−05 |
| 7th surface |
| k = 0.000<br>A4 = 9.26104e−05 |
| 15th surface |
| k = −0.579<br>A4 = −1.80982e−05 |
| 16th surface |
| k = 0.000<br>A4 = 6.97386e−05 |
| 17th surface |
| k = 0.000<br>A4 = −8.07041e−05 |
| 18th surface |
| k = 0.000<br>A4 = −1.42087e−04 |
| 19th surface |
| k = 0.000<br>A4 = 1.27864e−04 |
| 20th surface |
| k = 0.000<br>A4 = −1.23475e−04, A6 = −7.64122e−06 |

| Various data | |
|---|---|
| NA | 0.23 |
| Magnification | −1.30 |
| Focal length | 11.19 |
| Image height(mm) | 4.92 |
| fb(mm) (in air) | 1.99 |
| Lens total length(mm) (in air) | 47.51 |

Example 41

Unit mm

Surface data

| Surface no. | r | d | nd | νd | θgf |
|---|---|---|---|---|---|
| 1 | 25.769 | 1.00 | 1.78800 | 47.37 | 0.556 |
| 2 | 18.855 | 2.85 | 1.84666 | 23.78 | 0.620 |
| 3 | −40.476 | 5.37 | | | |
| 4* | −12.747 | 0.60 | 1.58366 | 30.23 | 0.594 |

-continued

| Unit mm | | | | | |
|---|---|---|---|---|---|
| 5* | 11.476 | 0.10 | | | |
| 6* | 8.066 | 3.75 | 1.49700 | 81.61 | 0.538 |
| 7* | −8.996 | 0.10 | | | |
| 8 | 24.048 | 2.60 | 1.61800 | 63.33 | 0.544 |
| 9 | −8.000 | 1.00 | 1.72047 | 34.71 | 0.583 |
| 10 | 26.872 | 1.85 | | | |
| 11(Stop) | ∞ | 0.30 | | | |
| 12 | 9.076 | 0.60 | 1.90366 | 31.32 | 0.595 |
| 13 | 5.849 | 1.82 | 1.53996 | 59.46 | 0.544 |
| 14 | 16.303 | 1.19 | | | |
| 15 | 10.078 | 2.13 | 1.49700 | 81.61 | 0.538 |
| 16 | 27.029 | 0.10 | | | |
| 17* | 14.378 | 3.00 | 1.63491 | 23.81 | 0.624 |
| 18* | −11.061 | 0.10 | | | |
| 19 | 30.935 | 1.06 | 1.49700 | 81.61 | 0.538 |
| 20 | 5.275 | 2.65 | | | |
| 21 | −8.961 | 3.00 | 1.75299 | 26.43 | 0.613 |
| 22 | −10.149 | 5.48 | | | |
| 23* | −7.320 | 0.60 | 1.63491 | 23.81 | 0.624 |
| 24* | 17.259 | 1.08 | | | |
| 25 | ∞ | 0.38 | 1.51641 | 65.06 | 0.535 |
| 26 | ∞ | 0.29 | | | |
| Image plane | ∞ | | | | |

Aspherical surface data

4th surface k = 0.000
A4 = −1.76429e−04, A6 = 6.30527e−07

5th surface k = 0.000
A4 = −2.32457e−04, A6 = −6.86686e−07

6th surface k = −1.081
A4 = −2.89278e−04, A6 = 1.34631e−06

7th surface k = −0.300
A4 = 4.59425e−05, A6 = 1.49990e−06

17th surface k = 0.000
A4 = −2.67915e−04, A6 = −3.04912e−06, A8 = −1.25579e−07

18th surface k = 0.000
A4 = 3.85802e−04, A6 = −8.69760e−06, A8 = −2.98874e−08

23th surface k = 0.000
A4 = 8.84524e−04, A6 = −1.13249e−05, A8 = 3.91153e−07

24th surface k = 0.000
A4 = −6.21360e−04, A6 = 1.53368e−05, A8 = −3.89452e−07

Various data

| | |
|---|---|
| NA | 0.23 |
| Magnification | −1.32 |
| Focal length | 5.34 |
| Image height(mm) | 4.75 |
| fb(mm) (in air) | 1.63 |
| Lens total length(mm) (in air) | 42.87 |

Example 42

Unit mm

Surface data

| Surface no. | r | d | nd | νd | θgf |
|---|---|---|---|---|---|
| 1 | 40.476 | 1.93 | 1.84666 | 23.78 | 0.620 |
| 2 | −18.855 | 1.00 | 1.78800 | 47.37 | 0.556 |
| 3 | −25.769 | 5.63 | | | |
| 4* | −12.272 | 1.63 | 1.58366 | 30.23 | 0.594 |
| 5* | 12.511 | 0.10 | | | |
| 6* | 8.053 | 3.59 | 1.49700 | 81.61 | 0.538 |
| 7* | −9.092 | 0.10 | | | |
| 8 | 36.029 | 2.41 | 1.61800 | 63.33 | 0.544 |
| 9 | −8.000 | 1.85 | 1.72047 | 34.71 | 0.583 |
| 10 | 127.453 | 0.79 | | | |
| 11(Stop) | ∞ | 0.30 | | | |
| 12 | 11.461 | 0.60 | 1.90366 | 31.32 | 0.595 |
| 13 | 5.817 | 1.60 | 1.53996 | 59.46 | 0.544 |
| 14 | 12.210 | 0.10 | | | |
| 15 | 8.567 | 1.27 | 1.48749 | 70.23 | 0.530 |
| 16 | 13.023 | 0.57 | | | |
| 17 | 12.975 | 1.75 | 1.49700 | 81.61 | 0.538 |
| 18 | 21.711 | 0.10 | | | |
| 19* | 13.032 | 3.00 | 1.63491 | 23.81 | 0.624 |
| 20* | −10.432 | 0.10 | | | |
| 21 | 32.856 | 1.80 | 1.49700 | 81.61 | 0.538 |
| 22 | 5.469 | 3.30 | | | |
| 23 | −8.726 | 3.00 | 1.84666 | 23.78 | 0.618 |
| 24 | −9.698 | 4.14 | | | |
| 25* | −7.320 | 0.60 | 1.63491 | 23.81 | 0.624 |
| 26* | 17.259 | 1.08 | | | |
| 27 | ∞ | 0.38 | 1.51641 | 65.06 | 0.535 |
| 28 | ∞ | 0.30 | | | |
| Image plane | ∞ | | | | |

Aspherical surface data

4th surface k = 0.000
A4 = −2.20622e−04, A6 = 1.84877e−06

5th surface k = 0.000
A4 = −2.39829e−04, A6 = 1.41106e−06

6th surface k = −1.082
A4 = −2.94477e−04, A6 = 2.15880e−06

7th surface k = −0.170
A4 = 9.04640e−05, A6 = 1.74380e−06

19th surface k = 0.000
A4 = −1.93247e−04, A6 = −2.53963e−06, A8 = −5.80800e−08

20th surface k = 0.000
A4 = 3.92431e−04, A6 = −6.94103e−06, A8 = 2.82007e−08

25th surface k = 0.000
A4 = 8.84524e−04, A6 = −1.13249e−05, A8 = 3.91153e−07

26th surface k = 0.000
A4 = −6.21360e−04, A6 = 1.53368e−05, A8 = −3.89452e−07

Various data

| | |
|---|---|
| NA | 0.23 |
| Magnification | −1.32 |
| Focal length | 5.31 |
| Image height(mm) | 4.75 |

-continued

| Unit mm | |
|---|---|
| fb(mm) (in air) | 1.63 |
| Lens total length(mm) (in air) | 42.87 |

Example 43

| Unit mm | | | | | |
|---|---|---|---|---|---|
| Surface data | | | | | |
| Surface no. | r | d | nd | νd | θgf |
| 1 | 32.668 | 3.43 | 1.84666 | 23.77 | 0.620 |
| 2* | −16.839 | 0.79 | | | |
| 3* | −14.534 | 0.70 | 1.58364 | 30.30 | 0.599 |
| 4* | 13.753 | 0.35 | | | |
| 5* | 13.429 | 3.98 | 1.49700 | 81.61 | 0.538 |
| 6 | −19.967 | 0.10 | | | |
| 7 | 15.031 | 3.74 | 1.49700 | 81.61 | 0.538 |
| 8* | −17.691 | 0.30 | | | |
| 9 | 17.346 | 2.79 | 1.61800 | 63.33 | 0.544 |
| 10 | −12.239 | 0.70 | 1.72047 | 34.71 | 0.583 |
| 11 | 9.694 | 1.03 | | | |
| 12(Stop) | ∞ | 1.14 | | | |
| 13 | −19.591 | 0.70 | 1.72047 | 34.71 | 0.583 |
| 14 | 7.666 | 2.09 | 1.61800 | 63.33 | 0.544 |
| 15 | 39.824 | 5.19 | | | |
| 16* | 13.644 | 5.65 | 1.49700 | 81.61 | 0.538 |
| 17* | −18.626 | 3.78 | | | |
| 18* | 18.113 | 2.84 | 1.63490 | 23.88 | 0.630 |
| 19* | −72.883 | 4.98 | | | |
| 20* | −17.228 | 0.70 | 1.53368 | 55.90 | 0.563 |
| 21* | 19.172 | 1.78 | | | |
| 22* | −13.391 | 0.84 | 1.53368 | 55.90 | 0.563 |
| 23* | 32.664 | 0.80 | | | |
| 24 | ∞ | 0.38 | 1.51640 | 65.06 | 0.535 |
| 25 | ∞ | 0.30 | | | |
| Image plane | ∞ | | | | |

Aspherical surface data

2nd surface k = −2.852

3rd surface k = 0.000
A4 = 3.99545e−06

4th surface k = 0.000
A4 = −1.80111e−04

5th surface k = 0.023
A4 = −1.98268e−04

8th surface k = −2.944
A4 = 1.69124e−05

16th surface k = −0.579
A4 = −6.22198e−05

17th surface k = 0.000
A4 = 1.32946e−05

18th surface k = −1.194
A4 = 2.27221e−07

-continued

Unit mm

19th surface k = 0.000
A4 = 5.73551e−06

20th surface k = 0.000
A4 = 2.95534e−06

21th surface k = 0.000
A4 = −1.18942e−06

22th surface k = 0.000
A4 = 2.62449e−06

23th surface k = 0.000
A4 = −2.59746e−06

| Various data | |
|---|---|
| NA | 0.23 |
| Magnification | −1.33 |
| Focal length | 7.78 |
| Image height(mm) | 4.92 |
| fb(mm) (in air) | 1.35 |
| Lens total length(mm) (in air) | 48.97 |

Example 44

| Unit mm | | | | | |
|---|---|---|---|---|---|
| Surface data | | | | | |
| Surface no. | r | d | nd | νd | θgf |
| 1 | 36.494 | 3.32 | 1.84666 | 23.77 | 0.620 |
| 2* | −16.015 | 0.72 | | | |
| 3* | −14.579 | 0.71 | 1.58364 | 30.30 | 0.599 |
| 4* | 16.856 | 0.41 | | | |
| 5* | 16.777 | 3.81 | 1.49700 | 81.61 | 0.538 |
| 6 | −15.718 | 0.10 | | | |
| 7 | 19.072 | 3.37 | 1.49700 | 81.61 | 0.538 |
| 8* | −17.469 | 0.30 | | | |
| 9 | 17.675 | 2.70 | 1.61800 | 63.33 | 0.544 |
| 10 | −12.437 | 0.70 | 1.72047 | 34.71 | 0.583 |
| 11 | 8.495 | 1.08 | | | |
| 12(Stop) | ∞ | 0.82 | | | |
| 13 | −14.896 | 0.70 | 1.72047 | 34.71 | 0.583 |
| 14 | 10.195 | 1.80 | 1.61800 | 63.33 | 0.544 |
| 15 | 27.848 | 1.85 | | | |
| 16* | 15.325 | 5.04 | 1.49700 | 81.61 | 0.538 |
| 17* | −10.454 | 9.60 | | | |
| 18* | 13.414 | 2.88 | 1.63490 | 23.88 | 0.630 |
| 19* | 990.845 | 4.74 | | | |
| 20* | −11.800 | 0.70 | 1.53368 | 55.90 | 0.563 |
| 21* | 51.656 | 1.21 | | | |
| 22* | −22.343 | 0.70 | 1.53368 | 55.90 | 0.563 |
| 23* | 18.755 | 1.20 | | | |
| 24 | ∞ | 0.38 | 1.51640 | 65.06 | 0.535 |
| 25 | ∞ | 0.30 | | | |
| Image plane | ∞ | | | | |

Aspherical surface data

2nd surface k = −2.354

3rd surface k = 0.000
A4 = −1.41730e−05

-continued

| Unit mm |
|---|
| 4th surface |
| k = 0.000<br>A4 = −1.08331e−04 |
| 5th surface |
| k = 0.711<br>A4 = −2.05079e−04 |
| 8th surface |
| k = −1.019<br>A4 = 6.63327e−06 |
| 16th surface |
| k = −0.579<br>A4 = −1.14177e−04 |
| 17th surface |
| k = 0.000<br>A4 = 3.77032e−05 |
| 18th surface |
| k = 0.662<br>A4 = −1.06116e−05 |
| 19th surface |
| k = 0.000<br>A4 = 1.38376e−05 |
| 20th surface |
| k = 0.000<br>A4 = 3.62602e−06 |
| 21th surface |
| k = 0.000<br>A4 = −2.19557e−06 |
| 22th surface |
| k = 0.000<br>A4 = 4.13364e−06 |
| 23th surface |
| k = 0.000<br>A4 = −2.84367e−06 |

| Various data | |
|---|---|
| NA | 0.23 |
| Magnification | −1.33 |
| Focal length | 7.87 |
| Image height(mm) | 4.92 |
| fb(mm) (in air) | 1.75 |
| Lens total length(mm) (in air) | 49.02 |

Example 45

Unit mm

Surface data

| Surface no. | r | d | nd | νd | θgf |
|---|---|---|---|---|---|
| 1 | 74.956 | 2.98 | 1.84666 | 23.77 | 0.620 |
| 2* | −14.732 | 0.57 | | | |
| 3* | −12.899 | 0.70 | 1.58364 | 30.30 | 0.599 |
| 4* | 43.976 | 0.34 | | | |
| 5* | 33.291 | 3.01 | 1.49700 | 81.61 | 0.538 |
| 6 | −17.492 | 0.10 | | | |
| 7 | 15.494 | 3.16 | 1.49700 | 81.61 | 0.538 |
| 8* | −22.742 | 0.30 | | | |
| 9 | 16.979 | 2.57 | 1.61800 | 63.33 | 0.544 |
| 10 | −17.660 | 0.70 | 1.72047 | 34.71 | 0.583 |
| 11 | 7.386 | 1.26 | | | |
| 12(Stop) | ∞ | 0.85 | | | |
| 13 | −15.256 | 0.76 | 1.72047 | 34.71 | 0.583 |
| 14 | 17.797 | 1.70 | 1.61800 | 63.33 | 0.544 |
| 15 | 48.679 | 1.26 | | | |
| 16* | 14.757 | 3.95 | 1.49700 | 81.61 | 0.538 |
| 17* | −9.274 | 14.60 | | | |
| 18* | 12.062 | 2.80 | 1.63490 | 23.88 | 0.630 |
| 19* | 97.824 | 2.82 | | | |
| 20* | −17.861 | 0.70 | 1.53368 | 55.90 | 0.563 |
| 21* | 237.695 | 1.46 | | | |
| 22* | −11.342 | 0.70 | 1.53368 | 55.90 | 0.563 |
| 23* | 17.018 | 1.20 | | | |
| 24 | ∞ | 0.38 | 1.51640 | 65.06 | 0.535 |
| 25 | ∞ | 0.30 | | | |
| Image plane | ∞ | | | | |

| Aspherical surface data |
|---|
| 2nd surface |
| k = −2.161 |
| 3rd surface |
| k = 0.000<br>A4 = 1.48176e−04 |
| 4th surface |
| k = 0.000<br>A4 = 2.73952e−05 |
| 5th surface |
| k = 10.865<br>A4 = −1.41264e−04 |
| 8th surface |
| k = −1.121<br>A4 = 5.97656e−05 |
| 16th surface |
| k = −0.579<br>A4 = −1.45146e−04 |
| 17th surface |
| k = 0.000<br>A4 = 5.53442e−05 |
| 18th surface |
| k = 0.704<br>A4 = −1.23220e−05 |
| 19th surface |
| k = 0.000<br>A4 = 4.74431e−06 |
| 20th surface |
| k = 0.000<br>A4 = 1.29150e−06 |
| 21th surface |
| k = 0.000<br>A4 = 1.11008e−06 |
| 22th surface |
| k = 0.000<br>A4 = 2.59060e−06 |
| 23th surface |
| k = 0.000<br>A4 = −1.53883e−06 |

| Various data | |
|---|---|
| NA | 0.23 |
| Magnification | −1.33 |
| Focal length | 7.55 |
| Image height(mm) | 4.92 |

-continued

| Unit mm | |
|---|---|
| fb(mm) (in air) | 1.75 |
| Lens total length(mm) (in air) | 49.05 |

Example 46

Unit mm

Surface data

| Surface no. | r | d | nd | νd | θgf |
|---|---|---|---|---|---|
| 1 | 71.023 | 2.80 | 1.84666 | 23.77 | 0.620 |
| 2* | −14.922 | 0.95 | | | |
| 3* | −12.661 | 0.70 | 1.58364 | 30.30 | 0.599 |
| 4* | 52.837 | 0.32 | | | |
| 5* | 34.772 | 2.72 | 1.49700 | 81.61 | 0.538 |
| 6 | −16.453 | 0.10 | | | |
| 7 | 17.240 | 2.71 | 1.49700 | 81.61 | 0.538 |
| 8* | −21.457 | 0.30 | | | |
| 9 | 17.407 | 2.53 | 1.61800 | 63.33 | 0.544 |
| 10 | −17.609 | 0.70 | 1.72047 | 34.71 | 0.583 |
| 11 | 7.015 | 1.23 | | | |
| 12(Stop) | ∞ | 0.75 | | | |
| 13 | −16.751 | 0.77 | 1.72047 | 34.71 | 0.583 |
| 14 | 18.568 | 1.71 | 1.61800 | 63.33 | 0.544 |
| 15 | 54.564 | 1.28 | | | |
| 16* | 16.776 | 3.75 | 1.49700 | 81.61 | 0.538 |
| 17* | −8.639 | 15.60 | | | |
| 18* | 12.605 | 2.73 | 1.63490 | 23.88 | 0.630 |
| 19* | 175.251 | 2.76 | | | |
| 20* | −17.864 | 0.70 | 1.53368 | 55.90 | 0.563 |
| 21* | 246.294 | 1.46 | | | |
| 22* | −11.062 | 0.70 | 1.53368 | 55.90 | 0.563 |
| 23* | 16.891 | 1.20 | | | |
| 24 | ∞ | 0.38 | 1.51640 | 65.06 | 0.535 |
| 25 | ∞ | 0.30 | | | |
| Image plane | ∞ | | | | |

Aspherical surface data

2nd surface k = −2.471

3rd surface k = 0.000
A4 = 1.72263e−04

4th surface k = 0.000
A4 = 3.64682e−05

5th surface k = 13.812
A4 = −1.65670e−04

8th surface k = −1.177
A4 = 8.11125e−05

16th surface k = −0.579
A4 = −1.27084e−04

17th surface k = 0.000
A4 = 4.62229e−05

18th surface k = 0.914
A4 = −7.54532e−06

-continued

Unit mm

19th surface k = 0.000
A4 = 1.97223e−06

20th surface k = 0.000
A4 = 4.00526e−07

21th surface k = 0.000
A4 = 8.92606e−07

22th surface k = 0.000
A4 = 5.45128e−07

23th surface k = 0.000
A4 = −3.69544e−07

Various data

| | |
|---|---|
| NA | 0.20 |
| Magnification | −1.33 |
| Focal length | 7.55 |
| Image height(mm) | 4.92 |
| fb(mm) (in air) | 1.75 |
| Lens total length(mm) (in air) | 49.05 |

Example 47

Unit mm

Surface data

| Surface no. | r | d | nd | νd | θgf |
|---|---|---|---|---|---|
| 1 | 53.186 | 3.31 | 1.84666 | 23.77 | 0.620 |
| 2* | −15.475 | 0.51 | | | |
| 3* | −15.703 | 0.70 | 1.58364 | 30.30 | 0.599 |
| 4* | 13.712 | 0.34 | | | |
| 5* | 13.464 | 4.14 | 1.49700 | 81.61 | 0.538 |
| 6 | −19.181 | 0.10 | | | |
| 7 | 17.400 | 3.90 | 1.49700 | 81.61 | 0.538 |
| 8* | −17.175 | 0.30 | | | |
| 9 | 17.131 | 2.69 | 1.61800 | 63.33 | 0.544 |
| 10 | −20.225 | 0.70 | 1.72047 | 34.71 | 0.583 |
| 11 | 9.630 | 1.97 | | | |
| 12 (Stop) | ∞ | 2.03 | | | |
| 13 | −26.870 | 0.70 | 1.72047 | 34.71 | 0.583 |
| 14 | 7.211 | 2.12 | 1.61800 | 63.33 | 0.544 |
| 15 | 28.975 | 4.80 | | | |
| 16* | 14.848 | 5.21 | 1.49700 | 81.61 | 0.538 |
| 17* | −15.080 | 3.09 | | | |
| 18* | 17.473 | 2.77 | 1.63490 | 23.88 | 0.630 |
| 19* | −177.281 | 4.94 | | | |
| 20* | −18.091 | 0.70 | 1.53368 | 55.90 | 0.563 |
| 21* | 24.560 | 1.58 | | | |
| 22* | −15.011 | 0.70 | 1.53368 | 55.90 | 0.563 |
| 23* | 19.931 | 1.20 | | | |
| 24 | ∞ | 0.38 | 1.51640 | 65.06 | 0.535 |
| 25 | ∞ | 0.30 | | | |
| Image plane | ∞ | | | | |

Unit mm

Aspherical surface data

2nd surface k = −2.086

3rd surface k = 0.000
A4 = −2.15591e−05

4th surface k = 0.000
A4 = −1.47223e−04

5th surface k = −0.289
A4 = −1.86447e−04

8th surface k = −1.390
A4 = 1.40344e−06

16th surface k = −0.579
A4 = −6.47710e−05

17th surface k = 0.000
A4 = 1.29548e−05

18th surface k = −0.598
A4 = −1.56300e−06

19th surface k = 0.000
A4 = −1.87807e−06

20th surface k = 0.000
A4 = 2.90468e−06

21th surface k = 0.000
A4 = −2.72835e−06

22th surface k = 0.000
A4 = 2.59014e−06

23th surface k = 0.000
A4 = −3.73844e−06

Various data

| | |
|---|---|
| NA | 0.23 |
| Magnification | −1.33 |
| Focal length | 8.00 |
| Image height (mm) | 4.92 |
| fb (mm) (in air) | 1.75 |
| Lens total length (mm) (in air) | 49.07 |

Example 48

Unit mm

Surface data

| Surface no. | r | d | nd | νd | θgf |
|---|---|---|---|---|---|
| 1 | −39350.564 | 2.80 | 1.84666 | 23.77 | 0.620 |
| 2* | −15.096 | 0.36 | | | |
| 3* | −15.047 | 0.70 | 1.58364 | 30.30 | 0.599 |
| 4* | 15.659 | 0.30 | | | |
| 5* | 14.778 | 3.69 | 1.49700 | 81.61 | 0.538 |
| 6 | −22.190 | 0.10 | | | |
| 7 | 19.531 | 4.09 | 1.49700 | 81.61 | 0.538 |
| 8* | −14.652 | 0.30 | | | |
| 9 | 17.123 | 2.28 | 1.61800 | 63.33 | 0.544 |
| 10 | 199.434 | 0.70 | 1.72047 | 34.71 | 0.583 |
| 11 | 10.381 | 4.19 | | | |
| 12 (Stop) | ∞ | 4.31 | | | |
| 13 | −76.959 | 0.70 | 1.72047 | 34.71 | 0.583 |
| 14 | 8.399 | 2.01 | 1.61800 | 63.33 | 0.544 |
| 15 | 22.390 | 3.54 | | | |
| 16* | 14.258 | 3.78 | 1.49700 | 81.61 | 0.538 |
| 17* | −14.525 | 2.72 | | | |
| 18* | 14.720 | 2.59 | 1.63490 | 23.88 | 0.630 |
| 19* | 53.371 | 4.84 | | | |
| 20* | −13.285 | 0.70 | 1.53368 | 55.90 | 0.563 |
| 21* | 25.319 | 1.55 | | | |
| 22* | −14.684 | 0.89 | 1.53368 | 55.90 | 0.563 |
| 23* | 31.963 | 1.20 | | | |
| 24 | ∞ | 0.38 | 1.51640 | 65.06 | 0.535 |
| 25 | ∞ | 0.30 | | | |
| Image plane | ∞ | | | | |

Aspherical surface data

2nd surface k = −0.684

3rd surface k = 0.000
A4 = −8.51383e−05

4th surface k = 0.000
A4 = −1.17461e−04

5th surface k = −0.882
A4 = −1.49470e−04

8th surface k = −0.931
A4 = 1.39588e−05

16th surface k = −0.579
A4 = −3.93181e−05

17th surface k = 0.000
A4 = 3.73980e−05

18th surface k = 0.481
A4 = 9.25556e−07

19th surface k = 0.000
A4 = −2.64171e−06

20th surface k = 0.000
A4 = 4.07916e−06

21th surface k = 0.000
A4 = −5.47250e−06

22th surface k = 0.000
A4 = 4.16590e−06

-continued

| Unit mm |
|---|
| 23th surface |
| k = 0.000<br>A4 = −6.37036e−06 |

| Various data | |
|---|---|
| NA | 0.20 |
| Magnification | −1.33 |
| Focal length | 7.74 |
| Image height (mm) | 4.92 |
| fb (mm) (in air) | 1.75 |
| Lens total length (mm) (in air) | 48.87 |

Example 49

Unit mm

Surface data

| Surface no. | r | d | nd | νd | θgf |
|---|---|---|---|---|---|
| 1 | −759.356 | 2.69 | 1.84666 | 23.77 | 0.620 |
| 2* | −16.189 | 0.67 | | | |
| 3* | −15.594 | 0.70 | 1.58364 | 30.30 | 0.599 |
| 4* | 13.189 | 0.30 | | | |
| 5* | 12.715 | 3.60 | 1.49700 | 81.61 | 0.538 |
| 6 | −30.208 | 0.10 | | | |
| 7 | 18.195 | 4.42 | 1.49700 | 81.61 | 0.538 |
| 8* | −14.458 | 0.30 | | | |
| 9 | 23.874 | 1.96 | 1.61800 | 63.33 | 0.544 |
| 10 | 58.560 | 0.70 | 1.72047 | 34.71 | 0.583 |
| 11 | 13.172 | 5.42 | | | |
| 12 (Stop) | ∞ | 5.58 | | | |
| 13 | 224.670 | 0.70 | 1.72047 | 34.71 | 0.583 |
| 14 | 9.058 | 2.04 | 1.61800 | 63.33 | 0.544 |
| 15 | 19.643 | 0.90 | | | |
| 16* | 9.888 | 3.32 | 1.49700 | 81.61 | 0.538 |
| 17* | −27.891 | 2.58 | | | |
| 18* | 9.778 | 2.40 | 1.63490 | 23.88 | 0.630 |
| 19* | 18.665 | 4.60 | | | |
| 20* | −8.157 | 0.70 | 1.53368 | 55.90 | 0.563 |
| 21* | 2626.112 | 1.31 | | | |
| 22* | −9.615 | 2.09 | 1.53368 | 55.90 | 0.563 |
| 23* | −515.428 | 1.20 | | | |
| 24 | ∞ | 0.38 | 1.51640 | 65.06 | 0.535 |
| 25 | ∞ | 0.30 | | | |
| Image plane | ∞ | | | | |

Aspherical surface data

2nd surface k = −0.608

3rd surface k = 0.000
A4 = −9.35581e−05

4th surface k = 0.000
A4 = −1.70494e−04

5th surface k = −1.128
A4 = −1.69703e−04

8th surface k = −1.027
A4 = 9.58875e−06

-continued

Unit mm

16th surface k = −0.579
A4 = 8.05044e−05

17th surface k = 0.000
A4 = 9.03489e−05

18th surface k = −0.016
A4 = 3.31417e−06

19th surface k = 0.000
A4 = −2.16071e−06

20th surface k = 0.000
A4 = 2.33119e−06

21th surface k = 0.000
A4 = −5.11799e−06

22th surface k = 0.000
A4 = 2.87005e−06

23th surface k = 0.000
A4 = −7.50459e−06

| Various data | |
|---|---|
| NA | 0.20 |
| Magnification | −1.33 |
| Focal length | 7.45 |
| Image height (mm) | 4.92 |
| fb (mm) (in air) | 1.76 |
| Lens total length (mm) (in air) | 48.85 |

Example 50

Unit mm

Surface data

| Surface no. | r | d | nd | νd | θgf |
|---|---|---|---|---|---|
| 1* | 52.649 | 2.73 | 1.84666 | 23.77 | 0.620 |
| 2* | −38.622 | 2.79 | | | |
| 3 | −19.976 | 2.81 | 1.65412 | 39.68 | 0.574 |
| 4 | 30.338 | 0.20 | | | |
| 5* | 20.044 | 4.31 | 1.49700 | 81.61 | 0.538 |
| 6 | −18.337 | 0.10 | | | |
| 7 | 10.677 | 4.30 | 1.49700 | 81.61 | 0.538 |
| 8* | 161.939 | 0.12 | | | |
| 9 | 24.169 | 3.23 | 1.61800 | 63.33 | 0.544 |
| 10 | −32.541 | 0.71 | 1.72047 | 34.71 | 0.583 |
| 11 | 12.119 | 0.91 | | | |
| 12 (Stop) | ∞ | 0.15 | | | |
| 13 | 49.063 | 0.77 | 1.90366 | 31.32 | 0.595 |
| 14 | 7.771 | 1.92 | 1.61800 | 63.33 | 0.544 |
| 15 | 10.588 | 0.20 | | | |
| 16* | 6.409 | 4.13 | 1.49700 | 81.61 | 0.538 |
| 17* | −23.504 | 1.62 | | | |
| 18* | −223.234 | 0.71 | 1.49700 | 81.61 | 0.538 |
| 19* | 6.065 | 7.57 | | | |
| 20* | 20.127 | 3.49 | 1.58364 | 30.30 | 0.599 |
| 21* | −9.164 | 2.84 | | | |

-continued

| Unit mm | | | | | |
|---|---|---|---|---|---|
| 22* | −13.178 | 0.79 | 1.53368 | 55.90 | 0.563 |
| 23* | 11.671 | 9.70 | | | |
| 24 | ∞ | 0.38 | 1.51640 | 65.06 | 0.535 |
| 25 | ∞ | 0.30 | | | |
| Image plane | ∞ | | | | |

Aspherical surface data

1st surface k = 0.000
A4 = 5.94361e−05

2nd surface k = 0.000
A4 = 5.27712e−05

5th surface k = −0.816
A4 = −7.30838e−06

8th surface k = 0.000
A4 = 1.01191e−04

16th surface k = −0.579
A4 = −6.69835e−05

17th surface k = 0.000
A4 = −5.31017e−05

18th surface k = 0.000
A4 = −5.11715e−04

19th surface k = 0.000
A4 = −4.64797e−04

20th surface k = 0.000
A4 = −2.92520e−04

21th surface k = 0.000
A4 = 1.24424e−04

22th surface k = 0.000
A4 = 9.16605e−05

23th surface k = 0.000
A4 = −5.17129e−04, A6 = −2.60414e−06

Various data

| | |
|---|---|
| NA | 0.17 |
| Magnification | −1.40 |
| Focal length | 14.81 |
| Image height (mm) | 4.92 |
| fb (mm) (in air) | 10.25 |
| Lens total length (mm) (in air) | 56.63 |

Example 51

Unit mm

Surface data

| Surface no. | r | d | nd | νd | θgf |
|---|---|---|---|---|---|
| 1* | 48.290 | 4.00 | 1.84666 | 23.77 | 0.620 |
| 2* | −46.881 | 2.58 | | | |
| 3 | −22.804 | 1.76 | 1.65412 | 39.68 | 0.574 |
| 4 | 27.062 | 0.14 | | | |
| 5* | 18.619 | 5.28 | 1.49700 | 81.61 | 0.538 |
| 6 | −19.533 | 0.10 | | | |
| 7 | 10.604 | 4.45 | 1.49700 | 81.61 | 0.538 |
| 8* | 131.823 | 0.10 | | | |
| 9 | 23.442 | 3.28 | 1.61800 | 63.33 | 0.544 |
| 10 | −31.030 | 0.70 | 1.72047 | 34.71 | 0.583 |
| 11 | 11.383 | 1.20 | | | |
| 12 (Stop) | ∞ | −0.09 | | | |
| 13 | 36.337 | 0.70 | 1.90366 | 31.32 | 0.595 |
| 14 | 7.635 | 2.06 | 1.61800 | 63.33 | 0.544 |
| 15 | 10.913 | 0.10 | | | |
| 16* | 6.511 | 4.50 | 1.49700 | 81.61 | 0.538 |
| 17* | −24.120 | 1.67 | | | |
| 18* | −46.412 | 0.73 | 1.49700 | 81.61 | 0.538 |
| 19* | 6.211 | 4.33 | | | |
| 20* | 16.578 | 3.80 | 1.58364 | 30.30 | 0.599 |
| 21* | −8.549 | 2.73 | | | |
| 22* | −9.091 | 0.70 | 1.53368 | 55.90 | 0.563 |
| 23* | 18.805 | 10.20 | | | |
| 24 | ∞ | 0.38 | 1.51640 | 65.06 | 0.535 |
| 25 | ∞ | 0.30 | | | |
| Image plane | ∞ | | | | |

Aspherical surface data

1st surface k = 0.000
A4 = 5.83731e−05

2nd surface k = 0.000
A4 = 5.27684e−05

5th surface k = −0.912
A4 = −8.58617e−06

8th surface k = 0.000
A4 = 1.02848e−04

16th surface k = −0.579
A4 = −3.17468e−05

17th surface k = 0.000
A4 = −1.40882e−04

18th surface k = 0.000
A4 = −7.46576e−04

19th surface k = 0.000
A4 = −6.42486e−04

20th surface k = 0.000
A4 = −2.69039e−04

-continued

| Unit mm |
|---|
| 21th surface |
| k = 0.000<br>A4 = 1.54596e−04 |
| 22th surface |
| k = 0.000<br>A4 = 1.25420e−04 |
| 23th surface |
| k = 0.000<br>A4 = −5.64464e−04, A6 = −5.63513e−07 |

| Various data | |
|---|---|
| NA | 0.20 |
| Magnification | −1.33 |
| Focal length | 14.41 |
| Image height (mm) | 4.92 |
| fb (mm) (in air) | 10.75 |
| Lens total length (mm) (in air) | 55.55 |

Example 52

Unit mm

Surface data

| Surface no. | r | d | nd | νd | θgf |
|---|---|---|---|---|---|
| 1* | 51.478 | 3.20 | 1.84666 | 23.77 | 0.620 |
| 2* | −38.560 | 2.65 | | | |
| 3 | −19.565 | 3.38 | 1.65412 | 39.68 | 0.574 |
| 4 | 30.186 | 0.21 | | | |
| 5* | 19.873 | 4.50 | 1.49700 | 81.61 | 0.538 |
| 6 | −18.633 | 0.10 | | | |
| 7 | 10.628 | 4.21 | 1.49700 | 81.61 | 0.538 |
| 8* | 212.692 | 0.10 | | | |
| 9 | 24.897 | 3.19 | 1.61800 | 63.33 | 0.544 |
| 10 | −30.693 | 0.70 | 1.72047 | 34.71 | 0.583 |
| 11 | 12.401 | 0.90 | | | |
| 12 (Stop) | ∞ | 0.10 | | | |
| 13 | 55.667 | 0.70 | 1.90366 | 31.32 | 0.595 |
| 14 | 7.805 | 1.84 | 1.61800 | 63.33 | 0.544 |
| 15 | 10.579 | 0.30 | | | |
| 16* | 6.428 | 4.02 | 1.49700 | 81.61 | 0.538 |
| 17* | −23.103 | 1.57 | | | |
| 18* | −110.480 | 0.70 | 1.49700 | 81.61 | 0.538 |
| 19* | 6.147 | 6.35 | | | |
| 20* | 17.957 | 3.44 | 1.58364 | 30.30 | 0.599 |
| 21* | −9.569 | 2.94 | | | |
| 22* | −11.357 | 0.70 | 1.53368 | 55.90 | 0.563 |
| 23* | 14.587 | 11.70 | | | |
| 24 | ∞ | 0.38 | 1.51640 | 65.06 | 0.535 |
| 25 | ∞ | 0.30 | | | |
| Image plane | ∞ | | | | |

| Aspherical surface data |
|---|
| 1st surface |
| k = 0.000<br>A4 = 6.61716e−05 |
| 2nd surface |
| k = 0.000<br>A4 = 5.97222e−05 |
| 5th surface |
| k = −0.834<br>A4 = −2.83924e−06 |
| 8th surface |
| k = 0.000<br>A4 = 1.05701e−04 |
| 16th surface |
| k = −0.579<br>A4 = −6.90189e−05 |
| 17th surface |
| k = 0.000<br>A4 = −5.47808e−05 |
| 18th surface |
| k = 0.000<br>A4 = −4.86035e−04 |
| 19th surface |
| k = 0.000<br>A4 = −5.42665e−04 |
| 20th surface |
| k = 0.000<br>A4 = −3.04526e−04 |
| 21th surface |
| k = 0.000<br>A4 = 2.66622e−05 |
| 22th surface |
| k = 0.000<br>A4 = −2.09838e−04 |
| 23th surface |
| k = 0.000<br>A4 = −6.85269e−04, A6 = −2.12762e−06 |

| Various data | |
|---|---|
| NA | 0.17 |
| Magnification | −1.40 |
| Focal length | 15.30 |
| Image height (mm) | 4.92 |
| fb (mm) (in air) | 12.25 |
| Lens total length (mm) (in air) | 58.05 |

Example 53

Unit mm

Surface data

| Surface no. | r | d | nd | νd | θgf |
|---|---|---|---|---|---|
| 1* | 70.275 | 2.70 | 1.84666 | 23.77 | 0.620 |
| 2* | −30.659 | 2.30 | | | |
| 3 | −17.537 | 2.26 | 1.65412 | 39.68 | 0.574 |
| 4 | 35.866 | 0.35 | | | |
| 5* | 27.673 | 3.95 | 1.49700 | 81.61 | 0.538 |
| 6 | −17.104 | 0.10 | | | |
| 7 | 9.747 | 3.94 | 1.49700 | 81.61 | 0.538 |
| 8* | 162.593 | 0.10 | | | |
| 9 | 24.099 | 3.09 | 1.61800 | 63.33 | 0.544 |
| 10 | −26.964 | 0.70 | 1.72047 | 34.71 | 0.583 |
| 11 | 12.683 | 0.88 | | | |
| 12 (Stop) | ∞ | 0.07 | | | |
| 13 | 64.816 | 0.70 | 1.90366 | 31.32 | 0.595 |

-continued

| Unit mm | | | | | |
|---|---|---|---|---|---|
| 14 | 7.829 | 1.84 | 1.61800 | 63.33 | 0.544 |
| 15 | 10.768 | 0.10 | | | |
| 16* | 6.611 | 3.23 | 1.49700 | 81.61 | 0.538 |
| 17* | −21.476 | 1.33 | | | |
| 18* | −267.827 | 0.70 | 1.49700 | 81.61 | 0.538 |
| 19* | 6.489 | 6.45 | | | |
| 20* | 23.224 | 3.31 | 1.58364 | 30.30 | 0.599 |
| 21* | −9.742 | 3.29 | | | |
| 22* | −7.668 | 0.70 | 1.53368 | 55.90 | 0.563 |
| 23* | 185.012 | 13.20 | | | |
| 24 | ∞ | 0.38 | 1.51640 | 65.06 | 0.535 |
| 25 | ∞ | 0.30 | | | |
| Image plane | ∞ | | | | |

Aspherical surface data

1st surface k = 0.000
A4 = 9.37043e−05

2nd surface k = 0.000
A4 = 8.05222e−05

5th surface k = 0.415
A4 = 9.29789e−06

8th surface k = 0.000
A4 = 1.46231e−04

16th surface k = −0.579
A4 = −1.60507e−04

17th surface k = 0.000
A4 = 1.24501e−04

18th surface k = 0.000
A4 = −1.08756e−04

19th surface k = 0.000
A4 = −6.99654e−04

20th surface k = 0.000
A4 = −3.08028e−04

21th surface k = 0.000
A4 = −1.14935e−04

22th surface k = 0.000
A4 = −6.53850e−04

23th surface k = 0.000
A4 = −9.34773e−04, A6 = 6.44915e−07

Various data

| | |
|---|---|
| NA | 0.17 |
| Magnification | −1.40 |
| Focal length | 15.97 |
| Image height (mm) | 4.92 |
| fb (mm) (in air) | 13.75 |
| Lens total length (mm) (in air) | 55.83 |

Example 54

Unit mm

Surface data

| Surface no. | r | d | nd | νd | θgf |
|---|---|---|---|---|---|
| 1* | 51.478 | 3.20 | 1.84666 | 23.77 | 0.620 |
| 2* | −38.560 | 2.65 | | | |
| 3 | −19.565 | 3.38 | 1.65412 | 39.68 | 0.574 |
| 4 | 30.186 | 0.21 | | | |
| 5* | 19.873 | 4.50 | 1.49700 | 81.61 | 0.538 |
| 6 | −18.633 | 0.10 | | | |
| 7 | 10.628 | 4.21 | 1.49700 | 81.61 | 0.538 |
| 8* | 212.692 | 0.10 | | | |
| 9 | 24.897 | 3.19 | 1.61800 | 63.33 | 0.544 |
| 10 | −30.693 | 0.70 | 1.72047 | 34.71 | 0.583 |
| 11 | 12.401 | 0.90 | | | |
| 12 (Stop) | ∞ | 0.10 | | | |
| 13 | 55.667 | 0.70 | 1.90366 | 31.32 | 0.595 |
| 14 | 7.805 | 1.84 | 1.61800 | 63.33 | 0.544 |
| 15 | 10.579 | 0.30 | | | |
| 16* | 6.428 | 4.02 | 1.49700 | 81.61 | 0.538 |
| 17* | −23.103 | 1.57 | | | |
| 18* | −110.480 | 0.70 | 1.49700 | 81.61 | 0.538 |
| 19* | 6.147 | 6.35 | | | |
| 20* | 17.957 | 3.44 | 1.58364 | 30.30 | 0.599 |
| 21* | −9.569 | 2.94 | | | |
| 22* | −11.357 | 0.70 | 1.53368 | 55.90 | 0.563 |
| 23* | 14.587 | 11.70 | | | |
| 24 | ∞ | 0.38 | 1.51640 | 65.06 | 0.535 |
| 25 | ∞ | 0.30 | | | |
| Image plane | ∞ | | | | |

Aspherical surface data

1st surface k = 0.000
A4 = 6.61716e−05

2nd surface k = 0.000
A4 = 5.97222e−05

5th surface k = −0.834
A4 = −2.83924e−06

8th surface k = 0.000
A4 = 1.05701e−04

16th surface k = −0.579
A4 = −6.90189e−05

17th surface k = 0.000
A4 = −5.47808e−05

18th surface k = 0.000
A4 = −4.86035e−04

19th surface k = 0.000
A4 = −5.42665e−04

20th surface k = 0.000
A4 = −3.04526e−04

21th surface k = 0.000
A4 = 2.66622e−05

-continued

| Unit mm |
|---|
| 22th surface |
| k = 0.000<br>A4 = −2.09838e−04 |
| 23th surface |
| k = 0.000<br>A4 = −6.85269e−04, A6 = −2.12762e−06 |

| Various data | |
|---|---|
| NA | 0.17 |
| Magnification | −1.40 |
| Focal length | 15.30 |
| Image height (mm) | 4.92 |
| fb (mm) (in air) | 12.25 |
| Lens total length (mm) (in air) | 58.05 |

Example 55

Unit mm

Surface data

| Surface no. | r | d | nd | νd | θgf |
|---|---|---|---|---|---|
| 1* | 25.913 | 2.07 | 1.84666 | 23.77 | 0.620 |
| 2* | 31.151 | 0.30 | | | |
| 3* | 17.097 | 6.09 | 1.49700 | 81.61 | 0.538 |
| 4 | −111.014 | 0.10 | | | |
| 5 | 16.382 | 3.66 | 1.49700 | 81.61 | 0.538 |
| 6* | 76.965 | 0.10 | | | |
| 7 | 12.471 | 5.23 | 1.61800 | 63.33 | 0.544 |
| 8 | −19.985 | 0.70 | 1.72047 | 34.71 | 0.583 |
| 9 | 10.437 | 1.53 | | | |
| 10 (Stop) | ∞ | −0.40 | | | |
| 11 | 15.326 | 0.70 | 1.90366 | 31.32 | 0.595 |
| 12 | 5.760 | 2.24 | 1.61800 | 63.33 | 0.544 |
| 13 | 7.466 | 0.10 | | | |
| 14* | 5.529 | 3.20 | 1.49700 | 81.61 | 0.538 |
| 15 | −250.000 | 0.93 | | | |
| 16* | −31.020 | 1.06 | 1.49700 | 81.61 | 0.538 |
| 17* | 6.332 | 2.81 | | | |
| 18* | 13.296 | 4.02 | 1.58364 | 30.30 | 0.599 |
| 19* | −8.640 | 0.80 | | | |
| 20* | −7.506 | 4.48 | 1.53368 | 55.90 | 0.563 |
| 21* | −8.795 | 0.39 | | | |
| 22 | −11.302 | 2.00 | 1.53368 | 55.90 | 0.563 |
| 23* | 23.373 | 2.15 | | | |
| 24 | ∞ | 0.38 | 1.51640 | 65.06 | 0.535 |
| 25 | ∞ | 0.31 | | | |
| Image plane | ∞ | | | | |

Aspherical surface data

| |
|---|
| 1st surface |
| k = 0.000<br>A4 = 9.25518e−06 |
| 2nd surface |
| k = 0.000<br>A4 = 8.47403e−06 |
| 3rd surface |
| k = −0.200<br>A4 = 2.89370e−06 |
| 6th surface |
| k = 0.000<br>A4 = 6.07603e−05 |

-continued

| Unit mm |
|---|
| 14th surface |
| k = −0.579<br>A4 = 2.14569e−05, A6 = 8.56596e−07 |
| 16th surface |
| k = 0.000<br>A4 = −1.21434e−05 |
| 17th surface |
| k = 0.000<br>A4 = 1.82906e−06 |
| 18th surface |
| k = 0.000<br>A4 = −5.24617e−05 |
| 19th surface |
| k = 0.000<br>A4 = −1.13335e−06 |
| 20th surface |
| k = 0.000<br>A4 = 1.01208e−05 |
| 21th surface |
| k = 0.000<br>A4 = −2.49639e−05 |
| 23th surface |
| k = 0.000<br>A4 = −2.94354e−05, A6 = −6.86427e−06 |

| Various data | |
|---|---|
| NA | 0.23 |
| Magnification | −1.10 |
| Focal length | 12.36 |
| Image height (mm) | 4.92 |
| fb (mm) (in air) | 2.72 |
| Lens total length (mm) (in air) | 44.83 |

Example 56

Unit mm

Surface data

| Surface no. | r | d | nd | νd | θgf |
|---|---|---|---|---|---|
| 1 | 22.916 | 1.51 | 1.60999 | 27.48 | 0.620 |
| 2 | 44.302 | 0.00 | 1001.00000 | −3.45 | 0.296 |
| 3 | 44.303 | 0.20 | 1.63762 | 34.21 | 0.594 |
| 4 | 44.214 | 0.75 | | | |
| 5* | 11.892 | 4.50 | 1.49700 | 81.61 | 0.538 |
| 6 | −75.023 | 0.10 | | | |
| 7 | 16.979 | 2.78 | 1.49700 | 81.61 | 0.538 |
| 8* | 35.199 | 0.71 | | | |
| 9 | 19.063 | 2.75 | 1.61800 | 63.33 | 0.544 |
| 10 | −18.581 | 0.77 | 1.72047 | 34.71 | 0.583 |
| 11 | 33.626 | 1.26 | | | |
| 12 (Stop) | ∞ | 0.30 | | | |
| 13 | 29.197 | 0.83 | 1.90366 | 31.32 | 0.595 |
| 14 | 5.383 | 1.47 | 1.61800 | 63.33 | 0.544 |
| 15 | 9.288 | 0.91 | | | |
| 16* | 6.872 | 3.01 | 1.49700 | 81.61 | 0.538 |
| 17* | 12.602 | 1.91 | | | |
| 18* | −9.053 | 3.06 | 1.49700 | 81.61 | 0.538 |
| 19* | −10.553 | 0.91 | | | |
| 20* | 12.072 | 3.90 | 1.58364 | 30.30 | 0.599 |
| 21* | −24.825 | 1.94 | | | |
| 22* | −19.526 | 1.01 | 1.49700 | 81.61 | 0.538 |
| 23* | 11.127 | 7.48 | | | |

-continued

| Unit mm | | | | | |
|---|---|---|---|---|---|
| 24* | −59.537 | 1.12 | 1.53368 | 55.90 | 0.563 |
| 25* | 19.034 | 1.10 | | | |
| 26 | ∞ | 0.38 | 1.51640 | 65.06 | 0.535 |
| 27 | ∞ | 0.41 | | | |
| Image plane | ∞ | | | | |

Aspherical surface data

5th surface k = −0.513
A4 = −1.39397e−05

8th surface k = 0.000
A4 = 7.69283e−05

16th surface k = −0.579
A4 = −1.27245e−04

17th surface k = 0.000
A4 = −2.00147e−04

18th surface k = 0.000
A4 = −1.96482e−04

19th surface k = 0.000
A4 = −5.46173e−07

20th surface k = 0.000
A4 = −4.97701e−05

21th surface k = 0.000
A4 = 5.00869e−05

22th surface k = 0.000
A4 = −1.31586e−04

23th surface k = 0.000
A4 = −1.81687e−04

24th surface k = 0.000
A4 = −3.30547e−04

25th surface k = 0.000
A4 = −3.69284e−04, A6 = −2.84789e−06

Various data

| | |
|---|---|
| NA | 0.20 |
| Magnification | −1.56 |
| Focal length | 7.72 |
| Image height (mm) | 4.92 |
| fb (mm) (in air) | 1.76 |
| Lens total length (mm) (in air) | 44.95 |

Example 57

Unit mm

Surface data

| Surface no. | r | d | nd | νd | θgf |
|---|---|---|---|---|---|
| 1* | 14.849 | 2.81 | 1.84666 | 23.77 | 0.620 |
| 2* | 24.251 | 1.16 | | | |
| 3* | 11.029 | 2.65 | 1.49700 | 81.61 | 0.538 |
| 4 | −159.692 | 0.10 | | | |
| 5 | 24.766 | 1.11 | 1.60999 | 27.48 | 0.620 |
| 6 | 25.004 | 0.00 | 1001.00000 | −3.45 | 0.296 |
| 7 | 25.005 | 0.20 | 1.63762 | 34.21 | 0.594 |
| 8 | 24.343 | 0.11 | | | |
| 9 | 16.634 | 2.86 | 1.61800 | 63.33 | 0.544 |
| 10 | −14.550 | 0.72 | 1.72047 | 34.71 | 0.583 |
| 11 | 28.345 | 0.47 | | | |
| 12 (Stop) | ∞ | −0.05 | | | |
| 13 | 28.631 | 0.72 | 1.90366 | 31.32 | 0.595 |
| 14 | 6.286 | 1.64 | 1.61800 | 63.33 | 0.544 |
| 15 | 14.078 | 5.35 | | | |
| 16* | 7.582 | 3.02 | 1.49700 | 81.61 | 0.538 |
| 17* | 14.928 | 8.00 | | | |
| 18* | 15.671 | 3.78 | 1.58364 | 30.30 | 0.599 |
| 19* | −20.144 | 1.79 | | | |
| 20* | −10.482 | 0.70 | 1.49700 | 81.61 | 0.538 |
| 21* | 8.846 | 3.50 | | | |
| 22* | 13.317 | 2.28 | 1.53368 | 55.90 | 0.563 |
| 23* | 9.855 | 2.70 | | | |
| 24 | ∞ | 0.38 | 1.51640 | 65.06 | 0.535 |
| 25 | ∞ | 0.30 | | | |
| Image plane | ∞ | | | | |

Aspherical surface data

1st surface k = 0.000
A4 = 1.89575e−05

2nd surface k = 0.000
A4 = 2.05342e−05

3rd surface k = −1.001
A4 = −2.79051e−05

16th surface k = −0.579
A4 = −9.97074e−05

17th surface k = 0.000
A4 = 4.56155e−05

18th surface k = 0.000
A4 = −1.55616e−04

19th surface k = 0.000
A4 = −9.53455e−05

20th surface k = 0.000
A4 = 6.03104e−05

21th surface k = 0.000
A4 = 5.76196e−05

22th surface k = 0.000
A4 = 5.52326e−05

-continued

| Unit mm |
|---|

23th surface k = 0.000
A4 = −1.67453e−04, A6 = −3.57134e−06

| Various data | |
|---|---|
| NA | 0.20 |
| Magnification | −1.60 |
| Focal length | 8.33 |
| Image height (mm) | 4.92 |
| fb (mm) (in air) | 3.25 |
| Lens total length (mm) (in air) | 46.16 |

Example 58

Unit mm

Surface data

| Surface no. | r | d | nd | νd | θgf |
|---|---|---|---|---|---|
| 1* | 23.262 | 3.28 | 1.84666 | 23.77 | 0.620 |
| 2* | 191.812 | 1.33 | | | |
| 3 | 53.883 | 0.50 | 1.62588 | 35.70 | 0.589 |
| 4 | 14.902 | 0.14 | | | |
| 5* | 13.978 | 5.96 | 1.49700 | 81.61 | 0.538 |
| 6 | −29.978 | 0.10 | | | |
| 7 | 15.765 | 3.37 | 1.49700 | 81.61 | 0.538 |
| 8* | 510.224 | 0.10 | | | |
| 9 | 32.798 | 3.12 | 1.61800 | 63.33 | 0.544 |
| 10 | −19.809 | 0.50 | 1.72047 | 34.71 | 0.583 |
| 11 | 12.325 | 1.78 | | | |
| 12 (Stop) | ∞ | 0.78 | | | |
| 13 | −140.812 | 0.50 | 1.90366 | 31.32 | 0.595 |
| 14 | 9.869 | 2.61 | 1.61800 | 63.33 | 0.544 |
| 15 | 113.862 | 2.42 | | | |
| 16* | 11.277 | 3.74 | 1.49700 | 81.61 | 0.538 |
| 17* | −59.524 | 8.10 | | | |
| 18* | −3485.657 | 0.70 | 1.49700 | 81.61 | 0.538 |
| 19* | 9.598 | 0.46 | | | |
| 20 | 9.139 | 5.57 | 1.60999 | 27.48 | 0.620 |
| 21 | −16.931 | 0.00 | 1001.00000 | −3.45 | 0.296 |
| 22 | −16.932 | 0.20 | 1.63762 | 34.21 | 0.594 |
| 23 | −49.525 | 3.11 | | | |
| 24* | −7.878 | 1.91 | 1.53368 | 55.90 | 0.563 |
| 25* | 24.022 | 3.30 | | | |
| 26 | ∞ | 0.38 | 1.51640 | 65.06 | 0.535 |
| 27 | ∞ | 0.31 | | | |
| Image plane | ∞ | | | | |

Aspherical surface data

1st surface k = 0.000
A4 = 1.21996e−05

2nd surface k = 0.000
A4 = 2.73727e−05

5th surface k = −0.165
A4 = −1.19710e−05

8th surface k = 0.000
A4 = 3.40041e−05

16th surface k = −0.579
A4 = −1.81901e−05, A6 = 2.18274e−07

-continued

| Unit mm |
|---|

17th surface k = 0.000
A4 = −9.14712e−05, A6 = 5.79438e−07

18th surface k = 0.000
A4 = −2.04464e−04

19th surface k = 0.000
A4 = 3.63528e−05

24th surface k = 0.000
A4 = −3.43309e−05

25th surface k = 0.000
A4 = −4.64396e−04

| Various data | |
|---|---|
| NA | 0.23 |
| Magnification | −1.33 |
| Focal length | 9.33 |
| Image height (mm) | 4.92 |
| fb (mm) (in air) | 3.86 |
| Lens total length (mm) (in air) | 54.14 |

Example 59

Unit mm

Surface data

| Surface no. | r | d | nd | νd | θgf |
|---|---|---|---|---|---|
| 1* | 22.101 | 3.18 | 1.84666 | 23.77 | 0.620 |
| 2* | 124.650 | 0.30 | | | |
| 3 | 114.152 | 0.70 | 1.62588 | 35.70 | 0.589 |
| 4 | 16.412 | 0.30 | | | |
| 5* | 13.305 | 5.99 | 1.49700 | 81.61 | 0.538 |
| 6 | −31.233 | 0.30 | | | |
| 7 | 17.773 | 3.61 | 1.49700 | 81.61 | 0.538 |
| 8* | −77.787 | 0.30 | | | |
| 9 | 40.293 | 3.15 | 1.61800 | 63.33 | 0.544 |
| 10 | −16.251 | 0.70 | 1.72047 | 34.71 | 0.583 |
| 11 | 16.421 | 1.03 | | | |
| 12 (Stop) | ∞ | 0.57 | | | |
| 13 | −40.907 | 0.70 | 1.90366 | 31.32 | 0.595 |
| 14 | 9.293 | 3.10 | 1.61800 | 63.33 | 0.544 |
| 15 | −40.883 | 1.32 | | | |
| 16* | 12.708 | 2.72 | 1.60999 | 27.48 | 0.620 |
| 17 | 27.809 | 0.00 | 1001.00000 | −3.45 | 0.296 |
| 18 | 27.809 | 0.20 | 1.63762 | 34.21 | 0.594 |
| 19* | 27.322 | 6.28 | | | |
| 20* | 28.448 | 1.49 | 1.49700 | 81.61 | 0.538 |
| 21* | 12.258 | 7.34 | | | |
| 22* | 10.768 | 3.89 | 1.58364 | 30.30 | 0.599 |
| 23* | −26.410 | 3.22 | | | |
| 24* | −9.722 | 0.95 | 1.53368 | 55.90 | 0.563 |
| 25* | 10.802 | 3.19 | | | |
| 26 | ∞ | 0.38 | 1.51640 | 65.06 | 0.535 |
| 27 | ∞ | 0.30 | | | |
| Image plane | ∞ | | | | |

Aspherical surface data

1st surface k = 0.000
A4 = 1.81664e−05

-continued

| Unit mm |
|---|
| 2nd surface |
| k = 0.000<br>A4 = 3.17867e−05 |
| 5th surface |
| k = −0.472<br>A4 = −1.54652e−05 |
| 8th surface |
| k = 0.000<br>A4 = 2.70940e−05 |
| 16th surface |
| k = −0.579<br>A4 = 5.37723e−05, A6 = 1.28843e−06 |
| 19th surface |
| k = 0.000<br>A4 = 7.64130e−05, A6 = 1.59199e−06 |
| 20th surface |
| k = 0.000<br>A4 = 2.38574e−05 |
| 21th surface |
| k = 0.000<br>A4 = −5.41581e−05 |
| 22th surface |
| k = 0.000<br>A4 = −9.20996e−05 |
| 23th surface |
| k = 0.000<br>A4 = 1.48765e−05 |
| 24th surface |
| k = 0.000<br>A4 = 2.30798e−04 |
| 25th surface |
| k = 0.000<br>A4 = −1.65854e−04 |

| Various data | |
|---|---|
| NA | 0.23 |
| Magnification | −1.33 |
| Focal length | 10.42 |
| Image height (mm) | 4.92 |
| fb (mm) (in air) | 3.74 |
| Lens total length (mm) (in air) | 55.07 |

Example 60

Unit mm

Surface data

| Surface no. | r | d | nd | νd | θgf |
|---|---|---|---|---|---|
| 1* | 30.853 | 3.59 | 1.84666 | 23.77 | 0.620 |
| 2* | −228.348 | 0.30 | | | |
| 3 | 34.422 | 0.70 | 1.62588 | 35.70 | 0.589 |
| 4 | 14.782 | 0.30 | | | |
| 5* | 12.104 | 6.41 | 1.49700 | 81.61 | 0.538 |
| 6 | −35.889 | 0.30 | | | |
| 7 | −49.464 | 0.20 | 1.63762 | 34.21 | 0.594 |
| 8 | −49.078 | 0.00 | 1001.00000 | −3.45 | 0.296 |
| 9 | −49.077 | 0.70 | 1.60999 | 27.48 | 0.620 |
| 10 | −60.906 | 0.30 | | | |
| 11 | 16.056 | 4.14 | 1.61800 | 63.33 | 0.544 |
| 12 | −51.065 | 0.70 | 1.72047 | 34.71 | 0.583 |
| 13 | 11.329 | 1.50 | | | |
| 14 (Stop) | ∞ | −0.25 | | | |
| 15 | 29.773 | 0.70 | 1.90366 | 31.32 | 0.595 |
| 16 | 8.337 | 3.21 | 1.61800 | 63.33 | 0.544 |
| 17 | 36.482 | 1.31 | | | |
| 18* | 10.000 | 3.43 | 1.49700 | 81.61 | 0.538 |
| 19* | 108.943 | 5.30 | | | |
| 20* | −760.614 | 0.70 | 1.49700 | 81.61 | 0.538 |
| 21* | 12.153 | 8.57 | | | |
| 22* | 10.932 | 4.26 | 1.58364 | 30.30 | 0.599 |
| 23* | −46.469 | 4.54 | | | |
| 24* | −10.332 | 0.75 | 1.53368 | 55.90 | 0.563 |
| 25* | 15.919 | 2.85 | | | |
| 26 | ∞ | 0.38 | 1.51640 | 65.06 | 0.535 |
| 27 | ∞ | 0.30 | | | |
| Image plane | ∞ | | | | |

| Aspherical surface data |
|---|
| 1st surface |
| k = 0.000<br>A4 = 9.77276e−06 |
| 2nd surface |
| k = 0.000<br>A4 = 1.67764e−05 |
| 5th surface |
| k = −0.659<br>A4 = 1.08105e−05 |
| 18th surface |
| k = −0.579<br>A4 = 5.63637e−06, A6 = 5.19107e−07 |
| 19th surface |
| k = 0.000<br>A4 = 2.26706e−06, A6 = 6.14099e−07 |
| 20th surface |
| k = 0.000<br>A4 = −3.93066e−06 |
| 21th surface |
| k = 0.000<br>A4 = 1.90962e−06 |
| 22th surface |
| k = 0.000<br>A4 = −3.81502e−05 |
| 23th surface |
| k = 0.000<br>A4 = 2.47354e−06 |
| 24th surface |
| k = 0.000<br>A4 = 7.91457e−06, A6 = 1.44833e−06 |
| 25th surface |
| k = 0.000<br>A4 = −1.11135e−05, A6 = −2.19459e−06 |

| Various data | |
|---|---|
| NA | 0.23 |
| Magnification | −1.33 |
| Focal length | 10.62 |
| Image height (mm) | 4.92 |
| fb (mm) (in air) | 3.41 |
| Lens total length (mm) (in air) | 55.07 |

Example 61

| Unit mm | | | | | |
|---|---|---|---|---|---|
| Surface data | | | | | |
| Surface no. | r | d | nd | νd | θgf |
| 1* | −8.586 | 6.54 | 1.53368 | 55.90 | 0.563 |
| 2* | −38.013 | 0.08 | | | |
| 3* | 23.658 | 5.62 | 1.63490 | 23.88 | 0.630 |
| 4* | −13.749 | 0.05 | | | |
| 5* | 483.930 | 0.50 | 1.58364 | 30.30 | 0.599 |
| 6* | 31.754 | 0.05 | | | |
| 7* | 10.006 | 6.19 | 1.49700 | 81.61 | 0.538 |
| 8* | −22.587 | 0.05 | | | |
| 9 | 36.901 | 4.56 | 1.61800 | 63.33 | 0.544 |
| 10 | −9.647 | 0.50 | 1.72047 | 34.71 | 0.583 |
| 11 | 15.812 | 1.63 | | | |
| 12(Stop) | ∞ | 0.83 | | | |
| 13 | −23.387 | 0.50 | 1.72047 | 34.71 | 0.583 |
| 14 | 18.752 | 3.04 | 1.61800 | 63.33 | 0.544 |
| 15 | −24.584 | 0.12 | | | |
| 16* | 13.844 | 5.92 | 1.49700 | 81.61 | 0.538 |
| 17* | −20.251 | 9.46 | | | |
| 18* | −10.122 | 5.91 | 1.58364 | 30.30 | 0.599 |
| 19* | −13.868 | 2.45 | | | |
| 20* | −9.722 | 7.60 | 1.58364 | 30.30 | 0.599 |
| 21* | −7.658 | 3.02 | | | |
| 22* | −16.164 | 3.70 | 1.63490 | 23.88 | 0.630 |
| 23* | −27.524 | 0.05 | | | |
| 24* | 7.572 | 5.94 | 1.53368 | 55.90 | 0.563 |
| 25* | 3.912 | 6.00 | | | |
| 26 | ∞ | 0.30 | 1.51640 | 65.06 | 0.535 |
| 27 | ∞ | 6.28 | | | |
| Image plane | ∞ | | | | |

Aspherical surface data

1st surface k = 0.580
A4 = −9.12075e−04, A6 = 5.36263e−05, A8 = −3.61636e−06

2nd surface k = 0.348
A4 = −6.71325e−04, A6 = 4.96564e−06, A8 = −1.02244e−07

3rd surface k = −0.448
A4 = 2.69179e−05, A6 = 2.59561e−07, A8 = 1.81093e−09

4th surface k = −2.729
A4 = 2.62358e−05, A6 = 1.66698e−06, A8 = −5.24204e−09

5th surface k = −2409.520
A4 = −5.88015e−06, A6 = −5.65544e−08

6th surface k = 0.023
A4 = 8.78714e−06, A6 = 4.93409e−09

7th surface k = −2.423
A4 = −3.77237e−05, A6 = −3.90286e−07, A8 = 6.14283e−09

8th surface k = 1.443
A4 = −3.05033e−05, A6 = 1.08600e−07, A8 = 1.41866e−09

16th surface k = −1.658
A4 = −1.51099e−05, A6 = 1.28932e−07, A8 = −7.26513e−10

17th surface k = 0.184
A4 = −2.43950e−05, A6 = −7.20933e−08, A8 = 4.75546e−10

-continued

Unit mm

18th surface k = 0.132
A4 = 6.92244e−06, A6 = 6.19572e−07, A8 = 8.38466e−09

19th surface k = −2.887
A4 = 8.20744e−06, A6 = −4.23855e−07, A8 = 2.80030e−09

20th surface k = −0.631
A4 = −4.16331e−06, A6 = −1.26465e−07, A8 = −9.14719e−09

21th surface k = −1.191
A4 = 5.22955e−05, A6 = −4.06789e−07, A8 = −1.05876e−09

22th surface k = −31.151
A4 = 7.85252e−05, A6 = −4.81367e−07, A8 = −3.45006e−09,
A10 = 2.89579e−12

23th surface k = −0.713
A4 = −4.71492e−05, A6 = −4.75038e−08, A8 = −1.74975e−10,
A10 = −7.97360e−12

24th surface k = −4.264
A4 = −3.18002e−04, A6 = 1.39934e−06, A8 = 7.25578e−09,
A10 = −5.39754e−11

25th surface k = −1.881
A4 = −3.56331e−04, A6 = 5.70132e−06, A8 = −5.32334e−08,
A10 = 2.10863e−10

| Various data | |
|---|---|
| NA | 0.60 |
| Magnification | −3.57 |
| Focal length | 8.96 |
| Image height(mm) | 7.93 |
| fb(mm) (in air) | 12.47 |
| Lens total length(mm) (in air) | 86.77 |

Example 62

| Unit mm | | | | | |
|---|---|---|---|---|---|
| Surface data | | | | | |
| Surface no. | r | d | nd | νd | θgf |
| 1* | −8.518 | 6.48 | 1.53368 | 55.90 | 0.563 |
| 2* | −38.017 | 0.07 | | | |
| 3* | 23.626 | 5.62 | 1.63490 | 23.88 | 0.630 |
| 4* | −13.766 | 0.05 | | | |
| 5* | 474.790 | 0.49 | 1.58364 | 30.30 | 0.599 |
| 6* | 31.840 | 0.05 | | | |
| 7* | 9.994 | 6.43 | 1.49700 | 81.61 | 0.538 |
| 8* | −22.550 | 0.06 | | | |
| 9 | 37.796 | 4.55 | 1.61800 | 63.33 | 0.544 |
| 10 | −9.723 | 0.50 | 1.72047 | 34.71 | 0.583 |
| 11 | 15.791 | 1.51 | | | |
| 12(Stop) | ∞ | 0.83 | | | |
| 13 | −23.405 | 0.50 | 1.72047 | 34.71 | 0.583 |
| 14 | 18.836 | 3.04 | 1.61800 | 63.33 | 0.544 |
| 15 | −24.432 | 0.05 | | | |
| 16* | 13.826 | 5.68 | 1.49700 | 81.61 | 0.538 |
| 17* | −20.280 | 9.47 | | | |
| 18* | −10.093 | 5.91 | 1.58364 | 30.30 | 0.599 |
| 19* | −13.913 | 3.08 | | | |

-continued

| Unit mm | | | | | |
|---|---|---|---|---|---|
| 20* | −9.681 | 7.68 | 1.58364 | 30.30 | 0.599 |
| 21* | −7.639 | 3.02 | | | |
| 22* | −16.165 | 3.77 | 1.63490 | 23.88 | 0.630 |
| 23* | −27.283 | 0.05 | | | |
| 24* | 7.584 | 5.93 | 1.53368 | 55.90 | 0.563 |
| 25* | 3.906 | 6.00 | | | |
| 26 | ∞ | 0.30 | 1.51640 | 65.06 | 0.535 |
| 27 | ∞ | 5.82 | | | |
| Image plane | ∞ | | | | |

Aspherical surface data

1st surface k = 0.475
A4 = −8.84441e−04, A6 = 6.04064e−05, A8 = −5.76698e−06

2nd surface k = −0.958
A4 = − 6.68132e−04, A6 = 5.04103e−06, A8 = −1.03257e−07

3rd surface k = −0.479
A4 = 2.66301e−05, A6 = 2.47046e−07, A8 = 1.70474e−09

4th surface k = −2.726
A4 = 2.62640e−05, A6 = 1.67016e−06, A8 = −5.41971e−09

5th surface k = −2345.875
A4 = −5.83422e−06, A6 = −4.85118e−08

6th surface k = −0.006
A4 = 8.68836e−06, A6 = −4.70192e−09

7th surface k = −2.425
A4 = −3.77595e−05, A6 = −3.84874e−07, A8 = 5.86446e−09

8th surface k = 1.450
A4 = −3.05845e−05, A6 = 1.01828e−07, A8 = 1.52990e−09

16th surface k = −1.658
A4 = −1.51124e−05, A6 = 1.26975e−07, A8 = −7.28488e−10

17th surface k = 0.179
A4 = −2.42938e−05, A6 = −6.94876e−08, A8 = 3.98116e−10

18th surface k = 0.132
A4 = 7.07169e−06, A6 = 6.32887e−07, A8 = 9.67925e−09

19th surface k = −2.890
A4 = 8.40985e−06, A6 = −4.16581e−07, A8 = 2.92048e−09

20th surface k = −0.632
A4 = −3.89651e−06, A6 = −1.34905e−07, A8 = −9.44213e−09

21th surface k = −1.191
A4 = 5.24213e−05, A6 = −4.02486e−07, A8 = −1.05494e−09

22th surface k = −30.784
A4 = 7.94179e−05, A6 = −4.73842e−07, A8 = −3.45074e−09,
A10 = 2.80530e−12

-continued

Unit mm

23th surface k = −0.621
A4 = −4.77440e−05, A6 = −4.56224e−08, A8 = −8.13918e−11,
A10 = −7.89572e−12

24th surface k = −4.243
A4 = −3.18831e−04, A6 = 1.39907e−06, A8 = 7.38731e−09,
A10 = −5.05176e−11

25th surface k = −1.870
A4 = −3.34225e−04, A6 = 5.68135e−06, A8 = −5.42846e−08,
A10 = 2.31442e−10

Various data

| | |
|---|---|
| NA | 0.60 |
| Magnification | −3.56 |
| Focal length | 8.92 |
| Image height(mm) | 7.93 |
| fb(mm) (in air) | 12.02 |
| Lens total length(mm) (in air) | 86.83 |

Example 63

Unit mm

Surface data

| Surface no. | r | d | nd | νd | θgf |
|---|---|---|---|---|---|
| 1* | −7.039 | 4.91 | 1.53368 | 55.90 | 0.563 |
| 2* | −17.920 | 0.05 | | | |
| 3* | 15.584 | 4.58 | 1.63490 | 23.88 | 0.630 |
| 4* | −12.462 | 0.05 | | | |
| 5* | 6.979 | 3.28 | 1.49700 | 81.61 | 0.538 |
| 6* | −19.498 | 0.05 | | | |
| 7 | 39.995 | 2.50 | 1.61800 | 63.33 | 0.544 |
| 8 | −7.177 | 0.50 | 1.72047 | 34.71 | 0.583 |
| 9 | 9.843 | 0.80 | | | |
| 10(Stop) | ∞ | 0.58 | | | |
| 11 | −13.844 | 0.50 | 1.72047 | 34.71 | 0.583 |
| 12 | 9.243 | 2.44 | 1.61800 | 63.33 | 0.544 |
| 13 | −20.574 | 0.05 | | | |
| 14* | 10.818 | 3.74 | 1.49700 | 81.61 | 0.538 |
| 15* | −12.062 | 13.98 | | | |
| 16* | −6.434 | 6.53 | 1.58364 | 30.30 | 0.599 |
| 17* | −5.371 | 3.16 | | | |
| 18* | −11.488 | 1.97 | 1.63490 | 23.88 | 0.630 |
| 19* | −18.115 | 0.27 | | | |
| 20* | 5.193 | 3.81 | 1.53368 | 55.90 | 0.563 |
| 21* | 2.478 | 4.35 | | | |
| 22 | ∞ | 0.26 | 1.51640 | 65.06 | 0.535 |
| 23 | ∞ | 0.91 | | | |
| Image plane | ∞ | | | | |

Aspherical surface data

1st surface k = −7.688
A4 = −5.30828e−03, A6 = 1.00779e−03, A8 = −3.13102e−04

2nd surface k = 9.824
A4 = −1.93476e−03, A6 = 2.83575e−05, A8 = −1.27395e−06

3rd surface k = −1.316
A4 = 3.98817e−05, A6 = 1.75107e−07, A8 = 2.54238e−08

| Unit mm |
|---|

4th surface k = −5.068
A4 = 1.22657e−04, A6 = 6.73445e−06, A8 = −1.01603e−07

5th surface k = −2.319
A4 = −8.13599e−05, A6 = −6.40124e−06, A8 = 1.43467e−07

6th surface k = 3.388
A4 = −1.26292e−04, A6 = −1.27410e−06, A8 = 9.01790e−08

14th surface k = −2.381
A4 = −1.37296e−04, A6 = 1.42467e−06, A8 = −9.01579e−09

15th surface k = −0.582
A4 = −2.02116e−05, A6 = −1.14010e−06, A8 = −9.41687e−09

16th surface k = −0.049
A4 = −2.66503e−04, A6 = 1.37620e−05, A8 = −2.75338e−07

17th surface k = −1.101
A4 = 2.02237e−04, A6 = −2.08688e−06, A8 = −2.48953e−08

18th surface k = −33.992
A4 = 2.88723e−04, A6 = −5.74254e−06, A8 = −5.45486e−08,
A10 = −8.25069e−11

19th surface k = −1.062
A4 = −1.89497e−04, A6 = −2.28174e−07, A8 = −1.72532e−08,
A10 = −3.24889e−10

20th surface k = −4.642
A4 = −1.21065e−03, A6 = 1.21481e−05, A8 = 1.80222e−07,
A10 = −1.84008e−09

21th surface k = −1.845
A4 = −8.86076e−04, A6 = 4.64728e−05, A8 = −1.48831e−06,
A10 = 2.99535e−08

| Various data | |
|---|---|
| NA | 0.60 |
| Magnification | −3.56 |
| Focal length | 4.98 |
| Image height(mm) | 4.75 |
| fb(mm) (in air) | 5.43 |
| Lens total length(mm) (in air) | 59.20 |

Example 64

Unit mm

Surface data

| Surface no. | r | d | nd | νd | θgf |
|---|---|---|---|---|---|
| 1* | −8.599 | 5.93 | 1.53368 | 55.90 | 0.563 |
| 2* | −19.840 | 0.05 | | | |
| 3* | 17.840 | 5.28 | 1.63490 | 23.88 | 0.630 |
| 4* | −14.375 | 0.06 | | | |
| 5* | 7.961 | 3.54 | 1.49700 | 81.61 | 0.538 |
| 6* | −22.188 | 0.05 | | | |
| 7 | 52.926 | 2.61 | 1.61800 | 63.33 | 0.544 |

Unit mm

| Surface no. | r | d | nd | νd | θgf |
|---|---|---|---|---|---|
| 8 | −8.538 | 0.50 | 1.72047 | 34.71 | 0.583 |
| 9 | 11.099 | 0.96 | | | |
| 10(Stop) | ∞ | 0.66 | | | |
| 11 | −15.771 | 0.50 | 1.72047 | 34.71 | 0.583 |
| 12 | 10.927 | 2.65 | 1.61800 | 63.33 | 0.544 |
| 13 | −21.930 | 0.05 | | | |
| 14* | 12.592 | 4.04 | 1.49700 | 81.61 | 0.538 |
| 15* | −13.902 | 15.89 | | | |
| 16* | −7.470 | 7.77 | 1.58364 | 30.30 | 0.599 |
| 17* | −6.239 | 3.85 | | | |
| 18* | −13.303 | 2.40 | 1.63490 | 23.88 | 0.630 |
| 19* | −20.860 | 0.30 | | | |
| 20* | 6.006 | 4.42 | 1.53368 | 55.90 | 0.563 |
| 21* | 2.794 | 5.00 | | | |
| 22 | ∞ | 0.30 | 1.51640 | 65.06 | 0.535 |
| 23 | ∞ | 0.53 | | | |
| Image plane | ∞ | | | | |

Aspherical surface data

1st surface k = −6.559
A4 = −3.07798e−03, A6 = 7.19063e−04, A8 = −1.43633e−04

2nd surface k = 8.617
A4 = −1.24859e−03, A6 = 1.39145e−05, A8 = −4.33338e−07

3rd surface k = −1.217
A4 = 2.14714e−05, A6 = 4.97776e−07, A8 = 6.93013e−09

4th surface k = −5.042
A4 = 7.67295e−05, A6 = 3.42831e−06, A8 = −3.37151e−08

5th surface k = −2.297
A4 = −6.04721e−05, A6 = −3.09153e−06, A8 = 4.84282e−08

6th surface k = 3.319
A4 = −8.28348e−05, A6 = −6.61324e−07, A8 = 3.24620e−08

14th surface k = −2.342
A4 = −9.16209e−05, A6 = 8.36992e−07, A8 = −4.45060e−09

15th surface k = −0.501
A4 = −1.62220e−05, A6 = −5.10344e−07, A8 = −3.96678e−09

16th surface k = −0.081
A4 = −1.74720e−04, A6 = 6.86575e−06, A8 = −9.76272e−08

17th surface k = −1.090
A4 = 1.45428e−04, A6 = −1.07366e−06, A8 = −5.76918e−09

18th surface k = −35.703
A4 = 2.12538e−04, A6 = −2.80559e−06, A8 = −1.82100e−08,
A10 = −2.49815e−12

19th surface k = −1.240
A4 = −1.24964e−04, A6 = −2.05558e−07, A8 = −4.46527e−09,
A10 = −7.30148e−11

20th surface k = −4.876
A4 = −8.70533e−04, A6 = 5.71807e−06, A8 = 5.33843e−08,
A10 = −2.87801e−10

| Unit mm |
|---|
| 21th surface |
| k = −1.928<br>A4 = −3.56431e−04, A6 = 1.04471e−05, A8 = −2.60887e−07,<br>A10 = 3.89803e−09 |

| Various data | |
|---|---|
| NA | 0.60 |
| Magnification | −3.56 |
| Focal length | 5.34 |
| Image height(mm) | 5.50 |
| fb(mm) (in air) | 5.73 |
| Lens total length(mm) (in air) | 67.24 |

Example 65

Unit mm

Surface data

| Surface no. | r | d | nd | νd | θgf |
|---|---|---|---|---|---|
| 1* | −6.269 | 4.80 | 1.53368 | 55.90 | 0.563 |
| 2* | −27.398 | 0.05 | | | |
| 3* | 17.424 | 4.12 | 1.63490 | 23.88 | 0.630 |
| 4* | −10.162 | 0.05 | | | |
| 5* | 329.227 | 0.61 | 1.58364 | 30.30 | 0.599 |
| 6* | 23.639 | 0.05 | | | |
| 7* | 7.301 | 4.38 | 1.49700 | 81.61 | 0.538 |
| 8* | −16.656 | 0.05 | | | |
| 9 | 26.802 | 3.49 | 1.61800 | 63.33 | 0.544 |
| 10 | −7.076 | 0.50 | 1.72047 | 34.71 | 0.583 |
| 11 | 11.663 | 1.25 | | | |
| 12(Stop) | ∞ | 0.71 | | | |
| 13 | −16.523 | 0.50 | 1.72047 | 34.71 | 0.583 |
| 14 | 14.445 | 2.57 | 1.61800 | 63.33 | 0.544 |
| 15 | −18.236 | 0.06 | | | |
| 16* | 10.173 | 4.62 | 1.49700 | 81.61 | 0.538 |
| 17* | −14.804 | 6.97 | | | |
| 18* | −7.554 | 4.14 | 1.58364 | 30.30 | 0.599 |
| 19* | −9.958 | 2.28 | | | |
| 20* | −7.176 | 4.95 | 1.61421 | 25.60 | 0.621 |
| 21* | −5.830 | 2.02 | | | |
| 22* | −11.735 | 2.84 | 1.63490 | 23.88 | 0.630 |
| 23* | −20.945 | 0.05 | | | |
| 24* | 5.546 | 4.33 | 1.53368 | 55.90 | 0.563 |
| 25* | 2.897 | 4.50 | | | |
| 26 | ∞ | 0.30 | 1.51640 | 65.06 | 0.535 |
| 27 | ∞ | 3.63 | | | |
| Image plane | ∞ | | | | |

Aspherical surface data

1st surface k = 0.659
A4 = −2.04816e−03, A6 = 2.35320e−04, A8 = −4.81520e−05

2nd surface k = −1.065
A4 = −1.68684e−03, A6 = 2.29728e−05, A8 = −9.25180e−07

3rd surface k = −0.588
A4 = 6.51788e−05, A6 = 1.13163e−06, A8 = 1.95724e−08

4th surface k = −2.720
A4 = 6.41977e−05, A6 = 7.66373e−06, A8 = −3.86820e−08

Unit mm

5th surface k = −1871.246
A4 = −1.46877e−05, A6 = −2.79488e−07

6th surface k = −0.064
A4 = 2.14004e−05, A6 = 4.39293e−08

7th surface k = −2.423
A4 = −9.35989e−05, A6 = −1.73930e−06, A8 = 5.12031e−08

8th surface k = 1.436
A4 = −7.63094e−05, A6 = 4.05361e−07, A8 = 1.19948e−08

16th surface k = −1.670
A4 = −3.89307e−05, A6 = 5.41575e−07, A8 = −3.89066e−09

17th surface k = 0.072
A4 = −6.09183e−05, A6 = −2.19847e−07, A8 = 6.07739e−09

18th surface k = 0.089
A4 = 9.88125e−06, A6 = 2.25429e−06, A8 = 5.40413e−08

19th surface k = −2.920
A4 = 2.34541e−05, A6 = −1.70730e−06, A8 = 1.38533e−08

20th surface k = −0.618
A4 = −1.37263e−05, A6 = −1.25116e−06, A8 = −8.15675e−08

21th surface k = −1.185
A4 = 1.29062e−04, A6 = −1.87858e−06, A8 = −1.27341e−08

22th surface k = −30.535
A4 = 2.12596e−04, A6 = −2.32471e−06, A8 = −3.18933e−08,
A10 = 2.49260e−11

23th surface k = 0.060
A4 = −1.34020e−04, A6 = −1.76460e−07, A8 = 8.51270e−10,
A10 = −1.31091e−10

24th surface k = −4.296
A4 = −8.13846e−04, A6 = 6.17276e−06, A8 = 7.50056e−08,
A10 = −7.01350e−10

25th surface k = −1.860
A4 = −8.20694e−04, A6 = 2.77718e−05, A8 = −5.24812e−07,
A10 = 5.58526e−09

| Various data | |
|---|---|
| NA | 0.60 |
| Magnification | −3.56 |
| Focal length | 6.16 |
| Image height(mm) | 5.50 |
| fb(mm) (in air) | 8.33 |
| Lens total length(mm) (in air) | 63.71 |

Example 66

| Unit mm | | | | | |
|---|---|---|---|---|---|
| Surface data | | | | | |
| Surface no. | r | d | nd | νd | θgf |
| 1* | −6.744 | 4.55 | 1.53368 | 55.90 | 0.563 |
| 2* | −28.324 | 0.05 | | | |
| 3* | 17.647 | 4.11 | 1.63490 | 23.88 | 0.630 |
| 4* | −10.252 | 0.05 | | | |
| 5* | 368.125 | 0.70 | 1.58364 | 30.30 | 0.599 |
| 6* | 23.485 | 0.05 | | | |
| 7* | 7.303 | 3.75 | 1.49700 | 81.61 | 0.538 |
| 8* | −16.608 | 0.05 | | | |
| 9 | 27.992 | 3.48 | 1.61800 | 63.33 | 0.544 |
| 10 | −7.240 | 0.50 | 1.72047 | 34.71 | 0.583 |
| 11 | 11.712 | 0.93 | | | |
| 12(Stop) | ∞ | 0.68 | | | |
| 13 | −16.247 | 0.50 | 1.72047 | 34.71 | 0.583 |
| 14 | 14.941 | 2.48 | 1.61800 | 63.33 | 0.544 |
| 15 | −17.172 | 0.05 | | | |
| 16* | 10.250 | 5.04 | 1.49700 | 81.61 | 0.538 |
| 17* | −14.686 | 7.09 | | | |
| 18* | −7.433 | 3.40 | 1.58364 | 30.30 | 0.599 |
| 19* | −10.047 | 2.59 | | | |
| 20* | −6.674 | 5.39 | 1.61421 | 25.60 | 0.621 |
| 21* | −5.707 | 2.10 | | | |
| 22* | −11.710 | 2.68 | 1.63490 | 23.88 | 0.630 |
| 23* | −20.113 | 0.08 | | | |
| 24* | 5.560 | 4.27 | 1.53368 | 55.90 | 0.563 |
| 25* | 2.881 | 4.50 | | | |
| 26 | ∞ | 0.30 | 1.51640 | 65.06 | 0.535 |
| 27 | ∞ | 2.87 | | | |
| Image plane | ∞ | | | | |

Aspherical surface data

1st surface k = 0.466
A4 = −1.83113e−03, A6 = 2.20399e−04, A8 = −4.01986e−05

2nd surface k = −4.154
A4 = −1.67302e−03, A6 = 2.41417e−05, A8 = −9.14504e−07

3rd surface k = −0.713
A4 = 6.22862e−05, A6 = 1.21873e−06, A8 = 2.05895e−08

4th surface k = −2.747
A4 = 6.54960e−05, A6 = 7.63953e−06, A8 = −3.72649e−08

5th surface k = −2888.742
A4 = −1.51322e−05, A6 = −1.13362e−07

6th surface k = −0.115
A4 = 2.12292e−05, A6 = −4.40257e−08

7th surface k = −2.422
A4 = −9.18841e−05, A6 = −1.69650e−06, A8 = 4.50496e−08

8th surface k = 1.359
A4 = −7.73141e−05, A6 = 3.20836e−07, A8 = 1.45375e−08

16th surface k = −1.661
A4 = −3.80858e−05, A6 = 6.00548e−07, A8 = −3.31015e−09

17th surface k = 0.087
A4 = −6.24513e−05, A6 = −2.33471e−07, A8 = 7.81939e−09

-continued

Unit mm

18th surface k = 0.116
A4 = 6.47632e−06, A6 = 1.93794e−06, A8 = 8.75430e−08

19th surface k = −2.967
A4 = 3.57609e−05, A6 = −1.49735e−06, A8 = 2.83588e−08

20th surface k = −0.611
A4 = −1.58294e−05, A6 = −1.07032e−06, A8 = −9.97644e−08

21th surface k = −1.189
A4 = 1.28670e−04, A6 = −1.99874e−06, A8 = −1.23533e−08

22th surface k = −30.969
A4 = 2.14284e−04, A6 = −2.50014e−06, A8 = −3.94482e−08,
A10 = 1.75181e−11

23th surface k = 0.274
A4 = −1.40593e−04, A6 = −2.34596e−07, A8 = −2.72736e−09,
A10 = −1.34264e−10

24th surface k = −4.460
A4 = −8.31533e−04, A6 = 6.06058e−06, A8 = 7.30319e−08,
A10 = −5.38583e−10

25th surface k = −1.870
A4 = −7.81641e−04, A6 = 2.80809e−05, A8 = −5.72873e−07,
A10 = 6.43070e−09

| Various data | |
|---|---|
| NA | 0.60 |
| Magnification | −3.56 |
| Focal length | 5.82 |
| Image height(mm) | 5.23 |
| fb(mm) (in air) | 7.57 |
| Lens total length(mm) (in air) | 62.10 |

Example 67

| Unit mm | | | | | |
|---|---|---|---|---|---|
| Surface data | | | | | |
| Surface no. | r | d | nd | νd | θgf |
| 1* | −11.654 | 8.90 | 1.53368 | 55.90 | 0.563 |
| 2* | −53.270 | 0.09 | | | |
| 3* | 32.497 | 7.73 | 1.63490 | 23.88 | 0.630 |
| 4* | −18.865 | 0.05 | | | |
| 5* | 609.908 | 0.55 | 1.58364 | 30.30 | 0.599 |
| 6* | 43.689 | 0.05 | | | |
| 7* | 13.655 | 8.70 | 1.49700 | 81.61 | 0.538 |
| 8* | −30.942 | 0.05 | | | |
| 9 | 54.201 | 6.26 | 1.61800 | 63.33 | 0.544 |
| 10 | −13.279 | 0.50 | 1.72047 | 34.71 | 0.583 |
| 11 | 21.817 | 2.42 | | | |
| 12(Stop) | ∞ | 1.14 | | | |
| 13 | −31.961 | 0.52 | 1.72047 | 34.71 | 0.583 |
| 14 | 25.513 | 4.08 | 1.61800 | 63.33 | 0.544 |
| 15 | −33.246 | 0.15 | | | |
| 16* | 18.998 | 8.40 | 1.49700 | 81.61 | 0.538 |
| 17* | −27.856 | 12.95 | | | |
| 18* | −14.193 | 8.09 | 1.58364 | 30.30 | 0.599 |
| 19* | −19.094 | 4.04 | | | |

-continued

| Unit mm | | | | | |
|---|---|---|---|---|---|
| 20* | −13.249 | 10.54 | 1.58364 | 30.30 | 0.599 |
| 21* | −10.558 | 4.39 | | | |
| 22* | −22.376 | 5.26 | 1.63490 | 23.88 | 0.630 |
| 23* | −37.463 | 0.05 | | | |
| 24* | 10.448 | 8.01 | 1.53368 | 55.90 | 0.563 |
| 25* | 5.391 | 8.22 | | | |
| 26 | ∞ | 0.30 | 1.51640 | 65.06 | 0.535 |
| 27 | ∞ | 8.21 | | | |
| Image plane | ∞ | | | | |

Aspherical Surface data

1st surface k = 1.075
A4 = −3.07742e−04, A6 = 9.46748e−06, A8 = −3.95246e−07

2nd surface k = 0.243
A4 = −2.62486e−04, A6 = 1.05472e−06, A8 = −1.12886e−08

3rd surface k = −0.422
A4 = 1.05645e−05, A6 = 4.99657e−08, A8 = 2.12551e−10

4th surface k = −2.716
A4 = 1.02640e−05, A6 = 3.36920e−07, A8 = −5.29009e−10

5th surface k = −1981.989
A4 = −2.50643e−06, A6 = −1.03156e−08

6th surface k = 0.024
A4 = 3.45165e−06, A6 = −4.51348e−11

7th surface k = −2.412
A4 = −1.51250e−05, A6 = −7.89064e−08, A8 = 6.63287e−10

8th surface k = 1.432
A4 = −1.17703e−05, A6 = 2.10026e−08, A8 = 1.62417e−10

16th surface k = −1.632
A4 = −6.09995e−06, A6 = 2.72227e−08, A8 = −7.60562e−11

17th surface k = 0.162
A4 = −9.42741e−06, A6 = −1.49326e−08, A8 = 6.00257e−11

18th surface k = 0.151
A4 = 1.94021e−06, A6 = 1.05693e−07, A8 = 8.44621e−10

19th surface k = −2.829
A4 = 3.81519e−06, A6 = −6.91852e−08, A8 = 2.58538e−10

20th surface k = −0.623
A4 = −2.50444e−06, A6 = −3.72162e−08, A8 = −1.04792e−09

21th surface k = −1.166
A4 = 2.08328e−05, A6 = −9.68055e−08, A8 = −1.11067e−10

22th surface k = −30.999
A4 = 2.88686e−05, A6 = −9.73152e−08, A8 = −4.06882e−10,
A10 = 1.90801e−13

-continued

Unit mm

23th surface k = −1.442
A4 = −1.86838e−05, A6 = −1.59948e−08, A8 = −2.14349e−11,
A10 = −4.13529e−13

24th surface k = −4.203
A4 = −1.26702e−04, A6 = 3.03286e−07, A8 = 8.98650e−10,
A10 = −3.27718e−12

25th surface k = −1.867
A4 = −1.38264e−04, A6 = 1.20863e−06, A8 = −5.84639e−09,
A10 = 1.39250e−11

Various data

| | |
|---|---|
| NA | 0.60 |
| Magnification | −3.55 |
| Focal length | 12.29 |
| Image height(mm) | 10.82 |
| fb(mm) (in air) | 16.62 |
| Lens total length(mm) (in air) | 119.56 |

Example 68

Unit mm

Surface data

| Surface no. | r | d | nd | νd | θgf |
|---|---|---|---|---|---|
| 1* | −63.538 | 10.02 | 1.85135 | 40.10 | 0.569 |
| 2* | 32.204 | 0.05 | | | |
| 3* | 32.533 | 7.00 | 1.53368 | 55.90 | 0.563 |
| 4* | −106.297 | 0.26 | | | |
| 5* | 54.300 | 10.00 | 1.49700 | 81.61 | 0.538 |
| 6* | −23.738 | 0.98 | | | |
| 7* | 85.904 | 4.20 | 1.49700 | 81.61 | 0.538 |
| 8* | −97.520 | 0.06 | | | |
| 9* | 105.081 | 8.88 | 1.63490 | 23.88 | 0.630 |
| 10* | −33.023 | 0.42 | | | |
| 11* | −38.264 | 2.80 | 1.58364 | 30.30 | 0.599 |
| 12* | 53.734 | 0.07 | | | |
| 13 | 62.691 | 11.68 | 1.49700 | 81.61 | 0.538 |
| 14 | −22.596 | 5.75 | 1.72047 | 34.71 | 0.583 |
| 15 | −112.813 | 3.53 | | | |
| 16(Stop) | ∞ | −1.56 | | | |
| 17* | 70.148 | 2.54 | 1.53368 | 55.90 | 0.563 |
| 18* | −183.515 | 0.24 | | | |
| 19 | −284.510 | 8.92 | 1.49700 | 81.61 | 0.538 |
| 20 | −28.520 | 8.41 | 1.72047 | 34.71 | 0.583 |
| 21 | 198.897 | 17.49 | 1.49700 | 81.61 | 0.538 |
| 22 | −40.316 | 16.34 | | | |
| 23* | 93.660 | 5.46 | 1.84666 | 23.78 | 0.620 |
| 24* | 212.953 | 16.44 | | | |
| 25* | 25.378 | 9.46 | 1.53368 | 55.90 | 0.563 |
| 26* | −119.565 | 0.48 | | | |
| 27* | 52.177 | 9.92 | 1.53368 | 55.90 | 0.563 |
| 28* | 10.383 | 12.85 | | | |
| 29* | −44.349 | 7.33 | 1.53368 | 55.90 | 0.563 |
| 30* | −53.218 | 2.07 | | | |
| 31* | −20.191 | 10.09 | 1.53368 | 55.90 | 0.563 |
| 32* | 50.820 | 2.00 | | | |
| 33 | ∞ | 0.30 | 1.51640 | 65.06 | 0.535 |
| 34 | ∞ | 1.80 | | | |
| Image plane | ∞ | | | | |

-continued

| Unit mm |
|---|
| Aspherical Surface data |

1st surface k = 4.443
A4 = −1.05776e−04, A6 = −3.64425e−07, A8 = 1.98904e−09

2nd surface k = −19.238
A4 = −3.91023e−05, A6 = −3.11804e−08, A8 = −5.67242e−11

3rd surface k = −20.954
A4 = 2.62599e−06, A6 = 1.82851e−08, A8 = 4.54659e−11

4th surface k = 9.940
A4 = −1.61900e−05, A6 = 9.03155e−09, A8 = 1.79996e−10

5th surface k = 1.123
A4 = 2.67856e−07, A6 = −3.15865e−08, A8 = 3.49785e−11

6th surface k = −2.027
A4 = 3.50357e−06, A6 = 2.04747e−08, A8 = 6.93297e−11

7th surface k = 2.496
A4 = −4.68859e−06, A6 = −7.75345e−09, A8 = 6.02390e−11

8th surface k = 3.339
A4 = 3.50988e−07, A6 = 2.15482e−08, A8 = −2.56013e−11

9th surface k = 3.604
A4 = 1.20384e−07, A6 = 1.78755e−08, A8 = −3.15317e−13

10th surface k = 0.355
A4 = 1.24700e−05, A6 = 2.89708e−10, A8 = 3.47525e−11

11th surface k = 1.839
A4 = 3.37433e−06, A6 = 3.63821e−09, A8 = 5.61429e−11

12th surface k = −10.495
A4 = −1.54011e−05, A6 = −1.49070e−09, A8 = 3.23097e−11

17th surface k = 0.528
A4 = −5.62809e−07, A6 = −5.77511e−09, A8 = −1.61623e−11

18th surface k = −142.321
A4 = 4.44624e−06, A6 = 9.06780e−09, A8 = −3.00760e−11

23th surface k = −1.909
A4 = −9.55582e−07, A6 = −2.84663e−09, A8 = 4.48649e−12

24th surface k = −158.290
A4 = −2.56151e−06, A6 = −1.96788e−09, A8 = 4.34014e−12

25th surface k = −1.408
A4 = −7.29707e−06, A6 = −3.93011e−09, A8 = −1.35076e−11

26th surface k = −36.249
A4 = 6.21711e−07, A6 = −2.35958e−09, A8 = −9.91770e−12

-continued

| Unit mm |
|---|

27th surface k = −11.909
A4 = −5.75821e−06, A6 = 3.19672e−08, A8 = −4.31284e−11

28th surface k = −1.033
A4 = −2.20475e−05, A6 = 7.79789e−08, A8 = 9.56535e−11

29th surface k = 5.439
A4 = −2.60359e−05, A6 = 9.13286e−08, A8 = 2.72747e−12

30th surface k = 2.910
A4 = −1.84445e−06, A6 = 5.39362e−08, A8 = −9.42280e−11

31th surface k = −0.869
A4 = 3.33460e−05, A6 = −1.85661e−08, A8 = 8.80359e−11

32th surface k = −24.510
A4 = −1.19291e−05, A6 = −5.06023e−10, A8 = −1.47595e−11

| Various data | |
|---|---|
| NA | 0.60 |
| Magnification | −3.51 |
| Focal length | 7.51 |
| Image height(mm) | 20.78 |
| fb(mm) (in air) | 4.00 |
| Lens total length(mm) (in air) | 196.17 |

Example 69

Unit mm

Surface data

| Surface no. | r | d | nd | νd | θgf |
|---|---|---|---|---|---|
| 1* | −29.955 | 5.67 | 1.85135 | 40.10 | 0.569 |
| 2* | 21.219 | 0.05 | | | |
| 3* | 26.565 | 3.07 | 1.53368 | 55.90 | 0.563 |
| 4* | −29.352 | 0.05 | | | |
| 5* | 27.194 | 4.58 | 1.49700 | 81.61 | 0.538 |
| 6* | −12.447 | 0.05 | | | |
| 7* | 41.662 | 1.69 | 1.49700 | 81.61 | 0.538 |
| 8* | −59.590 | 0.05 | | | |
| 9* | 44.366 | 3.67 | 1.63490 | 23.88 | 0.630 |
| 10* | −17.202 | 0.50 | | | |
| 11* | −19.670 | 1.21 | 1.58364 | 30.30 | 0.599 |
| 12* | 30.021 | 0.20 | | | |
| 13 | 23.366 | 5.25 | 1.49700 | 81.61 | 0.538 |
| 14 | −12.616 | 0.50 | 1.72047 | 34.71 | 0.583 |
| 15 | 68.194 | 2.31 | | | |
| 16(Stop) | ∞ | −1.10 | | | |
| 17* | 21.245 | 1.85 | 1.53368 | 55.90 | 0.563 |
| 18* | −93.246 | 0.09 | | | |
| 19 | −148.608 | 2.90 | 1.49700 | 81.61 | 0.538 |
| 20 | −12.601 | 1.24 | 1.72047 | 34.71 | 0.583 |
| 21 | 37.919 | 4.85 | 1.49700 | 81.61 | 0.538 |
| 22 | −24.743 | 6.71 | | | |
| 23* | 34.680 | 2.10 | 1.84666 | 23.78 | 0.620 |
| 24* | 92.807 | 9.47 | | | |
| 25* | 12.166 | 7.28 | 1.53368 | 55.90 | 0.563 |
| 26* | −40.917 | 0.63 | | | |
| 27* | 40.697 | 4.65 | 1.53368 | 55.90 | 0.563 |
| 28* | 5.464 | 4.96 | | | |
| 29* | 69.863 | 4.34 | 1.53368 | 55.90 | 0.563 |
| 30* | −23.297 | 2.44 | | | |
| 31* | −8.406 | 3.04 | 1.53368 | 55.90 | 0.563 |

-continued

| Unit mm | | | | | |
|---|---|---|---|---|---|
| 32* | 13.145 | 2.00 | | | |
| 33 | ∞ | 0.30 | 1.51640 | 65.06 | 0.535 |
| 34 | ∞ | 0.95 | | | |
| Image plane | ∞ | | | | |

Aspherical Surface data

1st surface k = −2.844
A4 = −5.95233e−04, A6 = −2.01185e−05, A8 = −4.04057e−08

2nd surface k = −26.594
A4 = −2.91563e−04, A6 = 3.38545e−08, A8 = −4.48601e−09

3rd surface k = −38.988
A4 = 1.31076e−05, A6 = 1.39853e−07, A8 = 7.03094e−09

4th surface k = 7.191
A4 = −8.19846e−05, A6 = −3.06820e−07, A8 = 2.47340e−08

5th surface k = 1.384
A4 = 5.08576e−06, A6 = −7.77373e−07, A8 = 6.23909e−09

6th surface k = −1.761
A4 = 1.48354e−05, A6 = 4.86920e−07, A8 = 6.06003e−09

7th surface k = −14.126
A4 = −5.35357e−05, A6 = −2.25010e−07, A8 = 6.88366e−09

8th surface k = −2.133
A4 = 1.05864e−05, A6 = 6.95122e−07, A8 = −3.15146e−09

9th surface k = 3.451
A4 = 2.22795e−06, A6 = 4.87778e−07, A8 = −1.66619e−09

10th surface k = 0.360
A4 = 1.03539e−04, A6 = −6.33943e−08, A8 = 4.04592e−09

11th surface k = 1.941
A4 = 2.37787e−05, A6 = 1.62382e−07, A8 = 7.66827e−09

12th surface k = −10.761
A4 = −1.30990e−04, A6 = −1.71078e−07, A8 = 5.02262e−09

17th surface k = −0.267
A4 = −1.00551e−05, A6 = −2.52136e−07, A8 = 4.24466e−10

18th surface k = −207.405
A4 = 2.84376e−05, A6 = 3.79772e−07, A8 = −4.21658e−09

23th surface k = −1.706
A4 = −7.10617e−06, A6 = −8.60971e−08, A8 = 7.01716e−10

24th surface k = −186.451
A4 = −2.28317e−05, A6 = −6.42653e−08, A8 = 6.74174e−10

25th surface k = −1.569
A4 = −6.55071e−05, A6 = −2.05782e−07, A8 = −4.37955e−09,
A10 = −2.52773e−14

-continued

Unit mm

26th surface k = −3.839
A4 = −8.01566e−06, A6 = −2.54791e−07, A8 = −1.15935e−09,
A10 = −2.54003e−14

27th surface k = −34.425
A4 = −4.77157e−05, A6 = 1.08255e−06, A8 = −4.06557e−09

28th surface k = −1.002
A4 = −1.54742e−04, A6 = 2.47821e−06, A8 = −3.91574e−09

29th surface k = −50.008
A4 = −5.21414e−05, A6 = 4.83615e−07, A8 = −8.84765e−09,
A10 = 1.50137e−12

30th surface k = −29.019
A4 = 1.22863e−04, A6 = 8.90770e−07, A8 = −5.28257e−09,
A10 = 5.46743e−13

31th surface k = −0.773
A4 = 3.16385e−04, A6 = 9.74440e−08, A8 = 1.40543e−08,
A10 = −5.53413e−14

32th surface k = −16.868
A4 = −1.76589e−04, A6 = 8.02882e−07, A8 = −7.40507e−09,
A10 = −1.70931e−12

Various data

| | |
|---|---|
| NA | 0.59 |
| Magnification | −3.51 |
| Focal length | 3.49 |
| Image height(mm) | 10.82 |
| fb(mm) (in air) | 3.15 |
| Lens total length(mm) (in air) | 87.44 |

Example 70

Unit mm

Surface data

| Surface no. | r | d | nd | νd | θgf |
|---|---|---|---|---|---|
| 1* | −51.987 | 5.12 | 1.85135 | 40.10 | 0.569 |
| 2* | 34.312 | 0.50 | | | |
| 3* | 36.711 | 2.87 | 1.53366 | 55.96 | 0.555 |
| 4* | −92.469 | 0.20 | | | |
| 5* | 26.612 | 4.74 | 1.49700 | 81.61 | 0.538 |
| 6* | −11.451 | 0.05 | | | |
| 7* | 45.611 | 2.06 | 1.49700 | 81.61 | 0.538 |
| 8* | −54.045 | 0.20 | | | |
| 9* | 33.570 | 3.44 | 1.63484 | 23.91 | 0.622 |
| 10* | −21.835 | 1.05 | | | |
| 11* | −19.881 | 0.50 | 1.58360 | 30.33 | 0.591 |
| 12* | 20.272 | 0.52 | | | |
| 13 | 29.888 | 5.28 | 1.49700 | 81.61 | 0.538 |
| 14 | −9.919 | 0.50 | 1.72047 | 34.71 | 0.583 |
| 15 | 2653.840 | 0.67 | | | |
| 16(Stop) | ∞ | 0.00 | | | |
| 17* | 22.326 | 5.73 | 1.53366 | 55.96 | 0.555 |
| 18* | −48.583 | 0.50 | | | |
| 19 | −361.891 | 3.71 | 1.49700 | 81.61 | 0.538 |
| 20 | −14.580 | 0.81 | 1.72047 | 34.71 | 0.583 |
| 21 | 49.171 | 13.96 | 1.49700 | 81.61 | 0.538 |
| 22 | −23.109 | 1.04 | | | |

-continued

| Unit mm | | | | | |
|---|---|---|---|---|---|
| 23* | 34.641 | 3.26 | 1.84666 | 23.78 | 0.621 |
| 24* | 68.766 | 8.81 | | | |
| 25* | 14.872 | 7.26 | 1.53366 | 55.96 | 0.555 |
| 26* | −32.487 | 0.20 | | | |
| 27* | 24.860 | 4.91 | 1.53366 | 55.96 | 0.555 |
| 28* | 5.064 | 10.91 | | | |
| 29* | −6.358 | 3.04 | 1.53366 | 55.96 | 0.555 |
| 30* | −143.898 | 1.00 | | | |
| 31 | ∞ | 0.30 | 1.51633 | 64.14 | 0.535 |
| 32 | ∞ | 2.00 | | | |
| Image plane | ∞ | | | | |

Aspherical Surface data

1st surface k = −2.324
A4 = −5.99284e−04, A6 = −2.07443e−05, A8 = −5.78774e−08

2nd surface k = −45.725
A4 = −3.42295e−04, A6 = −7.55261e−07, A8 = −1.43674e−08

3rd surface k = −4.989
A4 = 1.53046e−05, A6 = −3.22204e−07, A8 = 1.52980e−08

4th surface k = 10.000
A4 = −1.19884e−04, A6 = 7.20040e−07, A8 = 1.57561e−08

5th surface k = 2.681
A4 = 5.72765e−06, A6 = −6.11721e−07, A8 = 7.66294e−09

6th surface k = −2.065
A4 = 2.37171e−05, A6 = 6.14576e−07, A8 = 9.37247e−09

7th surface k = 8.756
A4 = −2.94464e−05, A6 = −1.23697e−07, A8 = 8.83931e−09

8th surface k = −18.390
A4 = 1.93047e−05, A6 = 8.03884e−07, A8 = −2.96453e−09

9th surface k = 4.712
A4 = 2.70731e−07, A6 = 5.42517e−07, A8 = −1.96572e−10

10th surface k = 0.590
A4 = 9.35359e−05, A6 = 8.42783e−08, A8 = 1.48700e−09

11th surface k = 1.834
A4 = 2.94251e−05, A6 = −5.71155e−08, A8 = 8.02874e−09

12th surface k = −8.347
A4 = −9.71672e−05, A6 = 9.03846e−09, A8 = 5.98733e−09

17th surface k = −0.493
A4 = −1.13272e−05, A6 = −1.77520e−07, A8 = 1.69868e−09

18th surface k = 0.000
A4 = 4.90449e−05, A6 = 8.80405e−08, A8 = 2.05302e−12

23th surface k = −0.340
A4 = −4.99251e−06, A6 = −1.15596e−07, A8 = 5.65807e−10

-continued

Unit mm

24th surface k = 0.000
A4 = −2.71164e−05, A6 = −5.85984e−08, A8 = 5.28978e−10

25th surface k = −1.287
A4 = −5.62805e−05, A6 = −7.66209e−08, A8 = −1.46489e−09

26th surface k = −28.138
A4 = −8.59208e−06, A6 = −1.62519e−07, A8 = −5.25099e−10

27th surface k = −11.343
A4 = −9.45284e−05, A6 = 8.98312e−07, A8 = −3.28383e−09

28th surface k = −1.166
A4 = −2.25428e−04, A6 = 2.61901e−06, A8 = −9.65650e−09

29th surface k = −0.771
A4 = −1.76889e−04, A6 = 3.16654e−06, A8 = −5.43037e−08

30th surface k = 0.000
A4 = −3.96799e−04, A6 = 8.52970e−07, A8 = −2.37397e−09

Various data

| | |
|---|---|
| NA | 0.62 |
| Magnification | −3.55 |
| Focal length | 3.98 |
| Image height(mm) | 11.04 |
| fb(mm) (in air) | 3.20 |
| Lens total length(mm) (in air) | 95.03 |

Example 71

Unit mm

Surface data

| Surface no. | r | d | nd | νd | θgf |
|---|---|---|---|---|---|
| 1* | −33.708 | 5.42 | 1.85135 | 40.10 | 0.569 |
| 2* | 30.549 | 0.05 | | | |
| 3* | 32.705 | 3.04 | 1.53366 | 55.96 | 0.555 |
| 4* | −33.718 | 0.05 | | | |
| 5* | 30.277 | 5.37 | 1.49700 | 81.61 | 0.538 |
| 6* | −9.108 | 1.92 | | | |
| 7* | 30.171 | 4.74 | 1.63484 | 23.91 | 0.622 |
| 8* | −20.083 | 0.50 | | | |
| 9* | −21.758 | 0.50 | 1.58360 | 30.33 | 0.591 |
| 10* | 20.217 | 0.31 | | | |
| 11 | 22.752 | 5.35 | 1.49700 | 81.61 | 0.538 |
| 12 | −11.085 | 0.50 | 1.72047 | 34.71 | 0.583 |
| 13 | 109.760 | 1.33 | | | |
| 14(Stop) | ∞ | −1.02 | | | |
| 15* | 19.480 | 3.80 | 1.53366 | 55.96 | 0.555 |
| 16* | −36.243 | 0.50 | | | |
| 17 | −46.615 | 2.73 | 1.49700 | 81.61 | 0.538 |
| 18 | −13.271 | 1.29 | 1.72047 | 34.71 | 0.583 |
| 19 | 63.152 | 10.17 | 1.49700 | 81.61 | 0.538 |
| 20 | −21.328 | 5.57 | | | |
| 21* | 33.223 | 2.86 | 1.84666 | 23.78 | 0.621 |
| 22* | 62.274 | 10.12 | | | |
| 23* | 13.399 | 6.98 | 1.53366 | 55.96 | 0.555 |
| 24* | −44.297 | 0.10 | | | |
| 25* | 23.820 | 4.79 | 1.53366 | 55.96 | 0.555 |
| 26* | 5.404 | 10.39 | | | |
| 27* | −5.660 | 2.59 | 1.53366 | 55.96 | 0.555 |

-continued

| Unit mm | | | | | |
|---|---|---|---|---|---|
| 28* | −57.346 | 1.00 | | | |
| 29 | ∞ | 0.30 | 1.51633 | 64.14 | 0.535 |
| 30 | ∞ | 1.99 | | | |
| Image plane | ∞ | | | | |

Aspherical Surface data

1st surface k = −2.324
A4 = −5.99284e−04, A6 = −2.07443e−05, A8 = −5.78774e−08

2nd surface k = −8.453
A4 = −3.06218e−04, A6 = −6.21190e−07, A8 = −3.79375e−09

3rd surface k = −10.000
A4 = −2.32237e−05, A6 = −4.72804e−07, A8 = 1.21769e−08

4th surface k = 9.824
A4 = −9.50929e−05, A6 = 4.21290e−07, A8 = 1.39565e−08

5th surface k = 0.977
A4 = −1.41054e−06, A6 = −7.40956e−07, A8 = 9.05571e−09

6th surface k = −1.674
A4 = −1.61992e−06, A6 = 3.89543e−07, A8 = 9.27075e−09

7th surface k = 4.822
A4 = −3.06329e−06, A6 = 5.40103e−07, A8 = 3.70020e−10

8th surface k = 0.187
A4 = 1.04929e−04, A6 = 2.35490e−07, A8 = 2.61993e−09

9th surface k = 1.884
A4 = 1.43703e−05, A6 = −1.78034e−07, A8 = 9.88090e−09

10th surface k = −9.975
A4 = −1.06112e−04, A6 = 2.10535e−07, A8 = 3.08727e−09

15th surface k = −0.105
A4 = −1.01308e−05, A6 = −9.94355e−08, A8 = 2.46319e−09

16th surface k = −9.295
A4 = 5.21616e−05, A6 = 2.67714e−07, A8 = 8.32227e−10

21th surface k = −0.825
A4 = −4.71738e−06, A6 = −1.19133e−07, A8 = 6.33286e−10

22th surface k = −9.836
A4 = −2.62975e−05, A6 = −4.49742e−08, A8 = 5.50344e−10

23th surface k = −1.187
A4 = −5.59393e−05, A6 = −2.19981e−07, A8 = −1.27378e−09

24th surface k = −9.425
A4 = −3.47590e−06, A6 = −2.14126e−07, A8 = −4.68874e−10

25th surface k = −10.000
A4 = −9.66569e−05, A6 = 9.71367e−07, A8 = −4.26857e−09

-continued

Unit mm

26th surface k = −1.038
A4 = −1.80783e−04, A6 = 9.34922e−07, A8 = −2.73424e−09

27th surface k = −0.796
A4 = 2.33856e−05, A6 = 1.10760e−06, A8 = −4.51672e−08

28th surface k = 0.564
A4 = −3.12661e−04, A6 = 2.54558e−07, A8 = −1.58646e−09

Various data

| | |
|---|---|
| NA | 0.60 |
| Magnification | −3.53 |
| Focal length | 3.86 |
| Image height(mm) | 11.04 |
| fb(mm) (in air) | 3.18 |
| Lens total length(mm) (in air) | 93.13 |

Example 72

Unit mm

Surface data

| Surface no. | r | d | nd | νd | θgf |
|---|---|---|---|---|---|
| 1* | −36.181 | 28.58 | 1.53368 | 55.90 | 0.563 |
| 2* | −56.946 | 0.76 | | | |
| 3* | 61.405 | 21.75 | 1.63490 | 23.88 | 0.630 |
| 4* | −75.609 | 1.28 | | | |
| 5* | 31.784 | 13.63 | 1.49700 | 81.61 | 0.538 |
| 6* | −109.442 | 0.05 | | | |
| 7 | −131.758 | 11.91 | 1.61800 | 63.33 | 0.544 |
| 8 | −32.872 | 1.02 | 1.72047 | 34.71 | 0.583 |
| 9 | 118.946 | 2.88 | | | |
| 10(Stop) | ∞ | 4.53 | | | |
| 11 | −75.872 | 1.04 | 1.72047 | 34.71 | 0.583 |
| 12 | 62.232 | 13.45 | 1.61800 | 63.33 | 0.544 |
| 13 | −92.209 | 2.29 | | | |
| 14* | 55.068 | 22.12 | 1.49700 | 81.61 | 0.538 |
| 15* | −67.262 | 34.05 | | | |
| 16* | −33.410 | 0.69 | 1.58364 | 30.30 | 0.599 |
| 17* | −66.553 | 65.37 | | | |
| 18* | −110.319 | 24.35 | 1.63490 | 23.88 | 0.630 |
| 19* | −70.789 | 9.27 | | | |
| 20* | 28.392 | 16.92 | 1.53368 | 55.90 | 0.563 |
| 21* | −885.222 | 0.49 | | | |
| 22* | 189.555 | 21.44 | 1.53368 | 55.90 | 0.563 |
| 23* | 11.316 | 18.40 | | | |
| 24 | ∞ | 0.30 | 1.51640 | 65.06 | 0.535 |
| 25 | ∞ | 0.07 | | | |
| Image plane | ∞ | | | | |

Aspherical surface data

1st surface k = −173.796
A4 = −3.35526e−04, A6 = 1.26109e−05, A8 = −3.73711e−07

2nd surface k = 5.924
A4 = −1.68456e−05, A6 = 1.61406e−08, A8 = −3.13890e−11

3rd surface k = −0.972
A4 = −6.35538e−07, A6 = 1.17469e−09, A8 = −2.12993e−13

-continued

| Unit mm |
|---|
| 4th surface |
| k = −7.795<br>A4 = 6.08950e−07, A6 = 2.28598e−09, A8 = −1.15413e−12 |
| 5th surface |
| k = −2.835<br>A4 = −1.32987e−06, A6 = −7.65103e−10, A8 = −7.52953e−14 |
| 6th surface |
| k = 6.750<br>A4 = −1.65736e−06, A6 = −2.85490e−10, A8 = 1.21681e−12 |
| 14th surface |
| k = −0.859<br>A4 = −1.10335e−06, A6 = −2.25718e−10, A8 = 1.30529e−13 |
| 15th surface |
| k = 0.165<br>A4 = 3.95032e−08, A6 = −6.71393e−10, A8 = 2.80361e−13 |
| 16th surface |
| k = −0.459<br>A4 = 4.57377e−06, A6 = −3.03724e−09, A8 = 9.29938e−13 |
| 17th surface |
| k = −4.247<br>A4 = 5.69051e−06, A6 = −4.82179e−09, A8 = 1.67011e−12 |
| 18th surface |
| k = −63.971<br>A4 = 1.34636e−06, A6 = −3.87038e−09, A8 = −3.48009e−13,<br>A10 = 1.77701e−15 |
| 19th surface |
| k = −1.377<br>A4 = −6.47891e−07, A6 = 1.15104e−10, A8 = −1.46999e−12,<br>A10 = 1.56999e−15 |
| 20th surface |
| k = −1.324<br>A4 = −3.27595e−06, A6 = 5.51173e−09, A8 = −9.45068e−13,<br>A10 = 5.26132e−15 |
| 21th surface |
| k = −1.000<br>A4 = 5.09843e−07, A6 = −7.59988e−10, A8 = −3.15984e−12 |
| 22th surface |
| k = −1.000<br>A4 = −1.12247e−06, A6 = −1.43359e−09, A8 = −6.54554e−12 |
| 23th surface |
| k = −0.877<br>A4 = −2.88824e−05, A6 = 1.68813e−07, A8 = −5.77452e−10,<br>A10 = 7.15614e−12 |

Various data

| | |
|---|---|
| NA | 0.81 |
| Magnification | −3.56 |
| Focal length | 23.68 |
| Image height(mm) | 7.93 |
| fb(mm) (in air) | 18.67 |
| Lens total length(mm) (in air) | 316.53 |

Example 73

Unit mm

Surface data

| Surface no. | r | d | nd | νd | θgf |
|---|---|---|---|---|---|
| 1* | −40.282 | 4.79 | 1.58364 | 30.30 | 0.599 |
| 2* | 463.655 | 0.15 | | | |
| 3* | −56.383 | 3.04 | 1.53368 | 55.90 | 0.563 |
| 4* | −22.798 | 0.05 | | | |
| 5* | 52.768 | 3.31 | 1.53368 | 55.90 | 0.563 |
| 6* | −30.496 | 0.05 | | | |
| 7* | 99.502 | 4.30 | 1.53368 | 55.90 | 0.563 |
| 8* | −15.870 | 0.05 | | | |
| 9* | 55.361 | 2.56 | 1.53368 | 55.90 | 0.563 |
| 10* | −40.687 | 0.05 | | | |
| 11* | −41.002 | 0.70 | 1.58364 | 30.30 | 0.599 |
| 12* | −132.635 | 0.05 | | | |
| 13* | −197.895 | 2.52 | 1.63490 | 23.88 | 0.630 |
| 14* | −19.020 | 0.05 | | | |
| 15* | −24.922 | 0.70 | 1.58364 | 30.30 | 0.599 |
| 16* | 37.592 | 0.05 | | | |
| 17 | 32.596 | 6.26 | 1.49700 | 81.61 | 0.538 |
| 18 | −15.766 | 0.70 | 1.72047 | 34.71 | 0.583 |
| 19 | −483.885 | 0.05 | | | |
| 20(Stop) | ∞ | −0.00 | | | |
| 21* | 31.326 | 1.93 | 1.53368 | 55.90 | 0.563 |
| 22* | 336.567 | 0.43 | | | |
| 23 | 129.510 | 5.53 | 1.49700 | 81.61 | 0.538 |
| 24 | −16.383 | 0.69 | 1.72047 | 34.71 | 0.583 |
| 25 | 44.942 | 5.29 | 1.49700 | 81.61 | 0.538 |
| 26 | −28.775 | 10.44 | | | |
| 27* | 43.477 | 3.20 | 1.84666 | 23.78 | 0.620 |
| 28* | 108.100 | 8.65 | | | |
| 29* | 13.858 | 7.47 | 1.53368 | 55.90 | 0.563 |
| 30* | −48.612 | 1.07 | | | |
| 31* | 26.460 | 6.21 | 1.53368 | 55.90 | 0.563 |
| 32* | 4.837 | 7.57 | | | |
| 33* | −354.887 | 1.05 | 1.53368 | 55.90 | 0.563 |
| 34* | −13.673 | 1.18 | | | |
| 35* | −10.332 | 1.47 | 1.53368 | 55.90 | 0.563 |
| 36* | 10.221 | 2.00 | | | |
| 37 | ∞ | 0.30 | 1.51640 | 65.06 | 0.535 |
| 38 | ∞ | 1.07 | | | |
| Image plane | ∞ | | | | |

Aspherical surface data

| |
|---|
| 1st surface |
| k = −3.208<br>A4 = −4.00276e−04, A6 = −1.07790e−05, A8 = −1.87287e−08 |
| 2nd surface |
| k = 7.798<br>A4 = −2.75758e−04, A6 = 2.10308e−08, A8 = −1.33321e−08 |
| 3rd surface |
| k = −18.910<br>A4 = −2.56423e−05, A6 = 8.98086e−08, A8 = −7.50836e−10 |
| 4th surface |
| k = 4.218<br>A4 = −8.97703e−05, A6 = 6.34630e−09, A8 = 1.59473e−10 |
| 5th surface |
| k = 2.825<br>A4 = 4.35005e−06, A6 = −3.43208e−07, A8 = 1.63947e−09 |
| 6th surface |
| k = −1.000<br>A4 = −2.56460e−06, A6 = 2.06882e−08, A8 = 5.97876e−10 |
| 7th surface |
| k = −1.000<br>A4 = −3.77951e−06, A6 = −6.33826e−09, A8 = 6.94696e−10 |

-continued

| Unit mm |
|---|
| 8th surface |
| k = −1.945<br>A4 = 3.71988e−06, A6 = −6.66431e−08, A8 = 2.51358e−09 |
| 9th surface |
| k = −18.446<br>A4 = −4.05634e−05, A6 = −2.46856e−07, A8 = 2.65735e−09 |
| 10th surface |
| k = −1.000<br>A4 = 1.06948e−06, A6 = 9.57333e−09, A8 = 3.53159e−11 |
| 11th surface |
| k = −1.000<br>A4 = 9.00548e−08, A6 = 1.08965e−08, A8 = 2.56428e−11 |
| 12th surface |
| k = −25.185<br>A4 = 1.20782e−05, A6 = 3.66535e−07, A8 = −1.92641e−09 |
| 13th surface |
| k = 9.934<br>A4 = −5.58480e−06, A6 = 3.40383e−07, A8 = −7.89811e−10 |
| 14th surface |
| k = 0.011<br>A4 = 6.84867e−05, A6 = 2.15623e−08, A8 = 3.28107e−09 |
| 15th surface |
| k = 2.072<br>A4 = 1.58083e−05, A6 = 1.06906e−07, A8 = 3.45403e−09 |
| 16th surface |
| k = −5.656<br>A4 = −8.90526e−05, A6 = −2.43611e−07, A8 = 1.71510e−09 |
| 21th surface |
| k = 0.012<br>A4 = −4.60350e−06, A6 = −1.00301e−07, A8 = 1.22359e−09 |
| 22th surface |
| k = −1157.205<br>A4 = 2.04437e−05, A6 = 1.78478e−07, A8 = 1.96410e−10 |
| 27th surface |
| k = 0.320<br>A4 = −1.89280e−06, A6 = −5.83570e−08, A8 = 1.95523e−10 |
| 28th surface |
| k = −177.199<br>A4 = −1.76597e−05, A6 = −2.74436e−08, A8 = 1.63913e−10 |
| 29th surface |
| k = −1.424<br>A4 = −4.44964e−05, A6 = −1.14731e−07, A8 = −1.32031e−09 |
| 30th surface |
| k = −49.536<br>A4 = −3.58778e−06, A6 = −1.51652e−07, A8 = −4.21497e−10 |
| 31th surface |
| k = −11.097<br>A4 = −4.01806e−05, A6 = 5.78536e−07, A8 = −3.83048e−09 |
| 32th surface |
| k = −1.067<br>A4 = −5.14012e−05, A6 = 3.96589e−06, A8 = 5.12675e−10 |
| 33th surface |
| k = −84.746<br>A4 = −9.39725e−05, A6 = 2.40683e−06, A8 = 1.83664e−08 |
| 34th surface |
| k = −19.376<br>A4 = 3.43366e−04, A6 = 1.79039e−06, A8 = −6.69090e−09 |

-continued

| Unit mm |
|---|
| 35th surface |
| k = −5.308<br>A4 = 2.75881e−04, A6 = 2.51333e−07, A8 = 1.18669e−08 |
| 36th surface |
| k = −14.558<br>A4 = −1.72642e−04, A6 = 1.29748e−06, A8 = −2.49913e−08 |

| Various data | |
|---|---|
| NA | 0.80 |
| Magnification | −3.54 |
| Focal length | 3.60 |
| Image height(mm) | 7.39 |
| fb(mm) (in air) | 3.27 |
| Lens total length(mm) (in air) | 94.87 |

Example 74

Unit mm

Surface data

| Surface no. | r | d | nd | νd | θgf |
|---|---|---|---|---|---|
| 1* | −22.220 | 11.55 | 1.53368 | 55.90 | 0.563 |
| 2* | −110.607 | 0.80 | | | |
| 3* | 69.374 | 9.96 | 1.84666 | 23.77 | 0.620 |
| 4* | −55.648 | 11.12 | | | |
| 5* | −53.462 | 3.04 | 1.58364 | 30.30 | 0.599 |
| 6* | −1333.696 | 0.30 | | | |
| 7* | 41.975 | 11.11 | 1.49700 | 81.61 | 0.538 |
| 8* | −33.586 | 6.66 | | | |
| 9 | −93.239 | 5.38 | 1.61800 | 63.33 | 0.544 |
| 10 | −21.843 | 1.00 | 1.72047 | 34.71 | 0.583 |
| 11 | 39.981 | 13.59 | | | |
| 12(Stop) | ∞ | 1.53 | | | |
| 13 | −61.889 | 1.00 | 1.72047 | 34.71 | 0.583 |
| 14 | 50.762 | 5.24 | 1.61800 | 63.33 | 0.544 |
| 15 | −54.934 | 0.10 | | | |
| 16* | 59.467 | 7.14 | 1.49700 | 81.61 | 0.538 |
| 17* | −66.460 | 0.10 | | | |
| 18* | 82.096 | 7.55 | 1.49700 | 81.61 | 0.538 |
| 19* | −54.564 | 3.09 | | | |
| 20* | −64.204 | 3.00 | 1.58364 | 30.30 | 0.599 |
| 21* | 444.592 | 8.67 | | | |
| 22* | 71.214 | 10.98 | 1.63490 | 23.88 | 0.630 |
| 23* | −83.225 | 28.34 | | | |
| 24* | −67.867 | 6.01 | 1.53368 | 55.90 | 0.563 |
| 25* | −608.925 | 5.07 | | | |
| 26* | −29.940 | 1.00 | 1.53368 | 55.90 | 0.563 |
| 27* | 92.925 | 5.00 | | | |
| 28 | ∞ | 0.30 | 1.51640 | 65.06 | 0.535 |
| 29 | ∞ | 6.50 | | | |
| Image plane | ∞ | | | | |

| Aspherical surface data |
|---|
| 1st surface |
| k = −3.559<br>A4 = 7.43178e−07, A6 = 9.21714e−09, A8 = 5.34633e−12 |
| 2nd surface |
| k = −56.705<br>A4 = 1.26171e−05, A6 = −2.11058e−08, A8 = 1.11767e−11 |
| 3rd surface |
| k = −0.891<br>A4 = −4.74513e−07, A6 = −1.03632e−10, A8 = 4.27759e−13 |

-continued

| Unit mm |
|---|
| 4th surface |
| k = −2.005<br>A4 = −2.95949e−07, A6 = 1.71592e−09, A8 = −1.02814e−12 |
| 5th surface |
| k = 0.000<br>A4 = 1.12076e−06, A6 = −3.15698e−09, A8 = −9.10021e−12 |
| 6th surface |
| k = 0.000<br>A4 = −1.68052e−06, A6 = −2.21792e−10, A8 = −7.11388e−12 |
| 7th surface |
| k = −2.402<br>A4 = −2.97163e−07, A6 = −2.14703e−09, A8 = 5.48901e−12 |
| 8th surface |
| k = −3.764<br>A4 = −7.20305e−07, A6 = −1.04316e−09, A8 = 3.58089e−12 |
| 16th surface |
| k = −0.278<br>A4 = 9.99889e−07, A6 = −1.23318e−09, A8 = −5.26020e−13 |
| 17th surface |
| k = −0.949<br>A4 = 6.09329e−08, A6 = −2.45917e−10, A8 = 8.84736e−16 |
| 18th surface |
| k = 3.430<br>A4 = 2.90794e−08, A6 = 5.65189e−10, A8 = −6.39630e−16 |
| 19th surface |
| k = −2.160<br>A4 = −3.62571e−07, A6 = −3.42492e−09, A8 = −3.01979e−13 |
| 20th surface |
| k = −0.380<br>A4 = 9.15647e−07, A6 = −7.30470e−09, A8 = −7.03078e−13 |
| 21th surface |
| k = 0.000<br>A4 = 1.54086e−06, A6 = 1.31932e−09, A8 = 6.29723e−16 |
| 22th surface |
| k = −8.393<br>A4 = 1.48279e−07, A6 = 1.47956e−10, A8 = 2.41697e−13,<br>A10 = −4.40436e−16 |
| 23th surface |
| k = 0.000<br>A4 = −1.31114e−06, A6 = 1.09844e−09, A8 = −5.20796e−13,<br>A10 = 1.48100e−16 |
| 24th surface |
| k = −2.311<br>A4 = −2.41567e−05, A6 = 2.27044e−08, A8 = −4.28423e−11,<br>A10 = −3.47983e−14 |
| 25th surface |
| k = 0.000<br>A4 = −4.10895e−06, A6 = −3.67106e−09, A8 = −4.04819e−11,<br>A10 = −2.16188e−17 |
| 26th surface |
| k = 0.000<br>A4 = −1.11631e−06, A6 = 8.03468e−09, A8 = −1.08760e−11,<br>A10 = 2.40056e−17 |
| 27th surface |
| k = −33.623<br>A4 = −2.66905e−05, A6 = 4.78713e−08, A8 = −7.55486e−11,<br>A10 = 4.72095e−14 |

-continued

Unit mm

Various data

| | |
|---|---|
| NA | 0.23 |
| Magnification | −1.33 |
| Focal length | 23.92 |
| Image height(mm) | 21.63 |
| fb(mm) (in air) | 11.70 |
| Lens total length(mm) (in air) | 175.01 |

Example 75

Unit mm

Surface data

| Surface no. | r | d | nd | νd | θgf |
|---|---|---|---|---|---|
| 1* | −18.167 | 3.69 | 1.53368 | 55.90 | 0.563 |
| 2* | −6801.076 | 0.08 | | | |
| 3* | 21.678 | 6.12 | 1.84666 | 23.77 | 0.620 |
| 4* | −284.362 | 0.36 | | | |
| 5* | 12.760 | 5.89 | 1.49700 | 81.61 | 0.538 |
| 6* | −83.302 | 2.65 | | | |
| 7 | −13.598 | 1.64 | 1.59522 | 67.74 | 0.544 |
| 8 | −8.480 | 0.70 | 1.72047 | 34.71 | 0.583 |
| 9 | 110.487 | 4.96 | | | |
| 10(Stop) | ∞ | 0.80 | | | |
| 11 | −48.292 | 0.70 | 1.72047 | 34.71 | 0.583 |
| 12 | 19.168 | 3.57 | 1.61800 | 63.33 | 0.544 |
| 13 | −22.873 | 0.05 | | | |
| 14* | 28.235 | 4.20 | 1.49700 | 81.61 | 0.538 |
| 15* | −20.667 | 0.05 | | | |
| 16* | 30.523 | 4.86 | 1.49700 | 81.61 | 0.538 |
| 17* | −26.992 | 2.22 | | | |
| 18* | −43.570 | 1.92 | 1.58364 | 30.30 | 0.599 |
| 19* | 28.439 | 3.33 | | | |
| 20* | 37.236 | 3.81 | 1.63490 | 23.88 | 0.630 |
| 21* | −37.308 | 12.91 | | | |
| 22* | −11.417 | 0.70 | 1.53368 | 55.90 | 0.563 |
| 23* | −54.620 | 3.52 | | | |
| 24* | −15.141 | 1.00 | 1.53368 | 55.90 | 0.563 |
| 25* | 52.853 | 1.42 | | | |
| 26 | ∞ | 0.30 | 1.51640 | 65.06 | 0.535 |
| 27 | ∞ | 0.50 | | | |
| Image plane | ∞ | | | | |

Aspherical surface data

| Aspherical surface data |
|---|
| 1st surface |
| k = −4.386<br>A4 = 8.13964e−05 |
| 2nd surface |
| k = −48.345<br>A4 = −1.43933e−04, A6 = −8.00000e−08 |
| 3rd surface |
| k = −0.148<br>A4 = 2.62435e−05, A6 = 7.46587e−08 |
| 4th surface |
| k = −2.471<br>A4 = 1.13156e−04, A6 = −3.03432e−07 |
| 5th surface |
| k = 0.000<br>A4 = −3.28501e−05 |
| 6th surface |
| k = 0.000<br>A4 = 1.86975e−04, A6 = 1.18474e−06 |

-continued

| Unit mm |
|---|
| 14th surface |
| k = −0.451<br>A4 = −7.69062e−06, A6 = −1.43734e−08 |
| 15th surface |
| k = −1.249<br>A4 = 2.02493e−05, A6 = 4.19132e−09 |
| 16th surface |
| k = 0.000<br>A4 = −8.45589e−06, A6 = 8.20795e−08 |
| 17th surface |
| k = −1.911<br>A4 = −3.58629e−05, A6 = 5.27389e−08 |
| 18th surface |
| k = −0.212<br>A4 = −6.84952e−05, A6 = −5.77815e−08 |
| 19th surface |
| k = 0.000<br>A4 = −4.80004e−05, A6 = −6.13427e−08 |
| 20th surface |
| k = −6.911<br>A4 = 3.04669e−05, A6 = −1.68754e−07 |
| 21th surface |
| k = 0.000<br>A4 = 1.99883e−06, A6 = −1.14266e−08 |
| 22th surface |
| k = 0.000<br>A4 = −3.55672e−05, A6 = 1.28738e−06 |
| 23th surface |
| k = 0.000<br>A4 = 7.71680e−05 |
| 24th surface |
| k = 0.000<br>A4 = 1.41483e−04, A6 = 1.00000e−07 |
| 25th surface |
| k = −200.000<br>A4 = −1.00622e−04, A6 = −2.32970e−07 |

| Various data | |
|---|---|
| NA | 0.23 |
| Magnification | −1.33 |
| Focal length | 8.65 |
| Image height(mm) | 10.82 |
| fb(mm) (in air) | 2.12 |
| Lens total length(mm) (in air) | 71.86 |

Example 76

Unit mm

Surface data

| Surface no. | r | d | nd | νd | θgf |
|---|---|---|---|---|---|
| 1* | −6.594 | 2.71 | 1.53368 | 55.90 | 0.563 |
| 2* | −15.141 | 0.05 | | | |
| 3* | 22.089 | 3.91 | 1.84666 | 23.77 | 0.620 |
| 4* | −18.712 | 2.70 | | | |
| 5* | −17.254 | 1.10 | 1.58364 | 30.30 | 0.599 |
| 6* | 34.657 | 0.11 | | | |
| 7* | 12.140 | 3.83 | 1.49700 | 81.61 | 0.538 |
| 8* | −10.668 | 1.93 | | | |
| 9 | −37.991 | 1.88 | 1.61800 | 63.33 | 0.544 |
| 10 | −6.858 | 0.70 | 1.72047 | 34.71 | 0.583 |
| 11 | 12.533 | 3.26 | | | |
| 12 (Stop) | ∞ | 0.31 | | | |
| 13 | −25.651 | 0.70 | 1.72047 | 34.71 | 0.583 |
| 14 | 12.946 | 2.21 | 1.61800 | 63.33 | 0.544 |
| 15 | −21.372 | 0.05 | | | |
| 16* | 25.619 | 3.07 | 1.49700 | 81.61 | 0.538 |
| 17* | −16.426 | 0.05 | | | |
| 18* | 23.987 | 3.45 | 1.49700 | 81.61 | 0.538 |
| 19* | −18.969 | 0.05 | | | |
| 20* | −67.273 | 1.10 | 1.58364 | 30.30 | 0.599 |
| 21* | 23.516 | 0.82 | | | |
| 22* | 23.296 | 3.10 | 1.63490 | 23.88 | 0.630 |
| 23* | −29.511 | 11.11 | | | |
| 24* | −16.767 | 0.50 | 1.53368 | 55.90 | 0.563 |
| 25* | −22.808 | 1.74 | | | |
| 26* | −7.454 | 0.50 | 1.53368 | 55.90 | 0.563 |
| 27* | 39.382 | 2.00 | | | |
| 28 | ∞ | 0.40 | 1.51640 | 65.06 | 0.535 |
| 29 | ∞ | 2.09 | | | |
| Image plane | ∞ | | | | |

| Aspherical surface data |
|---|
| 1st surface |
| k = −3.337<br>A4 = 7.81336e−05, A6 = 7.26382e−07, A8 = 2.76889e−08 |
| 2nd surface |
| k = −12.283<br>A4 = 1.65761e−04, A6 = −4.78004e−06, A8 = 1.77405e−08 |
| 3rd surface |
| k = −0.001<br>A4 = 2.82582e−06, A6 = 6.40852e−09, A8 = 4.33750e−09 |
| 4th surface |
| k = −3.772<br>A4 = 3.75820e−05, A6 = 3.81325e−07, A8 = −1.37171e−09 |
| 5th surface |
| k = 0.000<br>A4 = 7.52926e−05, A6 = −1.78578e−06, A8 = −1.36686e−08 |
| 6th surface |
| k = 0.000<br>A4 = −5.68162e−05, A6 = −5.39505e−07, A8 = −3.46650e−0 |
| 7th surface |
| k = −2.416<br>A4 = −3.38395e−05, A6 = −3.57963e−07, A8 = 2.59868e−08 |
| 8th surface |
| k = −4.028<br>A4 = 2.66890e−05, A6 = 7.32902e−07, A8 = 2.65023e−08 |
| 16th surface |
| k = −0.019<br>A4 = 8.97367e−05, A6 = −1.03233e−06, A8 = 7.72299e−09 |
| 17th surface |
| k = −1.855<br>A4 = 1.90242e−05, A6 = −6.72839e−07 |
| 18th surface |
| k = 0.000<br>A4 = 9.30171e−06, A6 = 3.12746e−07 |
| 19th surface |
| k = −1.268<br>A4 = −1.75825e−05, A6 = −1.24240e−07, A8 = 6.25523e−09 |

-continued

Unit mm

20th surface k = 0.000
A4 = −2.42353e−06, A6 = −2.15990e−06, A8 = 7.78426e−09

21th surface k = 0.000
A4 = 2.55273e−05, A6 = −1.61257e−08

22th surface k = −7.622
A4 = −3.41674e−06, A6 = −3.51619e−08, A8 = 5.04095e−09, A10 = −4.72437e−11

23th surface k = 0.000
A4 = −8.30630e−05, A6 = 3.95126e−08, A8 = 3.41864e−09, A10 = −2.19047e−11

24th surface k = 0.000
A4 = −6.73311e−04, A6 = 3.53688e−06, A8 = 6.26103e−08, A10 = −2.83370e−09

25th surface k = −31.496
A4 = −2.03990e−04, A6 = −1.56737e−06, A8 = −7.81513e−08

26th surface k = 0.000
A4 = 4.15201e−04, A6 = −1.51111e−06, A8 = 1.73325e−09

27th surface k = −182.577
A4 = −7.13102e−04, A6 = 1.05027e−05, A8 = −1.26316e−07, A10 = −4.92836e−11

Various data

| | |
|---|---|
| NA | 0.23 |
| Magnification | −1.34 |
| Focal length | 7.83 |
| Image height(mm) | 7.46 |
| fb(mm) (in air) | 4.36 |
| Lens total length(mm) (in air) | 55.30 |

Example 77

Unit mm

Surface data

| Surface no. | r | d | nd | νd | θgf |
|---|---|---|---|---|---|
| 1* | −5.961 | 2.31 | 1.53368 | 55.90 | 0.563 |
| 2* | −24.609 | 0.05 | | | |
| 3* | 17.837 | 2.80 | 1.84666 | 23.77 | 0.620 |
| 4* | −14.424 | 1.82 | | | |
| 5* | −15.035 | 0.46 | 1.58364 | 30.30 | 0.599 |
| 6* | 3512.460 | 0.05 | | | |
| 7* | 9.702 | 3.32 | 1.49700 | 81.61 | 0.538 |
| 8* | −7.673 | 0.99 | | | |
| 9 | −31.622 | 1.50 | 1.61800 | 63.33 | 0.544 |
| 10 | −5.784 | 0.70 | 1.72047 | 34.71 | 0.583 |
| 11 | 9.829 | 3.18 | | | |
| 12 (Stop) | ∞ | 0.25 | | | |
| 13 | −19.695 | 0.70 | 1.72047 | 34.71 | 0.583 |
| 14 | 12.012 | 1.60 | 1.61800 | 63.33 | 0.544 |
| 15 | −12.780 | 0.05 | | | |
| 16* | 18.475 | 2.02 | 1.49700 | 81.61 | 0.538 |
| 17* | −13.500 | 0.05 | | | |
| 18* | 11.482 | 2.43 | 1.49700 | 81.61 | 0.538 |
| 19* | −27.656 | 0.49 | | | |
| 20* | −13.626 | 0.52 | 1.58364 | 30.30 | 0.599 |
| 21* | −361.234 | 1.85 | | | |
| 22* | 16.895 | 1.87 | 1.63490 | 23.88 | 0.630 |
| 23* | −23.260 | 5.30 | | | |
| 24* | −7.198 | 0.46 | 1.53368 | 55.90 | 0.563 |
| 25* | −10.330 | 1.16 | | | |
| 26* | −5.492 | 0.50 | 1.53368 | 55.90 | 0.563 |
| 27* | 18.144 | 2.00 | | | |
| 28 | ∞ | 0.30 | 1.51640 | 65.06 | 0.535 |
| 29 | ∞ | 0.81 | | | |
| Image plane | ∞ | | | | |

-continued

Unit mm

Aspherical surface data

1st surface k = −3.978
A4 = 6.83164e−05, A6 = 1.94032e−05, A8 = 1.33454e−07

2nd surface k = −58.626
A4 = 7.53903e−04, A6 = −2.26638e−05, A8 = 1.17000e−07

3rd surface k = −1.266
A4 = −2.77500e−05, A6 = 6.78520e−07, A8 = 4.37879e−09

4th surface k = −3.007
A4 = 1.25194e−05, A6 = 2.27427e−06, A8 = 9.94944e−10

5th surface k = 0.000
A4 = 1.27950e−04, A6 = −1.46201e−06, A8 = −1.05504e−07

6th surface k = 0.000
A4 = −1.14481e−04, A6 = −3.81661e−07, A8 = −1.23805e−07

7th surface k = −1.950
A4 = −9.72173e−06, A6 = −4.81006e−06, A8 = 1.46505e−07

8th surface k = −4.052
A4 = 1.27783e−05, A6 = 1.17082e−06, A8 = 9.41636e−08

16th surface k = −2.587
A4 = 7.94127e−05, A6 = 2.33251e−09, A8 = −2.69891e−08

17th surface k = 0.444
A4 = −2.36239e−05, A6 = 3.53777e−07

18th surface k = 0.000
A4 = 2.69183e−05, A6 = 7.42095e−07

19th surface k = −0.016
A4 = −7.15117e−05, A6 = −3.49750e−06, A8 = −9.15827e−10

20th surface k = −1.384
A4 = 8.37580e−05, A6 = −8.92246e−06, A8 = 7.34778e−08

21th surface k = 0.000
A4 = 5.59543e−05, A6 = −9.82470e−07

22th surface k = −9.050
A4 = 2.70247e−05, A6 = 7.50428e−07, A8 = −7.24965e−08, A10 = 1.48867e−10

-continued

| Unit mm |
|---|
| 23th surface |
| k = 0.000<br>A4 = −3.00084e−05, A6 = −9.41421e−07, A8 = −1.23680e−08,<br>A10 = −4.67028e−10 |
| 24th surface |
| k = −0.035<br>A4 = −1.97646e−03, A6 = 3.98966e−05, A8 = −7.44586e−07,<br>A10 = −1.49643e−08 |
| 25th surface |
| k = 0.000<br>A4 = 3.47230e−05, A6 = −6.91721e−06, A8 = −6.57343e−08 |
| 26th surface |
| k = 0.000<br>A4 = 3.62836e−06, A6 = 9.62479e−06, A8 = −6.05415e−07 |
| 27th surface |
| k = −77.408<br>A4 = −1.88100e−03, A6 = 3.52845e−05, A8 = −1.48363e−06,<br>A10 = 1.10111e−08 |

| Various data | |
|---|---|
| NA | 0.22 |
| Magnification | −1.34 |
| Focal length | 5.46 |
| Image height (mm) | 5.33 |
| fb (mm) (in air) | 3.01 |
| Lens total length (mm) (in air) | 39.44 |

Example 78

Unit mm

Surface data

| Surface no. | r | d | nd | νd | θgf |
|---|---|---|---|---|---|
| 1* | −5.094 | 2.25 | 1.53368 | 55.90 | 0.563 |
| 2* | −21.978 | 0.05 | | | |
| 3* | 14.759 | 2.61 | 1.84666 | 23.77 | 0.620 |
| 4* | −12.484 | 1.35 | | | |
| 5* | −12.647 | 0.50 | 1.58364 | 30.30 | 0.599 |
| 6* | −300.282 | 0.05 | | | |
| 7* | 8.853 | 2.98 | 1.49700 | 81.61 | 0.538 |
| 8* | −6.900 | 0.75 | | | |
| 9 | −25.846 | 1.61 | 1.61800 | 63.33 | 0.544 |
| 10 | −5.005 | 0.70 | 1.72047 | 34.71 | 0.583 |
| 11 | 8.524 | 2.75 | | | |
| 12 (Stop) | ∞ | 0.24 | | | |
| 13 | −16.089 | 0.70 | 1.72047 | 34.71 | 0.583 |
| 14 | 10.367 | 1.58 | 1.61800 | 63.33 | 0.544 |
| 15 | −11.398 | 0.05 | | | |
| 16* | 14.113 | 1.91 | 1.49700 | 81.61 | 0.538 |
| 17* | −13.179 | 0.05 | | | |
| 18* | 12.193 | 2.41 | 1.49700 | 81.61 | 0.538 |
| 19* | −16.975 | 0.56 | | | |
| 20* | −11.963 | 0.46 | 1.58364 | 30.30 | 0.599 |
| 21* | −1533.737 | 1.63 | | | |
| 22* | 14.750 | 1.84 | 1.63490 | 23.88 | 0.630 |
| 23* | −19.850 | 4.58 | | | |
| 24* | −8.763 | 0.50 | 1.53368 | 55.90 | 0.563 |
| 25* | −22.584 | 1.25 | | | |
| 26* | −5.430 | 0.50 | 1.53368 | 55.90 | 0.563 |
| 27* | 17.171 | 1.00 | | | |
| 28 | ∞ | 0.30 | 1.51640 | 65.06 | 0.535 |
| 29 | ∞ | 1.30 | | | |
| Image plane | ∞ | | | | |

-continued

| Unit mm |
|---|
| Aspherical surface data |
| 1st surface |
| k = −3.753<br>A4 = 1.53644e−04, A6 = 3.51095e−05, A8 = 3.76371e−07 |
| 2nd surface |
| k = −52.983<br>A4 = 1.19282e−03, A6 = −4.36922e−05, A8 = 4.49809e−07 |
| 3rd surface |
| k = −1.023<br>A4 = −4.33927e−05, A6 = 1.26681e−06, A8 = 1.69670e−08 |
| 4th surface |
| k = −2.862<br>A4 = 8.92430e−06, A6 = 4.43110e−06, A8 = −2.90479e−08 |
| 5th surface |
| k = 0.000<br>A4 = 1.82796e−04, A6 = −3.80553e−06, A8 = −3.13184e−07 |
| 6th surface |
| k = 0.000<br>A4 = −1.74059e−04, A6 = −1.12245e−06, A8 = −3.34962e−07 |
| 7th surface |
| k = −2.012<br>A4 = 1.52723e−05, A6 = −8.41101e−06, A8 = 3.66174e−07 |
| 8th surface |
| k = −3.986<br>A4 = 8.69409e−06, A6 = 1.21957e−06, A8 = 2.32185e−07 |
| 16th surface |
| k = −1.895<br>A4 = 1.31025e−04, A6 = −4.14291e−07, A8 = −1.11771e−07 |
| 17th surface |
| k = −0.030<br>A4 = 5.11989e−06, A6 = 1.41228e−06 |
| 18th surface |
| k = 0.000<br>A4 = 3.58772e−05, A6 = 3.68790e−06 |
| 19th surface |
| k = −0.665<br>A4 = −9.13946e−05, A6 = −9.02423e−06, A8 = −1.32639e−07 |
| 20th surface |
| k = −0.869<br>A4 = 9.86704e−05, A6 = −1.97220e−05, A8 = 3.10896e−08 |
| 21th surface |
| k = 0.000<br>A4 = 1.09340e−04, A6 = 1.74012e−06 |
| 22th surface |
| k = −7.881<br>A4 = 4.76596e−05, A6 = 1.36921e−06, A8 = −6.41081e−08,<br>A10 = −1.98830e−09 |
| 23th surface |
| k = 0.000<br>A4 = −1.16502e−04, A6 = −1.10099e−07, A8 = −1.34141e−08,<br>A10 = −1.23320e−09 |
| 24th surface |
| k = −0.003<br>A4 = −2.69363e−03, A6 = 5.72972e−05, A8 = −2.11668e−06,<br>A10 = −1.79590e−08 |
| 25th surface |
| k = 0.000<br>A4 = −1.49191e−04, A6 = −1.19921e−05, A8 = −8.57893e−07 |

| Unit mm |
|---|
| 26th surface |
| k = 0.000<br>A4 = −2.57594e−04, A6 = 1.16204e−05, A8 = −9.02596e−07 |
| 27th surface |
| k = −68.041<br>A4 = −2.65930e−03, A6 = 7.91869e−05, A8 = −3.96242e−06, A10 = 4.79066e−08 |

| Various data | |
|---|---|
| NA | 0.23 |
| Magnification | −1.33 |
| Focal length | 4.88 |
| Image height (mm) | 4.75 |
| fb (mm) (in air) | 2.50 |
| Lens total length (mm) (in air) | 36.35 |

Example 79

Unit mm

Surface data

| Surface no. | r | d | nd | νd | θgf |
|---|---|---|---|---|---|
| 1* | 29.347 | 3.01 | 1.84666 | 23.77 | 0.620 |
| 2* | −36.004 | 0.10 | | | |
| 3 | −397.741 | 0.70 | 1.65412 | 39.68 | 0.574 |
| 4 | 21.124 | 0.10 | | | |
| 5* | 19.426 | 4.27 | 1.49700 | 81.61 | 0.538 |
| 6 | −31.982 | 0.10 | | | |
| 7 | 20.342 | 3.53 | 1.49700 | 81.61 | 0.538 |
| 8* | −22.961 | 0.10 | | | |
| 9 | −172.666 | 2.93 | 1.61800 | 63.33 | 0.544 |
| 10 | −11.505 | 0.70 | 1.72047 | 34.71 | 0.583 |
| 11 | 24.226 | 0.79 | | | |
| 12 (Stop) | ∞ | 0.17 | | | |
| 13 | −243.374 | 0.70 | 1.90366 | 31.32 | 0.595 |
| 14 | 9.660 | 3.41 | 1.61800 | 63.33 | 0.544 |
| 15 | −43.351 | 0.10 | | | |
| 16* | 11.180 | 4.50 | 1.49700 | 81.61 | 0.538 |
| 17* | −10186.757 | 8.48 | | | |
| 18* | 719.997 | 0.70 | 1.49700 | 81.61 | 0.538 |
| 19* | 13.006 | 6.32 | | | |
| 20* | 13.192 | 3.44 | 1.58364 | 30.30 | 0.599 |
| 21* | −15.080 | 3.70 | | | |
| 22* | −9.430 | 0.81 | 1.49700 | 81.61 | 0.538 |
| 23* | 10.877 | 2.39 | | | |
| 24* | −10.747 | 0.51 | 1.53368 | 55.90 | 0.563 |
| 25* | −3339.876 | 1.75 | | | |
| 26 | ∞ | 0.38 | 1.51640 | 65.06 | 0.535 |
| 27 | ∞ | 0.50 | | | |
| Image plane | ∞ | | | | |

| Aspherical surface data |
|---|
| 1st surface |
| k = 0.000<br>A4 = 1.00145e−05 |
| 2nd surface |
| k = 0.000<br>A4 = 4.66734e−05 |
| 5th surface |
| k = 0.699<br>A4 = 2.24508e−05 |

| Unit mm |
|---|
| 8th surface |
| k = 0.000<br>A4 = 8.05284e−05 |
| 16th surface |
| k = −0.579<br>A4 = 7.50799e−06 |
| 17th surface |
| k = 0.000<br>A4 = −8.03928e−05 |
| 18th surface |
| k = 0.000<br>A4 = 2.62042e−04 |
| 19th surface |
| k = 0.000<br>A4 = 2.02927e−08 |
| 20th surface |
| k = 0.000<br>A4 = 1.22996e−05 |
| 21th surface |
| k = 0.000<br>A4 = 1.31433e−04 |
| 22th surface |
| k = 0.000<br>A4 = 1.29005e−10 |
| 23th surface |
| k = 0.000<br>A4 = −8.96164e−11 |
| 24th surface |
| k = 0.000<br>A4 = 3.63415e−11 |
| 25th surface |
| k = 0.000<br>A4 = −8.06302e−04, A6 = −6.85664e−06 |

| Various data | |
|---|---|
| NA | 0.38 |
| Magnification | −2.20 |
| Focal length | 5.02 |
| Image height (mm) | 4.92 |
| fb (mm) (in air) | 2.50 |
| Lens total length (mm) (in air) | 54.08 |

Example 80

Unit mm

Surface data

| Surface no. | r | d | nd | νd | θgf |
|---|---|---|---|---|---|
| 1 | −4.006 | 2.23 | 1.53368 | 55.90 | 0.563 |
| 2* | −5.643 | 0.10 | | | |
| 3* | 25.874 | 2.62 | 1.84666 | 23.77 | 0.620 |
| 4 | −8.470 | 0.46 | | | |
| 5 | −9.951 | 0.50 | 1.58364 | 30.30 | 0.599 |
| 6 | 31.833 | 0.10 | | | |
| 7* | 15.267 | 2.87 | 1.49700 | 81.61 | 0.538 |
| 8* | −7.030 | 0.10 | | | |
| 9 | 11.408 | 2.73 | 1.61800 | 63.33 | 0.544 |
| 10 | −5.135 | 0.70 | 1.72047 | 34.71 | 0.583 |
| 11 | 5.898 | 1.39 | | | |

-continued

| Unit mm | | | | | |
|---|---|---|---|---|---|
| 12 (Stop) | ∞ | 0.95 | | | |
| 13 | −13.978 | 0.70 | 1.72047 | 34.71 | 0.583 |
| 14 | 12.361 | 2.62 | 1.61800 | 63.33 | 0.544 |
| 15 | −9.042 | 0.05 | | | |
| 16* | 13.037 | 3.38 | 1.49700 | 81.61 | 0.538 |
| 17* | −8.022 | 1.85 | | | |
| 18* | 60.912 | 0.50 | 1.58364 | 30.30 | 0.599 |
| 19* | 10.361 | 4.64 | | | |
| 20* | 7.593 | 2.80 | 1.63490 | 23.88 | 0.630 |
| 21 | 57.244 | 3.84 | | | |
| 22 | −9.323 | 0.50 | 1.53368 | 55.90 | 0.563 |
| 23 | 402.242 | 1.68 | | | |
| 24 | −6.000 | 0.50 | 1.53368 | 55.90 | 0.563 |
| 25* | 39.607 | 0.90 | | | |
| 26 | ∞ | 0.30 | 1.51640 | 65.06 | 0.535 |
| 27 | ∞ | 0.50 | | | |
| Image plane | ∞ | | | | |

Aspherical surface data

2nd surface k = 0.000
A4 = 2.35623e−04

3rd surface k = 0.000
A4 = −2.82645e−04

7th surface k = 0.000
A4 = −2.81954e−05

8th surface k = 0.000
A4 = 5.97163e−04

16th surface k = 0.000
A4 = −3.21151e−04

17th surface k = 0.000
A4 = 4.81608e−05

18th surface k = 0.000
A4 = 1.49059e−04

19th surface k = 0.000
A4 = −1.11086e−04

20th surface k = 0.000
A4 = −1.48114e−04

25th surface k = 0.000
A4 = −8.65591e−04, A6 = −1.95796e−05

Various data

| | |
|---|---|
| NA | 0.32 |
| Magnification | −2.00 |
| Focal length | 3.72 |
| Image height (mm) | 3.87 |
| fb (mm) (in air) | 1.60 |
| Lens total length (mm) (in air) | 39.40 |

Example 81

Unit mm

Surface data

| Surface no. | r | d | nd | νd | θgf |
|---|---|---|---|---|---|
| 1 | −4.999 | 2.50 | 1.53368 | 55.90 | 0.563 |
| 2* | −7.791 | 0.10 | | | |
| 3* | 26.421 | 2.58 | 1.84666 | 23.77 | 0.620 |
| 4 | −8.717 | 0.45 | | | |
| 5 | −16.546 | 0.50 | 1.58364 | 30.30 | 0.599 |
| 6 | 7.490 | 0.18 | | | |
| 7* | 7.494 | 3.51 | 1.49700 | 81.61 | 0.538 |
| 8* | −6.731 | 0.10 | | | |
| 9 | 8.184 | 2.60 | 1.61800 | 63.33 | 0.544 |
| 10 | −9.417 | 0.70 | 1.72047 | 34.71 | 0.583 |
| 11 | 5.248 | 1.23 | | | |
| 12 (Stop) | ∞ | 1.08 | | | |
| 13 | −8.120 | 0.70 | 1.72047 | 34.71 | 0.583 |
| 14 | 263.853 | 2.25 | 1.61800 | 63.33 | 0.544 |
| 15 | −8.897 | 0.05 | | | |
| 16* | 14.031 | 3.32 | 1.49700 | 81.61 | 0.538 |
| 17* | −8.260 | 0.05 | | | |
| 18* | 16.860 | 1.79 | 1.49700 | 81.61 | 0.538 |
| 19* | 32.221 | 0.80 | | | |
| 20* | 38.453 | 0.50 | 1.58364 | 30.30 | 0.599 |
| 21* | 8.351 | 3.63 | | | |
| 22* | 6.933 | 2.65 | 1.63490 | 23.88 | 0.630 |
| 23 | 26.183 | 4.93 | | | |
| 24 | −6.000 | 0.50 | 1.53368 | 55.90 | 0.563 |
| 25* | 12.318 | 2.01 | | | |
| 26 | ∞ | 0.30 | 1.51640 | 65.06 | 0.535 |
| 27 | ∞ | 0.50 | | | |
| Image plane | ∞ | | | | |

Aspherical surface data

2nd surface k = 0.000
A4 = 1.99427e−04

3rd surface k = 0.000
A4 = −3.99767e−04

7th surface k = 0.000
A4 = −2.57298e−04

8th surface k = 0.000
A4 = 4.27793e−04

16th surface k = 0.000
A4 = −2.36647e−04

17th surface k = 0.000
A4 = −2.67152e−05

18th surface k = 0.000
A4 = 2.23589e−09

19th surface k = 0.000
A4 = −2.43051e−09

20th surface k = 0.000
A4 = −1.76676e−04

21th surface k = 0.000
A4 = −4.16810e−04

-continued

| Unit mm | |
|---|---|
| 22th surface | |
| k = 0.000<br>A4 = −2.89542e−04 | |
| 25th surface | |
| k = 0.000<br>A4 = −8.76890e−04, A6 = 6.34071e−06 | |
| Various data | |
| NA | 0.32 |
| Magnification | −2.00 |
| Focal length | 4.27 |
| Image height (mm) | 3.87 |
| fb (mm) (in air) | 2.70 |
| Lens total length (mm) (in air) | 39.40 |

Example 82

Unit mm

Surface data

| Surface no. | r | d | nd | νd | θgf |
|---|---|---|---|---|---|
| 1 | −5.000 | 2.61 | 1.53368 | 55.90 | 0.563 |
| 2* | −6.052 | 0.10 | | | |
| 3* | 29.971 | 2.45 | 1.84666 | 23.77 | 0.620 |
| 4 | −8.900 | 0.10 | | | |
| 5 | −12.880 | 0.50 | 1.58364 | 30.30 | 0.599 |
| 6 | 15.407 | 0.28 | | | |
| 7* | 14.854 | 2.80 | 1.49700 | 81.61 | 0.538 |
| 8* | −7.113 | 0.10 | | | |
| 9 | 10.444 | 2.55 | 1.61800 | 63.33 | 0.544 |
| 10 | −6.908 | 0.70 | 1.72047 | 34.71 | 0.583 |
| 11 | 5.463 | 1.42 | | | |
| 12 (Stop) | ∞ | 1.00 | | | |
| 13 | −10.334 | 0.70 | 1.72047 | 34.71 | 0.583 |
| 14 | 16.417 | 2.68 | 1.61800 | 63.33 | 0.544 |
| 15 | −7.780 | 0.05 | | | |
| 16* | 12.572 | 3.57 | 1.49700 | 81.61 | 0.538 |
| 17* | −7.222 | 1.66 | | | |
| 18* | −222.930 | 0.50 | 1.58364 | 30.30 | 0.599 |
| 19* | 9.006 | 3.98 | | | |
| 20* | 7.379 | 2.73 | 1.63490 | 23.88 | 0.630 |
| 21 | 40.501 | 5.73 | | | |
| 22 | −6.000 | 0.50 | 1.53368 | 55.90 | 0.563 |
| 23* | 11.000 | 2.01 | | | |
| 24 | ∞ | 0.30 | 1.51640 | 65.06 | 0.535 |
| 25 | ∞ | 0.50 | | | |
| Image plane | ∞ | | | | |

Aspherical surface data

| |
|---|
| 2nd surface |
| k = 0.000<br>A4 = −1.05936e−11 |
| 3rd surface |
| k = 0.000<br>A4 = −3.54087e−04 |
| 7th surface |
| k = 0.000<br>A4 = −4.91474e−04 |
| 8th surface |
| k = 0.000<br>A4 = 2.22934e−04 |

-continued

| Unit mm | |
|---|---|
| 16th surface | |
| k = 0.000<br>A4 = −5.25327e−04 | |
| 17th surface | |
| k = 0.000<br>A4 = 1.12098e−04 | |
| 18th surface | |
| k = 0.000<br>A4 = −1.70703e−05 | |
| 19th surface | |
| k = 0.000<br>A4 = −4.89824e−04 | |
| 20th surface | |
| k = 0.000<br>A4 = −3.06971e−04 | |
| 23th surface | |
| k = 0.000<br>A4 = −1.00102e−03, A6 = −4.72860e−06 | |
| Various data | |
| NA | 0.32 |
| Magnification | −2.00 |
| Focal length | 4.22 |
| Image height (mm) | 3.87 |
| fb (mm) (in air) | 2.70 |
| Lens total length (mm) (in air) | 39.40 |

Example 83

Unit mm

Surface data

| Surface no. | r | d | nd | νd | θgf |
|---|---|---|---|---|---|
| 1* | −8.255 | 2.60 | 1.53368 | 55.90 | 0.563 |
| 2* | −14.196 | 1.24 | | | |
| 3* | 101.410 | 6.01 | 1.84666 | 23.77 | 0.620 |
| 4* | −20.773 | 6.49 | | | |
| 5* | −16.458 | 1.50 | 1.58364 | 30.30 | 0.599 |
| 6* | 115.582 | 0.05 | | | |
| 7* | 25.167 | 4.74 | 1.49700 | 81.61 | 0.538 |
| 8* | −58.962 | 0.05 | | | |
| 9* | 108.206 | 3.90 | 1.49700 | 81.61 | 0.538 |
| 10* | −18.035 | 2.69 | | | |
| 11 | 262.420 | 3.93 | 1.61800 | 63.33 | 0.544 |
| 12 | −14.956 | 0.59 | 1.72047 | 34.71 | 0.583 |
| 13 | 30.541 | 6.11 | | | |
| 14(Stop) | ∞ | 1.38 | | | |
| 15 | −26.136 | 0.63 | 1.72047 | 34.71 | 0.583 |
| 16 | 63.605 | 2.51 | 1.61800 | 63.33 | 0.544 |
| 17 | −37.610 | 0.05 | | | |
| 18* | 76.408 | 4.37 | 1.49700 | 81.61 | 0.538 |
| 19* | −22.777 | 0.05 | | | |
| 20* | 44.456 | 5.20 | 1.49700 | 81.61 | 0.538 |
| 21* | −44.738 | 3.37 | | | |
| 22* | −32.651 | 0.69 | 1.58364 | 30.30 | 0.599 |
| 23* | −325.190 | 0.05 | | | |
| 24* | 27.615 | 4.73 | 1.63490 | 23.88 | 0.630 |
| 25* | −102.253 | 19.80 | | | |
| 26* | −14.459 | 0.70 | 1.53368 | 55.90 | 0.563 |
| 27* | −111.000 | 2.16 | | | |
| 28* | −17.656 | 1.10 | 1.53368 | 55.90 | 0.563 |
| 29* | 110.376 | 1.20 | | | |
| 30 | ∞ | 0.30 | 1.51640 | 65.06 | 0.535 |
| 31 | ∞ | 0.50 | | | |
| Image plane | ∞ | | | | |

-continued

Unit mm

Aspherical surface data

1st surface k = −1.539
A4 = 1.48943e−05, A6 = −3.89277e−07, A8 = −3.16495e−10

2nd surface k = −2.553
A4 = 8.26430e−05, A6 = −3.70903e−07, A8 = −4.35290e−10

3rd surface k = 0.000
A4 = 5.57538e−06, A6 = 3.09183e−09, A8 = −7.06884e−12

4th surface k = −0.148
A4 = 1.09741e−05, A6 = 4.10988e−08, A8 = −1.79459e−11

5th surface k = −0.223
A4 = 2.76548e−06, A6 = 9.37309e−08, A8 = 1.06388e−10

6th surface k = −29.473
A4 = −5.12018e−06, A6 = −1.66723e−08, A8 = 2.66467e−10

7th surface k = −2.649
A4 = 2.86256e−06, A6 = 6.93196e−08, A8 = 2.24500e−10

8th surface k = 0.000
A4 = 4.46646e−06, A6 = 2.43563e−08

9th surface k = 0.000
A4 = −6.36933e−06, A6 = −6.27240e−09

10th surface k = −3.004
A4 = 8.21883e−06, A6 = 8.91877e−08, A8 = 6.92116e−11

18th surface k = 0.000
A4 = 5.10610e−06, A6 = −7.42857e−08, A8 = −1.54961e−11

19th surface k = 0.000
A4 = 3.08416e−06, A6 = 2.25200e−08, A8 = −1.04000e−10

20th surface k = 0.000
A4 = 4.03758e−06, A6 = 3.78128e−09, A8 = −8.78028e−11

21th surface k = 0.001
A4 = −8.30957e−06, A6 = −7.77920e−08, A8 = −7.06650e−12

22th surface k = 0.000
A4 = 1.08913e−06, A6 = −3.06879e−08, A8 = −1.47637e−11

23th surface k = −1487.500
A4 = 1.34349e−06, A6 = 1.87699e−08, A8 = 1.46137e−11

24th surface k = −1.292
A4 = 4.79292e−06, A6 = 9.60595e−10, A8 = 1.17371e−10

25th surface k = −27.655
A4 = 6.98089e−06, A6 = 1.06437e−08

-continued

Unit mm

26th surface k = −0.383
A4 = −7.30149e−05, A6 = 4.72395e−07, A8 = −3.56824e−09

27th surface k = 0.000
A4 = 3.59150e−05, A6 = −3.31847e−07, A8 = −8.89867e−10

28th surface k = 0.000
A4 = 5.68566e−05

29th surface k = −1058.583
A4 = −1.26430e−04, A6 = −5.45019e−09, A8 = 6.66594e−11

Various data

| | |
|---|---|
| NA | 0.33 |
| Magnification | −1.32 |
| Focal length | 9.91 |
| Image height(mm) | 10.82 |
| fb(mm) (in air) | 1.90 |
| Lens total length(mm) (in air) | 88.59 |

Example 84

Unit mm

Surface data

| Surface no. | r | d | nd | νd | θgf |
|---|---|---|---|---|---|
| 1 | 5.522 | 3.32 | 1.49700 | 81.54 | 0.537 |
| 2 | −4.753 | 0.70 | 1.72047 | 34.71 | 0.583 |
| 3 | −6.534 | 0.05 | | | |
| 4* | −11.725 | 1.03 | 1.53368 | 55.90 | 0.563 |
| 5* | −2.515 | 0.35 | | | |
| 6* | 2.408 | 1.07 | 1.58364 | 30.30 | 0.599 |
| 7* | 1.032 | 1.34 | | | |
| 8(Stop) | ∞ | −0.63 | | | |
| 9* | 2.834 | 1.69 | 1.49700 | 81.54 | 0.537 |
| 10* | −7.273 | 0.11 | | | |
| 11* | −52.231 | 0.42 | 1.58364 | 30.30 | 0.599 |
| 12* | 3.627 | 2.78 | | | |
| 13* | −10.317 | 0.64 | 1.53368 | 55.90 | 0.563 |
| 14* | −20.884 | 0.43 | | | |
| 15* | 36.783 | 0.98 | 1.58364 | 30.30 | 0.599 |
| 16* | 70.302 | 0.36 | | | |
| 17* | −113.857 | 2.13 | 1.53368 | 55.90 | 0.563 |
| 18* | −2.520 | 0.73 | | | |
| 19* | 5.467 | 1.41 | 1.53368 | 55.90 | 0.563 |
| 20* | 1.773 | 3.00 | | | |
| 21 | ∞ | 0.30 | 1.51640 | 65.06 | 0.535 |
| 22 | ∞ | 2.68 | | | |
| Image plane | ∞ | | | | |

Aspherical surface data

4th surface k = −2.346
A4 = −5.47816e−04, A6 = −1.85200e−05, A8 = −1.11713e−06

5th surface k = −4.656
A4 = −1.45735e−03, A6 = 1.26259e−04, A8 = −9.07838e−07

6th surface k = −0.427
A4 = −1.37657e−02, A6 = 1.04387e−03, A8 = −1.43077e−04

| Unit mm |
|---|
| 7th surface |
| k = −1.871<br>A4 = 1.08273e−02, A6 = −1.21053e−04, A8 = −1.09274e−04 |
| 9th surface |
| k = −1.286<br>A4 = −9.36741e−04, A6 = 5.67573e−04, A8 = 9.10428e−05 |
| 10th surface |
| k = −2.245<br>A4 = −4.60559e−03, A6 = 8.95601e−04, A8 = 6.69421e−06 |
| 11th surface |
| k = −934.669<br>A4 = −1.82784e−02, A6 = 2.13051e−03, A8 = −1.14784e−04 |
| 12th surface |
| k = −5.112<br>A4 = −4.07687e−04, A6 = −4.69186e−04, A8 = 1.51357e−04 |
| 13th surface |
| k = −0.526<br>A4 = −3.38283e−04, A6 = 3.66199e−05, A8 = 6.67864e−06 |
| 14th surface |
| k = −0.958<br>A4 = 2.56611e−04, A6 = −1.97950e−05, A8 = −3.52754e−07 |
| 15th surface |
| k = −0.461<br>A4 = −4.06730e−05, A6 = 6.44269e−06, A8 = −9.11321e−07 |
| 16th surface |
| k = −633.160<br>A4 = −8.54163e−03, A6 = 7.70310e−04, A8 = −2.24802e−05 |
| 17th surface |
| k = −9931.442<br>A4 = −9.69825e−03, A6 = 9.38022e−04, A8 = −3.70711e−05 |
| 18th surface |
| k = −3.263<br>A4 = −3.49796e−03, A6 = 2.98375e−04, A8 = −1.72732e−05 |
| 19th surface |
| k = 0.012<br>A4 = −2.75744e−03, A6 = 1.27065e−04, A8 = −1.14029e−05 |
| 20th surface |
| k = −2.861<br>A4 = −1.60534e−03, A6 = 1.89038e−04, A8 = −1.72789e−05 |

| Various data | |
|---|---|
| NA | 0.42 |
| Magnification | −2.54 |
| Focal length | 5.60 |
| Image height(mm) | 2.82 |
| fb(mm) (in air) | 5.88 |
| Lens total length(mm) (in air) | 24.78 |

Example 85

Unit mm

Surface data

| Surface no. | r | d | nd | νd | θgf |
|---|---|---|---|---|---|
| 1* | −5.514 | 1.29 | 1.53368 | 55.90 | 0.563 |
| 2* | −11.922 | 0.05 | | | |
| 3* | 5.778 | 1.67 | 1.63490 | 23.88 | 0.630 |
| 4* | −29.284 | 0.05 | | | |
| 5* | 4.017 | 1.87 | 1.49700 | 81.61 | 0.538 |
| 6* | −15.570 | 0.05 | | | |
| 7 | 34.714 | 1.69 | 1.61800 | 63.33 | 0.544 |
| 8 | −3.637 | 0.50 | 1.72047 | 34.71 | 0.583 |
| 9 | 6.126 | 0.50 | | | |
| 10(Stop) | ∞ | 0.57 | | | |
| 11 | −4.026 | 0.50 | 1.72047 | 34.71 | 0.583 |
| 12 | 6.286 | 2.41 | 1.61800 | 63.33 | 0.544 |
| 13 | −4.605 | 0.05 | | | |
| 14* | 4.993 | 3.09 | 1.49700 | 81.61 | 0.538 |
| 15* | −10.575 | 4.34 | | | |
| 16* | −3.072 | 0.50 | 1.58364 | 30.30 | 0.599 |
| 17* | 12.916 | 3.27 | | | |
| 18* | 34.808 | 2.40 | 1.63490 | 23.88 | 0.630 |
| 19* | −5.789 | 0.05 | | | |
| 20* | 5.466 | 3.30 | 1.53368 | 55.90 | 0.563 |
| 21* | 2.769 | 2.00 | | | |
| 22 | ∞ | 0.30 | 1.51640 | 65.06 | 0.535 |
| 23 | ∞ | 1.21 | | | |
| Image plane | ∞ | | | | |

| Aspherical surface data |
|---|
| 1st surface |
| k = −12.202<br>A4 = 1.84539e−03, A6 = 3.72790e−04, A8 = −1.11934e−05 |
| 2nd surface |
| k = −1.452<br>A4 = 1.42284e−04, A6 = −2.93804e−05, A8 = 1.26134e−05 |
| 3rd surface |
| k = −0.043<br>A4 = 2.43901e−04, A6 = −5.83025e−06, A8 = 2.13535e−06 |
| 4th surface |
| k = −234.585<br>A4 = 3.56864e−04, A6 = 4.51097e−05, A8 = 6.12625e−07 |
| 5th surface |
| k = −2.940<br>A4 = −8.89164e−04, A6 = −7.32674e−05, A8 = −4.90767e−06 |
| 6th surface |
| k = 4.395<br>A4 = 2.86421e−05, A6 = −8.09298e−05, A8 = −2.56197e−06 |
| 14th surface |
| k = −0.616<br>A4 = −4.85884e−04, A6 = −3.21813e−06, A8 = −2.60788e−07 |
| 15th surface |
| k = 0.121<br>A4 = 3.77898e−05, A6 = −2.13024e−05, A8 = 5.58090e−07 |
| 16th surface |
| k = −0.444<br>A4 = 2.49937e−03, A6 = −2.65748e−05, A8 = −3.54361e−06 |
| 17th surface |
| k = 0.000<br>A4 = 1.53490e−03, A6 = 1.15188e−04, A8 = −1.26803e−05 |
| 18th surface |
| k = −55.238<br>A4 = −4.63820e−04, A6 = −5.23030e−05, A8 = 4.97870e−07,<br>A10 = 3.80003e−08 |
| 19th surface |
| k = −0.135<br>A4 = 7.41400e−05, A6 = 7.36376e−06, A8 = −1.55794e−06,<br>A10 = 3.62379e−08 |

-continued

| Unit mm |
|---|
| 20th surface |
| k = −1.532<br>A4 = −8.00176e−04, A6 = 6.13990e−05, A8 = 2.02773e−06,<br>A10 = −7.50573e−10 |
| 21th surface |
| k = −0.303<br>A4 = −7.75557e−03, A6 = 1.59034e−05, A8 = −1.60847e−06,<br>A10 = −3.30506e−07 |

| Various data | |
|---|---|
| NA | 0.40 |
| Magnification | −2.58 |
| Focal length | 6.09 |
| Image height(mm) | 2.86 |
| fb(mm) (in air) | 3.40 |
| Lens total length(mm) (in air) | 31.54 |

Example 86

Unit mm

Surface data

| Surface no. | r | d | nd | vd | θgf |
|---|---|---|---|---|---|
| 1* | −2.994 | 0.88 | 1.53368 | 55.90 | 0.563 |
| 2* | −8.073 | 0.05 | | | |
| 3* | 6.018 | 1.86 | 1.63490 | 23.88 | 0.630 |
| 4* | −20.490 | 0.05 | | | |
| 5* | 3.224 | 2.35 | 1.49700 | 81.61 | 0.538 |
| 6* | −12.832 | 0.05 | | | |
| 7 | −29.415 | 1.62 | 1.61800 | 63.33 | 0.544 |
| 8 | −3.584 | 0.50 | 1.72047 | 34.71 | 0.583 |
| 9 | 8.995 | 0.50 | | | |
| 10(Stop) | ∞ | 0.63 | | | |
| 11 | −4.307 | 0.50 | 1.72047 | 34.71 | 0.583 |
| 12 | 7.428 | 2.35 | 1.61800 | 63.33 | 0.544 |
| 13 | −4.986 | 0.05 | | | |
| 14* | 4.490 | 3.26 | 1.49700 | 81.61 | 0.538 |
| 15* | −11.421 | 3.45 | | | |
| 16* | −3.264 | 0.50 | 1.58364 | 30.30 | 0.599 |
| 17* | 16.176 | 2.44 | | | |
| 18* | 30.183 | 2.05 | 1.63490 | 23.88 | 0.630 |
| 19* | −5.566 | 0.05 | | | |
| 20* | 4.781 | 3.10 | 1.53368 | 55.90 | 0.563 |
| 21* | 2.375 | 2.00 | | | |
| 22 | ∞ | 0.30 | 1.51640 | 65.06 | 0.535 |
| 23 | ∞ | 0.80 | | | |
| Image plane | ∞ | | | | |

| Aspherical surface data |
|---|
| 1st surface |
| k = −3.628<br>A4 = 2.21200e−03, A6 = −2.31748e−04, A8 = 5.92955e−05 |
| 2nd surface |
| k = −4.147<br>A4 = 1.98768e−04, A6 = −1.64515e−04, A8 = 1.62766e−05 |
| 3rd surface |
| k = −0.230<br>A4 = 1.23394e−04, A6 = 5.43421e−06, A8 = 4.73002e−06 |
| 4th surface |
| k = −128.688<br>A4 = 2.32019e−05, A6 = 4.04905e−05, A8 = 8.00733e−06 |

-continued

| Unit mm |
|---|
| 5th surface |
| k = −2.606<br>A4 = −3.31913e−04, A6 = 5.07700e−06, A8 = −4.37050e−06 |
| 6th surface |
| k = 6.614<br>A4 = −1.77928e−04, A6 = −3.96916e−05, A8 = −5.59983e−07 |
| 14th surface |
| k = −0.665<br>A4 = −6.37173e−04, A6 = 3.43918e−06, A8 = −3.68651e−07 |
| 15th surface |
| k = −0.288<br>A4 = 6.95438e−05, A6 = −1.77347e−05, A8 = 4.94606e−07 |
| 16th surface |
| k = −0.710<br>A4 = 4.67166e−03, A6 = −3.63236e−04, A8 = 1.79484e−05 |
| 17th surface |
| k = −0.162<br>A4 = 4.32027e−03, A6 = −4.81582e−05, A8 = 5.13546e−06 |
| 18th surface |
| k = −0.001<br>A4 = −2.62657e−04, A6 = −2.72183e−04, A8 = 8.71964e−06,<br>A10 = 1.73439e−07 |
| 19th surface |
| k = 0.002<br>A4 = −3.81707e−04, A6 = −1.42470e−05, A8 = −2.09683e−06,<br>A10 = 8.83630e−08 |
| 20th surface |
| k = −2.233<br>A4 = −1.78749e−03, A6 = 1.38140e−04, A8 = 1.79702e−05,<br>A10 = −6.32913e−07 |
| 21th surface |
| k = −0.253<br>A4 = −1.47421e−02, A6 = 2.66260e−04, A8 = −2.46439e−06,<br>A10 = 3.18446e−07 |

| Various data | |
|---|---|
| NA | 0.40 |
| Magnification | −1.99 |
| Focal length | 5.65 |
| Image height(mm) | 2.30 |
| fb(mm) (in air) | 3.00 |
| Lens total length(mm) (in air) | 29.24 |

Example 87

Unit mm

Surface data

| Surface no. | r | d | nd | vd | θgf |
|---|---|---|---|---|---|
| 1* | −3.798 | 1.90 | 1.53368 | 55.90 | 0.563 |
| 2* | −6.396 | 0.05 | | | |
| 3* | 7.086 | 2.06 | 1.63490 | 23.88 | 0.630 |
| 4* | −9.324 | 0.18 | | | |
| 5* | 3.430 | 2.38 | 1.49700 | 81.61 | 0.538 |
| 6* | −13.065 | 0.06 | | | |
| 7 | −11.385 | 1.90 | 1.61800 | 63.33 | 0.544 |
| 8 | −3.594 | 0.50 | 1.72047 | 34.71 | 0.583 |
| 9 | 16.094 | 0.33 | | | |
| 10(Stop) | ∞ | 0.33 | | | |
| 11 | −16.057 | 0.50 | 1.72047 | 34.71 | 0.583 |

| Unit mm | | | | | |
|---|---|---|---|---|---|
| 12 | 5.835 | 2.86 | 1.61800 | 63.33 | 0.544 |
| 13 | −8.690 | 0.05 | | | |
| 14* | 6.232 | 4.02 | 1.49700 | 81.61 | 0.538 |
| 15* | −9.315 | 3.51 | | | |
| 16* | −4.074 | 3.92 | 1.58364 | 30.30 | 0.599 |
| 17* | −8.282 | 2.17 | | | |
| 18* | −13.370 | 2.21 | 1.63490 | 23.88 | 0.630 |
| 19* | −7.760 | 1.21 | | | |
| 20* | 3.535 | 3.61 | 1.53368 | 55.90 | 0.563 |
| 21* | 1.476 | 4.00 | | | |
| 22 | ∞ | 0.30 | 1.51640 | 65.06 | 0.535 |
| 23 | ∞ | 1.33 | | | |
| Image plane | ∞ | | | | |

Aspherical surface data

1st surface k = −0.655
A4 = −2.80796e−04, A6 = −9.63910e−03, A8 = 4.92454e−03

2nd surface k = 5.942
A4 = −1.18699e−02, A6 = 7.12983e−04, A8 = −1.53686e−04

3rd surface k = −0.447
A4 = −1.97368e−04, A6 = 6.28902e−05, A8 = −7.46102e−07

4th surface k = −16.463
A4 = 4.48373e−04, A6 = 1.18444e−04, A8 = −4.32048e−06

5th surface k = −2.743
A4 = −6.97098e−04, A6 = −3.36286e−05, A8 = 2.94162e−07

6th surface k = 9.641
A4 = −8.56705e−04, A6 = −1.66634e−05, A8 = 4.35943e−06

14th surface k = −0.885
A4 = −8.82094e−04, A6 = −1.12042e−05, A8 = 6.24152e−07

15th surface k = −0.269
A4 = 1.80079e−04, A6 = −4.28347e−05, A8 = 9.77123e−07

16th surface k = −0.713
A4 = 4.31675e−03, A6 = −2.71566e−04, A8 = 3.38626e−06

17th surface k = −0.493
A4 = 3.60750e−03, A6 = −1.95719e−04, A8 = 2.22810e−06

18th surface k = −78.870
A4 = 1.08920e−03, A6 = −2.97701e−04, A8 = 1.06145e−05,
A10 = −4.47403e−07

19th surface k = −0.052
A4 = −7.53657e−04, A6 = −8.77181e−07, A8 = −1.92215e−06,
A10 = 1.95988e−08

20th surface k = −2.024
A4 = −4.21997e−03, A6 = 1.26487e−04, A8 = 1.39491e−05,
A10 = −4.19985e−07

21st surface k = −0.889
A4 = −2.88436e−02, A6 = 3.04215e−03, A8 = −2.40665e−04,
A10 = 2.08658e−05

Unit mm

Various data

| | |
|---|---|
| NA | 0.74 |
| Magnification | −4.18 |
| Focal length | 2.80 |
| Image height(mm) | 2.23 |
| fb(mm) (in air) | 5.53 |
| Lens total length(mm) (in air) | 39.27 |

Example 88

Unit mm

Surface data

| Surface no. | r | d | nd | νd | θgf |
|---|---|---|---|---|---|
| 1* | −2.732 | 1.36 | 1.53368 | 55.90 | 0.563 |
| 2* | −4.589 | 0.05 | | | |
| 3* | 7.247 | 1.87 | 1.63490 | 23.88 | 0.630 |
| 4* | −8.455 | 0.05 | | | |
| 5* | 3.138 | 2.15 | 1.49700 | 81.61 | 0.538 |
| 6* | −12.154 | 0.04 | | | |
| 7 | −15.110 | 1.79 | 1.61800 | 63.33 | 0.544 |
| 8 | −3.447 | 0.50 | 1.72047 | 34.71 | 0.583 |
| 9 | 25.308 | 0.17 | | | |
| 10(Stop) | ∞ | −0.01 | | | |
| 11 | 110.943 | 0.50 | 1.72047 | 34.71 | 0.583 |
| 12 | 4.107 | 2.60 | 1.61800 | 63.33 | 0.544 |
| 13 | −9.964 | 0.05 | | | |
| 14* | 5.280 | 2.65 | 1.49700 | 81.61 | 0.538 |
| 15* | −11.739 | 3.54 | | | |
| 16* | −3.025 | 2.06 | 1.58364 | 30.30 | 0.599 |
| 17* | −7.825 | 1.50 | | | |
| 18* | −15.729 | 2.16 | 1.63490 | 23.88 | 0.630 |
| 19* | −5.597 | 0.34 | | | |
| 20* | 3.756 | 3.64 | 1.53368 | 55.90 | 0.563 |
| 21* | 1.383 | 2.00 | | | |
| 22 | ∞ | 0.30 | 1.51640 | 65.06 | 0.535 |
| 23 | ∞ | 1.54 | | | |
| Image plane | ∞ | | | | |

Aspherical surface data

1st surface k = −2.227
A4 = 1.03707e−03, A6 = −3.66686e−03, A8 = 2.87380e−03

2nd surface k = 3.573
A4 = −1.72203e−02, A6 = 2.19859e−03, A8 = −3.34713e−04

3rd surface k = 0.001
A4 = 6.91776e−04, A6 = 2.83494e−05, A8 = 8.43494e−09

4th surface k = −16.058
A4 = 5.58712e−04, A6 = 1.20511e−04, A8 = −1.10589e−06

5th surface k = −3.338
A4 = −9.15433e−04, A6 = 1.68698e−05, A8 = −5.04647e−06

6th surface k = 10.493
A4 = −4.85932e−04, A6 = −8.48143e−07, A8 = 2.87740e−06

14th surface k = −0.972
A4 = −9.54935e−04, A6 = −1.60895e−05, A8 = 9.62636e−07

| Unit mm |
|---|
| 15th surface |
| k = 0.853<br>A4 = 7.88421e−05, A6 = −7.27968e−05, A8 = 1.26076e−06 |
| 16th surface |
| k = −0.842<br>A4 = 4.87822e−03, A6 = −3.71445e−04, A8 = −1.52508e−05 |
| 17th surface |
| k = −1.191<br>A4 = 3.67852e−03, A6 = −5.93789e−05, A8 = −5.04387e−06 |
| 18th surface |
| k = −144.172<br>A4 = 1.13639e−03, A6 = −4.17245e−04, A8 = 1.97474e−05,<br>A10 = −9.49865e−07 |
| 19th surface |
| k = 0.008<br>A4 = −8.04993e−04, A6 = 1.17608e−05, A8 = −2.70155e−06,<br>A10 = −3.55017e−08 |
| 20th surface |
| k = −2.462<br>A4 = −6.02434e−03, A6 = −6.10236e−07, A8 = 4.06972e−05,<br>A10 = −1.31050e−06 |
| 21th surface |
| k = −0.990<br>A4 = −3.54488e−02, A6 = 4.28101e−03, A8 = −2.94472e−04,<br>A10 = 1.55285e−05 |

Various data

| | |
|---|---|
| NA | 0.75 |
| Magnification | −4.18 |
| Focal length | 1.99 |
| Image height(mm) | 2.30 |
| fb(mm) (in air) | 3.74 |
| Lens total length(mm) (in air) | 30.73 |

Example 89

Unit mm

Surface data

| Surface no. | r | d | nd | νd | θgf |
|---|---|---|---|---|---|
| 1* | −5.138 | 2.14 | 1.53368 | 55.90 | 0.563 |
| 2* | −6.198 | 0.05 | | | |
| 3* | 8.105 | 2.22 | 1.63490 | 23.88 | 0.630 |
| 4* | −11.185 | 0.05 | | | |
| 5* | 3.574 | 3.37 | 1.49700 | 81.61 | 0.538 |
| 6* | −13.843 | 0.05 | | | |
| 7 | −14.787 | 2.55 | 1.61800 | 63.33 | 0.544 |
| 8 | −4.610 | 0.53 | 1.72047 | 34.71 | 0.583 |
| 9 | 125.202 | 0.12 | | | |
| 10(Stop) | ∞ | 0.37 | | | |
| 11 | −29.837 | 0.53 | 1.72047 | 34.71 | 0.583 |
| 12 | 7.231 | 2.99 | 1.61800 | 63.33 | 0.544 |
| 13 | −33.219 | 0.05 | | | |
| 14* | 7.572 | 2.49 | 1.49700 | 81.61 | 0.538 |
| 15* | −27.697 | 0.10 | | | |
| 16* | 33.001 | 3.56 | 1.49700 | 81.61 | 0.538 |
| 17* | −10.371 | 2.80 | | | |
| 18* | −4.952 | 1.36 | 1.58364 | 30.30 | 0.599 |
| 19* | −14.665 | 3.75 | | | |
| 20* | −17.212 | 2.97 | 1.63490 | 23.88 | 0.630 |
| 21* | −7.864 | 0.96 | | | |
| 22* | 3.950 | 4.37 | 1.53368 | 55.90 | 0.563 |
| 23* | 1.555 | 3.21 | | | |

Unit mm

| | | | | | |
|---|---|---|---|---|---|
| 24 | ∞ | 0.30 | 1.51640 | 65.06 | 0.535 |
| 25 | ∞ | 11.94 | | | |
| Image plane | ∞ | | | | |

| Aspherical surface data |
|---|
| 1st surface |
| k = −88.989<br>A4 = −5.99357e−03, A6 = 6.73377e−03, A8 = −4.61378e−03 |
| 2nd surface |
| k = 5.622<br>A4 = −9.89655e−03, A6 = 8.20507e−04, A8 = −1.50643e−04 |
| 3rd surface |
| k = −1.540<br>A4 = −4.59246e−04, A6 = 1.09257e−04, A8 = −3.18105e−06 |
| 4th surface |
| k = −25.930<br>A4 = 6.83244e−04, A6 = 1.11972e−04, A8 = −2.05324e−06 |
| 5th surface |
| k = −3.141<br>A4 = −3.44558e−04, A6 = −5.70704e−06, A8 = −5.53375e−08 |
| 6th surface |
| k = 7.221<br>A4 = −9.36274e−04, A6 = −1.66819e−05, A8 = 2.04119e−06 |
| 14th surface |
| k = −1.090<br>A4 = −7.88092e−04, A6 = −1.01703e−05, A8 = 3.83265e−07 |
| 15th surface |
| k = −24.035<br>A4 = 8.25593e−05, A6 = 1.53390e−06, A8 = −6.89536e−09 |
| 16th surface |
| k = −3.821<br>A4 = −3.09218e−05, A6 = 1.81194e−07, A8 = 1.48021e−07 |
| 17th surface |
| k = −0.514<br>A4 = 1.71442e−04, A6 = −2.85613e−05, A8 = 5.77601e−07 |
| 18th surface |
| k = −0.768<br>A4 = 3.97431e−03, A6 = −1.53083e−04, A8 = 1.20068e−06 |
| 19th surface |
| k = 0.112<br>A4 = 3.02336e−03, A6 = −1.24246e−04, A8 = 1.29603e−06 |
| 20th surface |
| k = −105.496<br>A4 = 7.78025e−04, A6 = −2.00034e−04, A8 = 6.78493e−06,<br>A10 = −2.09010e−07 |
| 21th surface |
| k = −0.635<br>A4 = −4.86148e−04, A6 = −4.19913e−07, A8 = −1.09125e−06,<br>A10 = 1.63697e−08 |
| 22th surface |
| k = −1.372<br>A4 = −4.25916e−03, A6 = 3.29135e−05, A8 = 1.23251e−05,<br>A10 = −3.44890e−07 |
| 23th surface |
| k = −0.921<br>A4 = −2.47609e−02, A6 = 1.80785e−03, A8 = −2.77502e−05,<br>A10 = −3.48041e−06 |

| Unit mm | |
|---|---|
| Various data | |
| NA | 0.95 |
| Magnification | −8.37 |
| Focal length | 2.62 |
| Image height (mm) | 2.30 |
| fb (mm) (in air) | 15.35 |
| Lens total length (mm) (in air) | 52.72 |

Example 90

Unit mm

Surface data

| Surface no. | r | d | nd | νd | θgf |
|---|---|---|---|---|---|
| 1 | −10.000 | 5.00 | 2.00100 | 29.13 | 0.600 |
| 2 | 14.403 | 4.74 | 1.90366 | 31.32 | 0.595 |
| 3 | −10.848 | 0.13 | | | |
| 4 | 19.239 | 3.06 | 1.84666 | 23.78 | 0.620 |
| 5 | −35.634 | 2.85 | | | |
| 6 | 11.706 | 2.97 | 1.49700 | 81.61 | 0.538 |
| 7 | −23.462 | 1.87 | 1.72916 | 54.68 | 0.544 |
| 8 | −10.000 | 0.50 | 1.76182 | 26.52 | 0.613 |
| 9 | 8.807 | 2.18 | | | |
| 10(Stop) | ∞ | 0.10 | | | |
| 11 | 160.537 | 0.50 | 1.84666 | 23.78 | 0.620 |
| 12 | 7.000 | 2.91 | 1.65160 | 58.55 | 0.542 |
| 13 | −17.489 | 0.10 | | | |
| 14 | 6.830 | 3.73 | 1.49700 | 81.61 | 0.538 |
| 15 | −12.198 | 0.82 | | | |
| 16 | −8.988 | 2.29 | 1.72825 | 28.46 | 0.608 |
| 17 | 8.015 | 2.84 | | | |
| 18 | 30.017 | 3.00 | 1.84666 | 23.78 | 0.620 |
| 19 | −9.829 | 4.23 | | | |
| 20 | −6.731 | 0.50 | 1.43875 | 94.93 | 0.534 |
| 21 | 7.361 | 0.72 | | | |
| 22 | 7.764 | 5.00 | 2.00100 | 29.13 | 0.600 |
| 23 | 17.906 | 4.14 | | | |
| 24 | ∞ | 0.38 | 1.51640 | 65.06 | 0.535 |
| 25 | ∞ | 0.45 | | | |
| Image plane | ∞ | | | | |

| Various data | |
|---|---|
| NA | 0.39 |
| Magnification | −2.04 |
| Focal length | 10.15 |
| Image height (mm) | 2.82 |
| fb (mm) (in air) | 4.84 |
| Lens total length (mm) (in air) | 54.88 |

Example 91

Unit mm

Surface data

| Surface no. | r | d | nd | νd | θgf |
|---|---|---|---|---|---|
| 1 | −10.000 | 4.63 | 2.00100 | 29.13 | 0.600 |
| 2 | 18.300 | 3.42 | 1.90366 | 31.32 | 0.595 |
| 3 | −9.713 | 0.10 | | | |
| 4 | 14.345 | 2.73 | 1.84666 | 23.78 | 0.620 |
| 5 | −82.083 | 3.46 | | | |
| 6 | 12.268 | 2.91 | 1.49700 | 81.61 | 0.538 |
| 7 | −11.850 | 1.47 | 1.72916 | 54.68 | 0.544 |

Unit mm

| | | | | | |
|---|---|---|---|---|---|
| 8 | −10.000 | 0.50 | 1.76182 | 26.52 | 0.613 |
| 9 | 9.606 | 2.02 | | | |
| 10(Stop) | ∞ | 0.10 | | | |
| 11 | 59.973 | 0.50 | 1.84666 | 23.78 | 0.620 |
| 12 | 7.193 | 2.80 | 1.65160 | 58.55 | 0.542 |
| 13 | −15.686 | 0.10 | | | |
| 14 | 7.063 | 3.37 | 1.49700 | 81.61 | 0.538 |
| 15 | −11.667 | 0.75 | | | |
| 16 | −9.306 | 5.00 | 1.63980 | 34.46 | 0.592 |
| 17 | 6.435 | 4.14 | | | |
| 18 | 19.482 | 2.64 | 2.00100 | 29.13 | 0.600 |
| 19 | −12.687 | 1.49 | | | |
| 20 | −10.019 | 0.50 | 1.43875 | 94.93 | 0.534 |
| 21 | 6.821 | 0.73 | | | |
| 22 | 7.316 | 5.00 | 2.00100 | 29.13 | 0.600 |
| 23 | 8.425 | 4.00 | | | |
| 24 | ∞ | 0.30 | 1.51640 | 65.06 | 0.535 |
| 25 | ∞ | 0.36 | | | |
| Image plane | ∞ | | | | |

| Various data | |
|---|---|
| NA | 0.41 |
| Magnification | −2.04 |
| Focal length | 9.96 |
| Image height(mm) | 2.25 |
| fb(mm) (in air) | 4.55 |
| Lens total length(mm) (in air) | 52.90 |

Example 92

Unit mm

Surface data

| Surface no. | r | d | nd | νd | θgf |
|---|---|---|---|---|---|
| 1 | −10.000 | 5.49 | 2.00100 | 29.13 | 0.600 |
| 2 | −61.066 | 3.34 | 1.84666 | 23.78 | 0.620 |
| 3 | −6.934 | 0.10 | | | |
| 4 | 78.347 | 5.54 | 1.84666 | 23.78 | 0.620 |
| 5 | −39.821 | 0.10 | | | |
| 6 | 11.573 | 2.73 | 1.49700 | 81.61 | 0.538 |
| 7 | 43.659 | 0.10 | | | |
| 8 | 14.320 | 4.05 | 1.69680 | 55.53 | 0.543 |
| 9 | −10.443 | 0.50 | 1.72151 | 29.23 | 0.605 |
| 10 | 7.760 | 2.80 | | | |
| 11(Stop) | ∞ | 0.10 | | | |
| 12 | 64.900 | 0.50 | 1.84666 | 23.78 | 0.620 |
| 13 | 7.618 | 3.08 | 1.59522 | 67.74 | 0.544 |
| 14 | −124.496 | 0.10 | | | |
| 15 | 14.276 | 2.92 | 1.49700 | 81.61 | 0.538 |
| 16 | −29.492 | 17.45 | | | |
| 17 | 35.576 | 8.57 | 1.49700 | 81.61 | 0.538 |
| 18 | 10.934 | 6.60 | | | |
| 19 | 22.042 | 2.17 | 1.84666 | 23.78 | 0.620 |
| 20 | −346.488 | 0.10 | | | |
| 21 | 10.303 | 9.00 | 2.00100 | 29.13 | 0.600 |
| 22 | 5.000 | 4.00 | | | |
| 23 | ∞ | 0.30 | 1.51640 | 65.06 | 0.535 |
| 24 | ∞ | 0.36 | | | |
| Image plane | ∞ | | | | |

| Various data | |
|---|---|
| NA | 0.74 |
| Magnification | −4.09 |
| Focal length | 6.29 |
| Image height(mm) | 2.25 |
| fb(mm) (in air) | 4.56 |
| Lens total length(mm) (in air) | 79.91 |

Example 93

| Unit mm | | | | | |
|---|---|---|---|---|---|
| Surface data | | | | | |
| Surface no. | r | d | nd | νd | θgf |
| 1 | −10.032 | 4.92 | 2.00100 | 29.13 | 0.600 |
| 2 | 19.088 | 3.27 | 1.90366 | 31.32 | 0.595 |
| 3 | −9.704 | 0.10 | | | |
| 4 | 14.300 | 2.59 | 1.84666 | 23.78 | 0.620 |
| 5 | −95.704 | 3.79 | | | |
| 6 | 13.188 | 2.70 | 1.49700 | 81.61 | 0.538 |
| 7 | −11.814 | 1.46 | 1.72916 | 54.68 | 0.544 |
| 8 | −10.000 | 0.50 | 1.76182 | 26.52 | 0.613 |
| 9 | 9.651 | 1.97 | | | |
| 10(Stop) | ∞ | 0.10 | | | |
| 11 | 57.750 | 0.50 | 1.84666 | 23.78 | 0.620 |
| 12 | 7.886 | 2.63 | 1.65160 | 58.55 | 0.542 |
| 13 | −15.437 | 0.10 | | | |
| 14 | 6.898 | 3.22 | 1.49700 | 81.61 | 0.538 |
| 15 | −12.109 | 0.76 | | | |
| 16 | −9.386 | 5.00 | 1.64394 | 31.87 | 0.599 |
| 17 | 6.269 | 4.13 | | | |
| 18 | 19.105 | 2.59 | 1.96066 | 27.70 | 0.596 |
| 19 | −12.400 | 1.79 | | | |
| 20 | −9.554 | 0.50 | 1.43875 | 94.95 | 0.545 |
| 21 | 6.985 | 0.72 | | | |
| 22 | 7.392 | 5.00 | 2.00100 | 29.13 | 0.600 |
| 23 | 8.938 | 4.00 | | | |
| 24 | ∞ | 0.30 | 1.51640 | 65.06 | 0.535 |
| 25 | ∞ | 0.35 | | | |
| Image plane | ∞ | | | | |

| Various data | |
|---|---|
| NA | 0.40 |
| Magnification | −2.04 |
| Focal length | 9.83 |
| Image height(mm) | 2.25 |
| fb(mm) (in air) | 4.55 |
| Lens total length(mm) (in air) | 52.90 |

Example 94

| Unit mm | | | | | |
|---|---|---|---|---|---|
| Surface data | | | | | |
| Surface no. | r | d | nd | νd | θgf |
| 1 | −10.000 | 8.75 | 1.84666 | 23.78 | 0.620 |
| 2 | −7.538 | 0.10 | | | |
| 3 | −519.674 | 2.18 | 1.84666 | 23.78 | 0.620 |
| 4 | −20.460 | 3.68 | | | |
| 5 | 11.754 | 2.66 | 1.49700 | 81.61 | 0.538 |
| 6 | 57.369 | 0.10 | | | |
| 7 | 12.489 | 3.87 | 1.69680 | 55.53 | 0.543 |
| 8 | −10.229 | 0.50 | 1.72151 | 29.23 | 0.605 |
| 9 | 7.301 | 2.63 | | | |
| 10(Stop) | ∞ | 0.96 | | | |
| 11 | −31.688 | 0.50 | 1.84666 | 23.78 | 0.620 |
| 12 | 8.281 | 3.25 | 1.59522 | 67.74 | 0.544 |
| 13 | −17.511 | 0.10 | | | |
| 14 | 13.000 | 2.53 | 1.49700 | 81.61 | 0.538 |
| 15 | −175.541 | 18.98 | | | |
| 16 | −115.321 | 0.50 | 1.49700 | 81.61 | 0.538 |
| 17 | 15.268 | 3.47 | | | |
| 18 | 29.518 | 2.47 | 1.84666 | 23.78 | 0.620 |
| 19 | −38.911 | 10.28 | | | |
| 20 | 9.569 | 7.36 | 2.00100 | 29.13 | 0.600 |
| 21 | 5.000 | 4.46 | | | |
| 22 | ∞ | 0.30 | 1.51640 | 65.06 | 0.535 |

-continued

| Unit mm | | |
|---|---|---|
| 23 | ∞ | 0.36 |
| Image plane | ∞ | |

| Various data | |
|---|---|
| NA | 0.69 |
| Magnification | −4.09 |
| Focal length | 6.84 |
| Image height(mm) | 2.25 |
| fb(mm) (in air) | 5.02 |
| Lens total length(mm) (in air) | 79.91 |

Example 95

| Unit mm | | | | | |
|---|---|---|---|---|---|
| Surface data | | | | | |
| Surface no. | r | d | nd | νd | θgf |
| 1 | −7.000 | 2.11 | 1.53368 | 55.90 | 0.563 |
| 2* | −5.323 | 0.10 | | | |
| 3* | 22.215 | 2.37 | 1.84666 | 23.77 | 0.620 |
| 4 | −9.110 | 2.81 | | | |
| 5 | −5.145 | 0.50 | 1.60999 | 27.48 | 0.620 |
| 6 | −11.263 | 0.00 | 1001.00000 | −3.45 | 0.296 |
| 7 | −11.263 | 0.20 | 1.63762 | 34.21 | 0.594 |
| 8 | 91.067 | 0.65 | | | |
| 9 | 83.446 | 2.36 | 1.61800 | 63.33 | 0.544 |
| 10 | −4.282 | 0.70 | 1.72047 | 34.71 | 0.583 |
| 11 | −10.570 | 0.10 | | | |
| 12(Stop) | ∞ | 1.06 | | | |
| 13 | −11.698 | 0.70 | 1.72047 | 34.71 | 0.583 |
| 14 | 10.934 | 2.92 | 1.61800 | 63.33 | 0.544 |
| 15 | −10.364 | 0.05 | | | |
| 16* | 10.909 | 3.56 | 1.49700 | 81.61 | 0.538 |
| 17* | −11.347 | 2.54 | | | |
| 18* | 10.087 | 1.66 | 1.58364 | 30.30 | 0.599 |
| 19* | 7.386 | 4.73 | | | |
| 20* | 13.468 | 2.76 | 1.63490 | 23.88 | 0.630 |
| 21 | −20.719 | 2.70 | | | |
| 22 | 127.874 | 0.50 | 1.53368 | 55.90 | 0.563 |
| 23 | 4.905 | 2.69 | | | |
| 24 | −6.683 | 0.50 | 1.53368 | 55.90 | 0.563 |
| 25* | 42.216 | 1.10 | | | |
| 26 | ∞ | 0.30 | 1.51640 | 65.06 | 0.535 |
| 27 | ∞ | 0.30 | | | |
| Image plane | ∞ | | | | |

Aspherical surface data

2nd surface k = 0.000
A4 = 4.45010e−05

3rd surface k = 0.000
A4 = 8.14332e−05

16th surface k = 0.000
A4 = −2.69612e−04

17th surface k = 0.000
A4 = 9.67105e−05

18th surface k = 0.000
A4 = −2.81280e−05

-continued

| Unit mm |
|---|
| 19th surface |
| k = 0.000<br>A4 = 4.63309e−05 |
| 20th surface |
| k = 0.000<br>A4 = −7.88627e−05 |
| 25th surface |
| k = 0.000<br>A4 = −1.52626e−03, A6 = −3.11735e−05 |

| Various data | |
|---|---|
| NA | 0.32 |
| Magnification | −2.00 |
| Focal length | 3.75 |
| Image height(mm) | 3.87 |
| fb(mm) (in air) | 1.60 |
| Lens total length(mm) (in air) | 39.89 |

Example 96

Unit mm

Surface data

| Surface no. | r | d | nd | νd | θgf |
|---|---|---|---|---|---|
| 1 | −7.000 | 2.16 | 1.53368 | 55.90 | 0.563 |
| 2* | −5.934 | 0.10 | | | |
| 3* | 33.139 | 2.32 | 1.84666 | 23.77 | 0.620 |
| 4 | −9.292 | 0.10 | | | |
| 5 | −191.804 | 1.74 | 1.49700 | 81.61 | 0.538 |
| 6 | −17.291 | 2.00 | | | |
| 7 | −5.386 | 0.50 | 1.60999 | 27.48 | 0.620 |
| 8 | −11.263 | 0.00 | 1001.00000 | −3.45 | 0.296 |
| 9 | −11.263 | 0.20 | 1.63762 | 34.21 | 0.594 |
| 10 | 23.280 | 0.72 | | | |
| 11 | 30.025 | 2.34 | 1.61800 | 63.33 | 0.544 |
| 12 | −4.979 | 0.70 | 1.72047 | 34.71 | 0.583 |
| 13 | −10.584 | 0.10 | | | |
| 14 (Stop) | ∞ | 1.07 | | | |
| 15 | −11.693 | 0.70 | 1.72047 | 34.71 | 0.583 |
| 16 | 12.173 | 2.75 | 1.61800 | 63.33 | 0.544 |
| 17 | −10.862 | 0.05 | | | |
| 18* | 10.882 | 3.39 | 1.49700 | 81.61 | 0.538 |
| 19* | −11.666 | 2.60 | | | |
| 20* | 8.928 | 1.63 | 1.58364 | 30.30 | 0.599 |
| 21* | 6.663 | 4.22 | | | |
| 22* | 12.130 | 2.64 | 1.63490 | 23.88 | 0.630 |
| 23 | −24.243 | 2.64 | | | |
| 24 | −50.390 | 0.50 | 1.53368 | 55.90 | 0.563 |
| 25 | 5.177 | 2.62 | | | |
| 26 | −6.111 | 0.50 | 1.53368 | 55.90 | 0.563 |
| 27* | −7309.424 | 1.10 | | | |
| 28 | ∞ | 0.30 | 1.51640 | 65.06 | 0.535 |
| 29 | ∞ | 0.30 | | | |
| Image plane | ∞ | | | | |

| Aspherical surface data |
|---|
| 2nd surface |
| k = 0.000<br>A4 = 2.52174e−05 |
| 3rd surface |
| k = 0.000<br>A4 = 8.68592e−05 |

-continued

| Unit mm |
|---|
| 18th surface |
| k = 0.000<br>A4 = −2.56350e−04 |
| 19th surface |
| k = 0.000<br>A4 = 1.10244e−04 |
| 20th surface |
| k = 0.000<br>A4 = −1.71924e−05 |
| 21th surface |
| k = 0.000<br>A4 = 4.70589e−05 |
| 22th surface |
| k = 0.000<br>A4 = −4.16768e−05 |
| 27th surface |
| k = 0.000<br>A4 = −1.84423e−03, A6 = −2.68348e−05 |

| Various data | |
|---|---|
| NA | 0.32 |
| Magnification | −2.00 |
| Focal length | 3.71 |
| Image height(mm) | 3.87 |
| fb(mm) (in air) | 1.60 |
| Lens total length(mm) (in air) | 39.90 |

Next, a lens which forms the lens unit Gf and a lens which forms the lens unit Gr are shown below.

| | Lens unit Gf | Lens unit Gr |
|---|---|---|
| Example1 | L1~L5 | L6~L10 |
| Example2 | L1~L5 | L6~L10 |
| Example3 | L1~L6 | L7~L12 |
| Example4 | L1~L5 | L6~L11 |
| Example5 | L1~L5 | L6~L8 |
| Example6 | L1~L4 | L5~L8 |
| Example7 | L1~L4 | L5~L8 |

Next, values of conditional expressions (1) to (15) in each example are shown below. '-' (hyphen) indicates that there is no corresponding arrangement or conditional expression is not satisfied. Moreover, with respect to the example 6 and the example 7, since there is no pair of lenses which satisfy conditional expression (1) to (3), description for conditional expression (1) to (3) is omitted.

| | Example1 | Example2 | Example3 | Example4 | Example5 |
|---|---|---|---|---|---|
| (1)$r_{OBf}/r_{TLr}$ | | | | | |
| r1, r21 | −1 | −1.085 | — | — | — |
| r3, r19 | −1 | −1.010 | — | — | — |
| r5, r17 | −1 | −0.952 | — | — | −1 |
| r7, r15 | −1 | −1.010 | — | — | — |
| r9, r13 | −1 | −0.995 | — | — | −1 |
| r1, r25 | — | — | −1 | — | — |
| r3, r23 | — | — | −1 | — | — |
| r5, r21 | — | — | −1 | — | — |
| r7, r19 | — | — | −1 | — | — |
| r9, r17 | — | — | −1 | — | — |
| r11, r15 | — | — | −1 | — | — |

-continued

| | | | | | |
|---|---|---|---|---|---|
| r1, r23 | — | — | — | −1 | — |
| r5, r17 | — | — | — | −1 | — |
| r7, r15 | — | — | — | −1 | — |
| r9, r13 | — | — | — | −1 | — |
| (2)$r_{OBr}/r_{TLf}$ | | | | | |
| r2, r20 | −1 | −0.995 | — | — | — |
| r4, r18 | −1 | −1.001 | — | — | — |
| r6, r16 | −1 | −0.952 | — | — | −1 |
| r8, r14 | −1 | −0.990 | — | — | — |
| r10, r12 | −1 | −0.926 | — | — | −1 |
| r2, r24 | — | — | −1 | — | — |
| r4, r22 | — | — | −1 | — | — |
| r6, r20 | — | — | −1 | — | — |
| r8, r18 | — | — | −1 | — | — |
| r10, r16 | — | — | −1 | — | — |
| r12, r14 | — | — | −1 | — | — |
| r2, r22 | — | — | — | −1 | — |
| r6, r16 | — | — | — | −1 | — |
| r8, r14 | — | — | — | −1 | — |
| r10, r12 | — | — | — | −1 | — |

| (3)$(d_{OB} - d_{TL})/(d_{OB} + d_{TL})$ | Example1 | Example2 | Example3 |
|---|---|---|---|
| d1, d20 | 0 | −0.003 | — |
| d3, d18 | 0 | −0.005 | — |
| d5, d16 | 0 | 0.013 | — |
| d7, d14 | 0 | 0.003 | — |
| d9, d12 | 0 | 0.006 | — |
| d1, d24 | — | — | 0 |
| d3, d22 | — | — | 0 |
| d5, d20 | — | — | 0 |
| d7, d19 | — | — | 0 |
| d9, d17 | — | — | 0 |
| d11, d17 | — | — | 0 |
| d1, d22 | — | — | — |
| d5, d16 | — | — | — |
| d7, d14 | — | — | — |
| d9, d12 | — | — | — |

| (3)$(d_{OB} - d_{TL})/(d_{OB} + d_{TL})$ | Example4 | Example5 |
|---|---|---|
| d1, d20 | — | — |
| d3, d18 | — | — |
| d5, d16 | — | 0 |
| d7, d14 | — | — |
| d9, d12 | — | 0 |
| d1, d24 | — | — |
| d3, d22 | — | — |
| d5, d20 | — | — |
| d7, d19 | — | — |
| d9, d17 | — | — |
| d11, d17 | — | — |
| d1, d22 | 0 | — |
| d5, d16 | 0 | — |
| d7, d14 | 0 | — |
| d9, d12 | 0 | — |

| | Example1 | Example2 | Example3 | Example4 | Example5 |
|---|---|---|---|---|---|
| (4)NA | 0.25 | 0.25 | 0.25 | 0.25 | 0.25 |
| NA' | 0.25 | 0.25 | 0.25 | 0.25 | 0.15 |
| (5)β | −1.00 | −0.99 | −1.00 | −1.00 | −1.68 |
| (6)$f_{OB}/f_{TL}$ | 1.00 | 1.01 | 1.00 | 1.00 | 0.60 |
| (9)$d_1/\Sigma d$ | 0.006 | 0.006 | 0.009 | 0.006 | 0.005 |
| (7)$MTF_{OB}$ | 66 | 64 | 62 | 60 | 64 |
| (8)$MTF_{TL}$ | 66 | 64 | 62 | 67 | 67 |
| (10)$d_2/\Sigma d$ | 1.35 | 1.35 | 1.28 | 1.33 | 1.26 |
| (11)Δf/Y | 0.0004 | −0.0041 | −0.0047 | −0.0007 | −0.0008 |
| (12)$\theta_o$ | 0.4 | 0.4 | 1.6 | 0.9 | 2.2 |
| (13)$\Delta f_{cd}/\epsilon d$ | 8.40 | 9.90 | 11.20 | 7.70 | 1.70 |
| (14)$d_{SHOB}/d_{SHTL}$ | 1.00 | 0.99 | 1.00 | 0.97 | 0.71 |

-continued

| | Example6 | Example7 |
|---|---|---|
| (4)NA | 0.22 | 0.17 |
| NA' | 0.17 | 0.22 |
| (5)β | −1.27 | −0.79 |
| (6)$f_{OB}/f_{TL}$ | 0.79 | 1.27 |
| (9)$d_1/\Sigma d$ | 0.024 | 0.024 |
| (7)$MTF_{OB}$ | 61 | 66 |
| (8)$MTF_{TL}$ | 66 | 61 |
| (10)$d_2/\Sigma d$ | 0.38 | 0.38 |
| (11)Δf/Y | −0.0047 | −0.0058 |
| (12)$\theta_o$ | 28.4 | 25.3 |
| (13)$\Delta f_{cd}/\epsilon d$ | 2.50 | 2.50 |
| (14)$d_{SHOB}/d_{SHTL}$ | 0.88 | 1.13 |

Also, values of fc/4 and fc'/4 in each example are shown below.

| | Example1 | Example2 | Example3 | Example4 | Example5 |
|---|---|---|---|---|---|
| Fc/4 | 229 | 229 | 229 | 229 | 229 |
| Fc/4' | 229 | 232 | 229 | 229 | 137 |

| | Example6 | Example7 |
|---|---|---|
| Fc/4 | 201 | 159 |
| Fc/4' | 159 | 201 |

Next, values of conditional expressions (15) to (57) in each example are given below. '-' (hyphen) indicates that there is no corresponding arrangement or conditional expression is not satisfied.

| | |
|---|---|
| (15), (15-1), (15-2) | β |
| (16) | NA |
| (17) | $L_{TL}/2Y$ |
| (18) | $(\Delta D_{G2dC} + (\Delta D_{G1dC} \times \beta_{G2C}^2/(1 + \beta_{G2C} \times \Delta D_{G1dC}/f_{G2C})))/\epsilon_d$ |
| (19) | WD/BF |
| (20), (20-1) | $2 \times (WD \times \tan(\sin^{-1}NA) + Y_{obj})/\phi_s$ |
| (21) | $D_{max}/\phi_s$ |
| (22) | $D_{G1max}/\phi_s$ |
| (23), (23-1) | $L_L/D_{oi}$ |
| (24), (24-1) | $1/vd_{min}$-$1/vd_{max}$ |
| (25), (25-1) | $D_{os}/D_{oi}$ |
| (26) | $\phi_{G1o}/(2 \times Y/\lvert\beta\rvert)$ |
| (27) | $BF/L_L$ |
| (28) | BF/Y |
| (29) | $\phi_{G1o}/R_{G1o}$ |
| (30) | $D_{G1G2}/\phi_s$ |
| (31), (31-1) | $L_{G1}/L_{G2}$ |
| (32) | $L_{G1s}/L_{sG2}$ |
| (33) | $\phi_{G1max}/\phi_{G2max}$ |
| (34) | $D_{os}/L_{G1}$ |
| (35) | $D_{ENP}/Y$ |
| (36) | $CRA_{obj}/CRA_{img}$ |
| (37), (37-1) | $f_{G1o}/f$ |
| (38), (38-1) | $R_{G1o}/WD$ |
| (39) | $R_{G2i}/BF$ |
| (40) | $R_{G1i}/D_{G1is}$ |
| (41) | $f_{G1o}/f_{G1}$ |
| (42) | $1/vd_{G1min}$-$1/vd_{G1ma}$ |
| (43) | $1/vd_{G2min}$-$1/vd_{G2max}$ |
| (45) | $D_{p1s}/L_{G1s}$ |
| (47) | $D_{noni}/L_{G1s}$ |
| (49) | $D_{sDL}/L_{sG2}$ |
| (51) | $D_{n1s}/D_{os}$ |
| (53) | $D_{sn2}/D_{si}$ |
| (54) | $D_{sn3}/D_{si}$ |
| (55) | $D_{p2s}/D_{os}$ |

-continued

| | |
|---|---|
| (56) | $L_L/D_{oi}+0.07\times WD/BF$ |
| (57) | $D_{os}/L_{G1}-0.39\times WD/BF$ |

| | Exam-ple8 | Exam-ple9 | Exam-ple10 | Exam-ple11 | Exam-ple12 |
|---|---|---|---|---|---|
| (15) | −1.04 | −1.05 | −1.03 | −1.03 | −1.05 |
| (16) | 0.15 | 0.21 | 0.15 | 0.15 | 0.18 |
| (17) | 3.6 | 4.2 | 3.6 | 3.6 | 3.6 |
| (18) | 10.74 | 11.51 | 9.01 | 10.78 | 8.52 |
| (19) | 5.80 | 3.94 | 5.80 | 5.80 | 6.91 |
| (20) | 3.54 | 2.91 | 3.64 | 3.64 | 2.93 |
| (21) | 1.18 | 0.92 | 1.21 | 0.98 | 0.53 |
| (22) | 0.25 | 0.44 | 0.21 | 0.23 | 0.05 |
| (23) | 0.51 | 0.63 | 0.51 | 0.51 | 0.58 |
| (24) | 0.02 | 0.02 | 0.02 | 0.02 | 0.03 |
| (25) | 0.64 | 0.62 | 0.64 | 0.64 | 0.66 |
| (26) | 1.36 | 1.62 | 1.37 | 1.43 | 1.42 |
| (27) | 0.14 | 0.12 | 0.14 | 0.14 | 0.09 |
| (28) | 0.88 | 0.88 | 0.88 | 0.88 | 0.59 |
| (29) | 0.64 | 0.61 | 0.65 | 0.90 | 0.14 |
| (30) | 0.39 | 0.38 | 0.37 | 0.29 | 0.29 |
| (31) | 0.75 | 1.06 | 0.76 | 0.71 | 1.00 |
| (32) | 0.79 | 1.06 | 0.79 | 0.75 | 1.07 |
| (33) | 1.61 | 1.51 | 1.66 | 1.54 | 1.59 |
| (34) | 3.11 | 2.03 | 3.08 | 3.13 | 2.40 |
| (35) | 5.50 | 11.95 | 5.85 | 6.43 | 6.26 |
| (36) | 0.25 | 0.13 | 0.24 | 0.22 | 0.20 |
| (37) | 2.64 | 2.49 | 2.54 | 2.11 | 2.29 |
| (38) | 0.80 | 1.46 | 0.80 | 0.60 | 4.80 |
| (39) | 1152.63 | 3.92 | −13.88 | 4.67 | 19.69 |
| (40) | 5.35 | 5.59 | 5.98 | 6.35 | 4.24 |
| (41) | 1.78 | 1.85 | 1.69 | 1.65 | 1.46 |
| (42) | 0.02 | 0.02 | 0.02 | 0.02 | 0.03 |
| (43) | 0.02 | 0.02 | 0.02 | 0.02 | 0.03 |
| (45) | — | — | — | — | 1.00 |
| (47) | — | — | — | — | 0.70 |
| (49) | — | — | — | — | — |
| (51) | 0.06 | 0.05 | 0.05 | 0.05 | 0.05 |
| (53) | 0.07 | 0.09 | 0.07 | 0.05 | 0.04 |
| (54) | 0.80 | 0.80 | 0.80 | 0.80 | 0.84 |
| (55) | 0.35 | 0.53 | 0.35 | 0.35 | 0.45 |
| (56) | 0.92 | 0.91 | 0.92 | 0.92 | 1.07 |
| (57) | 0.85 | 0.49 | 0.82 | 0.87 | −0.29 |

| | Exam-ple13 | Exam-ple14 | Exam-ple15 | Exam-ple16 | Exam-ple17 |
|---|---|---|---|---|---|
| (15) | −1.05 | −1.05 | −1.05 | −1.05 | −1.05 |
| (16) | 0.13 | 0.14 | 0.21 | 0.18 | 0.20 |
| (17) | 3.5 | 3.7 | 4.5 | 4.4 | 4.1 |
| (18) | 6.04 | 6.34 | 10.28 | 8.68 | 11.52 |
| (19) | 7.28 | 7.67 | 4.83 | 3.95 | 4.59 |
| (20) | 4.19 | 3.70 | 2.57 | 3.46 | 3.09 |
| (21) | 1.01 | 0.75 | 0.66 | 1.30 | 1.03 |
| (22) | 0.08 | 0.11 | 0.34 | 0.02 | 0.24 |
| (23) | 0.57 | 0.55 | 0.68 | 0.64 | 0.60 |
| (24) | 0.03 | 0.03 | 0.03 | 0.03 | 0.02 |
| (25) | 0.65 | 0.68 | 0.54 | 0.54 | 0.56 |
| (26) | 1.20 | 1.32 | 1.47 | 1.36 | 1.52 |
| (27) | 0.09 | 0.10 | 0.08 | 0.11 | 0.12 |
| (28) | 0.59 | 0.64 | 0.67 | 0.88 | 0.88 |
| (29) | 0.24 | 0.26 | 0.79 | 0.29 | 0.47 |
| (30) | 0.35 | 0.33 | 0.66 | 0.37 | 0.41 |
| (31) | 0.84 | 0.98 | 0.67 | 0.65 | 0.60 |
| (32) | 0.88 | 1.03 | 0.66 | 0.67 | 0.62 |
| (33) | 1.28 | 1.47 | 1.06 | 1.14 | 1.31 |
| (34) | 2.60 | 2.61 | 2.19 | 2.23 | 2.68 |
| (35) | 5.88 | 6.91 | 6.85 | 6.30 | 5.97 |
| (36) | 0.21 | 0.19 | 0.22 | 0.27 | 0.27 |
| (37) | 2.08 | 1.93 | 6.36 | 5.23 | 2.43 |
| (38) | 2.27 | 1.99 | 1.09 | 2.62 | 1.52 |
| (39) | 6.50 | 9.05 | 12.80 | 3.25 | 156.92 |
| (40) | 5.55 | 5.34 | 4.06 | 5.65 | 4.77 |
| (41) | 1.54 | 1.55 | 3.77 | 4.43 | 1.81 |
| (42) | 0.03 | 0.03 | 0.03 | 0.03 | 0.02 |
| (43) | 0.03 | 0.03 | 0.02 | 0.02 | 0.02 |
| (45) | 1.00 | 1.00 | 1.00 | 1.00 | — |
| (47) | 0.68 | 0.71 | — | — | — |
| (49) | — | — | — | — | — |
| (51) | 0.05 | 0.05 | 0.07 | 0.05 | 0.07 |
| (53) | 0.13 | — | 0.13 | 0.05 | 0.11 |
| (54) | 0.85 | 0.84 | 0.88 | 0.84 | 0.84 |
| (55) | 0.41 | 0.41 | 0.50 | 0.48 | 0.41 |
| (56) | 1.08 | 1.08 | 1.02 | 0.92 | 0.92 |
| (57) | −0.23 | −0.38 | 0.31 | 0.69 | 0.89 |

| | Exam-ple18 | Exam-ple19 | Exam-ple20 | Exam-ple21 | Exam-ple22 |
|---|---|---|---|---|---|
| (15) | −1.04 | −1.00 | −1.33 | −1.33 | −1.33 |
| (16) | 0.15 | 0.15 | 0.23 | 0.23 | 0.23 |
| (17) | 3.6 | 4.3 | 3.7 | 6.1 | 4.5 |
| (18) | 8.44 | −1.96 | 3.68 | 4.38 | 7.50 |
| (19) | 5.80 | 14.66 | 7.34 | 15.71 | 20.84 |
| (20) | 2.91 | 3.25 | 2.49 | 2.51 | 2.23 |
| (21) | 0.60 | 0.78 | 1.02 | 1.96 | 0.56 |
| (22) | 0.02 | 0.50 | 0.13 | 0.01 | 0.07 |
| (23) | 0.51 | 0.58 | 0.69 | 0.65 | 0.58 |
| (24) | 0.02 | 0.02 | 0.03 | 0.03 | 0.03 |
| (25) | 0.63 | 0.66 | 0.54 | 0.52 | 0.62 |
| (26) | 1.37 | 1.48 | 1.57 | 2.47 | 2.48 |
| (27) | 0.14 | 0.05 | 0.05 | 0.03 | 0.03 |
| (28) | 0.88 | 0.38 | 0.38 | 0.39 | 0.29 |
| (29) | 0.64 | 0.92 | 0.35 | 0.49 | 0.93 |
| (30) | 0.60 | 0.24 | 0.42 | 0.29 | 0.07 |
| (31) | 0.55 | 0.76 | 0.63 | 0.37 | 0.55 |
| (32) | 0.74 | 0.82 | 0.65 | 0.39 | 0.59 |
| (33) | 1.74 | 1.56 | 1.21 | 1.32 | 1.85 |
| (34) | 3.93 | 2.71 | 2.19 | 3.11 | 3.07 |
| (35) | 5.45 | 8.40 | 5.33 | 6.28 | 5.18 |
| (36) | 0.22 | 0.18 | 0.21 | 0.21 | 0.26 |
| (37) | 2.48 | 7.65 | 2.11 | 2.30 | 3.80 |
| (38) | 0.80 | 0.57 | 2.38 | 1.24 | 0.66 |
| (39) | −3.99 | 29134.52 | −37.68 | 8.81 | −14.44 |
| (40) | 2.83 | 13.46 | 6.90 | 5.27 | 15.92 |
| (41) | 1.25 | 4.74 | 1.03 | 1.73 | 2.37 |
| (42) | 0.02 | 0.02 | 0.03 | 0.03 | 0.03 |
| (43) | 0.02 | 0.02 | 0.03 | 0.03 | 0.02 |
| (45) | — | 1.00 | 1.00 | 1.00 | 1.00 |
| (47) | — | 0.77 | 0.61 | 0.71 | 0.73 |
| (49) | — | — | — | — | — |
| (51) | 0.11 | 0.05 | 0.07 | 0.05 | 0.04 |
| (53) | 0.04 | 0.03 | 0.09 | 0.04 | 0.02 |
| (54) | 0.80 | 0.92 | 0.92 | 0.96 | 0.95 |
| (55) | 0.34 | 0.40 | 0.50 | 0.35 | 0.35 |
| (56) | 0.92 | 1.61 | 1.20 | 1.75 | 2.03 |
| (57) | 1.67 | −3.01 | −0.67 | −3.02 | −5.05 |

| | Exam-ple23 | Exam-ple24 | Exam-ple25 | Exam-ple26 | Exam-ple27 |
|---|---|---|---|---|---|
| (15) | −1.33 | −2.20 | −2.55 | −2.55 | −2.55 |
| (16) | 0.23 | 0.38 | 0.43 | 0.40 | 0.40 |
| (17) | 4.6 | 5.5 | 5.6 | 5.2 | 5.2 |
| (18) | 4.83 | 7.31 | 8.28 | 15.29 | 15.98 |
| (19) | 13.36 | 6.01 | 3.71 | 8.73 | 7.43 |
| (20) | 2.27 | 1.52 | 1.26 | 1.37 | 1.41 |
| (21) | 0.66 | 0.74 | 1.04 | 0.86 | 0.93 |
| (22) | 0.01 | 0.01 | 0.06 | 0.05 | 0.03 |
| (23) | 0.57 | 0.74 | 0.78 | 0.74 | 0.73 |
| (24) | 0.03 | 0.03 | 0.03 | 0.03 | 0.03 |
| (25) | 0.62 | 0.46 | 0.41 | 0.47 | 0.46 |
| (26) | 2.49 | 3.73 | 3.70 | 4.37 | 4.38 |
| (27) | 0.05 | 0.05 | 0.06 | 0.04 | 0.04 |
| (28) | 0.46 | 0.53 | 0.63 | 0.37 | 0.43 |
| (29) | 0.86 | 0.57 | 0.44 | 0.47 | 0.47 |
| (30) | 0.09 | 0.08 | 0.09 | 0.03 | 0.04 |
| (31) | 0.59 | 0.44 | 0.43 | 0.47 | 0.45 |
| (32) | 0.63 | 0.46 | 0.44 | 0.46 | 0.45 |
| (33) | 1.79 | 1.27 | 1.09 | 1.34 | 1.35 |
| (34) | 2.99 | 2.07 | 1.79 | 2.01 | 2.05 |
| (35) | 5.53 | 5.31 | 4.99 | 4.22 | 4.18 |
| (36) | 0.23 | 0.16 | 0.14 | 0.20 | 0.18 |
| (37) | −48.46 | 3.89 | 3.89 | 5.56 | 6.66 |
| (38) | 0.71 | 1.86 | 2.82 | 2.26 | 2.26 |
| (39) | −14.49 | −1270.10 | 12.52 | −12.86 | −22.66 |
| (40) | 15.35 | 30.48 | 142.69 | −13851.56 | −953.80 |

-continued

| | | | | | |
|---|---|---|---|---|---|
| (41) | −29.10 | 1.39 | 1.22 | 2.03 | 2.35 |
| (42) | 0.03 | 0.03 | 0.03 | 0.03 | 0.03 |
| (43) | 0.02 | 0.02 | 0.02 | 0.02 | 0.02 |
| (45) | 0.96 | 1.00 | 1.00 | 1.00 | 1.00 |
| (47) | 0.90 | 0.72 | 0.73 | 0.79 | — |
| (49) | — | — | — | — | — |
| (51) | 0.04 | 0.05 | 0.05 | 0.02 | 0.02 |
| (53) | 0.02 | 0.02 | 0.03 | 0.03 | 0.03 |
| (54) | 0.92 | 0.93 | 0.92 | 0.95 | 0.94 |
| (55) | 0.34 | 0.51 | 0.58 | 0.50 | 0.49 |
| (56) | 1.51 | 1.16 | 1.04 | 1.35 | 1.25 |
| (57) | −2.23 | −0.28 | 0.35 | −1.40 | −0.85 |

| | Example28 | Example29 | Example30 | Example31 | Example32 |
|---|---|---|---|---|---|
| (15) | −1.60 | −1.56 | −1.55 | −2.00 | −2.00 |
| (16) | 0.40 | 0.31 | 0.31 | 0.20 | 0.23 |
| (17) | 5.2 | 5.2 | 5.2 | 4.0 | 4.6 |
| (18) | 14.82 | 10.68 | 9.97 | 13.17 | 12.33 |
| (19) | 8.86 | 8.88 | 8.96 | 8.42 | 8.45 |
| (20) | 1.50 | 1.65 | 1.68 | 2.02 | 1.98 |
| (21) | 0.47 | 0.63 | 0.81 | 0.79 | 1.15 |
| (22) | 0.03 | 0.05 | 0.06 | 0.02 | 0.04 |
| (23) | 0.73 | 0.73 | 0.73 | 0.61 | 0.60 |
| (24) | 0.03 | 0.03 | 0.03 | 0.03 | 0.03 |
| (25) | 0.46 | 0.47 | 0.45 | 0.51 | 0.53 |
| (26) | 3.06 | 2.31 | 2.34 | 2.14 | 2.94 |
| (27) | 0.04 | 0.04 | 0.04 | 0.07 | 0.07 |
| (28) | 0.37 | 0.37 | 0.37 | 0.51 | 0.60 |
| (29) | 0.72 | 0.57 | 0.74 | 0.47 | 0.80 |
| (30) | 0.05 | 0.10 | 0.08 | 0.05 | 0.02 |
| (31) | 0.43 | 0.47 | 0.41 | 0.34 | 0.37 |
| (32) | 0.42 | 0.46 | 0.41 | 0.36 | 0.39 |
| (33) | 1.20 | 1.13 | 1.08 | 1.14 | 1.59 |
| (34) | 2.08 | 2.04 | 2.16 | 3.34 | 3.24 |
| (35) | 3.79 | 4.22 | 3.96 | 2.46 | 3.54 |
| (36) | 0.20 | 0.19 | 0.20 | 0.32 | 0.27 |
| (37) | 6.81 | 6.71 | 6.11 | 7.21 | 4.16 |
| (38) | 1.63 | 1.60 | 1.23 | 1.06 | 0.72 |
| (39) | 10.52 | 9.98 | 11.07 | 16.38 | −2.99 |
| (40) | 185.32 | −988.41 | −327.47 | 40.51 | 49.74 |
| (41) | 2.91 | 2.82 | 2.61 | 3.98 | 3.64 |
| (42) | 0.03 | 0.03 | 0.03 | 0.03 | 0.03 |
| (43) | 0.02 | 0.02 | 0.02 | 0.02 | 0.02 |
| (45) | 1.00 | 1.00 | 1.00 | 1.00 | 1.00 |
| (47) | — | — | — | — | — |
| (49) | — | — | — | — | — |
| (51) | 0.02 | 0.02 | 0.03 | 0.04 | 0.03 |
| (53) | 0.04 | 0.05 | 0.04 | 0.02 | 0.01 |
| (54) | 0.95 | 0.95 | 0.95 | 0.72 | 0.70 |
| (55) | 0.48 | 0.49 | 0.47 | 0.32 | 0.32 |
| (56) | 1.35 | 1.36 | 1.36 | 1.20 | 1.19 |
| (57) | −1.38 | −1.42 | −1.34 | 0.05 | −0.05 |

| | Example33 | Example34 | Example35 | Example36 | Example37 |
|---|---|---|---|---|---|
| (15) | −1.33 | −1.33 | −1.33 | −1.33 | −1.33 |
| (16) | 0.23 | 0.23 | 0.23 | 0.23 | 0.23 |
| (17) | 4.5 | 4.7 | 4.8 | 4.9 | 5.0 |
| (18) | 7.72 | 2.62 | 3.45 | 4.97 | 2.00 |
| (19) | 5.75 | 12.05 | 10.55 | 4.40 | 13.69 |
| (20) | 2.35 | 2.55 | 2.55 | 2.53 | 2.56 |
| (21) | 0.64 | 0.89 | 0.88 | 0.86 | 0.89 |
| (22) | 0.01 | 0.16 | 0.16 | 0.15 | 0.14 |
| (23) | 0.52 | 0.72 | 0.72 | 0.69 | 0.73 |
| (24) | 0.03 | 0.03 | 0.03 | 0.03 | 0.03 |
| (25) | 0.64 | 0.54 | 0.54 | 0.54 | 0.53 |
| (26) | 2.57 | 1.78 | 1.81 | 1.83 | 1.83 |
| (27) | 0.13 | 0.03 | 0.03 | 0.08 | 0.03 |
| (28) | 1.06 | 0.27 | 0.31 | 0.75 | 0.24 |
| (29) | 0.94 | 0.43 | 0.42 | 0.37 | 0.39 |
| (30) | 0.06 | 0.26 | 0.37 | 0.38 | 0.37 |
| (31) | 0.77 | 0.61 | 0.62 | 0.69 | 0.61 |
| (32) | 0.83 | 0.63 | 0.65 | 0.72 | 0.63 |
| (33) | 1.97 | 1.15 | 1.16 | 1.10 | 1.11 |
| (34) | 2.86 | 2.04 | 2.05 | 2.02 | 2.03 |
| (35) | 7.17 | 8.17 | 9.29 | 9.68 | 9.74 |

-continued

| | | | | | |
|---|---|---|---|---|---|
| (36) | 0.20 | 0.14 | 0.13 | 0.15 | 0.16 |
| (37) | 4.03 | 1.99 | 1.95 | 1.58 | 1.63 |
| (38) | 0.67 | 1.88 | 1.98 | 2.27 | 2.15 |
| (39) | 4.67 | 20.40 | 13.06 | 3.44 | 84.44 |
| (40) | 14.22 | 8.78 | 6.88 | 7.05 | 6.82 |
| (41) | 2.63 | 1.14 | 1.15 | 1.19 | 1.15 |
| (42) | 0.03 | 0.03 | 0.03 | 0.03 | 0.03 |
| (43) | 0.02 | 0.03 | 0.03 | 0.03 | 0.03 |
| (45) | 1.00 | 1.00 | 1.00 | 1.00 | 1.00 |
| (47) | 0.74 | 0.65 | 0.64 | 0.66 | 0.66 |
| (49) | — | — | — | — | — |
| (51) | 0.03 | 0.05 | 0.06 | 0.06 | 0.06 |
| (53) | 0.01 | 0.04 | 0.05 | 0.06 | 0.06 |
| (54) | 0.80 | 0.95 | 0.95 | 0.88 | 0.88 |
| (55) | 0.37 | 0.52 | 0.53 | 0.53 | 0.53 |
| (56) | 0.93 | 1.56 | 1.46 | 1.00 | 1.69 |
| (57) | 0.62 | −2.66 | −2.07 | 0.30 | −3.31 |

| | Example38 | Example39 | Example40 | Example41 | Example42 |
|---|---|---|---|---|---|
| (15) | −1.33 | −1.30 | −1.30 | −1.32 | −1.32 |
| (16) | 0.23 | 0.23 | 0.23 | 0.23 | 0.23 |
| (17) | 5.4 | 4.9 | 4.8 | 4.5 | 4.5 |
| (18) | 4.49 | 14.80 | 12.59 | 0.65 | 0.40 |
| (19) | 5.80 | 7.71 | 7.83 | 6.54 | 6.33 |
| (20) | 2.51 | 2.26 | 2.30 | 1.66 | 1.63 |
| (21) | 0.70 | 0.52 | 0.45 | 0.72 | 0.74 |
| (22) | 0.04 | 0.19 | 0.20 | 0.71 | 0.74 |
| (23) | 0.67 | 0.70 | 0.71 | 0.76 | 0.76 |
| (24) | 0.03 | 0.02 | 0.02 | 0.03 | 0.03 |
| (25) | 0.55 | 0.58 | 0.60 | 0.56 | 0.56 |
| (26) | 2.06 | 1.88 | 1.90 | 1.59 | 1.52 |
| (27) | 0.07 | 0.05 | 0.05 | 0.04 | 0.04 |
| (28) | 0.74 | 0.45 | 0.43 | 0.37 | 0.37 |
| (29) | 0.31 | 0.94 | 1.03 | 0.44 | 0.27 |
| (30) | 0.33 | 0.13 | 0.28 | 0.28 | 0.14 |
| (31) | 0.63 | 0.81 | 0.92 | 0.80 | 0.83 |
| (32) | 0.66 | 0.82 | 0.93 | 0.87 | 0.86 |
| (33) | 1.31 | 1.12 | 1.26 | 1.31 | 1.28 |
| (34) | 2.22 | 1.88 | 1.84 | 1.77 | 1.65 |
| (35) | 8.79 | 8.44 | 10.70 | 9.76 | 8.07 |
| (36) | 0.20 | 0.34 | 0.28 | 0.11 | 0.13 |
| (37) | 1.65 | 2.58 | 1.56 | −17.82 | 2.90 |
| (38) | 2.36 | 0.88 | 0.84 | 2.24 | 3.64 |
| (39) | 4.40 | 8.68 | 9.57 | 9.83 | 9.82 |
| (40) | 6.60 | −6028.80 | 17.96 | 14.50 | 161.18 |
| (41) | 1.21 | 2.66 | 1.42 | −5.68 | 0.99 |
| (42) | 0.03 | 0.02 | 0.02 | 0.03 | 0.03 |
| (43) | 0.03 | 0.02 | 0.02 | 0.03 | 0.03 |
| (45) | 1.00 | — | — | 0.95 | 1.00 |
| (47) | 0.69 | — | — | 0.37 | 0.41 |
| (49) | — | — | — | — | — |
| (51) | 0.05 | 0.06 | 0.04 | 0.09 | 0.09 |
| (53) | 0.05 | 0.25 | 0.26 | 0.04 | 0.04 |
| (54) | 0.89 | 0.92 | 0.92 | 0.93 | 0.93 |
| (55) | 0.49 | 0.55 | 0.57 | 0.59 | 0.63 |
| (56) | 1.08 | 1.24 | 1.26 | 1.21 | 1.20 |
| (57) | −0.04 | −1.13 | −1.22 | −0.78 | −0.81 |

| | Example43 | Example44 | Example45 | Example46 | Example47 |
|---|---|---|---|---|---|
| (15) | −1.33 | −1.33 | −1.33 | −1.33 | −1.33 |
| (16) | 0.23 | 0.23 | 0.23 | 0.20 | 0.23 |
| (17) | 5.0 | 5.0 | 5.0 | 5.0 | 5.0 |
| (18) | 4.40 | 4.37 | 5.34 | 4.33 | 6.79 |
| (19) | 10.74 | 8.43 | 8.41 | 8.41 | 8.39 |
| (20) | 2.54 | 2.49 | 2.31 | 2.45 | 2.47 |
| (21) | 0.89 | 1.61 | 2.27 | 2.76 | 0.82 |
| (22) | 0.13 | 0.12 | 0.09 | 0.17 | 0.08 |
| (23) | 0.73 | 0.73 | 0.73 | 0.73 | 0.73 |
| (24) | 0.03 | 0.03 | 0.03 | 0.03 | 0.03 |
| (25) | 0.52 | 0.51 | 0.48 | 0.48 | 0.53 |
| (26) | 1.78 | 1.75 | 1.65 | 1.50 | 1.80 |
| (27) | 0.03 | 0.04 | 0.04 | 0.04 | 0.04 |
| (28) | 0.30 | 0.38 | 0.38 | 0.38 | 0.38 |
| (29) | 0.40 | 0.35 | 0.16 | 0.16 | 0.25 |
| (30) | 0.37 | 0.32 | 0.33 | 0.35 | 0.66 |

| | | | | | |
|---|---|---|---|---|---|
| (31) | 0.59 | 0.55 | 0.47 | 0.44 | 0.63 |
| (32) | 0.60 | 0.57 | 0.50 | 0.47 | 0.65 |
| (33) | 1.03 | 1.10 | 1.10 | 1.02 | 1.05 |
| (34) | 2.00 | 2.05 | 2.18 | 2.23 | 2.06 |
| (35) | 8.38 | 7.21 | 5.10 | 4.92 | 9.56 |
| (36) | 0.14 | 0.15 | 0.20 | 0.20 | 0.12 |
| (37) | 1.74 | 1.72 | 1.96 | 1.96 | 1.81 |
| (38) | 2.05 | 2.30 | 4.74 | 4.49 | 3.37 |
| (39) | 22.06 | 9.97 | 9.04 | 8.98 | 10.58 |
| (40) | 9.42 | 7.85 | 5.84 | 5.69 | 4.88 |
| (41) | 1.20 | 1.15 | 1.09 | 1.04 | 1.24 |
| (42) | 0.03 | 0.03 | 0.03 | 0.03 | 0.03 |
| (43) | 0.03 | 0.03 | 0.03 | 0.03 | 0.03 |
| (45) | 1.00 | 1.00 | 1.00 | 1.00 | 1.00 |
| (47) | 0.67 | 0.66 | 0.65 | 0.62 | 0.65 |
| (49) | — | — | — | — | — |
| (51) | 0.05 | 0.05 | 0.06 | 0.06 | 0.08 |
| (53) | 0.06 | 0.05 | 0.05 | 0.04 | 0.09 |
| (54) | 0.95 | 0.94 | 0.94 | 0.94 | 0.94 |
| (55) | 0.53 | 0.52 | 0.50 | 0.49 | 0.54 |
| (56) | 1.48 | 1.32 | 1.32 | 1.32 | 1.32 |
| (57) | −2.19 | −1.24 | −1.09 | −1.05 | −1.21 |

| | Example48 | Example49 | Example50 | Example51 | Example52 |
|---|---|---|---|---|---|
| (15) | −1.33 | −1.33 | −1.40 | −1.33 | −1.40 |
| (16) | 0.20 | 0.20 | 0.17 | 0.20 | 0.17 |
| (17) | 5.0 | 5.0 | 5.8 | 5.7 | 5.9 |
| (18) | 7.70 | 7.79 | 1.61 | 3.08 | 1.10 |
| (19) | 8.50 | 8.49 | 3.05 | 2.84 | 2.57 |
| (20) | 2.37 | 2.12 | 2.29 | 2.18 | 2.23 |
| (21) | 1.45 | 1.67 | 0.97 | 0.47 | 0.79 |
| (22) | 0.06 | 0.10 | 0.36 | 0.28 | 0.33 |
| (23) | 0.72 | 0.72 | 0.52 | 0.52 | 0.51 |
| (24) | 0.03 | 0.03 | 0.03 | 0.03 | 0.03 |
| (25) | 0.55 | 0.57 | 0.61 | 0.63 | 0.61 |
| (26) | 1.65 | 1.65 | 2.10 | 2.31 | 2.11 |
| (27) | 0.04 | 0.04 | 0.22 | 0.24 | 0.27 |
| (28) | 0.38 | 0.38 | 2.11 | 2.21 | 2.52 |
| (29) | 0.00 | −0.02 | 0.28 | 0.35 | 0.29 |
| (30) | 1.45 | 1.67 | 0.13 | 0.12 | 0.12 |
| (31) | 0.66 | 0.75 | 0.89 | 1.05 | 0.99 |
| (32) | 0.71 | 0.80 | 0.92 | 1.11 | 1.02 |
| (33) | 1.15 | 1.35 | 1.44 | 1.67 | 1.49 |
| (34) | 2.32 | 2.39 | 2.53 | 2.43 | 2.47 |
| (35) | 9.80 | 10.26 | 6.96 | 7.76 | 6.93 |
| (36) | 0.12 | 0.12 | 0.28 | 0.26 | 0.28 |
| (37) | 2.31 | 2.62 | 1.80 | 1.99 | 1.73 |
| (38) | −2459.34 | −47.39 | 1.66 | 1.56 | 1.62 |
| (39) | 16.97 | −272.93 | 1.12 | 1.73 | 1.18 |
| (40) | 2.48 | 2.43 | 13.27 | 9.52 | 13.77 |
| (41) | 1.35 | 1.30 | 1.62 | 1.68 | 1.60 |
| (42) | 0.03 | 0.03 | 0.03 | 0.03 | 0.03 |
| (43) | 0.03 | 0.03 | 0.02 | 0.02 | 0.02 |
| (45) | 1.00 | 1.00 | 1.00 | 1.00 | 1.00 |
| (47) | 0.59 | 0.55 | 0.68 | 0.64 | 0.68 |
| (49) | — | — | — | — | — |
| (51) | 0.14 | 0.17 | 0.03 | 0.03 | 0.03 |
| (53) | 0.17 | 0.22 | 0.03 | 0.02 | 0.02 |
| (54) | 0.94 | 0.93 | 0.70 | 0.66 | 0.65 |
| (55) | 0.55 | 0.57 | 0.41 | 0.43 | 0.42 |
| (56) | 1.32 | 1.32 | 0.74 | 0.72 | 0.69 |
| (57) | −0.99 | −0.92 | 1.34 | 1.33 | 1.47 |

| | Example53 | Example54 | Example55 | Example56 | Example57 |
|---|---|---|---|---|---|
| (15) | −1.40 | −1.40 | −1.10 | −1.56 | −1.60 |
| (16) | 0.17 | 0.17 | 0.23 | 0.20 | 0.20 |
| (17) | 5.7 | 5.9 | 4.6 | 4.6 | 4.7 |
| (18) | 1.55 | 1.10 | 16.84 | −0.34 | −4.26 |
| (19) | 2.24 | 2.57 | 11.88 | 13.08 | 7.02 |
| (20) | 2.20 | 2.23 | 2.77 | 2.20 | 1.94 |
| (21) | 0.80 | 0.79 | 0.31 | 1.01 | 0.98 |
| (22) | 0.28 | 0.33 | 0.03 | 0.10 | 0.14 |
| (23) | 0.48 | 0.51 | 0.53 | 0.62 | 0.61 |
| (24) | 0.03 | 0.03 | 0.03 | 0.02 | 0.03 |
| (25) | 0.59 | 0.61 | 0.68 | 0.57 | 0.51 |

| | | | | | |
|---|---|---|---|---|---|
| (26) | 2.01 | 2.11 | 2.50 | 2.22 | 2.04 |
| (27) | 0.33 | 0.27 | 0.07 | 0.04 | 0.08 |
| (28) | 2.82 | 2.52 | 0.58 | 0.39 | 0.69 |
| (29) | 0.20 | 0.29 | 0.86 | 0.61 | 0.85 |
| (30) | 0.12 | 0.12 | 0.13 | 0.21 | 0.05 |
| (31) | 0.90 | 0.99 | 0.80 | 0.51 | 0.38 |
| (32) | 0.94 | 1.02 | 0.89 | 0.55 | 0.40 |
| (33) | 1.44 | 1.49 | 2.25 | 1.53 | 1.36 |
| (34) | 2.64 | 2.47 | 2.94 | 2.85 | 3.07 |
| (35) | 5.50 | 6.93 | 10.06 | 6.49 | 3.36 |
| (36) | 0.35 | 0.28 | 0.19 | 0.15 | 0.23 |
| (37) | 1.60 | 1.73 | 12.47 | 9.82 | 4.78 |
| (38) | 2.26 | 1.62 | 0.77 | 0.93 | 0.63 |
| (39) | 13.33 | 1.18 | 8.21 | 10.05 | 2.92 |
| (40) | 14.46 | 13.77 | 6.80 | 26.71 | 59.95 |
| (41) | 1.60 | 1.60 | 10.30 | 6.18 | 3.14 |
| (42) | 0.03 | 0.03 | 0.03 | 0.02 | 0.03 |
| (43) | 0.02 | 0.02 | 0.02 | 0.02 | 0.02 |
| (45) | 1.00 | 1.00 | 1.00 | 1.00 | 0.45 |
| (47) | 0.68 | 0.68 | — | 0.77 | 0.26 |
| (49) | — | — | — | — | — |
| (51) | 0.03 | 0.03 | 0.04 | 0.05 | 0.03 |
| (53) | 0.02 | 0.02 | 0.01 | 0.04 | 0.02 |
| (54) | 0.61 | 0.65 | 0.89 | 0.94 | 0.90 |
| (55) | 0.40 | 0.42 | 0.37 | 0.38 | 0.34 |
| (56) | 0.64 | 0.69 | 1.37 | 1.53 | 1.10 |
| (57) | 1.77 | 1.47 | −1.70 | −2.25 | 0.33 |

| | Example58 | Example59 | Example60 | Example61 | Example62 |
|---|---|---|---|---|---|
| (15) | −1.33 | −1.33 | −1.33 | −3.57 | −3.56 |
| (16) | 0.23 | 0.23 | 0.23 | 0.60 | 0.60 |
| (17) | 5.5 | 5.6 | 5.6 | 5.5 | 5.5 |
| (18) | 8.68 | −0.12 | 1.62 | 4.121 | 2.714 |
| (19) | 7.46 | 7.70 | 8.43 | 0.12 | 0.14 |
| (20) | 2.18 | 2.19 | 1.98 | 0.57 | 0.58 |
| (21) | 0.82 | 0.75 | 0.79 | 0.80 | 0.79 |
| (22) | 0.14 | 0.03 | 0.03 | 0.01 | 0.01 |
| (23) | 0.60 | 0.60 | 0.61 | 0.84 | 0.84 |
| (24) | 0.03 | 0.03 | 0.03 | 0.030 | 0.030 |
| (25) | 0.59 | 0.58 | 0.58 | 0.31 | 0.31 |
| (26) | 2.61 | 2.57 | 2.51 | 1.30 | 1.32 |
| (27) | 0.08 | 0.08 | 0.07 | 0.17 | 0.16 |
| (28) | 0.81 | 0.79 | 0.72 | 1.59 | 1.53 |
| (29) | 0.83 | 0.86 | 0.60 | −0.67 | −0.69 |
| (30) | 0.26 | 0.16 | 0.11 | 0.21 | 0.20 |
| (31) | 0.63 | 0.59 | 0.54 | 0.51 | 0.50 |
| (32) | 0.67 | 0.62 | 0.59 | 0.53 | 0.53 |
| (33) | 1.64 | 1.60 | 1.51 | 0.77 | 0.78 |
| (34) | 2.71 | 2.66 | 2.77 | 1.13 | 1.13 |
| (35) | 8.99 | 7.42 | 6.89 | 3.20 | 3.18 |
| (36) | 0.15 | 0.18 | 0.19 | 0.41 | 0.40 |
| (37) | 3.32 | 3.00 | 3.04 | −2.51 | −2.50 |
| (38) | 0.78 | 0.74 | 1.04 | −5.56 | −5.20 |
| (39) | 6.02 | 2.79 | 4.50 | 0.31 | 0.32 |
| (40) | 6.92 | 16.02 | 7.56 | 9.68 | 10.43 |
| (41) | 1.79 | 1.97 | 1.70 | −2.20 | −2.16 |
| (42) | 0.03 | 0.03 | 0.03 | 0.03 | 0.03 |
| (43) | 0.02 | 0.02 | 0.02 | 0.03 | 0.03 |
| (45) | 1.00 | 1.00 | 0.39 | 0.74 | 0.75 |
| (47) | 0.66 | 0.73 | 0.68 | 0.44 | 0.45 |
| (49) | 0.83 | 0.26 | — | — | — |
| (51) | 0.05 | 0.03 | 0.04 | 0.08 | 0.07 |
| (53) | 0.04 | 0.04 | 0.01 | 0.02 | 0.02 |
| (54) | 0.88 | 0.89 | 0.90 | 0.79 | 0.80 |
| (55) | 0.40 | 0.40 | 0.39 | 0.70 | 0.70 |
| (56) | 1.12 | 1.14 | 1.20 | 0.85 | 0.85 |
| (57) | −0.19 | −0.34 | −0.51 | 1.08 | 1.08 |

| | Example63 | Example64 | Example65 | Example66 | Example67 |
|---|---|---|---|---|---|
| (15) | −3.56 | −3.56 | −3.56 | −3.56 | −3.55 |
| (16) | 0.60 | 0.60 | 0.60 | 0.60 | 0.60 |
| (17) | 6.2 | 6.1 | 5.8 | 5.9 | 5.5 |
| (18) | 2.887 | 3.456 | 1.820 | 2.639 | 4.128 |

-continued

| | | | | | |
|---|---|---|---|---|---|
| (19) | 0.16 | 0.15 | 0.13 | 0.19 | 0.14 |
| (20) | 0.53 | 0.51 | 0.55 | 0.58 | 0.58 |
| (21) | 1.85 | 1.84 | 0.80 | 0.80 | 0.78 |
| (22) | 0.01 | 0.01 | 0.01 | 0.01 | 0.01 |
| (23) | 0.89 | 0.90 | 0.85 | 0.86 | 0.84 |
| (24) | 0.030 | 0.030 | 0.030 | 0.030 | 0.030 |
| (25) | 0.29 | 0.29 | 0.32 | 0.31 | 0.31 |
| (26) | 1.32 | 1.27 | 1.33 | 1.49 | 1.32 |
| (27) | 0.10 | 0.09 | 0.15 | 0.14 | 0.16 |
| (28) | 1.16 | 1.06 | 1.53 | 1.47 | 1.55 |
| (29) | −0.50 | −0.46 | −0.66 | −0.65 | −0.69 |
| (30) | 0.18 | 0.19 | 0.23 | 0.18 | 0.22 |
| (31) | 0.44 | 0.43 | 0.51 | 0.48 | 0.49 |
| (32) | 0.45 | 0.45 | 0.54 | 0.50 | 0.52 |
| (33) | 0.78 | 0.76 | 0.82 | 0.86 | 0.78 |
| (34) | 1.11 | 1.10 | 1.13 | 1.14 | 1.14 |
| (35) | 3.26 | 3.07 | 3.81 | 3.20 | 3.22 |
| (36) | 0.32 | 0.31 | 0.32 | 0.36 | 0.41 |
| (37) | −5.18 | −6.53 | −2.68 | −3.08 | −2.46 |
| (38) | −7.97 | −9.78 | −5.56 | −4.54 | −5.14 |
| (39) | 0.45 | 0.48 | 0.34 | 0.38 | 0.32 |
| (40) | 12.25 | 11.51 | 9.32 | 12.61 | 9.00 |
| (41) | −3.88 | −4.55 | −2.24 | −2.35 | −2.12 |
| (42) | 0.03 | 0.03 | 0.03 | 0.03 | 0.03 |
| (43) | 0.03 | 0.03 | 0.03 | 0.03 | 0.03 |
| (45) | 0.70 | 0.69 | 0.75 | 0.75 | 0.75 |
| (47) | — | — | 0.44 | 0.44 | 0.44 |
| (49) | — | — | — | — | — |
| (51) | 0.07 | 0.07 | 0.09 | 0.07 | 0.08 |
| (53) | 0.03 | 0.02 | 0.03 | 0.03 | 0.02 |
| (54) | 0.87 | 0.88 | 0.81 | 0.83 | 0.80 |
| (55) | 0.67 | 0.65 | 0.71 | 0.69 | 0.70 |
| (56) | 0.90 | 0.91 | 0.86 | 0.87 | 0.85 |
| (57) | 1.04 | 1.04 | 1.08 | 1.06 | 1.09 |

| | Example68 | Example69 | Example70 | Example71 | Example72 |
|---|---|---|---|---|---|
| (15) | −3.51 | −3.51 | −3.55 | −3.53 | −3.56 |
| (16) | 0.60 | 0.59 | 0.62 | 0.60 | 0.81 |
| (17) | 4.7 | 4.0 | 4.3 | 4.2 | 20.0 |
| (18) | 5.676 | −2.165 | 2.520 | −4.024 | 16.232 |
| (19) | 0.43 | 0.44 | 0.41 | 0.43 | 0.06 |
| (20) | 0.47 | 0.59 | 0.55 | 0.56 | 0.15 |
| (21) | 0.53 | 0.68 | 0.72 | 0.70 | 1.29 |
| (22) | 0.03 | 0.04 | 0.07 | 0.13 | 0.03 |
| (23) | 0.97 | 0.95 | 0.95 | 0.95 | 0.94 |
| (24) | 0.030 | 0.030 | 0.030 | 0.030 | 0.030 |
| (25) | 0.34 | 0.34 | 0.30 | 0.32 | 0.26 |
| (26) | 1.13 | 1.21 | 1.23 | 1.22 | 1.60 |
| (27) | 0.02 | 0.04 | 0.04 | 0.04 | 0.06 |
| (28) | 0.20 | 0.30 | 0.30 | 0.30 | 2.37 |
| (29) | −0.21 | −0.25 | −0.15 | −0.23 | −0.20 |
| (30) | 0.06 | 0.09 | 0.04 | 0.02 | 0.15 |
| (31) | 0.49 | 0.47 | 0.42 | 0.45 | 0.37 |
| (32) | 0.52 | 0.52 | 0.43 | 0.48 | 0.38 |
| (33) | 0.80 | 0.84 | 0.69 | 0.73 | 0.80 |
| (34) | 1.09 | 1.14 | 1.07 | 1.10 | 1.05 |
| (35) | 4.29 | 3.54 | 3.75 | 3.97 | 9.28 |
| (36) | 0.19 | 0.20 | 0.24 | 0.23 | 0.31 |
| (37) | −3.19 | −3.97 | −5.93 | −4.70 | −15.07 |
| (38) | −36.12 | −20.98 | −38.61 | −23.70 | −31.38 |
| (39) | 12.39 | 4.04 | −43.59 | −17.45 | 0.60 |
| (40) | −32.00 | 29.54 | 3950.63 | 82.32 | 41.33 |
| (41) | −0.90 | −1.09 | −1.81 | −1.34 | −11.72 |
| (42) | 0.03 | 0.03 | 0.03 | 0.03 | 0.03 |
| (43) | 0.03 | 0.03 | 0.03 | 0.03 | 0.03 |
| (45) | 0.50 | 0.47 | 0.43 | 0.45 | 0.64 |
| (47) | 0.86 | 0.90 | 0.96 | 0.94 | — |
| (49) | — | — | — | — | — |
| (51) | 0.14 | 0.09 | 0.04 | 0.06 | 0.05 |
| (53) | 0.14 | 0.08 | 0.16 | 0.11 | 0.02 |
| (54) | 0.97 | 0.94 | 0.95 | 0.95 | 0.92 |
| (55) | 0.82 | 0.76 | 0.76 | 0.77 | 0.63 |
| (56) | 1.00 | 0.98 | 0.98 | 0.98 | 0.94 |
| (57) | 0.92 | 0.97 | 0.92 | 0.93 | 1.03 |

-continued

| | Example73 | Example74 | Example75 | Example76 | Example77 |
|---|---|---|---|---|---|
| (15) | −3.54 | −1.33 | −1.33 | −1.34 | −1.34 |
| (16) | 0.80 | 0.23 | 0.23 | 0.23 | 0.22 |
| (17) | 6.4 | 4.0 | 3.3 | 3.7 | 3.7 |
| (18) | 14.496 | 5.058 | 9.279 | 1.986 | 2.892 |
| (19) | 0.38 | 0.98 | 2.77 | 1.02 | 0.89 |
| (20) | 0.37 | 1.52 | 1.91 | 1.78 | 1.79 |
| (21) | 0.51 | 1.13 | 1.29 | 1.49 | 1.03 |
| (22) | 0.01 | 0.44 | 0.26 | 0.36 | 0.35 |
| (23) | 0.95 | 0.87 | 0.89 | 0.85 | 0.86 |
| (24) | 0.030 | 0.030 | 0.030 | 0.030 | 0.030 |
| (25) | 0.32 | 0.46 | 0.41 | 0.45 | 0.47 |
| (26) | 1.66 | 1.08 | 1.18 | 1.10 | 1.08 |
| (27) | 0.04 | 0.07 | 0.03 | 0.09 | 0.09 |
| (28) | 0.46 | 0.55 | 0.21 | 0.60 | 0.58 |
| (29) | −0.17 | −1.58 | −1.05 | −1.85 | −1.45 |
| (30) | 0.00 | 0.60 | 0.58 | 0.48 | 0.66 |
| (31) | 0.47 | 0.70 | 0.49 | 0.66 | 0.74 |
| (32) | 0.47 | 0.84 | 0.60 | 0.77 | 0.89 |
| (33) | 0.74 | 1.14 | 1.01 | 1.16 | 1.18 |
| (34) | 1.05 | 1.41 | 1.53 | 1.41 | 1.43 |
| (35) | 6.37 | 4.25 | 3.26 | 3.76 | 4.20 |
| (36) | 0.10 | 0.21 | 0.20 | 0.21 | 0.21 |
| (37) | −17.56 | −2.28 | −3.95 | −3.14 | −2.82 |
| (38) | −31.36 | −1.92 | −2.96 | −1.44 | −2.15 |
| (39) | 3.03 | 7.87 | 23.82 | 8.76 | 5.83 |
| (40) | −9696.32 | 2.94 | 22.27 | 3.84 | 3.10 |
| (41) | −5.11 | −0.58 | −0.65 | −0.76 | −0.85 |
| (42) | 0.03 | 0.03 | 0.03 | 0.03 | 0.03 |
| (43) | 0.03 | 0.03 | 0.03 | 0.03 | 0.03 |
| (45) | 0.35 | 0.83 | 0.86 | 0.88 | 0.86 |
| (47) | 0.97 | 0.36 | — | 0.40 | 0.37 |
| (49) | — | — | — | — | — |
| (51) | 0.02 | 0.17 | 0.18 | 0.15 | 0.19 |
| (53) | 0.13 | 0.03 | 0.03 | 0.03 | 0.04 |
| (54) | 0.95 | 0.88 | 0.95 | 0.86 | 0.86 |
| (55) | 0.80 | 0.72 | 0.69 | 0.73 | 0.74 |
| (56) | 0.98 | 0.94 | 1.09 | 0.92 | 0.92 |
| (57) | 0.90 | 1.03 | 0.45 | 1.02 | 1.08 |

| | Example78 | Example79 | Example80 | Example81 | Example82 |
|---|---|---|---|---|---|
| (15) | −1.33 | −2.20 | −2.00 | −2.00 | −2.00 |
| (16) | 0.23 | 0.38 | 0.32 | 0.32 | 0.32 |
| (17) | 3.8 | 5.5 | 5.1 | 5.1 | 5.1 |
| (18) | 2.970 | 7.326 | 5.550 | 6.867 | 6.856 |
| (19) | 0.92 | 6.01 | 1.47 | 0.89 | 0.89 |
| (20) | 1.77 | 1.51 | 1.28 | 1.29 | 1.26 |
| (21) | 0.98 | 0.73 | 1.07 | 1.14 | 1.30 |
| (22) | 0.29 | 0.01 | 0.11 | 0.10 | 0.06 |
| (23) | 0.87 | 0.74 | 0.90 | 0.87 | 0.87 |
| (24) | 0.030 | 0.030 | 0.030 | 0.030 | 0.030 |
| (25) | 0.46 | 0.46 | 0.39 | 0.40 | 0.38 |
| (26) | 1.08 | 3.74 | 1.22 | 1.24 | 1.24 |
| (27) | 0.08 | 0.05 | 0.05 | 0.08 | 0.08 |
| (28) | 0.55 | 0.53 | 0.44 | 0.72 | 0.72 |
| (29) | −1.52 | 0.57 | −1.18 | −0.96 | −0.96 |
| (30) | 0.64 | 0.08 | 0.54 | 0.54 | 0.55 |
| (31) | 0.71 | 0.44 | 0.54 | 0.62 | 0.55 |
| (32) | 0.85 | 0.46 | 0.57 | 0.65 | 0.59 |
| (33) | 1.14 | 1.27 | 0.83 | 0.87 | 0.80 |
| (34) | 1.40 | 2.07 | 1.31 | 1.28 | 1.32 |
| (35) | 4.06 | 5.31 | 4.96 | 4.82 | 4.44 |
| (36) | 0.21 | 0.16 | 0.23 | 0.23 | 0.23 |
| (37) | −2.67 | 3.89 | −13.18 | −8.91 | −93.62 |
| (38) | −2.12 | 1.86 | −1.60 | −2.00 | −2.00 |
| (39) | 6.61 | −1270.10 | 23.23 | 4.39 | 3.92 |
| (40) | 3.10 | 30.48 | 4.24 | 4.27 | 3.86 |
| (41) | −0.80 | 1.39 | −6.32 | −5.14 | −49.35 |
| (42) | 0.03 | 0.03 | 0.03 | 0.03 | 0.03 |
| (43) | 0.03 | 0.02 | 0.03 | 0.03 | 0.03 |
| (45) | 0.85 | 1.00 | 0.83 | 0.82 | 0.80 |
| (47) | 0.38 | 0.72 | 0.46 | 0.48 | 0.46 |
| (49) | — | — | — | — | — |
| (51) | 0.19 | 0.05 | 0.13 | 0.11 | 0.13 |
| (53) | 0.05 | 0.02 | 0.06 | 0.07 | 0.07 |

-continued

| | | | | | |
|---|---|---|---|---|---|
| (54) | 0.88 | 0.93 | 0.93 | 0.89 | 0.89 |
| (55) | 0.74 | 0.51 | 0.70 | 0.70 | 0.68 |
| (56) | 0.94 | 1.16 | 1.00 | 0.94 | 0.94 |
| (57) | 1.04 | −0.28 | 0.74 | 0.93 | 0.97 |

| | Example83 | Example84 | Example85 | Example86 | Example87 |
|---|---|---|---|---|---|
| (15) | −1.32 | −2.54 | −2.58 | −1.99 | −4.18 |
| (16) | 0.33 | 0.42 | 0.40 | 0.40 | 0.74 |
| (17) | 4.1 | 4.4 | 5.5 | 6.4 | 8.8 |
| (18) | 9.402 | 21.517 | 3.391 | 2.859 | 8.190 |
| (19) | 3.16 | 0.58 | 1.03 | 1.19 | 0.11 |
| (20) | 1.25 | 1.45 | 1.36 | 1.29 | 0.42 |
| (21) | 1.19 | 0.74 | 1.11 | 0.80 | 0.59 |
| (22) | 0.39 | 0.09 | 0.01 | 0.01 | 0.03 |
| (23) | 0.91 | 0.67 | 0.80 | 0.79 | 0.84 |
| (24) | 0.030 | 0.021 | 0.030 | 0.030 | 0.030 |
| (25) | 0.49 | 0.40 | 0.32 | 0.35 | 0.25 |
| (26) | 1.07 | 2.82 | 2.13 | 1.96 | 2.00 |
| (27) | 0.02 | 0.32 | 0.12 | 0.12 | 0.17 |
| (28) | 0.18 | 2.12 | 1.23 | 1.35 | 2.52 |
| (29) | −2.12 | 1.14 | −0.86 | −1.51 | −0.56 |
| (30) | 0.45 | 0.19 | 0.27 | 0.26 | 0.11 |
| (31) | 0.74 | 0.56 | 0.36 | 0.41 | 0.37 |
| (32) | 0.85 | 0.71 | 0.37 | 0.43 | 0.38 |
| (33) | 1.09 | 0.95 | 0.76 | 0.85 | 0.71 |
| (34) | 1.37 | 1.74 | 1.57 | 1.57 | 1.11 |
| (35) | 5.65 | 23.80 | 4.49 | 4.50 | 17.87 |
| (36) | 0.22 | 0.06 | 0.34 | 0.42 | 0.05 |
| (37) | −4.40 | 1.03 | −3.39 | −1.68 | −8.39 |
| (38) | −1.31 | 1.58 | −1.53 | −0.81 | −5.89 |
| (39) | 55.20 | 0.30 | 0.79 | 0.77 | 0.26 |
| (40) | 4.99 | 0.77 | 12.26 | 17.99 | 49.15 |
| (41) | −1.49 | 1.19 | −4.03 | −1.67 | −6.31 |
| (42) | 0.03 | 0.02 | 0.03 | 0.03 | 0.03 |
| (43) | 0.03 | 0.02 | 0.03 | 0.03 | 0.03 |
| (45) | 0.90 | — | 0.83 | 0.88 | 0.79 |
| (47) | 0.42 | 0.27 | — | — | — |
| (49) | — | — | — | — | — |
| (51) | 0.14 | 0.21 | 0.09 | 0.09 | 0.08 |
| (53) | 0.04 | 0.09 | 0.04 | 0.05 | 0.03 |
| (54) | 0.96 | 0.65 | 0.85 | 0.86 | 0.81 |
| (55) | 0.78 | 0.69 | 0.56 | 0.60 | 0.74 |
| (56) | 1.13 | 0.71 | 0.87 | 0.88 | 0.85 |
| (57) | 0.13 | 1.52 | 1.17 | 1.10 | 1.06 |

| | Example88 | Example89 | Example90 | Example91 | Example92 |
|---|---|---|---|---|---|
| (15) | −4.18 | −8.37 | −2.04 | −2.04 | −4.09 |
| (16) | 0.75 | 0.95 | 0.39 | 0.41 | 0.74 |
| (17) | 6.7 | 11.5 | 9.8 | 11.8 | 17.8 |
| (18) | 7.905 | 17.163 | 10.582 | 9.821 | 16.263 |
| (19) | 0.17 | 0.01 | 0.81 | 0.86 | 0.21 |
| (20) | 0.47 | 0.20 | 0.89 | 0.83 | 0.37 |
| (21) | 0.65 | 0.44 | 0.60 | 0.59 | 1.95 |
| (22) | 0.01 | 0.01 | 0.41 | 0.49 | 0.01 |
| (23) | 0.86 | 0.70 | 0.85 | 0.85 | 0.93 |
| (24) | 0.030 | 0.030 | 0.032 | 0.032 | 0.030 |
| (25) | 0.27 | 0.21 | 0.46 | 0.44 | 0.32 |
| (26) | 1.92 | 2.76 | 2.02 | 2.44 | 2.80 |
| (27) | 0.14 | 0.41 | 0.10 | 0.10 | 0.06 |
| (28) | 1.67 | 6.72 | 1.76 | 2.07 | 2.07 |
| (29) | −0.77 | −0.29 | −0.56 | −0.54 | −0.31 |
| (30) | 0.03 | 0.06 | 0.33 | 0.30 | 0.32 |
| (31) | 0.41 | 0.42 | 0.79 | 0.71 | 0.43 |
| (32) | 0.42 | 0.42 | 0.87 | 0.78 | 0.49 |
| (33) | 0.83 | 0.74 | 1.36 | 1.34 | 1.11 |
| (34) | 1.11 | 1.03 | 1.29 | 1.31 | 1.17 |
| (35) | 6.98 | −8.15 | 10.00 | 26.35 | −13.67 |
| (36) | 0.08 | 0.00 | 0.41 | 0.16 | 0.00 |
| (37) | −8.54 | −71.88 | −0.53 | −0.60 | −2.01 |
| (38) | −4.16 | −25.04 | −2.50 | −2.50 | −10.00 |
| (39) | 0.36 | 0.10 | 3.60 | 1.81 | 1.07 |
| (40) | 150.63 | 1016.39 | 4.03 | 4.75 | 2.77 |
| (41) | −4.92 | −53.92 | −0.58 | −0.69 | −2.18 |
| (42) | 0.03 | 0.03 | 0.03 | 0.03 | 0.03 |
| (43) | 0.03 | 0.03 | 0.03 | 0.03 | 0.03 |

-continued

| | | | | | |
|---|---|---|---|---|---|
| (45) | 0.82 | 0.80 | 0.58 | 0.62 | 0.64 |
| (47) | — | — | 0.88 | 0.88 | 0.87 |
| (49) | — | — | — | — | — |
| (51) | 0.08 | 0.06 | 0.10 | 0.10 | 0.13 |
| (53) | 0.02 | 0.02 | 0.02 | 0.02 | 0.01 |
| (54) | 0.83 | 0.63 | 0.66 | 0.67 | 0.92 |
| (55) | 0.76 | 0.79 | 0.67 | 0.66 | 0.75 |
| (56) | 0.87 | 0.71 | 0.90 | 0.91 | 0.95 |
| (57) | 1.04 | 1.02 | 0.98 | 0.98 | 1.09 |

| | Example93 | Example94 | Example95 | Example96 |
|---|---|---|---|---|
| (15) | −2.04 | −4.09 | −2.00 | −2.00 |
| (16) | 0.40 | 0.69 | 0.32 | 0.32 |
| (17) | 11.8 | 17.8 | 5.2 | 5.2 |
| (18) | 8.840 | 14.080 | 1.990 | 0.995 |
| (19) | 0.86 | 0.20 | 1.18 | 1.17 |
| (20) | 0.82 | 0.37 | 0.94 | 0.91 |
| (21) | 0.60 | 2.33 | 0.85 | 0.73 |
| (22) | 0.55 | 0.45 | 0.50 | 0.35 |
| (23) | 0.85 | 0.92 | 0.91 | 0.91 |
| (24) | 0.032 | 0.030 | 0.030 | 0.030 |
| (25) | 0.44 | 0.31 | 0.33 | 0.36 |
| (26) | 2.38 | 2.64 | 1.27 | 1.26 |
| (27) | 0.10 | 0.07 | 0.04 | 0.04 |
| (28) | 2.07 | 2.28 | 0.44 | 0.44 |
| (29) | −0.52 | −0.29 | −0.70 | −0.70 |
| (30) | 0.30 | 0.44 | 0.21 | 0.20 |
| (31) | 0.72 | 0.44 | 0.47 | 0.53 |
| (32) | 0.79 | 0.49 | 0.45 | 0.51 |
| (33) | 1.33 | 0.97 | 0.70 | 0.74 |
| (34) | 1.31 | 1.17 | 1.18 | 1.16 |
| (35) | 23.83 | −6.82 | 9.42 | 9.76 |
| (36) | 0.18 | 0.00 | 0.05 | 0.05 |
| (37) | −0.62 | 2.01 | 7.72 | 11.52 |
| (38) | −2.51 | −10.00 | −3.48 | −3.50 |
| (39) | 1.92 | 0.98 | 24.77 | −4293.76 |
| (40) | 4.90 | 2.78 | −105.70 | −105.84 |
| (41) | −0.68 | 2.46 | 3.35 | 4.88 |
| (42) | 0.03 | 0.03 | 0.03 | 0.03 |
| (43) | 0.03 | 0.03 | 0.03 | 0.03 |
| (45) | 0.61 | 0.64 | 0.81 | 0.83 |
| (47) | 0.88 | — | 0.31 | 0.29 |
| (49) | — | — | — | — |
| (51) | 0.10 | 0.12 | 0.06 | 0.05 |
| (53) | 0.02 | 0.03 | 0.06 | 0.07 |
| (54) | 0.67 | 0.91 | 0.94 | 0.94 |
| (55) | 0.65 | 0.96 | 0.86 | 0.87 |
| (56) | 0.91 | 0.94 | 0.99 | 0.99 |
| (57) | 0.97 | 1.09 | 0.72 | 0.70 |

Moreover, value of variable in each example are given below. Also, $N_{G1}$ denotes number of lenses in the first lens unit, $N_{G2}$ denotes number of lenses in the second lens unit, $f_{G2}$ denotes a focal length of the second lens unit, $f_{G2i}$ denotes a focal length of the second image-side lens. Furthermore, $f_{L1}$ to $F_{L19}$ denotes a focal length of each lens, and correspond to L1 to L19 shown in the cross-sectional view of the optical system. Also, with respect to the example which includes a diffraction optical element, description for focal length of a lens, shown by DL in the cross-sectional view of the optical system, is omitted.

| | Example8 | Example9 | Example10 | Example11 |
|---|---|---|---|---|
| $D_{oi}$ | 60.0 | 57.9 | 60.0 | 60.0 |
| $Y_{obj}$ | 4.7 | 4.7 | 4.8 | 4.8 |
| Y | 4.92 | 4.92 | 4.92 | 4.92 |
| $L_{TL}$ | 35.02 | 40.92 | 35.01 | 35.01 |
| $L_L$ | 30.71 | 36.61 | 30.70 | 30.70 |
| WD | 25.00 | 17.00 | 25.00 | 25.00 |
| BF | 4.31 | 4.31 | 4.31 | 4.31 |
| NA | 0.15 | 0.21 | 0.15 | 0.15 |

-continued

| | | | | |
|---|---|---|---|---|
| β | −1.04 | −1.05 | −1.03 | −1.03 |
| f | 9.34 | 9.35 | 9.35 | 10.22 |
| $\phi_{G1o}$ | 12.87 | 15.15 | 13.09 | 13.55 |
| $\phi_s$ | 4.84 | 5.70 | 4.73 | 4.77 |
| $D_{os}$ | 38.52 | 35.88 | 38.53 | 38.18 |
| $D_{G1G2}$ | 1.87 | 2.17 | 1.77 | 1.40 |
| $L_{G1}$ | 12.37 | 17.71 | 12.51 | 12.20 |
| $L_{G2}$ | 16.47 | 16.73 | 16.42 | 17.10 |
| $CRA_{obj}$ (MAX) | 5.01 | 3.02 | 4.85 | 4.57 |
| $CRA_{obj}$ (MIN) | 0.00 | 0.00 | 0.00 | 0.00 |
| $CRA_{img}$ | 20.40 | 23.21 | 20.47 | 20.41 |
| $D_{max}$ | 5.72 | 5.24 | 5.70 | 4.65 |
| $D_{G1max}$ | 1.23 | 2.49 | 0.99 | 1.10 |
| $\nu d_{max}$ | 81.61 | 81.61 | 81.61 | 81.61 |
| $\nu d_{min}$ | 30.30 | 30.30 | 30.30 | 31.32 |
| $N_{G1}$ | 4.00 | 5.00 | 4.00 | 4.00 |
| $N_{G2}$ | 5.00 | 5.00 | 6.00 | 6.00 |
| $f_{G1}$ | 13.85 | 12.59 | 14.04 | 13.02 |
| $f_{G2}$ | 53.90 | 19.64 | 34.90 | 39.91 |
| $f_{G1o}$ | 24.63 | 23.26 | 23.74 | 21.53 |
| $f_{G2i}$ | −10.50 | −8.84 | −10.57 | −10.74 |
| $f_{L1}$ | 24.63 | 23.26 | 23.74 | 21.53 |
| $f_{L2}$ | 27.02 | −40.17 | 27.43 | 24.93 |
| $f_{L3}$ | 12.38 | 18.64 | 10.99 | 13.31 |
| $f_{L4}$ | −6.99 | 9.77 | −6.17 | −6.78 |
| $f_{L5}$ | −15.63 | −6.61 | −16.62 | −25.51 |
| $f_{L6}$ | 51.27 | −14.37 | 44.82 | 33.89 |
| $f_{L7}$ | 20.88 | 73.73 | 11.13 | 20.46 |
| $f_{L8}$ | 15.49 | 12.37 | −12.69 | 8.23 |
| $f_{L9}$ | −10.50 | 22.47 | 11.28 | −12.22 |
| $f_{L10}$ | — | −8.84 | −10.57 | −10.74 |

| | Example12 | Example13 | Example14 | Example15 |
|---|---|---|---|---|
| $D_{oi}$ | 55.0 | 55.0 | 60.0 | 60.0 |
| $Y_{obj}$ | 4.7 | 4.7 | 4.7 | 4.7 |
| Y | 4.92 | 4.92 | 4.92 | 4.92 |
| $L_{TL}$ | 35.01 | 34.01 | 36.00 | 44.05 |
| $L_L$ | 32.11 | 31.12 | 32.87 | 40.74 |
| WD | 20.00 | 21.00 | 24.00 | 15.97 |
| BF | 2.90 | 2.89 | 3.13 | 3.31 |
| NA | 0.18 | 0.13 | 0.14 | 0.21 |
| β | −1.05 | −1.05 | −1.05 | −1.05 |
| f | 7.99 | 8.59 | 9.49 | 8.84 |
| $\phi_{G1o}$ | 13.29 | 11.27 | 12.33 | 13.69 |
| $\phi_s$ | 5.73 | 3.56 | 4.32 | 6.29 |
| $D_{os}$ | 36.58 | 35.61 | 40.71 | 32.22 |
| $D_{G1G2}$ | 1.64 | 1.24 | 1.41 | 4.13 |
| $L_{G1}$ | 15.23 | 13.67 | 15.60 | 14.70 |
| $L_{G2}$ | 15.23 | 16.21 | 15.86 | 21.90 |
| $CRA_{obj}$ (MAX) | 5.01 | 5.02 | 4.45 | 5.03 |
| $CRA_{obj}$ (MIN) | 0.00 | 0.00 | 0.00 | 0.00 |
| $CRA_{img}$ | 24.98 | 24.22 | 22.84 | 23.11 |
| $D_{max}$ | 3.01 | 3.60 | 3.25 | 4.13 |
| $D_{G1max}$ | 0.30 | 0.30 | 0.45 | 2.15 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 6.00 | 6.00 | 6.00 | 5.00 |
| $N_{G2}$ | 5.00 | 5.00 | 4.00 | 6.00 |
| $f_{G1}$ | 12.56 | 11.59 | 11.80 | 14.91 |
| $f_{G2}$ | 65.83 | 67.00 | −52.46 | 12.97 |
| $f_{G1o}$ | 18.32 | 17.88 | 18.30 | 56.21 |
| $f_{G2i}$ | −9.44 | −10.56 | −15.34 | −11.21 |
| $f_{L1}$ | 18.32 | 17.88 | 18.30 | 56.21 |
| $f_{L2}$ | −12.27 | −13.66 | −11.91 | 37.07 |
| $f_{L3}$ | 15.26 | 16.27 | 13.04 | 24.83 |
| $f_{L4}$ | 16.48 | 13.67 | 14.27 | 10.19 |
| $f_{L5}$ | 12.90 | 13.69 | 13.50 | −5.97 |
| $f_{L6}$ | −6.44 | −5.79 | −5.96 | −12.93 |
| $f_{L7}$ | −31.52 | 21.18 | −27.43 | 14.43 |
| $f_{L8}$ | 114.04 | −12.33 | 49.38 | 15.97 |
| $f_{L9}$ | 19.76 | 22.67 | 20.52 | 22.94 |
| $f_{L10}$ | 18.24 | 16.87 | −15.34 | −17.31 |
| $f_{L11}$ | −9.44 | −10.56 | — | −11.21 |

| | Example16 | Example17 | Example18 | Example19 |
|---|---|---|---|---|
| $D_{oi}$ | 60.0 | 60.0 | 60.0 | 70.0 |
| $Y_{obj}$ | 4.7 | 4.7 | 4.7 | 4.9 |
| Y | 4.92 | 4.92 | 4.92 | 4.92 |
| $L_{TL}$ | 43.01 | 40.23 | 35.01 | 42.41 |
| $L_L$ | 38.70 | 35.92 | 30.70 | 40.53 |
| WD | 17.00 | 19.78 | 25.00 | 27.58 |
| BF | 4.31 | 4.31 | 4.31 | 1.88 |
| NA | 0.18 | 0.20 | 0.15 | 0.15 |
| β | −1.05 | −1.05 | −1.04 | −1.00 |
| f | 10.48 | 10.21 | 8.63 | 9.02 |
| $\phi_{G1o}$ | 12.75 | 14.20 | 12.86 | 14.58 |
| $\phi_s$ | 4.52 | 5.67 | 5.89 | 5.59 |
| $D_{os}$ | 32.54 | 33.57 | 38.03 | 45.84 |
| $D_{G1G2}$ | 1.68 | 2.34 | 3.56 | 1.37 |
| $L_{G1}$ | 14.57 | 12.53 | 9.67 | 16.92 |
| $L_{G2}$ | 22.44 | 21.05 | 17.47 | 22.24 |
| $CRA_{obj}$ (MAX) | 4.97 | 5.01 | 5.00 | 4.01 |
| $CRA_{obj}$ (MIN) | 0.00 | 0.00 | 0.00 | 0.00 |
| $CRA_{img}$ | 18.67 | 18.43 | 22.74 | 21.84 |
| $D_{max}$ | 5.88 | 5.84 | 3.56 | 4.34 |
| $D_{G1max}$ | 0.10 | 1.38 | 0.10 | 2.78 |
| $\nu d_{max}$ | 81.61 | 81.61 | 81.61 | 81.61 |
| $\nu d_{min}$ | 23.77 | 30.30 | 33.79 | 30.30 |
| $N_{G1}$ | 5.00 | 4.00 | 4.00 | 7.00 |
| $N_{G2}$ | 5.00 | 5.00 | 6.00 | 7.00 |
| $f_{G1}$ | 12.37 | 13.75 | 17.15 | 14.57 |
| $f_{G2}$ | 13.91 | 16.65 | 35.67 | −25.41 |
| $f_{G1o}$ | 54.82 | 24.83 | 21.39 | 68.99 |
| $f_{G2i}$ | −10.13 | −12.05 | −12.01 | −13.57 |
| $f_{L1}$ | 54.82 | 24.83 | 21.39 | 24.92 |
| $f_{L2}$ | 27.79 | 27.96 | 22.33 | 34.57 |
| $f_{L3}$ | 21.01 | 11.33 | 15.76 | 15.04 |
| $f_{L4}$ | 8.55 | −6.47 | −7.77 | −10.67 |
| $f_{L5}$ | −4.58 | −17.53 | −11.67 | −9.30 |
| $f_{L6}$ | −8.88 | 38.34 | 9.71 | 18.19 |
| $f_{L7}$ | 16.30 | 14.48 | 12.02 | 25.65 |
| $f_{L8}$ | 14.63 | 48.32 | 28.79 | 145.05 |
| $f_{L9}$ | 24.09 | −12.05 | −14.54 | 13.70 |
| $f_{L10}$ | −10.13 | — | −12.01 | −19.71 |
| $f_{L11}$ | — | — | — | −13.57 |

| | Example20 | Example21 | Example22 | Example23 |
|---|---|---|---|---|
| $D_{oi}$ | 50.5 | 90.0 | 74.0 | 75.0 |
| $Y_{obj}$ | 3.7 | 3.7 | 3.7 | 3.7 |
| Y | 4.92 | 4.92 | 4.92 | 4.92 |
| $L_{TL}$ | 36.73 | 60.00 | 44.01 | 45.00 |
| $L_L$ | 34.85 | 58.09 | 42.57 | 42.76 |
| WD | 13.80 | 30.00 | 30.00 | 30.00 |
| BF | 1.88 | 1.91 | 1.44 | 2.25 |
| NA | 0.23 | 0.23 | 0.23 | 0.23 |
| β | −1.33 | −1.33 | −1.33 | −1.33 |
| f | 5.76 | 11.95 | 9.09 | 8.95 |
| $\phi_{G1o}$ | 11.62 | 18.29 | 18.37 | 18.43 |
| $\phi_s$ | 5.58 | 8.60 | 9.67 | 9.49 |
| $D_{os}$ | 27.52 | 46.38 | 45.86 | 46.52 |
| $D_{G1G2}$ | 2.33 | 2.52 | 0.72 | 0.82 |
| $L_{G1}$ | 12.55 | 14.93 | 14.92 | 15.58 |
| $L_{G2}$ | 19.96 | 40.64 | 26.93 | 26.36 |
| $CRA_{obj}$ (MAX) | 5.03 | 3.42 | 3.77 | 3.66 |
| $CRA_{obj}$ (MIN) | 0.00 | 0.00 | 0.00 | 0.00 |
| $CRA_{img}$ | 24.38 | 16.41 | 14.28 | 16.19 |
| $D_{max}$ | 5.67 | 16.81 | 5.38 | 6.22 |
| $D_{G1max}$ | 0.74 | 0.10 | 0.71 | 0.10 |
| $\nu d_{max}$ | 81.61 | 81.61 | 81.61 | 81.61 |
| $\nu d_{min}$ | 23.77 | 23.77 | 23.77 | 30.30 |
| $N_{G1}$ | 5.00 | 6.00 | 6.00 | 7.00 |
| $N_{G2}$ | 7.00 | 7.00 | 7.00 | 7.00 |
| $f_{G1}$ | 11.79 | 15.93 | 14.56 | 14.90 |
| $f_{G2}$ | 20.63 | −148.45 | −15.87 | −17.93 |
| $f_{G1o}$ | 12.16 | 27.51 | 34.51 | −433.62 |
| $f_{G2i}$ | −11.27 | −61.84 | −112.48 | −44.15 |
| $f_{L1}$ | 12.16 | 27.51 | 34.51 | −433.62 |
| $f_{L2}$ | −9.59 | −47.88 | −54.36 | 30.29 |
| $f_{L3}$ | 8.46 | 23.28 | 28.64 | −40.89 |
| $f_{L4}$ | 9.45 | 24.16 | 25.30 | 25.88 |
| $f_{L5}$ | −5.84 | 21.16 | 16.94 | 25.01 |
| $f_{L6}$ | −7.46 | −8.36 | −11.17 | 15.79 |
| $f_{L7}$ | 11.13 | −8.13 | −8.34 | −10.39 |
| $f_{L8}$ | 35.93 | 14.39 | 16.41 | −8.30 |
| $f_{L9}$ | 37.12 | 27.87 | 14.16 | 17.85 |

| | | | | |
|---|---|---|---|---|
| $f_{L10}$ | 16.62 | 46.31 | −11.47 | 13.12 |
| $f_{L11}$ | −19.11 | 23.89 | 9.84 | −11.60 |
| $f_{L12}$ | −11.27 | −13.98 | −9.96 | 9.84 |
| $f_{L13}$ | — | −61.84 | −112.48 | −12.08 |
| $f_{L14}$ | — | — | — | −44.15 |

| | Example24 | Example25 | Example26 | Example27 |
|---|---|---|---|---|
| $D_{oi}$ | 70.0 | 67.0 | 67.0 | 67.0 |
| $Y_{obj}$ | 2.2 | 1.9 | 1.9 | 1.9 |
| Y | 4.92 | 4.92 | 4.92 | 4.92 |
| $L_{TL}$ | 54.21 | 55.51 | 51.22 | 51.22 |
| $L_L$ | 51.58 | 52.41 | 49.41 | 49.09 |
| WD | 15.80 | 11.50 | 15.80 | 15.80 |
| BF | 2.63 | 3.10 | 1.81 | 2.13 |
| NA | 0.38 | 0.43 | 0.40 | 0.40 |
| β | −2.20 | −2.55 | −2.55 | −2.55 |
| f | 5.02 | 4.06 | 4.53 | 4.30 |
| $\phi_{G1o}$ | 16.68 | 14.25 | 16.84 | 16.89 |
| $\phi_s$ | 11.49 | 11.77 | 12.92 | 12.50 |
| $D_{os}$ | 32.14 | 27.52 | 31.44 | 30.95 |
| $D_{G1G2}$ | 0.96 | 1.10 | 0.36 | 0.52 |
| $L_{G1}$ | 15.55 | 15.33 | 15.63 | 15.10 |
| $L_{G2}$ | 35.06 | 35.97 | 33.42 | 33.47 |
| $CRA_{obj}$ (MAX) | 3.01 | 3.02 | 3.01 | 3.02 |
| $CRA_{obj}$ (MIN) | 0.00 | 0.00 | 0.00 | 0.00 |
| $CRA_{img}$ | 19.17 | 20.97 | 14.87 | 16.57 |
| $D_{max}$ | 8.48 | 12.20 | 11.08 | 11.58 |
| $D_{G1max}$ | 0.10 | 0.71 | 0.70 | 0.43 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 6.00 | 6.00 | 6.00 | 5.00 |
| $N_{G2}$ | 7.00 | 7.00 | 7.00 | 7.00 |
| $f_{G1}$ | 14.02 | 12.99 | 12.42 | 12.17 |
| $f_{G2}$ | 919.29 | 85.22 | −9.39 | −9.08 |
| $f_{G1o}$ | 19.51 | 15.80 | 25.17 | 28.64 |
| $f_{G2i}$ | −20.20 | −13.47 | −21.78 | −18.62 |
| $f_{L1}$ | 19.51 | 15.80 | 25.17 | 28.64 |
| $f_{L2}$ | −30.65 | −25.58 | −77.15 | 43.10 |
| $f_{L3}$ | 25.01 | 23.90 | 32.04 | 19.95 |
| $f_{L4}$ | 22.31 | 23.14 | 20.04 | 22.33 |
| $f_{L5}$ | 19.81 | 18.73 | 26.48 | −18.00 |
| $f_{L6}$ | −10.74 | −11.95 | −20.40 | −9.19 |
| $f_{L7}$ | −10.27 | −11.22 | −9.37 | 15.85 |
| $f_{L8}$ | 13.10 | 14.37 | 15.36 | 21.65 |
| $f_{L9}$ | 22.47 | 24.09 | 22.49 | −14.46 |
| $f_{L10}$ | −26.66 | −50.83 | −12.32 | 9.47 |
| $f_{L11}$ | 12.62 | 12.52 | 9.13 | −9.78 |
| $f_{L12}$ | −10.03 | −10.05 | −9.73 | −18.62 |
| $f_{L13}$ | −20.20 | −13.47 | −21.78 | — |

| | Example28 | Example29 | Example30 | Example31 |
|---|---|---|---|---|
| $D_{oi}$ | 67.0 | 67.0 | 67.0 | 60.0 |
| $Y_{obj}$ | 3.1 | 3.2 | 3.2 | 2.5 |
| Y | 4.92 | 4.92 | 4.92 | 4.92 |
| $L_{TL}$ | 50.99 | 50.97 | 50.83 | 39.12 |
| $L_L$ | 49.18 | 49.16 | 49.02 | 36.64 |
| WD | 16.02 | 16.04 | 16.18 | 20.90 |
| BF | 1.81 | 1.81 | 1.81 | 2.48 |
| NA | 0.40 | 0.31 | 0.31 | 0.20 |
| β | −1.60 | −1.56 | −1.55 | −2.00 |
| f | 5.39 | 5.41 | 5.52 | 6.48 |
| $\phi_{G1o}$ | 18.74 | 14.61 | 14.78 | 10.53 |
| $\phi_s$ | 13.40 | 10.17 | 10.06 | 6.66 |
| $D_{os}$ | 30.52 | 31.48 | 30.31 | 30.56 |
| $D_{G1G2}$ | 0.73 | 1.01 | 0.78 | 0.35 |
| $L_{G1}$ | 14.68 | 15.41 | 14.04 | 9.16 |
| $L_{G2}$ | 33.77 | 32.74 | 34.20 | 27.13 |
| $CRA_{obj}$ (MAX) | 5.01 | 4.86 | 5.01 | 4.25 |
| $CRA_{obj}$ (MIN) | 0.00 | 0.00 | 0.00 | 0.00 |
| $CRA_{img}$ | 24.98 | 24.99 | 24.99 | 13.24 |
| $D_{max}$ | 6.33 | 6.37 | 8.18 | 5.26 |
| $D_{G1max}$ | 0.44 | 0.54 | 0.64 | 0.10 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 5.00 | 5.00 | 5.00 | 5.00 |
| $N_{G2}$ | 7.00 | 7.00 | 6.00 | 7.00 |
| $f_{G1}$ | 12.63 | 12.85 | 12.89 | 11.74 |

| | | | | |
|---|---|---|---|---|
| $f_{G2}$ | −19.08 | −18.81 | −27.03 | −14.14 |
| $f_{G1o}$ | 36.71 | 36.28 | 33.71 | 46.69 |
| $f_{G2i}$ | −12.14 | −11.41 | −10.64 | 1004.70 |
| $f_{L1}$ | 36.71 | 36.28 | 33.71 | 46.69 |
| $f_{L2}$ | 40.13 | 44.47 | 57.34 | 46.74 |
| $f_{L3}$ | 21.15 | 19.96 | 18.06 | 25.46 |
| $f_{L4}$ | 24.31 | 23.47 | 20.89 | 13.56 |
| $f_{L5}$ | −22.06 | −21.47 | −17.23 | −12.34 |
| $f_{L6}$ | −9.37 | −9.35 | −9.76 | −8.13 |
| $f_{L7}$ | 13.36 | 13.37 | 13.67 | 11.38 |
| $f_{L8}$ | 34.78 | 34.82 | 33.26 | 38.36 |
| $f_{L9}$ | −104.76 | −93.84 | 16.88 | 270.72 |
| $f_{L10}$ | 15.68 | 14.70 | −15.01 | 13.62 |
| $f_{L11}$ | −14.06 | −13.63 | −10.64 | −6.90 |
| $f_{L12}$ | −12.14 | −11.41 | — | 1004.70 |

| | Example32 | Example33 | Example34 | Example35 |
|---|---|---|---|---|
| $D_{oi}$ | 70.0 | 74.0 | 62.7 | 63.0 |
| $Y_{obj}$ | 2.5 | 3.7 | 3.7 | 3.7 |
| Y | 4.92 | 4.92 | 4.92 | 4.92 |
| $L_{TL}$ | 44.98 | 44.01 | 46.52 | 46.88 |
| $L_L$ | 42.01 | 38.79 | 45.18 | 45.36 |
| WD | 25.04 | 30.00 | 16.17 | 16.07 |
| BF | 2.96 | 5.22 | 1.34 | 1.52 |
| NA | 0.23 | 0.23 | 0.23 | 0.23 |
| β | −2.00 | −1.33 | −1.33 | −1.33 |
| f | 10.51 | 10.24 | 6.71 | 6.94 |
| $\phi_{G1o}$ | 14.46 | 19.03 | 13.17 | 13.35 |
| $\phi_s$ | 8.46 | 9.19 | 5.88 | 5.84 |
| $D_{os}$ | 36.91 | 47.62 | 33.61 | 33.98 |
| $D_{G1G2}$ | 0.16 | 0.54 | 1.53 | 2.17 |
| $L_{G1}$ | 11.38 | 16.67 | 16.47 | 16.61 |
| $L_{G2}$ | 30.47 | 21.58 | 27.18 | 26.59 |
| $CRA_{obj}$ (MAX) | 3.30 | 3.22 | 3.54 | 3.17 |
| $CRA_{obj}$ (MIN) | 0.00 | 0.00 | 0.00 | 0.00 |
| $CRA_{img}$ | 12.08 | 16.48 | 25.00 | 25.00 |
| $D_{max}$ | 9.72 | 5.87 | 5.23 | 5.15 |
| $DG1_{max}$ | 0.30 | 0.10 | 0.96 | 0.92 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 5.00 | 6.00 | 6.00 | 6.00 |
| $N_{G2}$ | 6.00 | 6.00 | 7.00 | 6.00 |
| $f_{G1}$ | 12.00 | 15.66 | 11.76 | 11.71 |
| $f_{G2}$ | −16.50 | −40.91 | 416.18 | −1160.10 |
| $f_{G1o}$ | 43.72 | 41.25 | 13.37 | 13.51 |
| $f_{G2i}$ | 100.51 | −10.63 | −22.33 | −16.72 |
| $f_{L1}$ | 43.72 | 41.25 | 13.37 | 13.51 |
| $f_{L2}$ | 32.19 | −52.01 | −11.61 | −11.84 |
| $f_{L3}$ | 28.02 | 20.63 | 16.56 | 16.66 |
| $f_{L4}$ | 14.03 | 27.75 | 16.39 | 16.73 |
| $f_{L5}$ | −11.74 | 18.33 | 11.85 | 12.07 |
| $f_{L6}$ | −7.83 | −9.85 | −6.77 | −7.04 |
| $f_{L7}$ | 14.26 | −10.09 | −8.39 | −8.08 |
| $f_{L8}$ | 41.26 | 20.06 | 14.89 | 14.88 |
| $f_{L9}$ | 14.80 | 12.65 | 25.19 | 17.50 |
| $f_{L10}$ | −9.79 | −9.90 | 46.83 | 19.53 |
| $f_{L11}$ | 100.51 | 8.86 | 19.06 | −15.02 |
| $f_{L12}$ | — | −10.63 | −11.47 | −16.72 |
| $f_{L13}$ | — | — | −22.33 | — |

| | Example36 | Example37 | Example38 | Example39 |
|---|---|---|---|---|
| $D_{oi}$ | 64.1 | 65.0 | 74.6 | 65.2 |
| $Y_{obj}$ | 3.7 | 3.7 | 3.7 | 3.8 |
| Y | 4.92 | 4.92 | 4.92 | 4.92 |
| $L_{TL}$ | 47.90 | 48.69 | 53.56 | 48.01 |
| $L_L$ | 44.23 | 47.50 | 49.95 | 45.78 |
| WD | 16.16 | 16.30 | 21.00 | 17.18 |
| BF | 3.68 | 1.19 | 3.62 | 2.23 |
| NA | 0.23 | 0.23 | 0.23 | 0.23 |
| β | −1.33 | −1.33 | −1.33 | −1.30 |
| f | 8.73 | 8.25 | 9.31 | 11.64 |
| $\phi_{G1o}$ | 13.51 | 13.57 | 15.22 | 14.22 |
| $\phi_s$ | 5.94 | 5.87 | 6.90 | 6.93 |
| $D_{os}$ | 34.66 | 34.69 | 40.82 | 37.85 |
| $D_{G1G2}$ | 2.23 | 2.15 | 2.29 | 0.87 |
| $L_{G1}$ | 17.20 | 17.11 | 18.37 | 20.17 |
| $L_{G2}$ | 24.80 | 28.25 | 29.28 | 24.74 |

-continued

| | | | | |
|---|---|---|---|---|
| $CRA_{obj}$ (MAX) | 3.04 | 3.04 | 3.19 | 3.59 |
| $CRA_{obj}$ (MIN) | 0.00 | 0.00 | 0.00 | 0.00 |
| $CRA_{img}$ | 20.87 | 18.64 | 15.64 | 10.46 |
| $D_{max}$ | 5.08 | 5.21 | 4.86 | 3.62 |
| $DG1_{max}$ | 0.92 | 0.79 | 0.30 | 1.32 |
| $\nu d_{max}$ | 81.61 | 81.61 | 81.61 | 81.61 |
| $\nu d_{min}$ | 23.77 | 23.77 | 23.77 | 32.36 |
| $N_{G1}$ | 6.00 | 6.00 | 6.00 | 6.00 |
| $N_{G2}$ | 5.00 | 7.00 | 6.00 | 5.00 |
| $f_{G1}$ | 11.61 | 11.76 | 12.68 | 11.29 |
| $f_{G2}$ | 238.11 | 152.21 | −40.68 | −27.34 |
| $f_{G1o}$ | 13.83 | 13.48 | 15.35 | 30.09 |
| $f_{G2i}$ | −8.72 | 1846.69 | −9.62 | −13.42 |
| $f_{L1}$ | 13.83 | 13.48 | 15.35 | 30.09 |
| $f_{L2}$ | −11.77 | −11.53 | −13.63 | −26.10 |
| $f_{L3}$ | 17.05 | 15.57 | 17.12 | 16.79 |
| $f_{L4}$ | 16.34 | 17.36 | 17.69 | 23.91 |
| $f_{L5}$ | 12.87 | 11.81 | 16.75 | 21.98 |
| $f_{L6}$ | −7.52 | −6.86 | −8.50 | −25.35 |
| $f_{L7}$ | −7.59 | −8.30 | −7.69 | 24.96 |
| $f_{L8}$ | 15.13 | 14.58 | 18.30 | −6.92 |
| $f_{L9}$ | 16.05 | 19.96 | 36.70 | 183.01 |
| $f_{L10}$ | 21.08 | 85.87 | 26.35 | 13.30 |
| $f_{L11}$ | −8.72 | 19.60 | 19.77 | −13.42 |
| $f_{L12}$ | — | −8.10 | −9.62 | — |
| $f_{L13}$ | — | 1846.69 | — | — |

| | Example40 | Example41 | Example42 | Example43 |
|---|---|---|---|---|
| $D_{oi}$ | 64.2 | 54.5 | 54.1 | 65.0 |
| $Y_{obj}$ | 3.8 | 3.6 | 3.6 | 3.7 |
| Y | 4.92 | 4.75 | 4.75 | 4.92 |
| $L_{TL}$ | 47.64 | 43.00 | 43.00 | 49.10 |
| $L_L$ | 45.52 | 41.24 | 41.24 | 47.62 |
| WD | 16.60 | 11.49 | 11.12 | 15.90 |
| BF | 2.12 | 1.76 | 1.76 | 1.48 |
| NA | 0.23 | 0.23 | 0.23 | 0.23 |
| β | −1.30 | −1.32 | −1.32 | −1.33 |
| f | 11.19 | 5.34 | 5.31 | 7.78 |
| $\phi_{G1o}$ | 14.42 | 11.43 | 10.95 | 13.19 |
| $\phi_s$ | 6.70 | 7.60 | 7.60 | 5.86 |
| $D_{os}$ | 38.48 | 30.69 | 30.14 | 33.82 |
| $D_{G1G2}$ | 1.85 | 2.15 | 1.09 | 2.17 |
| $L_{G1}$ | 20.97 | 17.35 | 18.23 | 16.89 |
| $L_{G2}$ | 22.70 | 21.74 | 21.93 | 28.56 |
| $CRA_{obj}$ (MAX) | 3.01 | 3.44 | 3.94 | 3.44 |
| $CRA_{obj}$ (MIN) | 0.00 | 0.00 | 0.00 | 0.00 |
| $CRA_{img}$ | 10.83 | 31.50 | 31.28 | 25.01 |
| $D_{max}$ | 3.03 | 5.48 | 5.63 | 5.19 |
| $D_{G1max}$ | 1.32 | 5.37 | 5.63 | 0.79 |
| $\nu d_{max}$ | 81.61 | 81.61 | 81.61 | 81.61 |
| $\nu d_{min}$ | 34.71 | 23.78 | 23.78 | 23.77 |
| $N_{G1}$ | 6.00 | 6.00 | 6.00 | 6.00 |
| $N_{G2}$ | 5.00 | 7.00 | 8.00 | 6.00 |
| $f_{G1}$ | 12.35 | 16.76 | 15.57 | 11.28 |
| $f_{G2}$ | −163.05 | 16.34 | 50.69 | −144.12 |
| $f_{G1o}$ | 17.51 | −95.25 | 15.42 | 13.55 |
| $f_{G2i}$ | −14.09 | −8.02 | −8.02 | −17.68 |
| $f_{L1}$ | 17.51 | −95.25 | 15.42 | 13.55 |
| $f_{L2}$ | −15.40 | 15.53 | −95.25 | −12.00 |
| $f_{L3}$ | 18.06 | −10.25 | −10.36 | 16.82 |
| $f_{L4}$ | 30.22 | 9.23 | 9.23 | 17.00 |
| $f_{L5}$ | 14.86 | 10.02 | 10.82 | 12.05 |
| $f_{L6}$ | −12.27 | −8.45 | −10.39 | −7.41 |
| $f_{L7}$ | 13.83 | −19.97 | −13.77 | −7.57 |
| $f_{L8}$ | −7.40 | 15.92 | 18.92 | 14.99 |
| $f_{L9}$ | −763.86 | 31.04 | 46.98 | 16.82 |
| $f_{L10}$ | 13.22 | 10.32 | 60.83 | 23.13 |
| $f_{L11}$ | −14.09 | −12.97 | 9.60 | −16.89 |
| $f_{L12}$ | — | 1200.49 | −13.50 | −17.68 |
| $f_{L13}$ | — | −8.02 | 247.70 | — |
| $f_{L14}$ | — | — | −8.02 | — |

| | Example44 | Example45 | Example46 | Example47 |
|---|---|---|---|---|
| $D_{oi}$ | 65.0 | 65.0 | 65.0 | 65.0 |
| $Y_{obj}$ | 3.7 | 3.7 | 3.7 | 3.7 |
| Y | 4.92 | 4.92 | 4.92 | 4.92 |
| $L_{TL}$ | 49.15 | 49.18 | 49.18 | 49.20 |
| $L_L$ | 47.27 | 47.29 | 47.30 | 47.32 |
| WD | 15.85 | 15.83 | 15.82 | 15.80 |
| BF | 1.88 | 1.88 | 1.88 | 1.88 |
| NA | 0.23 | 0.23 | 0.20 | 0.23 |
| β | −1.33 | −1.33 | −1.33 | −1.33 |
| f | 7.87 | 7.55 | 7.55 | 8.00 |
| $\phi_{G1o}$ | 12.90 | 12.18 | 11.08 | 13.30 |
| $\phi_s$ | 5.98 | 6.43 | 5.65 | 6.02 |
| $D_{os}$ | 33.07 | 31.52 | 30.90 | 34.46 |
| $D_{G1G2}$ | 1.91 | 2.11 | 1.98 | 4.00 |
| $L_{G1}$ | 16.14 | 14.43 | 13.84 | 16.69 |
| $L_{G2}$ | 29.23 | 30.75 | 31.48 | 26.63 |
| $CRA_{obj}$ (MAX) | 3.85 | 4.92 | 5.03 | 3.03 |
| $CRA_{obj}$ (MIN) | 0.00 | 0.00 | 0.00 | 0.00 |
| $CRA_{img}$ | 25.01 | 25.01 | 25.01 | 24.94 |
| $D_{max}$ | 9.60 | 14.60 | 15.60 | 4.94 |
| $D_{G1max}$ | 0.72 | 0.57 | 0.95 | 0.51 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 6.00 | 6.00 | 6.00 | 6.00 |
| $N_{G2}$ | 6.00 | 6.00 | 6.00 | 6.00 |
| $f_{G1}$ | 11.80 | 13.57 | 14.24 | 11.71 |
| $f_{G2}$ | 91.51 | 24.06 | 18.81 | −451.46 |
| $f_{G1o}$ | 13.54 | 14.77 | 14.79 | 14.48 |
| $f_{G2i}$ | −18.99 | −12.64 | −12.42 | −15.93 |
| $f_{L1}$ | 13.54 | 14.77 | 14.79 | 14.48 |
| $f_{L2}$ | −13.28 | −17.01 | −17.43 | −12.43 |
| $f_{L3}$ | 16.99 | 23.54 | 22.87 | 16.62 |
| $f_{L4}$ | 18.92 | 19.07 | 19.69 | 18.07 |
| $f_{L5}$ | 12.23 | 14.42 | 14.57 | 15.43 |
| $f_{L6}$ | −6.91 | −7.15 | −6.88 | −8.97 |
| $f_{L7}$ | −8.30 | −11.29 | −12.11 | −7.82 |
| $f_{L8}$ | 25.05 | 44.46 | 44.73 | 14.98 |
| $f_{L9}$ | 13.37 | 12.12 | 12.07 | 15.98 |
| $f_{L10}$ | 21.39 | 21.40 | 21.25 | 25.19 |
| $f_{L11}$ | −17.93 | −31.10 | −31.18 | −19.41 |
| $f_{L12}$ | −18.99 | −12.64 | −12.42 | −15.93 |

| | Example48 | Example49 | Example50 | Example51 |
|---|---|---|---|---|
| $D_{oi}$ | 65.0 | 65.0 | 88.4 | 86.6 |
| $Y_{obj}$ | 3.7 | 3.7 | 3.5 | 3.7 |
| Y | 4.92 | 4.92 | 4.92 | 4.92 |
| $L_{TL}$ | 49.00 | 48.98 | 56.76 | 55.68 |
| $L_L$ | 47.12 | 47.09 | 46.38 | 44.80 |
| WD | 16.00 | 16.02 | 31.64 | 30.90 |
| BF | 1.88 | 1.89 | 10.38 | 10.88 |
| NA | 0.20 | 0.20 | 0.17 | 0.20 |
| β | −1.33 | −1.33 | −1.40 | −1.33 |
| f | 7.74 | 7.45 | 14.81 | 14.41 |
| $\phi_{G1o}$ | 12.20 | 12.20 | 14.75 | 17.05 |
| $\phi_s$ | 5.88 | 6.58 | 7.84 | 9.19 |
| $D_{os}$ | 35.51 | 36.89 | 53.84 | 54.48 |
| $D_{G1G2}$ | 8.50 | 11.00 | 1.06 | 1.10 |
| $L_{G1}$ | 15.31 | 15.45 | 21.29 | 22.38 |
| $L_{G2}$ | 23.30 | 20.64 | 24.03 | 21.32 |
| $CRA_{obj}$ (MAX) | 3.02 | 3.01 | 3.01 | 3.01 |
| $CRA_{obj}$ (MIN) | 0.00 | 0.00 | 0.00 | 0.00 |
| $CRA_{img}$ | 24.98 | 24.96 | 10.94 | 11.81 |
| $D_{max}$ | 8.50 | 11.00 | 7.57 | 4.33 |
| $D_{G1max}$ | 0.36 | 0.67 | 2.79 | 2.58 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 6.00 | 6.00 | 6.00 | 6.00 |
| $N_{G2}$ | 6.00 | 6.00 | 6.00 | 6.00 |
| $f_{G1}$ | 13.24 | 15.01 | 16.44 | 17.09 |
| $f_{G2}$ | −4737.68 | 153.91 | −32.88 | −46.90 |
| $f_{G1o}$ | 17.84 | 19.51 | 26.68 | 28.65 |
| $f_{G2i}$ | −18.73 | −18.39 | −11.47 | −11.38 |
| $f_{L1}$ | 17.84 | 19.51 | 26.68 | 28.65 |
| $f_{L2}$ | −13.04 | −12.13 | −18.02 | −18.66 |
| $f_{L3}$ | 18.46 | 18.52 | 20.01 | 20.10 |
| $f_{L4}$ | 17.54 | 16.97 | 22.79 | 22.92 |
| $f_{L5}$ | 30.17 | 63.84 | 22.94 | 22.12 |
| $f_{L6}$ | −15.22 | −23.74 | −12.18 | −11.48 |
| $f_{L7}$ | −10.47 | −13.12 | −10.31 | −10.82 |
| $f_{L8}$ | 20.62 | 25.33 | 37.48 | 33.16 |
| $f_{L9}$ | 15.14 | 15.13 | 10.62 | 10.85 |
| $f_{L10}$ | 31.20 | 29.27 | −11.87 | −10.97 |

-continued

| | | | | |
|---|---|---|---|---|
| $f_{L11}$ | −16.22 | −15.24 | 11.28 | 10.23 |
| $f_{L12}$ | −18.73 | −18.39 | −11.47 | −11.38 |

| | Example52 | Example53 | Example54 | Example55 |
|---|---|---|---|---|
| $D_{oi}$ | 90.0 | 87.0 | 90.0 | 78.8 |
| $Y_{obj}$ | 3.5 | 3.5 | 3.5 | 4.5 |
| Y | 4.92 | 4.92 | 4.92 | 4.92 |
| $L_{TL}$ | 58.18 | 55.96 | 58.18 | 44.95 |
| $L_L$ | 45.80 | 42.08 | 45.80 | 42.11 |
| WD | 31.82 | 31.04 | 31.82 | 33.80 |
| BF | 12.38 | 13.88 | 12.38 | 2.85 |
| NA | 0.17 | 0.17 | 0.17 | 0.23 |
| β | −1.40 | −1.40 | −1.40 | −1.10 |
| f | 15.30 | 15.97 | 15.30 | 12.36 |
| $\phi_{G1o}$ | 14.80 | 14.13 | 14.80 | 22.36 |
| $\phi_s$ | 8.07 | 8.06 | 8.07 | 9.00 |
| $D_{os}$ | 54.96 | 51.40 | 54.96 | 53.58 |
| $D_{G1G2}$ | 1.00 | 0.95 | 1.00 | 1.13 |
| $L_{G1}$ | 22.24 | 19.48 | 22.24 | 18.25 |
| $L_{G2}$ | 22.57 | 21.65 | 22.57 | 22.73 |
| $CRA_{obj}$ (MAX) | 3.01 | 3.42 | 3.01 | 3.01 |
| $CRA_{obj}$ (MIN) | 0.00 | 0.00 | 0.00 | 0.00 |
| $CRA_{img}$ | 10.57 | 9.64 | 10.57 | 16.01 |
| $D_{max}$ | 6.35 | 6.45 | 6.35 | 2.81 |
| $D_{G1max}$ | 2.65 | 2.30 | 2.65 | 0.30 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 6.00 | 6.00 | 6.00 | 5.00 |
| $N_{G2}$ | 6.00 | 6.00 | 6.00 | 7.00 |
| $f_{G1}$ | 16.59 | 15.95 | 16.59 | 14.96 |
| $f_{G2}$ | −32.02 | −37.38 | −32.02 | −35.27 |
| $f_{G1o}$ | 26.47 | 25.52 | 26.47 | 154.11 |
| $f_{G2i}$ | −11.85 | −13.78 | −11.85 | −13.99 |
| $f_{L1}$ | 26.47 | 25.52 | 26.47 | 154.11 |
| $f_{L2}$ | −17.67 | −17.71 | −17.67 | 30.29 |
| $f_{L3}$ | 20.13 | 21.91 | 20.13 | 41.05 |
| $f_{L4}$ | 22.35 | 20.68 | 22.35 | 13.24 |
| $f_{L5}$ | 22.74 | 21.08 | 22.74 | −9.43 |
| $f_{L6}$ | −12.18 | −11.88 | −12.18 | −10.58 |
| $f_{L7}$ | −10.12 | −9.91 | −10.12 | 27.16 |
| $f_{L8}$ | 38.42 | 37.46 | 38.42 | 10.93 |
| $f_{L9}$ | 10.60 | 10.57 | 10.60 | −10.48 |
| $f_{L10}$ | −11.69 | −12.74 | −11.69 | 9.62 |
| $f_{L11}$ | 11.21 | 12.21 | 11.21 | 459.63 |
| $f_{L12}$ | −11.85 | −13.78 | −11.85 | −13.99 |

| | Example56 | Example57 | Example58 | Example59 |
|---|---|---|---|---|
| $D_{oi}$ | 69.8 | 70.0 | 84.0 | 85.0 |
| $Y_{obj}$ | 3.1 | 3.1 | 3.7 | 3.7 |
| Y | 4.92 | 4.92 | 4.92 | 4.92 |
| $L_{TL}$ | 45.08 | 46.29 | 54.27 | 55.20 |
| $L_L$ | 43.19 | 42.91 | 50.28 | 51.33 |
| WD | 24.76 | 23.71 | 29.74 | 29.80 |
| BF | 1.89 | 3.38 | 3.99 | 3.87 |
| NA | 0.20 | 0.20 | 0.23 | 0.23 |
| β | −1.56 | −1.60 | −1.33 | −1.33 |
| f | 7.72 | 8.33 | 9.33 | 10.42 |
| $\phi_{G1o}$ | 13.97 | 12.57 | 19.32 | 18.99 |
| $\phi_s$ | 7.44 | 8.16 | 9.84 | 9.81 |
| $D_{os}$ | 40.08 | 35.89 | 49.92 | 49.35 |
| $D_{G1G2}$ | 1.56 | 0.43 | 2.56 | 1.59 |
| $L_{G1}$ | 14.06 | 11.71 | 18.40 | 18.52 |
| $L_{G2}$ | 27.56 | 30.78 | 29.32 | 31.22 |
| $CRA_{obj}$ (MAX) | 3.14 | 4.34 | 2.81 | 3.15 |
| $CRA_{obj}$ (MIN) | 0.00 | 0.00 | 0.00 | 0.00 |
| $CRA_{img}$ | 20.33 | 18.96 | 18.64 | 17.68 |
| $D_{max}$ | 7.48 | 8.00 | 8.10 | 7.34 |
| $D_{G1max}$ | 0.75 | 1.16 | 1.33 | 0.30 |
| $\nu d_{max}$ | 81.61 | 81.61 | 81.61 | 81.61 |
| $\nu d_{min}$ | 30.30 | 23.77 | 23.77 | 23.77 |
| $N_{G1}$ | 7.00 | 7.00 | 6.00 | 6.00 |
| $N_{G2}$ | 7.00 | 6.00 | 8.00 | 8.00 |
| $f_{G1}$ | 12.26 | 12.68 | 17.28 | 15.88 |
| $f_{G2}$ | −10.13 | −16.59 | −44.18 | −27.06 |
| $f_{G1o}$ | 75.80 | 39.79 | 30.99 | 31.29 |
| $f_{G2i}$ | −26.89 | −92.10 | −10.89 | −9.44 |
| $f_{L1}$ | 21.02 | 39.79 | 30.99 | 31.29 |
| $f_{L2}$ | 62.82 | 20.87 | −33.07 | −30.71 |
| $f_{L3}$ | 15.66 | 13.01 | 20.09 | 19.65 |
| $f_{L4}$ | −16.51 | −13.25 | 32.66 | 29.48 |
| $f_{L5}$ | −7.43 | −9.05 | 20.45 | 19.15 |
| $f_{L6}$ | 18.11 | 17.01 | −10.48 | −11.24 |
| $f_{L7}$ | 25.89 | 27.28 | −10.19 | −8.32 |
| $f_{L8}$ | −396.91 | 15.71 | 17.32 | 12.55 |
| $f_{L9}$ | 14.48 | −9.54 | 19.42 | −44.70 |
| $f_{L10}$ | −14.11 | −92.10 | −19.26 | 13.63 |
| $f_{L11}$ | −26.89 | | −10.89 | −9.44 |

| | Example60 | Example61 | Example62 | Example63 |
|---|---|---|---|---|
| $D_{oi}$ | 85.0 | 88.4 | 88.6 | 60.2 |
| $Y_{obj}$ | 3.7 | 2.2 | 2.2 | 1.3 |
| Y | 4.92 | 7.93 | 7.93 | 4.75 |
| $L_{TL}$ | 55.20 | 86.88 | 86.93 | 59.29 |
| $L_L$ | 51.67 | 74.30 | 74.81 | 53.77 |
| WD | 29.80 | 1.54 | 1.64 | 0.88 |
| BF | 3.54 | 12.58 | 12.12 | 5.52 |
| NA | 0.23 | 0.60 | 0.60 | 0.60 |
| β | −1.33 | −3.57 | −3.56 | −3.56 |
| f | 10.62 | 8.96 | 8.92 | 4.98 |
| $\phi_{G1o}$ | 18.57 | 5.78 | 5.87 | 3.52 |
| $\phi_s$ | 10.87 | 11.87 | 11.92 | 7.54 |
| $D_{os}$ | 48.94 | 27.31 | 27.45 | 17.61 |
| $D_{G1G2}$ | 1.25 | 2.47 | 2.34 | 1.38 |
| $L_{G1}$ | 17.64 | 24.13 | 24.30 | 15.92 |
| $L_{G2}$ | 32.78 | 47.70 | 48.17 | 36.46 |
| $CRA_{obj}$ (MAX) | 3.28 | 4.92 | 4.96 | 4.69 |
| $CRA_{obj}$ (MIN) | 0.00 | 0.00 | 0.00 | 0.00 |
| $CRA_{img}$ | 16.87 | 11.98 | 12.41 | 14.58 |
| $D_{max}$ | 8.57 | 9.46 | 9.47 | 13.98 |
| $D_{G1max}$ | 0.30 | 0.08 | 0.07 | 0.05 |
| $\nu d_{max}$ | 81.61 | 81.61 | 81.61 | 81.61 |
| $\nu d_{min}$ | 23.77 | 23.88 | 23.88 | 23.88 |
| $N_{G1}$ | 8.00 | 6.00 | 6.00 | 5.00 |
| $N_{G2}$ | 6.00 | 7.00 | 7.00 | 6.00 |
| $f_{G1}$ | 18.97 | 10.24 | 10.30 | 6.64 |
| $f_{G2}$ | 364.23 | 18.57 | 18.54 | 11.47 |
| $f_{G1o}$ | 32.31 | −22.52 | −22.27 | −25.76 |
| $f_{G2i}$ | −11.62 | −34.87 | −34.37 | −17.38 |
| $f_{L1}$ | 32.31 | −22.52 | −22.27 | −25.76 |
| $f_{L2}$ | −41.97 | 14.55 | 14.55 | 11.65 |
| $f_{L3}$ | 19.06 | −58.25 | −58.50 | 10.78 |
| $f_{L4}$ | 20.24 | 14.89 | 14.91 | 10.05 |
| $f_{L5}$ | −12.81 | 12.86 | 12.99 | −5.69 |
| $f_{L6}$ | −13.01 | −8.25 | −8.28 | −7.62 |
| $f_{L7}$ | 16.75 | −14.37 | −14.41 | 10.65 |
| $f_{L8}$ | 21.90 | 17.69 | 17.68 | 12.13 |
| $f_{L9}$ | −24.06 | 17.56 | 17.51 | 17.05 |
| $f_{L10}$ | 15.59 | −153.28 | −146.40 | −55.91 |
| $f_{L11}$ | −11.62 | 26.23 | 26.02 | −17.38 |
| $f_{L12}$ | — | −70.61 | −71.96 | — |
| $f_{L13}$ | — | −34.87 | −34.37 | — |

| | Example64 | Example65 | Example66 | Example67 |
|---|---|---|---|---|
| $D_{oi}$ | 68.2 | 64.9 | 63.7 | 121.9 |
| $Y_{obj}$ | 1.5 | 1.5 | 1.5 | 3.0 |
| Y | 5.50 | 5.50 | 5.23 | 10.82 |
| $L_{TL}$ | 67.34 | 63.81 | 62.20 | 119.67 |
| $L_L$ | 61.51 | 55.39 | 54.53 | 102.94 |
| WD | 0.88 | 1.13 | 1.49 | 2.27 |
| BF | 5.83 | 8.43 | 7.67 | 16.73 |
| NA | 0.60 | 0.60 | 0.60 | 0.60 |
| β | −3.56 | −3.56 | −3.56 | −3.55 |
| f | 5.34 | 6.16 | 5.82 | 12.29 |
| $\phi_{G1o}$ | 3.94 | 4.11 | 4.39 | 8.06 |
| $\phi_s$ | 8.63 | 8.68 | 8.89 | 16.50 |
| $D_{os}$ | 19.86 | 20.47 | 19.69 | 37.57 |
| $D_{G1G2}$ | 1.62 | 1.96 | 1.60 | 3.57 |
| $L_{G1}$ | 18.02 | 18.09 | 17.27 | 32.88 |
| $L_{G2}$ | 41.87 | 35.34 | 35.65 | 66.49 |
| $CRA_{obj}$ (MAX) | 4.85 | 4.12 | 4.69 | 4.96 |
| $CRA_{obj}$ (MIN) | 0.00 | 0.00 | 0.00 | 0.00 |
| $CRA_{img}$ | 15.70 | 13.05 | 13.18 | 12.17 |
| $D_{max}$ | 15.89 | 6.97 | 7.09 | 12.95 |
| $D_{G1max}$ | 0.06 | 0.05 | 0.05 | 0.09 |

-continued

| | | | | |
|---|---|---|---|---|
| $\nu d_{max}$ | 81.61 | 81.61 | 81.61 | 81.61 |
| $\nu d_{min}$ | 23.88 | 23.88 | 23.88 | 23.88 |
| $N_{G1}$ | 5.00 | 6.00 | 6.00 | 6.00 |
| $N_{G2}$ | 6.00 | 7.00 | 7.00 | 7.00 |
| $f_{G1}$ | 7.65 | 7.39 | 7.62 | 14.27 |
| $f_{G2}$ | 12.69 | 13.38 | 13.36 | 25.41 |
| $f_{G1o}$ | −34.83 | −16.54 | −17.90 | −30.20 |
| $f_{G2i}$ | −18.76 | −26.31 | −25.11 | −46.52 |
| $f_{L1}$ | −34.83 | −16.54 | −17.90 | −30.20 |
| $f_{L2}$ | 13.39 | 10.73 | 10.83 | 19.97 |
| $f_{L3}$ | 12.27 | −43.67 | −43.01 | −80.66 |
| $f_{L4}$ | 12.09 | 10.87 | 10.77 | 20.38 |
| $f_{L5}$ | −6.63 | 9.43 | 9.67 | 17.89 |
| $f_{L6}$ | −8.89 | −6.05 | −6.14 | −11.39 |
| $f_{L7}$ | 12.18 | −10.63 | −10.73 | −19.62 |
| $f_{L8}$ | 14.00 | 13.45 | 13.32 | 24.00 |
| $f_{L9}$ | 19.50 | 12.93 | 13.02 | 24.17 |
| $f_{L10}$ | −65.98 | −146.69 | −94.00 | −241.88 |
| $f_{L11}$ | −18.76 | 21.08 | 20.56 | 36.44 |
| $f_{L12}$ | — | −47.76 | −50.37 | −101.22 |
| $f_{L13}$ | — | −26.31 | −25.11 | −46.52 |

| | Example68 | Example69 | Example70 | Example71 |
|---|---|---|---|---|
| $D_{oi}$ | 198.0 | 89.0 | 96.5 | 94.7 |
| $Y_{obj}$ | 5.9 | 3.1 | 3.1 | 3.1 |
| Y | 20.78 | 10.82 | 11.04 | 11.04 |
| $L_{TL}$ | 196.27 | 87.54 | 95.13 | 93.23 |
| $L_L$ | 192.17 | 84.29 | 91.83 | 89.95 |
| WD | 1.76 | 1.43 | 1.35 | 1.42 |
| BF | 4.10 | 3.25 | 3.30 | 3.29 |
| NA | 0.60 | 0.59 | 0.62 | 0.60 |
| β | −3.51 | −3.51 | −3.55 | −3.53 |
| f | 7.51 | 3.49 | 3.98 | 3.86 |
| $\phi_{G1o}$ | 13.42 | 7.46 | 7.64 | 7.59 |
| $\phi_s$ | 30.89 | 13.92 | 15.10 | 14.83 |
| $D_{os}$ | 67.45 | 30.28 | 29.05 | 30.50 |
| $D_{G1G2}$ | 1.97 | 1.21 | 0.67 | 0.31 |
| $L_{G1}$ | 62.16 | 26.55 | 27.04 | 27.74 |
| $L_{G2}$ | 128.04 | 56.54 | 64.12 | 61.90 |
| $CRA_{obj}$ (MAX) | 4.70 | 4.94 | 4.99 | 5.01 |
| $CRA_{obj}$ (MIN) | 0.00 | 0.00 | 0.00 | 0.00 |
| $CRA_{img}$ | 24.79 | 25.00 | 20.83 | 22.04 |
| $D_{max}$ | 16.44 | 9.47 | 10.91 | 10.39 |
| $D_{G1max}$ | 0.98 | 0.50 | 1.05 | 1.92 |
| $\nu d_{max}$ | 81.61 | 81.61 | 81.61 | 81.61 |
| $\nu d_{min}$ | 23.78 | 23.78 | 23.78 | 23.78 |
| $N_{G1}$ | 8.00 | 8.00 | 8.00 | 7.00 |
| $N_{G2}$ | 9.00 | 9.00 | 8.00 | 8.00 |
| $f_{G1}$ | 26.67 | 12.77 | 13.05 | 13.53 |
| $f_{G2}$ | 23.91 | 8.21 | 7.57 | 7.50 |
| $f_{G1o}$ | −23.95 | −13.88 | −23.63 | −18.12 |
| $f_{G2i}$ | −25.80 | −9.16 | −12.56 | −11.98 |
| $f_{L1}$ | −23.95 | −13.88 | −23.63 | −18.12 |
| $f_{L2}$ | 47.51 | 26.64 | 49.63 | 31.61 |
| $f_{L3}$ | 34.71 | 17.87 | 16.80 | 14.76 |
| $f_{L4}$ | 92.60 | 49.61 | 50.11 | 19.71 |
| $f_{L5}$ | 40.59 | 19.99 | 21.35 | −17.88 |
| $f_{L6}$ | −37.87 | −20.18 | −17.12 | 15.83 |
| $f_{L7}$ | 35.01 | 17.32 | 15.68 | −13.95 |
| $f_{L8}$ | −40.29 | −14.74 | −13.72 | 24.32 |
| $f_{L9}$ | 95.43 | 32.60 | 29.49 | 36.34 |
| $f_{L10}$ | 63.05 | 27.51 | 30.46 | −15.11 |
| $f_{L11}$ | −34.09 | −12.99 | −15.53 | 33.42 |
| $f_{L12}$ | 69.13 | 30.92 | 33.80 | 80.48 |
| $f_{L13}$ | 193.42 | 64.33 | 78.99 | 20.12 |
| $f_{L14}$ | 40.14 | 18.45 | 20.19 | −14.40 |
| $f_{L15}$ | −26.47 | −12.40 | −13.04 | −11.98 |
| $f_{L16}$ | −699.77 | 33.28 | −12.56 | — |
| $f_{L17}$ | −25.80 | −9.16 | — | — |

| | Example72 | Example73 | Example74 | Example75 |
|---|---|---|---|---|
| $D_{oi}$ | 317.8 | 96.3 | 186.7 | 78.1 |
| $Y_{obj}$ | 2.2 | 2.1 | 16.3 | 8.1 |
| Y | 7.93 | 7.39 | 21.63 | 10.82 |
| $L_{TL}$ | 316.63 | 94.97 | 175.11 | 71.96 |
| $L_L$ | 297.86 | 91.60 | 163.31 | 69.74 |
| WD | 1.15 | 1.28 | 11.55 | 6.14 |
| BF | 18.77 | 3.37 | 11.80 | 2.22 |
| NA | 0.81 | 0.80 | 0.23 | 0.23 |
| β | −3.56 | −3.54 | −1.33 | −1.33 |
| f | 23.68 | 3.60 | 23.92 | 8.65 |
| $\phi_{G1o}$ | 7.14 | 6.93 | 35.10 | 19.15 |
| $\phi_s$ | 50.87 | 20.59 | 25.14 | 10.01 |
| $D_{os}$ | 83.01 | 30.70 | 86.05 | 32.23 |
| $D_{G1G2}$ | 7.41 | 0.05 | 15.12 | 5.76 |
| $L_{G1}$ | 78.98 | 29.36 | 60.91 | 21.13 |
| $L_{G2}$ | 211.47 | 62.19 | 87.29 | 42.85 |
| $CRA_{obj}$ (MAX) | 1.62 | 2.41 | 5.17 | 4.99 |
| $CRA_{obj}$ (MIN) | 0.00 | 0.00 | 0.00 | −3.49 |
| $CRA_{img}$ | 5.18 | 23.15 | 24.74 | 24.88 |
| $D_{max}$ | 65.37 | 10.44 | 28.34 | 12.91 |
| $D_{G1max}$ | 1.28 | 0.15 | 11.12 | 2.65 |
| $\nu d_{max}$ | 81.61 | 81.61 | 81.61 | 81.61 |
| $\nu d_{min}$ | 23.88 | 23.78 | 23.77 | 23.77 |
| $N_{G1}$ | 5.00 | 10.00 | 6.00 | 5.00 |
| $N_{G2}$ | 7.00 | 9.00 | 8.00 | 8.00 |
| $f_{G1}$ | 30.45 | 12.38 | 94.37 | 52.27 |
| $f_{G2}$ | 60.53 | 11.21 | 20.77 | 6.68 |
| $f_{G1o}$ | −356.83 | −63.28 | −54.58 | −34.14 |
| $f_{G2}$i | −23.54 | −9.39 | −42.31 | −21.94 |
| $f_{L1}$ | −356.83 | −63.28 | −54.58 | −34.14 |
| $f_{L2}$ | 56.88 | 69.53 | 37.85 | 24.01 |
| $f_{L3}$ | 51.20 | 36.72 | −95.51 | 22.73 |
| $f_{L4}$ | 67.75 | 25.98 | 39.47 | 33.81 |
| $f_{L5}$ | −35.65 | 44.35 | 44.87 | −10.90 |
| $f_{L6}$ | −47.30 | −101.97 | −19.47 | −18.96 |
| $f_{L7}$ | 62.19 | 32.96 | −38.56 | 17.44 |
| $f_{L8}$ | 64.81 | −25.57 | 43.51 | 24.71 |
| $f_{L9}$ | −115.85 | 22.34 | 64.36 | 29.65 |
| $f_{L10}$ | 251.10 | −22.63 | 67.19 | −29.20 |
| $f_{L11}$ | 51.88 | 64.58 | −95.92 | 29.95 |
| $f_{L12}$ | −23.54 | 29.63 | 62.16 | −27.20 |
| $f_{L13}$ | — | −16.59 | −143.67 | −21.94 |
| $f_{L14}$ | — | 36.16 | −42.31 | — |
| $f_{L15}$ | — | 83.99 | — | — |
| $f_{L16}$ | — | 21.08 | — | — |
| $f_{L17}$ | — | −12.32 | — | — |
| $f_{L18}$ | — | 26.62 | — | — |
| $f_{L19}$ | — | −9.39 | — | — |

| | Example76 | Example77 | Example78 | Example79 |
|---|---|---|---|---|
| $D_{oi}$ | 60.0 | 42.3 | 38.9 | 70.0 |
| $Y_{obj}$ | 5.6 | 4.0 | 3.6 | 2.2 |
| Y | 7.46 | 5.33 | 4.75 | 4.92 |
| $L_{TL}$ | 55.44 | 39.54 | 36.46 | 54.21 |
| $L_L$ | 50.94 | 36.43 | 33.86 | 51.58 |
| WD | 4.57 | 2.77 | 2.40 | 15.80 |
| BF | 4.49 | 3.11 | 2.60 | 2.63 |
| NA | 0.23 | 0.22 | 0.23 | 0.38 |
| β | −1.34 | −1.34 | −1.33 | −2.20 |
| f | 7.83 | 5.46 | 4.88 | 5.02 |
| $\phi_{G1o}$ | 12.21 | 8.66 | 7.73 | 16.73 |
| $\phi_s$ | 7.44 | 5.16 | 4.66 | 11.57 |
| $D_{os}$ | 26.76 | 19.94 | 18.00 | 32.14 |
| $D_{G1G2}$ | 3.57 | 3.42 | 2.99 | 0.96 |
| $L_{G1}$ | 18.92 | 13.99 | 12.86 | 15.55 |
| $L_{G2}$ | 28.45 | 19.01 | 18.02 | 35.06 |
| $CRA_{obj}$ (MAX) | 5.18 | 5.25 | 5.38 | 3.01 |
| $CRA_{obj}$ (MIN) | 0.00 | 0.00 | 0.00 | 0.00 |
| $CRA_{img}$ | 24.82 | 25.37 | 25.13 | 19.17 |
| $D_{max}$ | 11.11 | 5.30 | 4.58 | 8.48 |
| $D_{G1max}$ | 2.70 | 1.82 | 1.35 | 0.10 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 6.00 | 6.00 | 6.00 | 6.00 |
| $N_{G2}$ | 8.00 | 8.00 | 8.00 | 7.00 |
| $f_{G1}$ | 32.52 | 18.20 | 16.26 | 14.02 |
| $f_{G2}$ | 6.32 | 5.06 | 4.49 | 919.29 |
| $f_{G1o}$ | −24.61 | −15.40 | −13.03 | 19.51 |
| $f_{G2i}$ | −11.70 | −7.84 | −7.67 | −20.20 |
| $f_{L1}$ | −24.61 | −15.40 | −13.03 | 19.51 |
| $f_{L2}$ | 12.51 | 9.81 | 8.36 | −30.65 |
| $f_{L3}$ | −19.58 | −25.65 | −22.64 | 25.01 |
| $f_{L4}$ | 12.10 | 9.20 | 8.32 | 22.31 |
| $f_{L5}$ | 13.24 | 11.21 | 9.76 | 19.81 |

-continued

| | | | | |
|---|---|---|---|---|
| $f_{L6}$ | −6.06 | −4.96 | −4.28 | −10.74 |
| $f_{L7}$ | −11.85 | −10.26 | −8.65 | −10.27 |
| $f_{L8}$ | 13.37 | 10.27 | 9.03 | 13.10 |
| $f_{L9}$ | 20.64 | 16.03 | 14.04 | 22.47 |
| $f_{L10}$ | 21.90 | 16.67 | 14.68 | −26.66 |
| $f_{L11}$ | −29.72 | −24.27 | −20.66 | 12.62 |
| $f_{L12}$ | 20.98 | 15.70 | 13.61 | −10.03 |
| $f_{L13}$ | −122.15 | −46.89 | −27.17 | −20.20 |
| $f_{L14}$ | −11.70 | −7.84 | −7.67 | — |

| | Example80 | Example81 | Example82 | Example83 |
|---|---|---|---|---|
| $D_{oi}$ | 42.0 | 42.0 | 42.0 | 95.0 |
| $Y_{obj}$ | 1.9 | 1.9 | 1.9 | 8.2 |
| Y | 3.87 | 3.87 | 3.87 | 10.82 |
| $L_{TL}$ | 39.50 | 39.51 | 39.51 | 88.69 |
| $L_L$ | 37.80 | 36.70 | 36.70 | 86.69 |
| WD | 2.50 | 2.50 | 2.50 | 6.33 |
| BF | 1.70 | 2.81 | 2.81 | 2.00 |
| NA | 0.32 | 0.32 | 0.32 | 0.33 |
| β | −2.00 | −2.00 | −2.00 | −1.32 |
| f | 3.72 | 4.27 | 4.22 | 9.91 |
| $\phi_{G1o}$ | 4.74 | 4.79 | 4.79 | 17.51 |
| $\phi_s$ | 4.35 | 4.32 | 4.41 | 16.65 |
| $D_{os}$ | 16.30 | 16.95 | 16.10 | 46.23 |
| $D_{G1G2}$ | 2.34 | 2.31 | 2.42 | 7.49 |
| $L_{G1}$ | 12.41 | 13.22 | 12.19 | 33.79 |
| $L_{G2}$ | 23.05 | 21.17 | 22.09 | 45.40 |
| $CRA_{obj}$ (MAX) | 5.09 | 5.06 | 5.07 | 5.49 |
| $CRA_{obj}$ (MIN) | 0.00 | 0.00 | 0.00 | 0.00 |
| $CRA_{img}$ | 21.91 | 21.91 | 21.76 | 25.15 |
| $D_{max}$ | 4.64 | 4.93 | 5.73 | 19.80 |
| $D_{G1max}$ | 0.46 | 0.45 | 0.28 | 6.49 |
| $\nu d_{max}$ | 81.61 | 81.61 | 81.61 | 81.61 |
| $\nu d_{min}$ | 23.77 | 23.77 | 23.77 | 23.77 |
| $N_{G1}$ | 6.00 | 6.00 | 6.00 | 7.00 |
| $N_{G2}$ | 7.00 | 7.00 | 6.00 | 8.00 |
| $f_{G1}$ | 7.77 | 7.39 | 8.00 | 29.25 |
| $f_{G2}$ | 5.31 | 6.90 | 5.81 | 12.79 |
| $f_{G1o}$ | −49.08 | −38.01 | −394.66 | −43.59 |
| $f_{G2i}$ | −9.73 | −7.49 | −7.20 | −28.44 |
| $f_{L1}$ | −49.08 | −38.01 | −394.66 | −43.59 |
| $f_{L2}$ | 7.81 | 8.01 | 8.35 | 20.83 |
| $f_{L3}$ | −12.93 | −8.77 | −11.94 | −24.58 |
| $f_{L4}$ | 10.12 | 7.77 | 10.11 | 36.17 |
| $f_{L5}$ | 6.12 | 7.51 | 7.13 | 31.43 |
| $f_{L6}$ | −3.71 | −4.59 | −4.14 | 23.02 |
| $f_{L7}$ | −9.00 | −10.92 | −8.71 | −13.86 |
| $f_{L8}$ | 8.86 | 13.97 | 8.92 | −25.64 |
| $f_{L9}$ | 10.55 | 11.01 | 9.82 | 38.61 |
| $f_{L10}$ | −21.47 | 68.51 | −14.82 | 35.83 |
| $f_{L11}$ | 13.49 | −18.39 | 13.77 | 45.75 |
| $f_{L12}$ | −17.07 | 14.10 | −7.20 | −62.24 |
| $f_{L13}$ | −9.73 | −7.49 | — | 34.74 |
| $f_{L14}$ | — | — | — | −31.23 |
| $f_{L15}$ | — | — | — | −28.44 |

| | Example84 | Example85 | Example86 | Example87 |
|---|---|---|---|---|
| $D_{oi}$ | 28.4 | 35.3 | 33.0 | 40.0 |
| $Y_{obj}$ | 1.1 | 1.1 | 1.2 | 0.5 |
| Y | 2.82 | 2.86 | 2.30 | 2.23 |
| $L_{TL}$ | 24.89 | 31.65 | 29.34 | 39.37 |
| $L_L$ | 18.91 | 28.14 | 26.24 | 33.75 |
| WD | 3.49 | 3.60 | 3.70 | 0.65 |
| BF | 5.98 | 3.51 | 3.10 | 5.63 |
| NA | 0.42 | 0.40 | 0.40 | 0.74 |
| β | −2.54 | −2.58 | −1.99 | −4.18 |
| f | 5.60 | 6.09 | 5.65 | 2.80 |
| $\phi_{G1o}$ | 6.27 | 4.72 | 4.52 | 2.14 |
| $\phi_s$ | 3.75 | 3.92 | 4.29 | 5.92 |
| $D_{os}$ | 11.35 | 11.28 | 11.56 | 9.99 |
| $D_{G1G2}$ | 0.72 | 1.07 | 1.13 | 0.66 |
| $L_{G1}$ | 6.51 | 7.17 | 7.36 | 9.02 |
| $L_{G2}$ | 11.68 | 19.90 | 17.75 | 24.07 |
| $CRA_{obj}$ (MAX) | 0.57 | 3.42 | 4.40 | 0.56 |
| $CRA_{obj}$ (MIN) | 0.00 | 0.00 | 0.00 | 0.00 |
| $CRA_{img}$ | 9.96 | 10.12 | 10.38 | 10.98 |
| $D_{max}$ | 2.78 | 4.34 | 3.45 | 3.51 |
| $D_{G1max}$ | 0.35 | 0.05 | 0.05 | 0.18 |
| $\nu d_{max}$ | 81.54 | 81.61 | 81.61 | 81.61 |
| $\nu d_{min}$ | 30.30 | 23.88 | 23.88 | 23.88 |
| $N_{G1}$ | 4.00 | 5.00 | 5.00 | 5.00 |
| $N_{G2}$ | 6.00 | 6.00 | 6.00 | 6.00 |
| $f_{G1}$ | 4.84 | 5.13 | 5.68 | 3.72 |
| $f_{G2}$ | 6.71 | 8.69 | 7.57 | 4.86 |
| $f_{G1o}$ | 5.76 | −20.67 | −9.49 | −23.50 |
| $f_{G2i}$ | −5.67 | −18.30 | −16.04 | −12.20 |
| $f_{L1}$ | 5.76 | −20.67 | −9.49 | −23.50 |
| $f_{L2}$ | −28.93 | 7.74 | 7.53 | 6.67 |
| $f_{L3}$ | 5.78 | 6.64 | 5.45 | 5.74 |
| $f_{L4}$ | −4.33 | 5.42 | 6.45 | 7.78 |
| $f_{L5}$ | 4.34 | −3.10 | −3.50 | −4.03 |
| $f_{L6}$ | −5.80 | −3.34 | −3.72 | −5.88 |
| $f_{L7}$ | −39.03 | 4.70 | 5.20 | 6.11 |
| $f_{L8}$ | 130.77 | 7.31 | 6.96 | 8.22 |
| $f_{L9}$ | 4.80 | −4.20 | −4.61 | −20.92 |
| $f_{L10}$ | −5.67 | 8.00 | 7.57 | 25.26 |
| $f_{L11}$ | — | −18.30 | −16.04 | −12.20 |

| | Example88 | Example89 | Example90 | Example91 |
|---|---|---|---|---|
| $D_{oi}$ | 31.5 | 53.0 | 59.0 | 57.0 |
| $Y_{obj}$ | 0.5 | 0.3 | 1.4 | 1.1 |
| Y | 2.30 | 2.30 | 2.82 | 2.25 |
| $L_{TL}$ | 30.83 | 52.83 | 55.01 | 53.01 |
| $L_L$ | 26.99 | 37.38 | 50.04 | 48.35 |
| WD | 0.66 | 0.21 | 4.00 | 4.00 |
| BF | 3.84 | 15.45 | 4.97 | 4.66 |
| NA | 0.75 | 0.95 | 0.39 | 0.41 |
| β | −4.18 | −8.37 | −2.04 | −2.04 |
| f | 1.99 | 2.62 | 10.15 | 9.96 |
| $\phi_{G1o}$ | 2.11 | 1.51 | 5.57 | 5.37 |
| $\phi_s$ | 5.46 | 8.61 | 7.00 | 7.05 |
| $D_{os}$ | 8.62 | 11.27 | 27.30 | 25.23 |
| $D_{G1G2}$ | 0.16 | 0.49 | 2.28 | 2.12 |
| $L_{G1}$ | 7.80 | 10.95 | 21.12 | 19.21 |
| $L_{G2}$ | 19.03 | 25.94 | 26.64 | 27.02 |
| $CRA_{obj}$ (MAX) | 1.33 | 0.00 | 2.29 | 0.88 |
| $CRA_{obj}$ (MIN) | 0.00 | −1.04 | 0.00 | 0.00 |
| $CRA_{img}$ | 15.86 | 6.11 | 5.62 | 5.61 |
| $D_{max}$ | 3.54 | 3.75 | 4.23 | 4.14 |
| $D_{G1max}$ | 0.05 | 0.05 | 2.85 | 3.46 |
| $\nu d_{max}$ | 81.61 | 81.61 | 94.93 | 94.93 |
| $\nu d_{min}$ | 23.88 | 23.88 | 23.78 | 23.78 |
| $N_{G1}$ | 5.00 | 5.00 | 6.00 | 6.00 |
| $N_{G2}$ | 6.00 | 7.00 | 7.00 | 7.00 |
| $f_{G1}$ | 3.45 | 3.49 | 9.19 | 8.65 |
| $f_{G2}$ | 4.02 | 6.12 | 14.39 | 11.93 |
| $f_{G1o}$ | −16.97 | −188.41 | −5.35 | −5.97 |
| $f_{G2i}$ | −8.79 | −13.18 | 10.98 | 17.06 |
| $f_{L1}$ | −16.97 | −188.41 | −5.35 | −5.97 |
| $f_{L2}$ | 6.44 | 7.75 | 7.52 | 7.45 |
| $f_{L3}$ | 5.26 | 6.11 | 15.14 | 14.61 |
| $f_{L4}$ | 6.83 | 9.89 | 16.17 | 12.63 |
| $f_{L5}$ | −4.18 | −6.16 | 22.58 | 65.83 |
| $f_{L6}$ | −5.93 | −8.03 | −6.08 | −6.36 |
| $f_{L7}$ | 5.06 | 9.89 | −8.66 | −9.70 |
| $f_{L8}$ | 7.73 | 12.25 | 8.05 | 7.95 |
| $f_{L9}$ | −10.04 | 16.32 | 9.42 | 9.41 |
| $f_{L10}$ | 12.64 | −13.51 | −5.50 | −5.29 |
| $f_{L11}$ | −8.79 | 20.30 | 9.06 | 8.00 |
| $f_{L12}$ | — | −13.18 | −7.93 | −9.17 |
| $f_{L13}$ | — | — | 10.98 | 17.06 |

| | Example92 | Example93 | Example94 | Example95 |
|---|---|---|---|---|
| $D_{oi}$ | 81.0 | 57.0 | 81.0 | 42.0 |
| $Y_{obj}$ | 0.5 | 1.1 | 0.5 | 1.9 |
| Y | 2.25 | 2.25 | 2.25 | 3.87 |
| $L_{TL}$ | 80.01 | 53.00 | 80.01 | 39.99 |
| $L_L$ | 75.35 | 48.35 | 74.89 | 38.29 |
| WD | 1.00 | 4.00 | 1.00 | 2.01 |
| BF | 4.66 | 4.65 | 5.13 | 1.70 |
| NA | 0.74 | 0.40 | 0.69 | 0.32 |
| β | −4.09 | −2.04 | −4.09 | −2.00 |
| f | 6.29 | 9.83 | 6.84 | 3.75 |
| $\phi_{G1o}$ | 3.08 | 5.24 | 2.90 | 4.91 |

-continued

| | | | | |
|---|---|---|---|---|
| $\phi_s$ | 8.97 | 6.91 | 8.13 | 5.58 |
| $D_{os}$ | 25.76 | 25.31 | 25.47 | 13.92 |
| $D_{G1G2}$ | 2.90 | 2.07 | 3.59 | 1.16 |
| $L_{G1}$ | 21.96 | 19.34 | 21.84 | 11.81 |
| $L_{G2}$ | 50.49 | 26.94 | 49.45 | 25.32 |
| $CRA_{obj}$ (MAX) | 0.00 | 0.99 | 0.00 | 1.21 |
| $CRA_{obj}$ (MIN) | −1.16 | 0.00 | −2.31 | 0.00 |
| $CRA_{img}$ | 5.61 | 5.61 | 5.58 | 23.82 |
| $D_{max}$ | 17.45 | 4.13 | 18.98 | 4.73 |
| $DG1_{max}$ | 0.10 | 3.79 | 3.68 | 2.81 |
| $\nu d_{max}$ | 81.61 | 94.95 | 81.61 | 81.61 |
| $\nu d_{min}$ | 23.78 | 23.78 | 23.78 | 23.77 |
| $N_{G1}$ | 6.00 | 6.00 | 5.00 | 7.00 |
| $N_{G2}$ | 6.00 | 7.00 | 6.00 | 7.00 |
| $f_{G1}$ | 5.80 | 8.93 | 5.58 | 8.64 |
| $f_{G2}$ | 15.76 | 11.67 | 18.54 | 5.35 |
| $f_{G1o}$ | −12.63 | −6.06 | 13.76 | 28.96 |
| $f_{G2i}$ | −64.25 | 16.31 | −53.92 | −10.77 |
| $f_{L1}$ | −12.63 | −6.06 | 13.76 | 28.96 |
| $f_{L2}$ | 8.98 | 7.53 | 25.11 | 7.91 |
| $f_{L3}$ | 31.87 | 14.85 | 29.18 | 6.66 |
| $f_{L4}$ | 30.81 | 13.01 | 8.68 | −10.48 |
| $f_{L5}$ | 9.29 | 66.65 | −5.84 | −7.74 |
| $f_{L6}$ | −6.10 | −6.38 | −7.71 | 9.09 |
| $f_{L7}$ | −10.23 | −10.84 | 9.91 | 11.82 |
| $f_{L8}$ | 12.17 | 8.38 | 24.46 | −61.10 |
| $f_{L9}$ | 19.79 | 9.37 | −27.09 | 13.27 |
| $f_{L10}$ | −35.91 | −5.19 | 20.16 | −9.57 |
| $f_{L11}$ | 24.54 | 8.16 | −53.92 | −10.77 |
| $f_{L12}$ | −64.25 | −9.11 | — | — |
| $f_{L13}$ | — | 16.31 | — | — |

| | Example96 |
|---|---|
| $D_{oi}$ | 42.0 |
| $Y_{obj}$ | 1.9 |
| Y | 3.87 |
| $L_{TL}$ | 40.00 |
| $L_L$ | 38.30 |
| WD | 2.00 |
| BF | 1.70 |
| NA | 0.32 |
| $\beta$ | −2.00 |
| f | 3.71 |
| $\phi_{G1o}$ | 4.88 |
| $\phi_s$ | 5.76 |
| $D_{os}$ | 14.98 |
| $D_{G1G2}$ | 1.17 |
| $L_{G1}$ | 12.88 |
| $L_{G2}$ | 24.25 |
| $CRA_{obj}$ (MAX) | 1.23 |
| $CRA_{obj}$ (MIN) | 0.00 |
| $CRA_{img}$ | 23.29 |
| $D_{max}$ | 4.22 |
| $D_{G1max}$ | 2.00 |
| $\nu d_{max}$ | 81.61 |
| $\nu d_{min}$ | 23.77 |
| $N_{G1}$ | 8.00 |
| $N_{G2}$ | 7.00 |
| $f_{G1}$ | 8.77 |
| $f_{G2}$ | 5.85 |
| $f_{G1o}$ | 42.78 |
| $f_{G2i}$ | −11.46 |
| $f_{L1}$ | 42.78 |
| $f_{L2}$ | 8.79 |
| $f_{L3}$ | 38.11 |
| $f_{L4}$ | 7.09 |
| $f_{L5}$ | −13.77 |
| $f_{L6}$ | −8.18 |
| $f_{L7}$ | 9.73 |
| $f_{L8}$ | 11.92 |
| $f_{L9}$ | −61.27 |
| $f_{L10}$ | 13.10 |
| $f_{L11}$ | −8.77 |
| $f_{L12}$ | −11.46 |

Figure 104:
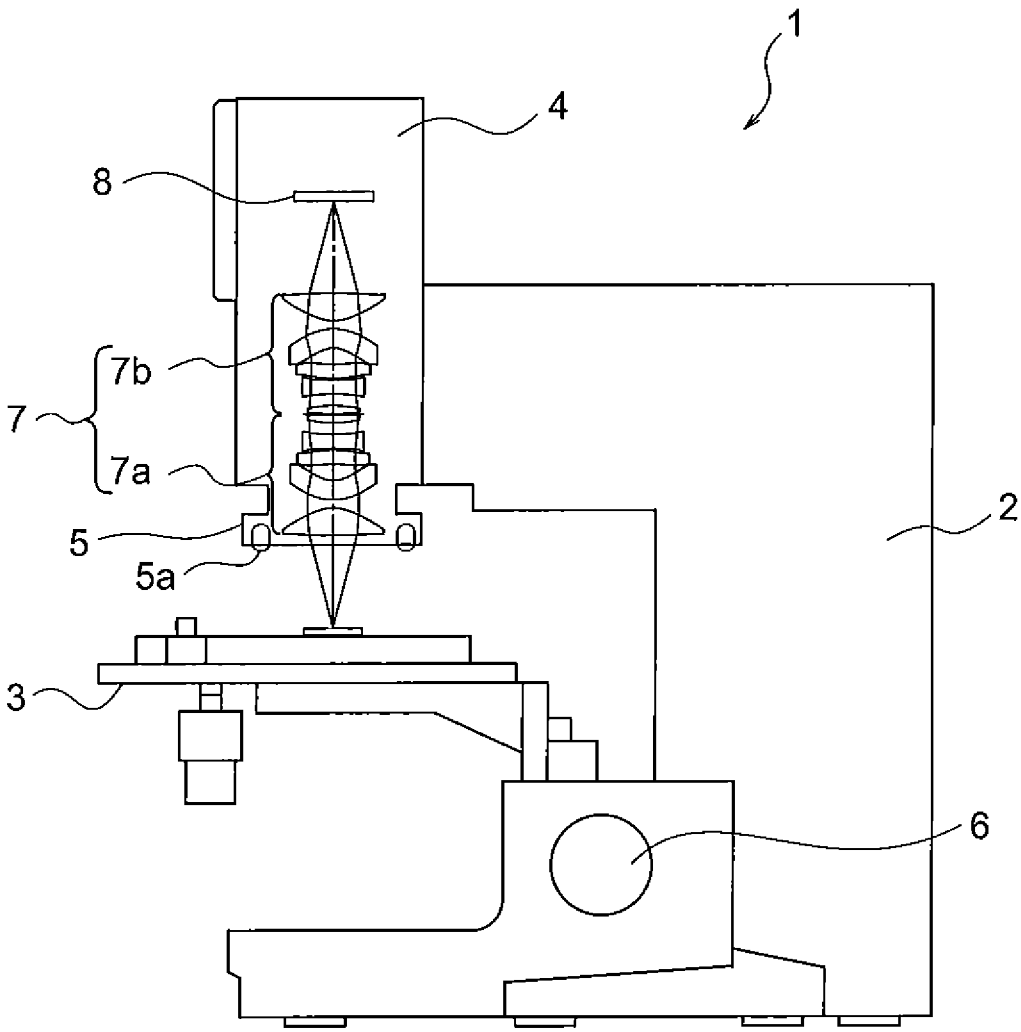
FIG. 104 is a diagram showing an arrangement of a microscope which is an optical instrument.

FIG. 104 is a diagram showing a microscope which is an optical instrument according to the present embodiment. A microscope 1 is a microscope of an upright type. As shown in FIG. 104, the microscope 1 includes a main body 2, a stage 3, an image pickup section 4, an illuminating unit 5, an aiming knob 6, an optical system 7, and an image pickup element 8.

The main body 2 is provided with the stage 3, the image pickup section 4, and the aiming knob 6. A sample is placed on the stage 3. Movement of the stage 3 in an optical axial direction is carried out by the aiming knob 6. The stage 3 is moved by an operation (rotation) of the aiming knob 6, and accordingly, focusing with respect to the sample is possible. For this, a moving mechanism (not shown in the diagram) is provided between the main body 2 and the stage 3.

The image pickup section 4 is provided with the illuminating unit 5. The image pickup section 4 and the illuminating unit 5 are positioned above the stage 3. An illuminating element 5*a* is disposed to be in a ring shape in the illuminating unit 5. An LED is an example of the illuminating element 5*a*.

The optical system 7 and the image pickup element 8 are disposed at an interior of the image pickup section 4. The optical system according to the example 1 for instance, is used for the optical system 7. The optical system 7 includes an objective 7*a* (the lens unit Gf or the first lens unit) and a tube lens 7*b* (the lens unit Gr or the second lens unit). A front end of the objective 7*a* is positioned at a central portion of the illuminating unit 5.

Illuminating light is irradiated from the illuminating unit 5. In this case, the illumination is an epi-illumination. Light reflected from the sample travels through the optical system 7 and is incident on the image pickup element 8. A sample image (optical image) is formed on an image pickup surface of the image pickup element 8. The sample image is subjected to photoelectric conversion by the image pickup element 8, and accordingly, an image of the sample is achieved. The image of the sample is displayed on a display unit (not shown in the diagram). In such manner, an observer is able to observe the image of the sample.

Here, the microscope 1 includes the optical system 7 (the optical system according to the present embodiment). In this optical system 7, the numerical aperture on the image side is large, and various aberrations are corrected favorably. Therefore, in the microscope 1, various aberrations are corrected favorably, and a bright and sharp sample image is achieved.

In the example described above, the optical system was disposed in the image pickup section. However, the arrangement is not restricted to such an arrangement. For example, in an objective (the lens unit Gf or the first lens unit) for which, a parfocal distance is 75 mm, it is possible to dispose the optical system and the image pickup element of the present example in a frame member which holds lenses. In this case, it is possible to install the optical system according to the present embodiment to the revolver similarly as the existing objective lens. When such an arrangement is made, it is possible to use the existing objective lens (the lens unit Gf or the second lens unit) and the optical system according to the present embodiment upon switching over.

Moreover, the description has been made by using the example of the microscope as the optical instrument using the abovementioned optical system. However, the optical system according to the present invention is not restricted to the microscope, for example, the optical system according to the present invention is applicable to an electronic image pickup apparatus (a lens unit for a portable camera, a notebook computer, and a handheld information terminal) as an optical instrument.

Since the image pickup section 4 includes the image pickup element 8, it is possible to assume the image pickup section 4 as an image pickup apparatus. In this case, since a microscope 1 includes the image pickup section 4, the stage 3, and the illuminating unit 5, it can be referred to as an image pickup system. In FIG. 104, the stage 3 is connected to the main body 2 via the aiming mechanism (aiming knob 6). However, the stage 3 may be installed directly on the main body without installing via a moving mechanism. By making such an arrangement, it is possible to integrate the image pickup section 4 and the stage 3 via the main body 2.

Figure 105:
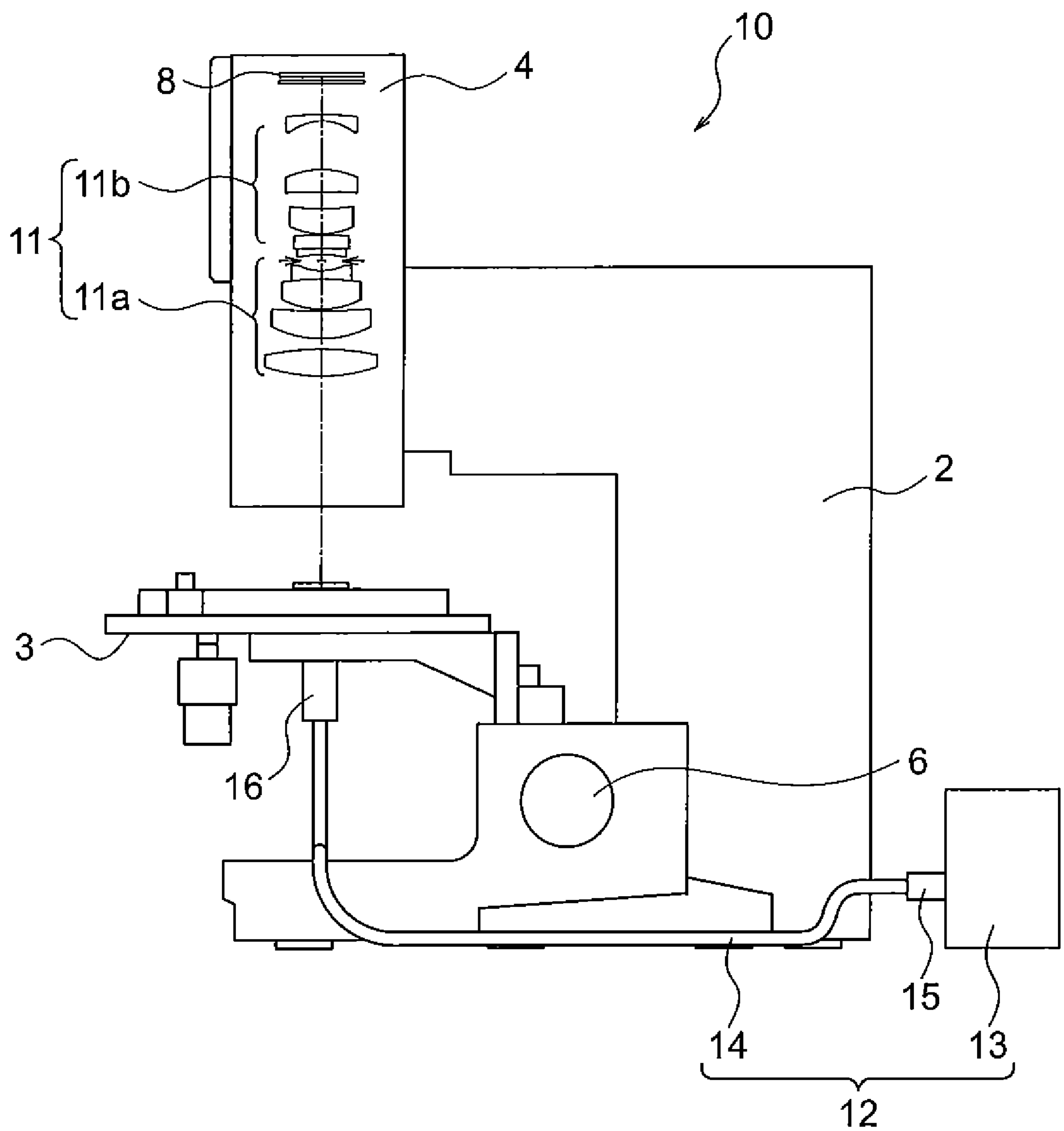
FIG. 105 is a diagram showing an arrangement of another microscope which is an optical instrument.

FIG. 105 is a diagram showing a microscope which is the optical instrument of the present embodiment. A microscope 10 is a microscope of the upright type. Same reference numerals are assigned to components which are same as in the microscope 1 (FIG. 104), and description of such components is omitted.

An optical system 11 and the image pickup element 8 are disposed at the interior of the image pickup section 4. The optical system according to the example 8 for instance, is used for the optical system 11. The optical system 11 includes a first lens unit 11*a* (or the lens unit Gf) and the second lens unit 11*b* (or the lens unit Gr).

In the microscope 1, the illuminating unit 5 has been provided toward the optical system 7. Whereas, in the microscope 10, an illuminating unit 12 is provided on an opposite side of the optical system 11, sandwiching the stage 3 between the illuminating unit 12 and the optical system 11. The illuminating unit 12 includes alight source section 13 and a light guiding fiber 14.

The light source section 13 includes a light source such as a halogen lamp, a mercury lamp, a xenon lamp, an LED (light emitting diode), or a laser. Moreover, the light source section 13 includes a lens. Illuminating light emitted from the light source is incident on an inlet end 15 of the light guiding fiber 14. The illuminating light incident on the light guiding fiber 14 is transmitted through the light guiding fiber 14, and is emerged from an exit end 16.

The exit end 16 of the light guiding member 14 is connected to the stage 3 by a holding mechanism (not shown in the diagram). Here, the exit end 16 of the light guiding fiber 14 is positioned on a lower surface of the stage 3. Therefore, the illuminating light emerged from the exit end 16 is directed from a lower side of the stage 3 toward the optical system 11, and is irradiated to the sample. In this manner, transmitted illumination is carried out in the microscope 10.

Here, the light guiding fiber 14 is held by the stage 3. However, the light guiding fiber 14 may be held by a means other than the stage 3. Moreover, the exit end 16 of the light guiding member 14 may be positioned on an upper surface (the optical system 7 side) of the stage 3. By making such an arrangement, it is possible to carry out the epi-illumination in the microscope 10 similarly as in the microscope 1.

Transmitted light from the sample travels through the optical system 11 and is incident on the image pickup element 8. A sample image (an optical image) is formed on the image pickup surface of the image pickup element 8. The sample image is subjected to photoelectric conversion by the image pickup element 8, and accordingly, an image of the sample is achieved. The image of the sample is displayed on a display unit (not shown in the diagram). In such manner, the observer is able to observe the image of the sample.

The microscope 10 also includes the optical system 11 (the optical system according to the present embodiment). The optical system 11 is an optical system in which aberrations are corrected favorably, while being an optical system having a short overall length, and has a high resolution because of the favorable correction of aberrations. Therefore, in the microscope 10, various aberrations are corrected favorably, and a sample image in which, the microscopic structure is clear, is achieved. The illumination of the microscope 10 may be epi-illumination. Moreover, it is possible to make design modifications appropriately in an arrangement of members which form the microscope 10.

Figure 106:
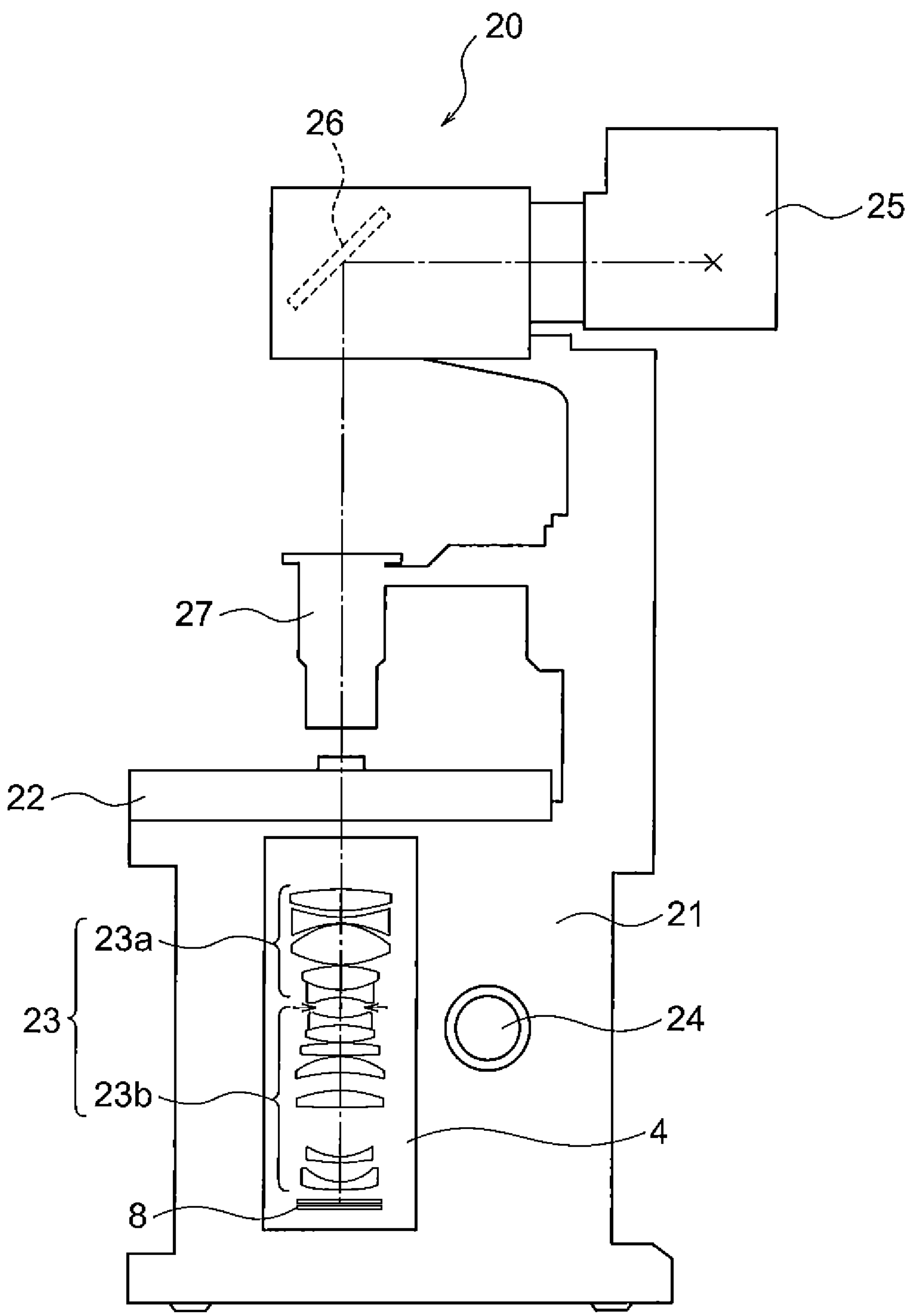
FIG. 106 is a diagram showing an arrangement of still another microscope which is an optical instrument.

FIG. 106 is a diagram showing a microscope which is an optical instrument of the present embodiment. A microscope 20 is a microscope of an inverted type. The microscope 20 includes a main body 21, a stage 22, the image pickup section 4, an optical system 23, the image pickup element 8, an aiming knob 24, a transmitted illumination light source 25, a reflecting mirror 26, and a condenser lens 27.

Here, the optical system 23 and the image pickup element 8 are disposed at the interior of the image pickup section 4. For the optical system 23, an optical system such as the optical system according to the example 20 is used. The optical system 23 includes a first lens unit (or the lens unit Gf) 23*a* and a second lens unit (or the lens unit Gr) 23*b*.

The main body 21 is provided with the stage 22, the image pickup section 4, and the aiming knob 24. A sample is placed on the stage 22. Movement of the image pickup section 4 in the optical axial direction is carried out by the aiming knob 24. The image pickup section 4 is moved by an operation (rotation) of the aiming knob 24, and accordingly, focusing with respect to the sample is possible. For this, a moving mechanism (not shown in the diagram) is provided inside the main body 21, and the image pickup section 4 is held by the moving mechanism.

Moreover, the main body 21 is provided with the transmitted illumination light source 25, the reflecting mirror 26, and the condenser lens 27. The transmitted illumination light source 25, the reflecting mirror 26, and the condenser lens 27 are disposed above the stage 22. Illuminating light emitted from the transmitted illumination light source 25 is reflected at the reflecting mirror 26, and is incident on the condenser lens 27. The condenser lens 27 is positioned above an upper surface of the stage 22. Accordingly, illuminating light emerged from the condenser lens 27 is directed from an upper side of the stage 22 toward the optical system 23, and is irradiated to the sample. In such manner, the transmitted illumination is carried out in the microscope 20.

The microscope 20 also includes the optical system 23 (optical system according to the present embodiment). The optical system 23 is an optical system in which aberrations are corrected favorably, while being an optical system having a short overall length, and has a high resolution because of the favorable correction of aberrations. Therefore, in the microscope 20, various aberrations are corrected favorably, and a sample image in which, the microscopic structure is clear, is achieved. It is possible to make design modifications appropriately in an arrangement of members which form the microscope 20.

Figure 107A:
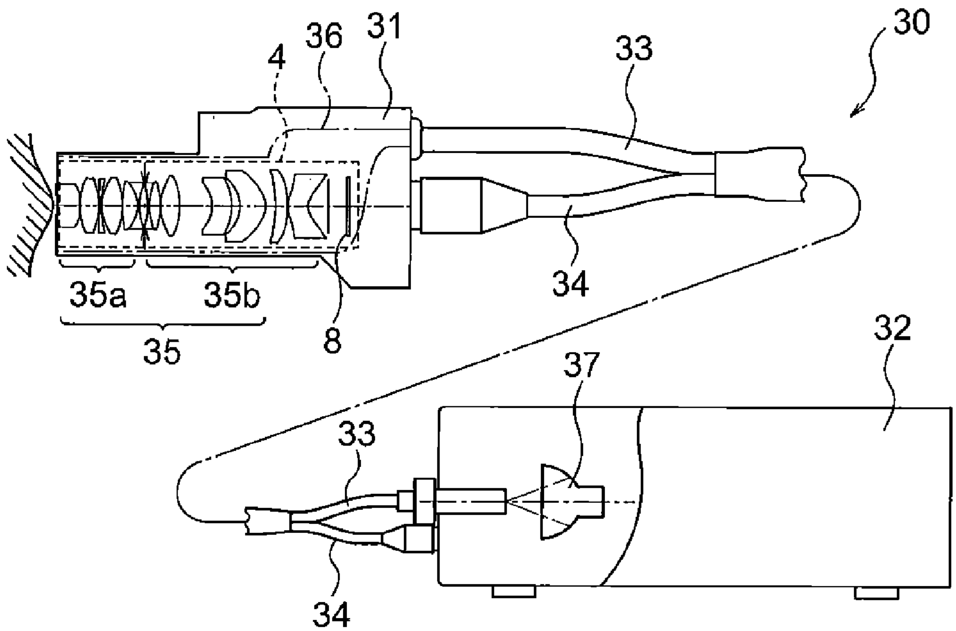
FIG. 107A is a diagram showing an arrangement of still another microscope which is an optical instrument.
Figure 107B:
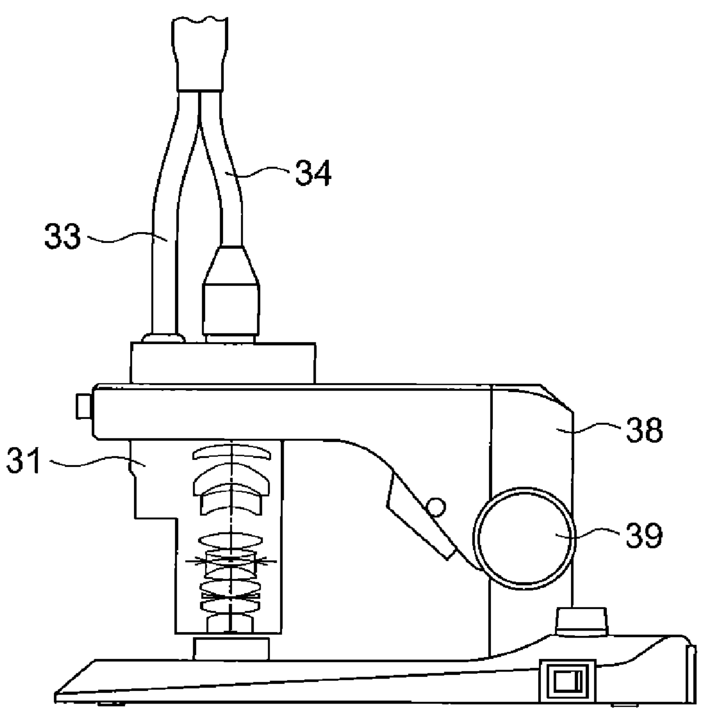
FIG. 107B is a diagram showing a state that the microscope is fixed.

FIG. 107A and FIG. 107B are diagrams showing a microscope which is an optical instrument of the present embodiment. FIG. 107A is a diagram showing an arrangement of the microscope, and FIG. 107B is a diagram showing a state in which, a microscope 30 is fixed.

The microscope 30 is a microscope of a portable type. The microscope 30 includes a probe section 31, a control box 32, a light guiding fiber 33, a cable 34, the image pickup section 4, an optical system 35, the image pickup element 8, a light guiding body for illumination 36, and a light source 37.

The optical system 35 and the image pickup element 8 are disposed at the interior of the image pickup section 4. For the optical system 35, an optical system such as the optical system according to the example 61 is used. The optical system 35 includes a first lens unit (or the lens unit Gf), 35*a* and a second lens unit (or the lens unit Gr) 35*b*.

The probe section 31 and the control box 32 are connected by the light guiding fiber 33 and the cable 34. The control box 32 includes the light source 37 and a processing section (not shown in the diagram). The processing section processes a video signal from the probe section 31.

The probe section 31 is of a size that enables a user to hold the probe section 31 in a hand. The probe section 31 includes the image pickup section 4 and the light guiding body for illumination 36. The light guiding body for illumination 36 is disposed at an outer peripheral side of the image pickup section 4. The light guiding body for illumination 36 is optically connected to the light guiding fiber 33. Illuminating light emitted from the light source 37 is transmitted through the light guiding fiber 33, and is incident on the light guiding body for illumination 36. The illuminating light is transmitted through the light guiding body for illumination, and is emerged from the probe section 31. In such manner, the epi-illumination is carried out in the microscope 30.

Light reflected from the sample travels through the optical system 35 and is incident on the image pickup element 8. A sample image (an optical image) is formed on the image pickup surface of the image pickup element 8. The sample image is subjected to photoelectric conversion by the image pickup element 8, and accordingly, an image of the sample is achieved. The image of the sample is displayed on the display unit (not shown in the diagram). In such manner, the observer is able to observe the image of the sample.

The probe section 31 is connected to the control box 32 by the light guiding fiber 33 and the cable 34. Therefore, it is possible to set a position and a direction of the probe 31 freely. In this case, fixing of a posture (position and direction) of the probe section 31 is to be carried out by hands of the observer. However, in fixing by the hands of the observer, sometimes there is no sufficient stability.

For stabilizing the posture (position and direction) of the probe section 31, it is preferable to hold the probe section 31 by a mount 38 as shown in FIG. 107B. By doing so, it is possible to stabilize the posture of the probe section 31.

The mount 38 is provided with an aiming knob 39. Movement of the probe section 31 (image pickup section 4) in the optical axial direction is carried out by the aiming knob 39. The probe section 31 is moved by an operation (rotation) of the aiming knob 39, and accordingly, focusing with respect to the sample is possible. For this, a moving mechanism (not shown in the diagram) is provided inside the mount 38.

The microscope 30 also includes the optical system 35 (optical system according to the present embodiment). The optical system 35 is an optical system in which aberrations are corrected favorably, while being an optical system having a short overall length, and has a high resolution because of the favorable correction of aberrations. Therefore, in the microscope 30, various aberrations are corrected favorably, and a sample image in which, the microscopic structure is clear, is achieved. It is possible to make design modifications appropriately in an arrangement of members which form the microscope 30.

In each of the microscope 1, the microscope 10, the microscope 20, and the microscope 30, any optical system from among the optical systems according to the example 1 to the example 96 can be used.

In such manner, the present invention may have various modified examples without departing from the scope of the invention. Shapes and the number of lenses are not restricted to the shapes and the number indicated in the examples described heretofore. A lens which is not shown in the diagrams of the examples described heretofore, and which essentially has no refractive power may be disposed.

According to the present invention, it is possible to provide an optical system in which, an aberration is corrected favorably, and the overall length is short while having a high resolution due to the favorable aberration correction, and an image pickup apparatus, and an image pickup system in which such optical system is used. Moreover, according to the present invention, it is possible to provide an optical system in which, the numerical aperture on the image side is large, and various aberrations are corrected favorably, and an optical instrument in which, such optical system is used.

The present invention also includes the following inventions in addition to the abovementioned inventions.

(Appended Mode 1-1)

An optical system which forms an optical image on an image pickup element including a plurality of pixels arranged in rows two-dimensionally, which converts a light intensity to an electric signal, and a plurality of color filters disposed on the plurality of pixels respectively, comprising in order from an object side, a first lens unit having a positive refractive power, which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the first lens unit includes a negative lens, and a positive lens which is disposed on the object side of the negative lens, and the following conditional expressions (15), (16), (19), and (20) are satisfied:

$$\beta \leq -1.1 \quad (15)$$

$$0.0 < NA \quad (16)$$

$$1.0 < WD/BF \quad (19)$$

$$0.5 < 2\times(WD\times\tan(\sin^{-1} NA)+Y_{obj})/\phi_s < 4.0 \quad (20)$$

where, $\beta$ denotes an imaging magnification of the optical system,

NA denotes a numerical aperture on the object side of the optical system,

WD denotes a distance on an optical axis from the object up to an object-side surface of the first object-side lens, BF denotes a distance on the optical axis from an image-side surface of the second image-side lens up to the image, $Y_{obj}$ denotes a maximum object height, and $\phi_s$ denotes a diameter of the stop.

(Appended Mode 1-2)

The optical system according to appended mode 1-1, wherein the first lens unit includes a first image-side lens which is disposed nearest to the image, and the following conditional expression (31) is satisfied:

$$0.1 < L_{G1}/L_{G2} < 1.5 \quad (31)$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to an image side surface of the second image-side lens.

(Appended Mode 1-3)

The optical system according to one of appended modes 1-1 and 1-2, wherein the following conditional expression (25) is satisfied:

$$0.15<D_{os}/D_{oi}<0.8 \tag{25}$$

where, $D_{os}$ denotes a distance on the optical axis from the object up to the stop, and $D_{oi}$ denotes a distance on the optical axis from the object up to the image.

(Appended Mode 1-4)

The optical system according to one of appended modes 1-1 to 1-3, wherein the following conditional expression (23) is satisfied:

$$0.4<L_L/D_{oi} \tag{23}$$

where, $L_L$ denotes a distance on the optical axis from the object-side surface of the first object-side lens up to the image-side surface of the second image-side lens, and $D_{oi}$ denotes the distance on the optical axis from the object up to the image.

(Appended Mode 1-5)

The optical system according to one of appended modes 1-1 to 1-4, wherein the first lens unit includes a first image-side lens which is disposed nearest to the image, and the following conditional expression (34) is satisfied:

$$0.5<D_{os}/L_{G1}<4.0 \tag{34}$$

where, $D_{os}$ denotes the distance on the optical axis from the object up to the stop, and $L_{G1}$ denotes the distance on the optical axis from the object-side surface of the first object-side lens up to the image-side surface of the first image-side lens.

(Appended Mode 1-6)

The optical system according to one of appended modes 1-1 to 1-5, wherein the following conditional expression (21) is satisfied:

$$0.01<D_{max}/\phi_s<3.0 \tag{21}$$

where, $D_{max}$ denotes a maximum distance from among distances on the optical axis of adjacent lenses in the optical system, and $\phi_s$ denotes the diameter of the stop.

(Appended Mode 1-7)

The optical system according to one of appended modes 1-1 to 1-6, wherein the following conditional expression (56) is satisfied:

$$0.78<L_L/D_{oi}+0.07\times WD/BF \tag{56}$$

where, $L_L$ denotes the distance on the optical axis from the object-side surface of the first object-side lens up to the image-side surface of the second image-side lens, $D_{oi}$ denotes the distance on the optical axis from the object up to the image, WD denotes the distance on the optical axis from the object up to the object-side surface of the first object-side lens, and BF denotes the distance on the optical axis from the image-side surface of the second image-side lens up to the image.

(Appended Mode 1-8)

The optical system according to one of appended modes 1-1 to 1-7, wherein the first lens unit includes a first image-side lens which is disposed nearest to the image, and the following conditional expression (57) is satisfied:

$$D_{os}/L_{G1}-0.39\times WD/BF<1.8 \tag{57}$$

where, $D_{os}$ denotes the distance on the optical axis from the object up to the stop, $L_{G1}$ denotes the distance on the optical axis from the object-side surface of the first object-side lens up to the image-side surface of the first image-side lens, WD denotes the distance on the optical axis from the object up to the object-side surface of the first object-side lens, and BF denotes the distance on the optical axis from the image-side surface of the second image-side lens up to the image.

(Appended Mode 1-9)

The optical system according to one of appended modes 1-1 to 1-8, wherein the following conditional expression (27) is satisfied:

$$0<BF/L_L<0.4 \tag{27}$$

where,

BF denotes the distance on the optical axis from the image-side surface of the second image-side lens up to the image, and $L_L$ denotes the distance on the optical axis from the object-side surface of the first object-side lens up to the image-side surface of the second image-side lens.

(Appended Mode 1-10)

The optical system according to one of appended modes 1-1 to 1-9, wherein the following conditional expressions (35) and (36) are satisfied:

$$1.0<D_{ENP}/Y \tag{35}$$

$$0\leq CRA_{obj}/CRA_{img}<0.5 \tag{36}$$

where, $D_{ENP}$ denotes a distance on the optical axis from a position of an entrance pupil of the optical system up to the object-side surface of the first object-side lens, Y denotes a maximum image height in an overall optical system, $CRA_{obj}$ denotes a maximum angle from among angles made by a principal ray that is incident on the first object-side lens, with the optical axis, and $CRA_{img}$ denotes a maximum angle from among angles made by a principal ray that is incident on an image plane, with the optical axis, and an angle measured in a direction of clockwise rotation is let to be a negative angle, and an angle measured in a direction of counterclockwise rotation is let to be a positive angle.

(Appended Mode 1-11)

An optical system according to one of appended modes 1-1 to 1-10, wherein a conjugate image of an object is formed by the first lens unit, and a final image of the object is formed by the second lens unit, and the following conditional expression (18) is satisfied:

$$-30<(\Delta D_{G2dC}+(\Delta D_{G1dC}\times\beta_{G2C}{}^2/(1+\beta_{G2C}\times\Delta D_{G1dC}/f_{G2C})))/\epsilon_d<30 \tag{18}$$

where, $\Delta D_{G1dC}$ denotes a distance from a position of an image point $P_{G1}$ on a d-line up to a position of an image point on a C-line, at an image point of the first lens unit with respect to an object point on an optical axis, $\Delta D_{G2dC}$ denotes a distance from a position of an image point on the d-line up to a position of an image point on the C-line, at an image point of the second lens unit, when the image point $P_{G1}$ is let to be an object point of the second lens unit, where $\Delta D_{G1dC}$ and $\Delta D_{G2dC}$ are let to be positive in a case in which, the position of the image point on the C-line is on the image side of the position of the image point on the d-line, $\Delta D_{G1dC}$ and $\Delta D_{G2dC}$ are let to be negative in a case in which, the position of the image point on the C-line is on the object side of the position of the image point on the d-line, $\beta_{G2C}$ denotes an imaging magnification for the C-line of the second lens unit when the image point $P_{G1}$ is let to be the object point of the second lens unit, $f_{G2C}$ denotes a focal length for the C-line of the second lens unit, and $\epsilon_d$ denotes an Airy disc radius for the d-line, which is determined by the numerical aperture on the image side of the optical system, and the object point and the image point are points on the optical axis, and also include cases of being a virtual object point and a virtual image point.

(Appended Mode 1-12)

The optical system according to one of appended modes 1-1 to 1-11, wherein the following conditional expression (22) is satisfied:

$$0.01 \le D_{G1max}/\phi_s < 2.0 \quad (22)$$

where, $D_{G1max}$ denotes a maximum distance from among distances on the optical axis of the adjacent lenses in the first lens unit, and $\phi_s$ denotes the diameter of the stop.

(Appended Mode 1-13)

The optical system according to one of appended modes 1-1 to 1-12, wherein the following conditional expression (24) is satisfied:

$$0.01 < 1/\nu d_{min} - 1/\nu d_{max} \quad (24)$$

where, $\nu d_{min}$ denotes a smallest Abbe's number from among Abbe's numbers for lenses forming the optical system, and $\nu d_{max}$ denotes a largest Abbe's number from among Abbe's numbers for lenses forming the optical system.

(Appended Mode 1-14)

The optical system according to one of appended modes 1-1 to 1-13, wherein the following conditional expression (26) is satisfied:

$$0.95 < \phi_{G1o}/(2 \times Y/|\beta|) \quad (26)$$

where, $\phi_{G1o}$ denotes an effective diameter of the object-side surface of the first object-side lens, Y denotes the maximum image height in the overall optical system, and $\beta$ denotes the imaging magnification of the optical system.

(Appended Mode 1-15)

The optical system according to one of appended modes 1-1 to 1-14, wherein the following conditional expression (28) is satisfied:

$$0 < BF/Y < 7.0 \quad (28)$$

where,

BF denotes the distance on the optical axis from the image-side surface of the second image-side lens up to the image, and Y denotes the maximum image height in the overall optical system.

(Appended Mode 1-16)

The optical system according to one of appended modes 1-1 to 1-15, wherein the following conditional expression (29) is satisfied:

$$-0.2 < \phi_{G1o}/R_{G1o} < 3.0 \quad (29)$$

where, $\phi_{G1o}$ denotes the effective diameter of the object-side surface of the first object-side lens, and $R_{G1o}$ denotes a radius of curvature of the object-side surface of the first object-side lens.

(Appended Mode 1-17)

The optical system according to one of appended modes 1-1 to 1-16, wherein the second lens unit includes four lenses, and at least one of the four lenses in the second lens unit is a negative lens, and at least one of the four lenses in the second lens unit is a positive lens, and an object-side surface of the positive lens from among the positive lenses, which is positioned nearest to the object side, is a convex surface that is convex toward the object side.

(Appended Mode 1-18)

The optical system according to one of appended modes 1-1 to 1-17, wherein the first lens unit includes a first image-side lens which is disposed nearest to the image side, and a distance of two lenses positioned on two sides of the stop is fixed, and the following conditional expression (30) is satisfied:

$$D_{G1G2}/\phi_s < 2.0 \quad (30)$$

where, $D_{G1G2}$ denotes a distance on the optical axis from the image-side surface of the first image-side lens up to the object-side surface of the second object-side lens, and $\phi_s$ denotes the diameter of the stop.

(Appended Mode 1-19)

The optical system according to one of appended modes 1-1 to 1-18, wherein the following conditional expression (32) is satisfied:

$$0.1 < L_{G1s}/L_{sG2} < 1.5 \quad (32)$$

where, $L_{G1s}$ denotes a distance on the optical axis from the object-side surface of the first object-side lens up to the stop, and $L_{sG2}$ denotes a distance on the optical axis from the stop up to the image side surface of the second image-side lens.

(Appended Mode 1-20)

The optical system according to one of appended modes 1-1 to 1-19, wherein the following conditional expression (33) is satisfied:

$$0.8 \le \phi_{G1max}/\phi_{G2max} < 5.0 \quad (33)$$

where, $\phi_{G1max}$ denotes a maximum effective diameter from among effective diameter of lenses in the first lens unit, and $\phi_{G2max}$ denotes a maximum effective diameter from among effective diameter of lenses in the second lens unit.

(Appended Mode 1-21)

The optical system according to one of appended modes 1-1 to 1-20, wherein the first lens unit includes a first image-side lens which is disposed nearest to the image, and the following conditional expression (34) is satisfied:

$$0.5 < D_{os}/L_{G1} < 4.0 \quad (34)$$

where, $D_{os}$ denotes the distance on the optical axis from the object up to the stop, and $L_{G1}$ denotes the distance on the optical axis from the object-side surface of the first object-side lens up to the image-side surface of the first image-side lens.

(Appended Mode 1-22)

The optical system according to one of appended modes 1-1 to 1-21, wherein the following conditional expressions (35) and (36) are satisfied:

$$1.0<D_{ENP}/Y \quad (35)$$

$$0\leq CRA_{obj}/CRA_{img}<0.5 \quad (36)$$

where, $D_{ENP}$ denotes the distance on the optical axis from a position of an entrance pupil of the optical system up to the object-side surface of the first object-side lens, Y denotes the maximum image height in the overall optical system, $CRA_{obj}$ denotes the maximum angle from among angles made by a principal ray that is incident on the first object-side lens, with the optical axis, and $CRA_{img}$ denotes the maximum angle from among angles made by a principal ray that is incident on an image plane, with the optical axis, and an angle measured in a direction of clockwise rotation is let to be a negative angle, and an angle measured in a direction of counterclockwise rotation is let to be a positive angle.

(Appended Mode 1-23)

The optical system according to one of appended modes 1-1 to 1-22, wherein the first lens unit includes the first object-side lens, and a lens which is disposed to be adjacent to the first object-side lens, and at least one of the first object-side lens and the lens disposed to be adjacent to the first object-side lens has a positive refractive power.

(Appended Mode 1-24)

The optical system according to one of appended modes 1-1 to 1-23, wherein the first object-side lens has a positive refractive power.

(Appended Mode 1-25)

The optical system according to one of appended modes 1-1 to 1-24, wherein the following conditional expression (37) is satisfied:

$$0.05<f_{G1o}/f \quad (37)$$

where, $f_{G1o}$ denotes a focal length of the first object-side lens, and f denotes a focal length of the overall optical system.

(Appended Mode 1-26)

The optical system according to one of appended modes 1-1 to 1-25, wherein an object-side surface of the first object-side lens is convex toward the object side.

(Appended Mode 1-27)

The optical system according to one of appended modes 1-1 to 1-26, wherein the following conditional expression (38) is satisfied:

$$0.02<R_{G1o}/WD \quad (38)$$

where, $R_{G1o}$ denotes the radius of curvature of the object-side surface of the first object-side lens, and WD denotes the distance on the optical axis from the object up to the object-side side surface of the first object-side lens.

(Appended Mode 1-28)

The optical system according to one of appended modes 1-1 to 1-27, wherein the second lens unit includes a predetermined lens unit nearest to the image, and the predetermined lens unit has a negative refractive power as a whole, and consists a single lens having a negative refractive power or two single lenses, and the two single lenses consist in order from the object side, a lens having a negative refractive power, and a lens having one of a positive refractive power and a negative refractive power.

(Appended Mode 1-29)

The optical system according to one of appended modes 1-1 to 1-28, wherein an image-side surface of the second image-side lens is concave toward the image side, and the following conditional expression (39) is satisfied:

$$0.1<R_{G2i/BF} \quad (39)$$

where, $R_{G2i}$ denotes a radius of curvature of the image-side surface of the second image-side lens, and BF denotes the distance on the optical axis from the image-side surface of the second image-side lens up to the image.

(Appended Mode 1-30)

The optical system according to appended mode 1-28, wherein a positive lens is disposed toward the object side of the predetermined lens unit, and the positive lens is disposed to be adjacent to the predetermined lens unit.

(Appended Mode 1-31)

The optical system according to one of appended modes 1-1 to 1-30, wherein the first lens unit includes a first image-side lens which is disposed nearest to the image, and an image-side surface of the first image-side lens is concave toward the image side, and the following conditional expression (40) is satisfied:

$$0.2<R_{G1i}/D_{G1is} \quad (40)$$

where, $R_{G1i}$ denotes a radius of curvature of the image-side surface of the first image-side lens, and $D_{G1is}$ denotes a distance on the optical axis from the image-side surface of the first image-side lens up to the stop.

(Appended Mode 1-32)

The optical system according to one of appended modes 1-1 to 1-31, wherein the following conditional expression (41) is satisfied:

$$0.5<f_{G1o}/f_{G1}<20 \quad (41)$$

where, $f_{G1o}$ denotes the focal length of the first object-side lens, and $f_{G1}$ denotes a focal length of the first lens unit.

(Appended Mode 1-33)

The optical system according to one of appended modes 1-1 to 1-32, wherein the following conditional expression (42) is satisfied:

$$0.01<1/\nu d_{G1min}-1/\nu d_{G1max} \quad (42)$$

where, $\nu d_{G1min}$ denotes a smallest Abbe's number from among Abbe's numbers for lenses forming the first lens unit, and $d_{G1max}$ denotes a largest Abbe's number from among Abbe's numbers for lenses forming the first lens unit.

(Appended Mode 1-34)

The optical system according to one of appended modes 1-1 to 1-33, wherein the following conditional expression (43) is satisfied:

$$0.01<1/\nu d_{G2min}-1/\nu d_{G2max} \quad (43)$$

where, $\nu d_{G2min}$ denotes a smallest Abbe's number from among Abbe's numbers for lenses forming the second lens unit, and $\nu d_{G2max}$ denotes a largest Abbe's number from among Abbe's numbers for lenses forming the second lens unit.

(Appended Mode 1-35)

The optical system according to one of appended modes 1-1 to 1-34, wherein the optical system includes at least one positive lens which satisfies the following conditional expression (44):

$$0.59<\theta_{gF}<0.8 \quad (44)$$

where, $\theta_{gF}$ denotes a partial dispersion ratio of the positive lens, and is expressed by $\theta_{gF}=(ng-nF)/(nF-nC)$, where nC, nF, and ng denote refractive indices with respect to a C-line, an F-line, and a g-line respectively.

(Appended Mode 1-36)

The optical system according to appended mode 1-35, wherein the positive lens which satisfies conditional expression (44) is included in the first lens unit.

(Appended Mode 1-37)

The optical system according to one of appended modes 1-35 and 1-36, wherein the positive lens which satisfies conditional expression (44), satisfies the following conditional expression (45):

$$0.3<D_{p1s}/L_{G1s}\leq 1 \quad (45)$$

where, $D_{p1s}$ denotes a distance on the optical axis from an object-side surface of the positive lens up to the stop, and $L_{G1s}$ denotes the distance on the optical axis from the object-side surface of the first object-side lens up to the stop.

(Appended Mode 1-38)

The optical system according to one of appended modes 1-1 to 1-37, wherein the optical system includes at least one diffractive optical element.

(Appended Mode 1-39)

The optical system according to one of appended modes 1-1 to 1-38, wherein at least one diffractive optical element is disposed at a position which is on the object side of the stop, and at the position which satisfies the following conditional expression (48):

$$0.1<D_{DLs}/D_{G1is} \quad (48)$$

where, $D_{DLs}$ denotes a distance on the optical axis from the diffractive optical element up to the stop, and $D_{G1is}$ denotes the distance on the optical axis from the image-side surface of the first image-side lens up to the stop.

(Appended Mode 1-40)

The optical system according to one of appended modes 1-1 to 1-39, wherein at least one diffractive optical element is disposed at a position which is on the image side of the stop, and at the position which satisfies the following conditional expression (49):

$$0.2<D_{sDL}/L_{sG2}<0.9 \quad (49)$$

where, $D_{sDL}$ denotes a distance on the optical axis from the stop up to the diffractive optical element, and $L_{sG2}$ denotes a distance on the optical axis from the stop up to the image-side surface of the second image-side lens.

(Appended Mode 1-41)

The optical system according to one of appended modes 1-1 to 1-40, wherein the optical system includes a negative lens which satisfies the following conditional expressions (50) and (51):

$$0.01<1/\nu d_{n1}-1/\nu d_{G1max} \quad (50)$$

$$0<D_{n1s}/D_{os}<0.3 \quad (51)$$

where, $\nu d_{n1}$ denotes Abbe's number for the negative lens, $\nu d_{G1max}$ denotes the largest Abbe's number from among the Abbe's numbers for lenses forming the first lens unit, $D_{n1s}$ denotes a distance on the optical axis from an object-side surface of the negative lens up to the stop, and $D_{os}$ denotes the distance on the optical axis from the object up to the stop.

(Appended Mode 1-42)

The optical system according to one of appended modes 1-1 to 1-41, wherein the optical system includes a negative lens at a position which satisfies the following conditional expression (54):

$$0.6<D_{sn3}/D_{si}<1 \quad (54)$$

where, $D_{sn3}$ denotes a distance on the optical axis from the stop up to an image-side surface of the negative lens, and $D_{si}$ denotes a distance on the optical axis from the stop up to the image.

(Appended Mode 1-43)

An image pickup apparatus comprising:

an optical system according to one of appended modes 1-1 to 1-42; and an image pickup element.

(Appended Mode 1-44)

The image pickup system comprising:

an image pickup apparatus according to appended mode 1-43;

a stage which holds an object; and an illuminating unit which illuminates the object.

(Appended Mode 1-45)

The image pickup system according to appended mode 1-44, wherein the image pickup apparatus and the stage are integrated.

(Appended Mode 2-1)

An optical system which forms an optical image on an image pickup element including a plurality of pixels arranged in rows two-dimensionally, which converts a light intensity to an electric signal, and a plurality of color filters disposed on the plurality of pixels respectively, comprising in order from an object side, a first lens unit which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the following conditional expressions (16), (21), (23-1), and (24-1) are satisfied:

$$0.0<NA \quad (16)$$

$$0.01<D_{max}/\phi_s<3.0 \quad (21)$$

$$0.6\leq L_L/D_{oi} \quad (23\text{-}1)$$

$$0.015<1/\nu d_{min}-1/\nu d_{max} \quad (24\text{-}1)$$

where,

NA denotes a numerical aperture on the object side of the optical system, $D_{max}$ denotes a maximum distance from among distances on an optical axis of adjacent lenses in the optical system, $\phi_s$ denotes a diameter of the stop, $L_L$ denotes a distance on the optical axis from an object-side surface of the first object-side lens up to an image-side surface of the second image-side lens, $D_{oi}$ denotes a distance on the optical axis from the object to the image, $\nu d_{min}$ denotes a smallest Abbe's number from among Abbe's numbers for lenses forming the optical system, and $\nu d_{max}$ denotes a largest Abbe's number from among the Abbe's numbers for lenses forming the optical system.

(Appended Mode 2-2)

The optical system according to appended mode 2-1, wherein the following conditional expressions (35) and (36) are satisfied:

$$1.0<D_{ENP}/Y \quad (35)$$

$$0\leq CRA_{obj}/CRA_{img}<0.5 \quad (36)$$

where, $D_{ENP}$ denotes a distance on the optical axis from a position of an entrance pupil of the optical system up to the object-side surface of the first object-side lens, Y denotes a maximum image height in an overall optical system, $CRA_{obj}$ denotes a maximum angle from among angles made by a principal ray that is incident on the first object-side lens, with the optical axis, and $CRA_{img}$ denotes a maximum angle from among angles made by a principal ray that is incident on an image plane, with the optical axis, and an angle measured in a direction of clockwise rotation is let to be a negative angle, and an angle measured in a direction of counterclockwise rotation is let to be a positive angle.

(Appended Mode 2-3)

The optical system according to one of appended modes 2-1 and 2-2, wherein the following conditional expression (25-1) is satisfied:

$$0.15<D_{os}/D_{oi}<0.65 \quad (25\text{-}1)$$

where, $D_{os}$ denotes a distance on the optical axis from the object up to the stop, and $D_{oi}$ denotes the distance on the optical axis from the object up to the image.

(Appended Mode 2-4)

The optical system according to one of appended modes 2-1 to 2-3, the following conditional expression (27) is satisfied:

$$0<BF/L_L<0.4 \quad (27)$$

where,

BF denotes a distance on an optical axis from the image-side surface of the second image-side lens up to the image, and $L_L$ denotes the distance on the optical axis from the object-side surface of the first object-side lens up to the image-side surface of the second image-side lens.

(Appended Mode 2-5)

The optical system according to one of appended modes 2-1 to 2-4, wherein the second lens unit includes a predetermined lens unit nearest to the image, and the predetermined lens unit has a negative refractive power as a whole, and consists a single lens having a negative refractive power or two single lenses, and the two single lenses consist in order from the object side, a lens having a negative refractive power, and a lens having one of a positive refractive power and a negative refractive power.

(Appended Mode 2-6)

The optical system according to one of appended modes 2-1 to 2-5, wherein the first lens unit includes a first image-side lens which is disposed nearest to the image, and an image-side surface of the first image-side lens is concave toward the image side, and the following conditional expression (40) is satisfied:

$$0.2<R_{G1i}/D_{G1is} \quad (40)$$

where, $R_{G1i}$ denotes a radius of curvature of the image-side surface of the first image-side lens, and $D_{G1is}$ denotes a distance on the optical axis from the image-side surface of the first image-side lens up to the stop.

(Appended Mode 2-7)

The optical system according to one of appended modes 2-1 to 2-6, wherein a conjugate image of an object is formed by the first lens unit, and a final image of the object is formed by the second lens unit, and the following conditional expression (18) is satisfied:

$$-30<(\Delta D_{G2dC}+(\Delta D_{G1dC}\times\beta_{G2C}^2/(1+\beta_{G2C}\times\Delta D_{G1dC}/f_{G2C})))/\epsilon_d<30 \quad (18)$$

where, $\Delta D_{G1dC}$ denotes a distance from a position of an image point $P_{G1}$ on a d-line up to a position of an image point on a C-line, at an image point of the first lens unit with respect to an object point on the optical axis, $\Delta D_{G2dC}$ denotes a distance from a position of an image point on the d-line up to a position of an image point on the C-line, at an image point of the second lens unit, when the image point $P_{G1}$ is let to be an object point of the second lens unit, where $\Delta D_{G1dC}$ and $\Delta D_{G2dC}$ are let to be positive in a case in which, the position of the image point on the C-line is on the image side of the position of the image point on the d-line, $\Delta D_{G1dC}$ and $\Delta D_{G2dC}$ are let to be negative in a case in which, the position of the image point on the C-line is on the object side of the position of the image point on the d-line, $\beta_{G2C}$ denotes an imaging magnification for the C-line of the second lens unit when the image point $P_{G1}$ is let to be the object point of the second lens unit, $f_{G2C}$ denotes a focal length for the C-line of the second lens unit, and $\epsilon_d$ denotes an Airy disc radius for the d-line, which is determined by the numerical aperture on the image side of the optical system, and the object point and the image point are points on the optical axis, and also include cases of being a virtual object point and a virtual image point.

(Appended Mode 2-8)

The optical system according to one of appended modes 2-1 to 2-7, wherein the following conditional expression (22) is satisfied:

$$0.01 \leq D_{G2max}/\phi_s < 2.0 \quad (22)$$

where, $D_{G1max}$ denotes a maximum distance from among distances on the optical axis of the adjacent lenses in the first lens unit, and $\phi_s$ denotes the diameter of the stop.

(Appended Mode 2-9)

The optical system according to one of appended modes 2-1 to 2-8, wherein the following conditional expression (26) is satisfied:

$$0.95 < \phi_{G1o}/(2\times Y/|\beta|) \quad (26)$$

where, $\phi_{G1o}$ denotes an effective diameter of the object-side surface of the first object-side lens, Y denotes the maximum image height in the overall optical system, and $\beta$ denotes an imaging magnification of the optical system.

(Appended Mode 2-10)

The optical system according to one of appended modes 2-1 to 2-9, wherein the following conditional expression (28) is satisfied:

$$0 < BF/Y < 7.0 \quad (28)$$

where,

BF denotes the distance on the optical axis from the image-side surface of the second image-side lens up to the image, and Y denotes the maximum image height in the overall optical system.

(Appended Mode 2-11)

The optical system according to one of appended modes 2-1 to 2-10, wherein the second lens unit includes four lenses, and at least one of the four lenses in the second lens unit is a negative lens, and at least one of the four lenses in the second lens unit is a positive lens, and an object-side surface of the positive lens from among the positive lenses, which is positioned nearest to the object side, is a convex surface that is convex toward the object side.

(Appended Mode 2-12)

The optical system according to one of appended modes 2-1 to 2-11, wherein the first lens unit includes a first image-side lens which is disposed nearest to the image side, and a distance of two lenses positioned on two side of the stop is fixed, and the following conditional expression (30) is satisfied:

$$D_{G1G2}/\phi_s < 2.0 \quad (30)$$

where, $D_{G1G2}$ denotes a distance on the optical axis from the image-side surface of the first image-side lens up to the object-side surface of the second object-side lens, and $\phi_s$ denotes the diameter of the stop.

(Appended Mode 2-13)

The optical system according to one of appended modes 2-1 to 2-12, wherein the first lens unit includes a first image-side lens which disposed nearest to the image, and the following conditional expression (31) is satisfied:

$$0.1 < L_{G1}/L_{G2} < 1.5 \quad (31)$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to the image side surface of the second image-side lens.

(Appended Mode 2-14)

The optical system according to one of appended modes 2-1 to 2-13, wherein the following conditional expression (32) is satisfied:

$$0.1 < L_{G1s}/L_{sG2} < 1.5 \quad (32)$$

where, $L_{G1s}$ denotes a distance on the optical axis from the object-side surface of the first object-side lens up to the stop, and $L_{sG2}$ denotes a distance on the optical axis from the stop up to the image side surface of the second image-side lens.

(Appended Mode 2-15)

The optical system according to one of appended modes 2-1 to 2-14, wherein the following conditional expression (33) is satisfied:

$$0.8 \leq \phi_{G1max}/\phi_{G2max} < 5.0 \quad (33)$$

where, $\phi_{G1max}$ denotes a maximum effective diameter from among effective diameter of lenses in the first lens unit, and $\phi_{G2max}$ denotes a maximum effective diameter from among effective diameter apertures of lenses in the second lens unit.

(Appended Mode 2-16)

The optical system according to one of appended modes 2-1 to 2-15, wherein the first lens unit includes a first image-side lens which is disposed nearest to the image, and the following conditional expression (34) is satisfied:

$$0.5 < D_{os}/L_{G1} < 4.0 \quad (34)$$

where, $D_{os}$ denotes the distance on the optical axis from the object up to the stop, and $L_{G1}$ denotes the distance on the optical axis from the object-side surface of the first object-side lens up to the image-side surface of the first image-side lens.

(Appended Mode 2-17)

The optical system according to one of appended modes 2-1 to 2-16, wherein the first lens unit includes the first object-side lens, and a lens which is disposed to be adjacent to the first object-side lens, and at least one of the first object-side lens and the lens disposed to be adjacent to the first object-side lens has a positive refractive power.

(Appended Mode 2-18)

The optical system according to one of appended modes 2-1 to 2-17, wherein the first object-side lens has a negative refractive power.

(Appended Mode 2-19)

The optical system according to one of appended modes 2-1 to 2-18, wherein the following conditional expression (37-1) is satisfied:

$$f_{G1o}/f<-0.01 \quad (37\text{-}1)$$

where, $f_{G1o}$ denotes a focal length of the first object-side lens, and f denotes a focal length of the overall optical system.

(Appended Mode 2-20)

The optical system according to one of appended modes 2-1 to 2-19, wherein an object-side surface of the first object-side lens is concave toward the object side.

(Appended Mode 2-21)

The optical system according to one of appended modes 2-1 to 2-20, wherein the following conditional expression (38-1) is satisfied:

$$R_{G1o}/WD<-0.1 \quad (38\text{-}1)$$

where, $R_{G1o}$ denotes a radius of curvature of the object-side surface of the first object-side lens, and WD denotes a distance on the optical axis from the object up to the object-side side surface of the first object-side lens.

(Appended Mode 2-22)

The optical system according to one of appended modes 2-1 to 2-21, wherein an image-side surface of the second image-side lens is concave toward the image side, and the following conditional expression (39) is satisfied:

$$0.1\leq R_{G2i}/BF \quad (39)$$

where, $R_{G2i}$ denotes a radius of curvature of the image-side surface of the second image-side lens, and BF denotes the distance on the optical axis from the image-side surface of the second image-side lens up to the image.

(Appended Mode 2-23)

The optical system according to appended mode 2-5, wherein a positive lens is disposed on the object side of the predetermined lens unit, and the positive lens is disposed to be adjacent to the predetermined lens unit.

(Appended Mode 2-24)

The optical system according to one of appended modes 2-1 to 2-23, wherein a shape of at least one lens surface of the second image-side lens is a shape having an inflection point.

(Appended Mode 2-25)

The optical system according to one of appended modes 2-1 to 2-24, wherein the following conditional expression (42) is satisfied:

$$0.01<1/\nu d_{G1min}-1/\nu d_{G1max} \quad (42)$$

where, $\nu d_{G1min}$ denotes a smallest Abbe's number from among Abbe's numbers for lenses forming the first lens unit, and $\nu d_{G1max}$ denotes a largest Abbe's number from among Abbe's numbers for lenses forming the first lens unit.

(Appended Mode 2-26)

The optical system according to one of appended modes 2-1 to 2-25, wherein the following conditional expression (43) is satisfied:

$$0.01<1/\nu d_{G2min}-1/\nu d_{G2max} \quad (43)$$

where, $\nu d_{G2min}$ denotes a smallest Abbe's number from among Abbe's numbers for lenses forming the second lens unit, and $\nu d_{G2max}$ denotes a largest Abbe's number from among Abbe's numbers for lenses forming the second lens unit.

(Appended Mode 2-27)

The optical system according to one of appended modes 2-1 to 2-26, wherein the optical system includes at least one positive lens which satisfies the following conditional expression (44):

$$0.59<\theta_{gF}<0.8 \quad (44)$$

where, $\theta_{gF}$ denotes a partial dispersion ratio of the positive lens, and is expressed by $\theta_{gF}=(ng-nF)/(nF-nC)$, where nC, nF, and ng denote refractive indices with respect to a C-line, an F-line, and a g-line respectively.

(Appended Mode 2-28)

The optical system according to appended mode 2-27, wherein the positive lens which satisfies conditional expression (44) is included in the first lens unit.

(Appended Mode 2-29)

The optical system according to one of appended mode 2-27 and 2-28, wherein the positive lens which satisfies conditional expression (44), satisfies the following conditional expression (45):

$$0.3<D_{p1s}/L_{G1s}\leq 1 \quad (45)$$

where, $D_{p1s}$ denotes a distance on the optical axis from an object-side surface of the positive lens up to the stop, and $L_{G1s}$ denotes the distance on the optical axis from an object-side surface of the first object-side lens up to the stop.

(Appended Mode 2-30)

The optical system according to one of appended modes 2-1 to 2-29, wherein the first lens unit has a positive refractive power, and includes at least one diffractive optical element.

(Appended Mode 2-31)

The optical system according to one of appended modes 2-1 to 2-30, wherein at least one diffractive optical element is disposed at a position which is on the object side of the stop, and at the position which satisfies the following conditional expression (48):

$$0.1<D_{DLs}/D_{G1is} \quad (48)$$

where, $D_{DLs}$ denotes a distance on the optical axis from the diffractive optical element up to the stop, and $D_{G1is}$ denotes the distance on the optical axis from the image-side surface of the first image-side lens up to the stop.

(Appended Mode 2-32)

The optical system according to one of appended modes 2-1 to 2-31, wherein at least one diffractive optical element is disposed at a position which is on the image side of the stop, and at the position which satisfies the following conditional expression (49):

$$0.2<D_{sDL}/L_{sG2}<0.9 \quad (49)$$

where, $D_{sDL}$ denotes a distance on the optical axis from the stop up to the diffractive optical element, and $L_{sG2}$ denotes a distance on the optical axis from the stop up to the image-side surface of the second image-side lens.

(Appended Mode 2-33)

The optical system according to one of appended modes 2-1 to 2-32, wherein the optical system includes a negative lens which satisfies the following conditional expressions (50) and (51):

$$0.01<1/\nu d_{n1}-1/\nu d_{G1max} \quad (50)$$

$$0<D_{n1s}/D_{os}<0.3 \quad (51)$$

where, $\nu d_{n1}$ denotes Abbe's number for the negative lens, $\nu d_{G1max}$ denotes the largest Abbe's number from among the Abbe's numbers for lenses forming the first lens unit, $D_{n1s}$ denotes a distance on the optical axis from an object-side surface of the negative lens up to the stop, and $D_{os}$ denotes the distance on the optical axis from the object up to the stop.

(Appended Mode 2-34)

The optical system according to one of appended modes 2-1 to 2-33, wherein the optical system includes a negative lens at a position which satisfies the following conditional expression (54):

$$0.6<D_{sn3}/D_{si}<1 \quad (54)$$

where, $D_{sn3}$ denotes a distance on the optical axis from the stop up to an image-side surface of the negative lens, and $D_{si}$ denotes a distance on the optical axis from the stop up to the image.

(Appended Mode 2-35)

The optical system according to one of appended modes 2-1 to 2-34, wherein the following conditional expression (56) is satisfied:

$$0.78<L_L/D_{oi}+0.07\times WD/BF \quad (56)$$

where, $L_L$ denotes the distance on the optical axis from the object-side surface of the first object-side lens up to the image-side surface of the second image-side lens, $D_{si}$ denotes the distance on the optical axis from the object up to the image, WD denotes the distance on the optical axis from the object up to the object-side surface of the first object-side lens, and BF denotes the distance on the optical axis from the image-side surface of the second image-side lens up to the image.

(Appended Mode 2-36)

The optical system according to one of appended modes 2-1 to 2-35, wherein the first lens unit includes a first image-side lens which is disposed nearest to the image, and the following conditional expression (57) is satisfied:

$$D_{os}/L_{G1}-0.39\times WD/BF<1.8 \quad (57)$$

where, $D_{os}$ denotes the distance on the optical axis from the object up to the stop, $L_{G1}$ denotes the distance on the optical axis from the object-side surface of the first object-side lens up to the image-side surface of the first image-side lens, WD denotes the distance on the optical axis from the object up to the object-side surface of the first object-side lens, and BF denotes the distance on the optical axis from the image-side surface of the second image-side lens up to the image.

(Appended Mode 2-37)

An image pickup apparatus comprising:

an optical system according to one of appended modes 2-1 to 2-36; and an image pickup element.

(Appended Mode 2-38)

An image pickup system comprising:

an image pickup apparatus according to appended mode 2-37;

a stage which holds an object; and an illuminating unit which illuminates the object.

(Appended Mode 2-39)

The image pickup system according to appended mode 2-38, wherein the image pickup apparatus and the stage are integrated.

(Appended Mode 3-1)

An optical system comprising in order from an object side, a lens unit Gf having a positive refractive power, a stop, and a lens unit Gr having a positive refractive power, and the following conditional expressions (4-1), (5), (9-1), and (13) are satisfied:

$$0.08<NA, 0.08<NA' \quad (4\text{-}1)$$

$$-2<\beta<-0.5 \quad (5)$$

$$0<d_1/\Sigma d<0.2 \quad (9\text{-}1)$$

$$-20<\Delta f_{cd}/\epsilon d<20 \quad (13)$$

where,

NA denotes a numerical aperture on the object side of the optical system,

NA' denotes a numerical aperture on an image side of the optical system, $\beta$ denotes a projection magnification of the optical system, $d_1$ denotes a distance on an optical axis from a surface positioned nearest to the image side of the lens unit Gf up to a surface positioned nearest to the object side of the lens unit Gr, $\Sigma d$ denotes a sum total of lens thickness on the optical axis of an overall optical system, $\epsilon d$ denotes an Airy disc radius for a d-line which is determined by the numerical aperture on the image side of the optical system, and $\Delta f_{cd}$ denotes a difference in a focal position on a C-line and a focal position on the d-line, which is a difference in positions at which light is focused when parallel light is made to be incident on the lens unit Gr from the stop side.

(Appended Mode 3-2)

The optical system according to appended mode 3-1, wherein the following conditional expression (6) is satisfied:

$$0.5<f_{OB}/f_{TL}<2 \quad (6)$$

where, $f_{OB}$ denotes a focal length of the lens unit Gf, and $f_{TL}$ denotes a focal length of the lens unit Gr.

(Appended Mode 3-3)

The optical system according to one of appended modes 3-1 and 3-2, wherein the following conditional expression (14) is satisfied:

$$0.7<d_{SHOB}/d_{SHTL}<1.3 \quad (14)$$

where, $d_{SHOB}$ denotes a distance on the optical axis from a front principal point of the lens unit Gf up to the stop, and $d_{SHTL}$ denotes a distance on the optical axis from the stop up to a rear principal point of the lens unit Gr.

(Appended Mode 3-4)

The optical system according to one of appended modes 3-1 to 3-3, wherein a positive lens Lf1 is disposed nearest to an image in the lens unit Gf.

(Appended Mode 3-5)

The optical system according to one of appended modes 3-1 to 3-4, wherein the lens unit Gf includes a lens Lfe which is disposed nearest to the object, and at least one lens surface of the lens Lfe has a shape which has an inflection point.

(Appended Mode 3-6)

The optical system according to one of appended modes 3-1 to 3-5, wherein the lens unit Gr includes a lens Lre which is disposed nearest to the image, and at least one lens surface of the lens Lre has a shape which has an inflection point.

(Appended Mode 3-7)

The optical system according to one of appended modes 3-1 to 3-6, wherein the following conditional expressions (7-1) and (8-1) are satisfied:

$$40\% \leq MTF_{OB} \quad (7\text{-}1)$$

$$40\% \leq MTF_{TL} \quad (8\text{-}1)$$

where, $MTF_{OB}$ denotes an MTF on an axis of the lens unit Gf, and is an MTF with respect to a spatial frequency of fc/4, $MTF_{TL}$ denotes an MTF on an axis of the lens unit Gr, and is an MTF with respect to a spatial frequency of fc'/4, where fc denotes a cut-off frequency with respect to the numerical aperture on the object side of the optical system, and fc' denotes a cut-off frequency with respect to the numerical aperture on the image side of the optical system, and both $MTF_{OB}$ and $MTF_{TL}$ are MTFs at positions at which, light is focused when parallel light of an e-line is made to be incident from a direction of the stop side, respectively.

(Appended Mode 3-8)

The optical system according to one of appended modes 3-1 to 3-7, wherein a positive lens Lr1 is disposed nearest to the object in the lens unit Gr.

(Appended Mode 3-9)

The optical system according to one of appended modes 3-1 to 3-8, wherein a negative lens Lf2 is disposed on the object side of the positive lens Lf1 such that, the negative lens Lf2 is adjacent to the positive lens Lf1.

(Appended Mode 3-10)

The optical system according to one of appended modes 3-1 to 3-9, wherein a negative lens Lr2 is disposed on the image side of the positive lens Lr1 such that, the negative lens Lr2 is adjacent to the positive lens Lr1.

(Appended Mode 3-11)

The optical system according to one of appended modes 3-1 to 3-10, wherein an object-side surface of the negative lens Lf2 is concave toward the object side.

(Appended Mode 3-12)

The optical system according to one of appended modes 3-1 to 3-11, wherein an image-side surface of the negative lens Lr2 is concave toward the image side.

(Appended Mode 3-13)

The optical system according to one of appended modes 3-1 to 3-12, wherein the lens Lfe has a negative refractive power.

(Appended Mode 3-14)

The optical system according to one of appended modes 3-1 to 3-13, wherein the lens Lre has a negative refractive power.

(Appended Mode 3-15)

The optical system according to one of appended modes 3-1 to 3-14, wherein the optical system includes at least one pair of lenses which satisfies the following conditional expressions (1), (2), and (3), and one lens in the pair of lenses is included in the lens unit Gf, and the other lens in the pair of lenses is included in the lens unit Gr:

$$-1.1 < r_{OBf}/r_{TLr} < -0.9 \quad (1)$$

$$-1.1 < r_{OBr}/r_{TLf} < -0.9 \quad (2)$$

$$-0.1 < (d_{OB}-d_{TL})/(d_{OB}+d_{TL}) < 0.1 \quad (3)$$

where, $r_{OBf}$ denotes a paraxial radius of curvature of an object-side surface of the one lens in the pair of lenses, $r_{OBr}$ denotes a paraxial radius of curvature of an image-side surface of the one lens in the pair of lenses, $r_{TLf}$ denotes a paraxial radius of curvature of an object-side surface of the other lens in the pair of lenses, $r_{TLr}$ denotes a paraxial radius of curvature of an image-side surface of the other lens in the pair of lenses, $d_{OB}$ denotes a thickness on the optical axis of the one lens in the pair of lenses, and $d_{TL}$ denotes a thickness on the optical axis of the other lens in the pair of lenses.

(Appended Mode 3-16)

The optical system according to one of appended modes 3-1 to 3-15, wherein the following conditional expression (12-1) is satisfied:

$$-10° < \theta_o < 30° \quad (12\text{-}1)$$

where, $\theta_o$ denotes an angle made by a normal of a plane perpendicular to the optical axis with a principal ray on the object side.

(Appended Mode 3-17)

An optical instrument comprising:

an optical system according to one of appended modes 3-1 to 3-16; and an image pickup element.

(Appended Mode 4-1)

An optical system comprising in order from an object side, a lens unit Gf having a positive refractive power, a stop, and a lens unit Gr having a positive refractive power, and the following conditional expressions (4-1), (5), (10-1), and (13) are satisfied:

$$0.0 < NA, 0.0 < NA' \quad (4\text{-}1)$$

$$-2 < \beta < -0.5 \quad (5)$$

$$0 < d_2/\Sigma d < 2 \quad (10\text{-}1)$$

$$-20 < \Delta f_{cd}/\epsilon d < 20 \quad (13)$$

where,

NA denotes a numerical aperture on the object side of the optical system,

NA' denotes a numerical aperture on an image side of the optical system,

β denotes a projection magnification of the optical system, $d_2$ denotes a distance on an optical axis from a front principal point of the lens unit Gf up to a rear principal point of the lens unit Gr, Σd denotes a sum total of lens thickness on the optical axis of an overall optical system, ϵd denotes an Airy disc radius for a d-line which is determined by the numerical aperture on the image side of the optical system, and $\Delta f_{cd}$ denotes a difference in a focal position on a C-line and a focal position on the d-line, which is a difference in positions at which light is focused when parallel light is made to be incident on the lens unit Gr from the stop side.

(Appended Mode 4-2)

The optical system according to appended mode 4-1, wherein the following conditional expression (6) is satisfied:

$$0.5<f_{OB}/f_{TL}<2 \quad (6)$$

where, $f_{OB}$ denotes a focal length of the lens unit Gf, and $f_{TL}$ denotes a focal length of the lens unit Gr.

(Appended Mode 4-3)

The optical system according to one of appended modes 4-1 and 4-2, wherein the following conditional expression (14) is satisfied:

$$0.7<d_{SHOB}/d_{SHTL}<1.3 \quad (14)$$

where, $d_{SHOB}$ denotes a distance on the optical axis from the front principal point of the lens unit Gf up to the stop, and $d_{SHTL}$ denotes a distance on the optical axis from the stop up to the rear principal point of the lens unit Gr.

(Appended Mode 4-4)

The optical system according to one of appended modes 4-1 to 4-3, wherein a positive lens Lf1 is disposed nearest to an image in the lens unit Gf.

(Appended Modes 4-5)

The optical system according to one of appended modes 4-1 to 4-4, wherein the lens unit Gf includes a lens Lfe which is disposed nearest to the object, and at least one lens surface of the lens Lfe has a shape which has an inflection point.

(Appended Mode 4-6)

The optical system according to one of appended modes 4-1 to 4-5, wherein the lens unit Gr includes a lens Lre which is disposed nearest to the image, and at least one lens surface of the lens Lre has a shape which has an inflection point.

(Appended Mode 4-7)

The optical system according to one of appended modes 4-1 to 4-6, wherein the following conditional expressions (7-1) and (8-1) are satisfied:

$$40\% \leq MTF_{OB} \quad (7\text{-}1)$$

$$40\% \leq MTF_{TL} \quad (8\text{-}1)$$

where, $MTF_{OB}$ denotes an MTF on an axis of the lens unit Gf, and is an MTF with respect to a spatial frequency of fc/4, $MTF_{TL}$ denotes an MTF on an axis of the lens unit Gr, and is an MTF with respect to a spatial frequency of fc'/4, where fc denotes a cut-off frequency with respect to the numerical aperture on the object side of the optical system, and fc' denotes a cut-off frequency with respect to the numerical aperture on the image side of the optical system, and both $MTF_{OB}$ and $MTF_{TL}$ are MTFs at positions at which light is focused when parallel light of an e-line is made to be incident from a direction of the stop side, respectively.

(Appended Mode 4-8)

The optical system according to one of appended modes 4-1 to 4-7, wherein a positive lens Lr1 is disposed nearest to the object in the lens unit Gr.

(Appended Mode 4-9)

The optical system according to one of appended modes 4-1 to 4-8, wherein a negative lens Lf2 is disposed on the object side of the positive lens Lf1 such that, the negative lens Lf2 is adjacent to the positive lens Lf1.

(Appended Mode 4-10)

The optical system according to one of appended modes 4-1 to 4-9, wherein a negative lens Lr2 is disposed on the image side of the positive lens Lr1 such that, the negative lens Lr2 is adjacent to the positive lens Lr1.

(Appended Mode 4-11)

The optical system according to one of appended modes 4-1 to 4-10, wherein an object-side surface of the negative lens Lf2 is concave toward the object side.

(Appended Mode 4-12)

The optical system according to one of appended modes 4-1 to 4-11, wherein an image-side surface of the negative lens Lr2 is concave toward image side.

(Appended Mode 4-13)

The optical system according to one of appended modes 4-1 to 4-12, wherein the lens Lfe has a negative refractive power.

(Appended Mode 4-14)

The optical system according to one of appended modes 4-1 to 4-13, wherein the lens Lre has a negative refractive power.

(Appended Mode 4-15)

The optical system according to one of appended modes 4-1 to 4-14, wherein the optical system includes at least one pair of lenses which satisfies the following conditional expressions (1), (2), and (3), and one lens in the pair of lenses is included in the lens unit Gf, and the other lens in the pair of lenses is included in the lens unit Gr:

$$-1.1<r_{OBf}/r_{TLr}<-0.9 \quad (1)$$

$$-1.1<r_{OBr}/r_{TLf}<-0.9 \quad (2)$$

$$-0.1<(d_{OB}-d_{TL})/(d_{OB}+d_{TL})<0.1 \quad (3)$$

where, $r_{OBf}$ denotes a paraxial radius of curvature of an object-side surface of the one lens in the pair of lenses, $r_{OBr}$ denotes a paraxial radius of curvature of an image-side surface of the one lens in the pair of lenses, $r_{TLf}$ denotes a paraxial radius of curvature of an object-side surface of the other lens in the pair of lenses, $r_{TLr}$ denotes a paraxial radius of curvature of an image-side surface of the other lens in the pair of lenses, $d_{OB}$ denotes a thickness on the optical axis of the one lens in the pair of lenses, and $d_{TL}$ denotes a thickness on the optical axis of the other lens in the pair of lenses.

(Appended Mode 4-16)

The optical system according to one of appended modes 4-1 to 4-15, wherein the following conditional expression (12-1) is satisfied:

$$-10°<\theta_o<30° \quad (12\text{-}1)$$

where, $\theta_o$ denotes an angle made by a normal of a plane perpendicular to the optical axis with a principal ray on the object side.

(Appended Mode 4-17)

An optical instrument comprising:

an optical system according to one of appended modes 4-1 to 4-16; and an image pickup element.

(Appended Mode 5-1)

An optical system which forms an optical image on an image pickup element including a plurality of pixels arranged in rows two-dimensionally, which converts a light intensity to an electric signal, and a plurality of color filters disposed on the plurality of pixels respectively, and for which, a pitch of pixels is not more than 5.0 μm, comprising in order from an object side, a first lens unit which includes a plurality of lenses, a stop, and a second lens unit which includes a plurality of lenses, wherein lens units which form the optical system include the first lens unit and the second lens unit, and the first lens unit includes a first object-side lens which is disposed nearest to the object, and the second lens unit includes a second image-side lens which is disposed nearest to an image, and a conjugate image of the object is formed by the first lens unit, and a final image of the object is formed by the second lens unit, and the following conditional expressions (16), (18), and (25) are satisfied:

$$0.0<NA \quad (16)$$

$$-30<(\Delta D_{G2dC}+(\Delta D_{G1dC}\times\beta_{G2C}^{2}/(1+\beta_{G2C}\times\Delta D_{G1dC}/f_{G2C})))/\epsilon_d<30 \quad (18)$$

$$0.15<D_{os}/D_{oi}<0.8 \quad (25)$$

where,

NA denotes a numerical aperture on the object side of the optical system, $\Delta D_{G1dC}$ denotes a distance from a position of an image point $P_{G1}$ on a d-line up to a position of an image point on a C-line, at an image point of the first lens unit with respect to an object point on an optical axis, $\Delta D_{G2dC}$ denotes a distance from a position of an image point on the d-line up to a position of an image point on the C-line, at an image point of the second lens unit, when the image point $P_{G1}$ is let to be an object point of the second lens unit, where $\Delta D_{G1dC}$ and $\Delta D_{G2dC}$ are let to be positive in a case in which, the position of the image point on the C-line is on the image side of the position of the image point on the d-line, $\Delta D_{G1dC}$ and $\Delta D_{G2dC}$ are let to be negative in a case in which, the position of the image point on the C-line is on the object side of the position of the image point on the d-line, $\beta_{G2C}$ denotes an imaging magnification for the C-line of the second lens unit when the image point $P_{G1}$ is let to be the object point of the second lens unit, $f_{G2C}$ denotes a focal length for the C-line of the second lens unit, $\epsilon_d$ denotes an Airy disc radius for the d-line, which is determined by the numerical aperture on the image side of the optical system, $D_{os}$ denotes a distance on the optical axis from the object up to the stop, and $D_{oi}$ denotes a distance on the optical axis from the object up to the image, and the object point and the image point are points on the optical axis, and also include cases of being a virtual object point and a virtual image point.

(Appended Mode 5-2)

The optical system according to appended mode 5-1, wherein the following conditional expression (24) is satisfied:

$$0.01<1/\nu d_{min}-1/\nu d_{max} \quad (24)$$

where, $\nu d_{min}$ denotes a smallest Abbe's number from among Abbe's numbers for lenses forming the optical system, and $\nu d_{max}$ denotes a largest Abbe's number from among Abbe's numbers for lenses forming the optical system.

(Appended Mode 5-3)

The optical system according to one of appended modes 5-1 and 5-2, wherein the following conditional expression (23) is satisfied:

$$0.4<L_L/D_{oi} \quad (23)$$

where, $L_L$ denotes a distance on the optical axis from an object-side surface of the first object-side lens up to an image-side surface of the second image-side lens, and $D_{oi}$ denotes the distance on the optical axis from the object up to the image.

(Appended Mode 5-4)

The optical system according to one of appended modes 5-1 to 5-3, wherein the first lens unit has a positive refractive power, and the following conditional expression (19) is satisfied:

$$1.0<WD/BF \quad (19)$$

where,

WD denotes a distance on the optical axis from the object up to the object-side surface of the first object-side lens, and BF denotes a distance on the optical axis from the image-side surface of the second image-side lens up to the image.

(Appended Mode 5-5)

The optical system according to one of appended modes 5-1 to 5-4, wherein the following conditional expression (56) is satisfied:

$$0.78<L_L/D_{oi}+0.07\times WD/BF \quad (56)$$

where, $L_L$ denotes the distance on the optical axis from the object-side surface of the first object-side lens up to the image-side surface of the second image-side lens, $D_{oi}$ denotes the distance on the optical axis from the object up to the image, WD denotes the distance on the optical axis from the object up to the object-side surface of the first object-side lens, and BF denotes the distance on the optical axis from the image-side surface of the second image-side lens up to the image.

(Appended Mode 5-6)

The optical system according to one of appended modes 5-1 to 5-5, wherein the first lens unit includes a first image-side lens which is disposed nearest to the image, and the following conditional expression (31-1) is satisfied:

$$0.1<L_{G1}/L_{G2}<1.4 \quad (31\text{-}1)$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to the image side surface of the second image-side lens.

(Appended Mode 5-7)

The optical system according to one of appended modes 5-1 to 5-6, wherein the first lens unit includes the first image-side lens which is disposed nearest to the image, and the following conditional expression (34) is satisfied:

$$0.5<D_{os}/L_{G1}<4.0 \quad (34)$$

where, $D_{os}$ denotes the distance on the optical axis from the object up to the stop, and $L_{G1}$ denotes the distance on the optical axis from the object-side surface of the first object-side lens up to the image-side surface of the first image-side lens.

(Appended Mode 5-8)

The optical system according to one of appended modes 5-1 to 5-7, wherein the first lens unit includes the first image-side lens which is disposed nearest to the image, and the following conditional expression (57) is satisfied:

$$D_{os}/L_{G1}-0.39\times WD/BF<1.8 \quad (57)$$

where, $D_{os}$ denotes the distance on the optical axis from the object up to the stop, $L_{G1}$ denotes the distance on the optical axis from the object-side surface of the first object-side lens up to the image-side surface of the first image-side lens, WD denotes the distance on the optical axis from the object up to the object-side surface of the first object-side lens, and BF denotes the distance on the optical axis from the image-side surface of the second image-side lens up to the image.

(Appended Mode 5-9)

The optical system according to one of appended modes 5-1 to 5-8, wherein the following conditional expression (27) is satisfied:

$$0<BF/L_L<0.4 \quad (27)$$

where,

BF denotes the distance on the optical axis from the image-side surface of the second image-side lens up to the image, and $L_L$ denotes the distance on the optical axis from the object-side surface of the first object-side lens up to the image-side surface of the second image-side lens.

(Appended Mode 5-10)

The optical system according to one of appended modes 5-1 to 5-9, wherein the following conditional expressions (35) and (36) are satisfied:

$$1.0<D_{ENP}/Y \quad (35)$$

$$0\leq CRA_{obj}/CRA_{img}<0.5 \quad (36)$$

where, $D_{ENP}$ denotes a distance on the optical axis from a position of an entrance pupil of the optical system up to the object-side surface of the first object-side lens, Y denotes a maximum image height in an overall optical system, $CRA_{obj}$ denotes a maximum angle from among angles made by a principal ray that is incident on the first object-side lens, with the optical axis, and $CRA_{img}$ denotes a maximum angle from among angles made by a principal ray that is incident on an image plane, with the optical axis, and an angle measured in a direction of clockwise rotation is let to be a negative angle, and an angle measured in a direction of counterclockwise rotation is let to be a positive angle.

(Appended Mode 5-11)

The optical system according to one of appended modes 5-1 to 5-10, wherein the first lens unit includes a negative lens, and a positive lens which is disposed on the object side of the negative lens, and the following conditional expression (20-1) is satisfied:

$$1.0<2\times(WD\times\tan(\sin^{-1}\text{NA})+Y_{obj})/\phi_s<5.0 \quad (20\text{-}1)$$

where,

WD denotes the distance on an optical axis from the object up to the object-side surface of the first object-side lens, NA denotes the numerical aperture on the object side of the optical system, $Y_{obj}$ denotes a maximum object height, and $\phi_s$ denotes a diameter of the stop.

(Appended Mode 5-12)

The optical system according to one of appended modes 5-1 to 5-11, wherein the following conditional expression (21) is satisfied:

$$0.01<D_{max}/\phi_s<3.0 \quad (21)$$

where, $D_{max}$ denotes a maximum distance from among distances on the optical axis of adjacent lenses in the optical system, and $\phi_s$ denotes the diameter of the stop.

(Appended Mode 5-13)

The optical system according to one of appended modes 5-1 to 5-12, wherein the first lens unit includes the first object-side lens, and a lens which is disposed to be adjacent to the first object-side lens, and at least one of the first object-side lens and the lens disposed to be adjacent to the first object-side lens has a positive refractive power.

(Appended Mode 5-14)

The optical system according to one of appended modes 5-1 to 5-13, wherein the second lens unit includes a predetermined lens unit nearest to the image, and the predetermined lens unit has a negative refractive power as a whole, and consists a single lens having a negative refractive power or two single lenses, and the two single lenses consist in order from the object side, a lens having a negative refractive power, and a lens having one of a positive refractive power and a negative refractive power.

(Appended Mode 5-15)

The optical system according to appended mode 5-14, wherein a positive lens is disposed on the object side of the predetermined lens unit, and the positive lens is disposed to be adjacent to the predetermined lens unit.

(Appended Mode 5-16)

The optical system according to one of appended modes 5-1 to 5-15, wherein the first lens unit includes a first image-side lens which is disposed nearest to the image, and an image-side surface of the first image-side lens is concave toward the image side, and the following conditional expression (40) is satisfied:

$$0.2<R_{G1i}/D_{G1is} \quad (40)$$

where, $R_{G1i}$ denotes a radius of curvature of the image-side surface of the first image-side lens, and $D_{G1is}$ denotes a distance on the optical axis from the image-side surface of the first image-side lens up to the stop.

(Appended Mode 5-17)

The optical system according to one of appended modes 5-1 to 5-16, wherein the optical system includes at least one positive lens which satisfies the following conditional expression (44):

$$0.59<\theta_{gF}<0.8 \quad (44)$$

where, $\theta_{gF}$ denotes a partial dispersion ratio of the positive lens, and is expressed by $\theta_{gF}$=(ng−nF)/(nF−nC), where nC, nF, and ng denote refractive indices with respect to a C-line, an F-line, and a g-line respectively.

(Appended Mode 5-18)

The optical system according to appended mode 5-17, wherein the positive lens which satisfies conditional expression (44) is included in the first lens unit.

(Appended Mode 5-19)

The optical system according to one of appended modes 5-17 and 5-18, wherein the positive lens which satisfies conditional expression (44), satisfies the following conditional expression (45):

$$0.3<D_{p1s}/L_{G1s}\leq 1 \quad (45)$$

where, $D_{p1s}$ denotes a distance on the optical axis from an object-side surface of the positive lens up to the stop, and $L_{G1s}$ denotes a distance on the optical axis from an object-side surface of the first object-side lens up to the stop.

(Appended Mode 5-20)

The optical system according to one of appended modes 5-1 to 5-19, wherein the following conditional expression (28) is satisfied:

$$0<BF/Y<7.0 \quad (28)$$

where,

BF denotes the distance on the optical axis from the image-side surface of the second image-side lens up to the image, and Y denotes the maximum image height in the overall optical system.

(Appended Mode 5-21)

The optical system according to one of appended modes 5-1 to 5-20, wherein the following conditional expression (22) is satisfied:

$$0.01\leq D_{G1max}/\phi_s<2.0 \quad (22)$$

where, $D_{G1max}$ denotes a maximum distance from among distances on the optical axis of the adjacent lenses in the first lens unit, and $\phi_s$ denotes the diameter of the stop.

(Appended Mode 5-22)

The optical system according to one of appended modes 5-1 to 5-21, wherein the optical system satisfies the following conditional expression (26) is satisfied:

$$0.95<\phi_{G1o}/(2\times Y/|\beta|) \quad (26)$$

where, $\phi_{G1o}$ denotes an effective diameter of the object-side surface of the first object-side lens, Y denotes the maximum image height in the overall optical system, and $\beta$ denotes an imaging magnification of the optical system.

(Appended Mode 5-23)

The optical system according to one of appended modes 5-1 to 5-22, wherein the following conditional expression (29) is satisfied:

$$-0.2<\phi_{G1o}/R_{G1o}<3.0 \quad (29)$$

where, $\phi_{G1o}$ denotes the effective diameter of the object-side surface of the first object-side lens, and $R_{G1o}$ denotes a radius of curvature of the object-side surface of the first object-side lens.

(Appended Mode 5-24)

The optical system according to one of appended modes 5-1 to 5-23, wherein the second lens unit includes four lenses, and at least one of the four lenses in the second lens unit is a negative lens, and at least one of the four lenses in the second lens unit is a positive lens, and an object-side surface of the positive lens from among the positive lenses, which is positioned nearest to the object side, is a convex surface that is convex toward the object side.

(Appended Mode 5-25)

The optical system according to one of appended modes 5-1 to 5-24, wherein the first lens unit includes a first image-side lens which is disposed nearest to the image side, and a distance of two lenses positioned on two side of the stop is fixed, and the following conditional expression (30) is satisfied:

$$D_{G1G2}/\phi_s<2.0 \quad (30)$$

where, $D_{G1G2}$ denotes a distance on the optical axis from the image-side surface of the first image-side lens up to the object-side surface of the second object-side lens, and $\phi_s$ denotes the diameter of the stop.

(Appended Mode 5-26)

The optical system according to one of appended modes 5-1 to 5-25, wherein the following conditional expression (32) is satisfied:

$$0.1<L_{G1s}/L_{sG2}<1.5 \quad (32)$$

where, $L_{G1s}$ denotes the distance on the optical axis from the object-side surface of the first object-side lens up to the stop, and $L_{sG2}$ denotes a distance on the optical axis from the stop up to the image side surface of the second image-side lens.

(Appended Mode 5-27)

The optical system according to one of appended modes 5-1 to 5-26, wherein the following conditional expression (33) is satisfied:

$$0.8\leq\phi_{G1max}/\phi_{G2max}<5.0 \quad (33)$$

where, $\phi_{G1max}$ denotes the maximum effective diameter from among effective diameter of lenses in the first lens unit, and $\phi_{G2max}$ denotes a maximum effective diameter from among effective diameter of lenses in the second lens unit.

(Appended Mode 5-28)

The optical system according to one of appended modes 5-1 to 5-27, wherein the first object-side lens has a positive refractive power.

(Appended Mode 5-29)

The optical system according to one of appended modes 5-1 to 5-28, wherein the following conditional expression (37) is satisfied:

$$0.05<f_{G1o}/f \quad (37)$$

where, $f_{G1o}$ denotes a focal length of the first object-side lens, and f denotes a focal length of the overall optical system.

(Appended Mode 5-30)

The optical system according to one of appended modes 5-1 to 5-29, wherein an object-side surface of the first object-side lens is convex toward the object.

(Appended Mode 5-31)

The optical system according to one of appended modes 5-1 to 5-30, wherein the optical system satisfies the following conditional expression (38) is satisfied:

$$0.02<R_{G1o}/WD \quad (38)$$

where, $R_{G1o}$ denotes the radius of curvature of the object-side surface of the first object-side lens, and WD denotes the distance on the optical axis from the object up to the object-side side surface of the first object-side lens.

(Appended Mode 5-32)

The optical system according to one of appended modes 5-1 to 5-31, wherein an image-side surface of the second image-side lens is concave toward the image side, and the following conditional expression (39) is satisfied:

$$0.1\le R_{G2i}/BF \quad (39)$$

where, $R_{G2i}$ denotes a radius of curvature of the image-side surface of the second image-side lens, and BF denotes the distance on the optical axis from the image-side surface of the second image-side lens up to the image.

(Appended Mode 5-33)

The optical system according to one of appended modes 5-1 to 5-32, wherein the following conditional expression (41) is satisfied:

$$0.5<f_{G1o}/f_{G1}<20 \quad (41)$$

where, $f_{G1o}$ denotes the focal length of the first object-side lens, and $f_{G1}$ denotes a focal length of the first lens unit.

(Appended Mode 5-34)

The optical system according to one of appended modes 5-1 to 5-33, wherein the optical system satisfies the following conditional expression (42) is satisfied:

$$0.01<1/\nu d_{G1min}-1/\nu d_{G1max} \quad (42)$$

where, $\nu d_{G1min}$ denotes a smallest Abbe's number from among Abbe's numbers for lenses forming the first lens unit, and $\nu d_{G1max}$ denotes the largest Abbe's number from among Abbe's numbers for lenses forming the first lens unit.

(Appended Mode 5-35)

The optical system according to one of appended modes 5-1 to 5-34, wherein the following conditional expression (43) is satisfied:

$$0.01<1/\nu d_{G2min}-1/\nu d_{G2max} \quad (43)$$

where, $\nu d_{G2min}$ denotes a smallest Abbe's number from among Abbe's numbers for lenses forming the second lens unit, and $\nu d_{G2max}$ denotes a largest Abbe's number from among Abbe's numbers for lenses forming the second lens unit.

(Appended Mode 5-36)

The optical system according to one of appended modes 5-1 to 5-35, wherein the first lens unit has a positive refractive power, and includes at least one diffractive optical element.

(Appended Mode 5-37)

The optical system according to one of appended modes 5-1 to 5-36, wherein at least one diffractive optical element is disposed at a position which is on the object side of the stop, and at the position which satisfies the following conditional expression (48):

$$0.1<D_{DLs}/D_{G1is} \quad (48)$$

where, $D_{DLs}$ denotes a distance on the optical axis from the diffractive optical element up to the stop, and $D_{G1is}$ denotes a distance on the optical axis from the image-side surface of the first image-side lens up to the stop.

(Appended Mode 5-38)

The optical system according to one of appended modes 5-1 to 5-37, wherein at least one diffractive optical element is disposed at a position which is on the image side of the stop, and at the position which satisfies the following conditional expression (49):

$$0.2<D_{sDL}/L_{sG2}<0.9 \quad (49)$$

where, $D_{sDL}$ denotes a distance on the optical axis from the stop up to the diffractive optical element, and $L_{sG2}$ denotes a distance on the optical axis from the stop up to the image-side surface of the second image-side lens.

(Appended Mode 5-39)

The optical system according to one of appended modes 5-1 to 5-38, wherein the optical system includes a negative lens which satisfies the following conditional expressions (50) and (51):

$$0.01<1/\nu d_{n1}-1/\nu d_{G1max} \quad (50)$$

$$0<D_{n1s}/D_{os}<0.3 \quad (51)$$

where, $\nu d_{n1}$ denotes Abbe's number for the negative lens, $\nu d_{G1max}$ denotes the largest Abbe's number from among the Abbe's numbers for lenses forming the first lens unit, $D_{n1s}$ denotes a distance on the optical axis from an object-side surface of the negative lens up to the stop, and $D_{os}$ denotes the distance on the optical axis from the object up to the stop.

(Appended Mode 5-40)

The optical system according to one of appended modes 5-1 to 5-39, wherein the optical system includes a negative lens at a position which satisfies the following conditional expression (54):

$$0.6<D_{sn3}/D_{si}<1 \quad (54)$$

where, $D_{sn3}$ denotes a distance on the optical axis from the stop up to an image-side surface of the negative lens, and $D_{si}$ denotes a distance on the optical axis from the stop up to the image.

(Appended Mode 5-41)

The optical system according to one of appended modes 5-1 to 5-40, wherein the following conditional expression (56) is satisfied:

$$0.78<L_L/D_{oi}+0.07\times WD/BF \quad (56)$$

where, $L_L$ denotes the distance on the optical axis from the object-side surface of the first object-side lens up to the image-side surface of the second image-side lens, $D_{oi}$ denotes the distance on the optical axis from the object up to the image, WD denotes the distance on the optical axis from the object up to the object-side surface of the first object-side lens, and BF denotes the distance on the optical axis from the image-side surface of the second image-side lens up to the image.

(Appended Mode 5-42)

The optical system according to one of appended modes 5-1 to 5-41, wherein the first lens unit includes a first image-side lens which is disposed nearest to the image, and the following conditional expression (57) is satisfied:

$$D_{os}/L_{G1}-0.39\times WD/BF<1.8 \tag{57}$$

where, $D_{os}$ denotes the distance on the optical axis from the object up to the stop, $L_{G1}$ denotes the distance on the optical axis from the object-side surface of the first object-side lens up to the image-side surface of the first image-side lens, WD denotes the distance on the optical axis from the object up to the object-side surface of the first object-side lens, and BF denotes the distance on the optical axis from the image-side surface of the second image-side lens up to the image.

(Appended Mode 5-43)

An image pickup apparatus comprising:

an optical system according to one of appended modes 5-1 to 5-42; and an image pickup element.

(Appended Mode 5-44)

An image pickup system comprising:

an image pickup apparatus according to appended mode 5-43;

a stage which holds an object; and an illuminating unit which illuminates the object.

(Appended Mode 5-45)

The image pickup system according to appended mode 5-44, wherein the image pickup apparatus and the stage are integrated.

(Appended Mode 5'-2)

The optical system according to appended mode 5-1, wherein the following conditional expression (24) is satisfied:

$$0.01<1/\nu d_{min}-1/\nu d_{max} \tag{24}$$

where, $\nu d_{min}$ denotes the smallest Abbe's number from among Abbe's numbers for lenses forming the optical system, and $\nu d_{max}$ denotes the largest Abbe's number from among Abbe's numbers for lenses forming the optical system.

(Appended Mode 5'-3)

The optical system according to one of appended modes 5-1 and 5'-2, wherein the following conditional expression (23) is satisfied:

$$0.4<L_L/D_{oi} \tag{23}$$

where, $L_L$ denotes the distance on the optical axis from the object-side surface of the first object-side lens up to the image-side surface of the second image-side lens, and $D_{oi}$ denotes the distance on the optical axis from the object up to the image.

(Appended Mode 5'-4)

The optical system according to one of appended modes 5-1, 5'-2, and 5'-3, wherein the following conditional expression (21) is satisfied:

$$0.01<D_{max}/\phi_s<3.0 \tag{21}$$

where, $D_{max}$ denotes the maximum distance from among distances on the optical axis of adjacent lenses in the optical system, and $\phi_s$ denotes the diameter of the stop.

(Appended Mode 5'-5)

The optical system according to one of appended mode 5-1, and appended modes 5'-2 to 5'-4, wherein the following conditional expression (25) is satisfied:

$$0.15<D_{os}/D_{oi}<0.8 \tag{25}$$

where, $D_{os}$ denotes the distance on the optical axis from the object up to the stop, and $D_{oi}$ denotes the distance on the optical axis from the object up to the image.

(Appended Mode 5'-6)

The optical system according to one of appended mode 5-1 and appended modes from 5'-2 to 5'-5, wherein the following conditional expression (27) is satisfied:

$$0<BF/L_L<0.4 \tag{27}$$

where,

BF denotes the distance on the optical axis from the image-side surface of the second image-side lens up to the image, and $L_L$ denotes the distance on the optical axis from the object-side surface of the first object-side lens up to the image-side surface of the second image-side lens.

(Appended Mode 5'-7)

The optical system according to one of appended mode 5-1, and appended modes 5'-2 to 5'-6, wherein the following conditional expressions (35) and (36) are satisfied:

$$1.0<D_{ENP}/Y \tag{35}$$

$$0\leq CRA_{obj}/CRA_{img}<0.5 \tag{36}$$

where, $D_{ENP}$ denotes a distance on the optical axis from a position of an entrance pupil of the optical system up to the object-side surface of the first object-side lens, Y denotes the maximum image height in the overall optical system, $CRA_{obj}$ denotes the maximum angle from among angles made by a principal ray that is incident on the first object-side lens, with the optical axis, and $CRA_{img}$ denotes the maximum angle from among angles made by a principal ray that is incident on an image plane, with the optical axis, and an angle measured in a direction of clockwise rotation is let to be a negative angle, and an angle measured in a direction of counterclockwise rotation is let to be a positive angle.

(Appended Mode 5'-8)

The optical system according to one of appended mode 5-1 and appended modes 5'-2 to 5'-7, wherein the second lens unit includes a predetermined lens unit nearest to the image, and the predetermined lens unit has a negative refractive power as a whole, and consists a single lens having a negative refractive power or two single lenses, and the two single lenses consist in order from the object side, a lens having a negative refractive power, and a lens having one of a positive refractive power and a negative refractive power.

(Appended Mode 5'-9)

The optical system according to one of appended mode 5-1 and appended modes 5'-2 to 5'-8, wherein the first lens unit includes a first image-side lens which is disposed nearest to the image, and an image-side surface of the first image-side lens is concave toward the image side, and the following conditional expression (40) is satisfied:

$$0.2<R_{G1i}/D_{G1is} \quad (40)$$

where, $R_{G1i}$ denotes the radius of curvature of the image-side surface of the first image-side lens, and $D_{G1is}$ denotes the distance on the optical axis from the image-side surface of the first image-side lens up to the stop.

(Appended Mode 5"-2)

The optical system according to appended mode 5-1, wherein the first lens unit has a positive refractive power, and the following conditional expression (19) is satisfied:

$$1.0<WD/BF \quad (19)$$

where,

WD denotes the distance on an optical axis from the object up to an object-side surface of the first object-side lens, and BF denotes the distance on the optical axis from the image-side surface of the second image-side lens up to the image.

(Appended Mode 5"-3)

The optical system according to one of appended modes 5-1 and 5"-2, wherein the first lens unit includes a negative lens, and a positive lens which is disposed on the object side of the negative lens, and the following conditional expression (20-1) is satisfied:

$$1.0<2\times(WD\times\tan(\sin^{-1}\mathrm{NA})+Y_{obj})/\phi_s<5.0 \quad (20\text{-}1)$$

where,

WD denotes the distance on an optical axis from the object up to the object-side surface of the first object-side lens, NA denotes the numerical aperture on the object side of the optical system, $Y_{obj}$ denotes the maximum object height, and $\phi_s$ denotes the diameter of the stop.

(Appended Mode 5"-4)

The optical system according to one of appended modes 5-1, 5"-2, and 5"-3, wherein the following conditional expression (23) is satisfied:

$$0.4<L_L/D_{oi} \quad (23)$$

where, $L_L$ denotes the distance on the optical axis from the object-side surface of the first object-side lens up to the image-side surface of the second image-side lens, and $D_{oi}$ denotes the distance on the optical axis from the object up to the image.

(Appended Mode 5"-5)

The optical system according to one of appended mode 5-1, and appended modes 5"-2 to 5"-4, wherein the following conditional expression (27) is satisfied:

$$0<BF/L_L<0.4 \quad (27)$$

where,

BF denotes the distance on the optical axis from the image-side surface of the second image-side lens up to the image, and $L_L$ denotes the distance on the optical axis from the object-side surface of the first object-side lens up to the image-side surface of the second image-side lens.

(Appended Mode 5"-6)

The optical system according to one of appended mode 5-1, and appended modes 5"-2 to 5"-5, wherein the following conditional expressions (35) and (36) are satisfied:

$$1.0<D_{ENP}/Y \quad (35)$$

$$0\leq CRA_{obj}/CRA_{img}<0.5 \quad (36)$$

where, $D_{ENP}$ denotes a distance on the optical axis from a position of an entrance pupil of the optical system up to the object-side surface of the first object-side lens, Y denotes a maximum image height in the overall optical system, $CRA_{obj}$ denotes the maximum angle from among angles made by a principal ray that is incident on the first object-side lens, with the optical axis, and $CRA_{img}$ denotes the maximum angle from among angles made by a principal ray that is incident on an image plane, with the optical axis, and an angle measured in a direction of clockwise rotation is let to be a negative angle, and an angle measured in a direction of counterclockwise rotation is let to be a positive angle.

(Appended Mode 5"-7)

The optical system according to one of appended modes 5-1, and appended modes 5"-2 to 5"-6, wherein the following conditional expression (25) is satisfied:

$$0.15<D_{os}/D_{oi}<0.8 \quad (25)$$

where, $D_{os}$ denotes the distance on the optical axis from the object up to the stop, and $D_{oi}$ denotes the distance on the optical axis from the object up to the image.

(Appended Mode 5"-8)

The optical system according to one of appended mode 5-1, and appended modes 5"-2 to 5"-7, wherein the first lens unit includes a first image-side lens which is disposed nearest to the image, and the following conditional expression (31-1) is satisfied:

$$0.1<L_{G1}/L_{G2}<1.4 \quad (31\text{-}1)$$

where, $L_{G1}$ denotes the distance on the optical axis from the object-side surface of the first object-side lens up to an image-side surface of the first image-side lens, and $L_{G2}$ denotes the distance on the optical axis from an object-side surface of the second object-side lens up to the image side surface of the second image-side lens.

(Appended Mode 5"-9)

The optical system according to one of appended mode 5-1, and appended modes 5"-2 to 5"-8, wherein the first lens unit includes the first image-side lens which is disposed nearest to the image, and the following conditional expression (34) is satisfied:

$$0.5<D_{os}/L_{G1}<4.0 \quad (34)$$

where, $D_{os}$ denotes the distance on the optical axis from the object up to the stop, and $L_{G1}$ denotes the distance on the optical axis from the object-side surface of the first object-side lens up to the image-side surface of the first image-side lens.

(Appended Mode 5"-10)

The optical system according to one of appended mode 5-1, and appended modes 5"-2 to 5"-9, wherein the following conditional expression (21) is satisfied:

$$0.01<D_{max}/\phi_s<3.0 \quad (21)$$

where, $D_{max}$ denotes a maximum distance from among distances on the optical axis of adjacent lenses in the optical system, and $\phi_s$ denotes the diameter of the stop.

(Appended Mode 5"-11)

The optical system according to one of appended mode 5-1, and appended modes 5"-2 to 5"-10, wherein the following conditional expression (56) is satisfied:

$$0.78<L_L/D_{oi}+0.07\times WD/BF \quad (56)$$

where, $L_L$ denotes the distance on the optical axis from the object-side surface of the first object-side lens up to the image-side surface of the second image-side lens, $D_{oi}$ denotes the distance on the optical axis from the object up to the image, WD denotes the distance on the optical axis from the object up to the object-side surface of the first object-side lens, and BF denotes the distance on the optical axis from the image-side surface of the second image-side lens up to the image.

(Appended Mode 5"-12)

The optical system according one of appended modes 5-1, and appended modes 5"-2 to 5"-11, wherein the first lens unit includes a first image-side lens which is disposed nearest to the image, and the following conditional expression (57) is satisfied:

$$D_{os}/L_{G1}-0.39\times WD/BF<1.8 \quad (57)$$

where, $D_{os}$ denotes the distance on the optical axis from the object up to the stop, $L_{G1}$ denotes the distance on the optical axis from the object-side surface of the first object-side lens up to the image-side surface of the first image-side lens, WD denotes the distance on the optical axis from the object up to the object-side surface of the first object-side lens, and BF denotes the distance on the optical axis from the image-side surface of the second image-side lens up to the image.

As described heretofore, the present invention is suitable for an optical system in which, the numerical aperture on the image side is large, and various aberrations are corrected favorably, and an optical instrument in which such optical system is used. Moreover, the present invention is suitable for an optical system in which, an aberration is corrected favorably, and while having a high resolution because of the favorable correction of aberration, the overall length of the optical system is short, and for an image pickup apparatus and an image pickup system in which such optical system is used.

What is claimed is:

1. An optical system which forms an optical image on an image pickup element including a plurality of pixels arranged in rows two-dimensionally, which converts a light intensity to an electric signal, and a plurality of color filters disposed on the plurality of pixels respectively, comprising in order from an object side, a first lens unit having a positive refractive power, which includes a plurality of lenses, a stop, and a second lens unit which includes a plurality of lenses, wherein lens units which form the optical system include the first lens unit and the second lens unit, and the first lens unit includes a first object-side lens which is disposed nearest to an object, and the second lens unit includes a second image-side lens which is disposed nearest to an image, and the first lens unit includes a negative lens, and a positive lens which is disposed on the object side of the negative lens, and the following conditional expressions (15), (16), (19), and (20) are satisfied:

$$\beta\leq-1.1 \quad (15)$$

$$0.08<NA \quad (16)$$

$$1.0<WD/BF \quad (19)$$

$$0.5<2\times(WD\times\tan(\sin^{-1}NA)+Y_{obj})/\phi_s<4.0 \quad (20)$$

where, $\beta$ denotes an imaging magnification of the optical system,

NA denotes a numerical aperture on the object side of the optical system,

WD denotes a distance on an optical axis from the object up to an object-side surface of the first object-side lens, BF denotes a distance on the optical axis from an image-side surface of the second image-side lens up to the image, $Y_{obj}$ denotes a maximum object height, and $\phi_s$ denotes a diameter of the stop.

2. The optical system according to claim 1, wherein the first lens unit includes a first image-side lens which is disposed nearest to the image, and the following conditional expression (31) is satisfied:

$$0.1<L_{G1}/L_{G2}<1.5 \quad (31)$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to an image side surface of the second image-side lens.

3. The optical system according to claim 2, wherein the following conditional expression (25) is satisfied:

$$0.15<D_{os}/D_{oi}<0.8 \quad (25)$$

where, $D_{os}$ denotes a distance on the optical axis from the object up to the stop, and $D_{oi}$ denotes a distance on the optical axis from the object up to the image.

4. The optical system according to claim 3, wherein the following conditional expression (23) is satisfied:

$$0.4<L_L/D_{oi} \quad (23)$$

where, $L_L$ denotes a distance on the optical axis from the object-side surface of the first object-side lens up to the image-side surface of the second image-side lens, and $D_{oi}$ denotes the distance on the optical axis from the object up to the image.

5. The optical system according to claim 4, wherein the following conditional expression (34) is satisfied:

$$0.5<D_{os}/L_{G1}<4.0 \quad (34)$$

where, $D_{os}$ denotes the distance on the optical axis from the object up to the stop, and $L_{G1}$ denotes the distance on the optical axis from the object-side surface of the first object-side lens up to the image-side surface of the first image-side lens.

6. The optical system according to claim 5, wherein the following conditional expression (21) is satisfied:

$$0.01<D_{max}/\phi_s<3.0 \quad (21)$$

where, $D_{max}$ denotes a maximum distance from among distances on the optical axis of adjacent lenses in the optical system, and $\phi_s$ denotes the diameter of the stop.

7. The optical system according to claim 6, wherein the following conditional expression (56) is satisfied:

$$0.78<L_L/D_{oi}+0.07\times WD/BF \quad (56)$$

where, $L_L$ denotes the distance on the optical axis from the object-side surface of the first object-side lens up to the image-side surface of the second image-side lens, $D_{oi}$ denotes the distance on the optical axis from the object up to the image, WD denotes the distance on the optical axis from the object up to the object-side surface of the first object-side lens, and BF denotes the distance on the optical axis from the image-side surface of the second image-side lens up to the image.

8. The optical system according to claim 7, wherein the following conditional expression (57) is satisfied:

$$D_{os}/L_{G1}-0.39\times WD/BF<1.8 \quad (57)$$

where, $D_{os}$ denotes the distance on the optical axis from the object up to the stop, $L_{G1}$ denotes the distance on the optical axis from the object-side surface of the first object-side lens up to the image-side surface of the first image-side lens, WD denotes the distance on the optical axis from the object up to the object-side surface of the first object-side lens, and BF denotes the distance on the optical axis from the image-side surface of the second image-side lens up to the image.

9. The optical system according to claim 8, wherein the following conditional expression (27) is satisfied:

$$0<BF/L_L<0.4 \quad (27)$$

where,

BF denotes the distance on the optical axis from the image-side surface of the second image-side lens up to the image, and $L_L$ denotes the distance on the optical axis from the object-side surface of the first object-side lens up to the image-side surface of the second image-side lens.

10. The optical system according to claim 9, wherein the following conditional expressions (35) and (36) are satisfied:

$$1.0<D_{ENP}/Y \quad (35)$$

$$0\leq CRA_{obj}/CRA_{img}<0.5 \quad (36)$$

where, $D_{ENP}$ denotes a distance on the optical axis from a position of an entrance pupil of the optical system up to the object-side surface of the first object-side lens, Y denotes a maximum image height in an overall optical system, $CRA_{obj}$ denotes a maximum angle from among of angles made by a principal ray that is incident on the first object-side lens, with the optical axis, and $CRA_{img}$ denotes a maximum angle from among of angles made by a principal ray that is incident on an image plane, with the optical axis, and an angle measured in a direction of clockwise rotation is let to be a negative angle, and an angle measured in a direction of counterclockwise rotation is let to be a positive angle.

* * * * *